US012105940B2

(12) United States Patent
Clarke et al.

(10) Patent No.: US 12,105,940 B2
(45) Date of Patent: Oct. 1, 2024

(54) DEVICES, METHODS, AND GRAPHICAL USER INTERFACES FOR PROVIDING NOTIFICATIONS AND APPLICATION INFORMATION

(71) Applicant: Apple Inc., Cupertino, CA (US)

(72) Inventors: Graham R. Clarke, Scotts Valley, CA (US); Eric Lance Wilson, San Jose, CA (US); Andrew P. Clymer, San Jose, CA (US); Caelan G. Stack, Belmont, CA (US); Christopher P. Foss, San Francisco, CA (US); William M. Tyler, San Francisco, CA (US); Gregory M. Apodaca, Colbert, WA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/949,134

(22) Filed: Sep. 20, 2022

(65) Prior Publication Data

US 2023/0367460 A1 Nov. 16, 2023

Related U.S. Application Data

(60) Provisional application No. 63/349,128, filed on Jun. 5, 2022, provisional application No. 63/340,388, filed on May 10, 2022.

(51) Int. Cl.
*G06F 3/04842* (2022.01)
*G06F 3/01* (2006.01)
(Continued)

(52) U.S. Cl.
CPC .......... *G06F 3/04842* (2013.01); *G06F 3/016* (2013.01); *G06F 3/0481* (2013.01);
(Continued)

(58) Field of Classification Search
CPC ......................... G06F 21/36; G06F 2221/2149
(Continued)

(56) References Cited

U.S. PATENT DOCUMENTS 8,584,043 B2 11/2013 Cho et al.
9,189,193 B2 11/2015 Kim et al.
(Continued)

FOREIGN PATENT DOCUMENTS

JP 2012256254 A * 12/2012
JP 2016085640 A * 5/2016
(Continued)

OTHER PUBLICATIONS

Office Action, dated Feb. 14, 2023, received in U.S. Appl. No. 17/949,152, 36 pages.
(Continued)

*Primary Examiner* — Hwei-Min Lu
(74) *Attorney, Agent, or Firm* — Morgan, Lewis & Bockius LLP

(57) ABSTRACT

A computer system displays a first version of a first user interface that includes first user interface objects displayed concurrently with a first background. The first user interface objects include content from a first plurality of applications. In response to detecting a first input, when the first input includes movement in a first direction, the system replaces display of the first version of the first user interface with a second user interface that includes representations of a second plurality of applications. When the first input includes second movement in a second direction, the system replaces display of the first version of the first user interface with display of a second version of the first user interface that includes second user interface objects displayed with a second background. The second user interface objects cor-
(Continued)

respond to a third plurality of applications and include content from the third plurality of applications.

68 Claims, 177 Drawing Sheets

(51) Int. Cl.

| | |
|---|---|
| ***G06F 3/0481*** | (2022.01) |
| ***G06F 3/0482*** | (2013.01) |
| ***G06F 3/04845*** | (2022.01) |
| ***G06F 3/04847*** | (2022.01) |
| ***G06F 3/0485*** | (2022.01) |
| ***G06F 3/0488*** | (2022.01) |
| ***G06F 11/30*** | (2006.01) |
| ***G06F 21/36*** | (2013.01) |
| ***G06F 40/279*** | (2020.01) |
| ***G06T 11/60*** | (2006.01) |
| ***G06T 13/00*** | (2011.01) |
| ***G06T 13/80*** | (2011.01) |
| ***H04M 1/72442*** | (2021.01) |
| ***H04M 1/72463*** | (2021.01) |
| ***H04M 1/72472*** | (2021.01) |
| ***H04M 1/72484*** | (2021.01) |

(52) U.S. Cl.
CPC ...... *G06F 3/04845* (2013.01); *G06F 3/04847* (2013.01); *G06F 3/0485* (2013.01); *G06F 3/0488* (2013.01); *G06F 11/3072* (2013.01); *G06F 21/36* (2013.01); *G06F 40/279* (2020.01); *G06T 11/60* (2013.01); *G06T 13/00* (2013.01); *G06T 13/80* (2013.01); *H04M 1/72442* (2021.01); *H04M 1/724634* (2022.02); *H04M 1/72472* (2021.01); *H04M 1/72484* (2021.01); *G06F 3/0482* (2013.01); *G06F 2221/2149* (2013.01); *G06T 2200/24* (2013.01)

(58) Field of Classification Search
USPC .......................................................... 715/764
See application file for complete search history.

(56) References Cited

U.S. PATENT DOCUMENTS 9,304,668 B2 4/2016 Rezende et al.
9,489,050 B2 11/2016 Hua
9,547,432 B2 1/2017 Lee et al.
9,912,795 B2 3/2018 Soundararajan et al.
9,952,756 B2 4/2018 Conn et al.
9,953,101 B1 4/2018 Walliser
10,015,301 B1 7/2018 Soundararajan et al.
10,114,534 B2 10/2018 Kasterstein et al.
10,157,455 B2 12/2018 Jeong et al.
10,223,540 B2 3/2019 Shepherd et al.
10,241,737 B2 3/2019 Choi
10,409,476 B2 9/2019 Choi et al.
10,435,894 B2 10/2019 Woodward
10,551,995 B1 * 2/2020 Ho ........................ G06F 3/0486
10,733,716 B2 8/2020 Jeong et al.
10,834,246 B2 11/2020 Soundararajan et al.
10,884,536 B2 1/2021 Lee et al.
10,924,600 B2 2/2021 Soundararajan et al.
10,970,006 B1 4/2021 Nazzaro et al.
11,010,498 B1 5/2021 Puvvula et al.
11,061,372 B1 7/2021 Chen et al.
11,320,983 B1 5/2022 Boyers
11,379,106 B1 7/2022 Graham et al.
11,435,894 B2 9/2022 Tyler
11,470,193 B2 10/2022 Soundararajan et al.
11,489,803 B2 11/2022 Dascola et al.
11,502,984 B2 11/2022 Dascola et al.
11,561,688 B2 1/2023 Crowley et al.
11,567,654 B2 1/2023 Tyler
11,695,862 B2 7/2023 Soundararajan et al.
11,706,329 B2 7/2023 Soundararajan et al.
2006/0123353 A1 6/2006 Matthews et al.
2008/0016438 A1 1/2008 Choi
2008/0294575 A1 11/2008 Jung
2009/0186604 A1 7/2009 Ruy et al.
2010/0088597 A1 4/2010 Shin et al.
2010/0100841 A1 4/2010 Shin et al.
2010/0295789 A1 11/2010 Shin et al.
2011/0074599 A1 3/2011 Cornwall et al.
2011/0195723 A1 * 8/2011 Kim ...................... G06F 3/0484 455/566
2012/0015693 A1 1/2012 Choi et al.
2012/0079432 A1 3/2012 Lee et al.
2012/0110483 A1 5/2012 Arcese et al.
2013/0063362 A1 3/2013 Papakipos et al.
2013/0088442 A1 * 4/2013 Lee ..................... G06F 3/04883 345/173
2013/0103665 A1 4/2013 Kasterstein et al.
2013/0162571 A1 * 6/2013 Tamegai ............. G06F 3/04817 345/173
2013/0283305 A1 10/2013 Hirsch et al.
2013/0305189 A1 11/2013 Kim
2014/0053189 A1 2/2014 Lee et al.
2014/0101609 A1 4/2014 Bamford et al.
2014/0245202 A1 * 8/2014 Yoon ..................... G06F 3/0482 715/765
2014/0298190 A1 * 10/2014 Barrus .................... G06F 21/31 715/741
2014/0331167 A1 11/2014 Kasterstein et al.
2015/0026615 A1 1/2015 Choi et al.
2015/0185988 A1 7/2015 Yim et al.
2015/0205498 A1 7/2015 Levi
2015/0205505 A1 7/2015 Conn et al.
2015/0254464 A1 9/2015 Shah et al.
2015/0268811 A1 9/2015 Min et al.
2015/0281626 A1 * 10/2015 Sirpal ................... G06F 3/0484 348/564
2015/0334219 A1 11/2015 Soundararajan et al.
2015/0334570 A1 * 11/2015 Nade ....................... G06F 21/36 455/411
2015/0339036 A1 11/2015 Hwang et al.
2015/0378537 A1 12/2015 Marimuthu et al.
2016/0006678 A1 * 1/2016 Jung ................... G06F 3/04883 715/752
2016/0124633 A1 5/2016 Kim et al.
2016/0154549 A1 6/2016 Chaudhri et al.
2016/0357406 A1 12/2016 Lee et al.
2016/0364564 A1 * 12/2016 Lee ....................... G06F 3/0484
2017/0099602 A1 * 4/2017 Joo ......................... G06F 21/32
2017/0115998 A1 * 4/2017 Fang ..................... H04M 1/724
2017/0201856 A1 7/2017 Wilbur
2017/0357439 A1 * 12/2017 Lemay .................... H04M 1/67
2018/0032048 A1 2/2018 Devis et al.
2018/0046346 A1 2/2018 Choi et al.
2018/0048752 A1 * 2/2018 Zhou ................. H04M 1/72403
2018/0081616 A1 * 3/2018 Choi ................. H04M 1/72412
2018/0124232 A1 * 5/2018 Tokutake .............. G06F 3/0488
2018/0232114 A1 8/2018 Saunshi et al.
2018/0307356 A1 10/2018 Zhu et al.
2018/0335920 A1 * 11/2018 Tyler ................... G06F 3/04883
2018/0348971 A1 12/2018 Bai
2018/0373426 A1 12/2018 Yang et al.
2019/0166475 A1 5/2019 Nankandiyil et al.
2019/0342252 A1 11/2019 Dascola et al.
2019/0369861 A1 * 12/2019 Ive ...................... G06F 3/04886
2020/0014807 A1 1/2020 Kurumasa et al.
2020/0233539 A1 7/2020 Liu et al.
2020/0233568 A1 7/2020 Wang
2020/0259946 A1 8/2020 Mao et al.
2020/0296193 A1 9/2020 Kim et al.
2020/0356063 A1 * 11/2020 Guzman ............... G06F 3/0481
2021/0105356 A1 * 4/2021 Yu ......................... G06F 3/0482
2021/0349426 A1 * 11/2021 Chen ....................... G06T 11/40
2022/0058038 A1 2/2022 Park et al.

(56) References Cited

U.S. PATENT DOCUMENTS

| | | | |
|---|---|---|---|
| 2022/0083199 | A1 | 3/2022 | Van O's et al. |
| 2022/0174145 | A1 | 6/2022 | Wilson et al. |
| 2022/0224665 | A1 | 7/2022 | Zhou et al. |
| 2022/0229546 | A1 | 7/2022 | Lee et al. |
| 2022/0342514 | A1 | 10/2022 | Chao et al. |
| 2022/0357823 | A1 | 11/2022 | Choi |
| 2023/0066232 | A1 | 3/2023 | Caro et al. |
| 2023/0091262 | A1 | 3/2023 | Zhou et al. |
| 2023/0367440 | A1 | 11/2023 | Clarke et al. |
| 2023/0367467 | A1 | 11/2023 | Clarke et al. |
| 2023/0367470 | A1 | 11/2023 | Clarke et al. |
| 2023/0367472 | A1 | 11/2023 | Clarke et al. |
| 2024/0143147 | A1 | 5/2024 | Clarke et al. |

FOREIGN PATENT DOCUMENTS

| | | | |
|---|---|---|---|
| JP | 2021144680 | A | 9/2021 |
| WO | WO 2018034396 | A1 | 2/2018 |

OTHER PUBLICATIONS

Invitation to Pay Additional Fees, dated Aug. 23, 2023, received in International Patent Application No. PCT/US2023/021376, 11 pages.
U.S. Appl. No. 10/895,979, filed Jan. 19, 2021, Boyers.
Notice of Allowance, dated Jul. 26, 2023, received in U.S. Appl. No. 17/949,144, 13 pages.
Office Action, dated May 10, 2023, received in U.S. Appl. No. 17/949,128, 8 pages.
Office Action, dated Mar. 30, 2023, received in U.S. Appl. No. 17/949,144, 19 pages.
Final Office Action, dated Jun. 14, 2023, received in U.S. Appl. No. 17/949,152, 39 pages.
International Search Report and Written Opinion, dated Oct. 18, 2023, received in International Patent Application No. PCT/US2023/021376, 36 pages.
Burgstahler et al., "Switching Push and Pull: and Energy Efficient Notification Approach", IEEE Computer Society, Jun. 1, 2014, 8 pages.
Haj_Yahya, et al., "Techniques for Reducing the Connected-Standby Energy Consumption for the Mobile Device", IEEE Computer Sciety, Feb. 1, 2022, 14 pages.
Notice of Allowance, dated Aug. 16, 2023, received in U.S. Appl. No. 17/949,128, 11 pages.
Google, Inc., "Android Developers Guides—Ongoing Activity", https:developer.android.com/training/wearables/ongoing-activity, May 20, 2021, 11 pages.
Office Action, dated Sep. 8, 2023, received in U.S. Appl. No. 17/949,155, 25 pages.
Office Action, dated Feb. 13, 2024, received in Japanese Patent Application No. 2022-151732, which corresponds with U.S. Appl. No. 17/949,134, 2 pages.
Office Action, dated Mar. 8, 2024, received in U.S. Appl. No. 17/949,152, 40 pages.
Office Action, dated Feb. 27, 2024, received in Japanese Patent Application No. 2022-151736, which corresponds with U.S. Appl. No. 17/949,155, 6 pages.
Google, Inc., "Android Developers Guides—Notification Manager", https://developer.anddroid.com/reference/android/app/NotificationManager, 2024, 67 pages.
Stack Overflow, "Android: Remove Notification from Notification Bar", https://stackoverflow.com/questions/3595232/android-remove-notification-from-notification-bar, 2015, 7 pages.
Notice of Allowance, dated Jun. 5, 2024, received in U.S. Appl. No. 17/949,155, 10 pages.
Miser, "My iPhone for Seniors", https://ptgmedia.pearsoncmg.com/images/9780789753618/samplepages/9780789753618, Feb. 1, 2015, 127 pages.
Samsung, Samsung Galaxy Note Edge User Manual, http://downloadcenter.samsung.com/content/UM/201411/20141111909537622/SM-N915, Nov. 1, 2014, 137 pages.
Office Action, dated Oct. 26, 2023, received in U.S. Appl. No. 17/612,903, 9 pages.
Notice of Allowance, dated Feb. 2, 2024, received in U.S. Appl. No. 17/612,903, 6 pages.
International Search Report and Written Opinion, dated Sep. 23, 2020, received in International Patent Application No. PCT/US2020/033997, 20 pages.
Office Action, dated Aug. 1, 2024, received in U.S. Appl. No. 18/407,235, 9 pages.

* cited by examiner

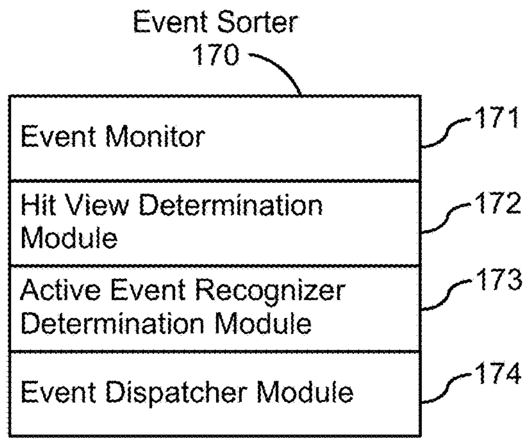
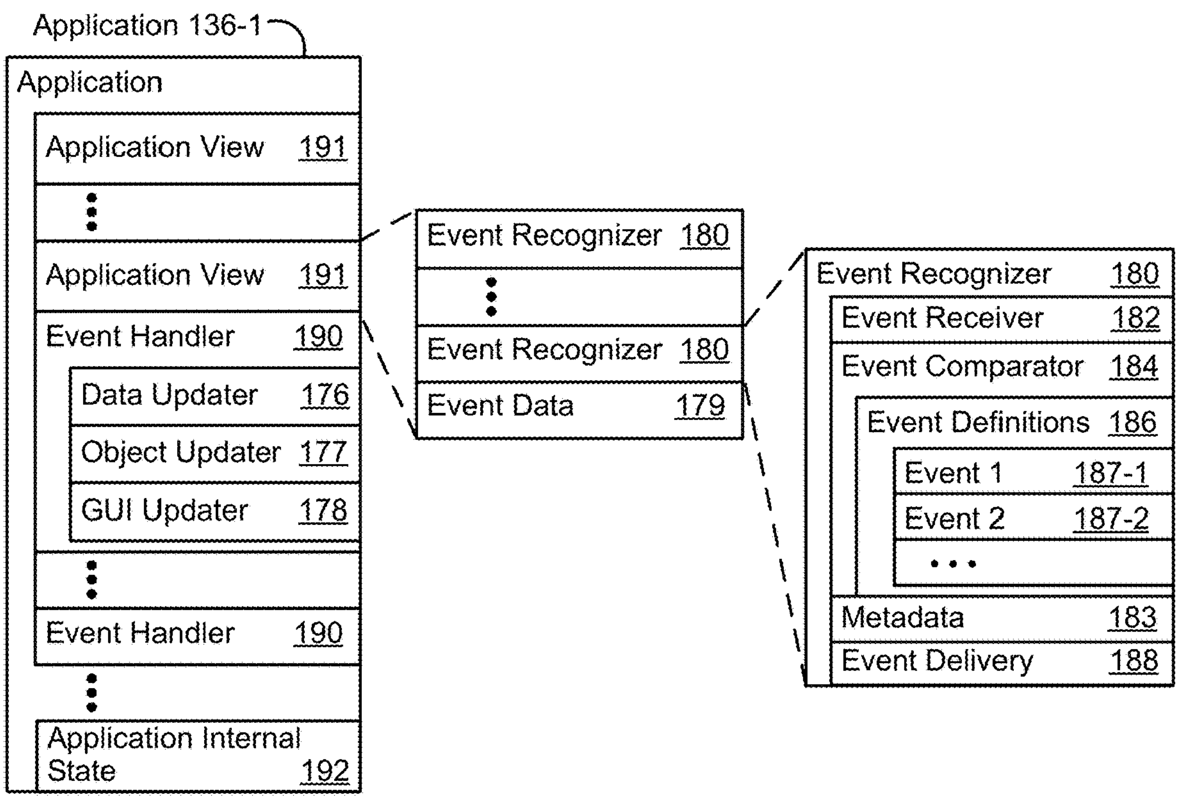
Figure 1B

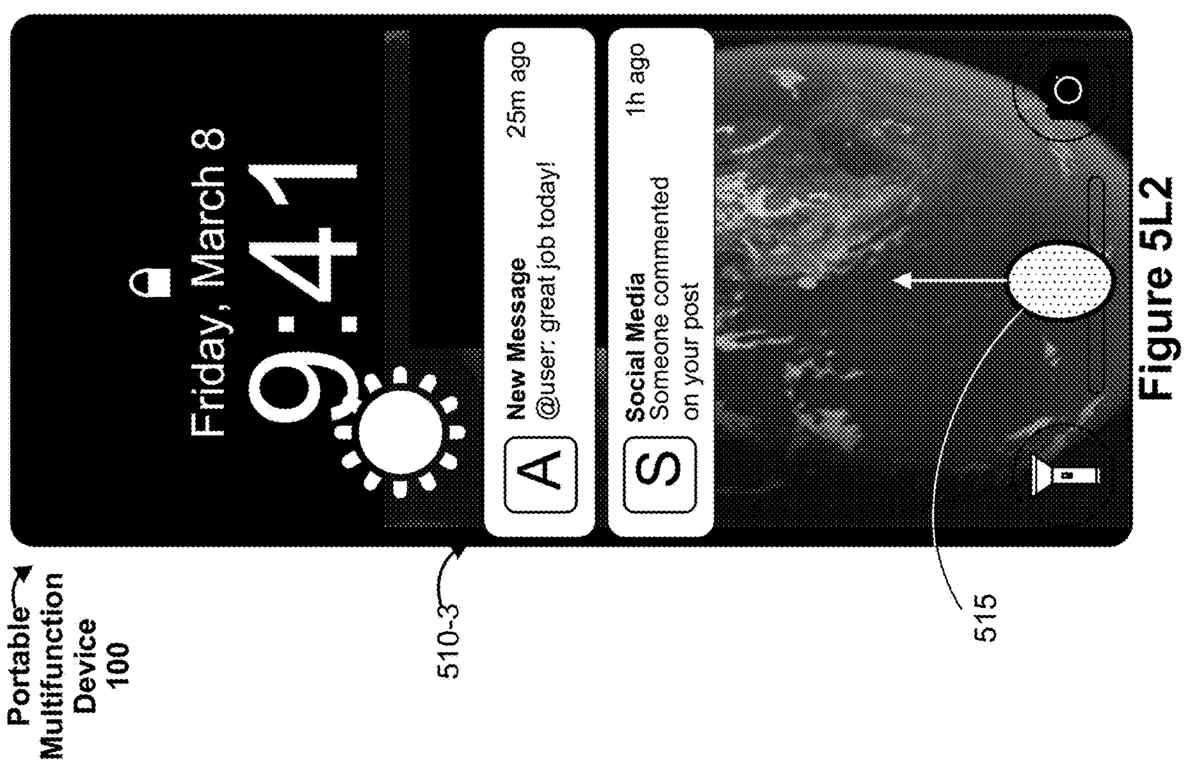
Figure 5L2
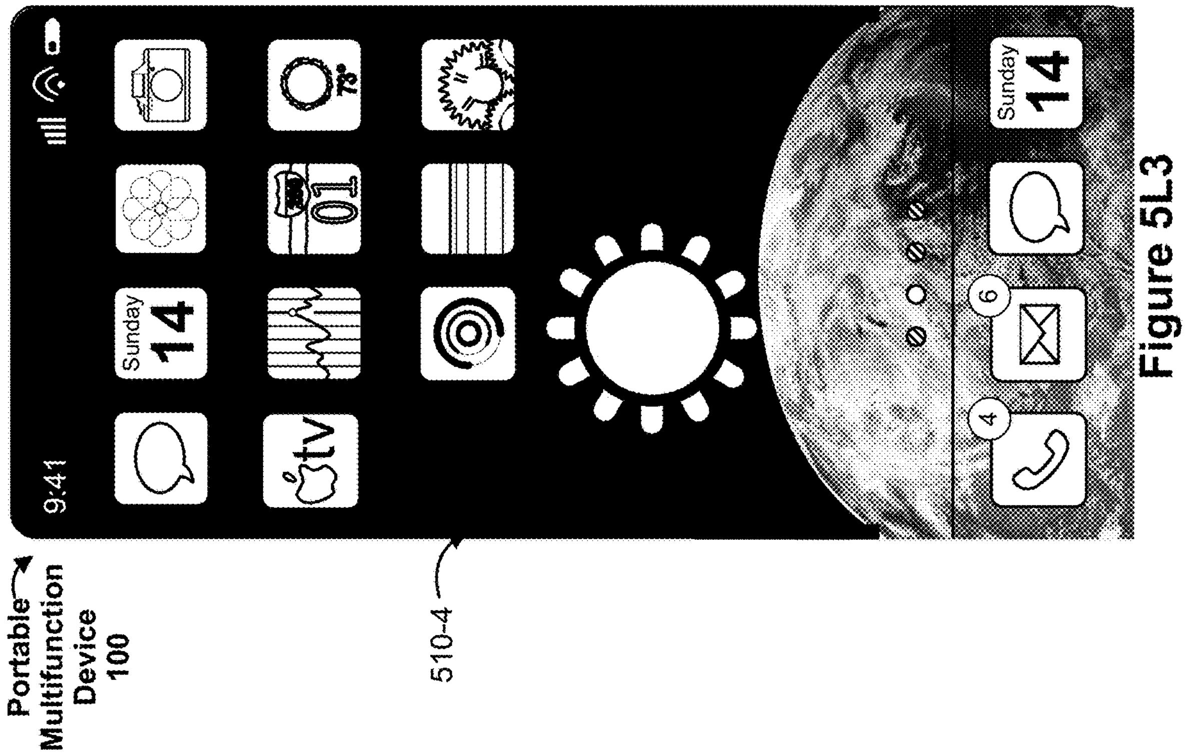
Figure 5L3

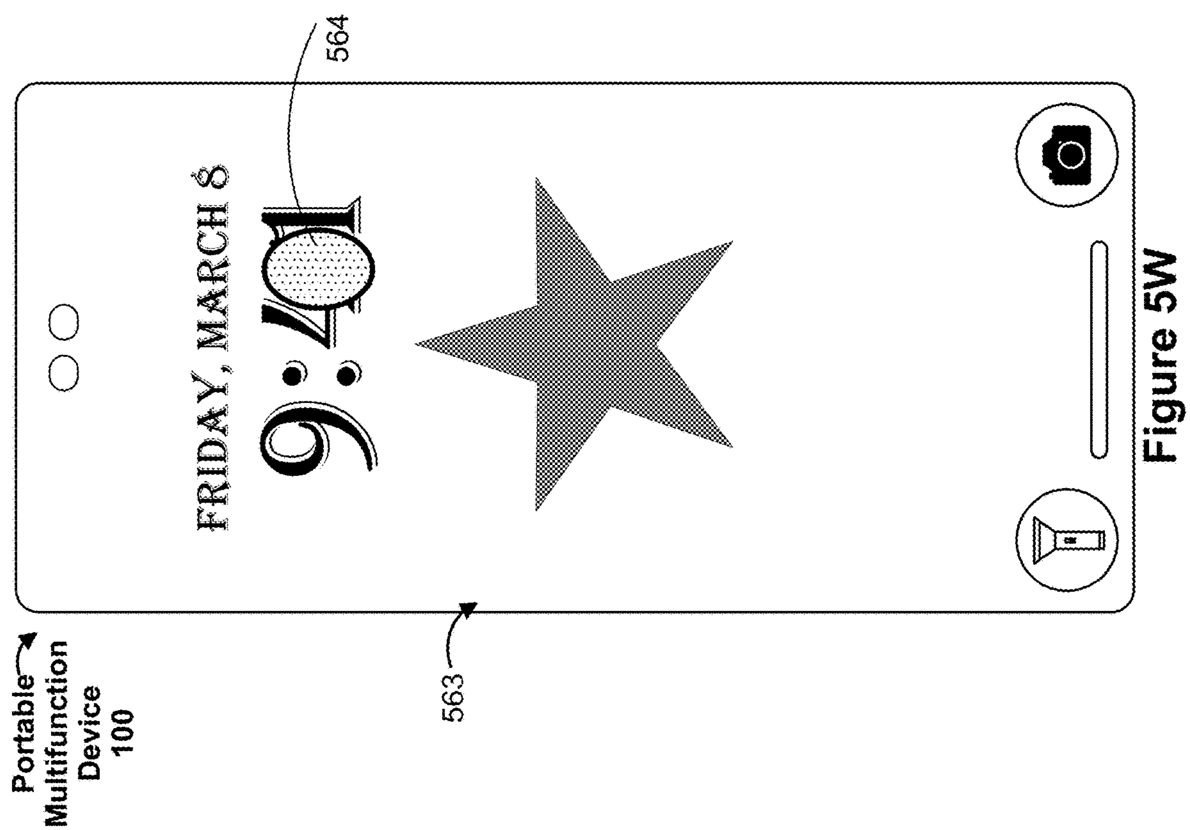
Figure 5W
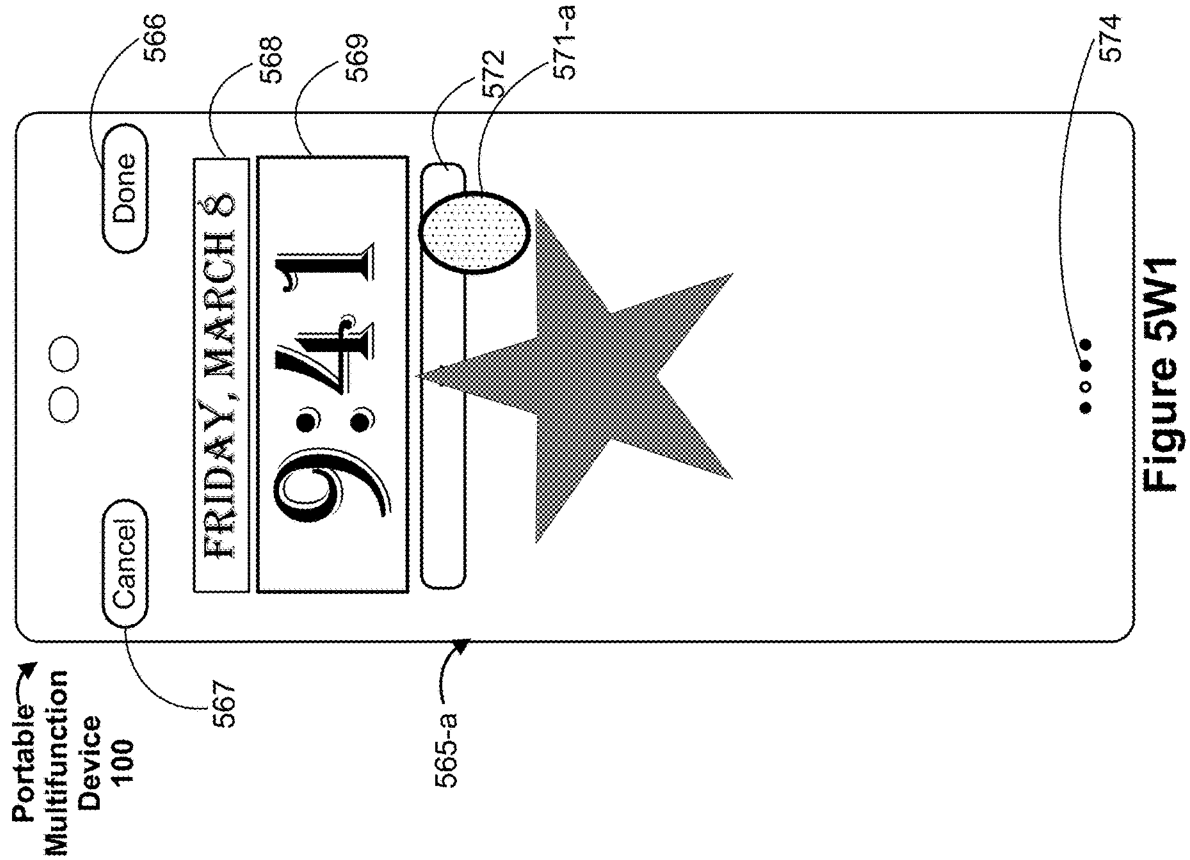
Figure 5W1

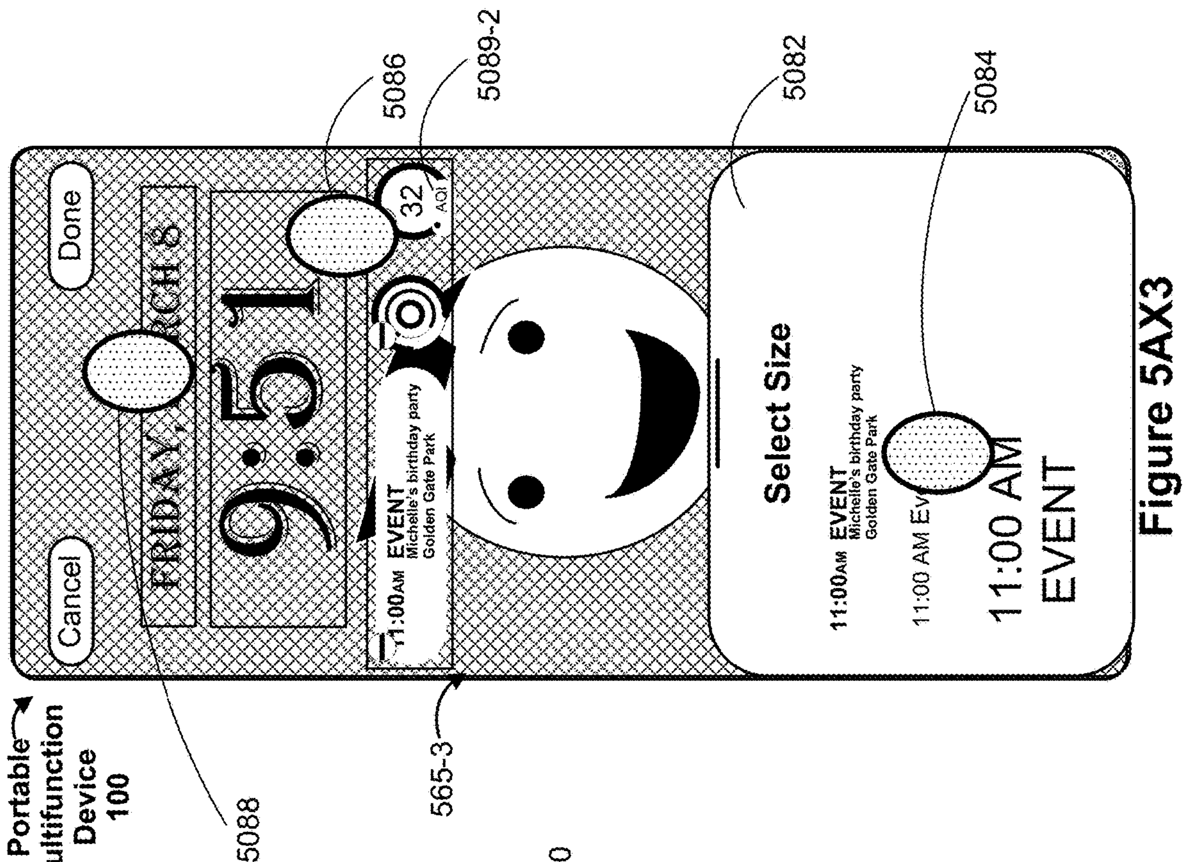
Figure 5AX3
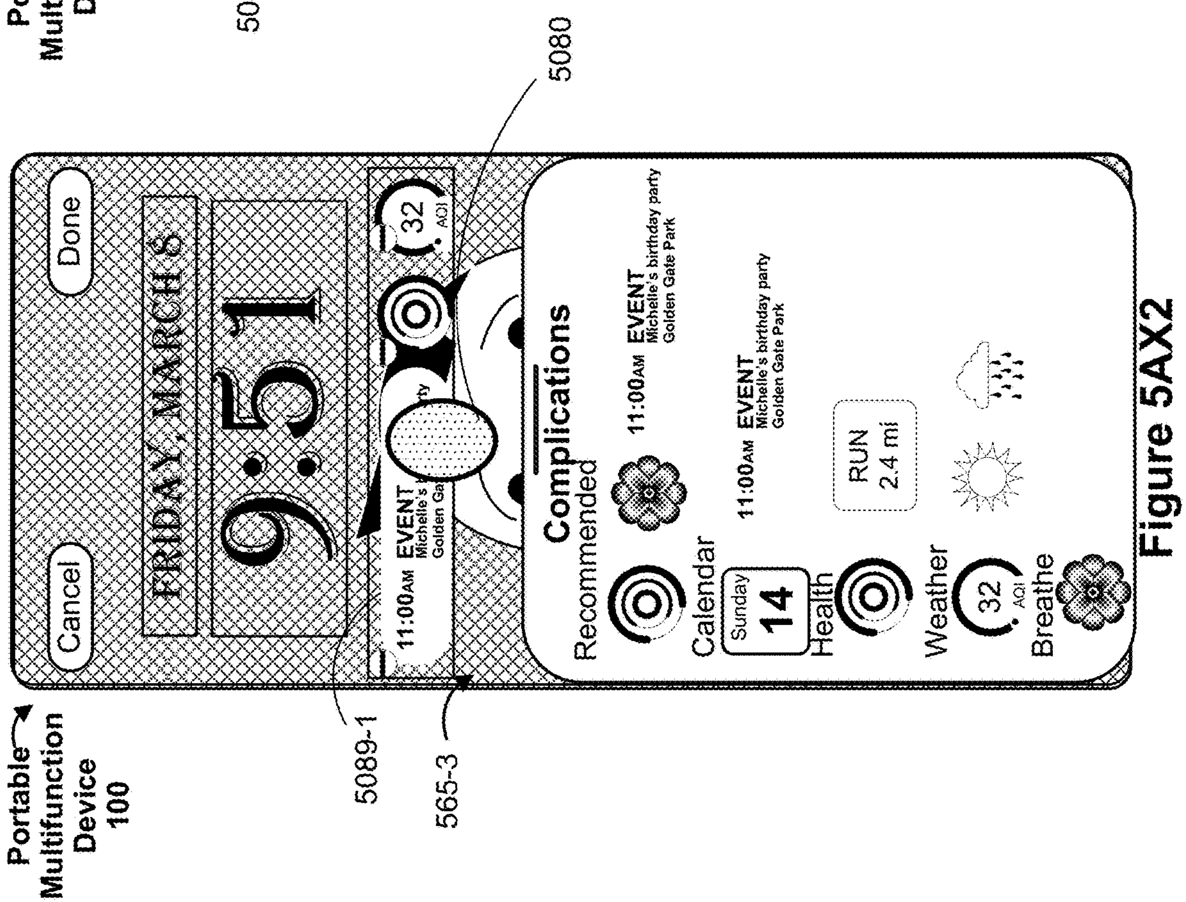
Figure 5AX2

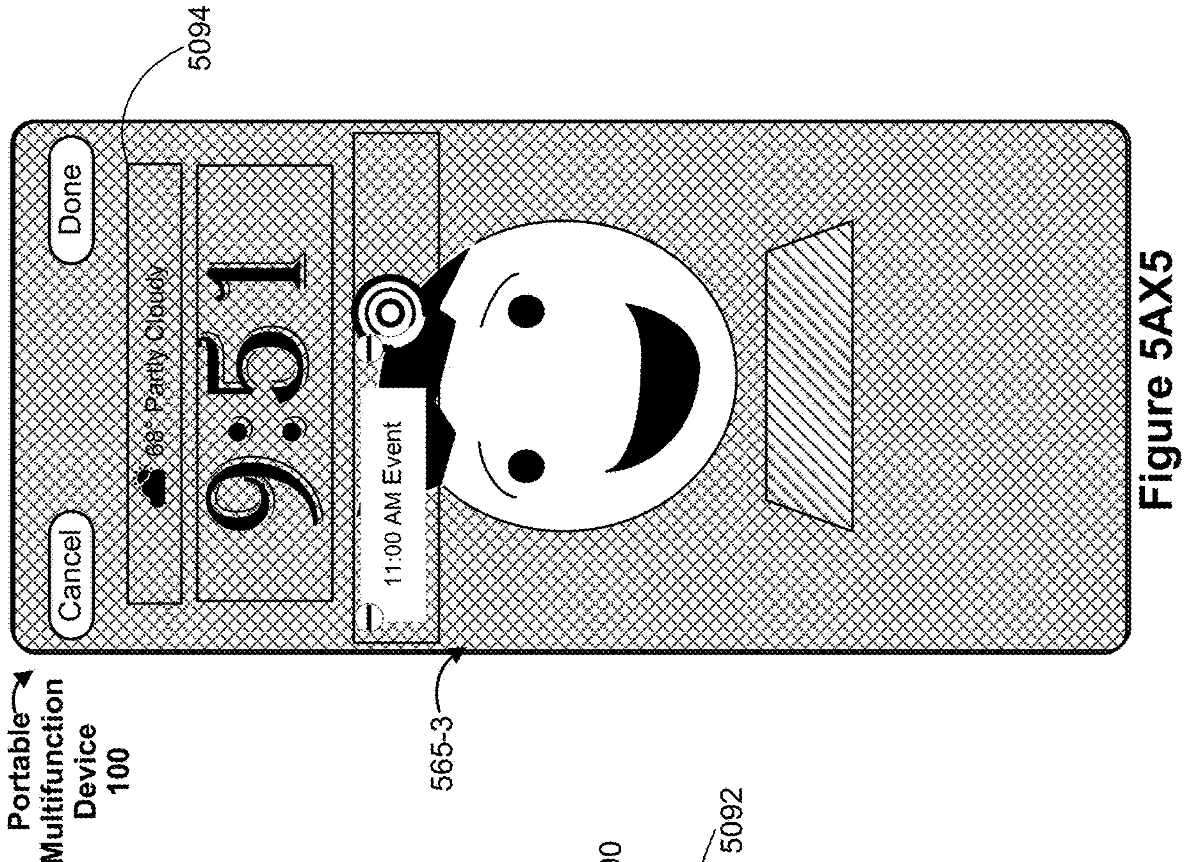
Figure 5AX5
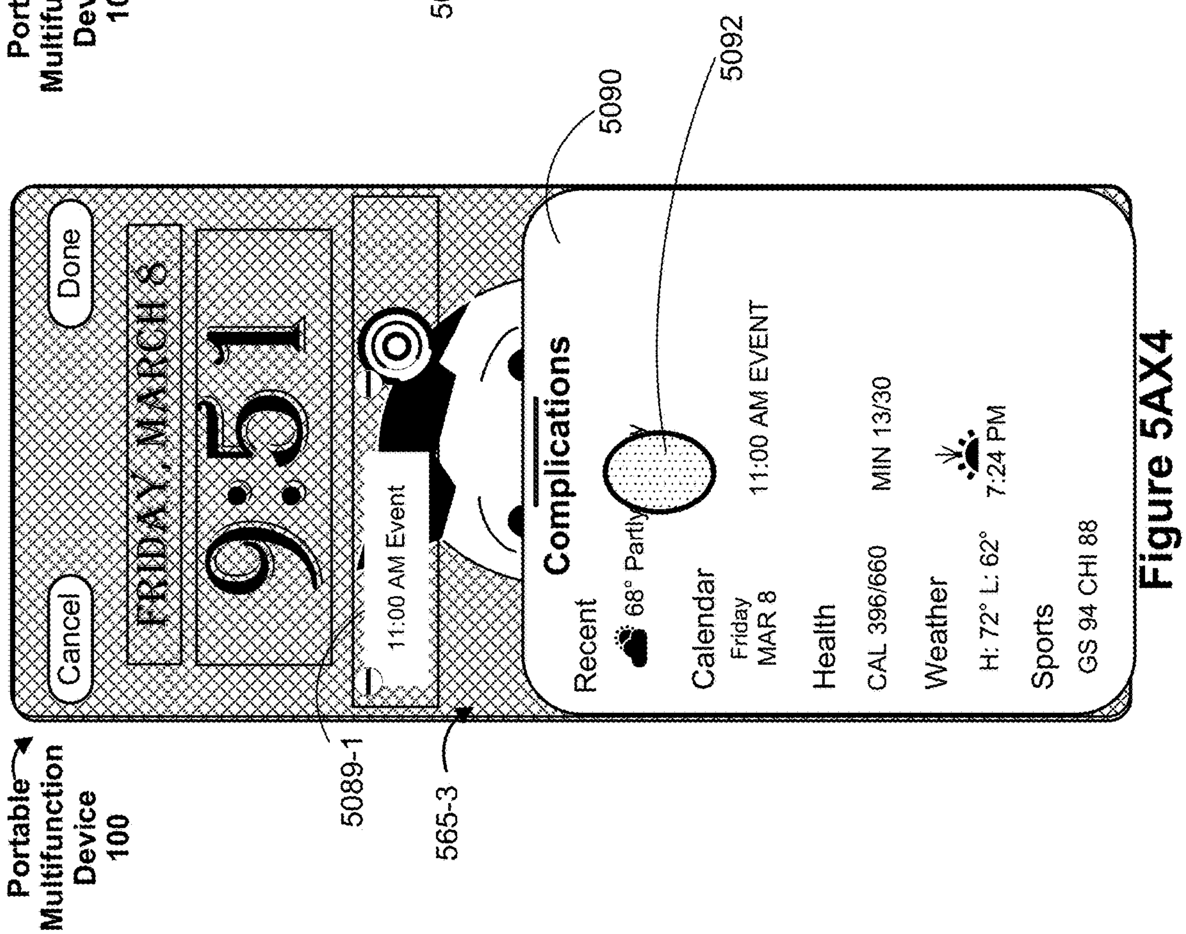
Figure 5AX4

Portable Multifunction Device 100

5070-10

5070-9

5084

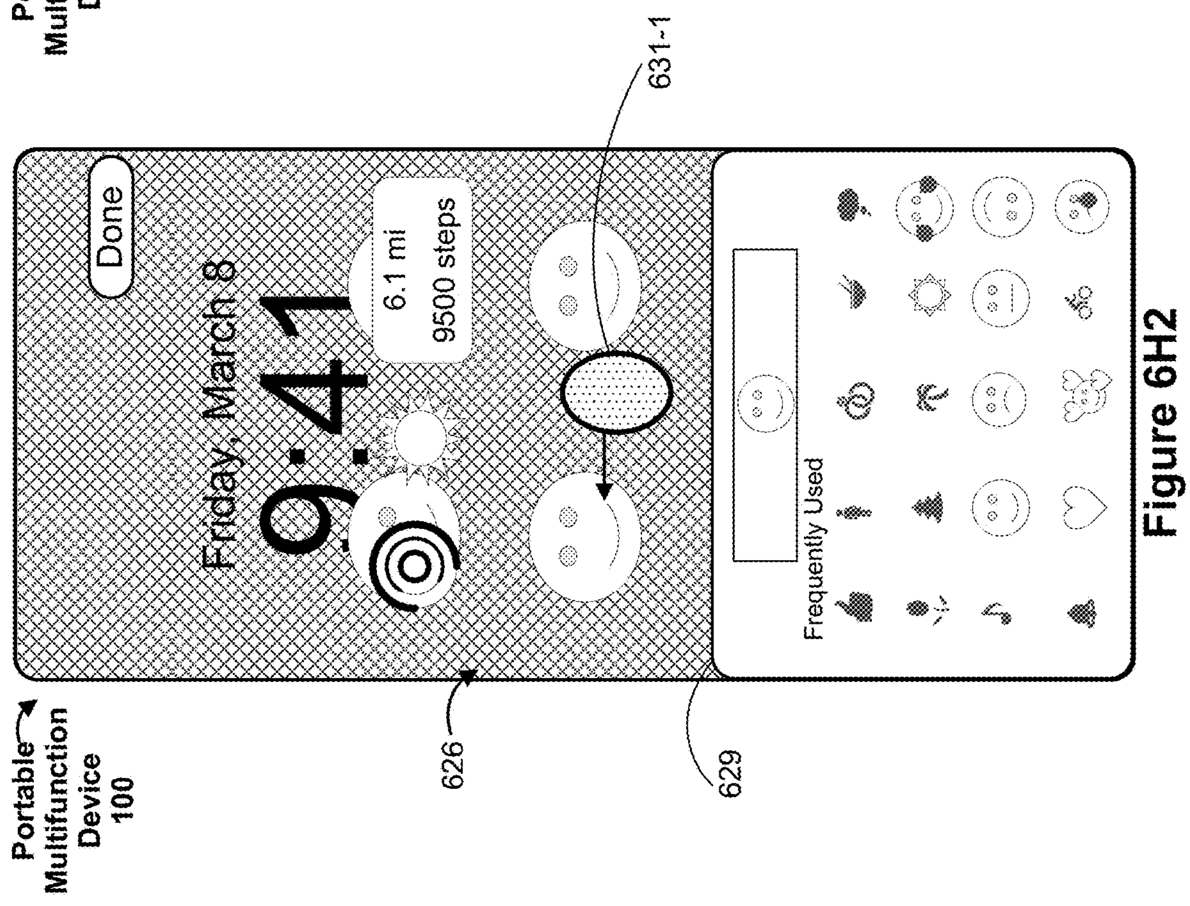
Figure 6H2
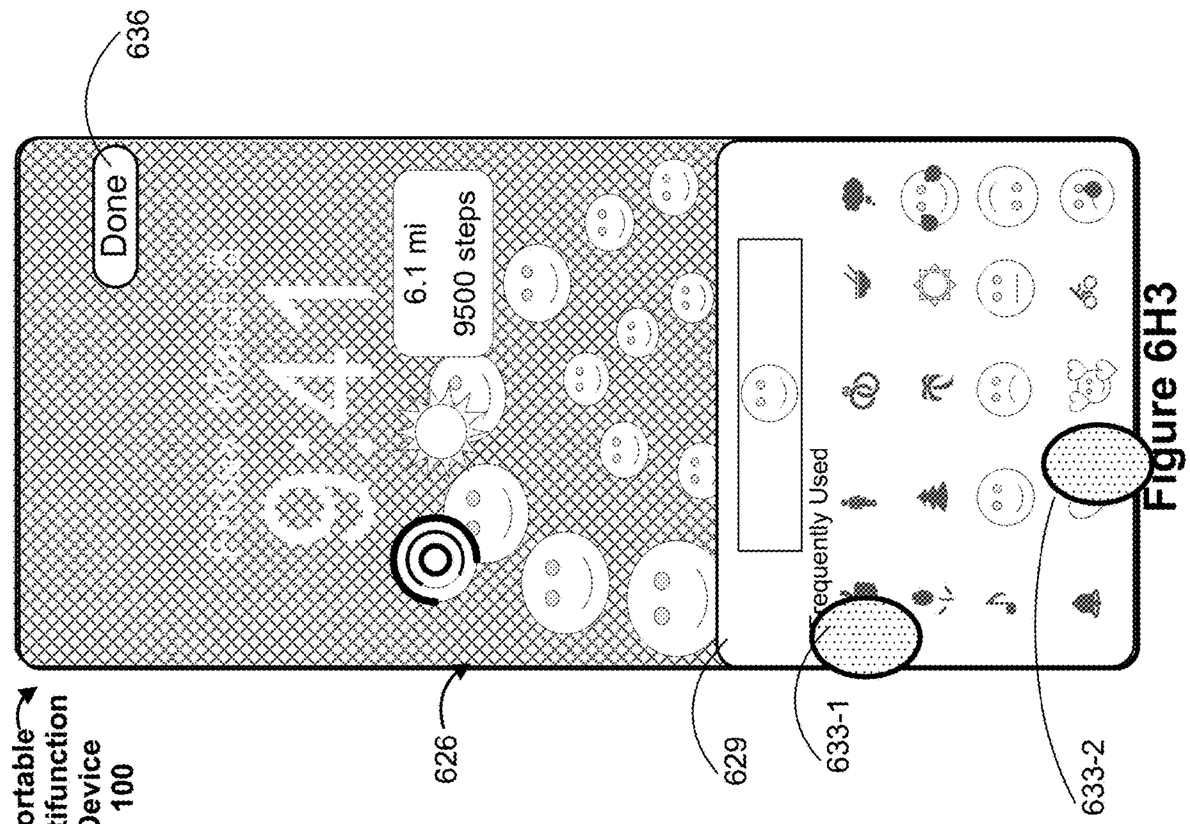
Figure 6H3

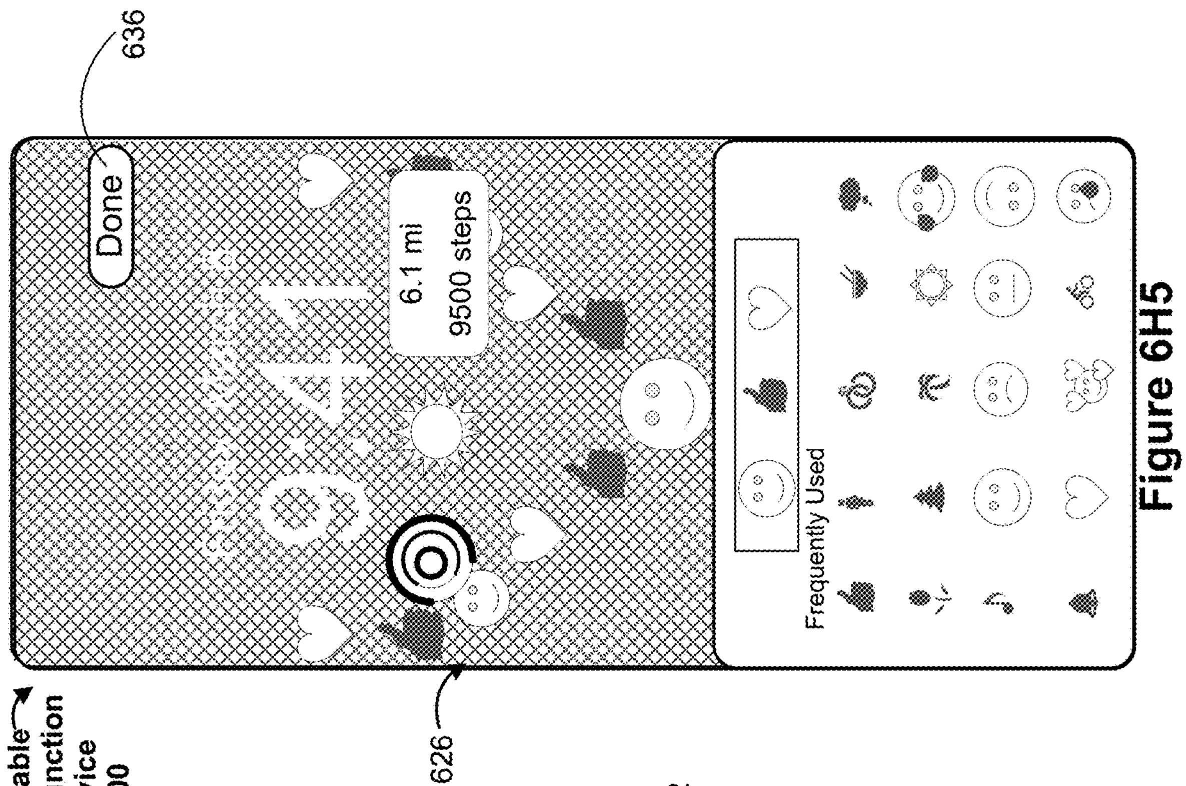
Figure 6H5
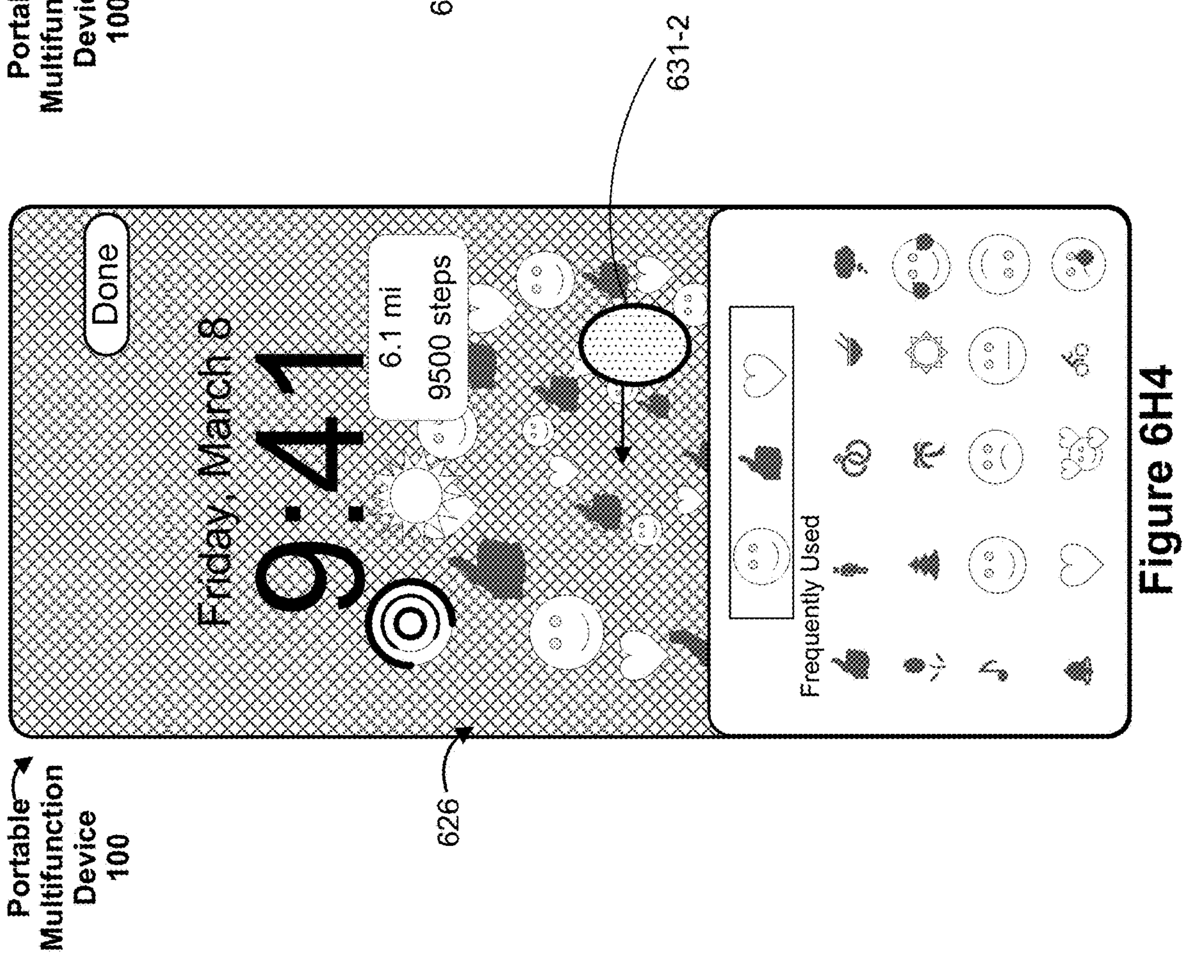
Figure 6H4

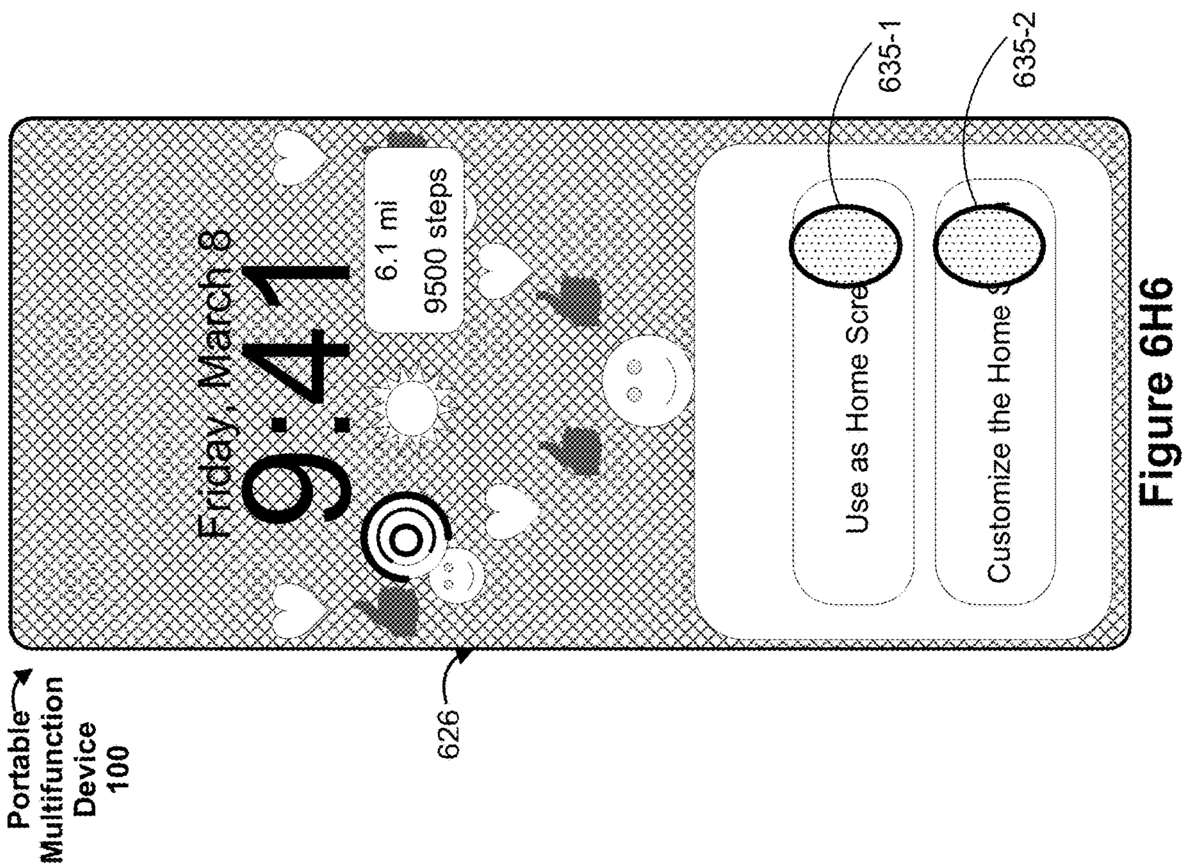
Figure 6H6

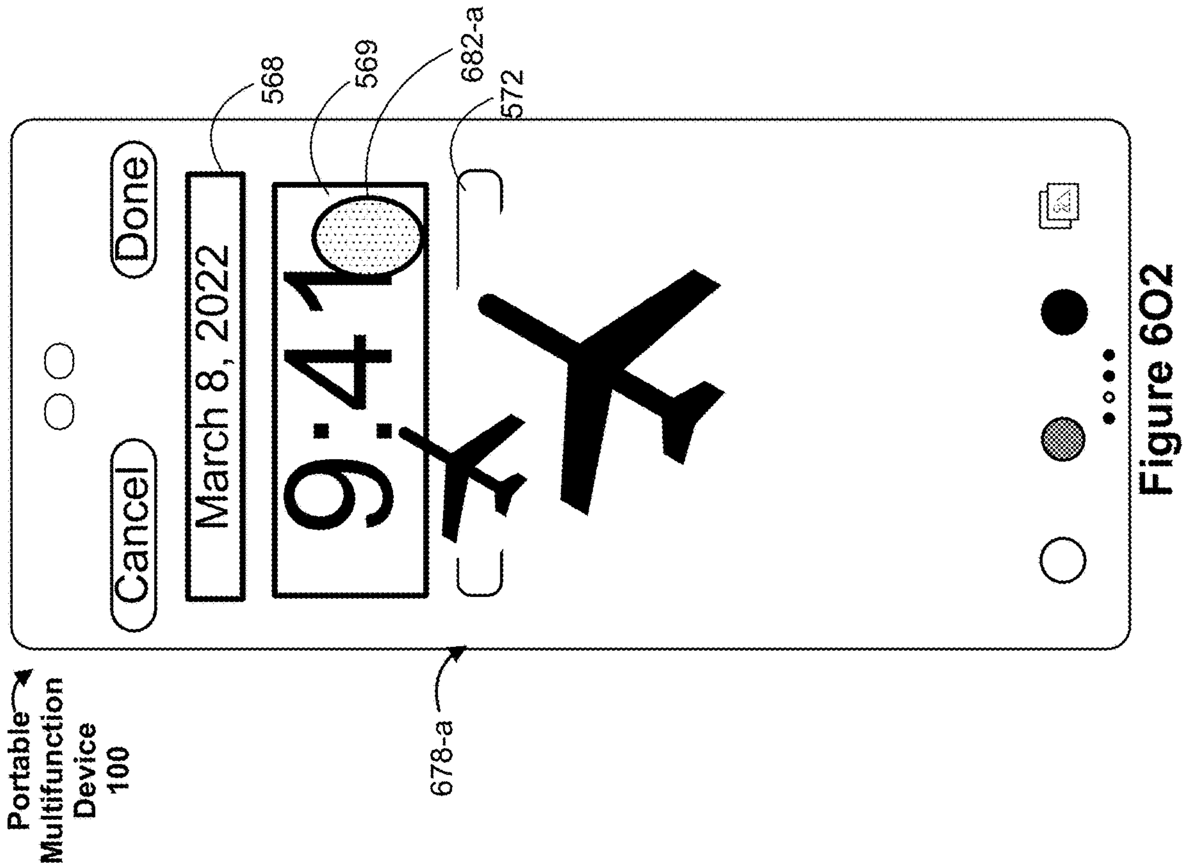
Figure 6O2
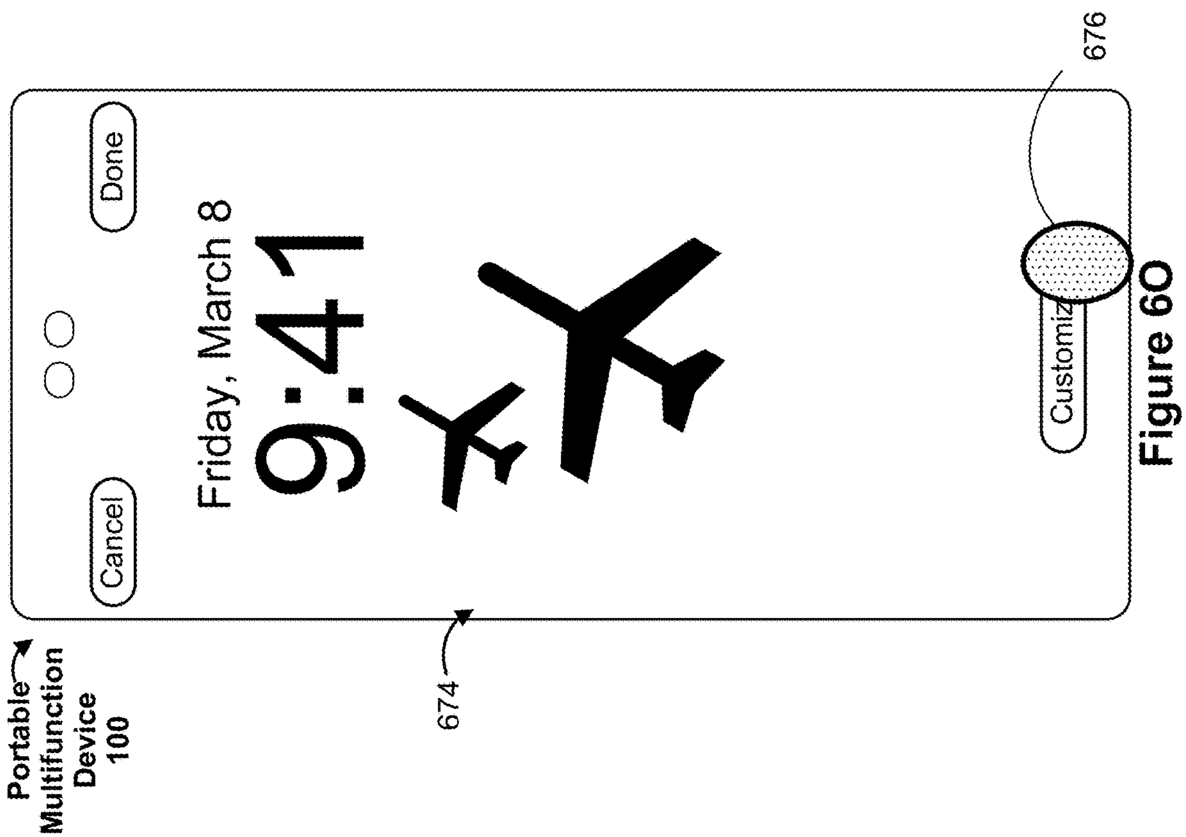
Figure 6O

Figure 9A:
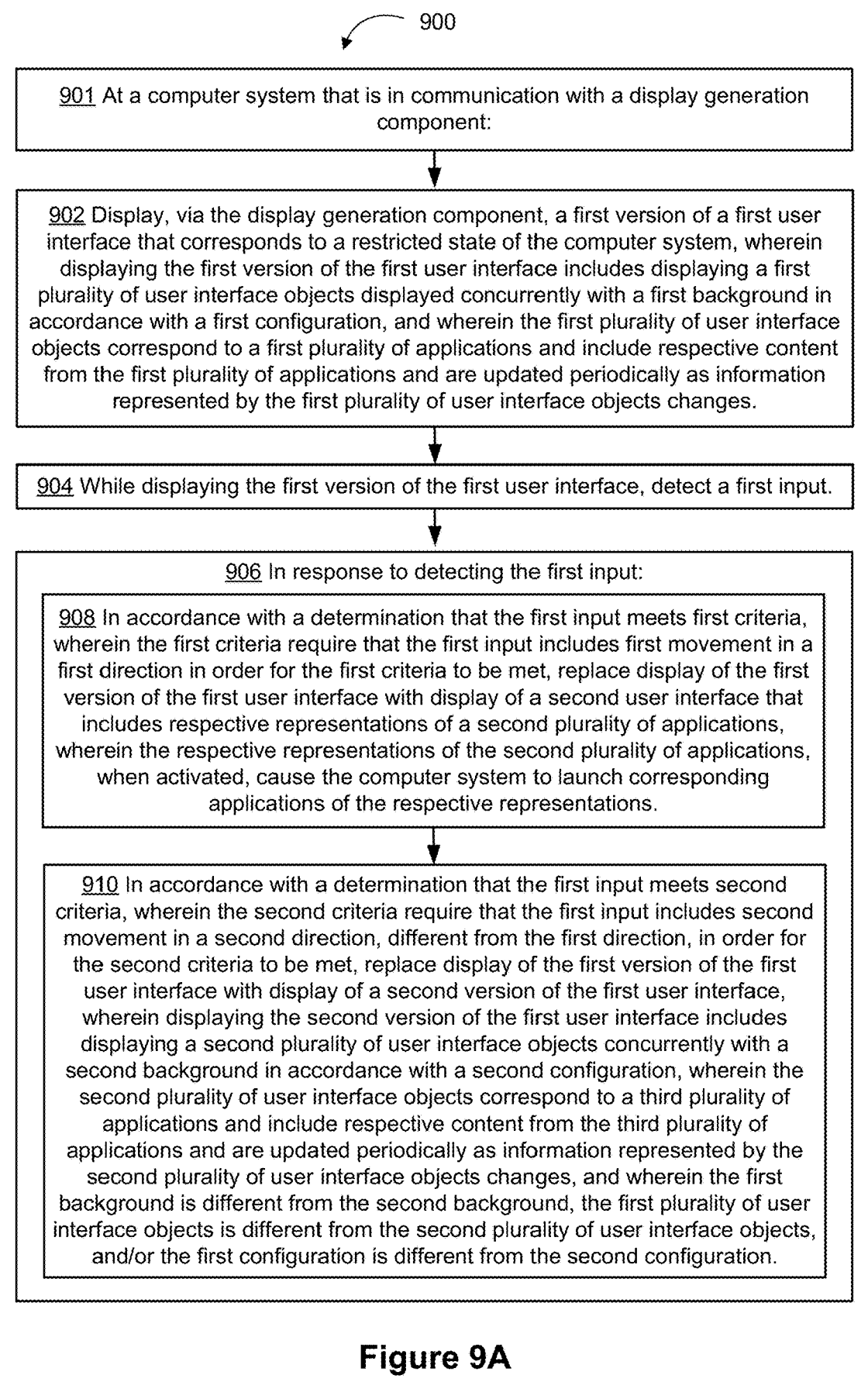

900

901 At a computer system that is in communication with a display generation component:

902 Display, via the display generation component, a first version of a first user interface that corresponds to a restricted state of the computer system, wherein displaying the first version of the first user interface includes displaying a first plurality of user interface objects displayed concurrently with a first background in accordance with a first configuration, and wherein the first plurality of user interface objects correspond to a first plurality of applications and include respective content from the first plurality of applications and are updated periodically as information represented by the first plurality of user interface objects changes.

904 While displaying the first version of the first user interface, detect a first input.

906 In response to detecting the first input:

908 In accordance with a determination that the first input meets first criteria, wherein the first criteria require that the first input includes first movement in a first direction in order for the first criteria to be met, replace display of the first version of the first user interface with display of a second user interface that includes respective representations of a second plurality of applications, wherein the respective representations of the second plurality of applications, when activated, cause the computer system to launch corresponding applications of the respective representations.

910 In accordance with a determination that the first input meets second criteria, wherein the second criteria require that the first input includes second movement in a second direction, different from the first direction, in order for the second criteria to be met, replace display of the first version of the first user interface with display of a second version of the first user interface, wherein displaying the second version of the first user interface includes displaying a second plurality of user interface objects concurrently with a second background in accordance with a second configuration, wherein the second plurality of user interface objects correspond to a third plurality of applications and include respective content from the third plurality of applications and are updated periodically as information represented by the second plurality of user interface objects changes, and wherein the first background is different from the second background, the first plurality of user interface objects is different from the second plurality of user interface objects, and/or the first configuration is different from the second configuration.

Figure 9B:
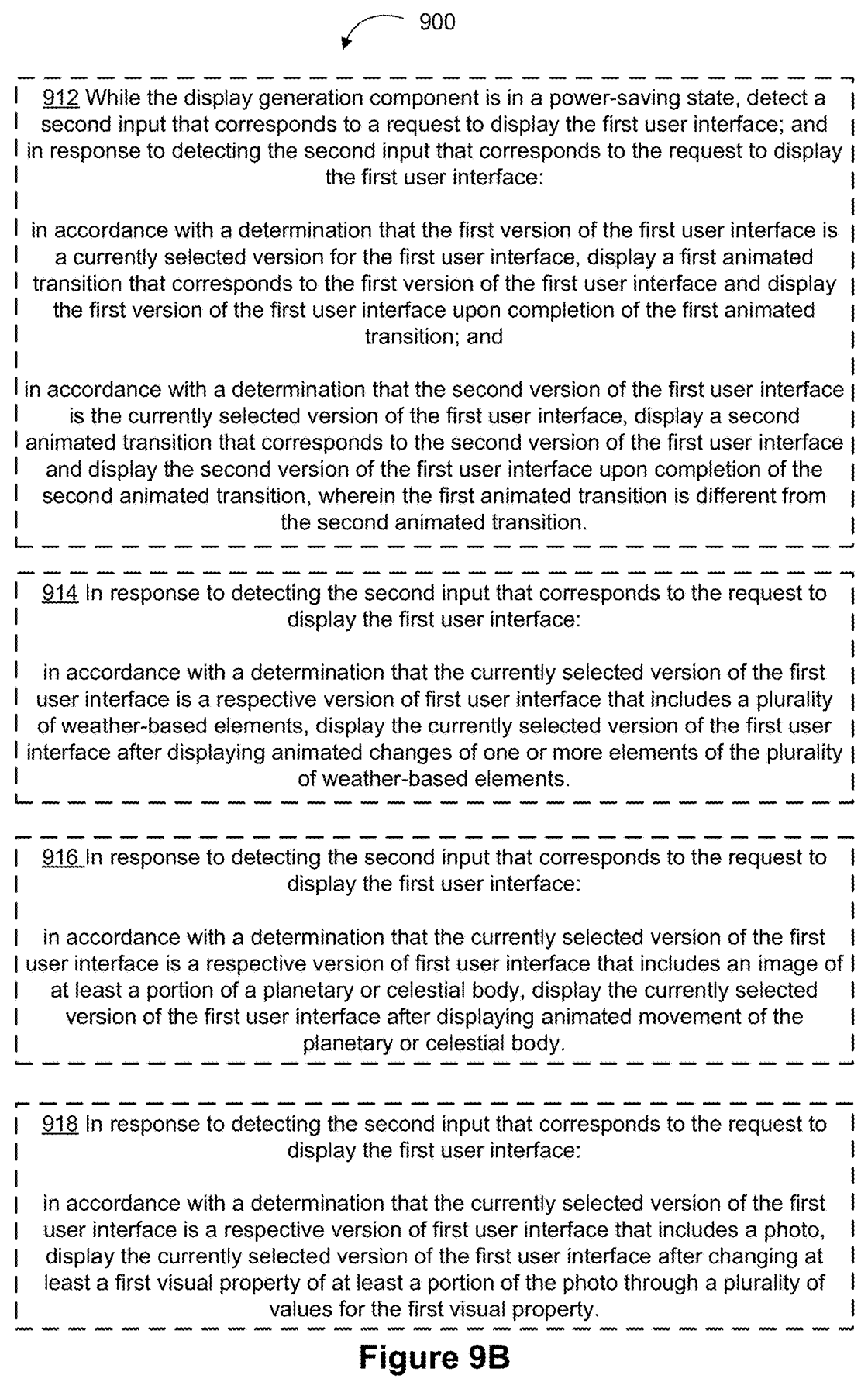

912 While the display generation component is in a power-saving state, detect a second input that corresponds to a request to display the first user interface; and in response to detecting the second input that corresponds to the request to display the first user interface:

in accordance with a determination that the first version of the first user interface is a currently selected version for the first user interface, display a first animated transition that corresponds to the first version of the first user interface and display the first version of the first user interface upon completion of the first animated transition; and in accordance with a determination that the second version of the first user interface is the currently selected version of the first user interface, display a second animated transition that corresponds to the second version of the first user interface and display the second version of the first user interface upon completion of the second animated transition, wherein the first animated transition is different from the second animated transition.

914 In response to detecting the second input that corresponds to the request to display the first user interface:

in accordance with a determination that the currently selected version of the first user interface is a respective version of first user interface that includes a plurality of weather-based elements, display the currently selected version of the first user interface after displaying animated changes of one or more elements of the plurality of weather-based elements.

916 In response to detecting the second input that corresponds to the request to display the first user interface:

in accordance with a determination that the currently selected version of the first user interface is a respective version of first user interface that includes an image of at least a portion of a planetary or celestial body, display the currently selected version of the first user interface after displaying animated movement of the planetary or celestial body.

918 In response to detecting the second input that corresponds to the request to display the first user interface:

in accordance with a determination that the currently selected version of the first user interface is a respective version of first user interface that includes a photo, display the currently selected version of the first user interface after changing at least a first visual property of at least a portion of the photo through a plurality of values for the first visual property.

Figure 9C:
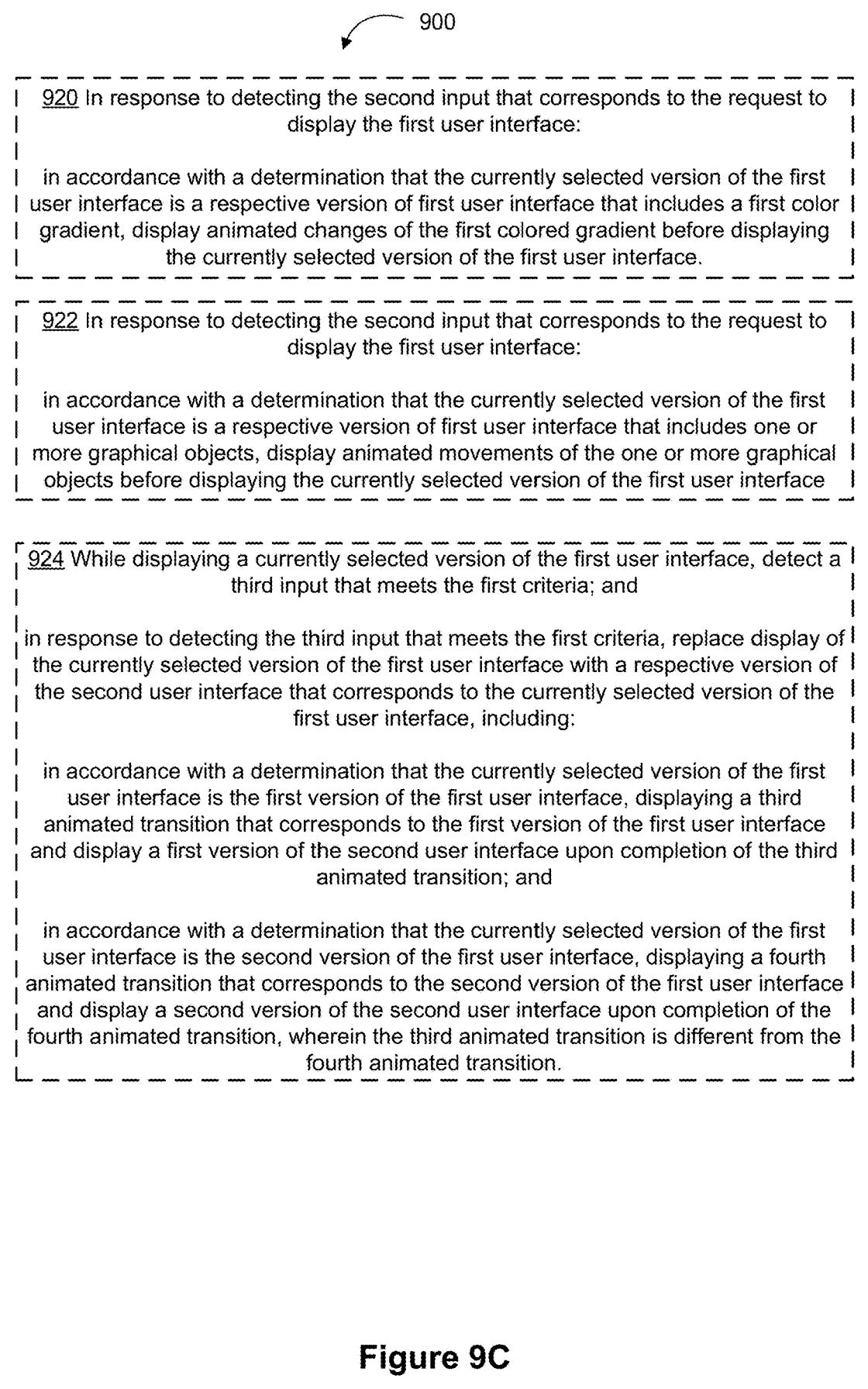

920 In response to detecting the second input that corresponds to the request to display the first user interface:

in accordance with a determination that the currently selected version of the first user interface is a respective version of first user interface that includes a first color gradient, display animated changes of the first colored gradient before displaying the currently selected version of the first user interface.

922 In response to detecting the second input that corresponds to the request to display the first user interface:

in accordance with a determination that the currently selected version of the first user interface is a respective version of first user interface that includes one or more graphical objects, display animated movements of the one or more graphical objects before displaying the currently selected version of the first user interface 924 While displaying a currently selected version of the first user interface, detect a third input that meets the first criteria; and in response to detecting the third input that meets the first criteria, replace display of the currently selected version of the first user interface with a respective version of the second user interface that corresponds to the currently selected version of the first user interface, including:

in accordance with a determination that the currently selected version of the first user interface is the first version of the first user interface, displaying a third animated transition that corresponds to the first version of the first user interface and display a first version of the second user interface upon completion of the third animated transition; and in accordance with a determination that the currently selected version of the first user interface is the second version of the first user interface, displaying a fourth animated transition that corresponds to the second version of the first user interface and display a second version of the second user interface upon completion of the fourth animated transition, wherein the third animated transition is different from the fourth animated transition.

Figure 9D:
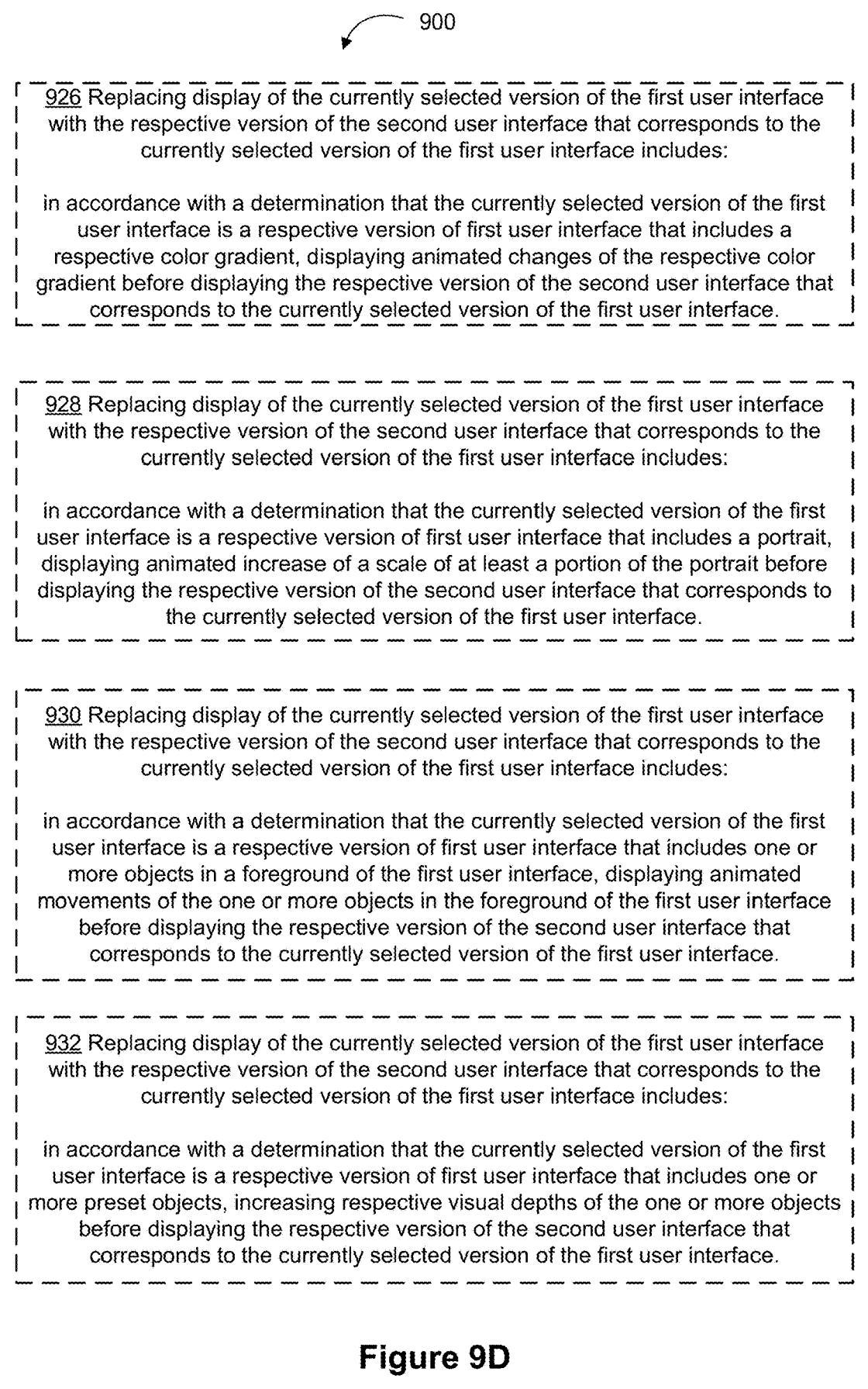

926 Replacing display of the currently selected version of the first user interface with the respective version of the second user interface that corresponds to the currently selected version of the first user interface includes:

in accordance with a determination that the currently selected version of the first user interface is a respective version of first user interface that includes a respective color gradient, displaying animated changes of the respective color gradient before displaying the respective version of the second user interface that corresponds to the currently selected version of the first user interface.

928 Replacing display of the currently selected version of the first user interface with the respective version of the second user interface that corresponds to the currently selected version of the first user interface includes:

in accordance with a determination that the currently selected version of the first user interface is a respective version of first user interface that includes a portrait, displaying animated increase of a scale of at least a portion of the portrait before displaying the respective version of the second user interface that corresponds to the currently selected version of the first user interface.

930 Replacing display of the currently selected version of the first user interface with the respective version of the second user interface that corresponds to the currently selected version of the first user interface includes:

in accordance with a determination that the currently selected version of the first user interface is a respective version of first user interface that includes one or more objects in a foreground of the first user interface, displaying animated movements of the one or more objects in the foreground of the first user interface before displaying the respective version of the second user interface that corresponds to the currently selected version of the first user interface.

932 Replacing display of the currently selected version of the first user interface with the respective version of the second user interface that corresponds to the currently selected version of the first user interface includes:

in accordance with a determination that the currently selected version of the first user interface is a respective version of first user interface that includes one or more preset objects, increasing respective visual depths of the one or more objects before displaying the respective version of the second user interface that corresponds to the currently selected version of the first user interface.

Figure 9E:
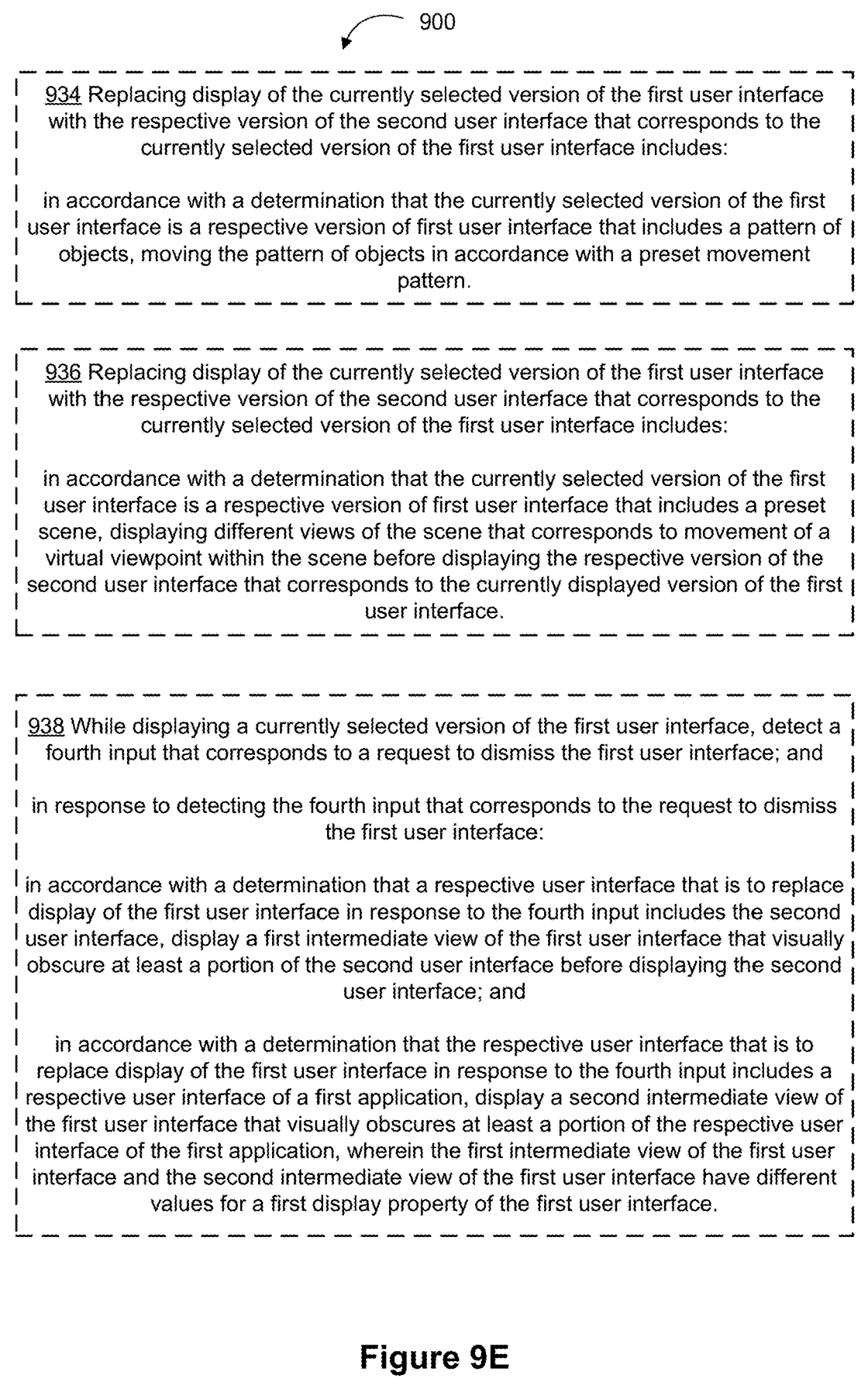

934 Replacing display of the currently selected version of the first user interface with the respective version of the second user interface that corresponds to the currently selected version of the first user interface includes:

in accordance with a determination that the currently selected version of the first user interface is a respective version of first user interface that includes a pattern of objects, moving the pattern of objects in accordance with a preset movement pattern.

936 Replacing display of the currently selected version of the first user interface with the respective version of the second user interface that corresponds to the currently selected version of the first user interface includes:

in accordance with a determination that the currently selected version of the first user interface is a respective version of first user interface that includes a preset scene, displaying different views of the scene that corresponds to movement of a virtual viewpoint within the scene before displaying the respective version of the second user interface that corresponds to the currently displayed version of the first user interface.

938 While displaying a currently selected version of the first user interface, detect a fourth input that corresponds to a request to dismiss the first user interface; and in response to detecting the fourth input that corresponds to the request to dismiss the first user interface:

in accordance with a determination that a respective user interface that is to replace display of the first user interface in response to the fourth input includes the second user interface, display a first intermediate view of the first user interface that visually obscure at least a portion of the second user interface before displaying the second user interface; and in accordance with a determination that the respective user interface that is to replace display of the first user interface in response to the fourth input includes a respective user interface of a first application, display a second intermediate view of the first user interface that visually obscures at least a portion of the respective user interface of the first application, wherein the first intermediate view of the first user interface and the second intermediate view of the first user interface have different values for a first display property of the first user interface.

Figure 9F:
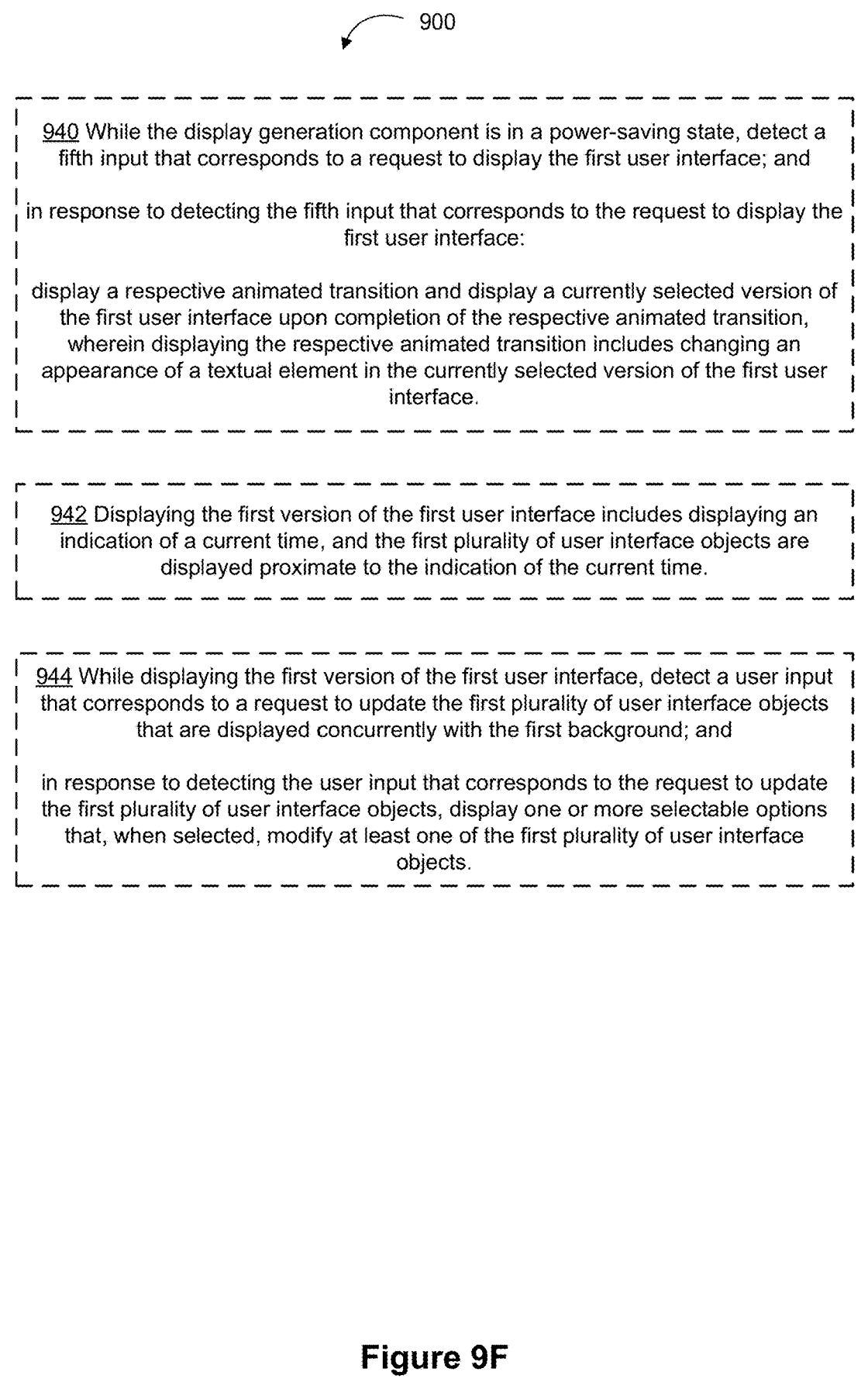

940 While the display generation component is in a power-saving state, detect a fifth input that corresponds to a request to display the first user interface; and in response to detecting the fifth input that corresponds to the request to display the first user interface:

display a respective animated transition and display a currently selected version of the first user interface upon completion of the respective animated transition, wherein displaying the respective animated transition includes changing an appearance of a textual element in the currently selected version of the first user interface.

942 Displaying the first version of the first user interface includes displaying an indication of a current time, and the first plurality of user interface objects are displayed proximate to the indication of the current time.

944 While displaying the first version of the first user interface, detect a user input that corresponds to a request to update the first plurality of user interface objects that are displayed concurrently with the first background; and in response to detecting the user input that corresponds to the request to update the first plurality of user interface objects, display one or more selectable options that, when selected, modify at least one of the first plurality of user interface objects.

Figure 9G:
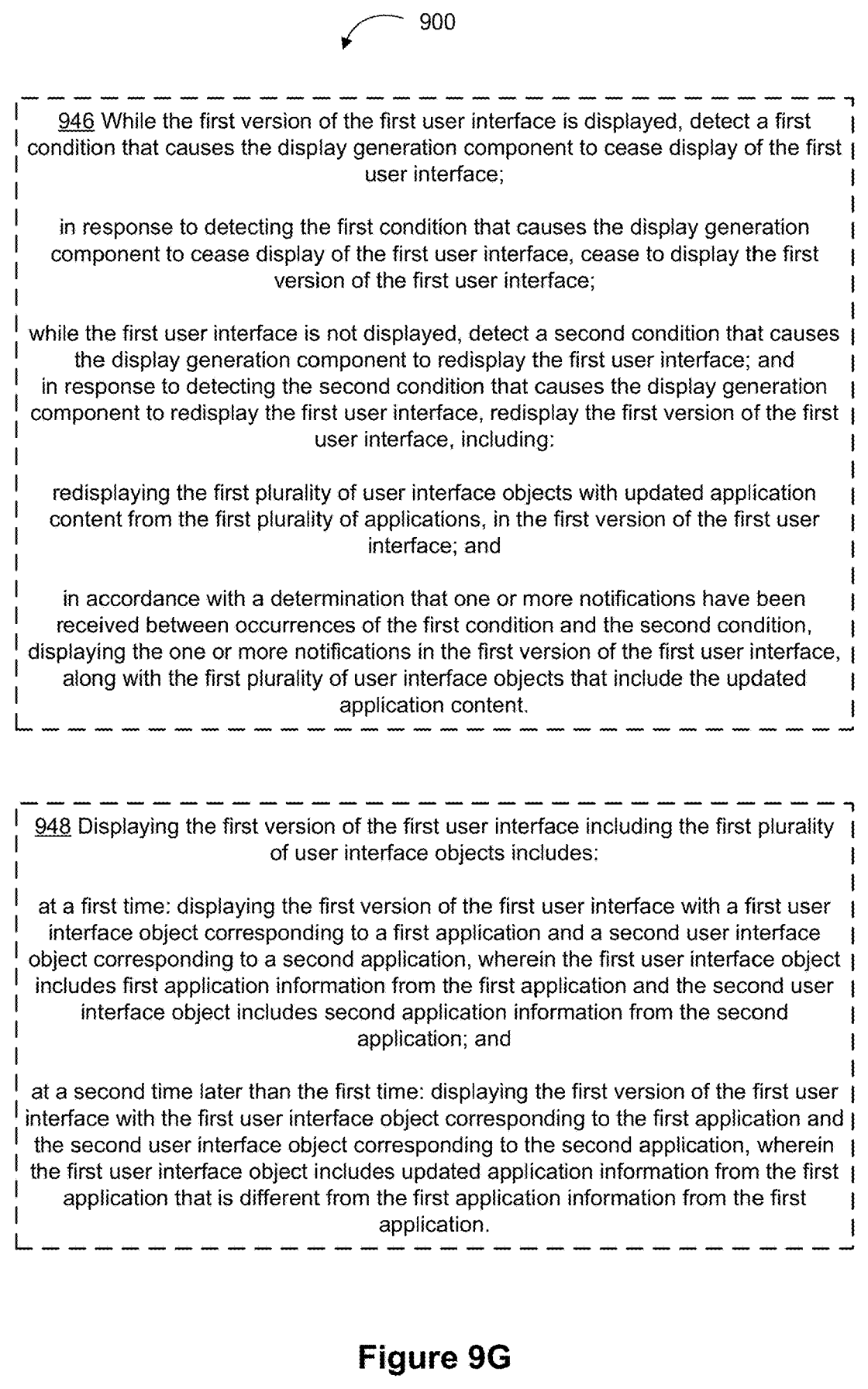

946 While the first version of the first user interface is displayed, detect a first condition that causes the display generation component to cease display of the first user interface;

in response to detecting the first condition that causes the display generation component to cease display of the first user interface, cease to display the first version of the first user interface;

while the first user interface is not displayed, detect a second condition that causes the display generation component to redisplay the first user interface; and in response to detecting the second condition that causes the display generation component to redisplay the first user interface, redisplay the first version of the first user interface, including:

redisplaying the first plurality of user interface objects with updated application content from the first plurality of applications, in the first version of the first user interface; and in accordance with a determination that one or more notifications have been received between occurrences of the first condition and the second condition, displaying the one or more notifications in the first version of the first user interface, along with the first plurality of user interface objects that include the updated application content.

948 Displaying the first version of the first user interface including the first plurality of user interface objects includes:

at a first time: displaying the first version of the first user interface with a first user interface object corresponding to a first application and a second user interface object corresponding to a second application, wherein the first user interface object includes first application information from the first application and the second user interface object includes second application information from the second application; and at a second time later than the first time: displaying the first version of the first user interface with the first user interface object corresponding to the first application and the second user interface object corresponding to the second application, wherein the first user interface object includes updated application information from the first application that is different from the first application information from the first application.

Figure 9H:
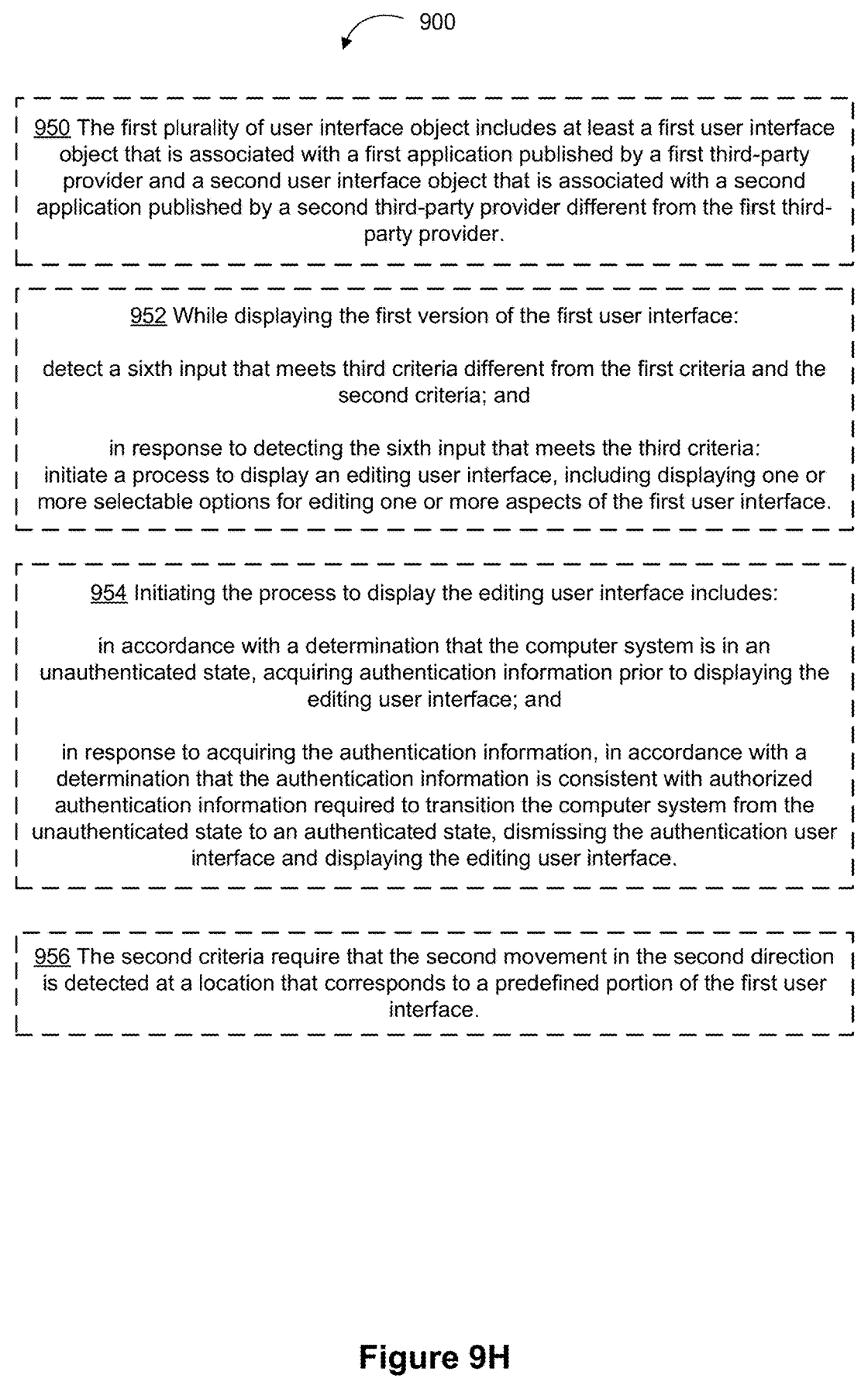

950 The first plurality of user interface object includes at least a first user interface object that is associated with a first application published by a first third-party provider and a second user interface object that is associated with a second application published by a second third-party provider different from the first third-party provider.

952 While displaying the first version of the first user interface:

detect a sixth input that meets third criteria different from the first criteria and the second criteria; and in response to detecting the sixth input that meets the third criteria:
initiate a process to display an editing user interface, including displaying one or more selectable options for editing one or more aspects of the first user interface.

954 Initiating the process to display the editing user interface includes:

in accordance with a determination that the computer system is in an unauthenticated state, acquiring authentication information prior to displaying the editing user interface; and in response to acquiring the authentication information, in accordance with a determination that the authentication information is consistent with authorized authentication information required to transition the computer system from the unauthenticated state to an authenticated state, dismissing the authentication user interface and displaying the editing user interface.

956 The second criteria require that the second movement in the second direction is detected at a location that corresponds to a predefined portion of the first user interface.

Figure 9I:
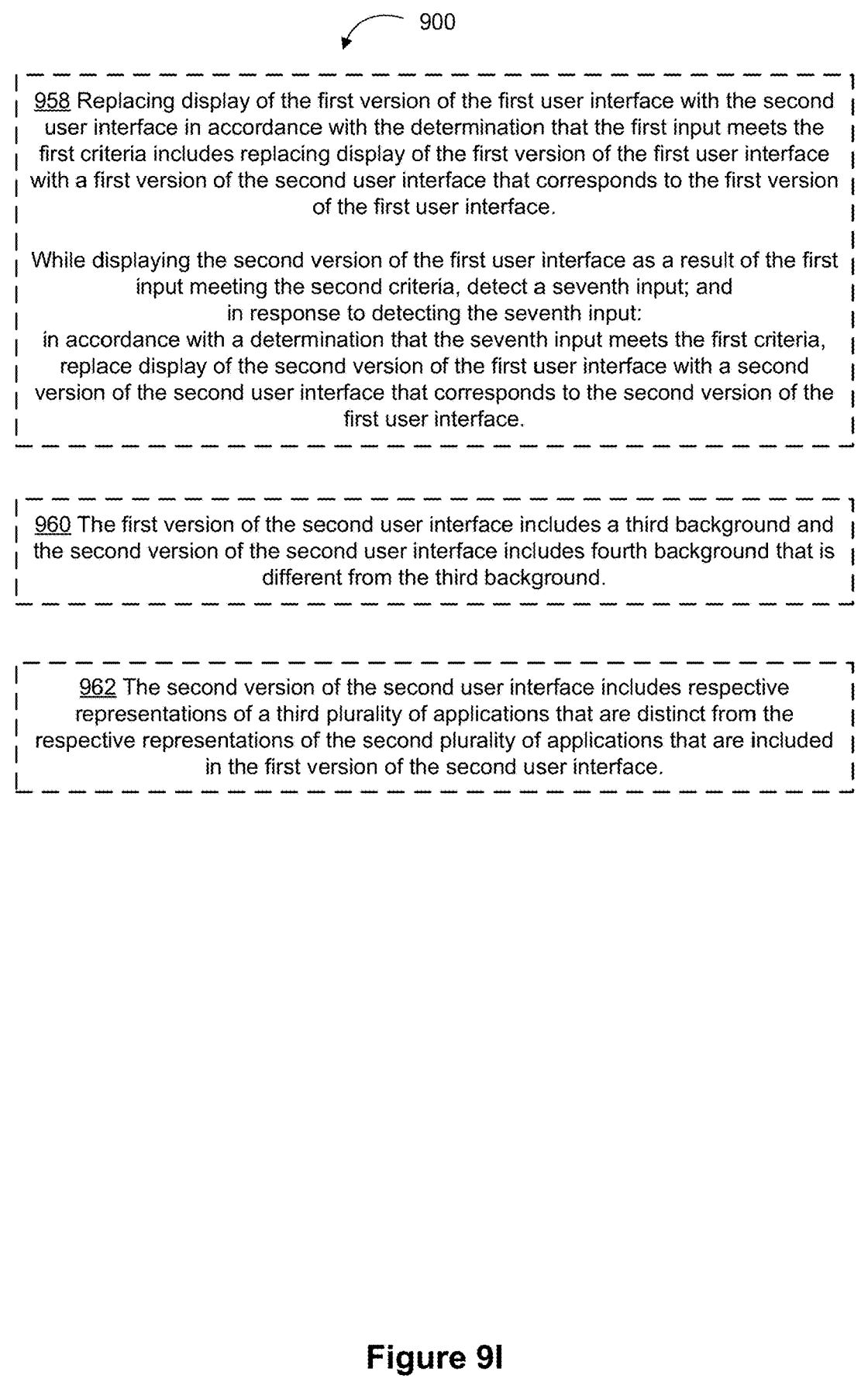

958 Replacing display of the first version of the first user interface with the second user interface in accordance with the determination that the first input meets the first criteria includes replacing display of the first version of the first user interface with a first version of the second user interface that corresponds to the first version of the first user interface.

While displaying the second version of the first user interface as a result of the first input meeting the second criteria, detect a seventh input; and
in response to detecting the seventh input:
in accordance with a determination that the seventh input meets the first criteria, replace display of the second version of the first user interface with a second version of the second user interface that corresponds to the second version of the first user interface.

960 The first version of the second user interface includes a third background and the second version of the second user interface includes fourth background that is different from the third background.

962 The second version of the second user interface includes respective representations of a third plurality of applications that are distinct from the respective representations of the second plurality of applications that are included in the first version of the second user interface.

Figure 10A:
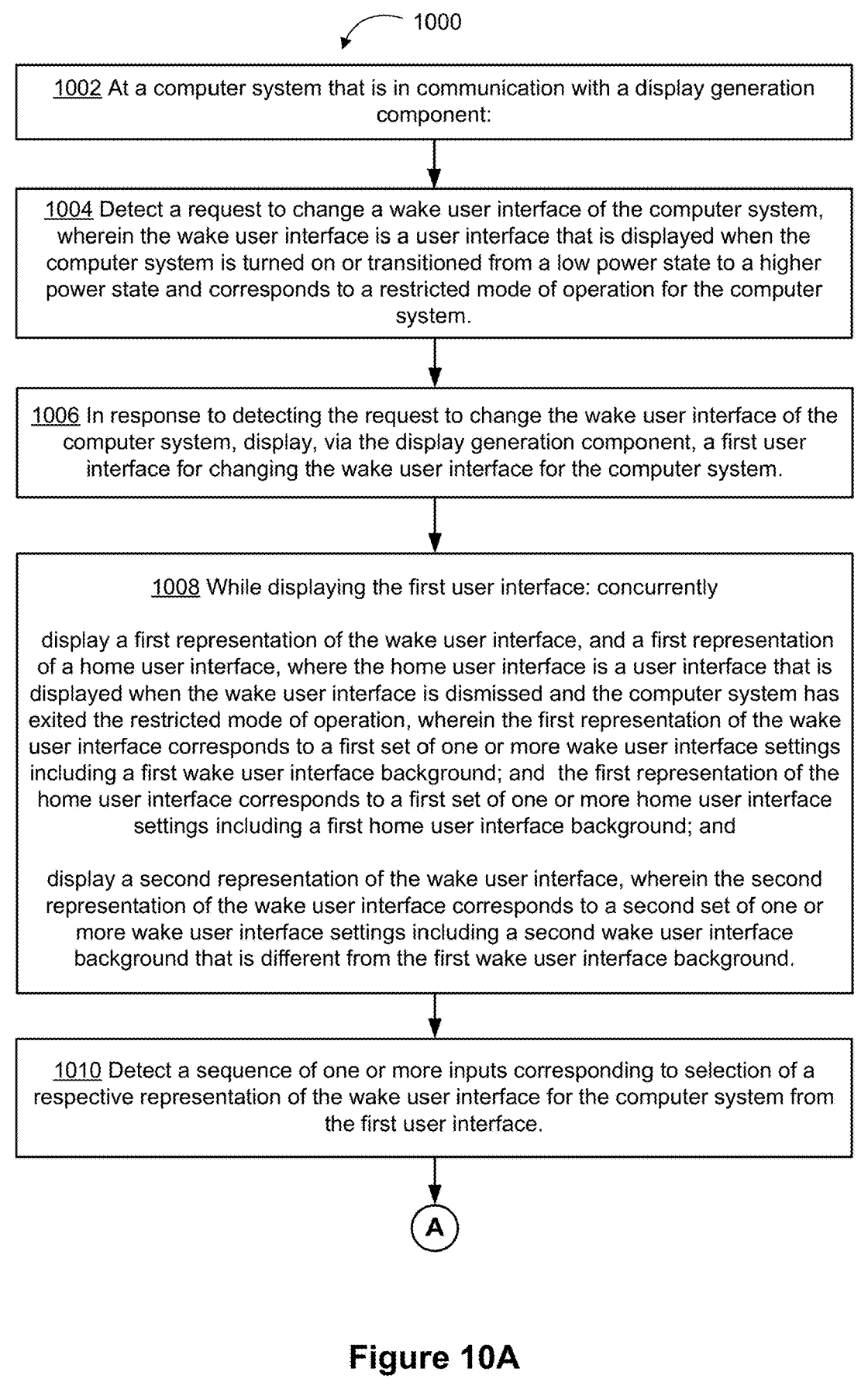

1002 At a computer system that is in communication with a display generation component:

↓

1004 Detect a request to change a wake user interface of the computer system, wherein the wake user interface is a user interface that is displayed when the computer system is turned on or transitioned from a low power state to a higher power state and corresponds to a restricted mode of operation for the computer system.

↓

1006 In response to detecting the request to change the wake user interface of the computer system, display, via the display generation component, a first user interface for changing the wake user interface for the computer system.

↓

1008 While displaying the first user interface: concurrently display a first representation of the wake user interface, and a first representation of a home user interface, where the home user interface is a user interface that is displayed when the wake user interface is dismissed and the computer system has exited the restricted mode of operation, wherein the first representation of the wake user interface corresponds to a first set of one or more wake user interface settings including a first wake user interface background; and the first representation of the home user interface corresponds to a first set of one or more home user interface settings including a first home user interface background; and display a second representation of the wake user interface, wherein the second representation of the wake user interface corresponds to a second set of one or more wake user interface settings including a second wake user interface background that is different from the first wake user interface background.

↓

1010 Detect a sequence of one or more inputs corresponding to selection of a respective representation of the wake user interface for the computer system from the first user interface.

Figure 10B:
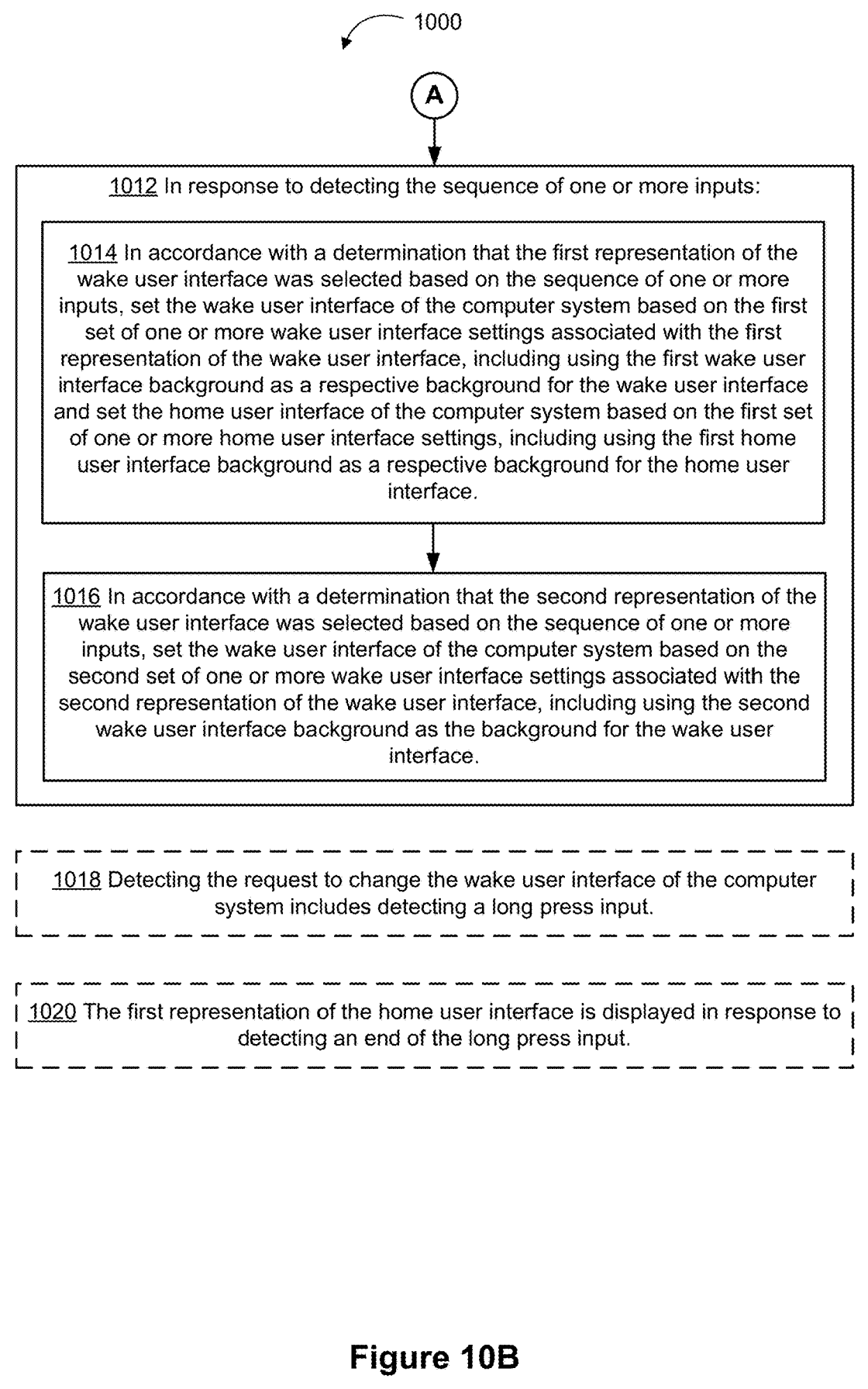

1012 In response to detecting the sequence of one or more inputs:

1014 In accordance with a determination that the first representation of the wake user interface was selected based on the sequence of one or more inputs, set the wake user interface of the computer system based on the first set of one or more wake user interface settings associated with the first representation of the wake user interface, including using the first wake user interface background as a respective background for the wake user interface and set the home user interface of the computer system based on the first set of one or more home user interface settings, including using the first home user interface background as a respective background for the home user interface.

1016 In accordance with a determination that the second representation of the wake user interface was selected based on the sequence of one or more inputs, set the wake user interface of the computer system based on the second set of one or more wake user interface settings associated with the second representation of the wake user interface, including using the second wake user interface background as the background for the wake user interface.

1018 Detecting the request to change the wake user interface of the computer system includes detecting a long press input.

1020 The first representation of the home user interface is displayed in response to detecting an end of the long press input.

Figure 10C:
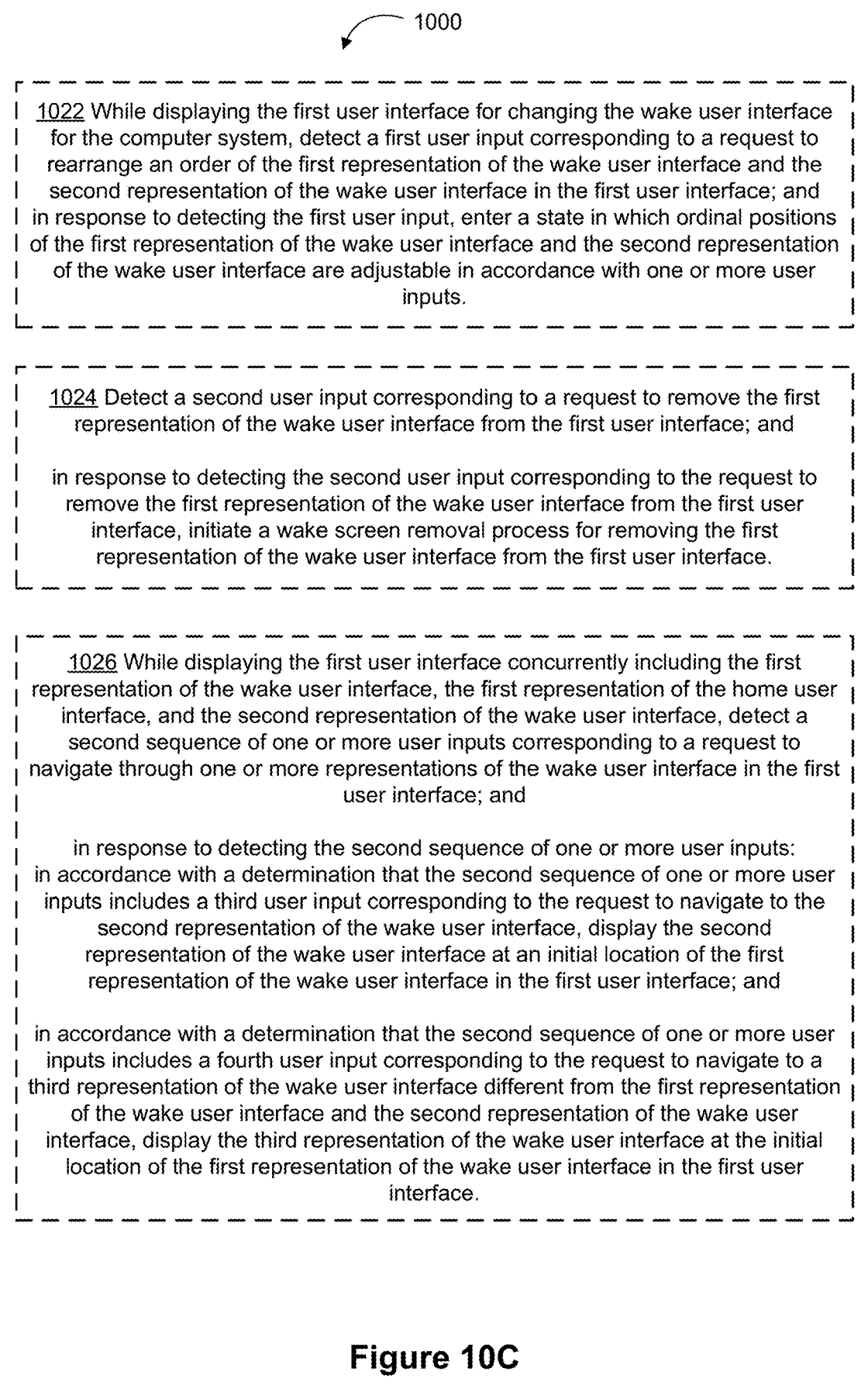

1022 While displaying the first user interface for changing the wake user interface for the computer system, detect a first user input corresponding to a request to rearrange an order of the first representation of the wake user interface and the second representation of the wake user interface in the first user interface; and in response to detecting the first user input, enter a state in which ordinal positions of the first representation of the wake user interface and the second representation of the wake user interface are adjustable in accordance with one or more user inputs.

1024 Detect a second user input corresponding to a request to remove the first representation of the wake user interface from the first user interface; and in response to detecting the second user input corresponding to the request to remove the first representation of the wake user interface from the first user interface, initiate a wake screen removal process for removing the first representation of the wake user interface from the first user interface.

1026 While displaying the first user interface concurrently including the first representation of the wake user interface, the first representation of the home user interface, and the second representation of the wake user interface, detect a second sequence of one or more user inputs corresponding to a request to navigate through one or more representations of the wake user interface in the first user interface; and in response to detecting the second sequence of one or more user inputs:
in accordance with a determination that the second sequence of one or more user inputs includes a third user input corresponding to the request to navigate to the second representation of the wake user interface, display the second representation of the wake user interface at an initial location of the first representation of the wake user interface in the first user interface; and in accordance with a determination that the second sequence of one or more user inputs includes a fourth user input corresponding to the request to navigate to a third representation of the wake user interface different from the first representation of the wake user interface and the second representation of the wake user interface, display the third representation of the wake user interface at the initial location of the first representation of the wake user interface in the first user interface.

Figure 10D:
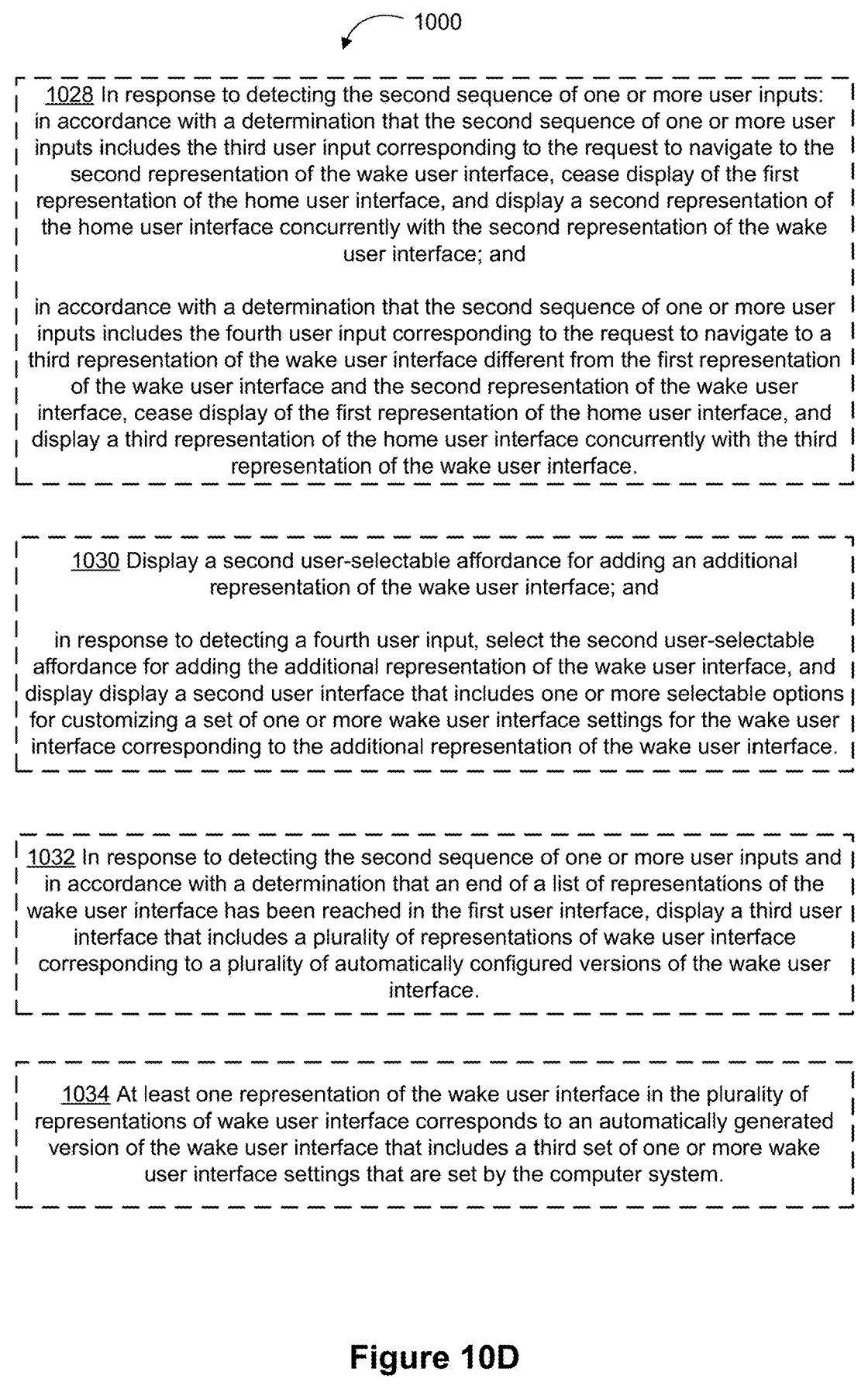

1028 In response to detecting the second sequence of one or more user inputs: in accordance with a determination that the second sequence of one or more user inputs includes the third user input corresponding to the request to navigate to the second representation of the wake user interface, cease display of the first representation of the home user interface, and display a second representation of the home user interface concurrently with the second representation of the wake user interface; and in accordance with a determination that the second sequence of one or more user inputs includes the fourth user input corresponding to the request to navigate to a third representation of the wake user interface different from the first representation of the wake user interface and the second representation of the wake user interface, cease display of the first representation of the home user interface, and display a third representation of the home user interface concurrently with the third representation of the wake user interface.

1030 Display a second user-selectable affordance for adding an additional representation of the wake user interface; and in response to detecting a fourth user input, select the second user-selectable affordance for adding the additional representation of the wake user interface, and display display a second user interface that includes one or more selectable options for customizing a set of one or more wake user interface settings for the wake user interface corresponding to the additional representation of the wake user interface.

1032 In response to detecting the second sequence of one or more user inputs and in accordance with a determination that an end of a list of representations of the wake user interface has been reached in the first user interface, display a third user interface that includes a plurality of representations of wake user interface corresponding to a plurality of automatically configured versions of the wake user interface.

1034 At least one representation of the wake user interface in the plurality of representations of wake user interface corresponds to an automatically generated version of the wake user interface that includes a third set of one or more wake user interface settings that are set by the computer system.

Figure 10E:
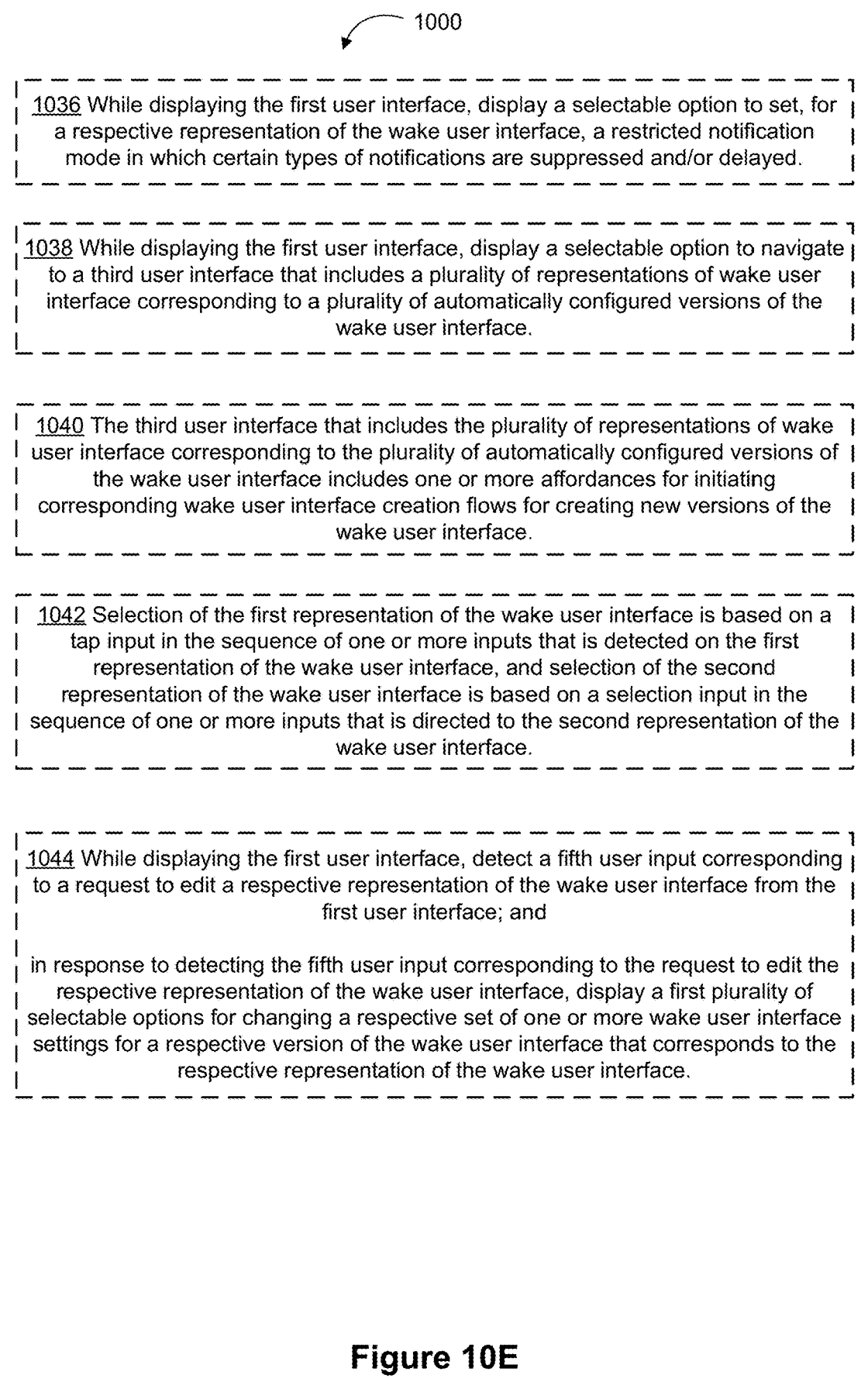

1036 While displaying the first user interface, display a selectable option to set, for a respective representation of the wake user interface, a restricted notification mode in which certain types of notifications are suppressed and/or delayed.

1038 While displaying the first user interface, display a selectable option to navigate to a third user interface that includes a plurality of representations of wake user interface corresponding to a plurality of automatically configured versions of the wake user interface.

1040 The third user interface that includes the plurality of representations of wake user interface corresponding to the plurality of automatically configured versions of the wake user interface includes one or more affordances for initiating corresponding wake user interface creation flows for creating new versions of the wake user interface.

1042 Selection of the first representation of the wake user interface is based on a tap input in the sequence of one or more inputs that is detected on the first representation of the wake user interface, and selection of the second representation of the wake user interface is based on a selection input in the sequence of one or more inputs that is directed to the second representation of the wake user interface.

1044 While displaying the first user interface, detect a fifth user input corresponding to a request to edit a respective representation of the wake user interface from the first user interface; and in response to detecting the fifth user input corresponding to the request to edit the respective representation of the wake user interface, display a first plurality of selectable options for changing a respective set of one or more wake user interface settings for a respective version of the wake user interface that corresponds to the respective representation of the wake user interface.

Figure 10F:
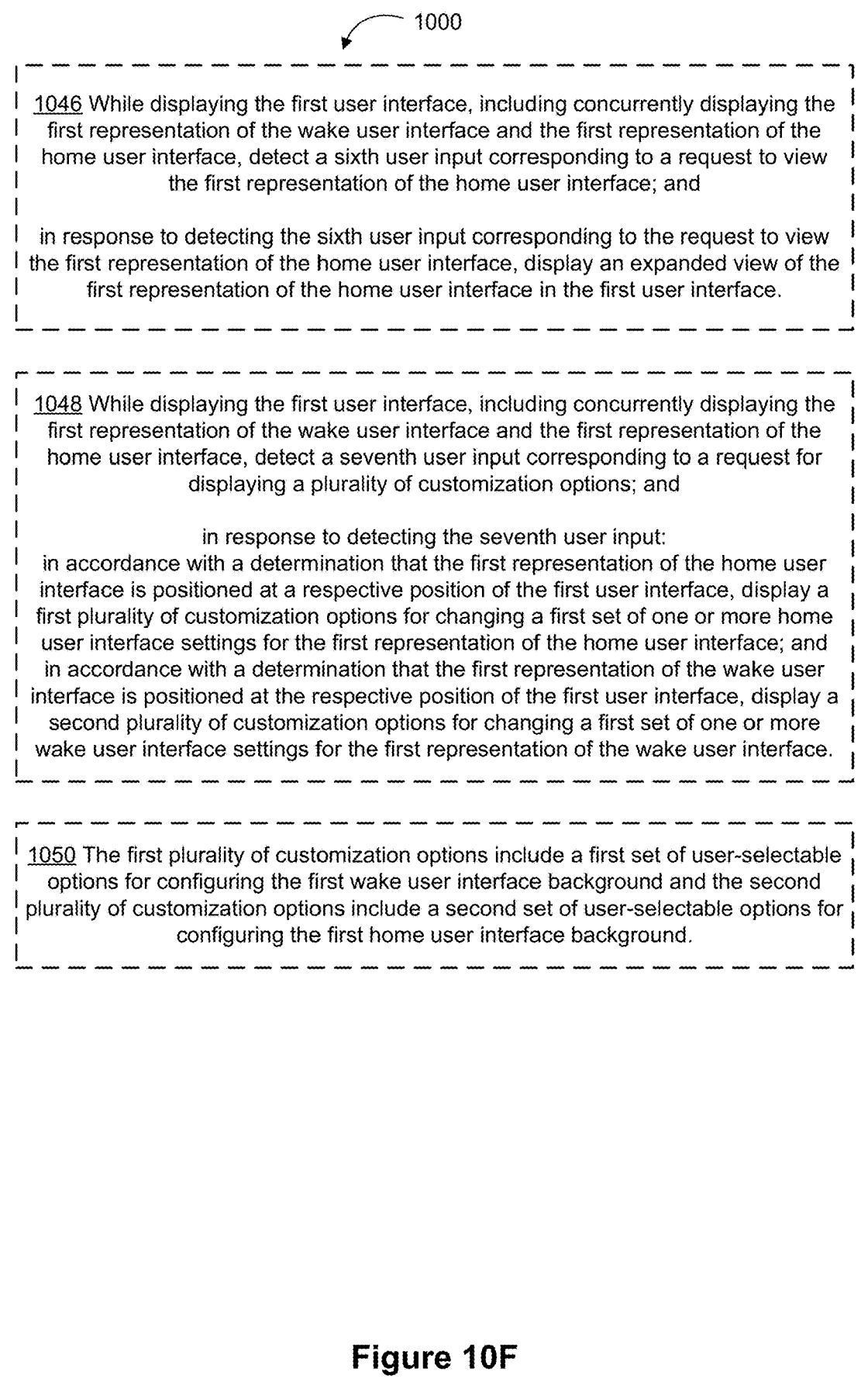

1046 While displaying the first user interface, including concurrently displaying the first representation of the wake user interface and the first representation of the home user interface, detect a sixth user input corresponding to a request to view the first representation of the home user interface; and in response to detecting the sixth user input corresponding to the request to view the first representation of the home user interface, display an expanded view of the first representation of the home user interface in the first user interface.

1048 While displaying the first user interface, including concurrently displaying the first representation of the wake user interface and the first representation of the home user interface, detect a seventh user input corresponding to a request for displaying a plurality of customization options; and in response to detecting the seventh user input:
in accordance with a determination that the first representation of the home user interface is positioned at a respective position of the first user interface, display a first plurality of customization options for changing a first set of one or more home user interface settings for the first representation of the home user interface; and in accordance with a determination that the first representation of the wake user interface is positioned at the respective position of the first user interface, display a second plurality of customization options for changing a first set of one or more wake user interface settings for the first representation of the wake user interface.

1050 The first plurality of customization options include a first set of user-selectable options for configuring the first wake user interface background and the second plurality of customization options include a second set of user-selectable options for configuring the first home user interface background.

Figure 10G:
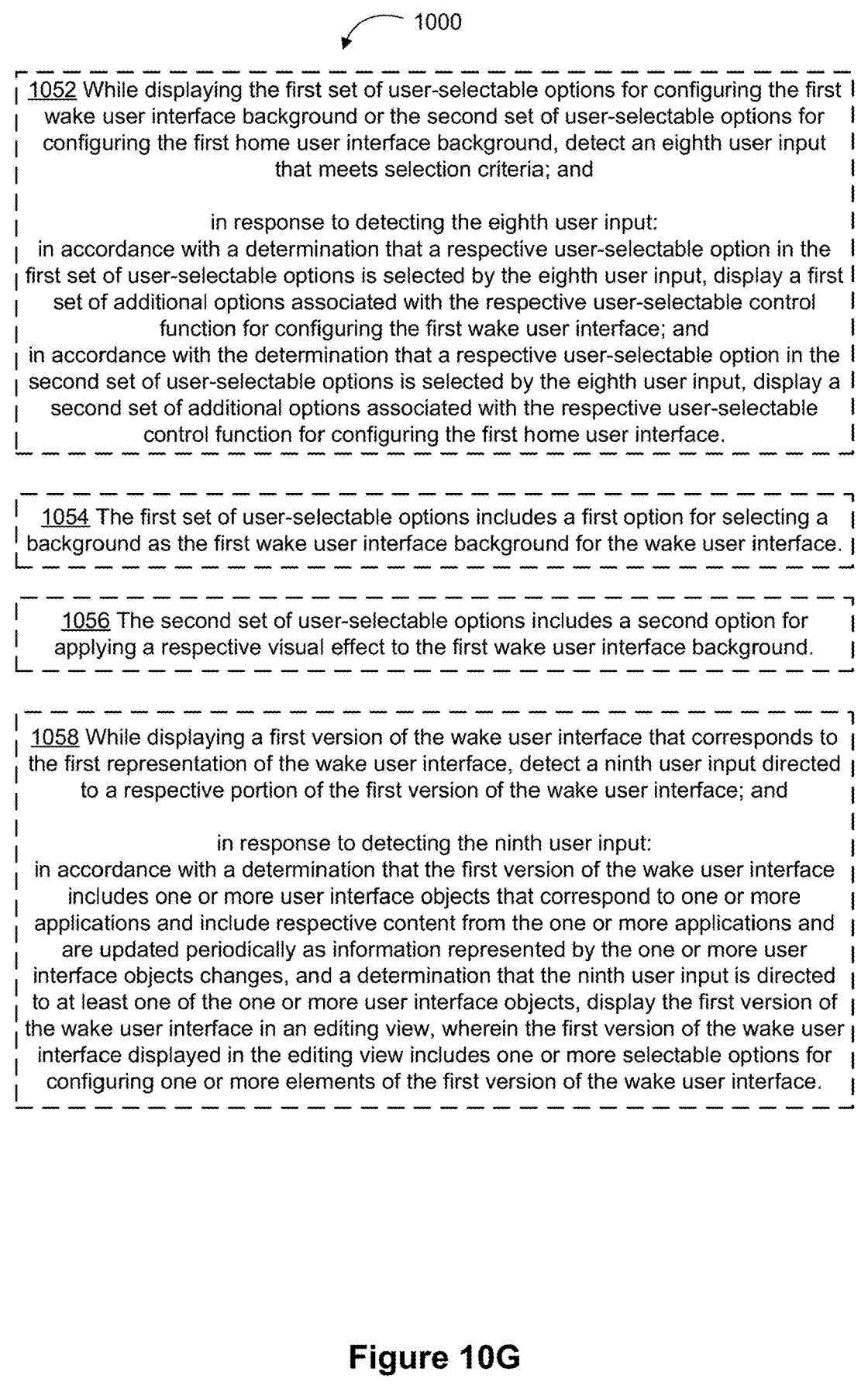

1052 While displaying the first set of user-selectable options for configuring the first wake user interface background or the second set of user-selectable options for configuring the first home user interface background, detect an eighth user input that meets selection criteria; and in response to detecting the eighth user input:
in accordance with a determination that a respective user-selectable option in the first set of user-selectable options is selected by the eighth user input, display a first set of additional options associated with the respective user-selectable control function for configuring the first wake user interface; and
in accordance with the determination that a respective user-selectable option in the second set of user-selectable options is selected by the eighth user input, display a second set of additional options associated with the respective user-selectable control function for configuring the first home user interface.

1054 The first set of user-selectable options includes a first option for selecting a background as the first wake user interface background for the wake user interface.

1056 The second set of user-selectable options includes a second option for applying a respective visual effect to the first wake user interface background.

1058 While displaying a first version of the wake user interface that corresponds to the first representation of the wake user interface, detect a ninth user input directed to a respective portion of the first version of the wake user interface; and in response to detecting the ninth user input:
in accordance with a determination that the first version of the wake user interface includes one or more user interface objects that correspond to one or more applications and include respective content from the one or more applications and are updated periodically as information represented by the one or more user interface objects changes, and a determination that the ninth user input is directed to at least one of the one or more user interface objects, display the first version of the wake user interface in an editing view, wherein the first version of the wake user interface displayed in the editing view includes one or more selectable options for configuring one or more elements of the first version of the wake user interface.

Figure 10H:
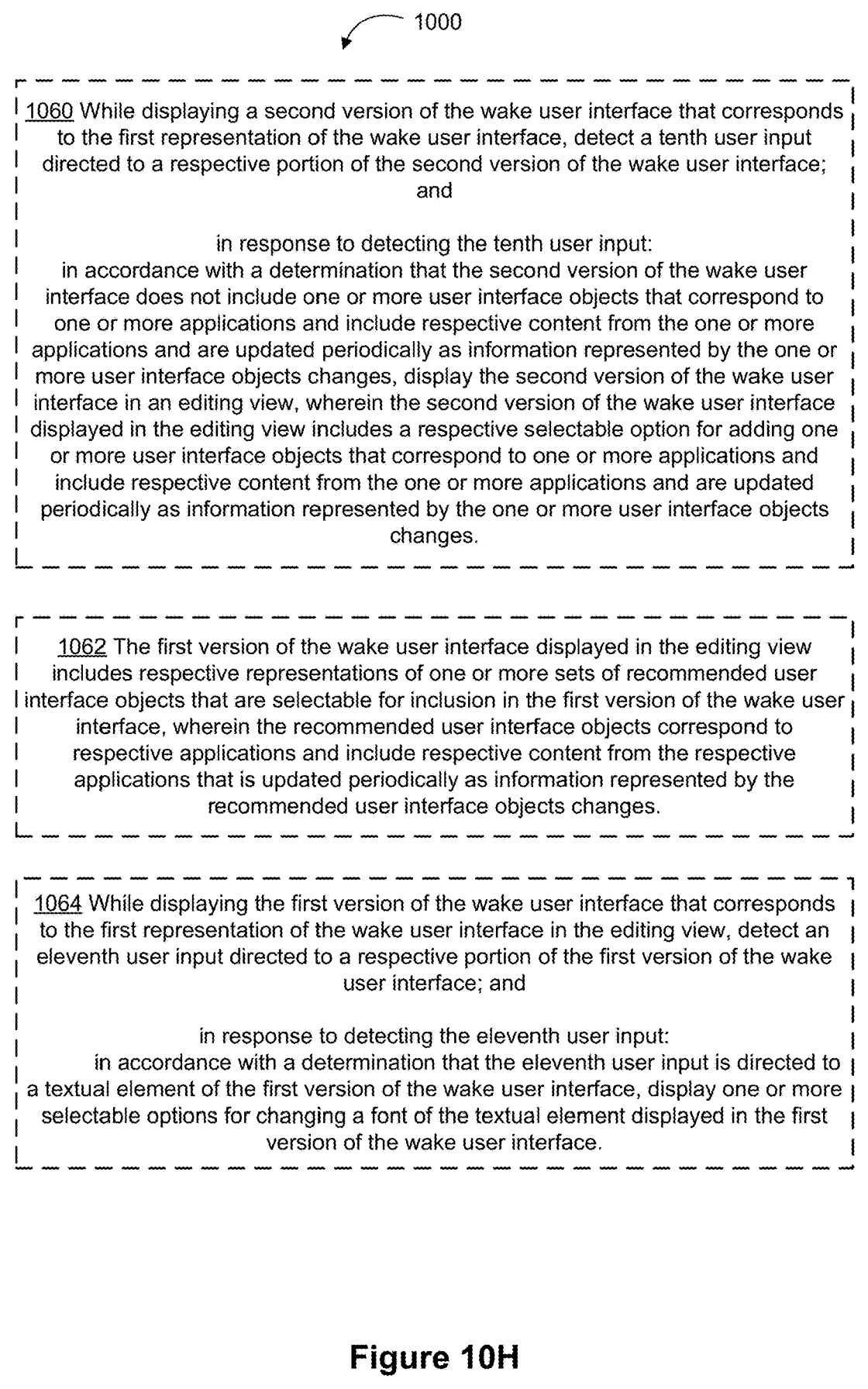

1060 While displaying a second version of the wake user interface that corresponds to the first representation of the wake user interface, detect a tenth user input directed to a respective portion of the second version of the wake user interface; and in response to detecting the tenth user input:
in accordance with a determination that the second version of the wake user interface does not include one or more user interface objects that correspond to one or more applications and include respective content from the one or more applications and are updated periodically as information represented by the one or more user interface objects changes, display the second version of the wake user interface in an editing view, wherein the second version of the wake user interface displayed in the editing view includes a respective selectable option for adding one or more user interface objects that correspond to one or more applications and include respective content from the one or more applications and are updated periodically as information represented by the one or more user interface objects changes.

1062 The first version of the wake user interface displayed in the editing view includes respective representations of one or more sets of recommended user interface objects that are selectable for inclusion in the first version of the wake user interface, wherein the recommended user interface objects correspond to respective applications and include respective content from the respective applications that is updated periodically as information represented by the recommended user interface objects changes.

1064 While displaying the first version of the wake user interface that corresponds to the first representation of the wake user interface in the editing view, detect an eleventh user input directed to a respective portion of the first version of the wake user interface; and in response to detecting the eleventh user input:
in accordance with a determination that the eleventh user input is directed to a textual element of the first version of the wake user interface, display one or more selectable options for changing a font of the textual element displayed in the first version of the wake user interface.

Figure 10I:
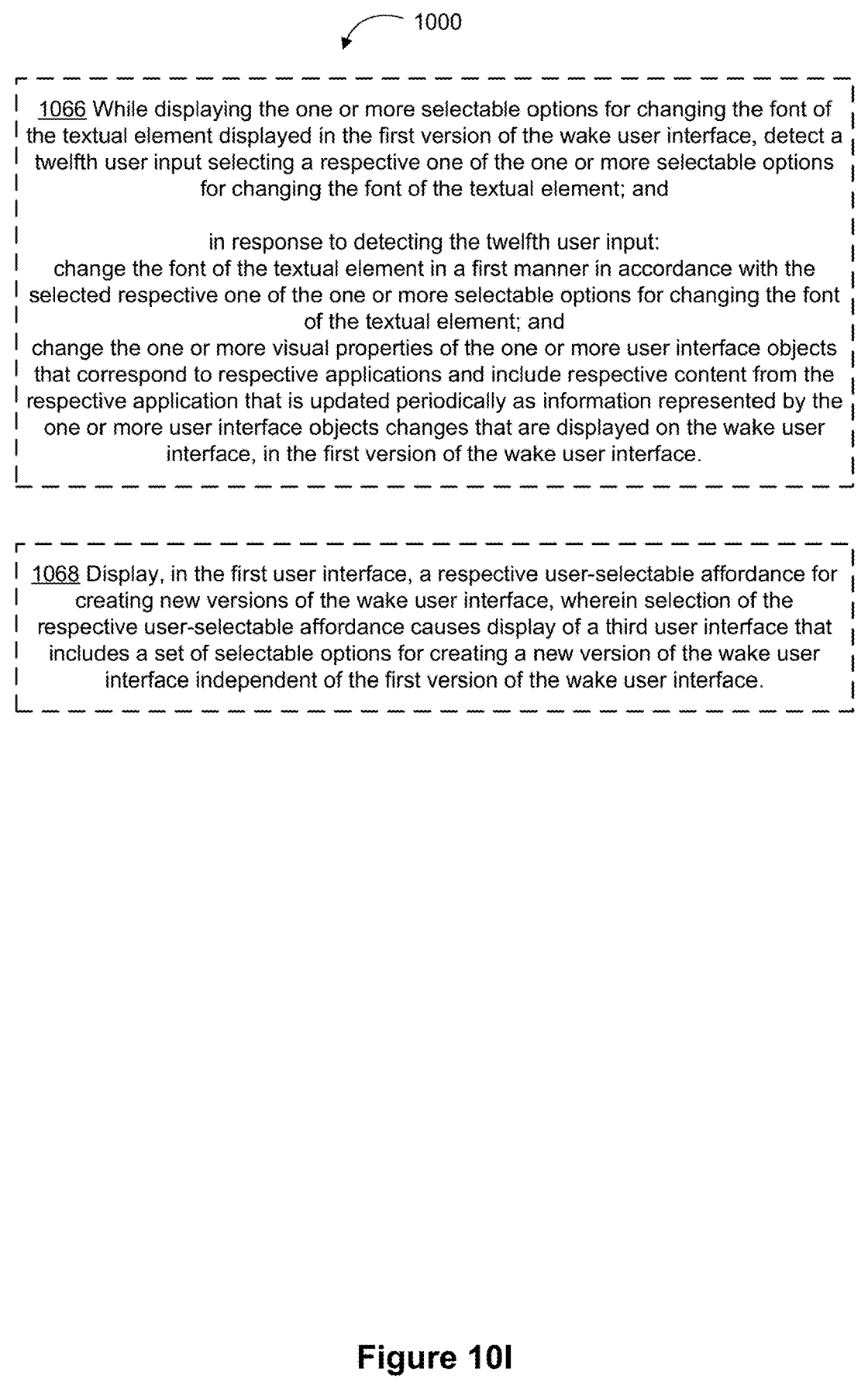

1066 While displaying the one or more selectable options for changing the font of the textual element displayed in the first version of the wake user interface, detect a twelfth user input selecting a respective one of the one or more selectable options for changing the font of the textual element; and in response to detecting the twelfth user input:
change the font of the textual element in a first manner in accordance with the selected respective one of the one or more selectable options for changing the font of the textual element; and
change the one or more visual properties of the one or more user interface objects that correspond to respective applications and include respective content from the respective application that is updated periodically as information represented by the one or more user interface objects changes that are displayed on the wake user interface, in the first version of the wake user interface.

1068 Display, in the first user interface, a respective user-selectable affordance for creating new versions of the wake user interface, wherein selection of the respective user-selectable affordance causes display of a third user interface that includes a set of selectable options for creating a new version of the wake user interface independent of the first version of the wake user interface.

Figure 11B:
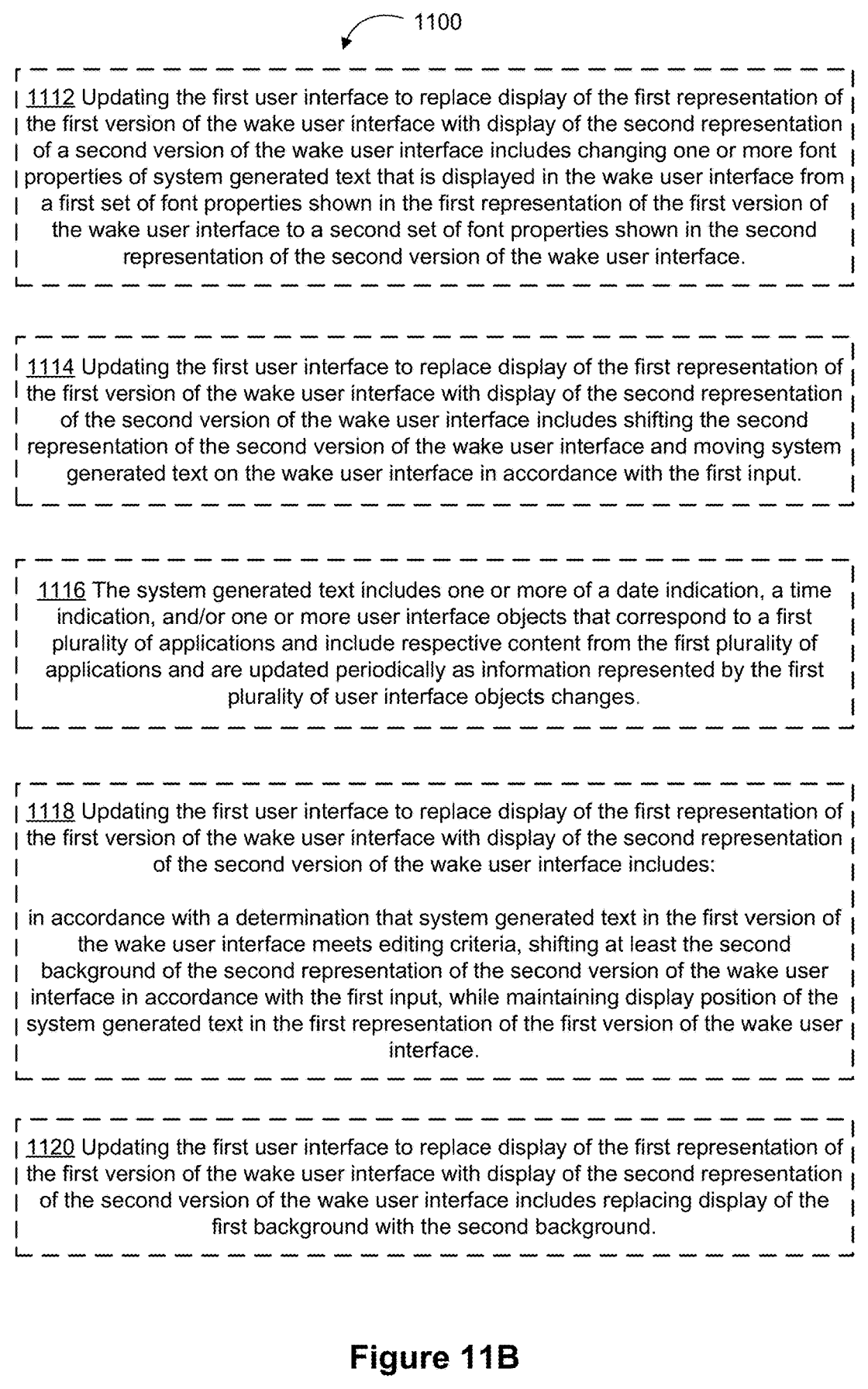

1112 Updating the first user interface to replace display of the first representation of the first version of the wake user interface with display of the second representation of a second version of the wake user interface includes changing one or more font properties of system generated text that is displayed in the wake user interface from a first set of font properties shown in the first representation of the first version of the wake user interface to a second set of font properties shown in the second representation of the second version of the wake user interface.

1114 Updating the first user interface to replace display of the first representation of the first version of the wake user interface with display of the second representation of the second version of the wake user interface includes shifting the second representation of the second version of the wake user interface and moving system generated text on the wake user interface in accordance with the first input.

1116 The system generated text includes one or more of a date indication, a time indication, and/or one or more user interface objects that correspond to a first plurality of applications and include respective content from the first plurality of applications and are updated periodically as information represented by the first plurality of user interface objects changes.

1118 Updating the first user interface to replace display of the first representation of the first version of the wake user interface with display of the second representation of the second version of the wake user interface includes:

in accordance with a determination that system generated text in the first version of the wake user interface meets editing criteria, shifting at least the second background of the second representation of the second version of the wake user interface in accordance with the first input, while maintaining display position of the system generated text in the first representation of the first version of the wake user interface.

1120 Updating the first user interface to replace display of the first representation of the first version of the wake user interface with display of the second representation of the second version of the wake user interface includes replacing display of the first background with the second background.

Figure 11C:
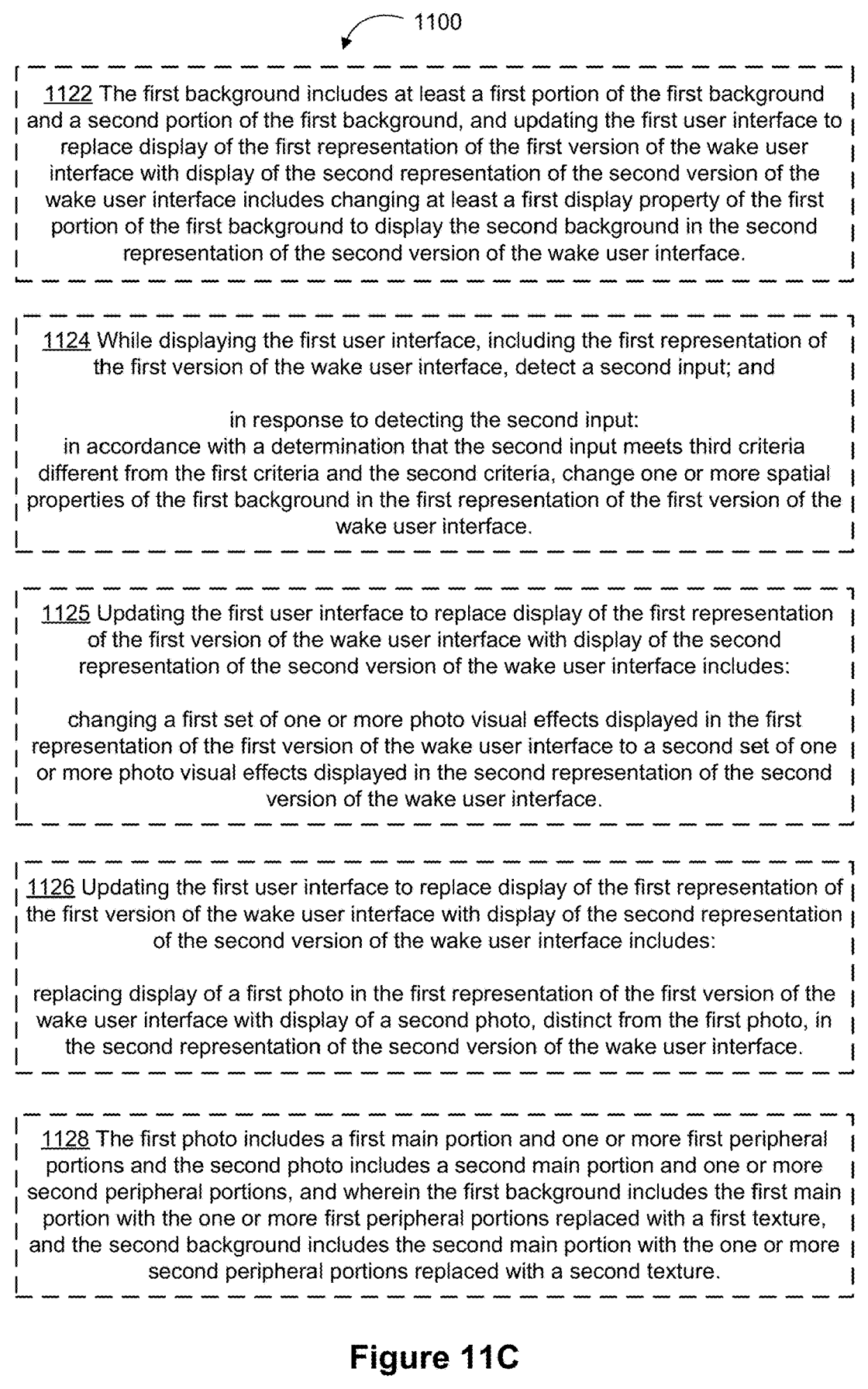

1122 The first background includes at least a first portion of the first background and a second portion of the first background, and updating the first user interface to replace display of the first representation of the first version of the wake user interface with display of the second representation of the second version of the wake user interface includes changing at least a first display property of the first portion of the first background to display the second background in the second representation of the second version of the wake user interface.

1124 While displaying the first user interface, including the first representation of the first version of the wake user interface, detect a second input; and in response to detecting the second input:
in accordance with a determination that the second input meets third criteria different from the first criteria and the second criteria, change one or more spatial properties of the first background in the first representation of the first version of the wake user interface.

1125 Updating the first user interface to replace display of the first representation of the first version of the wake user interface with display of the second representation of the second version of the wake user interface includes:

changing a first set of one or more photo visual effects displayed in the first representation of the first version of the wake user interface to a second set of one or more photo visual effects displayed in the second representation of the second version of the wake user interface.

1126 Updating the first user interface to replace display of the first representation of the first version of the wake user interface with display of the second representation of the second version of the wake user interface includes:

replacing display of a first photo in the first representation of the first version of the wake user interface with display of a second photo, distinct from the first photo, in the second representation of the second version of the wake user interface.

1128 The first photo includes a first main portion and one or more first peripheral portions and the second photo includes a second main portion and one or more second peripheral portions, and wherein the first background includes the first main portion with the one or more first peripheral portions replaced with a first texture, and the second background includes the second main portion with the one or more second peripheral portions replaced with a second texture.

Figure 11D:
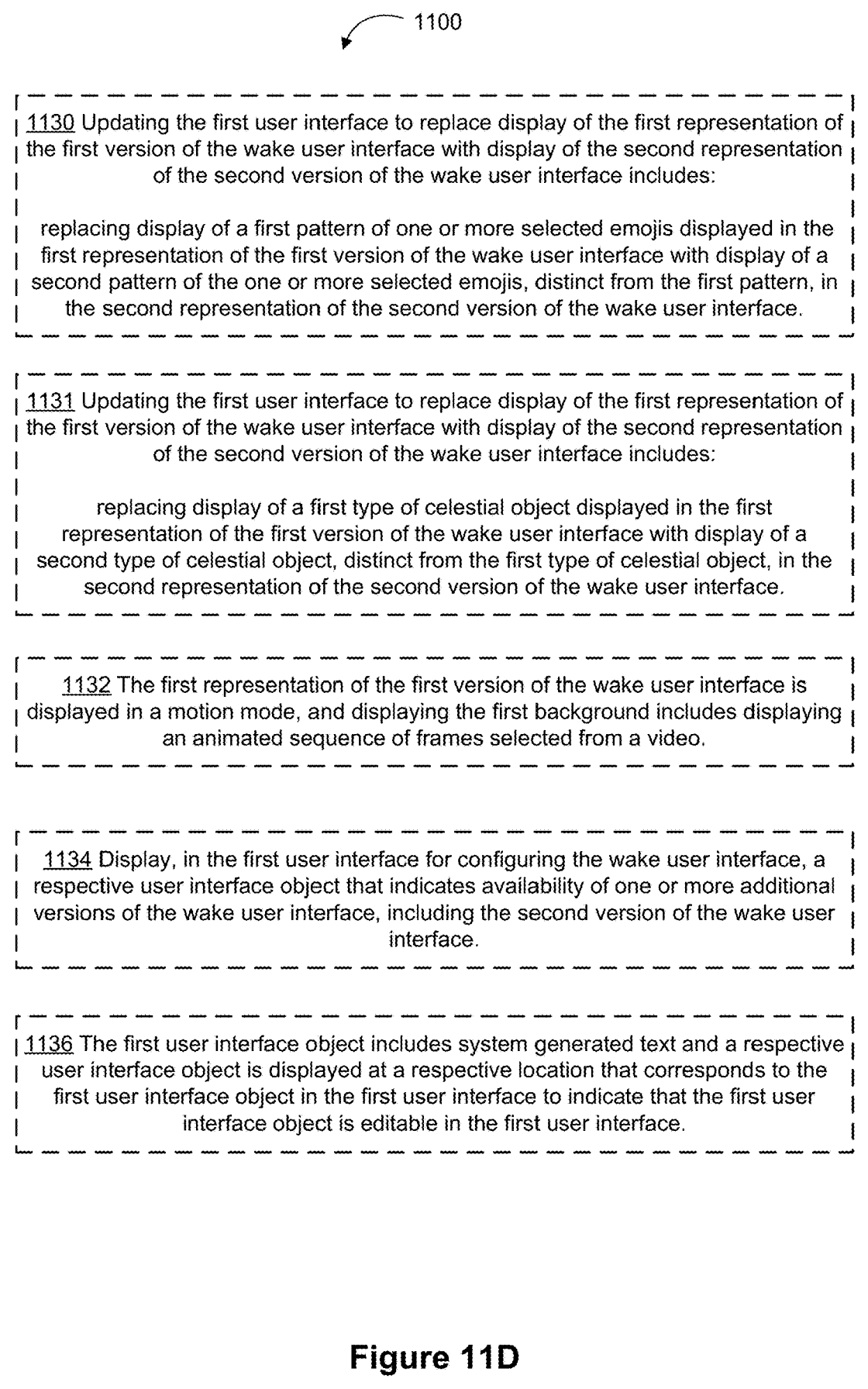

1130 Updating the first user interface to replace display of the first representation of the first version of the wake user interface with display of the second representation of the second version of the wake user interface includes:

replacing display of a first pattern of one or more selected emojis displayed in the first representation of the first version of the wake user interface with display of a second pattern of the one or more selected emojis, distinct from the first pattern, in the second representation of the second version of the wake user interface.

1131 Updating the first user interface to replace display of the first representation of the first version of the wake user interface with display of the second representation of the second version of the wake user interface includes:

replacing display of a first type of celestial object displayed in the first representation of the first version of the wake user interface with display of a second type of celestial object, distinct from the first type of celestial object, in the second representation of the second version of the wake user interface.

1132 The first representation of the first version of the wake user interface is displayed in a motion mode, and displaying the first background includes displaying an animated sequence of frames selected from a video.

1134 Display, in the first user interface for configuring the wake user interface, a respective user interface object that indicates availability of one or more additional versions of the wake user interface, including the second version of the wake user interface.

1136 The first user interface object includes system generated text and a respective user interface object is displayed at a respective location that corresponds to the first user interface object in the first user interface to indicate that the first user interface object is editable in the first user interface.

Figure 11E:
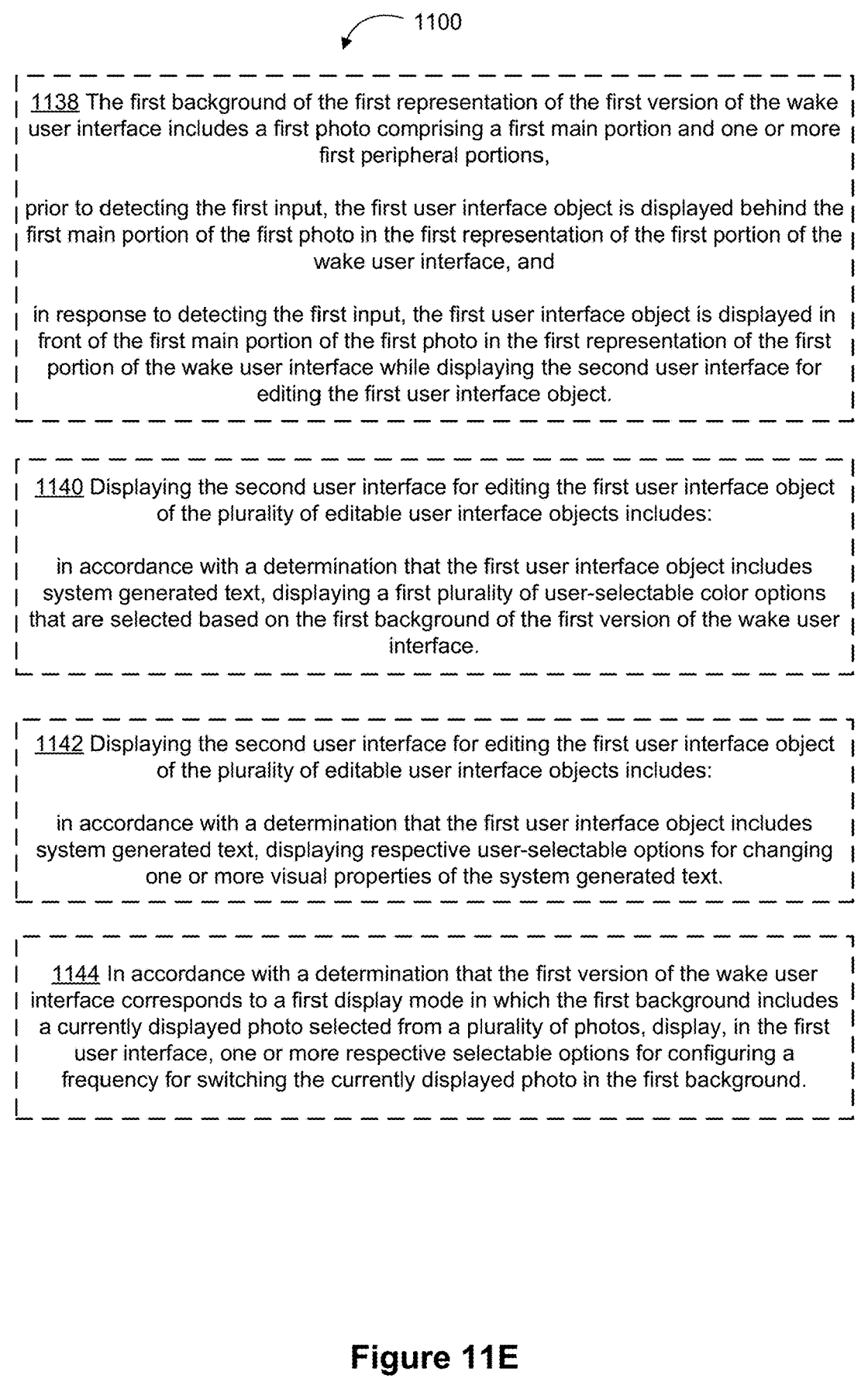

1138 The first background of the first representation of the first version of the wake user interface includes a first photo comprising a first main portion and one or more first peripheral portions, prior to detecting the first input, the first user interface object is displayed behind the first main portion of the first photo in the first representation of the first portion of the wake user interface, and in response to detecting the first input, the first user interface object is displayed in front of the first main portion of the first photo in the first representation of the first portion of the wake user interface while displaying the second user interface for editing the first user interface object.

1140 Displaying the second user interface for editing the first user interface object of the plurality of editable user interface objects includes:

in accordance with a determination that the first user interface object includes system generated text, displaying a first plurality of user-selectable color options that are selected based on the first background of the first version of the wake user interface.

1142 Displaying the second user interface for editing the first user interface object of the plurality of editable user interface objects includes:

in accordance with a determination that the first user interface object includes system generated text, displaying respective user-selectable options for changing one or more visual properties of the system generated text.

1144 In accordance with a determination that the first version of the wake user interface corresponds to a first display mode in which the first background includes a currently displayed photo selected from a plurality of photos, display, in the first user interface, one or more respective selectable options for configuring a frequency for switching the currently displayed photo in the first background.

Figure 11F:
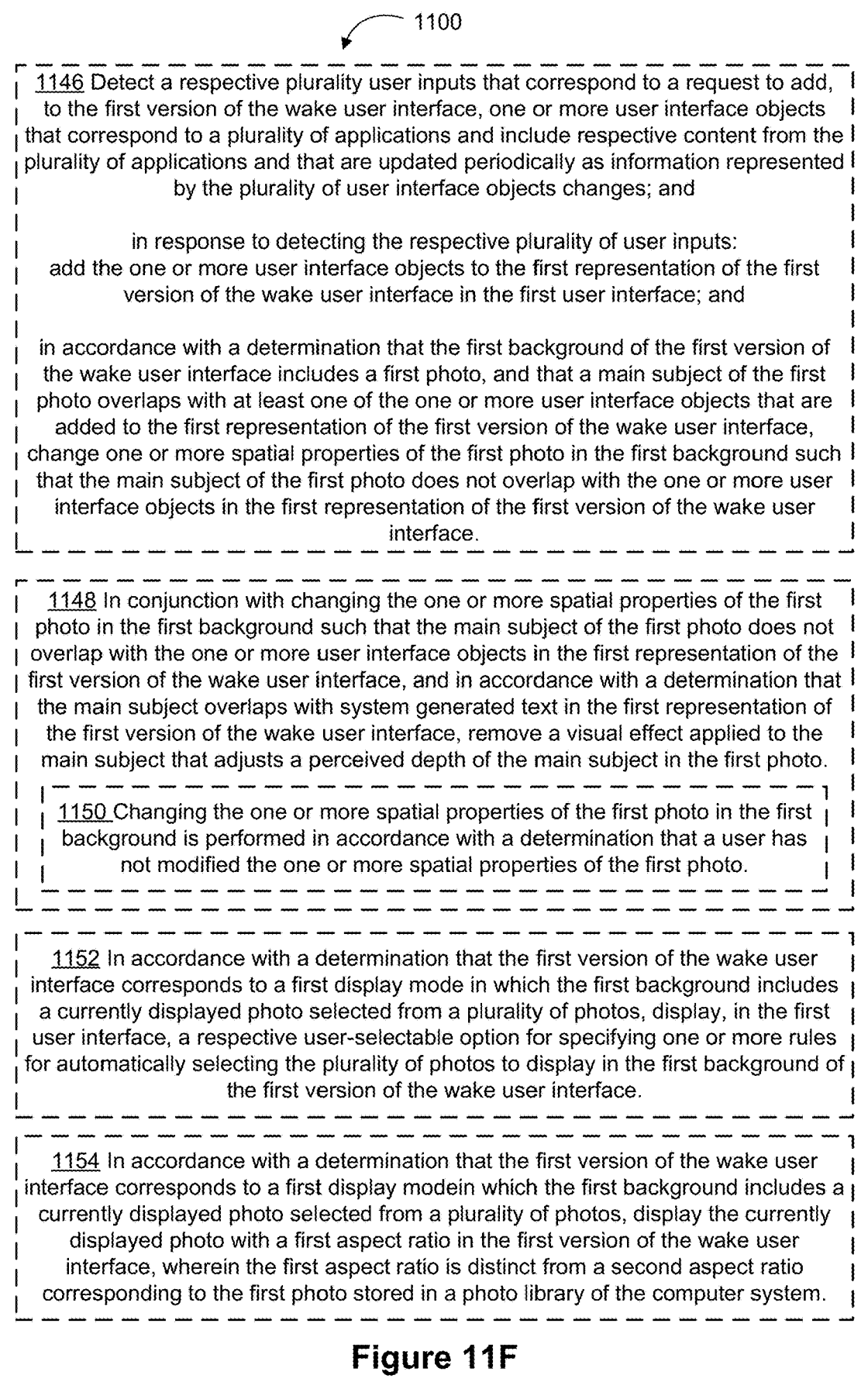

1146 Detect a respective plurality user inputs that correspond to a request to add, to the first version of the wake user interface, one or more user interface objects that correspond to a plurality of applications and include respective content from the plurality of applications and that are updated periodically as information represented by the plurality of user interface objects changes; and in response to detecting the respective plurality of user inputs:
add the one or more user interface objects to the first representation of the first version of the wake user interface in the first user interface; and in accordance with a determination that the first background of the first version of the wake user interface includes a first photo, and that a main subject of the first photo overlaps with at least one of the one or more user interface objects that are added to the first representation of the first version of the wake user interface, change one or more spatial properties of the first photo in the first background such that the main subject of the first photo does not overlap with the one or more user interface objects in the first representation of the first version of the wake user interface.

1148 In conjunction with changing the one or more spatial properties of the first photo in the first background such that the main subject of the first photo does not overlap with the one or more user interface objects in the first representation of the first version of the wake user interface, and in accordance with a determination that the main subject overlaps with system generated text in the first representation of the first version of the wake user interface, remove a visual effect applied to the main subject that adjusts a perceived depth of the main subject in the first photo.

1150 Changing the one or more spatial properties of the first photo in the first background is performed in accordance with a determination that a user has not modified the one or more spatial properties of the first photo.

1152 In accordance with a determination that the first version of the wake user interface corresponds to a first display mode in which the first background includes a currently displayed photo selected from a plurality of photos, display, in the first user interface, a respective user-selectable option for specifying one or more rules for automatically selecting the plurality of photos to display in the first background of the first version of the wake user interface.

1154 In accordance with a determination that the first version of the wake user interface corresponds to a first display modein which the first background includes a currently displayed photo selected from a plurality of photos, display the currently displayed photo with a first aspect ratio in the first version of the wake user interface, wherein the first aspect ratio is distinct from a second aspect ratio corresponding to the first photo stored in a photo library of the computer system.

Figure 11G:
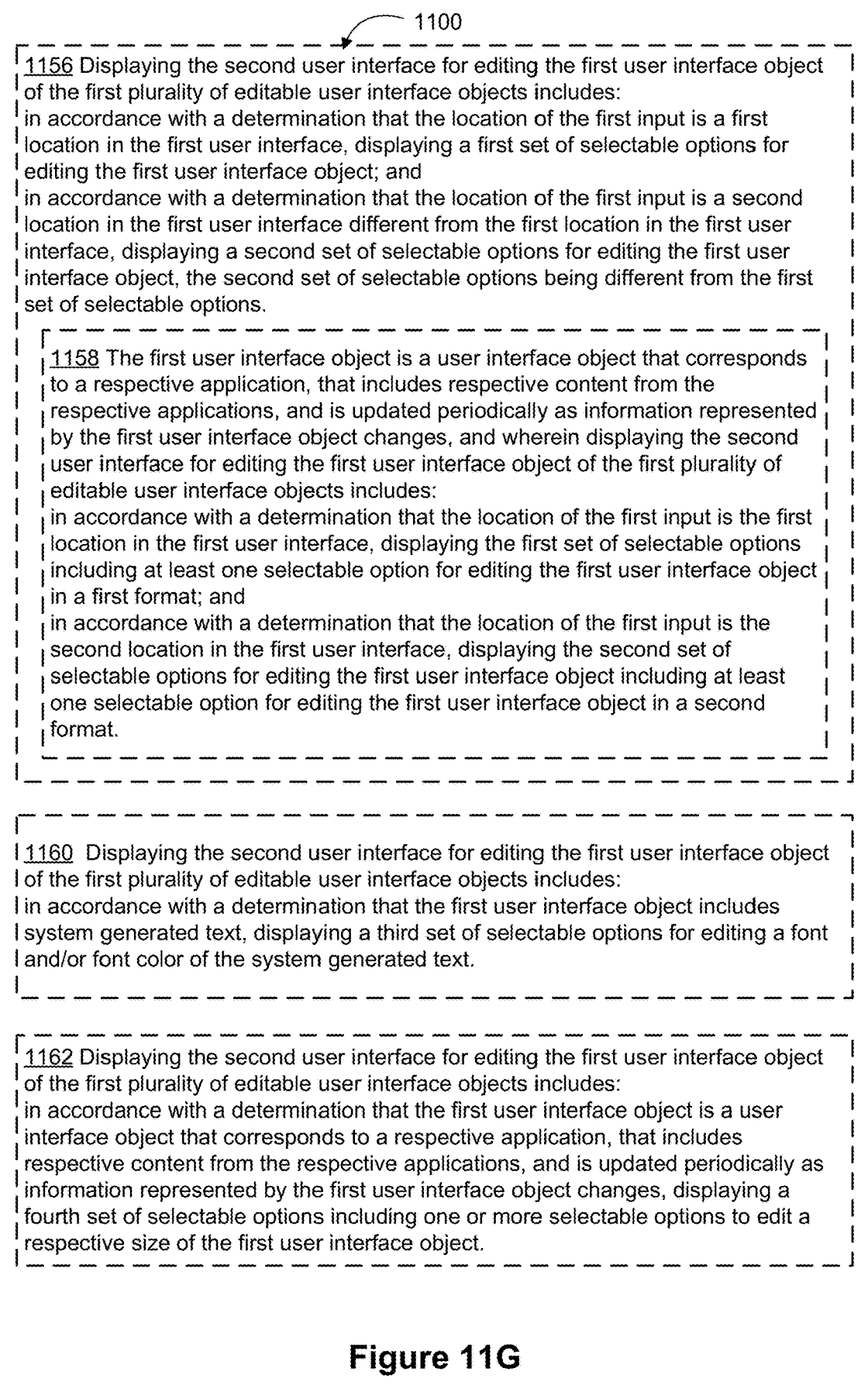

1156 Displaying the second user interface for editing the first user interface object of the first plurality of editable user interface objects includes:
in accordance with a determination that the location of the first input is a first location in the first user interface, displaying a first set of selectable options for editing the first user interface object; and
in accordance with a determination that the location of the first input is a second location in the first user interface different from the first location in the first user interface, displaying a second set of selectable options for editing the first user interface object, the second set of selectable options being different from the first set of selectable options.

1158 The first user interface object is a user interface object that corresponds to a respective application, that includes respective content from the respective applications, and is updated periodically as information represented by the first user interface object changes, and wherein displaying the second user interface for editing the first user interface object of the first plurality of editable user interface objects includes:
in accordance with a determination that the location of the first input is the first location in the first user interface, displaying the first set of selectable options including at least one selectable option for editing the first user interface object in a first format; and
in accordance with a determination that the location of the first input is the second location in the first user interface, displaying the second set of selectable options for editing the first user interface object including at least one selectable option for editing the first user interface object in a second format.

1160 Displaying the second user interface for editing the first user interface object of the first plurality of editable user interface objects includes:
in accordance with a determination that the first user interface object includes system generated text, displaying a third set of selectable options for editing a font and/or font color of the system generated text.

1162 Displaying the second user interface for editing the first user interface object of the first plurality of editable user interface objects includes:
in accordance with a determination that the first user interface object is a user interface object that corresponds to a respective application, that includes respective content from the respective applications, and is updated periodically as information represented by the first user interface object changes, displaying a fourth set of selectable options including one or more selectable options to edit a respective size of the first user interface object.

1164 In response to detecting the first input directed to the first user interface: in accordance with a determination that the first input meets the first criteria, display respective affordances at locations corresponding to a subset of user interface objects of the first plurality of editable user interface objects, wherein the subset of user interface objects correspond to different applications and include respective content from the different applications and are updated periodically as information represented by the subset of user interface objects change, and wherein the respective affordances, when selected, remove corresponding user interface objects of the subset of user interface objects from the first user interface.

Figure 12A:
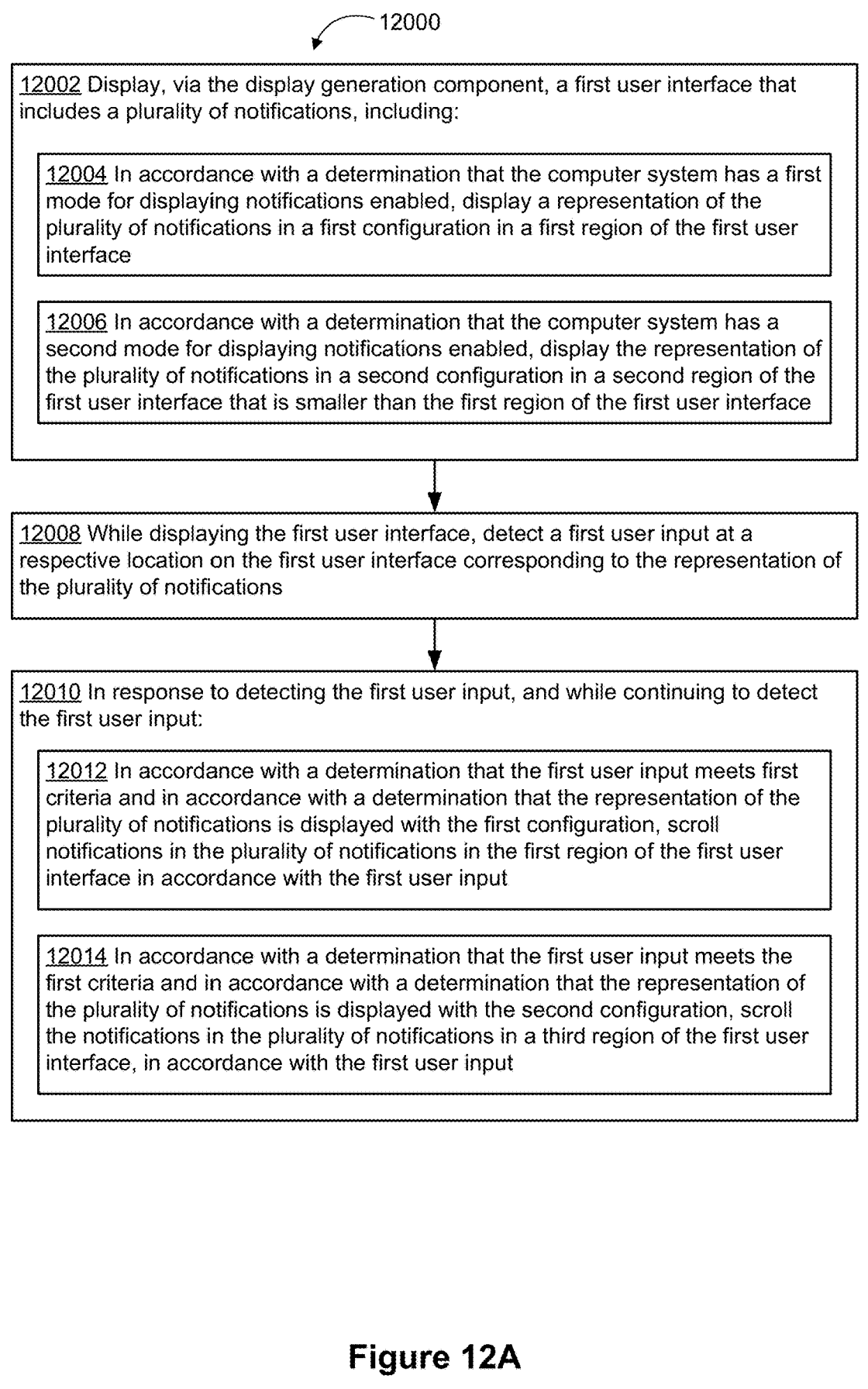

12002 Display, via the display generation component, a first user interface that includes a plurality of notifications, including:

12004 In accordance with a determination that the computer system has a first mode for displaying notifications enabled, display a representation of the plurality of notifications in a first configuration in a first region of the first user interface 12006 In accordance with a determination that the computer system has a second mode for displaying notifications enabled, display the representation of the plurality of notifications in a second configuration in a second region of the first user interface that is smaller than the first region of the first user interface

↓

12008 While displaying the first user interface, detect a first user input at a respective location on the first user interface corresponding to the representation of the plurality of notifications

↓

12010 In response to detecting the first user input, and while continuing to detect the first user input:

12012 In accordance with a determination that the first user input meets first criteria and in accordance with a determination that the representation of the plurality of notifications is displayed with the first configuration, scroll notifications in the plurality of notifications in the first region of the first user interface in accordance with the first user input 12014 In accordance with a determination that the first user input meets the first criteria and in accordance with a determination that the representation of the plurality of notifications is displayed with the second configuration, scroll the notifications in the plurality of notifications in a third region of the first user interface, in accordance with the first user input

Figure 12B:
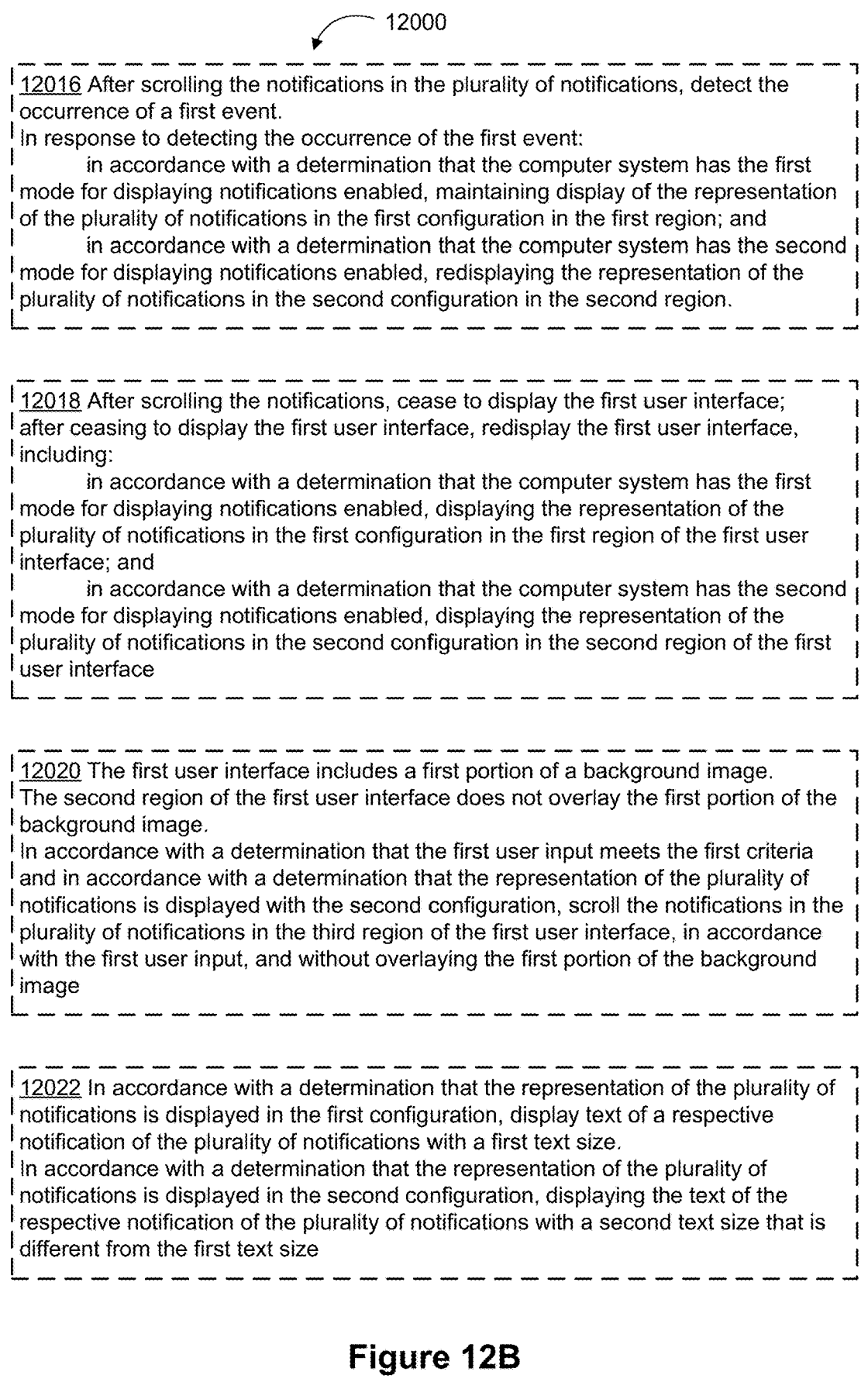

12016 After scrolling the notifications in the plurality of notifications, detect the occurrence of a first event.
In response to detecting the occurrence of the first event:
in accordance with a determination that the computer system has the first mode for displaying notifications enabled, maintaining display of the representation of the plurality of notifications in the first configuration in the first region; and
in accordance with a determination that the computer system has the second mode for displaying notifications enabled, redisplaying the representation of the plurality of notifications in the second configuration in the second region.

12018 After scrolling the notifications, cease to display the first user interface; after ceasing to display the first user interface, redisplay the first user interface, including:
in accordance with a determination that the computer system has the first mode for displaying notifications enabled, displaying the representation of the plurality of notifications in the first configuration in the first region of the first user interface; and
in accordance with a determination that the computer system has the second mode for displaying notifications enabled, displaying the representation of the plurality of notifications in the second configuration in the second region of the first user interface 12020 The first user interface includes a first portion of a background image.
The second region of the first user interface does not overlay the first portion of the background image.
In accordance with a determination that the first user input meets the first criteria and in accordance with a determination that the representation of the plurality of notifications is displayed with the second configuration, scroll the notifications in the plurality of notifications in the third region of the first user interface, in accordance with the first user input, and without overlaying the first portion of the background image 12022 In accordance with a determination that the representation of the plurality of notifications is displayed in the first configuration, display text of a respective notification of the plurality of notifications with a first text size.
In accordance with a determination that the representation of the plurality of notifications is displayed in the second configuration, displaying the text of the respective notification of the plurality of notifications with a second text size that is different from the first text size

Figure 12C:
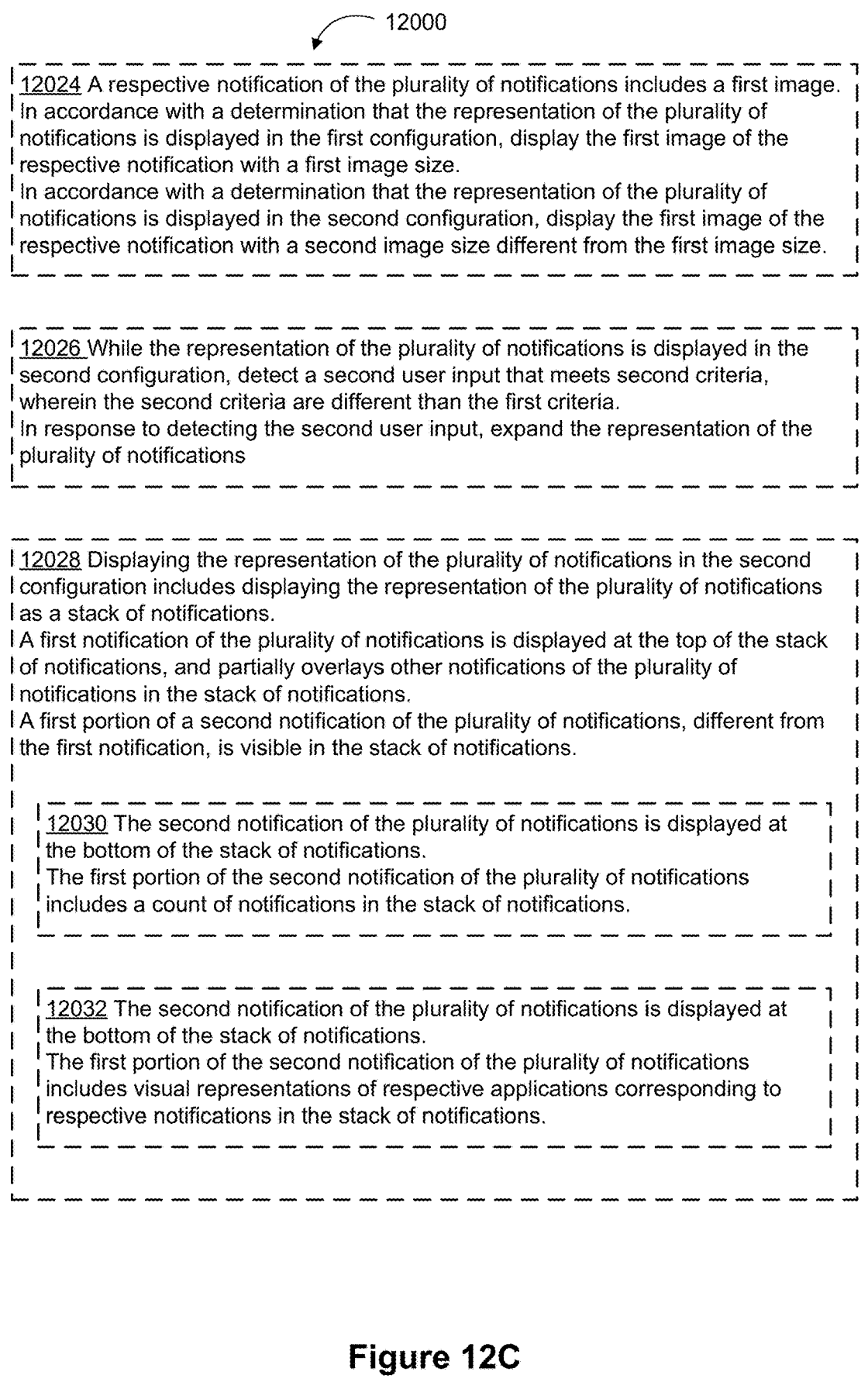

12024 A respective notification of the plurality of notifications includes a first image.
In accordance with a determination that the representation of the plurality of notifications is displayed in the first configuration, display the first image of the respective notification with a first image size.
In accordance with a determination that the representation of the plurality of notifications is displayed in the second configuration, display the first image of the respective notification with a second image size different from the first image size.

12026 While the representation of the plurality of notifications is displayed in the second configuration, detect a second user input that meets second criteria, wherein the second criteria are different than the first criteria.
In response to detecting the second user input, expand the representation of the plurality of notifications 12028 Displaying the representation of the plurality of notifications in the second configuration includes displaying the representation of the plurality of notifications as a stack of notifications.
A first notification of the plurality of notifications is displayed at the top of the stack of notifications, and partially overlays other notifications of the plurality of notifications in the stack of notifications.
A first portion of a second notification of the plurality of notifications, different from the first notification, is visible in the stack of notifications.

12030 The second notification of the plurality of notifications is displayed at the bottom of the stack of notifications.
The first portion of the second notification of the plurality of notifications includes a count of notifications in the stack of notifications.

12032 The second notification of the plurality of notifications is displayed at the bottom of the stack of notifications.
The first portion of the second notification of the plurality of notifications includes visual representations of respective applications corresponding to respective notifications in the stack of notifications.

Figure 12D:
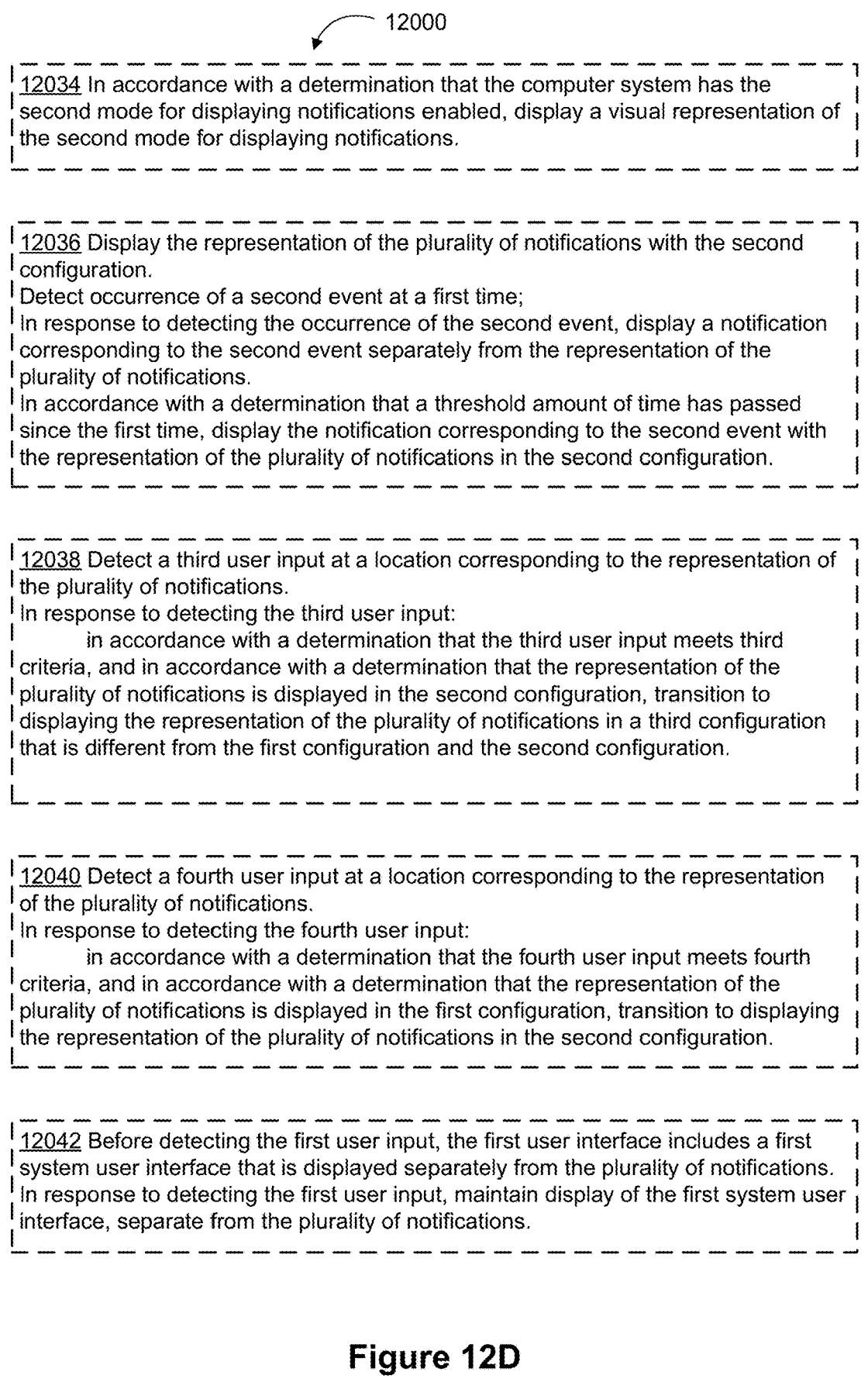

12034 In accordance with a determination that the computer system has the second mode for displaying notifications enabled, display a visual representation of the second mode for displaying notifications.

12036 Display the representation of the plurality of notifications with the second configuration.
Detect occurrence of a second event at a first time;
In response to detecting the occurrence of the second event, display a notification corresponding to the second event separately from the representation of the plurality of notifications.
In accordance with a determination that a threshold amount of time has passed since the first time, display the notification corresponding to the second event with the representation of the plurality of notifications in the second configuration.

12038 Detect a third user input at a location corresponding to the representation of the plurality of notifications.
In response to detecting the third user input:
in accordance with a determination that the third user input meets third criteria, and in accordance with a determination that the representation of the plurality of notifications is displayed in the second configuration, transition to displaying the representation of the plurality of notifications in a third configuration that is different from the first configuration and the second configuration.

12040 Detect a fourth user input at a location corresponding to the representation of the plurality of notifications.
In response to detecting the fourth user input:
in accordance with a determination that the fourth user input meets fourth criteria, and in accordance with a determination that the representation of the plurality of notifications is displayed in the first configuration, transition to displaying the representation of the plurality of notifications in the second configuration.

12042 Before detecting the first user input, the first user interface includes a first system user interface that is displayed separately from the plurality of notifications.
In response to detecting the first user input, maintain display of the first system user interface, separate from the plurality of notifications.

Figure 12E:
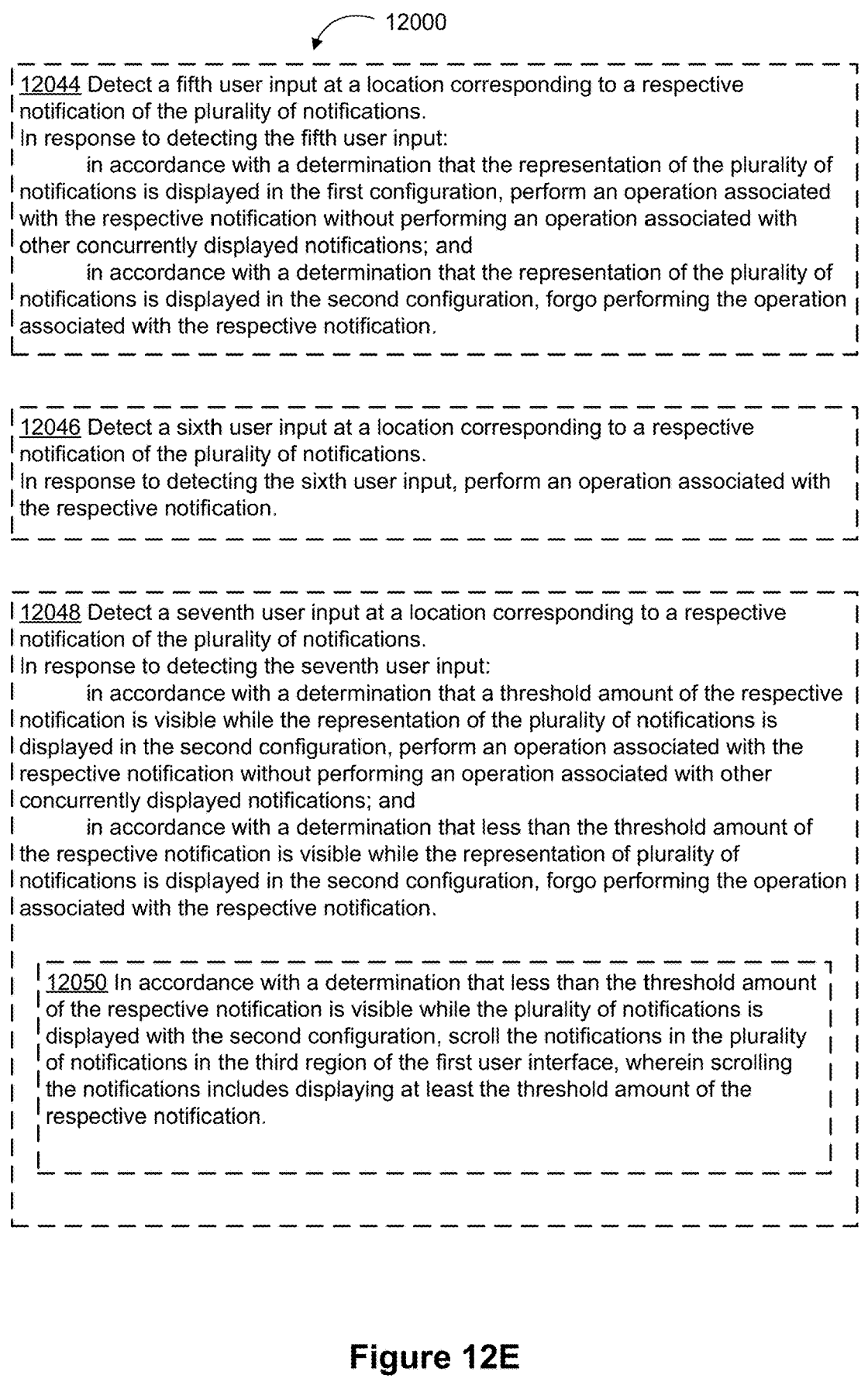

12044 Detect a fifth user input at a location corresponding to a respective notification of the plurality of notifications.
In response to detecting the fifth user input:
in accordance with a determination that the representation of the plurality of notifications is displayed in the first configuration, perform an operation associated with the respective notification without performing an operation associated with other concurrently displayed notifications; and
in accordance with a determination that the representation of the plurality of notifications is displayed in the second configuration, forgo performing the operation associated with the respective notification.

12046 Detect a sixth user input at a location corresponding to a respective notification of the plurality of notifications.
In response to detecting the sixth user input, perform an operation associated with the respective notification.

12048 Detect a seventh user input at a location corresponding to a respective notification of the plurality of notifications.
In response to detecting the seventh user input:
in accordance with a determination that a threshold amount of the respective notification is visible while the representation of the plurality of notifications is displayed in the second configuration, perform an operation associated with the respective notification without performing an operation associated with other concurrently displayed notifications; and
in accordance with a determination that less than the threshold amount of the respective notification is visible while the representation of plurality of notifications is displayed in the second configuration, forgo performing the operation associated with the respective notification.

12050 In accordance with a determination that less than the threshold amount of the respective notification is visible while the plurality of notifications is displayed with the second configuration, scroll the notifications in the plurality of notifications in the third region of the first user interface, wherein scrolling the notifications includes displaying at least the threshold amount of the respective notification.

Figure 13A:
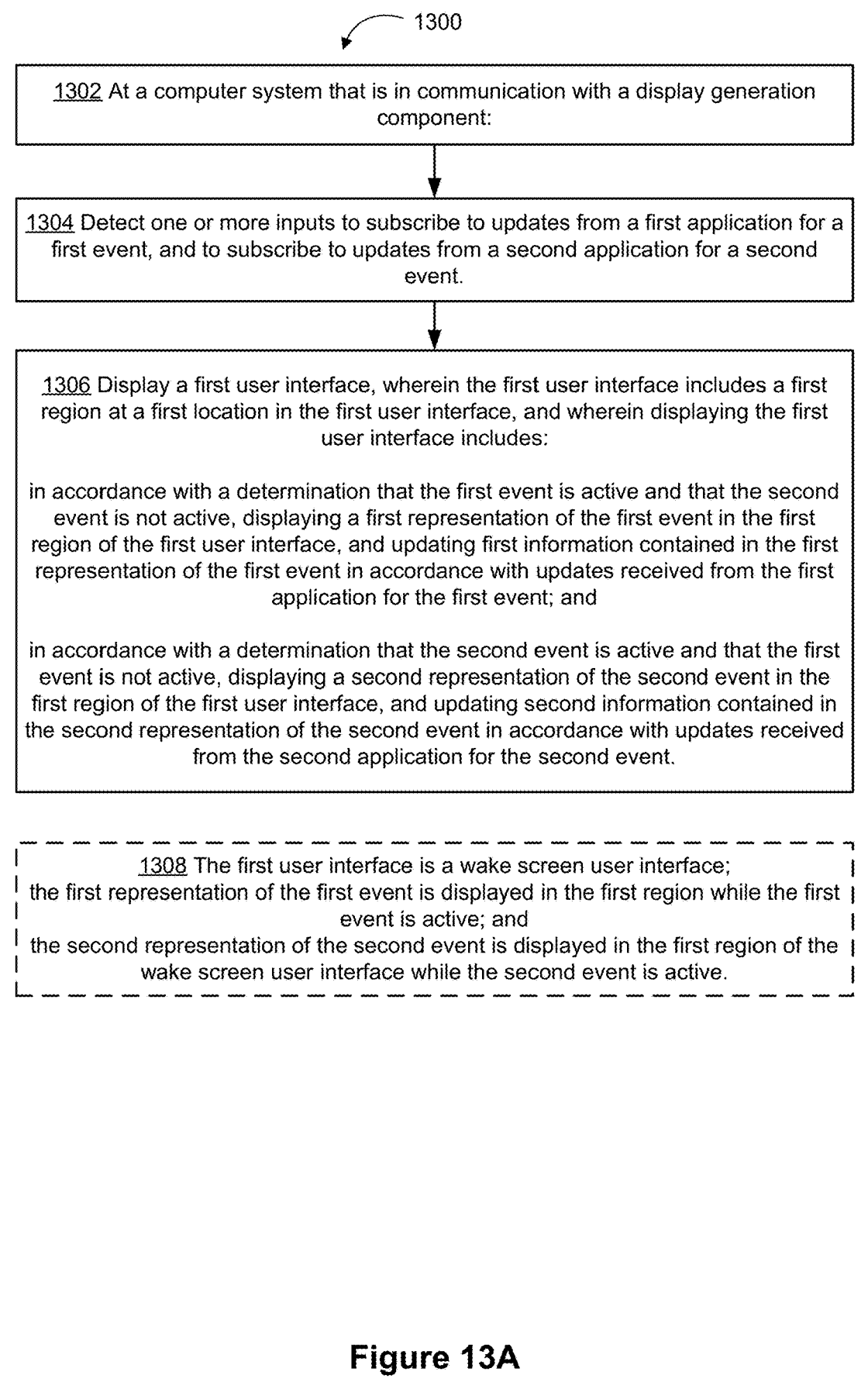

1302 At a computer system that is in communication with a display generation component:

↓

1304 Detect one or more inputs to subscribe to updates from a first application for a first event, and to subscribe to updates from a second application for a second event.

↓

1306 Display a first user interface, wherein the first user interface includes a first region at a first location in the first user interface, and wherein displaying the first user interface includes:

in accordance with a determination that the first event is active and that the second event is not active, displaying a first representation of the first event in the first region of the first user interface, and updating first information contained in the first representation of the first event in accordance with updates received from the first application for the first event; and in accordance with a determination that the second event is active and that the first event is not active, displaying a second representation of the second event in the first region of the first user interface, and updating second information contained in the second representation of the second event in accordance with updates received from the second application for the second event.

1308 The first user interface is a wake screen user interface;
the first representation of the first event is displayed in the first region while the first event is active; and
the second representation of the second event is displayed in the first region of the wake screen user interface while the second event is active.

Figure 13B:
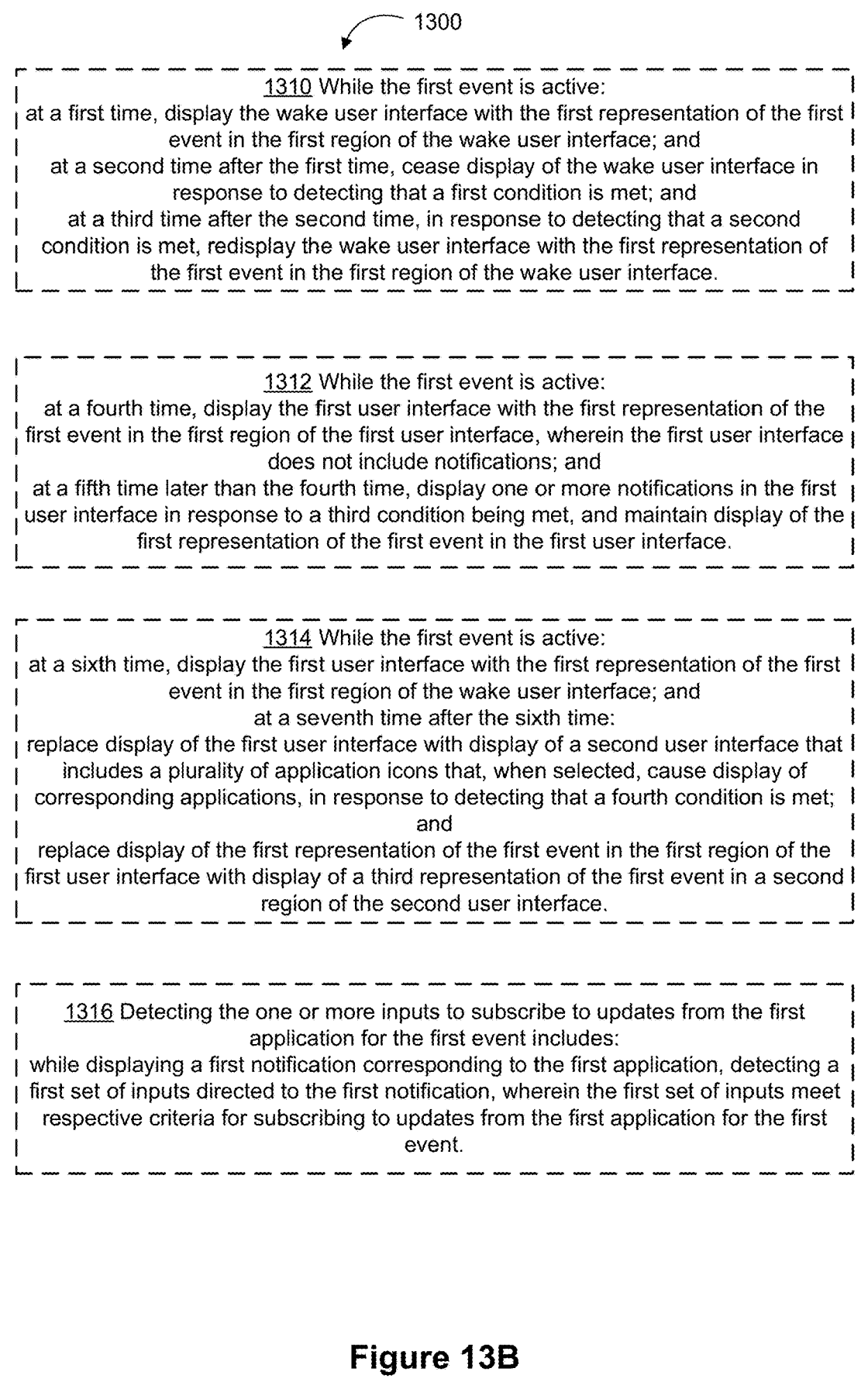

1310 While the first event is active:
at a first time, display the wake user interface with the first representation of the first event in the first region of the wake user interface; and
at a second time after the first time, cease display of the wake user interface in response to detecting that a first condition is met; and
at a third time after the second time, in response to detecting that a second condition is met, redisplay the wake user interface with the first representation of the first event in the first region of the wake user interface.

1312 While the first event is active:
at a fourth time, display the first user interface with the first representation of the first event in the first region of the first user interface, wherein the first user interface does not include notifications; and
at a fifth time later than the fourth time, display one or more notifications in the first user interface in response to a third condition being met, and maintain display of the first representation of the first event in the first user interface.

1314 While the first event is active:
at a sixth time, display the first user interface with the first representation of the first event in the first region of the wake user interface; and
at a seventh time after the sixth time:
replace display of the first user interface with display of a second user interface that includes a plurality of application icons that, when selected, cause display of corresponding applications, in response to detecting that a fourth condition is met; and
replace display of the first representation of the first event in the first region of the first user interface with display of a third representation of the first event in a second region of the second user interface.

1316 Detecting the one or more inputs to subscribe to updates from the first application for the first event includes:
while displaying a first notification corresponding to the first application, detecting a first set of inputs directed to the first notification, wherein the first set of inputs meet respective criteria for subscribing to updates from the first application for the first event.

Figure 13C:
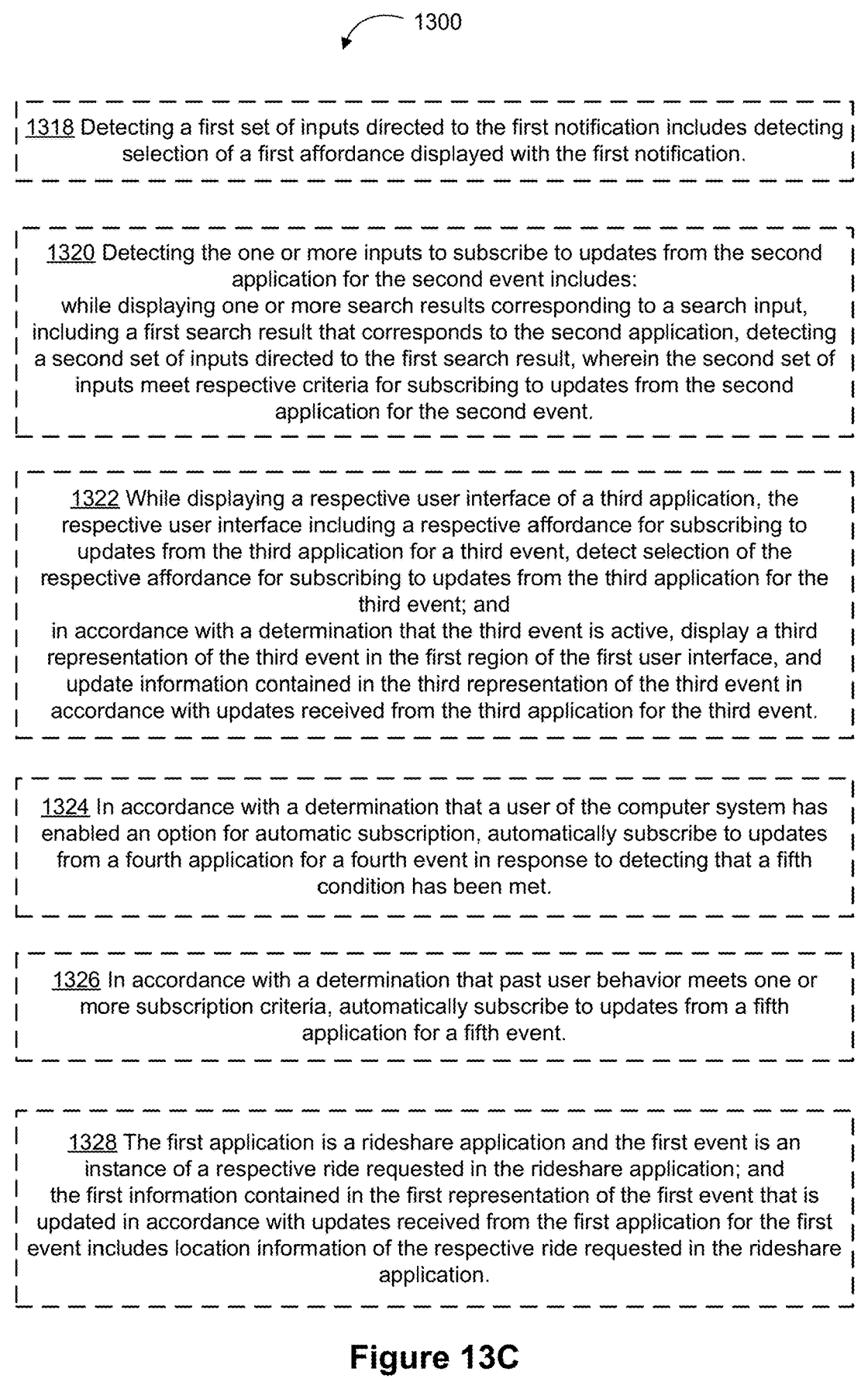

1318 Detecting a first set of inputs directed to the first notification includes detecting selection of a first affordance displayed with the first notification.

1320 Detecting the one or more inputs to subscribe to updates from the second application for the second event includes:
while displaying one or more search results corresponding to a search input, including a first search result that corresponds to the second application, detecting a second set of inputs directed to the first search result, wherein the second set of inputs meet respective criteria for subscribing to updates from the second application for the second event.

1322 While displaying a respective user interface of a third application, the respective user interface including a respective affordance for subscribing to updates from the third application for a third event, detect selection of the respective affordance for subscribing to updates from the third application for the third event; and
in accordance with a determination that the third event is active, display a third representation of the third event in the first region of the first user interface, and update information contained in the third representation of the third event in accordance with updates received from the third application for the third event.

1324 In accordance with a determination that a user of the computer system has enabled an option for automatic subscription, automatically subscribe to updates from a fourth application for a fourth event in response to detecting that a fifth condition has been met.

1326 In accordance with a determination that past user behavior meets one or more subscription criteria, automatically subscribe to updates from a fifth application for a fifth event.

1328 The first application is a rideshare application and the first event is an instance of a respective ride requested in the rideshare application; and
the first information contained in the first representation of the first event that is updated in accordance with updates received from the first application for the first event includes location information of the respective ride requested in the rideshare application.

Figure 13D:
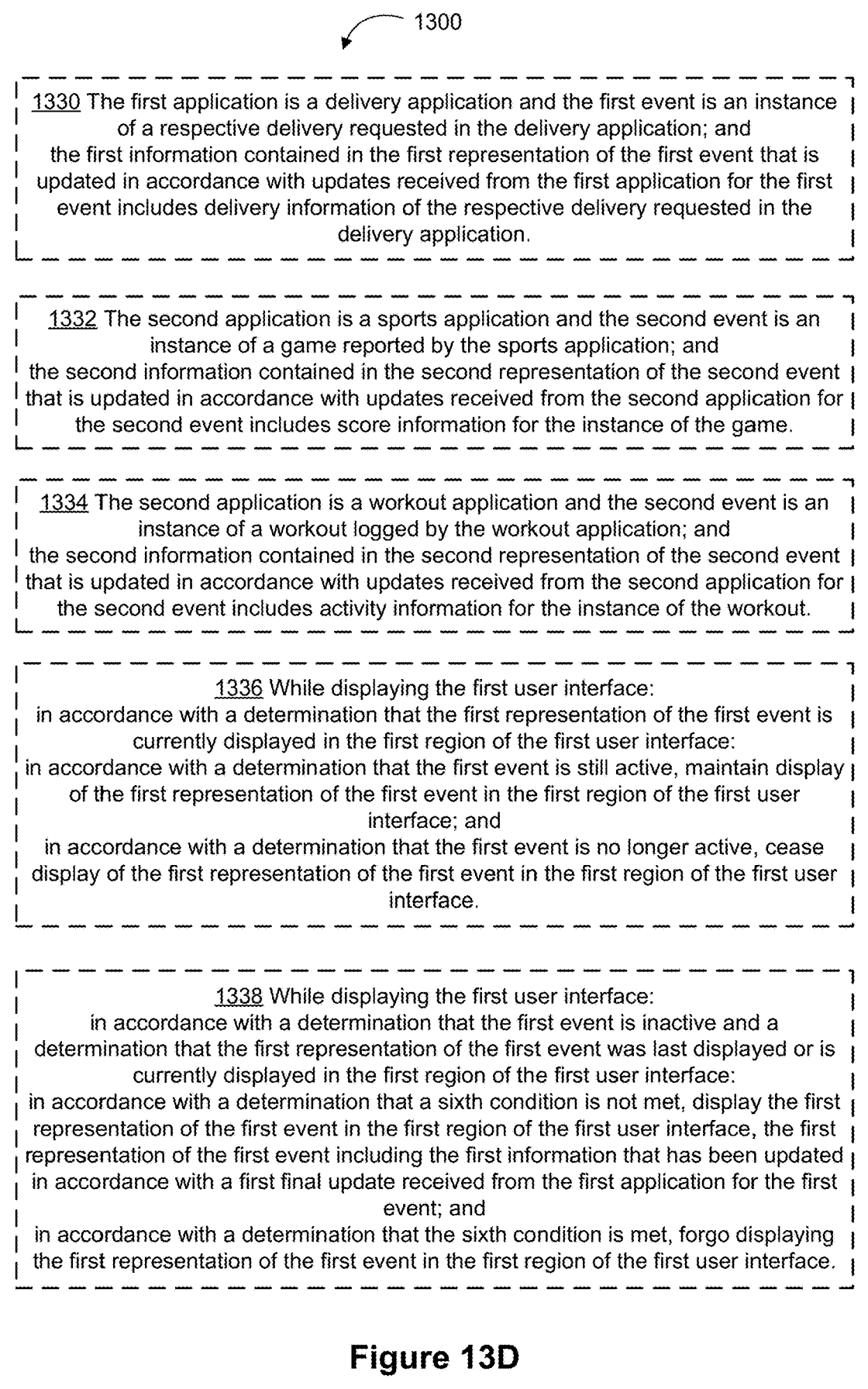

1330 The first application is a delivery application and the first event is an instance of a respective delivery requested in the delivery application; and
the first information contained in the first representation of the first event that is updated in accordance with updates received from the first application for the first event includes delivery information of the respective delivery requested in the delivery application.

1332 The second application is a sports application and the second event is an instance of a game reported by the sports application; and
the second information contained in the second representation of the second event that is updated in accordance with updates received from the second application for the second event includes score information for the instance of the game.

1334 The second application is a workout application and the second event is an instance of a workout logged by the workout application; and
the second information contained in the second representation of the second event that is updated in accordance with updates received from the second application for the second event includes activity information for the instance of the workout.

1336 While displaying the first user interface:
in accordance with a determination that the first representation of the first event is currently displayed in the first region of the first user interface:
in accordance with a determination that the first event is still active, maintain display of the first representation of the first event in the first region of the first user interface; and
in accordance with a determination that the first event is no longer active, cease display of the first representation of the first event in the first region of the first user interface.

1338 While displaying the first user interface:
in accordance with a determination that the first event is inactive and a determination that the first representation of the first event was last displayed or is currently displayed in the first region of the first user interface:
in accordance with a determination that a sixth condition is not met, display the first representation of the first event in the first region of the first user interface, the first representation of the first event including the first information that has been updated in accordance with a first final update received from the first application for the first event; and
in accordance with a determination that the sixth condition is met, forgo displaying the first representation of the first event in the first region of the first user interface.

Figure 13E:
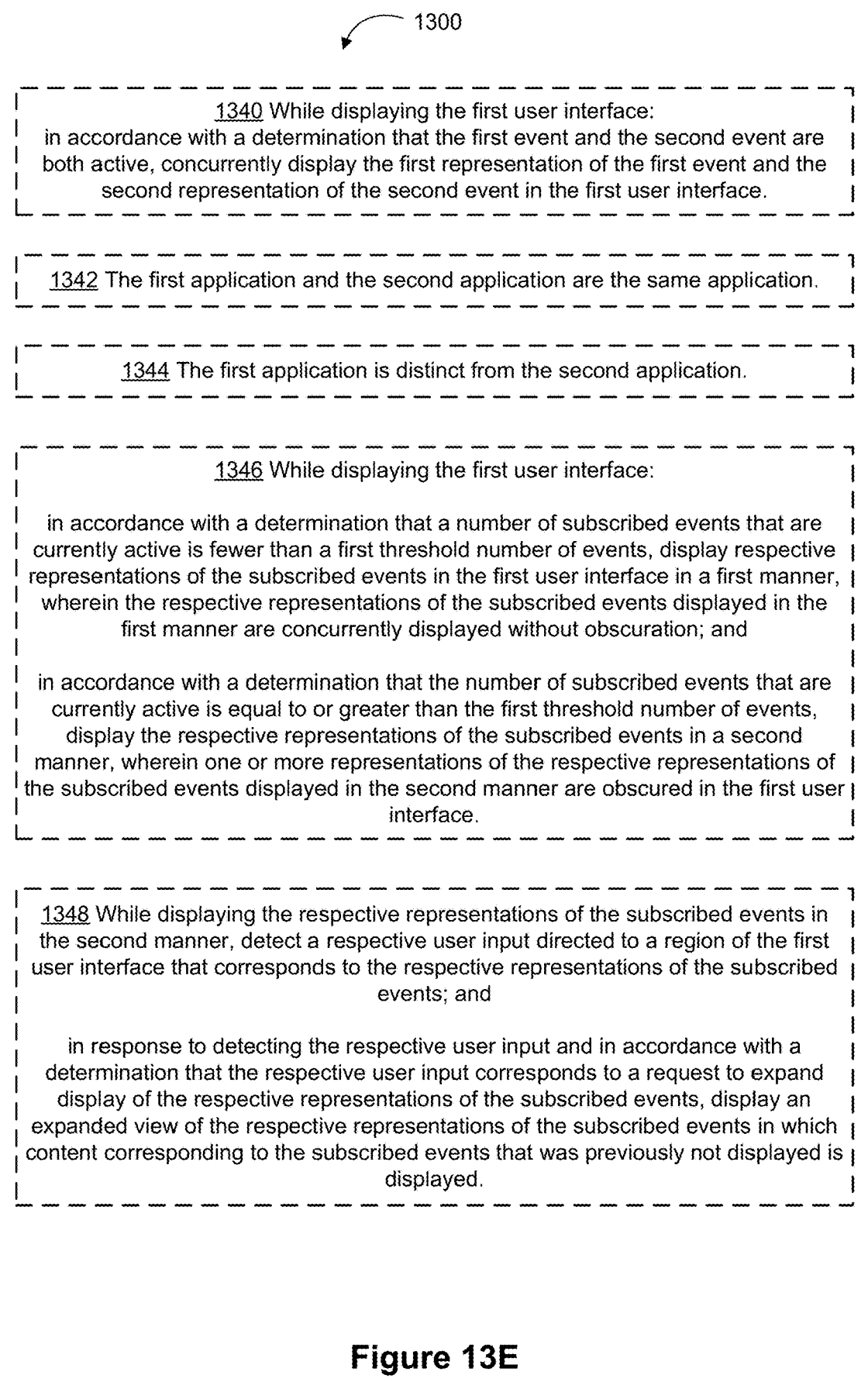

1340 While displaying the first user interface:
in accordance with a determination that the first event and the second event are both active, concurrently display the first representation of the first event and the second representation of the second event in the first user interface.

1342 The first application and the second application are the same application.

1344 The first application is distinct from the second application.

1346 While displaying the first user interface:

in accordance with a determination that a number of subscribed events that are currently active is fewer than a first threshold number of events, display respective representations of the subscribed events in the first user interface in a first manner, wherein the respective representations of the subscribed events displayed in the first manner are concurrently displayed without obscuration; and in accordance with a determination that the number of subscribed events that are currently active is equal to or greater than the first threshold number of events, display the respective representations of the subscribed events in a second manner, wherein one or more representations of the respective representations of the subscribed events displayed in the second manner are obscured in the first user interface.

1348 While displaying the respective representations of the subscribed events in the second manner, detect a respective user input directed to a region of the first user interface that corresponds to the respective representations of the subscribed events; and in response to detecting the respective user input and in accordance with a determination that the respective user input corresponds to a request to expand display of the respective representations of the subscribed events, display an expanded view of the respective representations of the subscribed events in which content corresponding to the subscribed events that was previously not displayed is displayed.

Figure 13F:
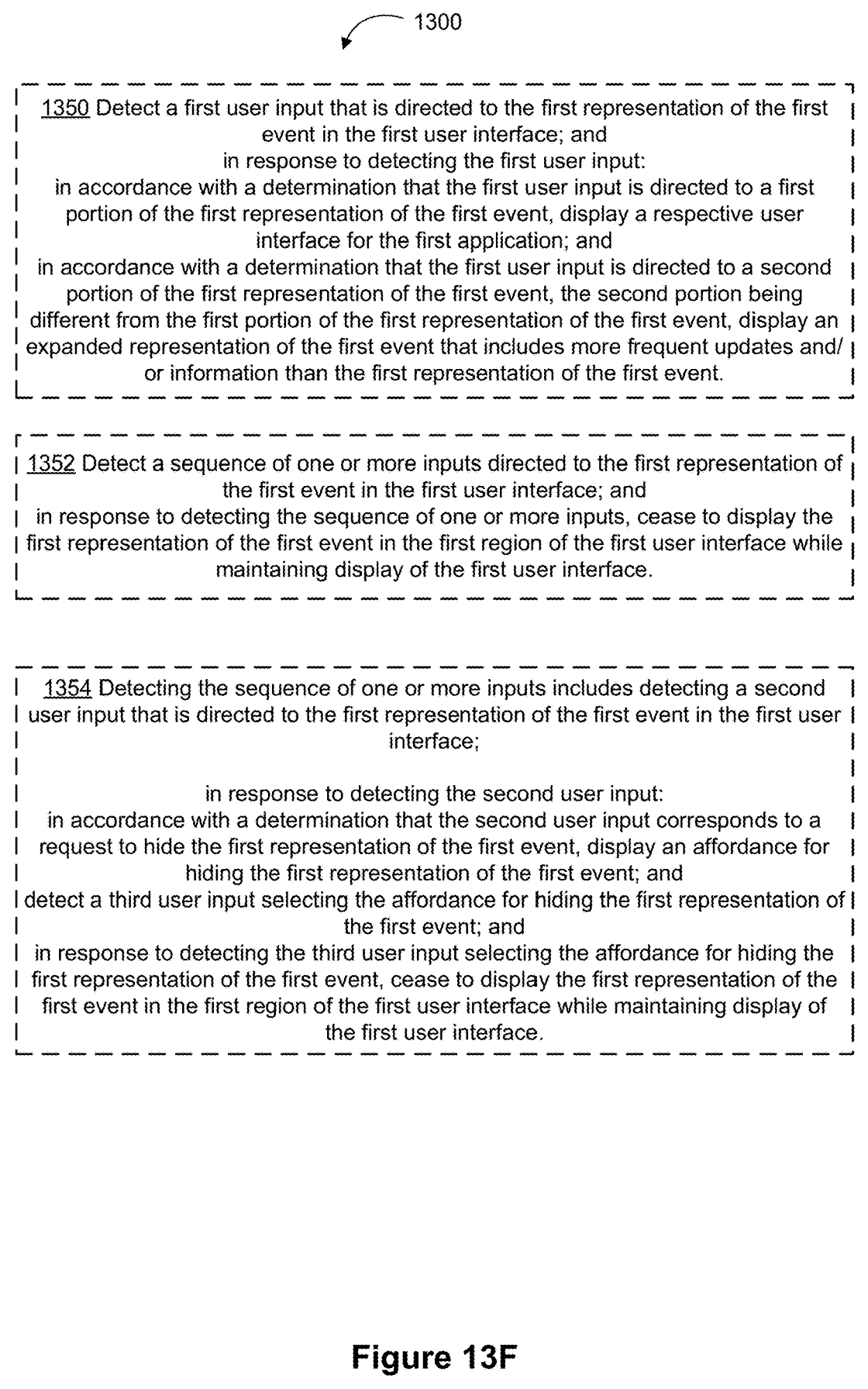

1350 Detect a first user input that is directed to the first representation of the first event in the first user interface; and
in response to detecting the first user input:
in accordance with a determination that the first user input is directed to a first portion of the first representation of the first event, display a respective user interface for the first application; and
in accordance with a determination that the first user input is directed to a second portion of the first representation of the first event, the second portion being different from the first portion of the first representation of the first event, display an expanded representation of the first event that includes more frequent updates and/or information than the first representation of the first event.

1352 Detect a sequence of one or more inputs directed to the first representation of the first event in the first user interface; and
in response to detecting the sequence of one or more inputs, cease to display the first representation of the first event in the first region of the first user interface while maintaining display of the first user interface.

1354 Detecting the sequence of one or more inputs includes detecting a second user input that is directed to the first representation of the first event in the first user interface;

in response to detecting the second user input:
in accordance with a determination that the second user input corresponds to a request to hide the first representation of the first event, display an affordance for hiding the first representation of the first event; and
detect a third user input selecting the affordance for hiding the first representation of the first event; and
in response to detecting the third user input selecting the affordance for hiding the first representation of the first event, cease to display the first representation of the first event in the first region of the first user interface while maintaining display of the first user interface.

Figure 13G:
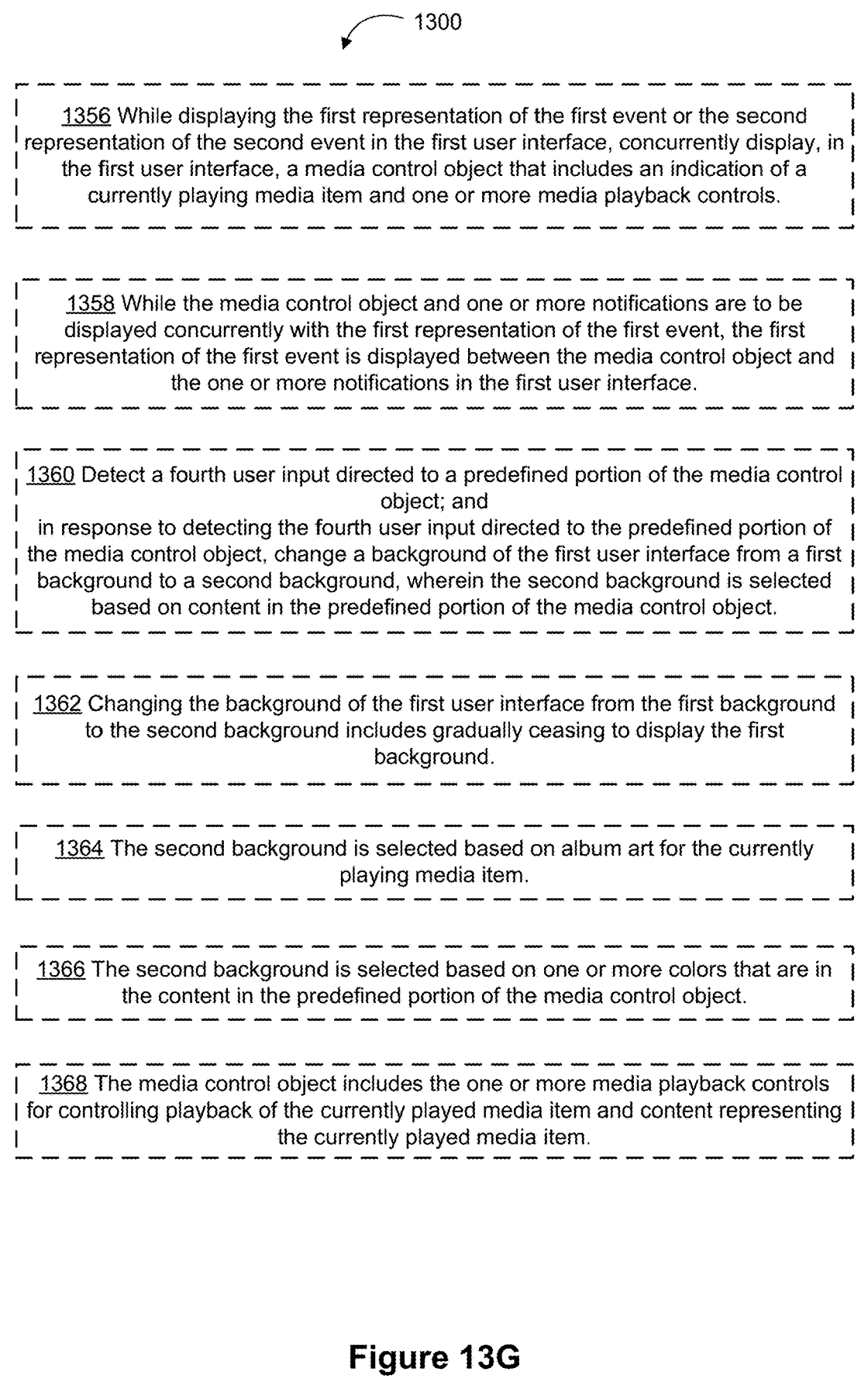

1356 While displaying the first representation of the first event or the second representation of the second event in the first user interface, concurrently display, in the first user interface, a media control object that includes an indication of a currently playing media item and one or more media playback controls.

1358 While the media control object and one or more notifications are to be displayed concurrently with the first representation of the first event, the first representation of the first event is displayed between the media control object and the one or more notifications in the first user interface.

1360 Detect a fourth user input directed to a predefined portion of the media control object; and
in response to detecting the fourth user input directed to the predefined portion of the media control object, change a background of the first user interface from a first background to a second background, wherein the second background is selected based on content in the predefined portion of the media control object.

1362 Changing the background of the first user interface from the first background to the second background includes gradually ceasing to display the first background.

1364 The second background is selected based on album art for the currently playing media item.

1366 The second background is selected based on one or more colors that are in the content in the predefined portion of the media control object.

1368 The media control object includes the one or more media playback controls for controlling playback of the currently played media item and content representing the currently played media item.

Figure 14A:
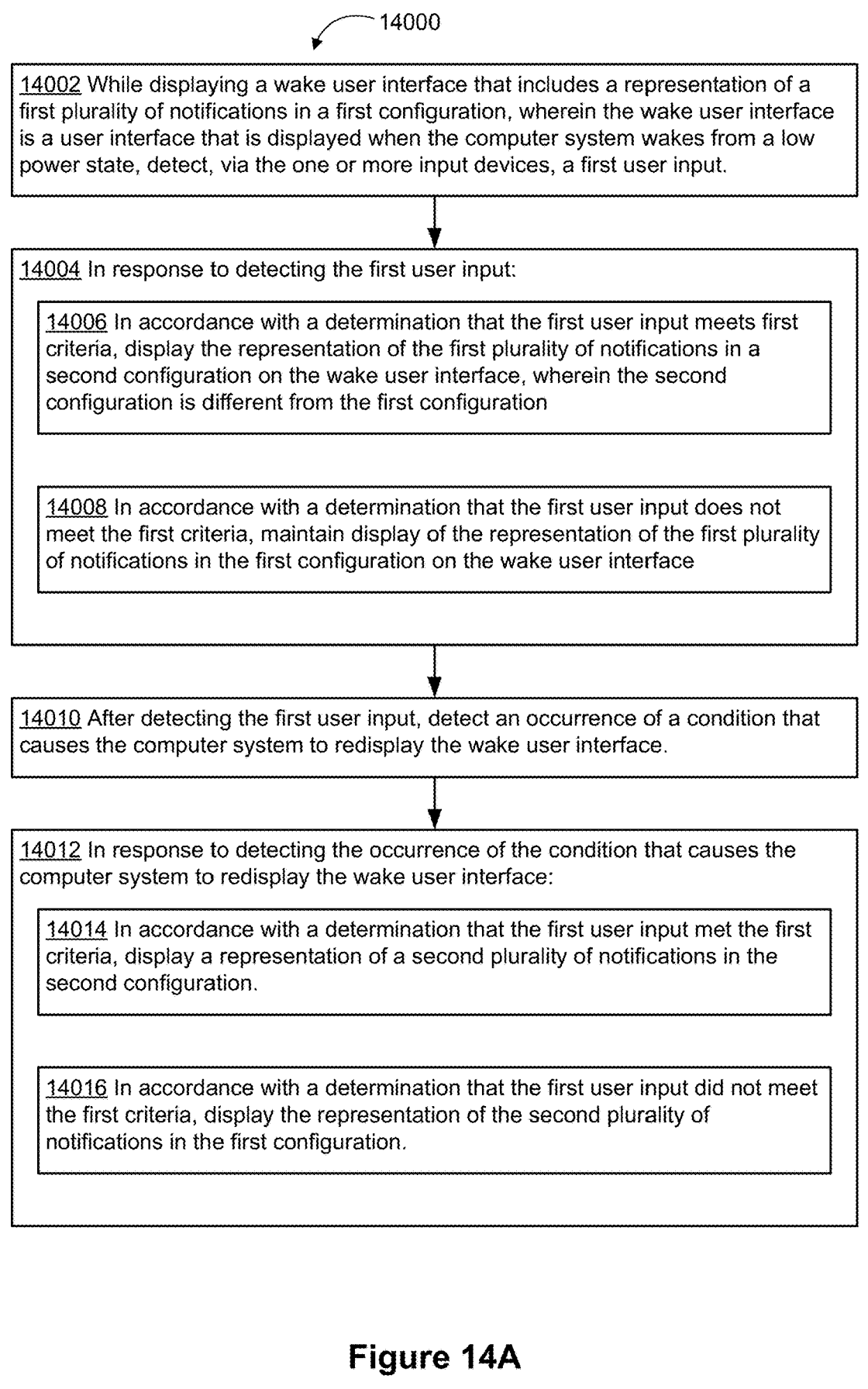

14002 While displaying a wake user interface that includes a representation of a first plurality of notifications in a first configuration, wherein the wake user interface is a user interface that is displayed when the computer system wakes from a low power state, detect, via the one or more input devices, a first user input.

14004 In response to detecting the first user input:

14006 In accordance with a determination that the first user input meets first criteria, display the representation of the first plurality of notifications in a second configuration on the wake user interface, wherein the second configuration is different from the first configuration 14008 In accordance with a determination that the first user input does not meet the first criteria, maintain display of the representation of the first plurality of notifications in the first configuration on the wake user interface 14010 After detecting the first user input, detect an occurrence of a condition that causes the computer system to redisplay the wake user interface.

14012 In response to detecting the occurrence of the condition that causes the computer system to redisplay the wake user interface:

14014 In accordance with a determination that the first user input met the first criteria, display a representation of a second plurality of notifications in the second configuration.

14016 In accordance with a determination that the first user input did not meet the first criteria, display the representation of the second plurality of notifications in the first configuration.

Figure 14B:
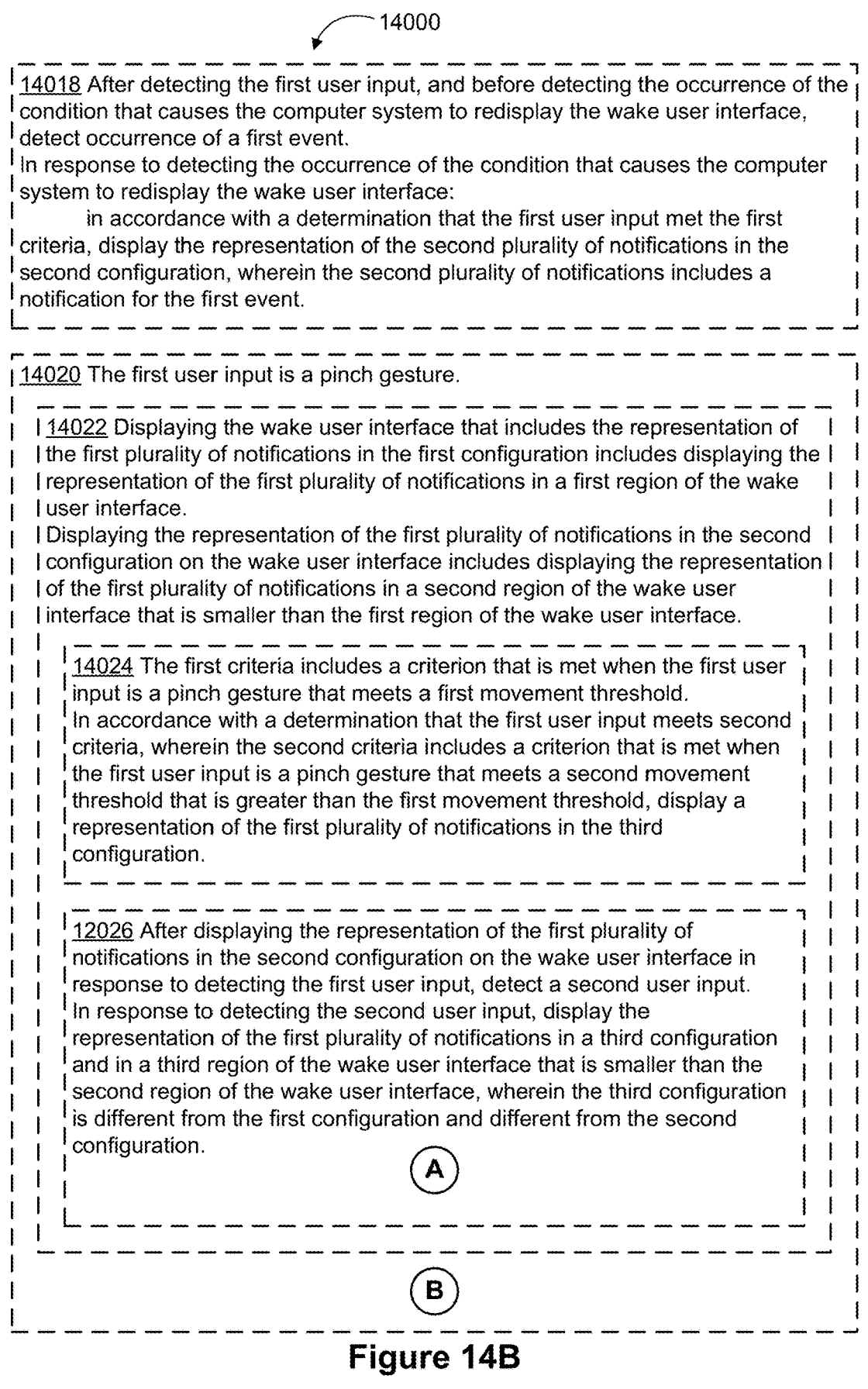

14018 After detecting the first user input, and before detecting the occurrence of the condition that causes the computer system to redisplay the wake user interface, detect occurrence of a first event.
In response to detecting the occurrence of the condition that causes the computer system to redisplay the wake user interface:
in accordance with a determination that the first user input met the first criteria, display the representation of the second plurality of notifications in the second configuration, wherein the second plurality of notifications includes a notification for the first event.

14020 The first user input is a pinch gesture.

14022 Displaying the wake user interface that includes the representation of the first plurality of notifications in the first configuration includes displaying the representation of the first plurality of notifications in a first region of the wake user interface.
Displaying the representation of the first plurality of notifications in the second configuration on the wake user interface includes displaying the representation of the first plurality of notifications in a second region of the wake user interface that is smaller than the first region of the wake user interface.

14024 The first criteria includes a criterion that is met when the first user input is a pinch gesture that meets a first movement threshold.
In accordance with a determination that the first user input meets second criteria, wherein the second criteria includes a criterion that is met when the first user input is a pinch gesture that meets a second movement threshold that is greater than the first movement threshold, display a representation of the first plurality of notifications in the third configuration.

12026 After displaying the representation of the first plurality of notifications in the second configuration on the wake user interface in response to detecting the first user input, detect a second user input.
In response to detecting the second user input, display the representation of the first plurality of notifications in a third configuration and in a third region of the wake user interface that is smaller than the second region of the wake user interface, wherein the third configuration is different from the first configuration and different from the second configuration.

Figure 14C:
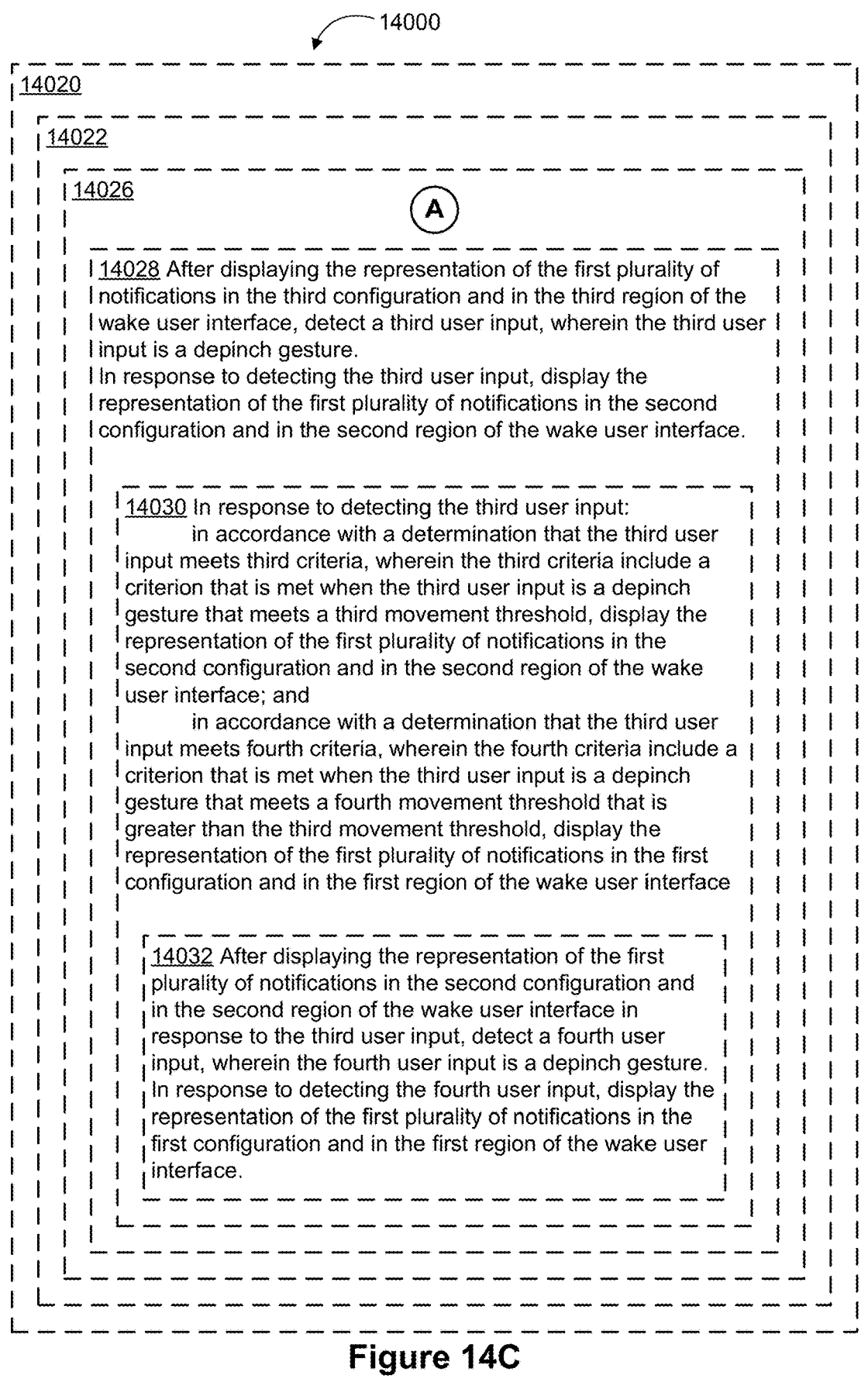

14028 After displaying the representation of the first plurality of notifications in the third configuration and in the third region of the wake user interface, detect a third user input, wherein the third user input is a depinch gesture.
In response to detecting the third user input, display the representation of the first plurality of notifications in the second configuration and in the second region of the wake user interface.

14030 In response to detecting the third user input:
in accordance with a determination that the third user input meets third criteria, wherein the third criteria include a criterion that is met when the third user input is a depinch gesture that meets a third movement threshold, display the representation of the first plurality of notifications in the second configuration and in the second region of the wake user interface; and
in accordance with a determination that the third user input meets fourth criteria, wherein the fourth criteria include a criterion that is met when the third user input is a depinch gesture that meets a fourth movement threshold that is greater than the third movement threshold, display the representation of the first plurality of notifications in the first configuration and in the first region of the wake user interface 14032 After displaying the representation of the first plurality of notifications in the second configuration and in the second region of the wake user interface in response to the third user input, detect a fourth user input, wherein the fourth user input is a depinch gesture.
In response to detecting the fourth user input, display the representation of the first plurality of notifications in the first configuration and in the first region of the wake user interface.

Figure 14D:
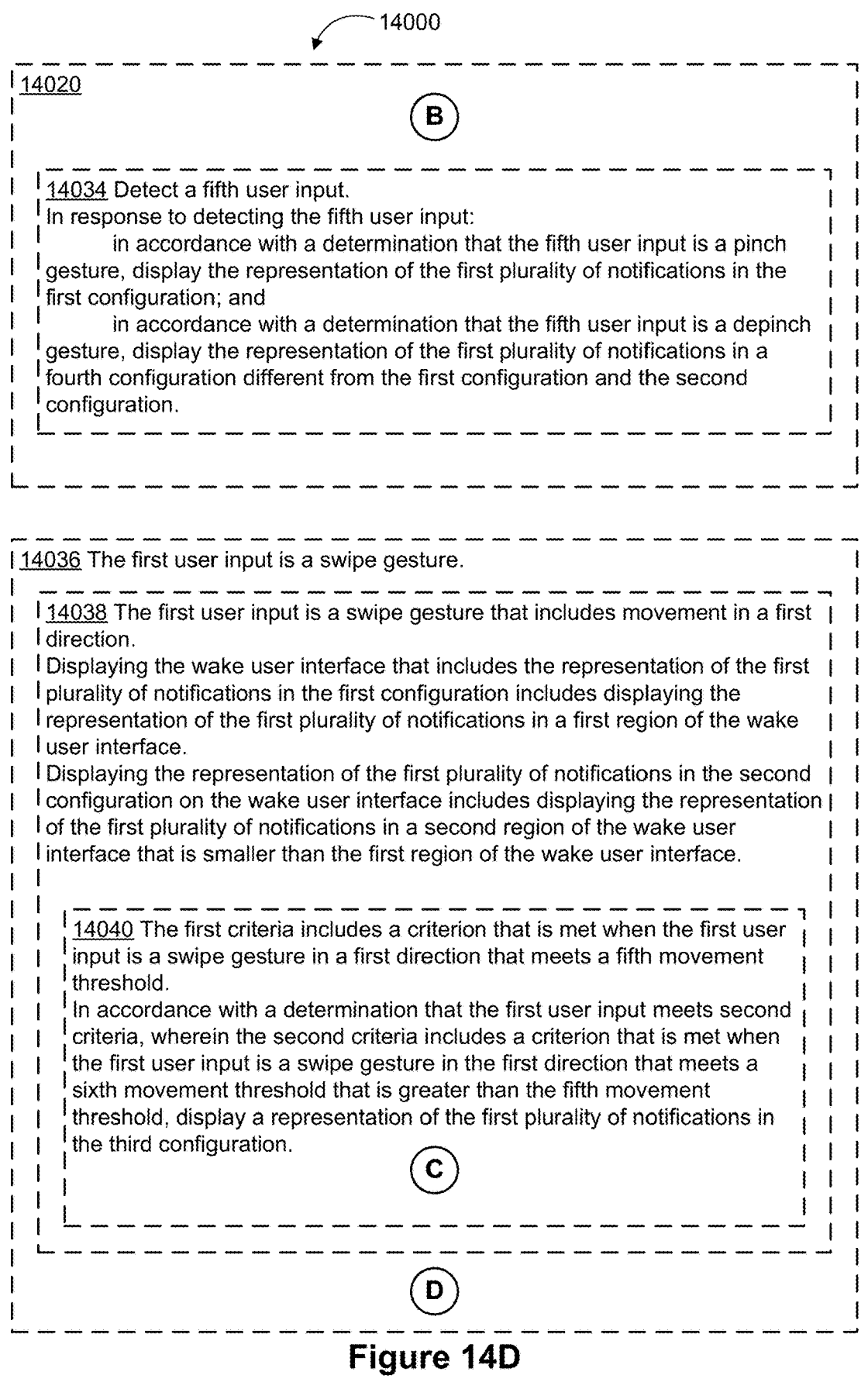

14034 Detect a fifth user input.
In response to detecting the fifth user input:
in accordance with a determination that the fifth user input is a pinch gesture, display the representation of the first plurality of notifications in the first configuration; and
in accordance with a determination that the fifth user input is a depinch gesture, display the representation of the first plurality of notifications in a fourth configuration different from the first configuration and the second configuration.

14036 The first user input is a swipe gesture.

14038 The first user input is a swipe gesture that includes movement in a first direction.
Displaying the wake user interface that includes the representation of the first plurality of notifications in the first configuration includes displaying the representation of the first plurality of notifications in a first region of the wake user interface.
Displaying the representation of the first plurality of notifications in the second configuration on the wake user interface includes displaying the representation of the first plurality of notifications in a second region of the wake user interface that is smaller than the first region of the wake user interface.

14040 The first criteria includes a criterion that is met when the first user input is a swipe gesture in a first direction that meets a fifth movement threshold.
In accordance with a determination that the first user input meets second criteria, wherein the second criteria includes a criterion that is met when the first user input is a swipe gesture in the first direction that meets a sixth movement threshold that is greater than the fifth movement threshold, display a representation of the first plurality of notifications in the third configuration.

Figure 14E:
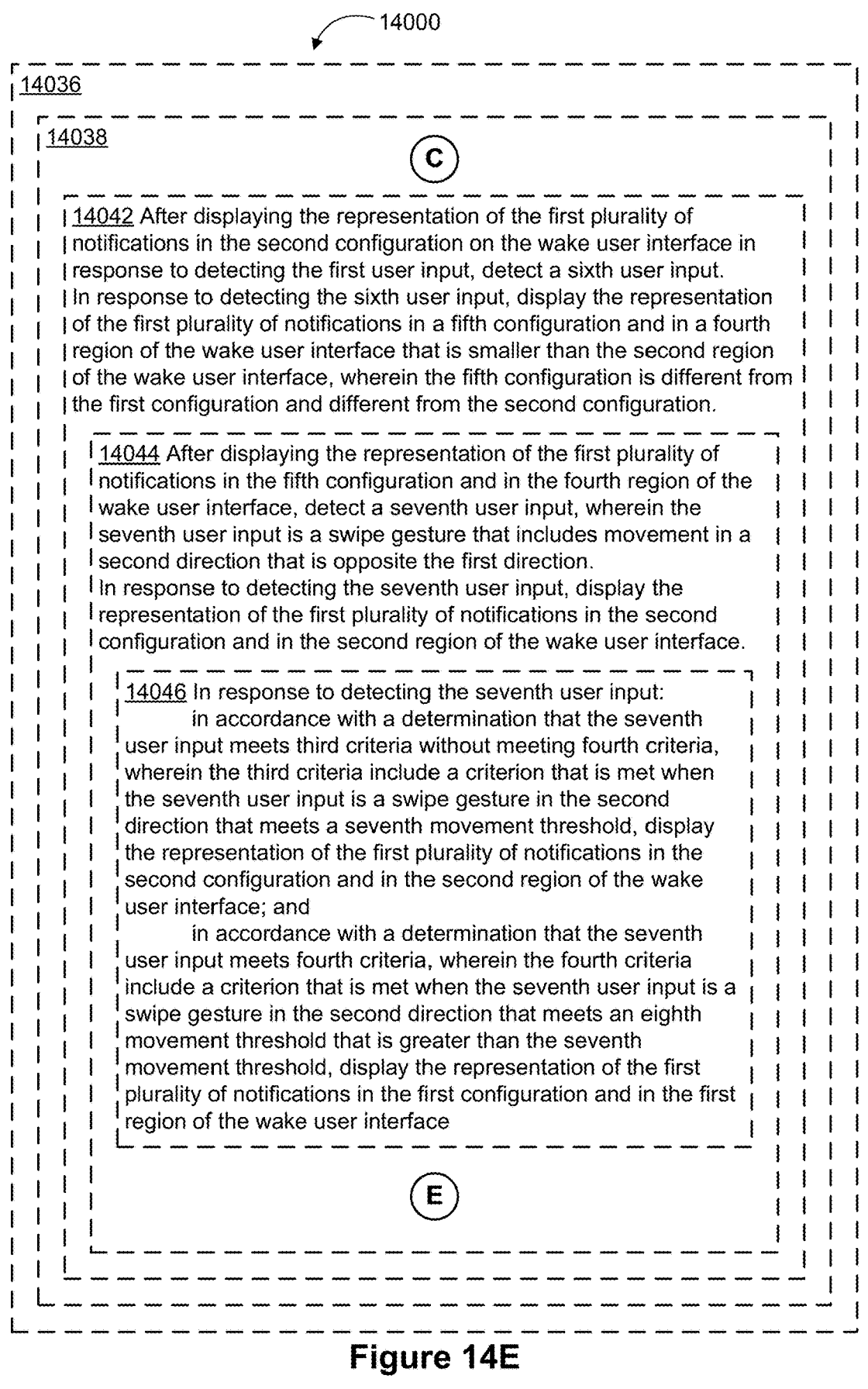

14042 After displaying the representation of the first plurality of notifications in the second configuration on the wake user interface in response to detecting the first user input, detect a sixth user input.
In response to detecting the sixth user input, display the representation of the first plurality of notifications in a fifth configuration and in a fourth region of the wake user interface that is smaller than the second region of the wake user interface, wherein the fifth configuration is different from the first configuration and different from the second configuration.

14044 After displaying the representation of the first plurality of notifications in the fifth configuration and in the fourth region of the wake user interface, detect a seventh user input, wherein the seventh user input is a swipe gesture that includes movement in a second direction that is opposite the first direction.
In response to detecting the seventh user input, display the representation of the first plurality of notifications in the second configuration and in the second region of the wake user interface.

14046 In response to detecting the seventh user input:

in accordance with a determination that the seventh user input meets third criteria without meeting fourth criteria, wherein the third criteria include a criterion that is met when the seventh user input is a swipe gesture in the second direction that meets a seventh movement threshold, display the representation of the first plurality of notifications in the second configuration and in the second region of the wake user interface; and in accordance with a determination that the seventh user input meets fourth criteria, wherein the fourth criteria include a criterion that is met when the seventh user input is a swipe gesture in the second direction that meets an eighth movement threshold that is greater than the seventh movement threshold, display the representation of the first plurality of notifications in the first configuration and in the first region of the wake user interface (E)

Figure 14F:
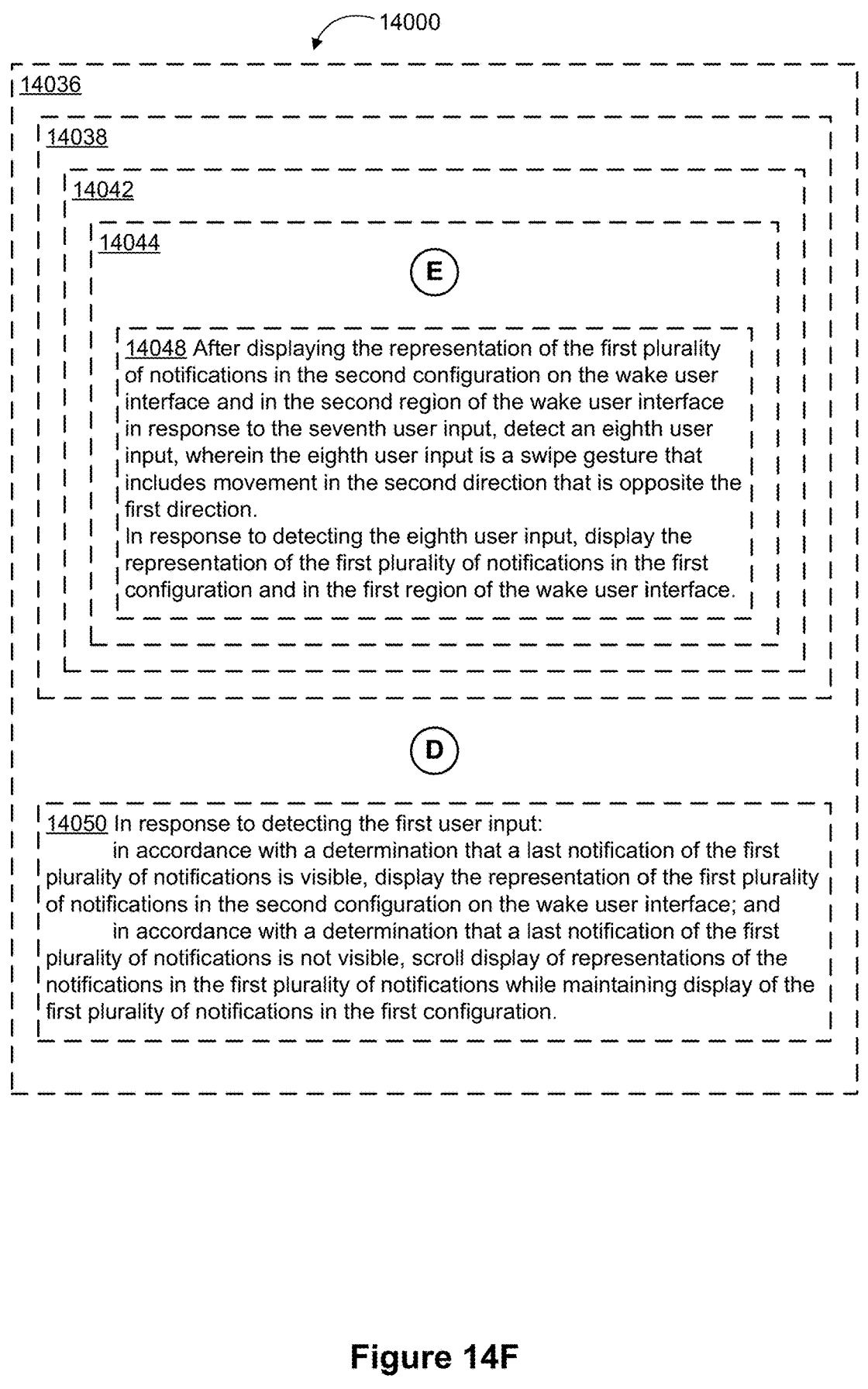

14048 After displaying the representation of the first plurality of notifications in the second configuration on the wake user interface and in the second region of the wake user interface in response to the seventh user input, detect an eighth user input, wherein the eighth user input is a swipe gesture that includes movement in the second direction that is opposite the first direction.

In response to detecting the eighth user input, display the representation of the first plurality of notifications in the first configuration and in the first region of the wake user interface.

(D)

14050 In response to detecting the first user input:

in accordance with a determination that a last notification of the first plurality of notifications is visible, display the representation of the first plurality of notifications in the second configuration on the wake user interface; and in accordance with a determination that a last notification of the first plurality of notifications is not visible, scroll display of representations of the notifications in the first plurality of notifications while maintaining display of the first plurality of notifications in the first configuration.

Figure 14G:
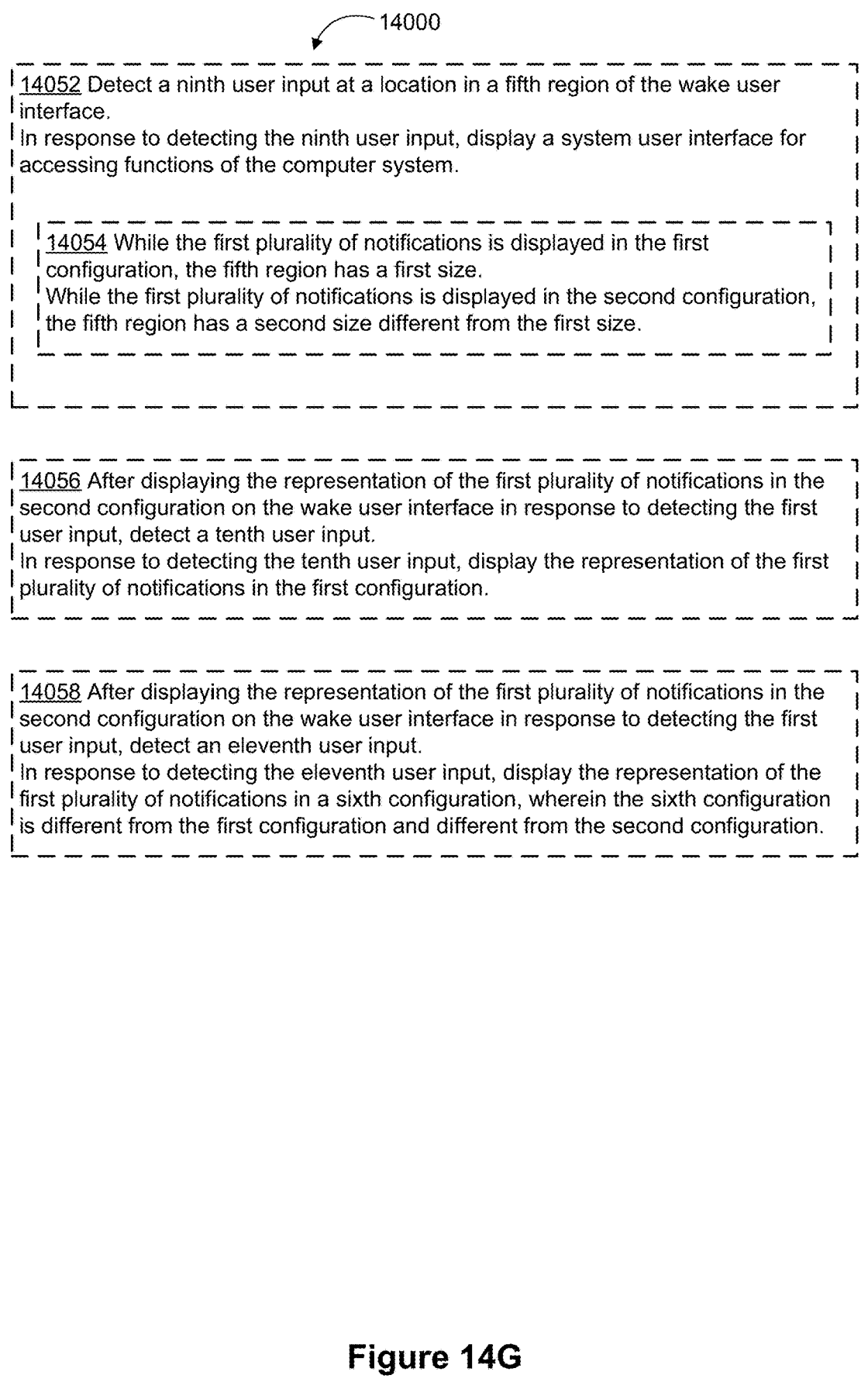

14052 Detect a ninth user input at a location in a fifth region of the wake user interface.
In response to detecting the ninth user input, display a system user interface for accessing functions of the computer system.

14054 While the first plurality of notifications is displayed in the first configuration, the fifth region has a first size.
While the first plurality of notifications is displayed in the second configuration, the fifth region has a second size different from the first size.

14056 After displaying the representation of the first plurality of notifications in the second configuration on the wake user interface in response to detecting the first user input, detect a tenth user input.
In response to detecting the tenth user input, display the representation of the first plurality of notifications in the first configuration.

14058 After displaying the representation of the first plurality of notifications in the second configuration on the wake user interface in response to detecting the first user input, detect an eleventh user input.
In response to detecting the eleventh user input, display the representation of the first plurality of notifications in a sixth configuration, wherein the sixth configuration is different from the first configuration and different from the second configuration.

Figure 15A:
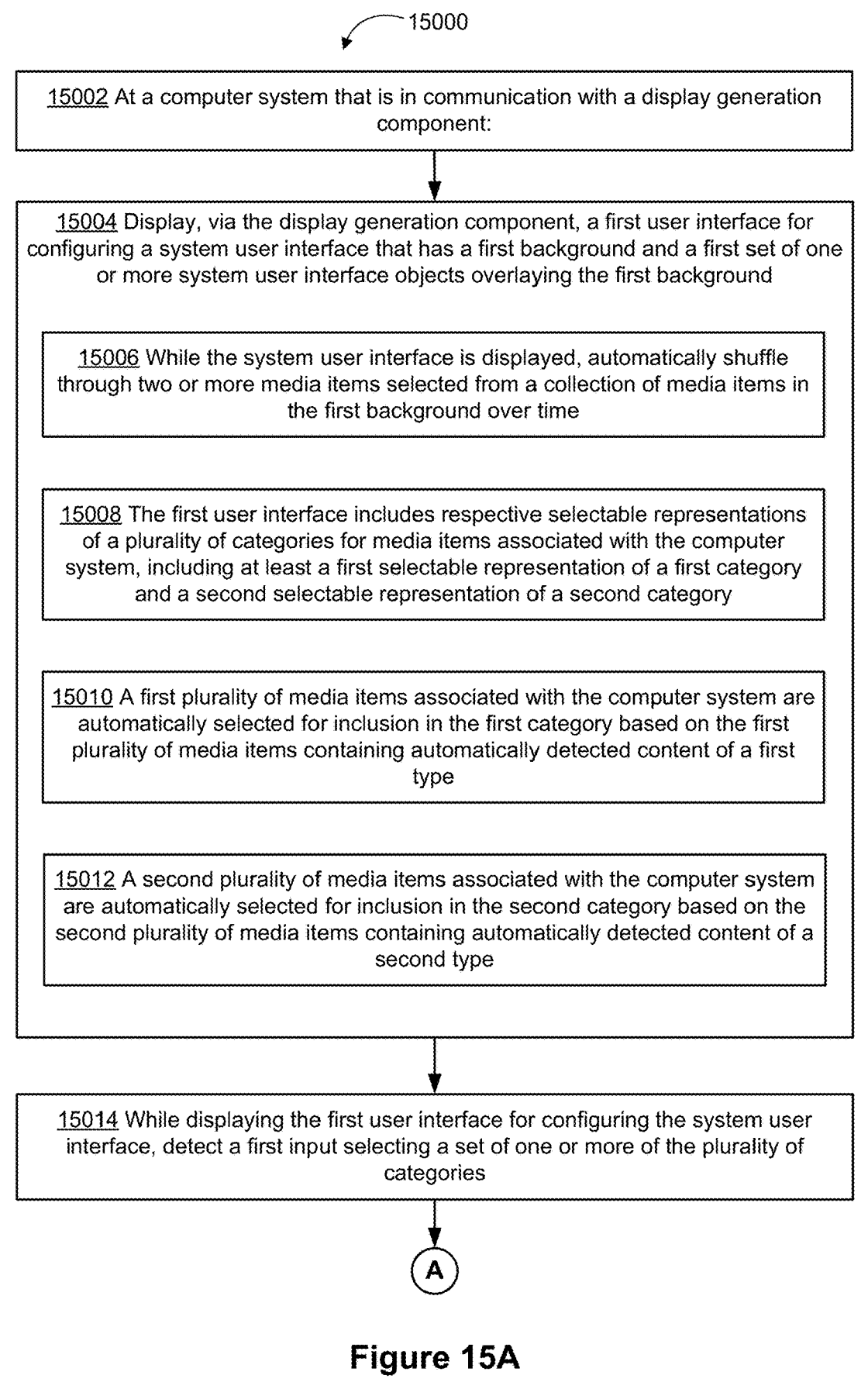

15002 At a computer system that is in communication with a display generation component:

15004 Display, via the display generation component, a first user interface for configuring a system user interface that has a first background and a first set of one or more system user interface objects overlaying the first background 15006 While the system user interface is displayed, automatically shuffle through two or more media items selected from a collection of media items in the first background over time 15008 The first user interface includes respective selectable representations of a plurality of categories for media items associated with the computer system, including at least a first selectable representation of a first category and a second selectable representation of a second category 15010 A first plurality of media items associated with the computer system are automatically selected for inclusion in the first category based on the first plurality of media items containing automatically detected content of a first type 15012 A second plurality of media items associated with the computer system are automatically selected for inclusion in the second category based on the second plurality of media items containing automatically detected content of a second type 15014 While displaying the first user interface for configuring the system user interface, detect a first input selecting a set of one or more of the plurality of categories

Figure 15B:
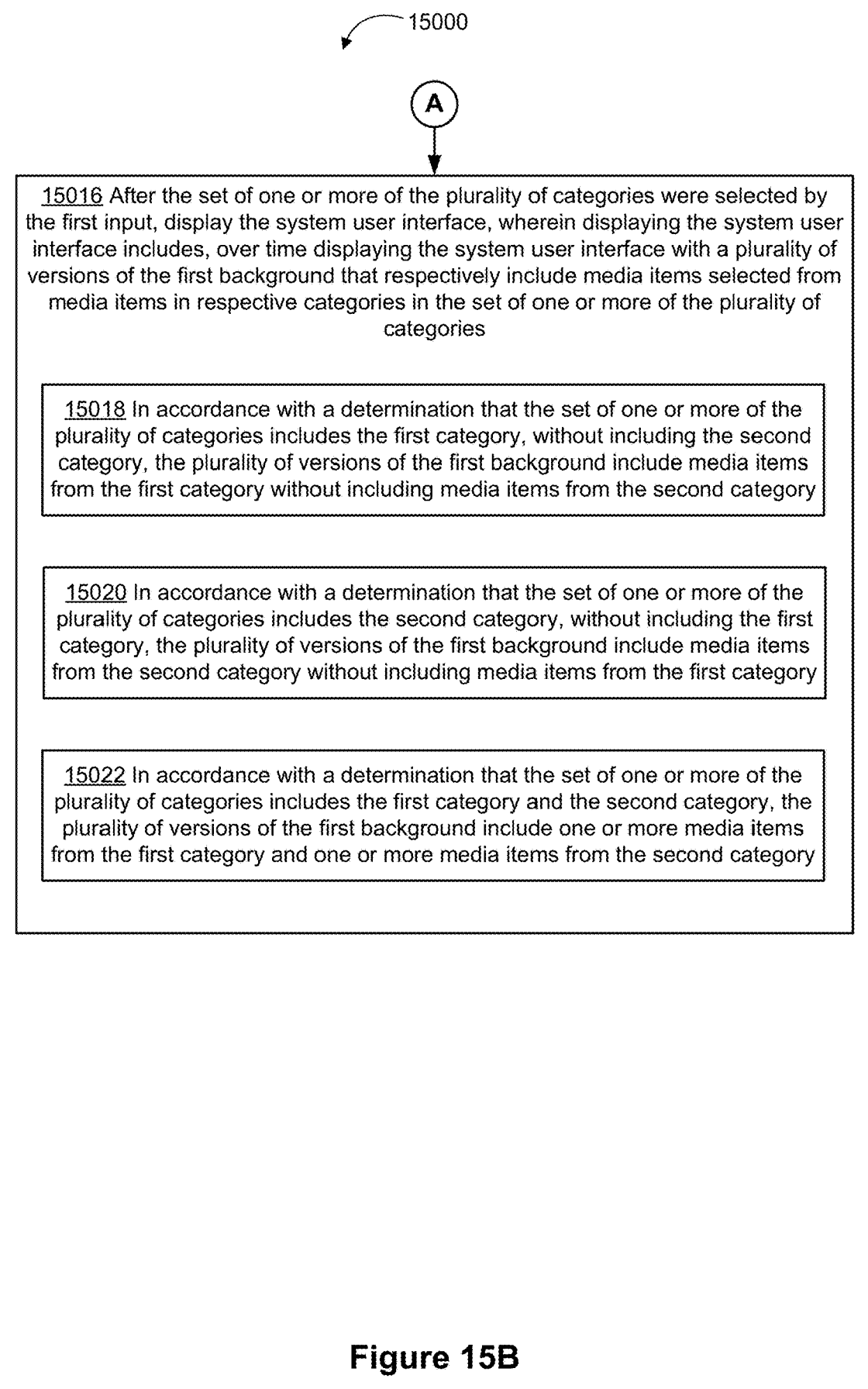

15016 After the set of one or more of the plurality of categories were selected by the first input, display the system user interface, wherein displaying the system user interface includes, over time displaying the system user interface with a plurality of versions of the first background that respectively include media items selected from media items in respective categories in the set of one or more of the plurality of categories 15018 In accordance with a determination that the set of one or more of the plurality of categories includes the first category, without including the second category, the plurality of versions of the first background include media items from the first category without including media items from the second category 15020 In accordance with a determination that the set of one or more of the plurality of categories includes the second category, without including the first category, the plurality of versions of the first background include media items from the second category without including media items from the first category 15022 In accordance with a determination that the set of one or more of the plurality of categories includes the first category and the second category, the plurality of versions of the first background include one or more media items from the first category and one or more media items from the second category

Figure 15C:
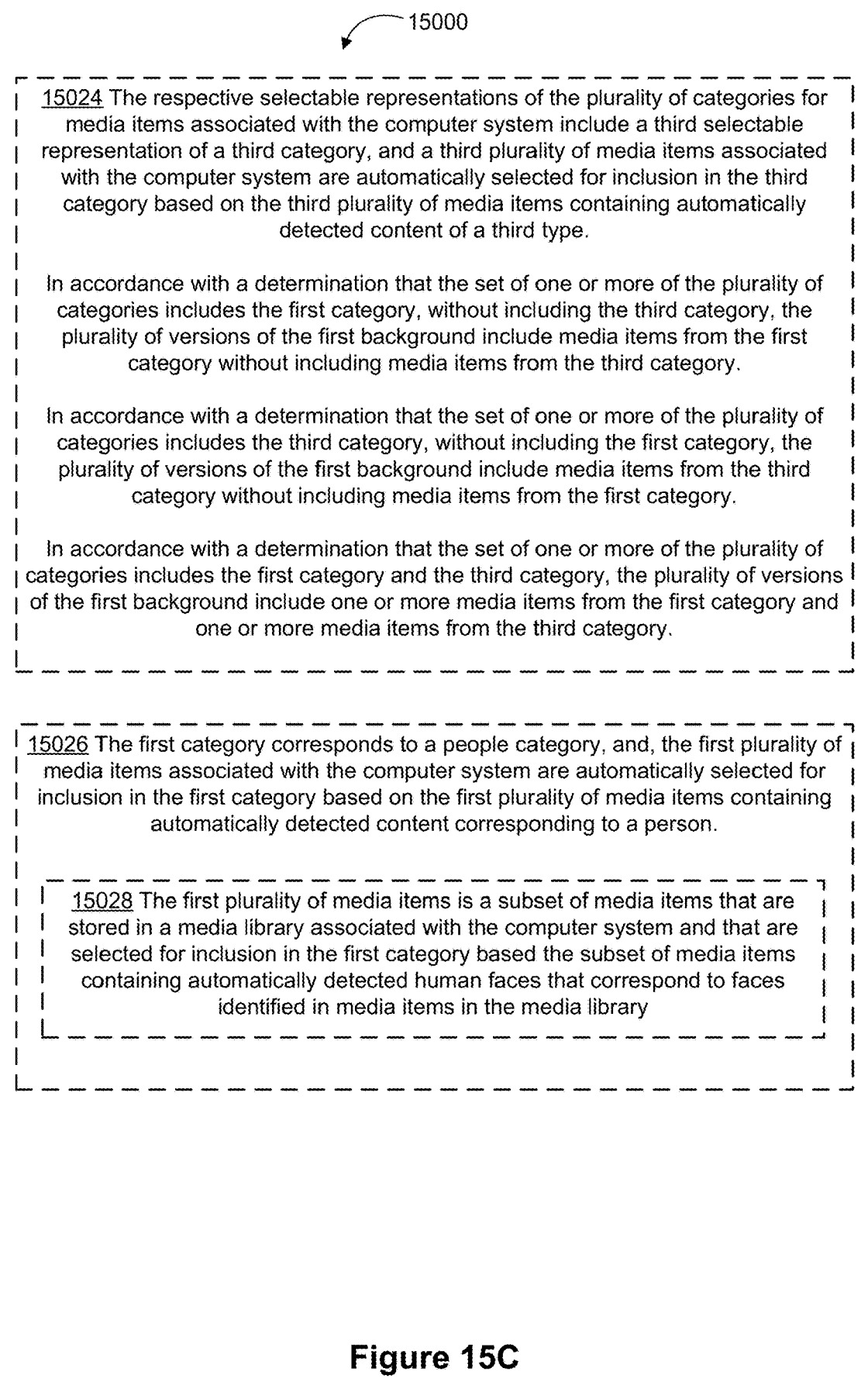

15024 The respective selectable representations of the plurality of categories for media items associated with the computer system include a third selectable representation of a third category, and a third plurality of media items associated with the computer system are automatically selected for inclusion in the third category based on the third plurality of media items containing automatically detected content of a third type.

In accordance with a determination that the set of one or more of the plurality of categories includes the first category, without including the third category, the plurality of versions of the first background include media items from the first category without including media items from the third category.

In accordance with a determination that the set of one or more of the plurality of categories includes the third category, without including the first category, the plurality of versions of the first background include media items from the third category without including media items from the first category.

In accordance with a determination that the set of one or more of the plurality of categories includes the first category and the third category, the plurality of versions of the first background include one or more media items from the first category and one or more media items from the third category.

15026 The first category corresponds to a people category, and, the first plurality of media items associated with the computer system are automatically selected for inclusion in the first category based on the first plurality of media items containing automatically detected content corresponding to a person.

15028 The first plurality of media items is a subset of media items that are stored in a media library associated with the computer system and that are selected for inclusion in the first category based the subset of media items containing automatically detected human faces that correspond to faces identified in media items in the media library

Figure 15D:
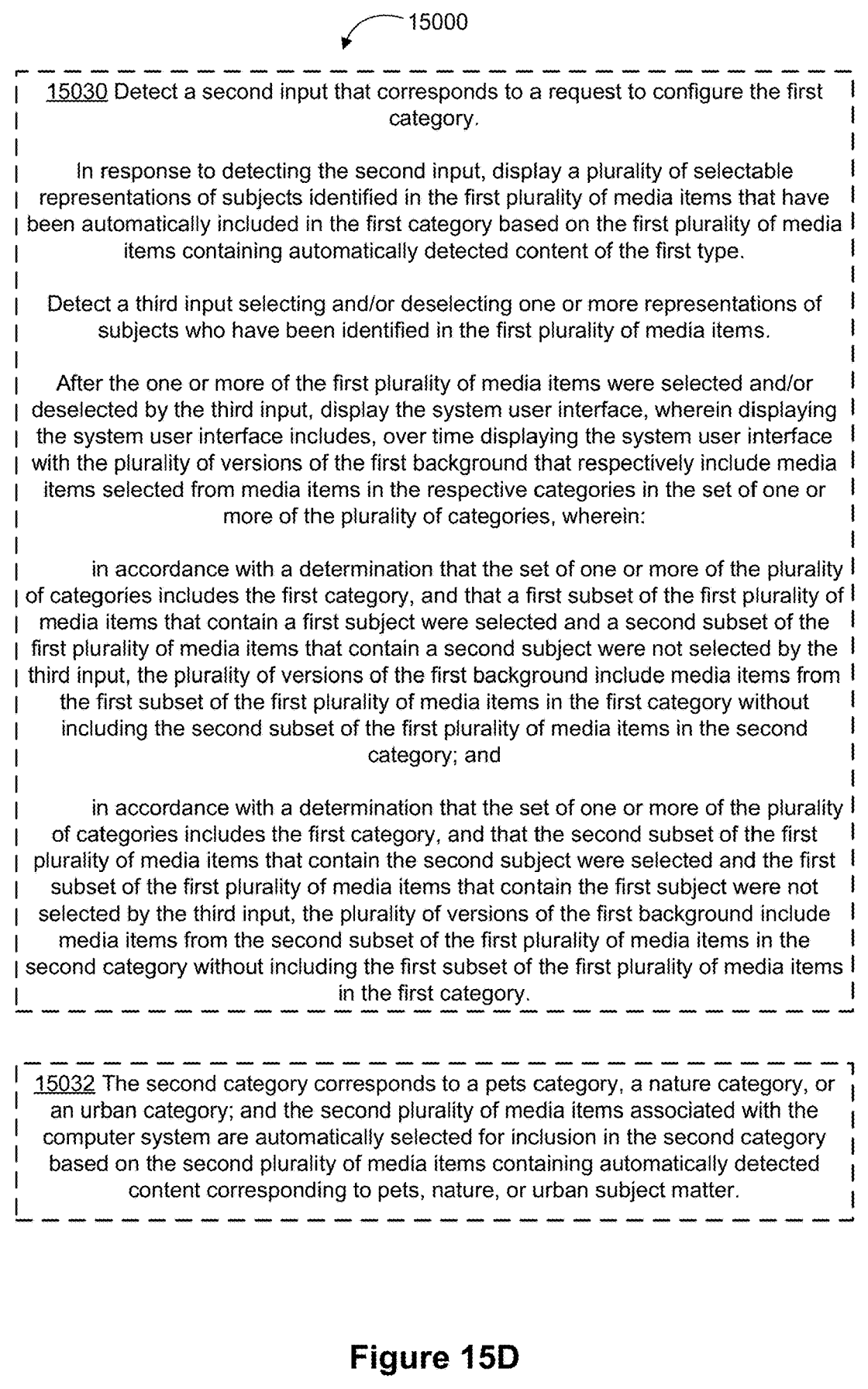

15030 Detect a second input that corresponds to a request to configure the first category.

In response to detecting the second input, display a plurality of selectable representations of subjects identified in the first plurality of media items that have been automatically included in the first category based on the first plurality of media items containing automatically detected content of the first type.

Detect a third input selecting and/or deselecting one or more representations of subjects who have been identified in the first plurality of media items.

After the one or more of the first plurality of media items were selected and/or deselected by the third input, display the system user interface, wherein displaying the system user interface includes, over time displaying the system user interface with the plurality of versions of the first background that respectively include media items selected from media items in the respective categories in the set of one or more of the plurality of categories, wherein:

in accordance with a determination that the set of one or more of the plurality of categories includes the first category, and that a first subset of the first plurality of media items that contain a first subject were selected and a second subset of the first plurality of media items that contain a second subject were not selected by the third input, the plurality of versions of the first background include media items from the first subset of the first plurality of media items in the first category without including the second subset of the first plurality of media items in the second category; and in accordance with a determination that the set of one or more of the plurality of categories includes the first category, and that the second subset of the first plurality of media items that contain the second subject were selected and the first subset of the first plurality of media items that contain the first subject were not selected by the third input, the plurality of versions of the first background include media items from the second subset of the first plurality of media items in the second category without including the first subset of the first plurality of media items in the first category.

15032 The second category corresponds to a pets category, a nature category, or an urban category; and the second plurality of media items associated with the computer system are automatically selected for inclusion in the second category based on the second plurality of media items containing automatically detected content corresponding to pets, nature, or urban subject matter.

Figure 15E:
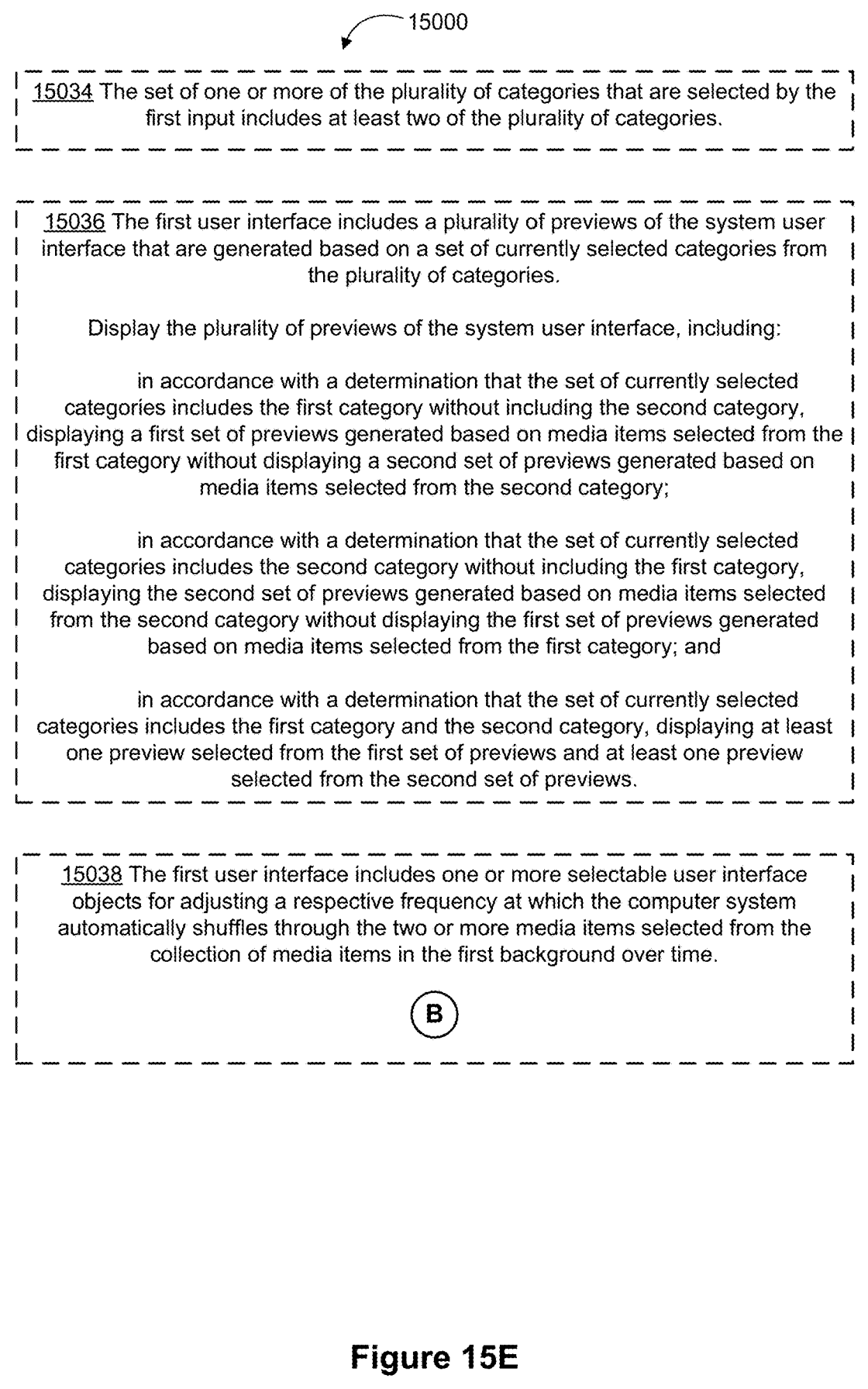

15034 The set of one or more of the plurality of categories that are selected by the first input includes at least two of the plurality of categories.

15036 The first user interface includes a plurality of previews of the system user interface that are generated based on a set of currently selected categories from the plurality of categories.

Display the plurality of previews of the system user interface, including:

in accordance with a determination that the set of currently selected categories includes the first category without including the second category, displaying a first set of previews generated based on media items selected from the first category without displaying a second set of previews generated based on media items selected from the second category;

in accordance with a determination that the set of currently selected categories includes the second category without including the first category, displaying the second set of previews generated based on media items selected from the second category without displaying the first set of previews generated based on media items selected from the first category; and in accordance with a determination that the set of currently selected categories includes the first category and the second category, displaying at least one preview selected from the first set of previews and at least one preview selected from the second set of previews.

15038 The first user interface includes one or more selectable user interface objects for adjusting a respective frequency at which the computer system automatically shuffles through the two or more media items selected from the collection of media items in the first background over time.

Figure 15F:
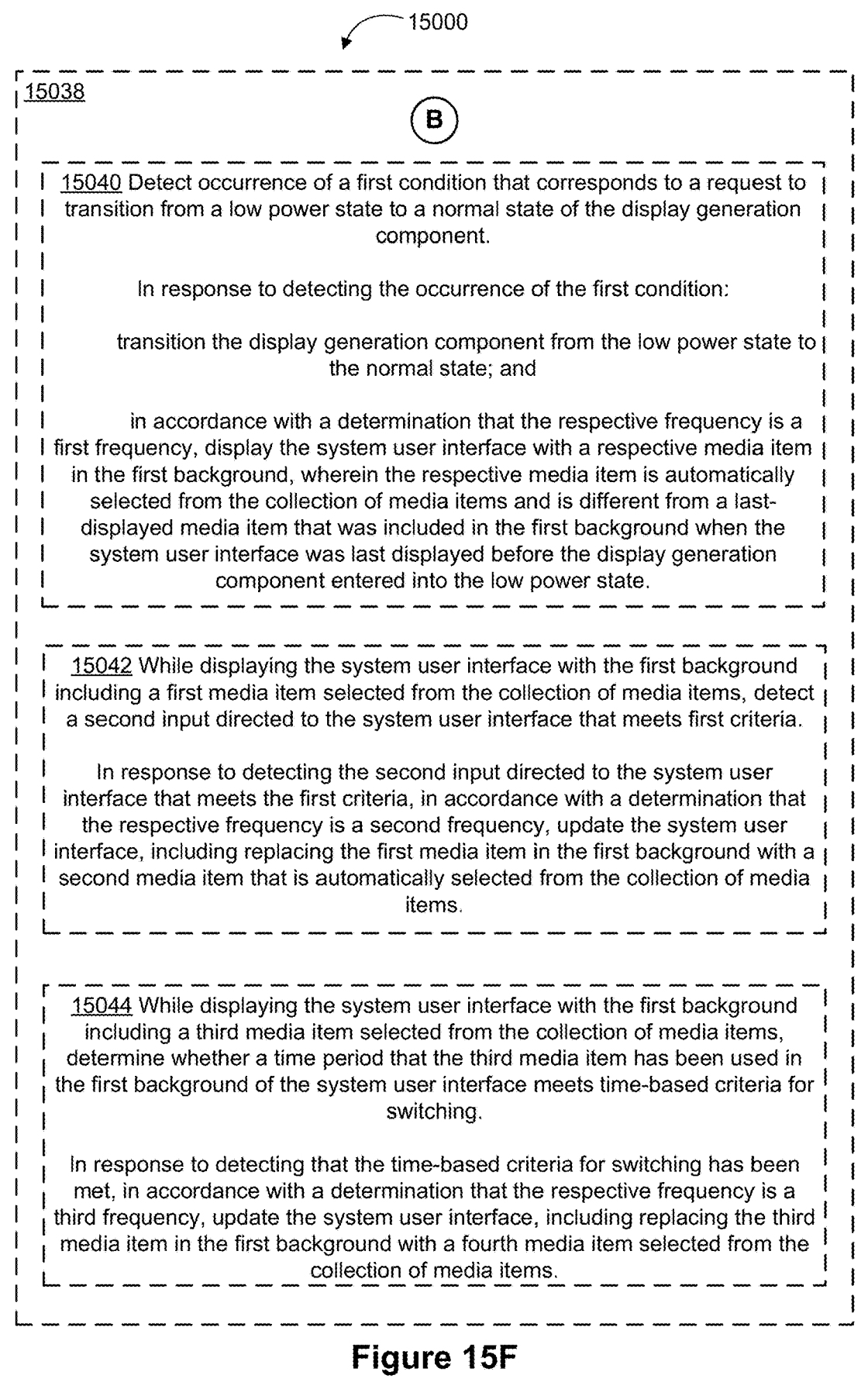

15040 Detect occurrence of a first condition that corresponds to a request to transition from a low power state to a normal state of the display generation component.

In response to detecting the occurrence of the first condition:

transition the display generation component from the low power state to the normal state; and in accordance with a determination that the respective frequency is a first frequency, display the system user interface with a respective media item in the first background, wherein the respective media item is automatically selected from the collection of media items and is different from a last-displayed media item that was included in the first background when the system user interface was last displayed before the display generation component entered into the low power state.

15042 While displaying the system user interface with the first background including a first media item selected from the collection of media items, detect a second input directed to the system user interface that meets first criteria.

In response to detecting the second input directed to the system user interface that meets the first criteria, in accordance with a determination that the respective frequency is a second frequency, update the system user interface, including replacing the first media item in the first background with a second media item that is automatically selected from the collection of media items.

15044 While displaying the system user interface with the first background including a third media item selected from the collection of media items, determine whether a time period that the third media item has been used in the first background of the system user interface meets time-based criteria for switching.

In response to detecting that the time-based criteria for switching has been met, in accordance with a determination that the respective frequency is a third frequency, update the system user interface, including replacing the third media item in the first background with a fourth media item selected from the collection of media items.

Figure 15G:
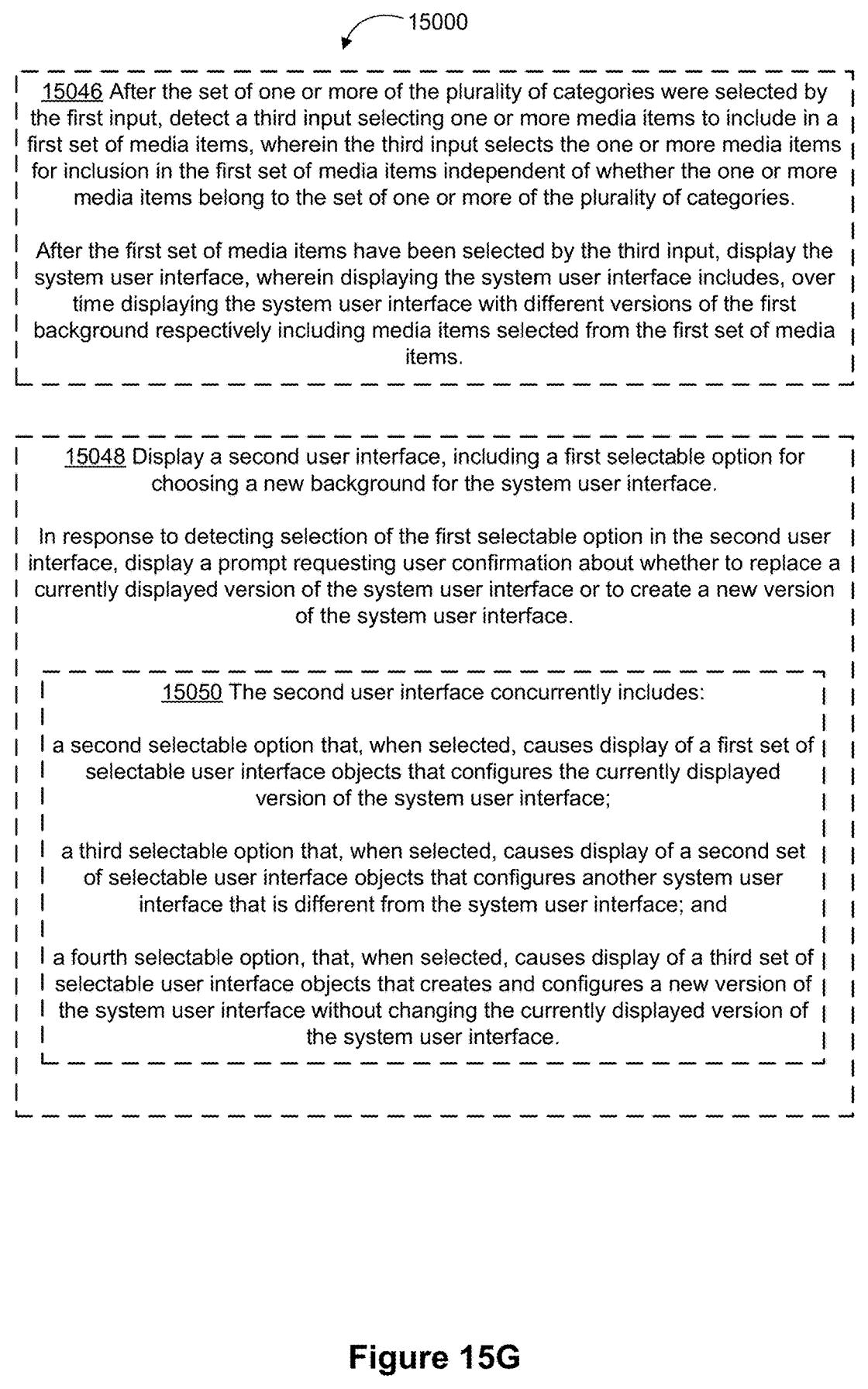

15046 After the set of one or more of the plurality of categories were selected by the first input, detect a third input selecting one or more media items to include in a first set of media items, wherein the third input selects the one or more media items for inclusion in the first set of media items independent of whether the one or more media items belong to the set of one or more of the plurality of categories.

After the first set of media items have been selected by the third input, display the system user interface, wherein displaying the system user interface includes, over time displaying the system user interface with different versions of the first background respectively including media items selected from the first set of media items.

15048 Display a second user interface, including a first selectable option for choosing a new background for the system user interface.

In response to detecting selection of the first selectable option in the second user interface, display a prompt requesting user confirmation about whether to replace a currently displayed version of the system user interface or to create a new version of the system user interface.

15050 The second user interface concurrently includes:

a second selectable option that, when selected, causes display of a first set of selectable user interface objects that configures the currently displayed version of the system user interface;

a third selectable option that, when selected, causes display of a second set of selectable user interface objects that configures another system user interface that is different from the system user interface; and a fourth selectable option, that, when selected, causes display of a third set of selectable user interface objects that creates and configures a new version of the system user interface without changing the currently displayed version of the system user interface.

Figure 15H:
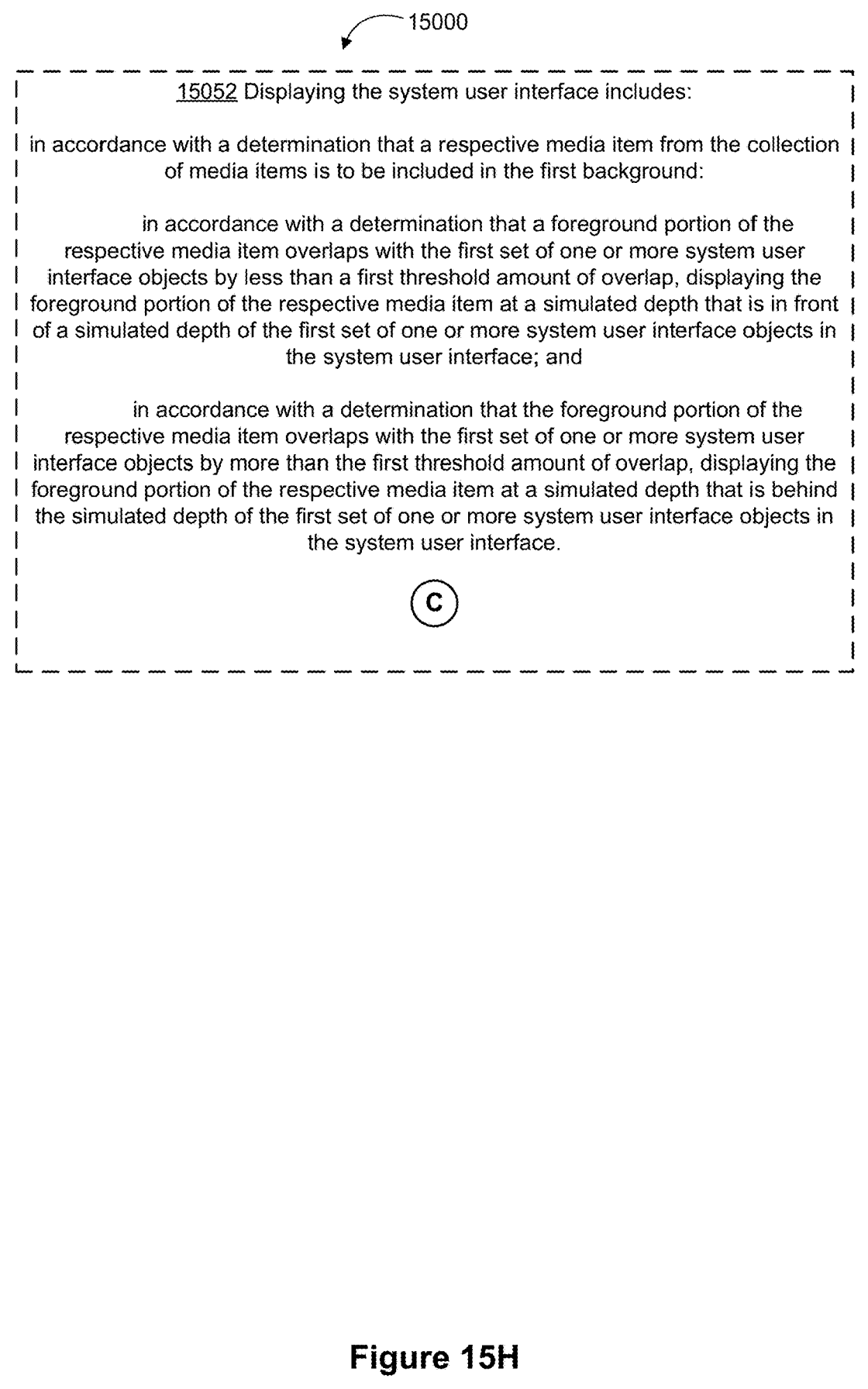

15052 Displaying the system user interface includes:

in accordance with a determination that a respective media item from the collection of media items is to be included in the first background:

in accordance with a determination that a foreground portion of the respective media item overlaps with the first set of one or more system user interface objects by less than a first threshold amount of overlap, displaying the foreground portion of the respective media item at a simulated depth that is in front of a simulated depth of the first set of one or more system user interface objects in the system user interface; and in accordance with a determination that the foreground portion of the respective media item overlaps with the first set of one or more system user interface objects by more than the first threshold amount of overlap, displaying the foreground portion of the respective media item at a simulated depth that is behind the simulated depth of the first set of one or more system user interface objects in the system user interface.

Figure 15I:
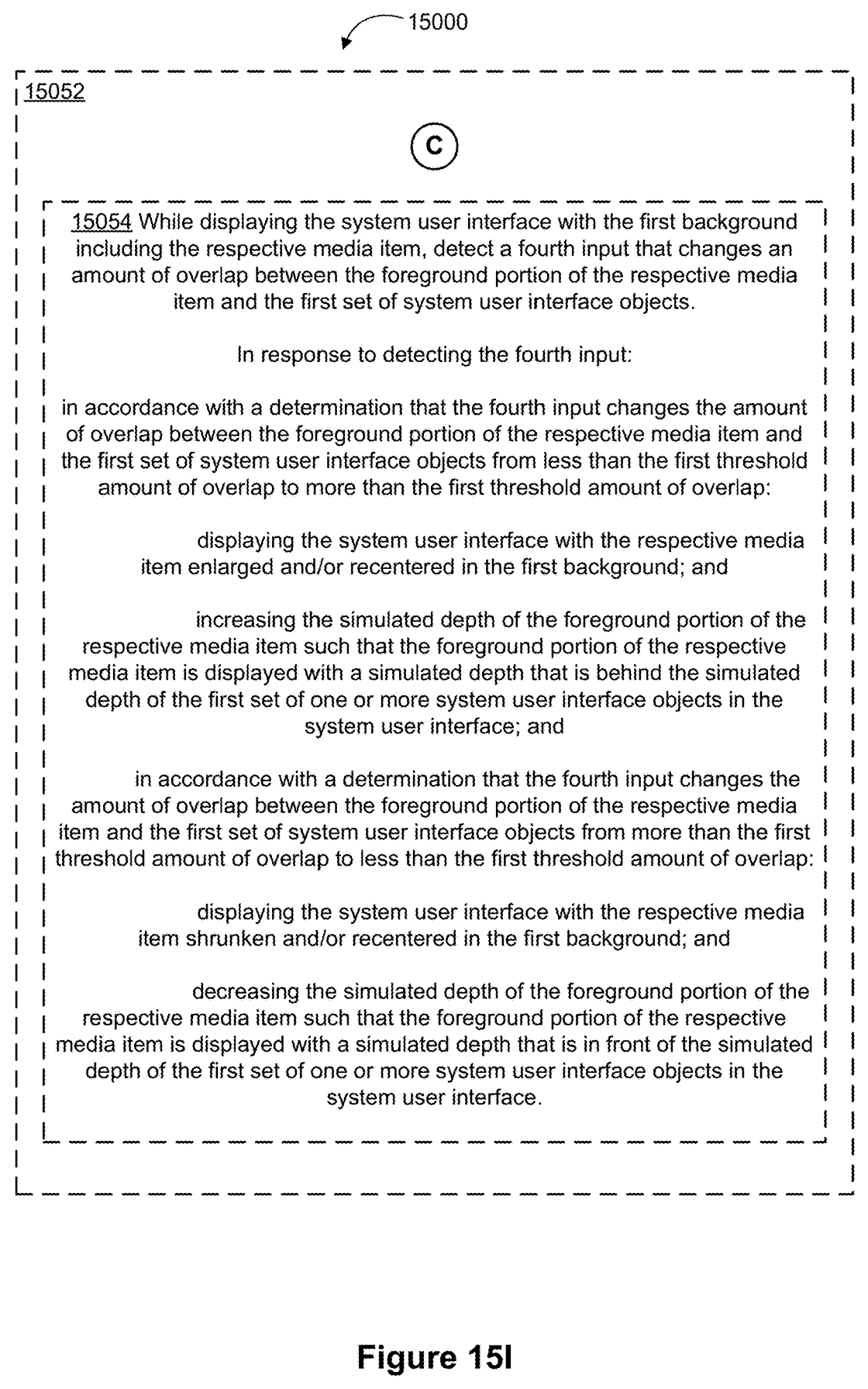

15054 While displaying the system user interface with the first background including the respective media item, detect a fourth input that changes an amount of overlap between the foreground portion of the respective media item and the first set of system user interface objects.

In response to detecting the fourth input:

in accordance with a determination that the fourth input changes the amount of overlap between the foreground portion of the respective media item and the first set of system user interface objects from less than the first threshold amount of overlap to more than the first threshold amount of overlap:

displaying the system user interface with the respective media item enlarged and/or recentered in the first background; and increasing the simulated depth of the foreground portion of the respective media item such that the foreground portion of the respective media item is displayed with a simulated depth that is behind the simulated depth of the first set of one or more system user interface objects in the system user interface; and in accordance with a determination that the fourth input changes the amount of overlap between the foreground portion of the respective media item and the first set of system user interface objects from more than the first threshold amount of overlap to less than the first threshold amount of overlap:

displaying the system user interface with the respective media item shrunken and/or recentered in the first background; and decreasing the simulated depth of the foreground portion of the respective media item such that the foreground portion of the respective media item is displayed with a simulated depth that is in front of the simulated depth of the first set of one or more system user interface objects in the system user interface.

Figure 16A:
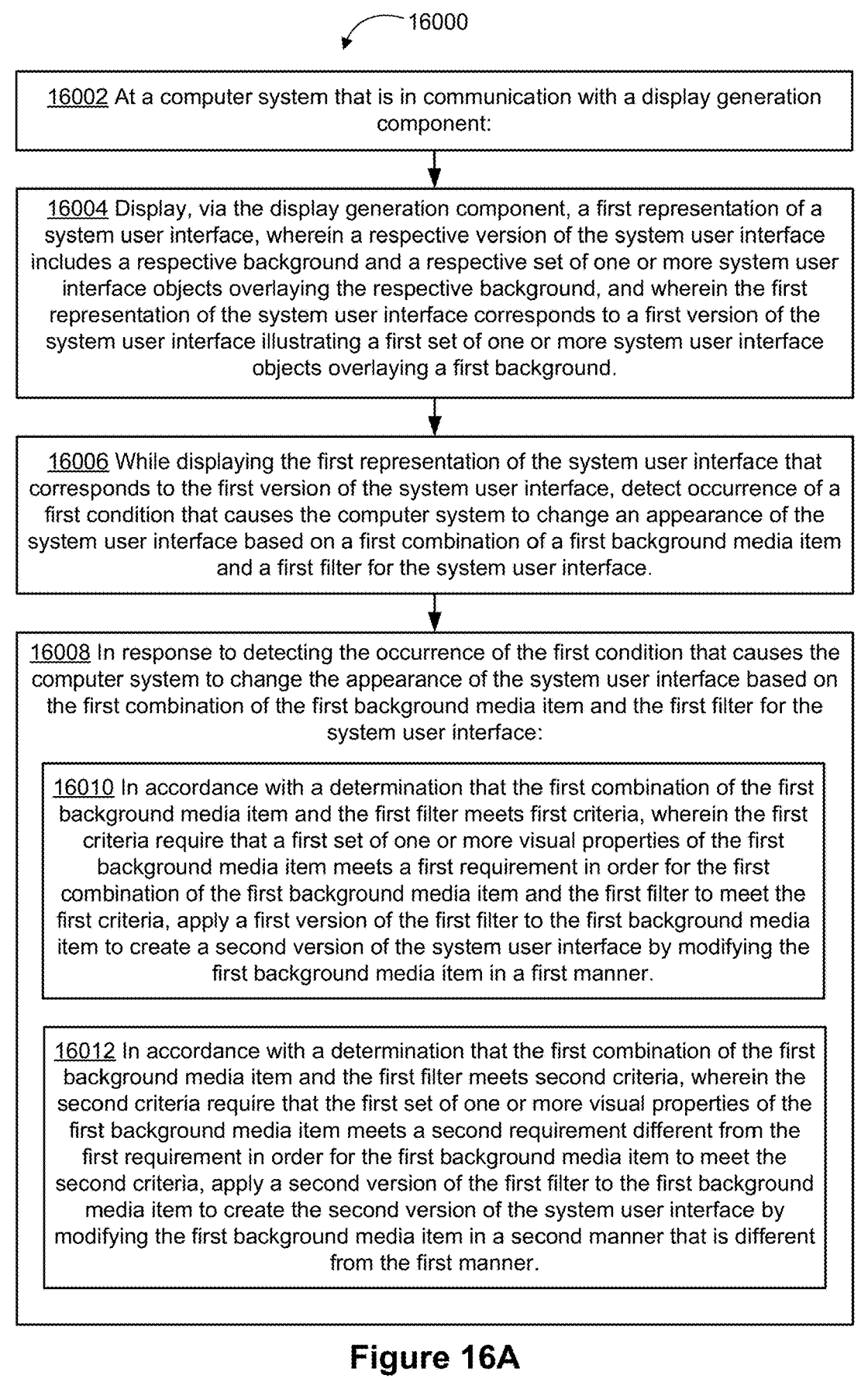

16002 At a computer system that is in communication with a display generation component:

↓

16004 Display, via the display generation component, a first representation of a system user interface, wherein a respective version of the system user interface includes a respective background and a respective set of one or more system user interface objects overlaying the respective background, and wherein the first representation of the system user interface corresponds to a first version of the system user interface illustrating a first set of one or more system user interface objects overlaying a first background.

↓

16006 While displaying the first representation of the system user interface that corresponds to the first version of the system user interface, detect occurrence of a first condition that causes the computer system to change an appearance of the system user interface based on a first combination of a first background media item and a first filter for the system user interface.

↓

16008 In response to detecting the occurrence of the first condition that causes the computer system to change the appearance of the system user interface based on the first combination of the first background media item and the first filter for the system user interface:

16010 In accordance with a determination that the first combination of the first background media item and the first filter meets first criteria, wherein the first criteria require that a first set of one or more visual properties of the first background media item meets a first requirement in order for the first combination of the first background media item and the first filter to meet the first criteria, apply a first version of the first filter to the first background media item to create a second version of the system user interface by modifying the first background media item in a first manner.

16012 In accordance with a determination that the first combination of the first background media item and the first filter meets second criteria, wherein the second criteria require that the first set of one or more visual properties of the first background media item meets a second requirement different from the first requirement in order for the first background media item to meet the second criteria, apply a second version of the first filter to the first background media item to create the second version of the system user interface by modifying the first background media item in a second manner that is different from the first manner.

Figure 16B:
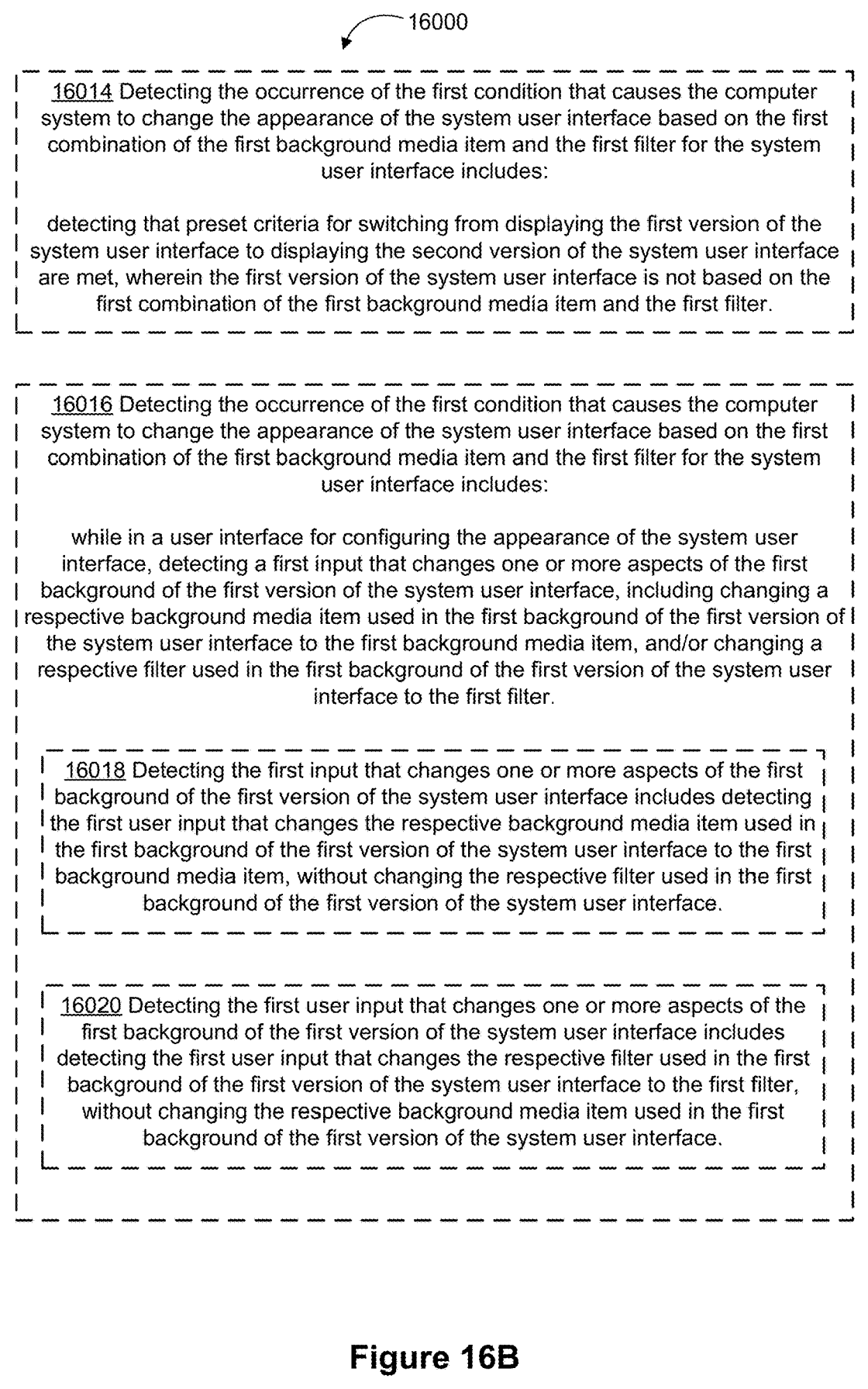

16014 Detecting the occurrence of the first condition that causes the computer system to change the appearance of the system user interface based on the first combination of the first background media item and the first filter for the system user interface includes:

detecting that preset criteria for switching from displaying the first version of the system user interface to displaying the second version of the system user interface are met, wherein the first version of the system user interface is not based on the first combination of the first background media item and the first filter.

16016 Detecting the occurrence of the first condition that causes the computer system to change the appearance of the system user interface based on the first combination of the first background media item and the first filter for the system user interface includes:

while in a user interface for configuring the appearance of the system user interface, detecting a first input that changes one or more aspects of the first background of the first version of the system user interface, including changing a respective background media item used in the first background of the first version of the system user interface to the first background media item, and/or changing a respective filter used in the first background of the first version of the system user interface to the first filter.

16018 Detecting the first input that changes one or more aspects of the first background of the first version of the system user interface includes detecting the first user input that changes the respective background media item used in the first background of the first version of the system user interface to the first background media item, without changing the respective filter used in the first background of the first version of the system user interface.

16020 Detecting the first user input that changes one or more aspects of the first background of the first version of the system user interface includes detecting the first user input that changes the respective filter used in the first background of the first version of the system user interface to the first filter, without changing the respective background media item used in the first background of the first version of the system user interface.

Figure 16C:
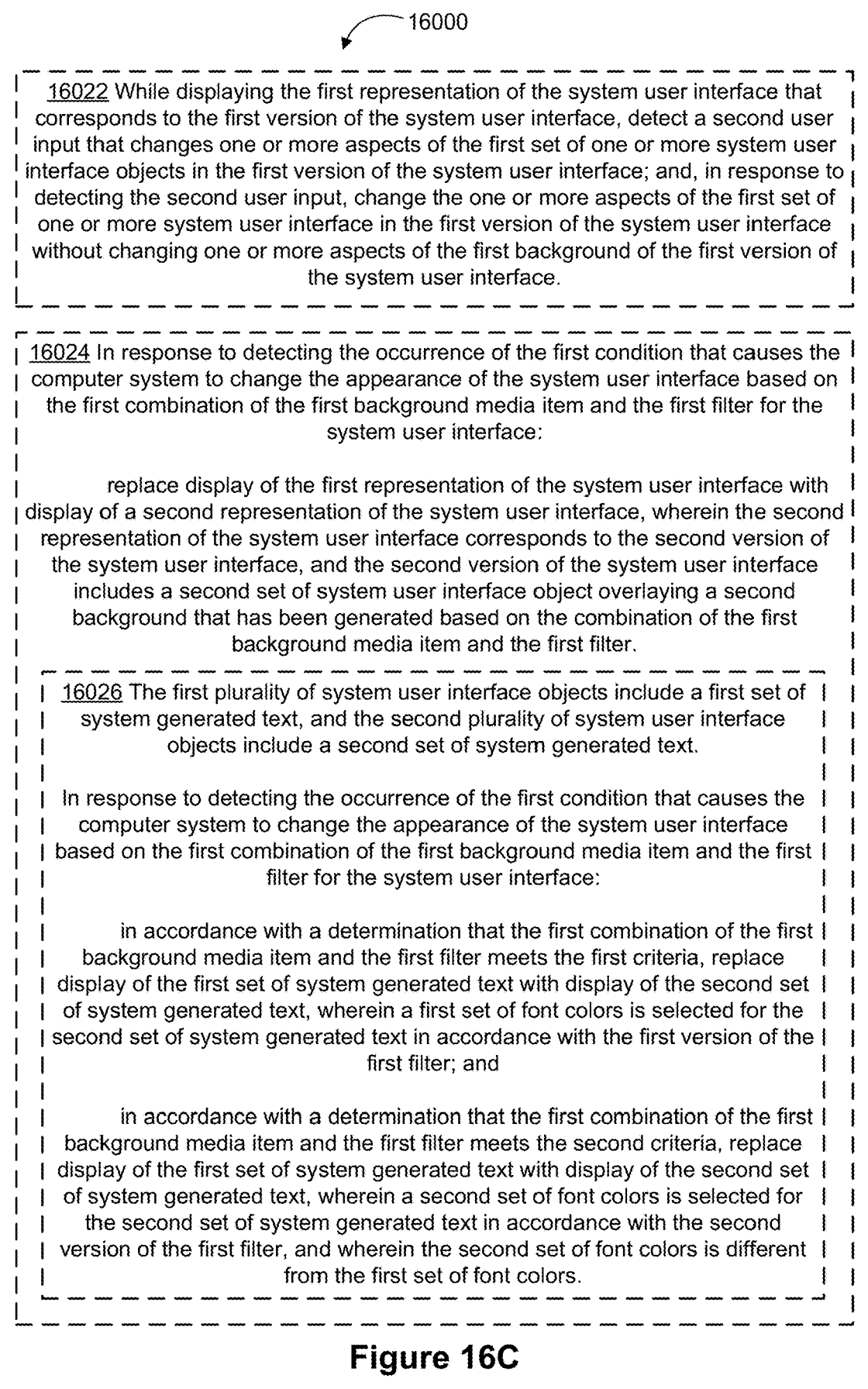

16022 While displaying the first representation of the system user interface that corresponds to the first version of the system user interface, detect a second user input that changes one or more aspects of the first set of one or more system user interface objects in the first version of the system user interface; and, in response to detecting the second user input, change the one or more aspects of the first set of one or more system user interface in the first version of the system user interface without changing one or more aspects of the first background of the first version of the system user interface.

16024 In response to detecting the occurrence of the first condition that causes the computer system to change the appearance of the system user interface based on the first combination of the first background media item and the first filter for the system user interface:

replace display of the first representation of the system user interface with display of a second representation of the system user interface, wherein the second representation of the system user interface corresponds to the second version of the system user interface, and the second version of the system user interface includes a second set of system user interface object overlaying a second background that has been generated based on the combination of the first background media item and the first filter.

16026 The first plurality of system user interface objects include a first set of system generated text, and the second plurality of system user interface objects include a second set of system generated text.

In response to detecting the occurrence of the first condition that causes the computer system to change the appearance of the system user interface based on the first combination of the first background media item and the first filter for the system user interface:

in accordance with a determination that the first combination of the first background media item and the first filter meets the first criteria, replace display of the first set of system generated text with display of the second set of system generated text, wherein a first set of font colors is selected for the second set of system generated text in accordance with the first version of the first filter; and in accordance with a determination that the first combination of the first background media item and the first filter meets the second criteria, replace display of the first set of system generated text with display of the second set of system generated text, wherein a second set of font colors is selected for the second set of system generated text in accordance with the second version of the first filter, and wherein the second set of font colors is different from the first set of font colors.

Figure 16D:
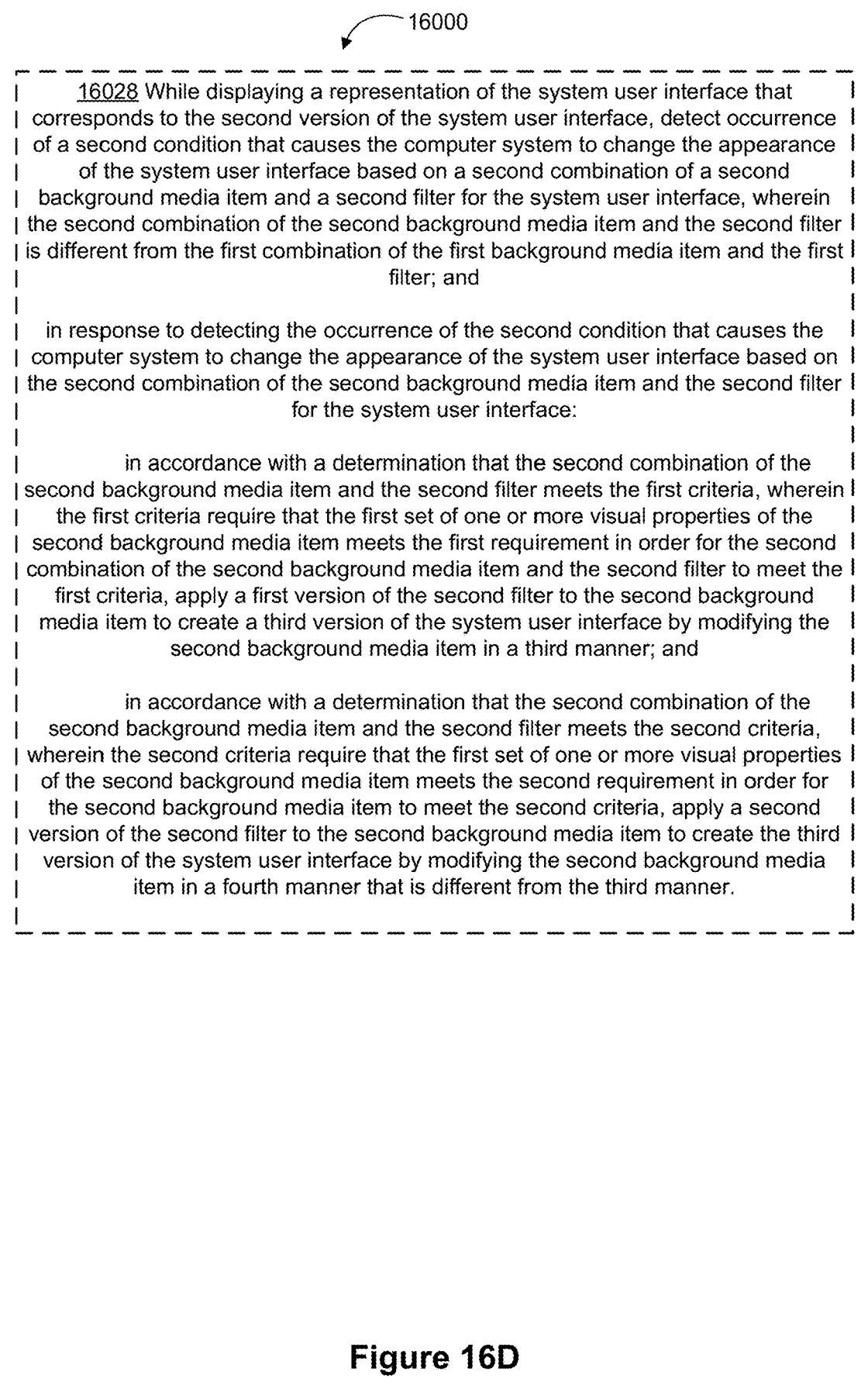

16028 While displaying a representation of the system user interface that corresponds to the second version of the system user interface, detect occurrence of a second condition that causes the computer system to change the appearance of the system user interface based on a second combination of a second background media item and a second filter for the system user interface, wherein the second combination of the second background media item and the second filter is different from the first combination of the first background media item and the first filter; and in response to detecting the occurrence of the second condition that causes the computer system to change the appearance of the system user interface based on the second combination of the second background media item and the second filter for the system user interface:

in accordance with a determination that the second combination of the second background media item and the second filter meets the first criteria, wherein the first criteria require that the first set of one or more visual properties of the second background media item meets the first requirement in order for the second combination of the second background media item and the second filter to meet the first criteria, apply a first version of the second filter to the second background media item to create a third version of the system user interface by modifying the second background media item in a third manner; and in accordance with a determination that the second combination of the second background media item and the second filter meets the second criteria, wherein the second criteria require that the first set of one or more visual properties of the second background media item meets the second requirement in order for the second background media item to meet the second criteria, apply a second version of the second filter to the second background media item to create the third version of the system user interface by modifying the second background media item in a fourth manner that is different from the third manner.

Figure 16E:
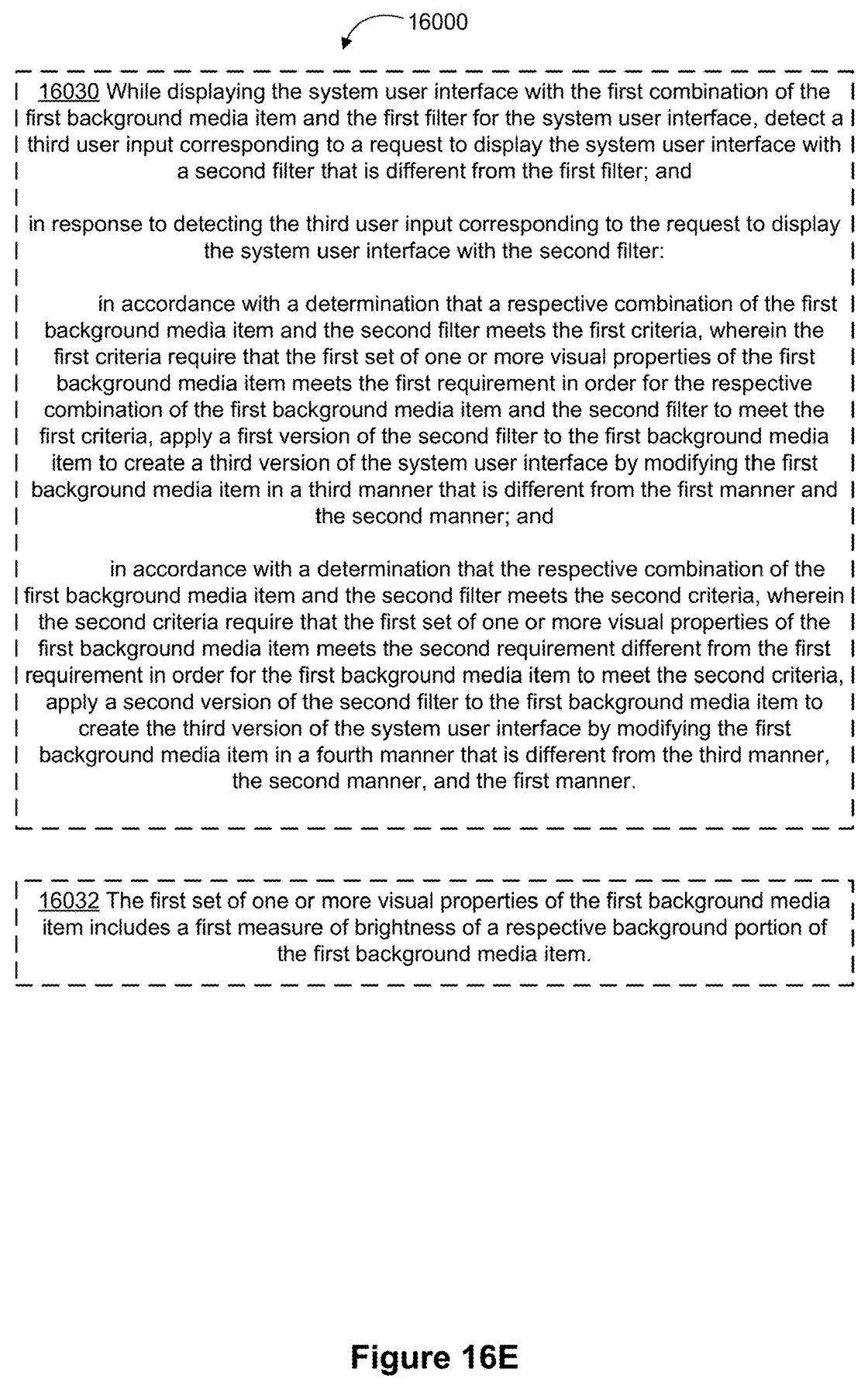

16030 While displaying the system user interface with the first combination of the first background media item and the first filter for the system user interface, detect a third user input corresponding to a request to display the system user interface with a second filter that is different from the first filter; and in response to detecting the third user input corresponding to the request to display the system user interface with the second filter:

in accordance with a determination that a respective combination of the first background media item and the second filter meets the first criteria, wherein the first criteria require that the first set of one or more visual properties of the first background media item meets the first requirement in order for the respective combination of the first background media item and the second filter to meet the first criteria, apply a first version of the second filter to the first background media item to create a third version of the system user interface by modifying the first background media item in a third manner that is different from the first manner and the second manner; and in accordance with a determination that the respective combination of the first background media item and the second filter meets the second criteria, wherein the second criteria require that the first set of one or more visual properties of the first background media item meets the second requirement different from the first requirement in order for the first background media item to meet the second criteria, apply a second version of the second filter to the first background media item to create the third version of the system user interface by modifying the first background media item in a fourth manner that is different from the third manner, the second manner, and the first manner.

16032 The first set of one or more visual properties of the first background media item includes a first measure of brightness of a respective background portion of the first background media item.

Figure 16F:
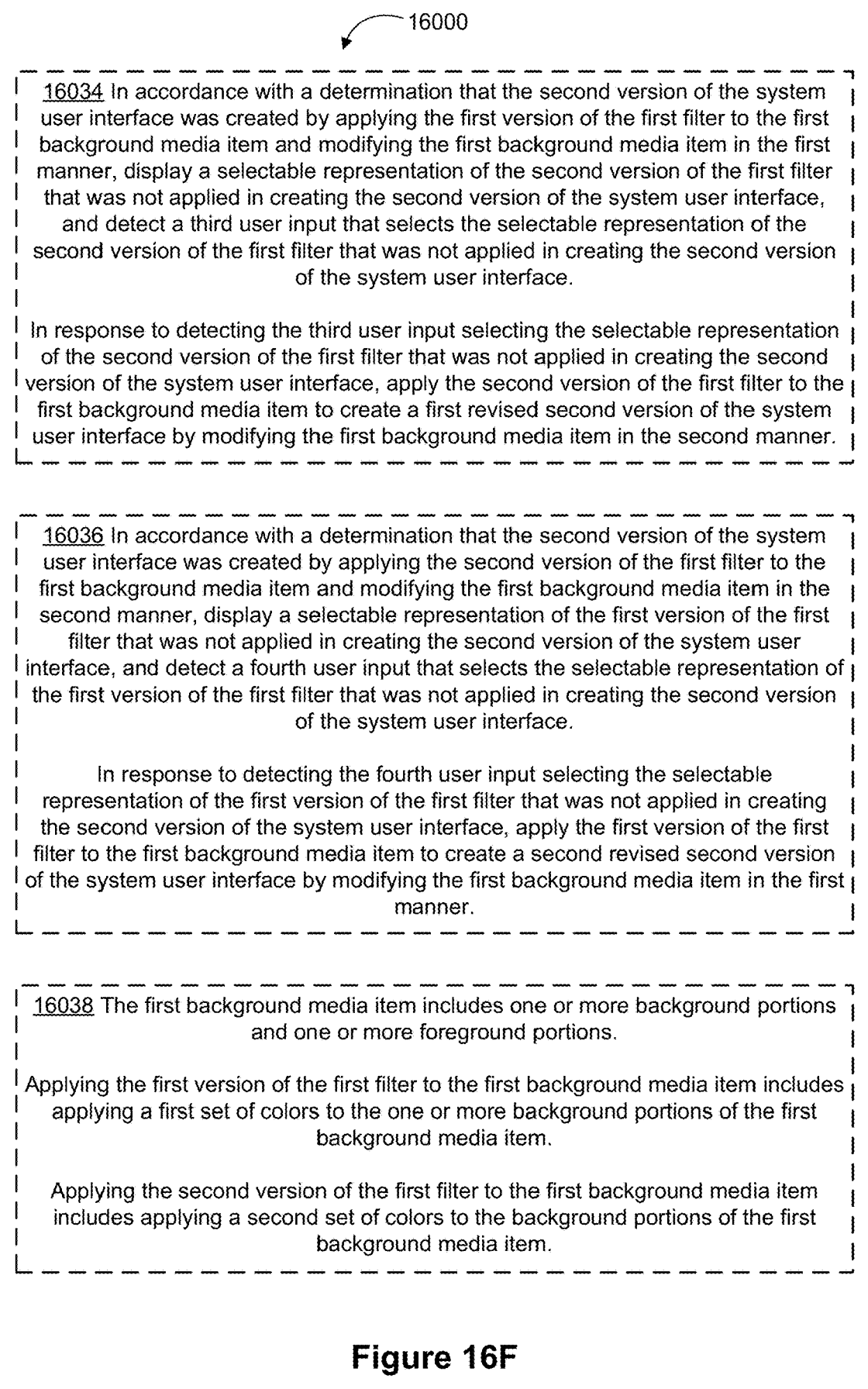

16034 In accordance with a determination that the second version of the system user interface was created by applying the first version of the first filter to the first background media item and modifying the first background media item in the first manner, display a selectable representation of the second version of the first filter that was not applied in creating the second version of the system user interface, and detect a third user input that selects the selectable representation of the second version of the first filter that was not applied in creating the second version of the system user interface.

In response to detecting the third user input selecting the selectable representation of the second version of the first filter that was not applied in creating the second version of the system user interface, apply the second version of the first filter to the first background media item to create a first revised second version of the system user interface by modifying the first background media item in the second manner.

16036 In accordance with a determination that the second version of the system user interface was created by applying the second version of the first filter to the first background media item and modifying the first background media item in the second manner, display a selectable representation of the first version of the first filter that was not applied in creating the second version of the system user interface, and detect a fourth user input that selects the selectable representation of the first version of the first filter that was not applied in creating the second version of the system user interface.

In response to detecting the fourth user input selecting the selectable representation of the first version of the first filter that was not applied in creating the second version of the system user interface, apply the first version of the first filter to the first background media item to create a second revised second version of the system user interface by modifying the first background media item in the first manner.

16038 The first background media item includes one or more background portions and one or more foreground portions.

Applying the first version of the first filter to the first background media item includes applying a first set of colors to the one or more background portions of the first background media item.

Applying the second version of the first filter to the first background media item includes applying a second set of colors to the background portions of the first background media item.

Figure 16G:
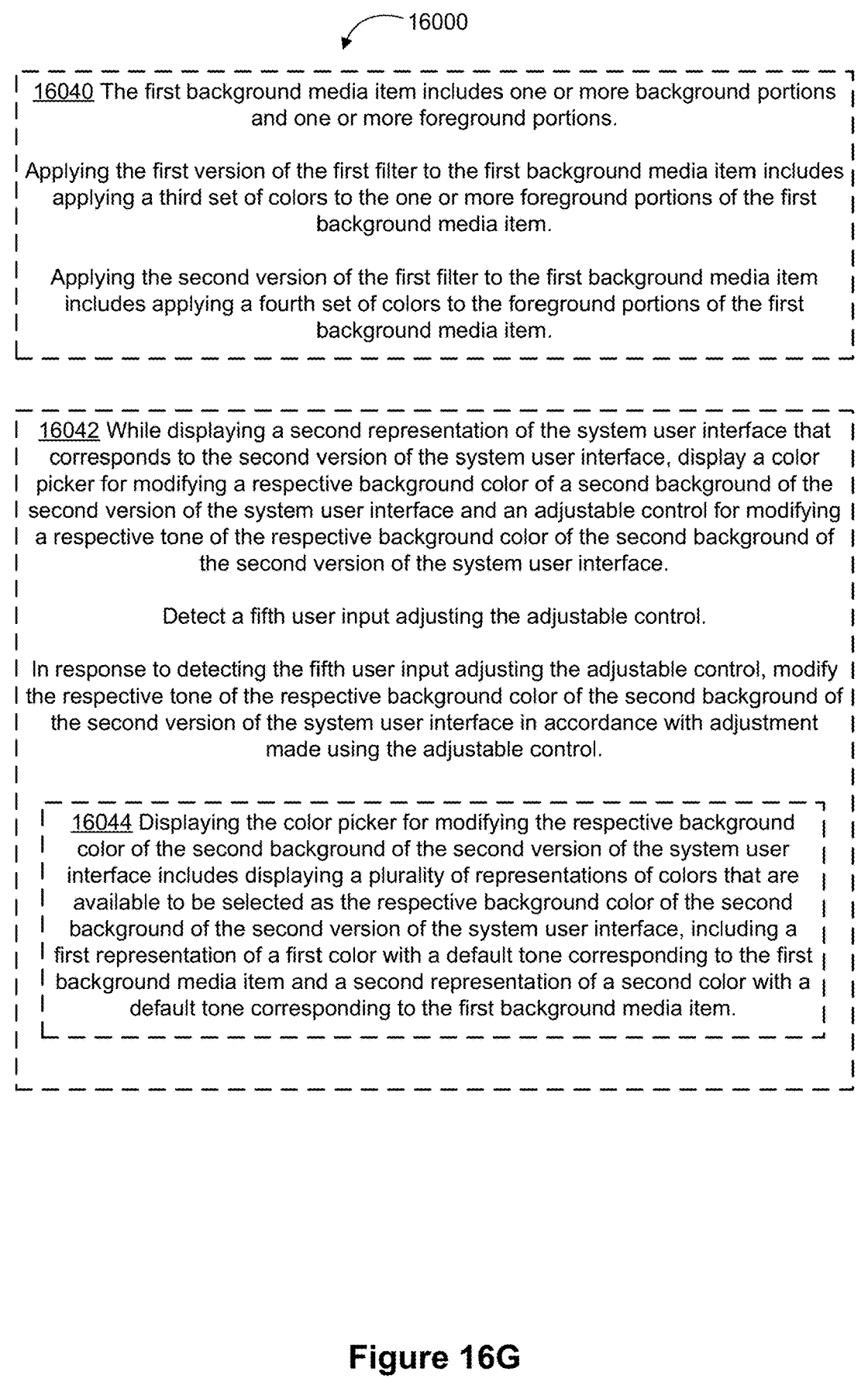

16040 The first background media item includes one or more background portions and one or more foreground portions.

Applying the first version of the first filter to the first background media item includes applying a third set of colors to the one or more foreground portions of the first background media item.

Applying the second version of the first filter to the first background media item includes applying a fourth set of colors to the foreground portions of the first background media item.

16042 While displaying a second representation of the system user interface that corresponds to the second version of the system user interface, display a color picker for modifying a respective background color of a second background of the second version of the system user interface and an adjustable control for modifying a respective tone of the respective background color of the second background of the second version of the system user interface.

Detect a fifth user input adjusting the adjustable control.

In response to detecting the fifth user input adjusting the adjustable control, modify the respective tone of the respective background color of the second background of the second version of the system user interface in accordance with adjustment made using the adjustable control.

16044 Displaying the color picker for modifying the respective background color of the second background of the second version of the system user interface includes displaying a plurality of representations of colors that are available to be selected as the respective background color of the second background of the second version of the system user interface, including a first representation of a first color with a default tone corresponding to the first background media item and a second representation of a second color with a default tone corresponding to the first background media item.

Figure 16H:
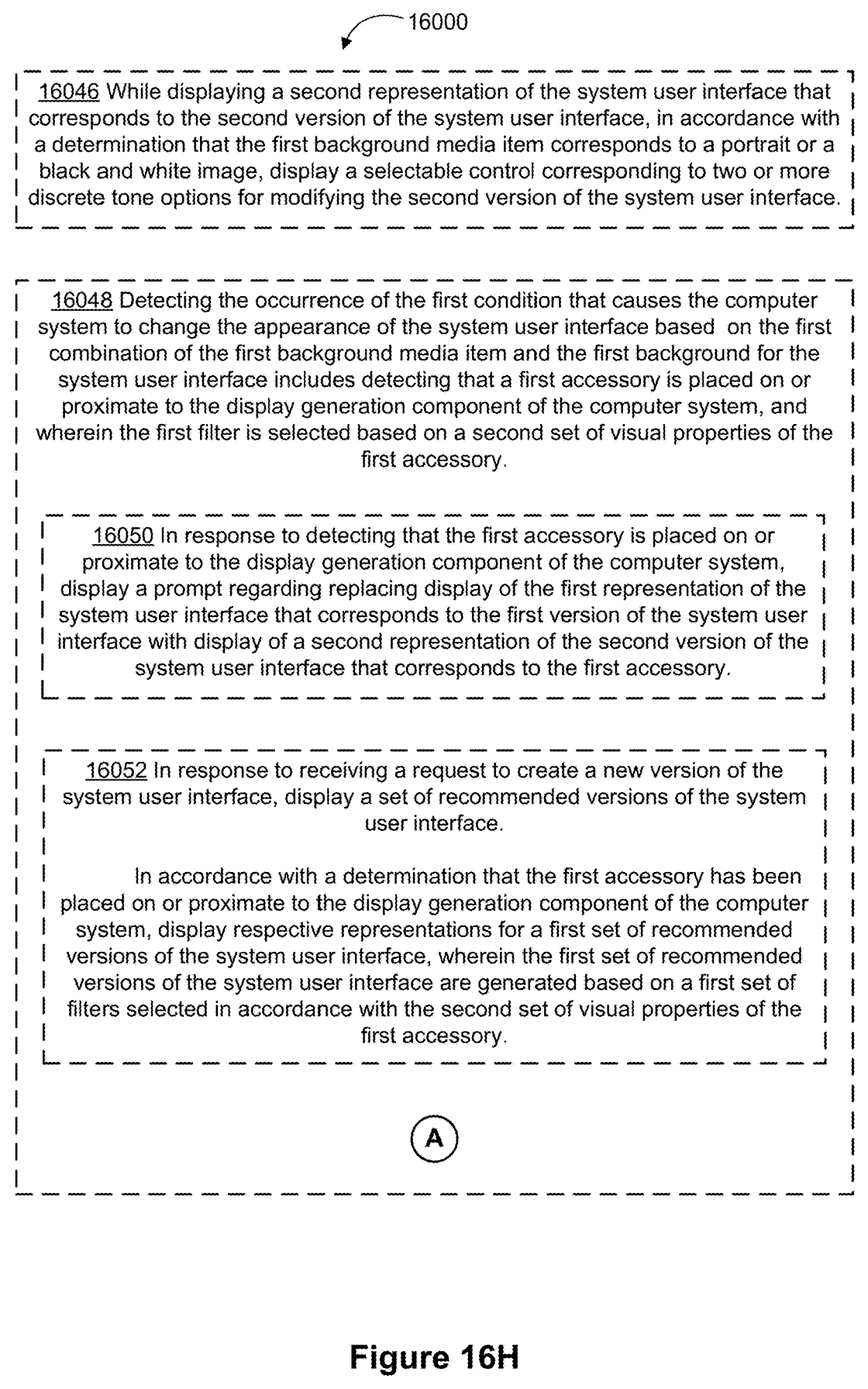

16046 While displaying a second representation of the system user interface that corresponds to the second version of the system user interface, in accordance with a determination that the first background media item corresponds to a portrait or a black and white image, display a selectable control corresponding to two or more discrete tone options for modifying the second version of the system user interface.

16048 Detecting the occurrence of the first condition that causes the computer system to change the appearance of the system user interface based on the first combination of the first background media item and the first background for the system user interface includes detecting that a first accessory is placed on or proximate to the display generation component of the computer system, and wherein the first filter is selected based on a second set of visual properties of the first accessory.

16050 In response to detecting that the first accessory is placed on or proximate to the display generation component of the computer system, display a prompt regarding replacing display of the first representation of the system user interface that corresponds to the first version of the system user interface with display of a second representation of the second version of the system user interface that corresponds to the first accessory.

16052 In response to receiving a request to create a new version of the system user interface, display a set of recommended versions of the system user interface.

In accordance with a determination that the first accessory has been placed on or proximate to the display generation component of the computer system, display respective representations for a first set of recommended versions of the system user interface, wherein the first set of recommended versions of the system user interface are generated based on a first set of filters selected in accordance with the second set of visual properties of the first accessory.

Figure 16I:
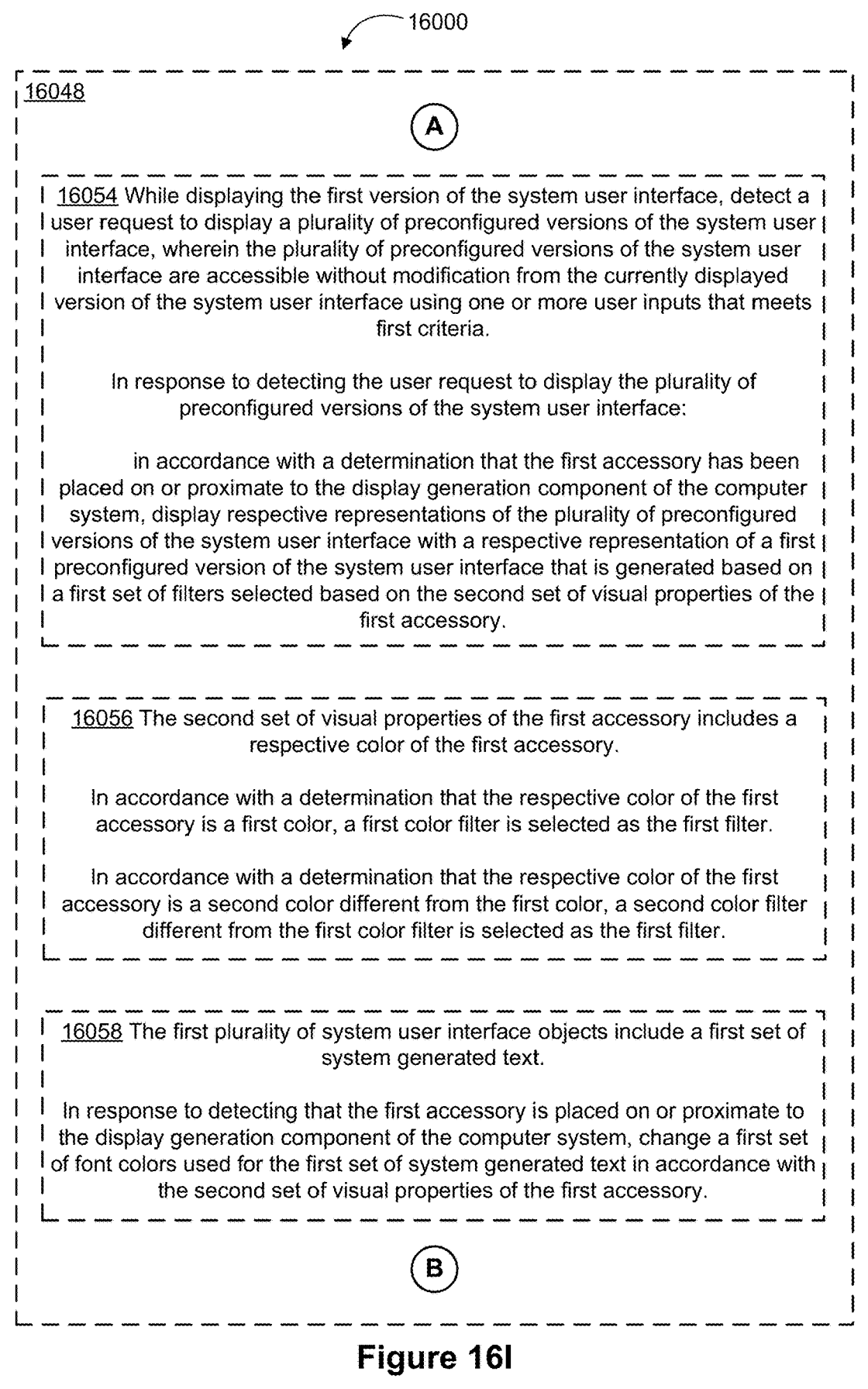

16054 While displaying the first version of the system user interface, detect a user request to display a plurality of preconfigured versions of the system user interface, wherein the plurality of preconfigured versions of the system user interface are accessible without modification from the currently displayed version of the system user interface using one or more user inputs that meets first criteria.

In response to detecting the user request to display the plurality of preconfigured versions of the system user interface:

in accordance with a determination that the first accessory has been placed on or proximate to the display generation component of the computer system, display respective representations of the plurality of preconfigured versions of the system user interface with a respective representation of a first preconfigured version of the system user interface that is generated based on a first set of filters selected based on the second set of visual properties of the first accessory.

16056 The second set of visual properties of the first accessory includes a respective color of the first accessory.

In accordance with a determination that the respective color of the first accessory is a first color, a first color filter is selected as the first filter.

In accordance with a determination that the respective color of the first accessory is a second color different from the first color, a second color filter different from the first color filter is selected as the first filter.

16058 The first plurality of system user interface objects include a first set of system generated text.

In response to detecting that the first accessory is placed on or proximate to the display generation component of the computer system, change a first set of font colors used for the first set of system generated text in accordance with the second set of visual properties of the first accessory.

Figure 16J:
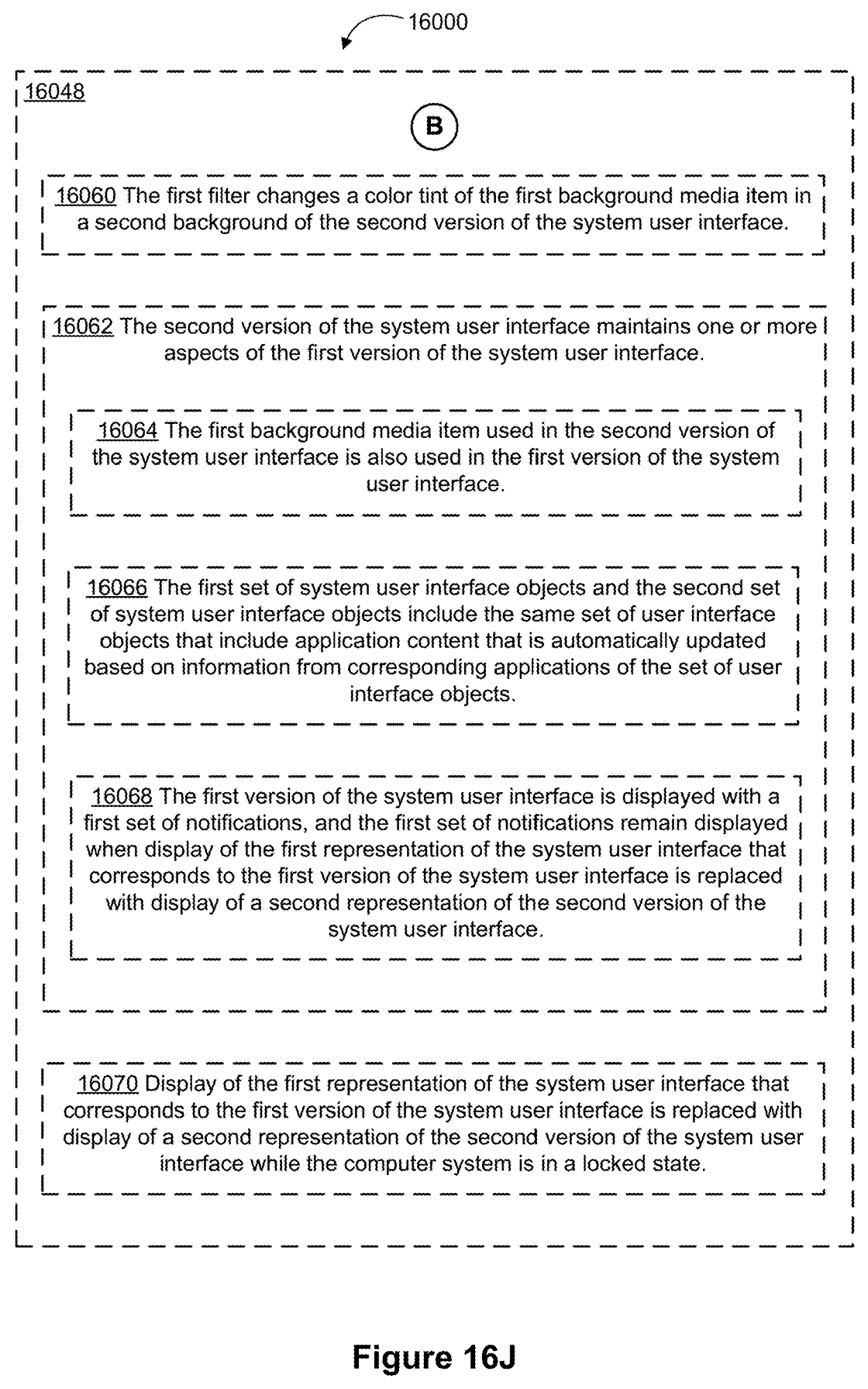

16060 The first filter changes a color tint of the first background media item in a second background of the second version of the system user interface.

16062 The second version of the system user interface maintains one or more aspects of the first version of the system user interface.

16064 The first background media item used in the second version of the system user interface is also used in the first version of the system user interface.

16066 The first set of system user interface objects and the second set of system user interface objects include the same set of user interface objects that include application content that is automatically updated based on information from corresponding applications of the set of user interface objects.

16068 The first version of the system user interface is displayed with a first set of notifications, and the first set of notifications remain displayed when display of the first representation of the system user interface that corresponds to the first version of the system user interface is replaced with display of a second representation of the second version of the system user interface.

16070 Display of the first representation of the system user interface that corresponds to the first version of the system user interface is replaced with display of a second representation of the second version of the system user interface while the computer system is in a locked state.

Figure 17A:
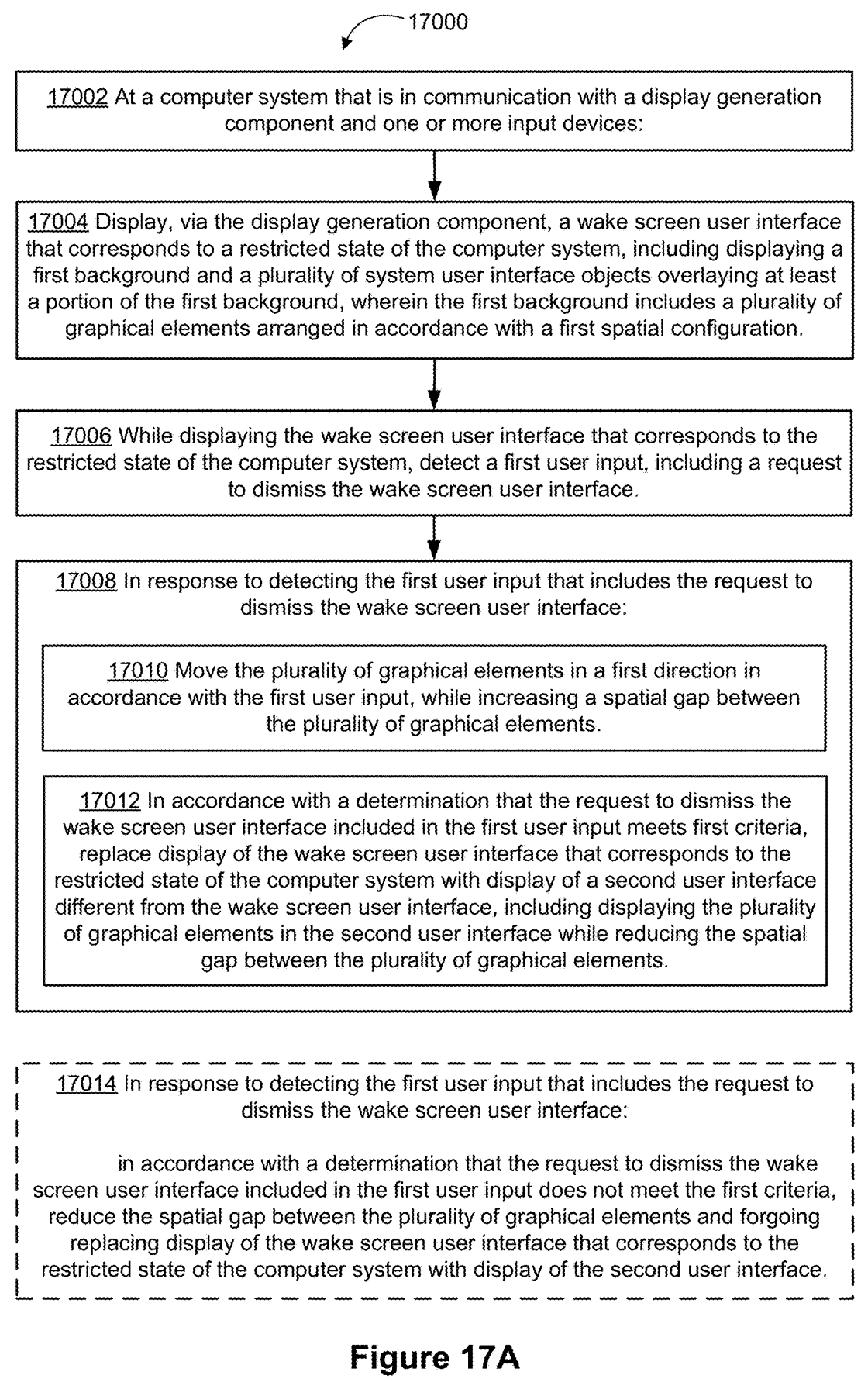

17002 At a computer system that is in communication with a display generation component and one or more input devices:

↓

17004 Display, via the display generation component, a wake screen user interface that corresponds to a restricted state of the computer system, including displaying a first background and a plurality of system user interface objects overlaying at least a portion of the first background, wherein the first background includes a plurality of graphical elements arranged in accordance with a first spatial configuration.

↓

17006 While displaying the wake screen user interface that corresponds to the restricted state of the computer system, detect a first user input, including a request to dismiss the wake screen user interface.

↓

17008 In response to detecting the first user input that includes the request to dismiss the wake screen user interface:

17010 Move the plurality of graphical elements in a first direction in accordance with the first user input, while increasing a spatial gap between the plurality of graphical elements.

17012 In accordance with a determination that the request to dismiss the wake screen user interface included in the first user input meets first criteria, replace display of the wake screen user interface that corresponds to the restricted state of the computer system with display of a second user interface different from the wake screen user interface, including displaying the plurality of graphical elements in the second user interface while reducing the spatial gap between the plurality of graphical elements.

17014 In response to detecting the first user input that includes the request to dismiss the wake screen user interface:

in accordance with a determination that the request to dismiss the wake screen user interface included in the first user input does not meet the first criteria, reduce the spatial gap between the plurality of graphical elements and forgoing replacing display of the wake screen user interface that corresponds to the restricted state of the computer system with display of the second user interface.

Figure 17B:
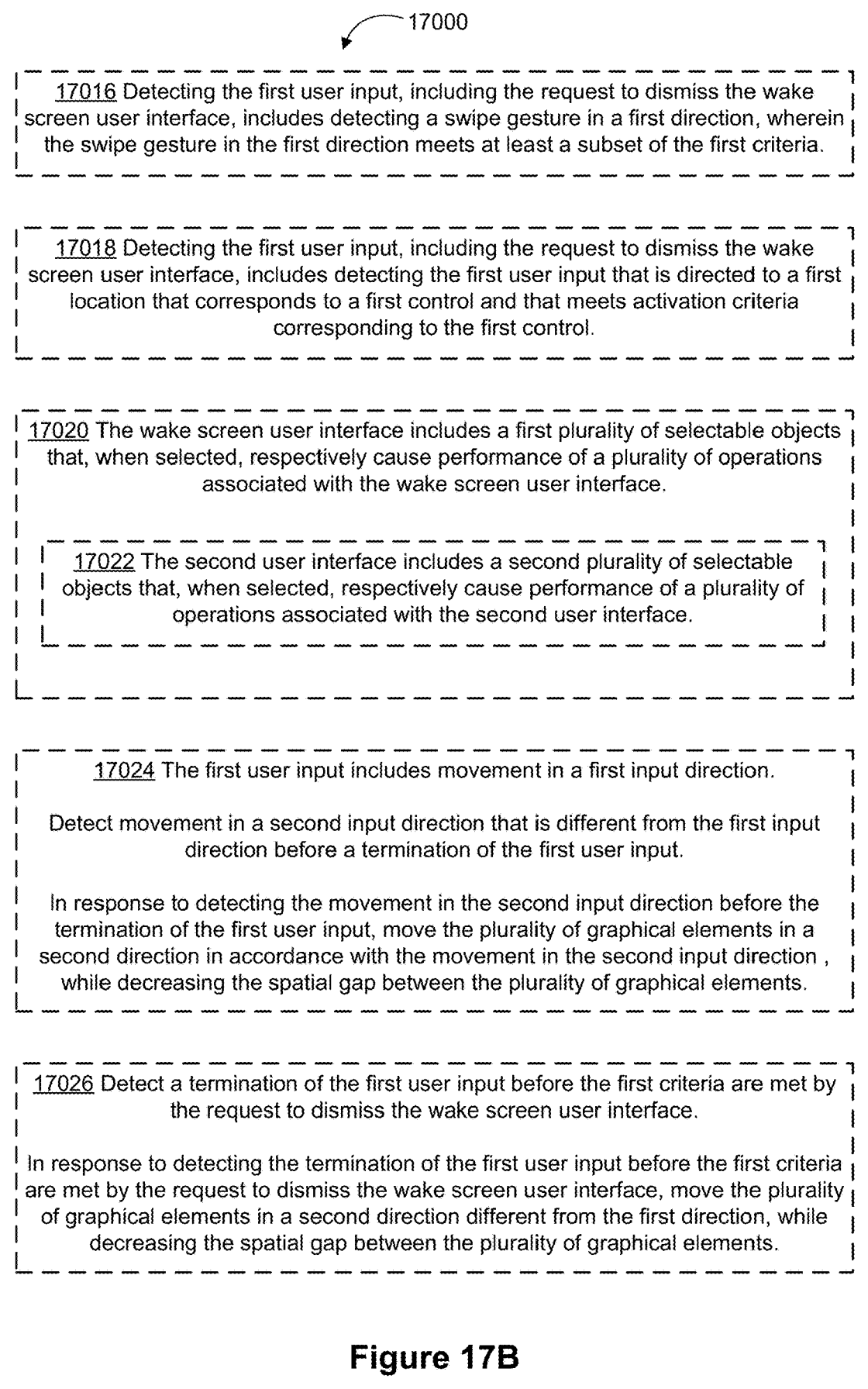

17016 Detecting the first user input, including the request to dismiss the wake screen user interface, includes detecting a swipe gesture in a first direction, wherein the swipe gesture in the first direction meets at least a subset of the first criteria.

17018 Detecting the first user input, including the request to dismiss the wake screen user interface, includes detecting the first user input that is directed to a first location that corresponds to a first control and that meets activation criteria corresponding to the first control.

17020 The wake screen user interface includes a first plurality of selectable objects that, when selected, respectively cause performance of a plurality of operations associated with the wake screen user interface.

17022 The second user interface includes a second plurality of selectable objects that, when selected, respectively cause performance of a plurality of operations associated with the second user interface.

17024 The first user input includes movement in a first input direction.

Detect movement in a second input direction that is different from the first input direction before a termination of the first user input.

In response to detecting the movement in the second input direction before the termination of the first user input, move the plurality of graphical elements in a second direction in accordance with the movement in the second input direction , while decreasing the spatial gap between the plurality of graphical elements.

17026 Detect a termination of the first user input before the first criteria are met by the request to dismiss the wake screen user interface.

In response to detecting the termination of the first user input before the first criteria are met by the request to dismiss the wake screen user interface, move the plurality of graphical elements in a second direction different from the first direction, while decreasing the spatial gap between the plurality of graphical elements.

Figure 17C:
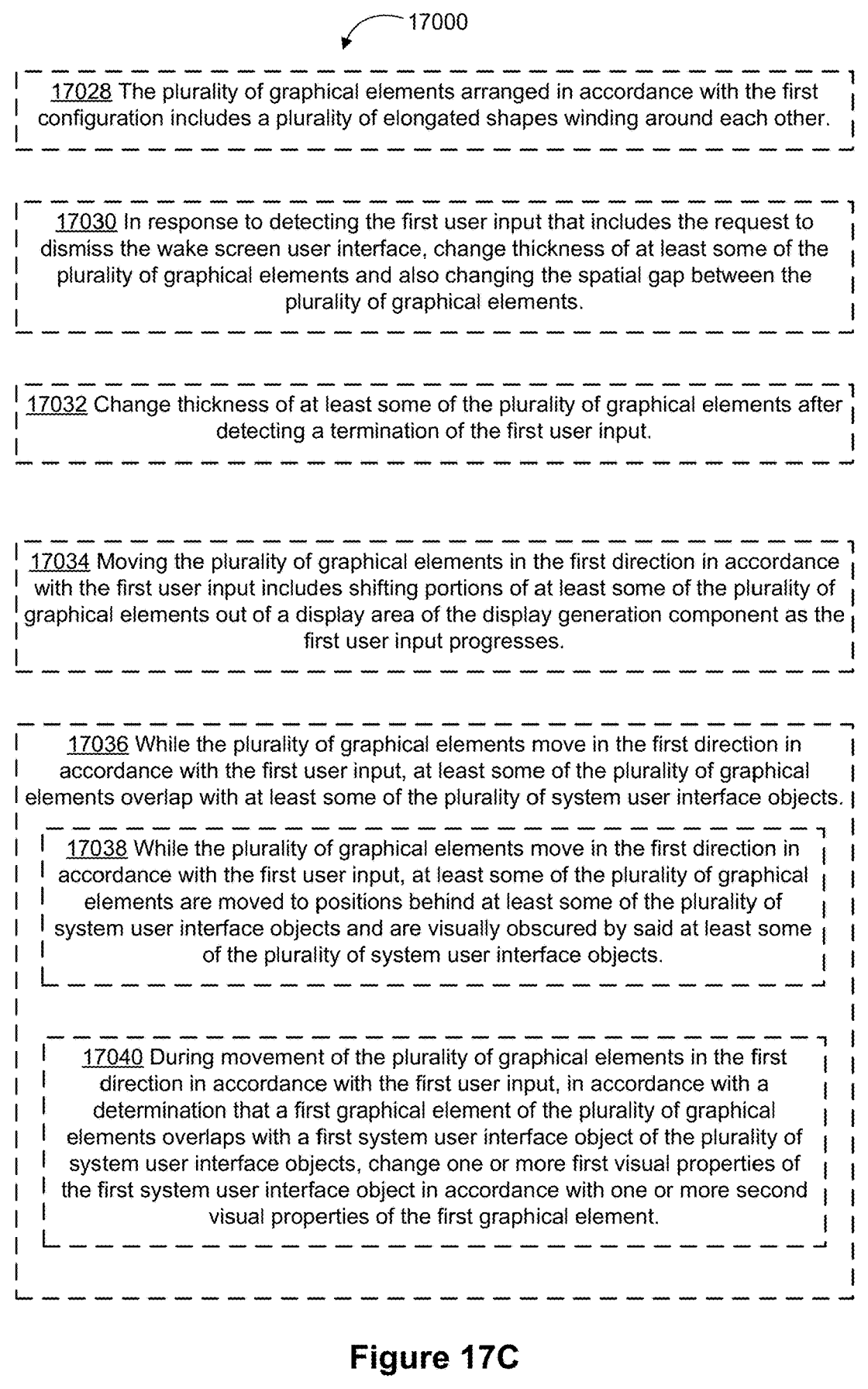

17028 The plurality of graphical elements arranged in accordance with the first configuration includes a plurality of elongated shapes winding around each other.

17030 In response to detecting the first user input that includes the request to dismiss the wake screen user interface, change thickness of at least some of the plurality of graphical elements and also changing the spatial gap between the plurality of graphical elements.

17032 Change thickness of at least some of the plurality of graphical elements after detecting a termination of the first user input.

17034 Moving the plurality of graphical elements in the first direction in accordance with the first user input includes shifting portions of at least some of the plurality of graphical elements out of a display area of the display generation component as the first user input progresses.

17036 While the plurality of graphical elements move in the first direction in accordance with the first user input, at least some of the plurality of graphical elements overlap with at least some of the plurality of system user interface objects.

17038 While the plurality of graphical elements move in the first direction in accordance with the first user input, at least some of the plurality of graphical elements are moved to positions behind at least some of the plurality of system user interface objects and are visually obscured by said at least some of the plurality of system user interface objects.

17040 During movement of the plurality of graphical elements in the first direction in accordance with the first user input, in accordance with a determination that a first graphical element of the plurality of graphical elements overlaps with a first system user interface object of the plurality of system user interface objects, change one or more first visual properties of the first system user interface object in accordance with one or more second visual properties of the first graphical element.

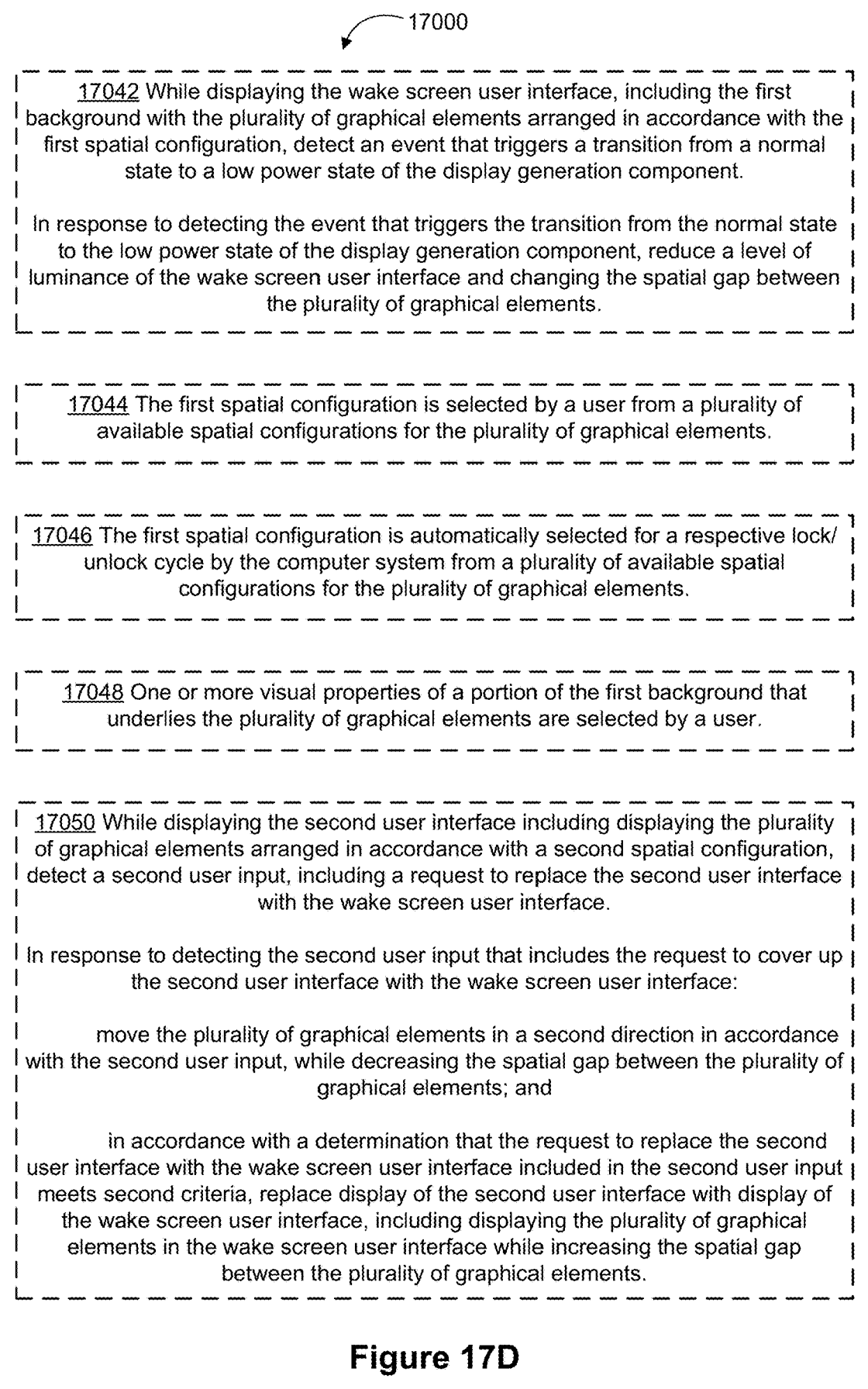

17042 While displaying the wake screen user interface, including the first background with the plurality of graphical elements arranged in accordance with the first spatial configuration, detect an event that triggers a transition from a normal state to a low power state of the display generation component.

In response to detecting the event that triggers the transition from the normal state to the low power state of the display generation component, reduce a level of luminance of the wake screen user interface and changing the spatial gap between the plurality of graphical elements.

17044 The first spatial configuration is selected by a user from a plurality of available spatial configurations for the plurality of graphical elements.

17046 The first spatial configuration is automatically selected for a respective lock/unlock cycle by the computer system from a plurality of available spatial configurations for the plurality of graphical elements.

17048 One or more visual properties of a portion of the first background that underlies the plurality of graphical elements are selected by a user.

17050 While displaying the second user interface including displaying the plurality of graphical elements arranged in accordance with a second spatial configuration, detect a second user input, including a request to replace the second user interface with the wake screen user interface.

In response to detecting the second user input that includes the request to cover up the second user interface with the wake screen user interface:

move the plurality of graphical elements in a second direction in accordance with the second user input, while decreasing the spatial gap between the plurality of graphical elements; and in accordance with a determination that the request to replace the second user interface with the wake screen user interface included in the second user input meets second criteria, replace display of the second user interface with display of the wake screen user interface, including displaying the plurality of graphical elements in the wake screen user interface while increasing the spatial gap between the plurality of graphical elements.

Figure 17D

DEVICES, METHODS, AND GRAPHICAL USER INTERFACES FOR PROVIDING NOTIFICATIONS AND APPLICATION INFORMATION

RELATED APPLICATIONS

This applications claims priority to U.S. Provisional Application Ser. No. 63/349,128, filed Jun. 5, 2022, and U.S. Provisional Application Ser. No. 63/340,388, filed May 10, 2022, each of which are hereby incorporated by reference in its entirety.

TECHNICAL FIELD

This relates generally to electronic devices with touch-sensitive surfaces, including but not limited to electronic devices with touch-sensitive surfaces that display notifications and application information for applications of the electronic device.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interfaces and objects therein on a display.

Example manipulations include adjusting the position and/or size of one or more user interface objects or activating buttons or opening files/applications represented by user interface objects, as well as associating metadata with one or more user interface objects or otherwise manipulating user interfaces. Example user interface objects include digital images, video, text, icons, control elements such as buttons and other graphics.

But methods for performing these manipulations are cumbersome and inefficient. For example, using a sequence of mouse based inputs to select one or more user interface objects and perform one or more actions on the selected user interface objects is tedious and creates a significant cognitive burden on a user. In addition, these methods take longer than necessary, thereby wasting energy. This latter consideration is particularly important in battery-operated devices.

SUMMARY

Accordingly, there is a need for electronic devices with faster, more efficient methods and interfaces for viewing status information and accessing controls for controlling applications. Such methods and interfaces optionally complement or replace conventional methods for viewing status information and accessing controls for controlling applications. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at a computer system that is in communication with a display generation component. The method includes displaying, via the display generation component, a first version of a first user interface that corresponds to a restricted state of the computer system. Displaying the first version of the first user interface includes displaying a first plurality of user interface objects displayed concurrently with a first background in accordance with a first configuration. The first plurality of user interface objects correspond to a first plurality of applications and include respective content from the first plurality of applications and are updated periodically as information represented by the first plurality of user interface objects changes. The method further includes, while displaying the first version of the first user interface, detecting a first input. The method further includes, in response to detecting the first input: in accordance with a determination that the first input meets first criteria, wherein the first criteria require that the first input includes first movement in a first direction in order for the first criteria to be met, replacing display of the first version of the first user interface with display of a second user interface that includes respective representations of a second plurality of applications, wherein the respective representations of the second plurality of applications, when activated, cause the computer system to launch corresponding applications of the respective representations; and in accordance with a determination that the first input meets second criteria, wherein the second criteria require that the first input includes second movement in a second direction, different from the first direction, in order for the second criteria to be met, replacing display of the first version of the first user interface with display of a second version of the first user interface, wherein displaying the second version of the first user interface includes displaying a second plurality of user interface objects concurrently with a second background in accordance with a second configuration. The second plurality of user interface objects correspond to a third plurality of applications and include respective content from the third plurality of applications and are updated periodically as information represented by the second plurality of user interface objects changes. The first background is different from the second background, the first plurality of user interface objects is different from the second plurality of user interface objects, and/or the first configuration is different from the second configuration.

In accordance with some embodiments, a method is performed at a computer system that is in communication with a display generation component. The method includes detecting a request to change a wake user interface of the computer system. The wake user interface is a user interface that is displayed when the computer system is turned on or transitioned from a low power state to a higher power state and corresponds to a restricted mode of operation for the computer system. The method further includes, in response to detecting the request to change the wake user interface of the computer system, displaying, via the display generation component, a first user interface for changing the wake user interface for the computer system. The method further includes, while displaying the first user interface, concurrently displaying a first representation of the wake user interface, and a first representation of a home user interface, where the home user interface is a user interface that is displayed when the wake user interface is dismissed and the computer system has exited the restricted mode of operation. The first representation of the wake user interface corresponds to a first set of one or more wake user interface settings including a first wake user interface background. The first representation of the home user interface corresponds to a first set of one or more home user interface settings including a first home user interface background. The method further includes displaying a second representation of the wake user interface. The second representation of the wake user interface corresponds to a second set of one or more wake user interface settings including a second wake user interface background that is different from the first wake user interface background. The method further includes detecting a sequence of one or more inputs corresponding to selection of a respective representation of the wake user interface for the computer system from the first user interface. The method further includes, in response to detecting the sequence of one or more inputs: in accordance with a determination that the first representation of the wake user interface was selected based on the sequence of one or more inputs, setting the wake user interface of the computer system based on the first set of one or more wake user interface settings associated with the first representation of the wake user interface, including using the first wake user interface background as a respective background for the wake user interface and setting the home user interface of the computer system based on the first set of one or more home user interface settings, including using the first home user interface background as a respective background for the home user interface; and in accordance with a determination that the second representation of the wake user interface was selected based on the sequence of one or more inputs, setting the wake user interface of the computer system based on the second set of one or more wake user interface settings associated with the second representation of the wake user interface, including using the second wake user interface background as the background for the wake user interface.

In accordance with some embodiments, a method is performed at a computer system that is in communication with a display generation component. The method includes displaying, via the display generation component, a first user interface for configuring a wake user interface. A respective version of the wake user interface includes a respective background and a respective plurality of editable user interface objects overlaying the respective background. The first user interface displays at least a first representation of a first version of the wake user interface illustrating a first plurality of editable user interface objects overlaying a first background. The method further includes, while displaying the first user interface, detecting a first input directed to the first user interface. The method further includes, in response to detecting the first input directed to the first user interface: in accordance with a determination that the first input meets first criteria, displaying a second user interface for editing a first user interface object of the first plurality of editable user interface objects, wherein the first user interface object is selected in accordance with a location of the first input; and in accordance with a determination that the first input meets second criteria different from the first criteria, updating the first user interface to replace display of the first representation of the first version of the wake user interface with display of a second representation of a second version of the wake user interface. The second representation of the second version of the wake user interface includes a second plurality of editable user interface objects overlaying a second background that is different from the first background. The second plurality of editable user interface objects is different from the first plurality of editable user interface objects.

In accordance with some embodiments, a method is performed at a computer system with a display generation component and one or more input devices. The method includes displaying, via the display generation component, a first user interface that includes a plurality of notifications including: in accordance with a determination that the computer system has a first mode for displaying notifications enabled, displaying a representation of the plurality of notifications in a first configuration in a first region of the first user interface; and in accordance with a determination that the computer system has a second mode for displaying notifications enabled, displaying the representation of the plurality of notifications in a second configuration in a second region of the first user interface that is smaller than the first region of the first user interface. The method further includes, while displaying the first user interface, detecting a first user input at a respective location on the first user interface corresponding to the representation of the plurality of notifications. The method further includes, in response to detecting the first user input, and while continuing to detect the first user input: in accordance with a determination that the first user input meets first criteria and in accordance with a determination that the representation of the plurality of notifications is displayed with the first configuration, scrolling notifications in the plurality of notifications in the first region of the first user interface in accordance with the first user input; and in accordance with a determination that the first user input meets the first criteria and in accordance with a determination that the representation of the plurality of notifications is displayed with the second configuration, scrolling the notifications in the plurality of notifications in a third region of the first user interface, in accordance with the first user input.

In accordance with some embodiments, a method is performed at a computer system that is in communication with a display generation component. The method includes detecting one or more inputs to subscribe to updates from a first application for a first event, and to subscribe to updates from a second application for a second event. The method further includes displaying a first user interface. The first user interface includes a first region at a first location in the first user interface. Displaying the first user interface includes: in accordance with a determination that the first event is active and that the second event is not active, displaying a first representation of the first event in the first region of the first user interface, and updating first information contained in the first representation of the first event in accordance with updates received from the first application for the first event; and in accordance with a determination that the second event is active and that the first event is not active, displaying a second representation of the second event in the first region of the first user interface, and updating second information contained in the second representation of the second event in accordance with updates received from the second application for the second event.

In accordance with some embodiments, a method is performed at a computer system with a display generation component and one or more input devices. The method includes, while displaying a wake user interface that includes a representation of a first plurality of notifications in a first configuration, wherein the wake user interface is a user interface that is displayed when the computer system wakes from a low power state, detecting, via the one or more input devices, a first user input. The method further includes, in response to detecting the first user input: in accordance with a determination that the first user input meets first criteria, displaying the representation of the first plurality of notifications in a second configuration on the wake user interface, wherein the second configuration is different from the first configuration; and in accordance with a determination that the first user input does not meet the first criteria, maintaining display of the representation of the first plurality of notifications in the first configuration on the wake user interface. The method further includes, after detecting the first user input, detecting an occurrence of a condition that causes the computer system to redisplay the wake user interface. The method further includes, in response to detecting the occurrence of the condition that causes the computer system to redisplay the wake user interface: in accordance with a determination that the first user input met the first criteria, displaying a representation of a second plurality of notifications in the second configuration; and in accordance with a determination that the first user input did not meet the first criteria, displaying the representation of the second plurality of notifications in the first configuration.

In accordance with some embodiments, a method is performed at a computer system with a display generation component. The method includes displaying, via the display generation component, a first user interface for configuring a system user interface that has a first background and a first set of one or more system user interface objects overlaying the first background, wherein: while the system user interface is displayed, the computer system automatically shuffles through two or more media items selected from a collection of media items in the first background over time; the first user interface includes respective selectable representations of a plurality of categories for media items associated with the computer system, including at least a first selectable representation of a first category and a second selectable representation of a second category; a first plurality of media items associated with the computer system are automatically selected for inclusion in the first category based on the first plurality of media items containing automatically detected content of a first type; and a second plurality of media items associated with the computer system are automatically selected for inclusion in the second category based on the second plurality of media items containing automatically detected content of a second type. The method further includes, while displaying the first user interface for configuring the system user interface, detecting a first input selecting a set of one or more of the plurality of categories; and after the set of one or more of the plurality of categories were selected by the first input, displaying the system user interface, wherein displaying the system user interface includes, over time displaying the system user interface with a plurality of versions of the first background that respectively include media items selected from media items in respective categories in the set of one or more of the plurality of categories, wherein: in accordance with a determination that the set of one or more of the plurality of categories includes the first category, without including the second category, the plurality of versions of the first background include media items from the first category without including media items from the second category; in accordance with a determination that the set of one or more of the plurality of categories includes the second category, without including the first category, the plurality of versions of the first background include media items from the second category without including media items from the first category; and in accordance with a determination that the set of one or more of the plurality of categories includes the first category and the second category, the plurality of versions of the first background include one or more media items from the first category and one or more media items from the second category.

In accordance with some embodiments, a method is performed at a computer system with a display generation component. The method includes displaying, via the display generation component, a first representation of a system user interface, wherein a respective version of the system user interface includes a respective background and a respective set of one or more system user interface objects overlaying the respective background, and wherein the first representation of the system user interface corresponds to a first version of the system user interface illustrating a first set of one or more system user interface objects overlaying a first background. The method further includes, while displaying the first representation of the system user interface that corresponds to the first version of the system user interface, detecting occurrence of a first condition that causes the computer system to change an appearance of the system user interface based on a first combination of a first background media item and a first filter for the system user interface. The method includes in response to detecting the occurrence of the first condition that causes the computer system to change the appearance of the system user interface based on the first combination of the first background media item and the first filter for the system user interface: in accordance with a determination that the first combination of the first background media item and the first filter meets first criteria, wherein the first criteria require that a first set of one or more visual properties of the first background media item meets a first requirement in order for the first combination of the first background media item and the first filter to meet the first criteria, applying a first version of the first filter to the first background media item to create a second version of the system user interface by modifying the first background media item in a first manner; and in accordance with a determination that the first combination of the first background media item and the first filter meets second criteria, wherein the second criteria require that the first set of one or more visual properties of the first background media item meets a second requirement different from the first requirement in order for the first background media item to meet the second criteria, applying a second version of the first filter to the first background media item to create the second version of the system user interface by modifying the first background media item in a second manner that is different from the first manner.

In accordance with some embodiments, a method is performed at a computer system with a display generation component. The method includes displaying, via the display generation component, a wake screen user interface that corresponds to a restricted state of the computer system, including displaying a first background and a plurality of system user interface objects overlaying at least a portion of the first background, wherein the first background includes a plurality of graphical elements arranged in accordance with a first spatial configuration. The method further includes, while displaying the wake screen user interface that corresponds to the restricted state of the computer system, detecting a first user input, including a request to dismiss the wake screen user interface. The method includes, in response to detecting the first user input that includes the request to dismiss the wake screen user interface: moving the plurality of graphical elements in a first direction in accordance with the first user input, while increasing a spatial gap between the plurality of graphical elements; and in accordance with a determination that the request to dismiss the wake screen user interface included in the first user input meets first criteria, replacing display of the wake screen user interface that corresponds to the restricted state of the computer system with display of a second user interface different from the wake screen user interface, including displaying the plurality of graphical elements in the second user interface while reducing the spatial gap between the plurality of graphical elements.

In accordance with some embodiments, an electronic device includes a display, a touch-sensitive surface, optionally one or more sensors to detect intensities of contacts with the touch-sensitive surface, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions that, when executed by an electronic device with a display, a touch-sensitive surface, optionally one or more sensors to detect intensities of contacts with the touch-sensitive surface, and optionally one or more tactile output generators, cause the device to perform or cause performance of the operations of any of the methods described herein. In accordance with some embodiments, a graphical user interface on an electronic device with a display, a touch-sensitive surface, optionally one or more sensors to detect intensities of contacts with the touch-sensitive surface, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, optionally one or more sensors to detect intensities of contacts with the touch-sensitive surface, and optionally one or more tactile output generators; and means for performing or causing performance of the operations of any of the methods described herein. In accordance with some embodiments, an information processing apparatus, for use in an electronic device with a display, a touch-sensitive surface, optionally one or more sensors to detect intensities of contacts with the touch-sensitive surface, and optionally one or more tactile output generators, includes means for performing or causing performance of the operations of any of the methods described herein.

Thus, electronic devices with displays, touch-sensitive surfaces, optionally one or more sensors to detect intensities of contacts with the touch-sensitive surface, optionally one or more tactile output generators, optionally one or more device orientation sensors, and optionally an audio system, are provided with improved methods and interfaces for modifying user interfaces and displaying notifications and/or status information, thereby increasing the effectiveness, efficiency, and user satisfaction with such devices. Such methods and interfaces may complement or replace conventional methods for modifying user interfaces and displaying notifications and/or status information.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 1B is a block diagram illustrating example components for event handling in accordance with some embodiments.

FIGS. 7A-7V-3 illustrate a representation of a plurality of notifications in different configurations, and user inputs for switching between the different configurations in accordance with some embodiments.

FIGS. 9A-9I are flow diagrams of a process for changing a user interface based on a user input in accordance with some embodiments.

FIGS. 10A-10I are flow diagrams of a process for selecting and/or modifying a user interface in accordance with some embodiments.

FIGS. 11A-11H are flow diagrams of a process for modifying a user interface in accordance with some embodiments.

FIGS. 12A-12E are flow diagrams of a process for displaying a representation of a plurality of notifications in different configurations in accordance with some embodiments.

FIGS. 13A-13G are flow diagrams of a process for displaying status information in a session region based on subscriptions in accordance with some embodiments.

FIGS. 14A-14G are flow diagrams of a process for changing between different configurations in which a representation of a plurality of notifications can be displayed in accordance with some embodiments.

FIGS. 15A-15I are flow diagrams of a process for automatically shuffling through media items as a background in accordance with some embodiments.

FIGS. 16A-16J are flow diagrams of a process for applying different versions of a filter to a background media item in accordance with some embodiments.

FIGS. 17A-17D are flow diagrams of a process for providing feedback on a system user interface in accordance with some embodiments.

DESCRIPTION OF EMBODIMENTS

Many electronic devices have graphical user interfaces that allow a user to navigate between application user interfaces and/or system user interfaces. Some methods for navigating between user interfaces enable multitasking, such that a respective application continues to update in the background even after navigating away from the respective application user interface. Some methods for providing a system user interface limit customizations made to the system user interface, which can obscure certain elements and/or status information displayed on the system user interface. For example, with these methods, a user may need to navigate back to the respective application user interface in order to view the updates. In the embodiments described below, an improved method for providing status updates for a plurality of applications within a persistent session region is provided. This method streamlines the user's ability to view real-time status information for active sessions, thereby eliminating the need for extra, separate steps to navigate back to the respective user interface of the respective application to view a status update.

The methods, devices, and GUIs described herein use haptic feedback to improve user interface interactions in multiple ways. For example, they make it easier to indicate hidden thresholds and indicate user interface components that represent selectable options.

The processes described below enhance the operability of the devices and make the user-device interfaces more efficient (e.g., by helping the user to provide proper inputs and reducing user mistakes when operating/interacting with the device) through various techniques, including by providing improved visual, audio, and/or tactile feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

Figure 1A:
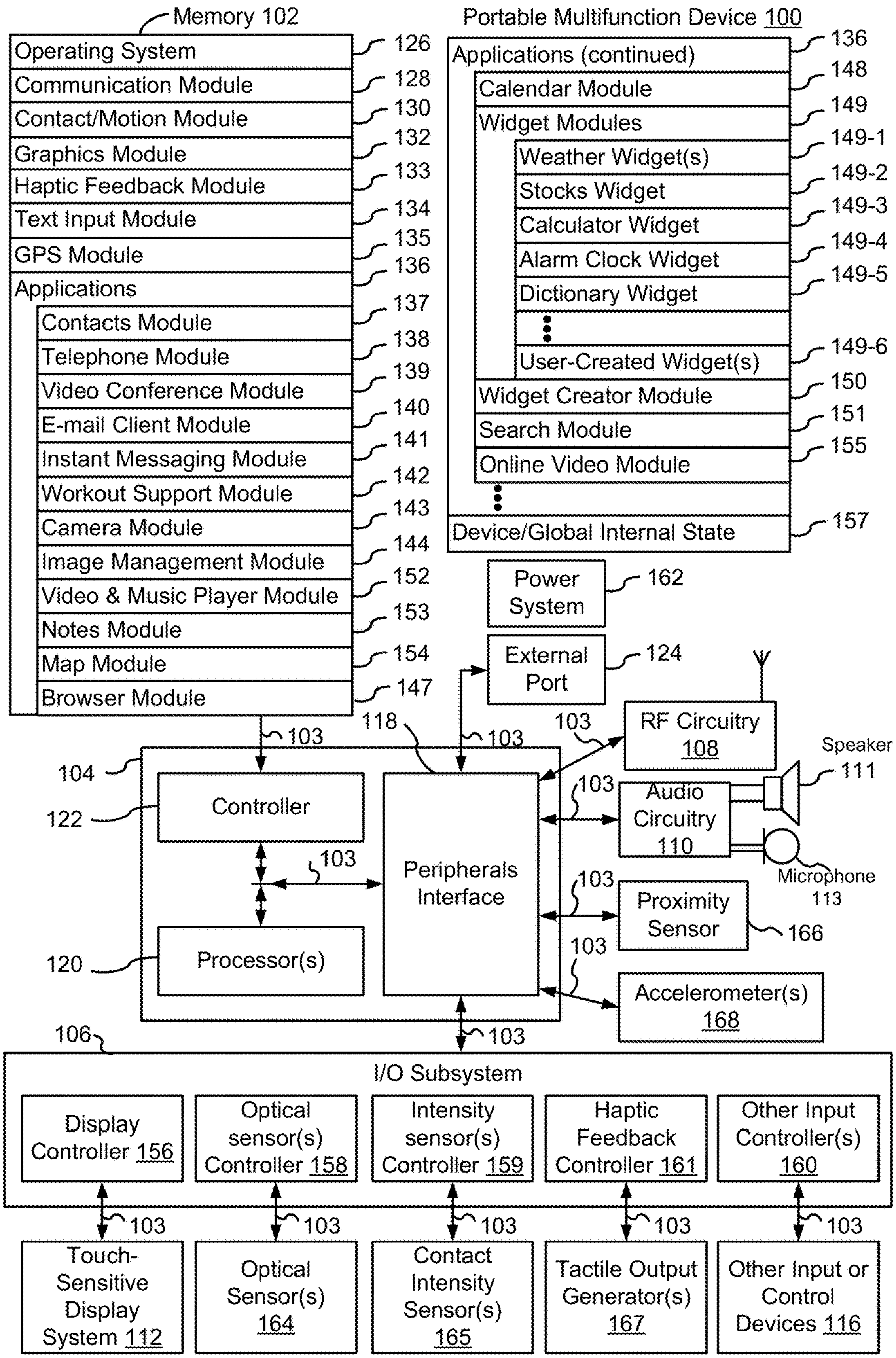
FIG. 1A is a block diagram illustrating a portable multifunction device with a touch-sensitive display in accordance with some embodiments.
Figure 2:
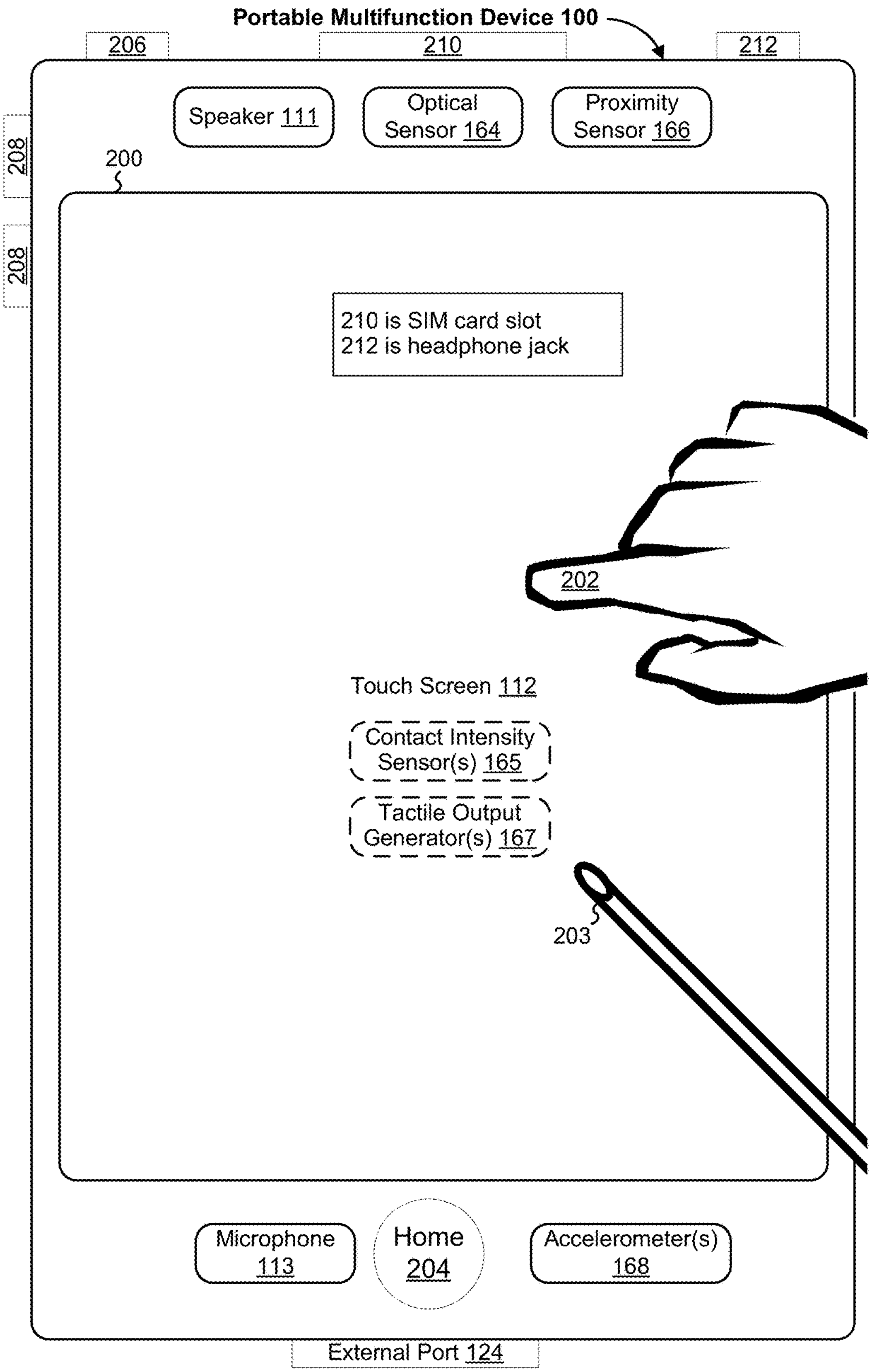
FIG. 2 illustrates a portable multifunction device having a touch screen in accordance with some embodiments.
Figure 3:
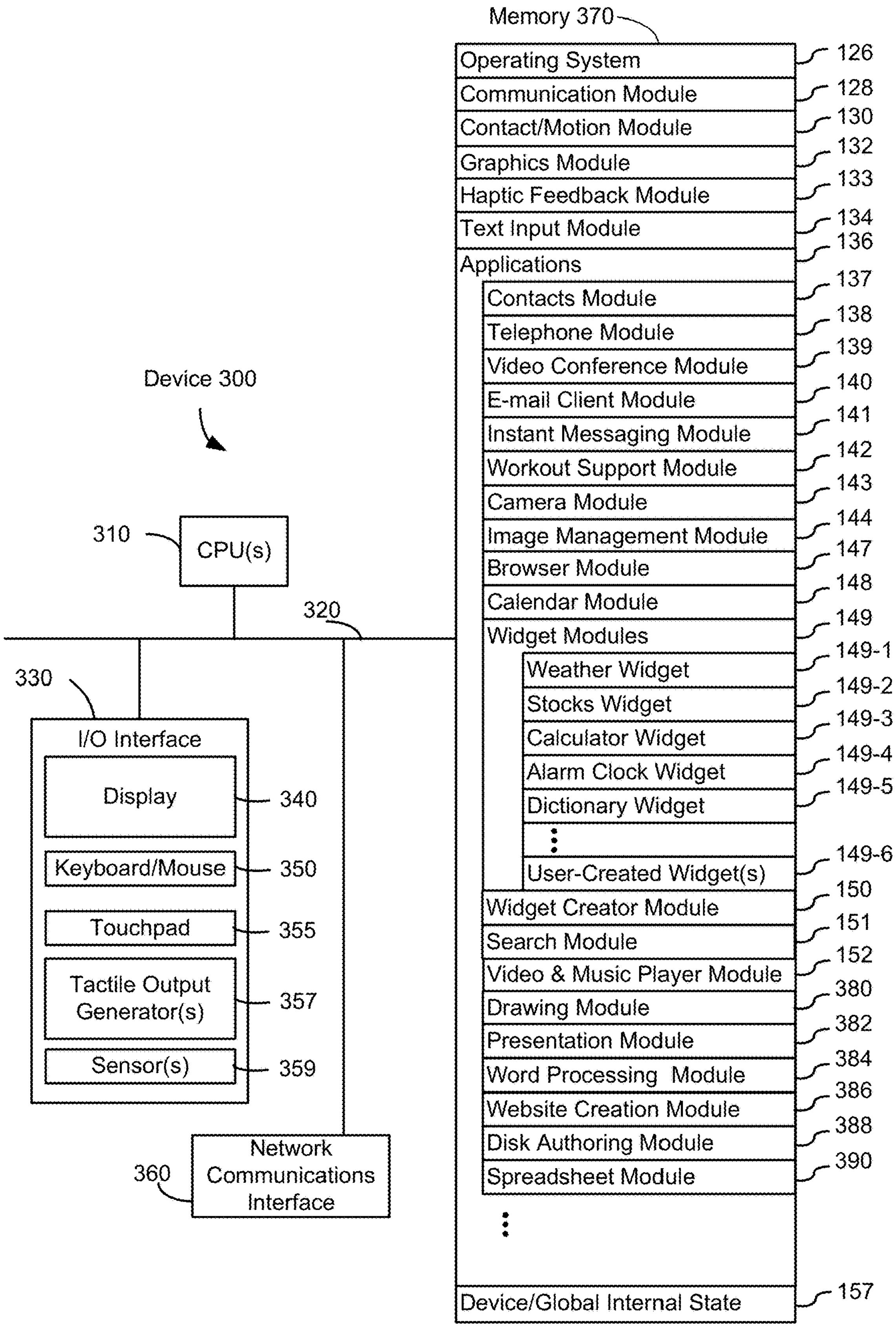
FIG. 3 is a block diagram of an example multifunction device with a display and a touch-sensitive surface in accordance with some embodiments.

Below, FIGS. 1A-1B, 2, and 3 provide a description of example devices. FIGS. 4A-4B and 5A-5CB illustrate example user interfaces for navigating and editing respective types of user interfaces. FIGS. 6A-6AR illustrate example user interfaces for an expanded face switcher. FIGS. 7A-7V-3 illustrate a representation of a plurality of notifications in different configurations, and user inputs for switching between the different configurations. FIGS. 8A-8AN illustrate example user interfaces for displaying a session region for ongoing events. FIGS. 9A-9I illustrate a flow diagram of a method of changing a user interface based on a user input. FIGS. 10A-10I illustrate a flow diagram of a method of selecting and/or modifying a user interface. FIGS. 11A-11H illustrate a flow diagram of a method of modifying a user interface. FIG. 12A-12E illustrate a flow diagram of a method of displaying a representation of a plurality of notifications in different configurations. FIGS. 13A-13G illustrate a flow diagram of a method of displaying status information in a session region based on subscriptions. FIGS. 14A-14G illustrate a flow diagram of a method of changing between different configurations in which a representation of a plurality of notifications can be displayed. FIGS. 15A-15I are flow diagrams of a process for automatically shuffling through media items as a background in accordance with some embodiments. FIGS. 16A-16J are flow diagrams of a process for applying different versions of a filter to a background media item in accordance with some embodiments. FIGS. 17A-17D are flow diagrams of a process for providing feedback in a system user interface in accordance with some embodiments. The user interfaces in FIGS. 5A-5CB, 6A-6AR, 7A-7V-3 and 8A-8AN are used to illustrate the processes in FIGS. 9A-9I, 10A-10I, 11A-11H, 12A-12E, 13A-13G, 14A-14G, 15A-15I, 16A-16J, and 17A-17D.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164 (e.g., as part of one or more cameras). FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California. In some embodiments, the external port is a Lightning connector that is the same as, or similar to and/or compatible with the Lightning connector used in some iPhone®, iPod Touch®, and iPad® devices from Apple Inc. of Cupertino, California. In some embodiments, the external port is a USB Type-C connector that is the same as, or similar to and/or compatible with the USB Type-C connector used in some electronic devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have criteria that are met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, the device detects input(s) that corresponds to a request to select one or more of the graphics by detecting a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
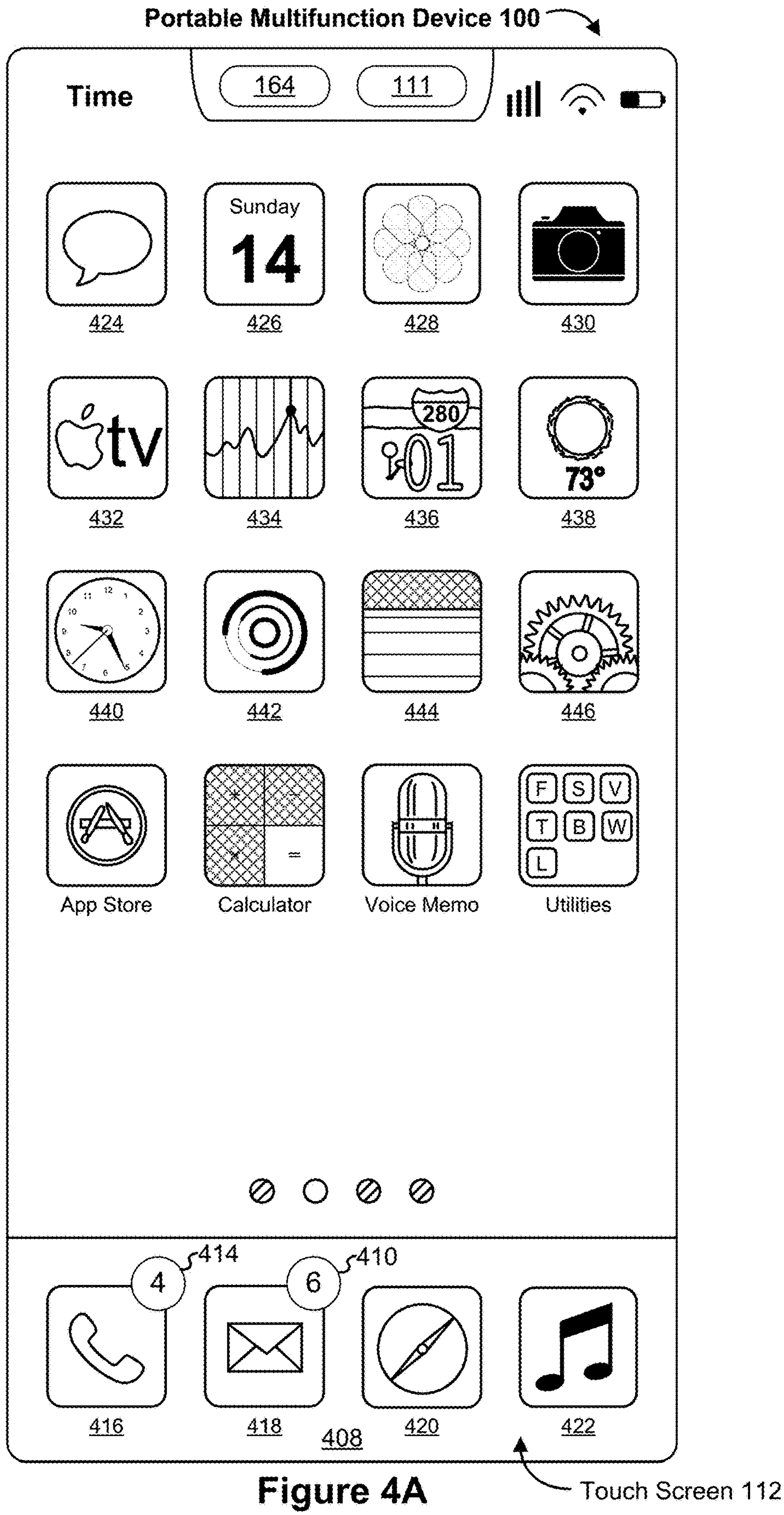
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) for wireless communication(s), such as cellular and Wi-Fi signals;
- Time;
- a Bluetooth indicator;
- a Battery status indicator;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser"; and
  - Icon 422 for video and music player module 152, labeled "Music"; and
- Icons for other applications, such as:
  - Icon 424 for IM module 141, labeled "Messages";
  - Icon 426 for calendar module 148, labeled "Calendar";

- Icon 428 for image management module 144, labeled "Photos";
- Icon 430 for camera module 143, labeled "Camera";
- Icon 432 for online video module 155, labeled "Online Video";
- Icon 434 for stocks widget 149-2, labeled "Stocks";
- Icon 436 for map module 154, labeled "Maps";
- Icon 438 for weather widget 149-1, labeled "Weather";
- Icon 440 for alarm clock widget 149-4, labeled "Clock";
- Icon 442 for workout support module 142, labeled "Workout Support";
- Icon 444 for notes module 153, labeled "Notes"; and
- Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
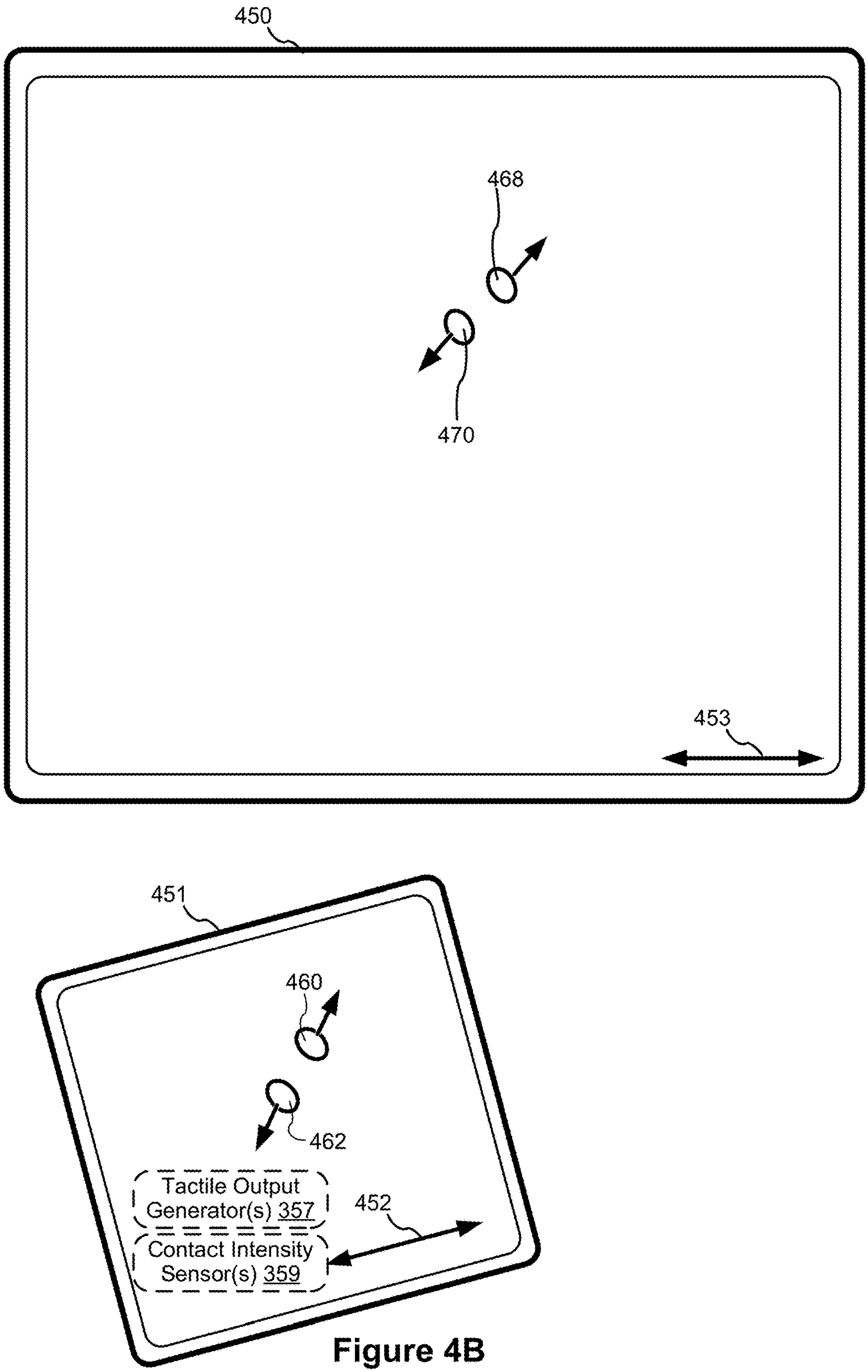
FIG. 4B illustrates an example user interface for a multifunction device with a touch-sensitive surface that is separate from the display in accordance with some embodiments.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the device responds to the user's input to the user interface object when the user initiates the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the device responds to the user's input to the user interface object when the user directs his or her attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, (optionally) one or more tactile output generators for generating tactile outputs, and (optionally) one or more sensors to detect intensities of contacts with the touch-sensitive surface.

Figure 5B:
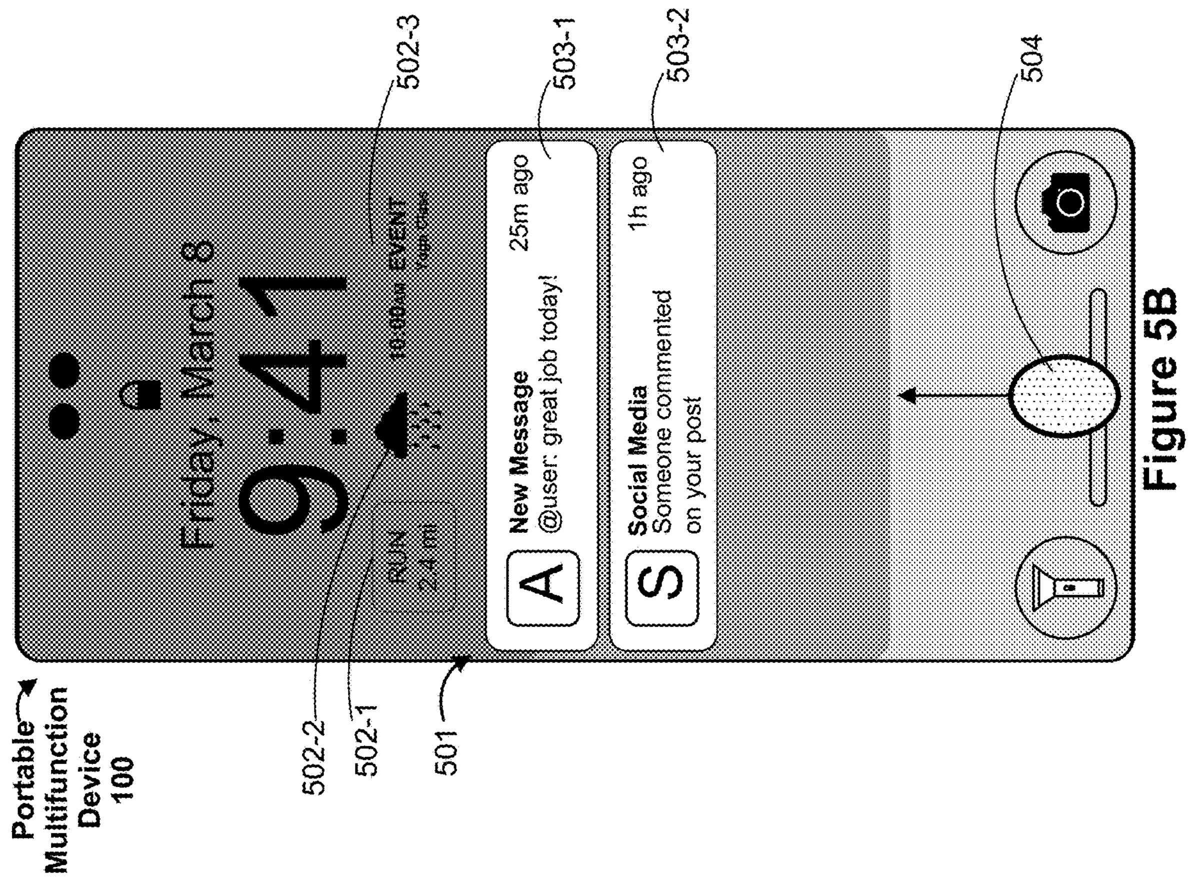
FIGS. 5A-5CB illustrate example user interfaces for navigating and editing respective types of user interfaces in accordance with some embodiments.
Figure 5A:
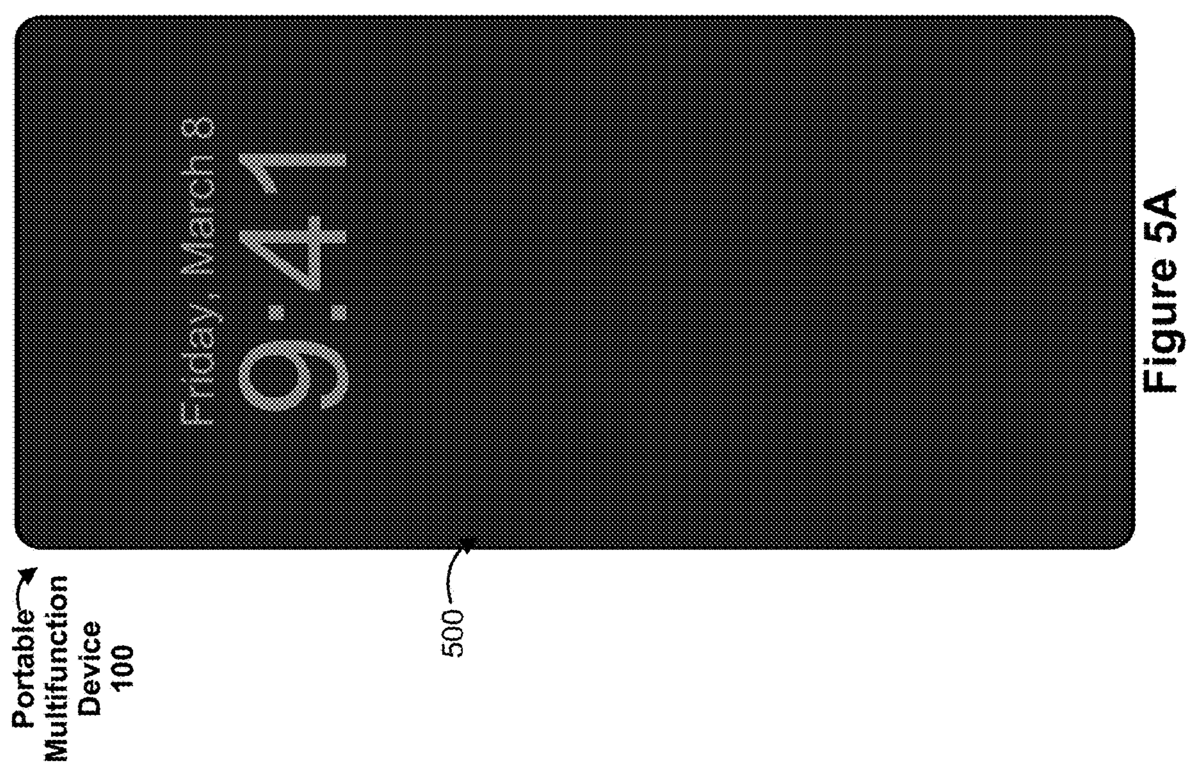
Figure 5C:
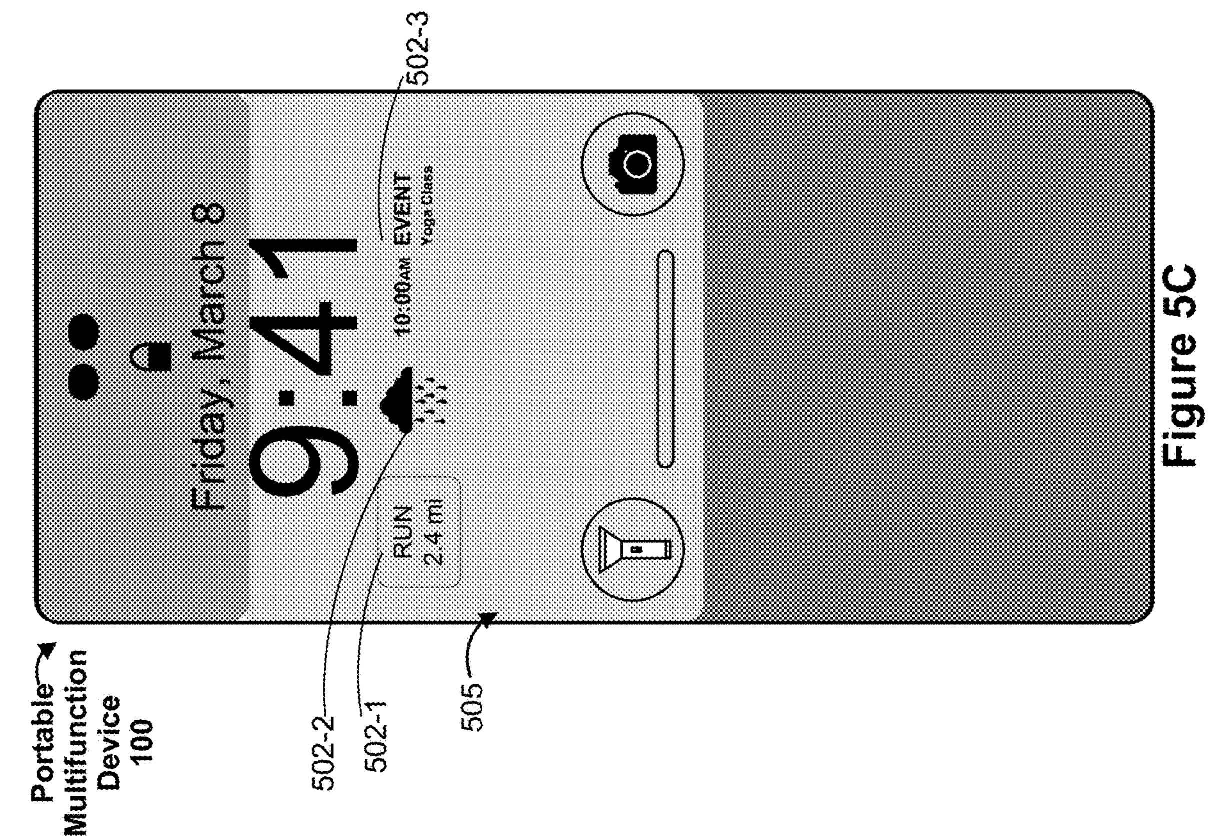
Figure 6A:
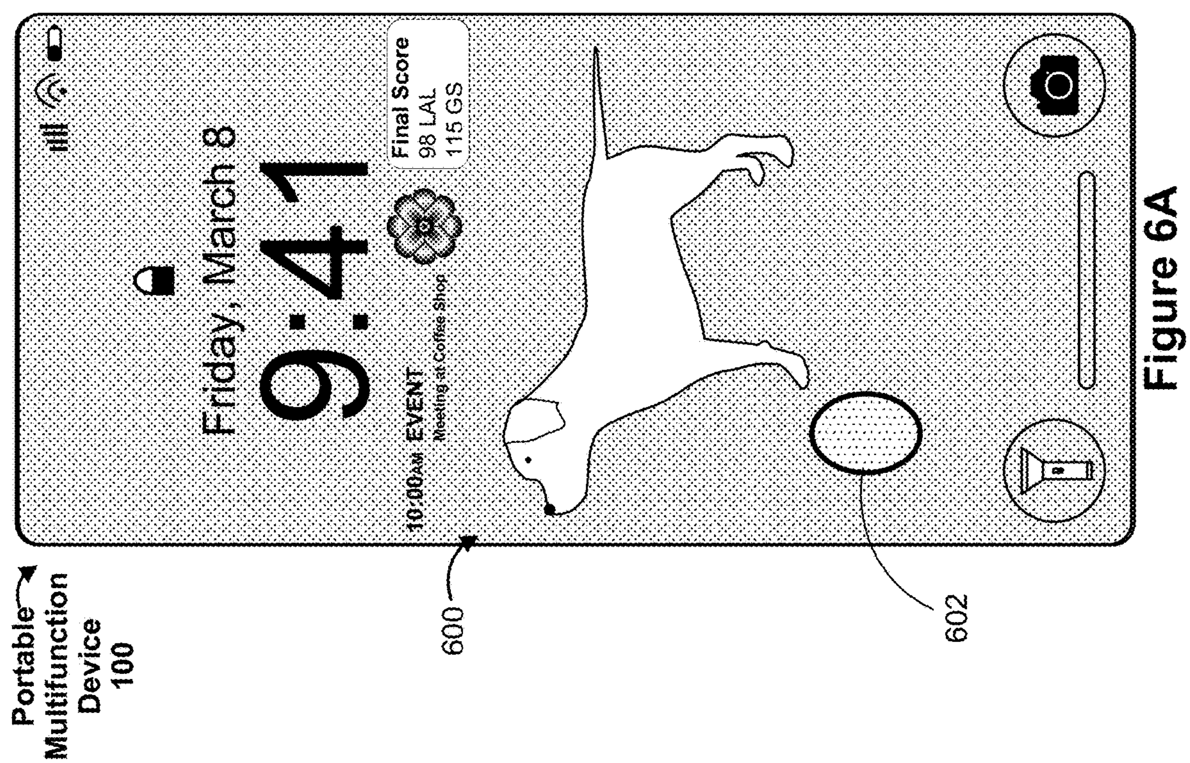
FIGS. 6A-6AR illustrate example user interfaces for an expanded face switcher in accordance with some embodiments.
Figure 7B:
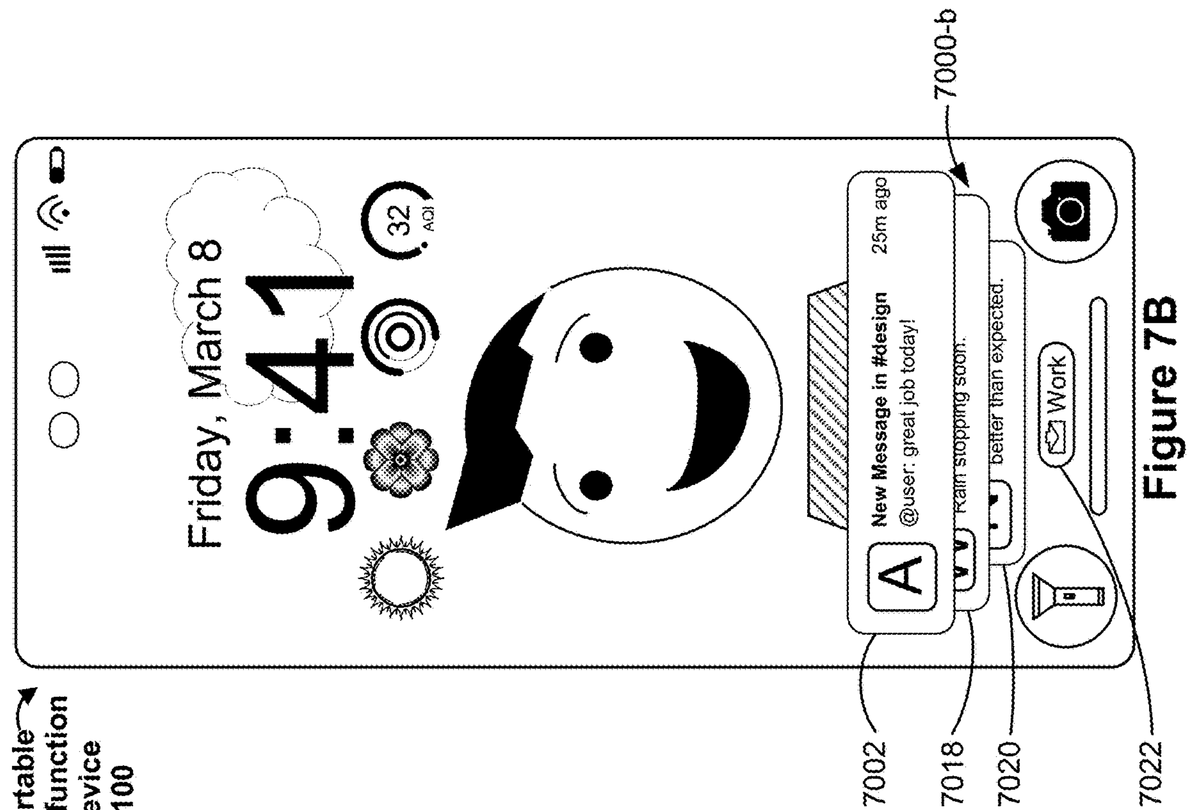
Figure 7A:
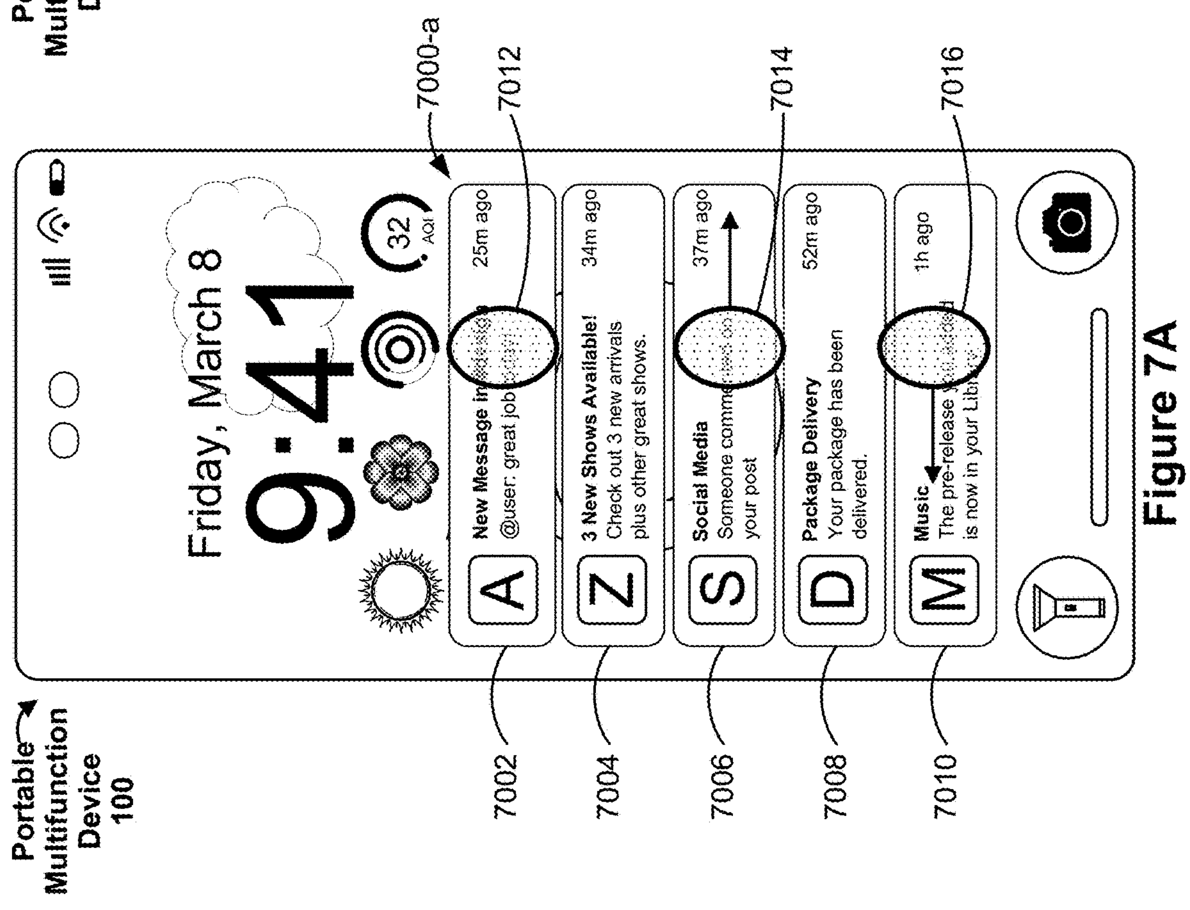
Figures 7C, 7D:
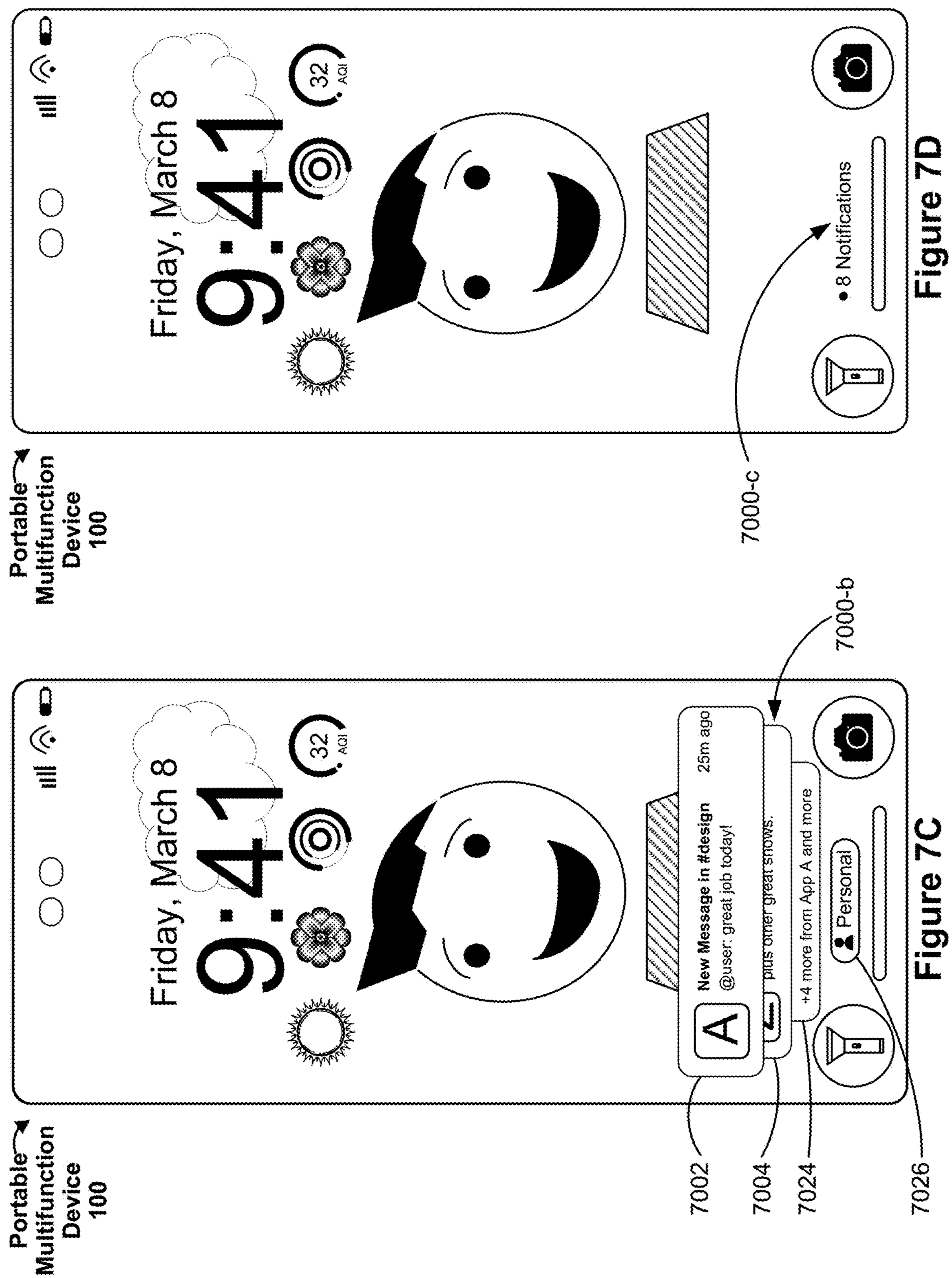
Figure 7E:
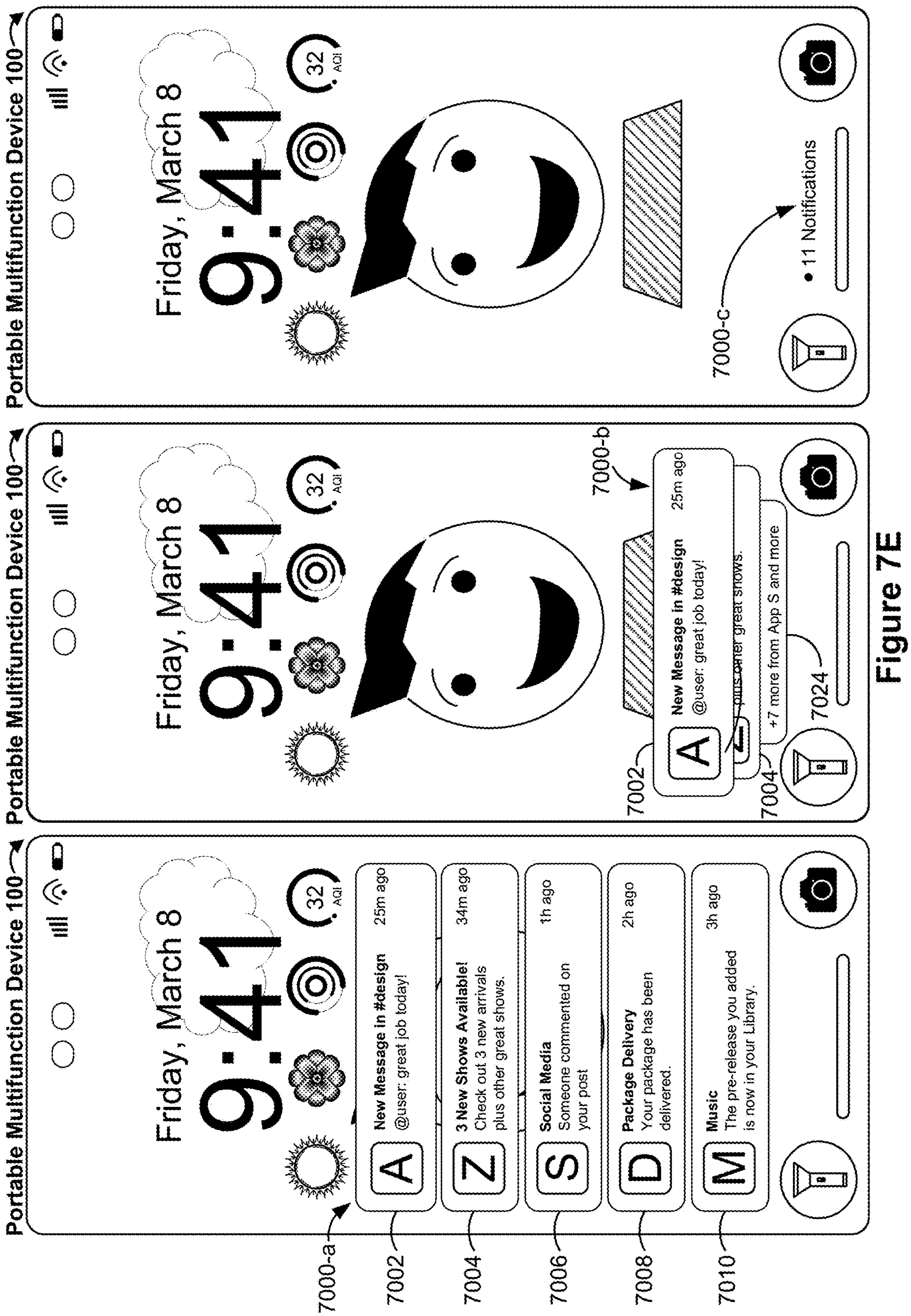
Figures 7F, 7G:
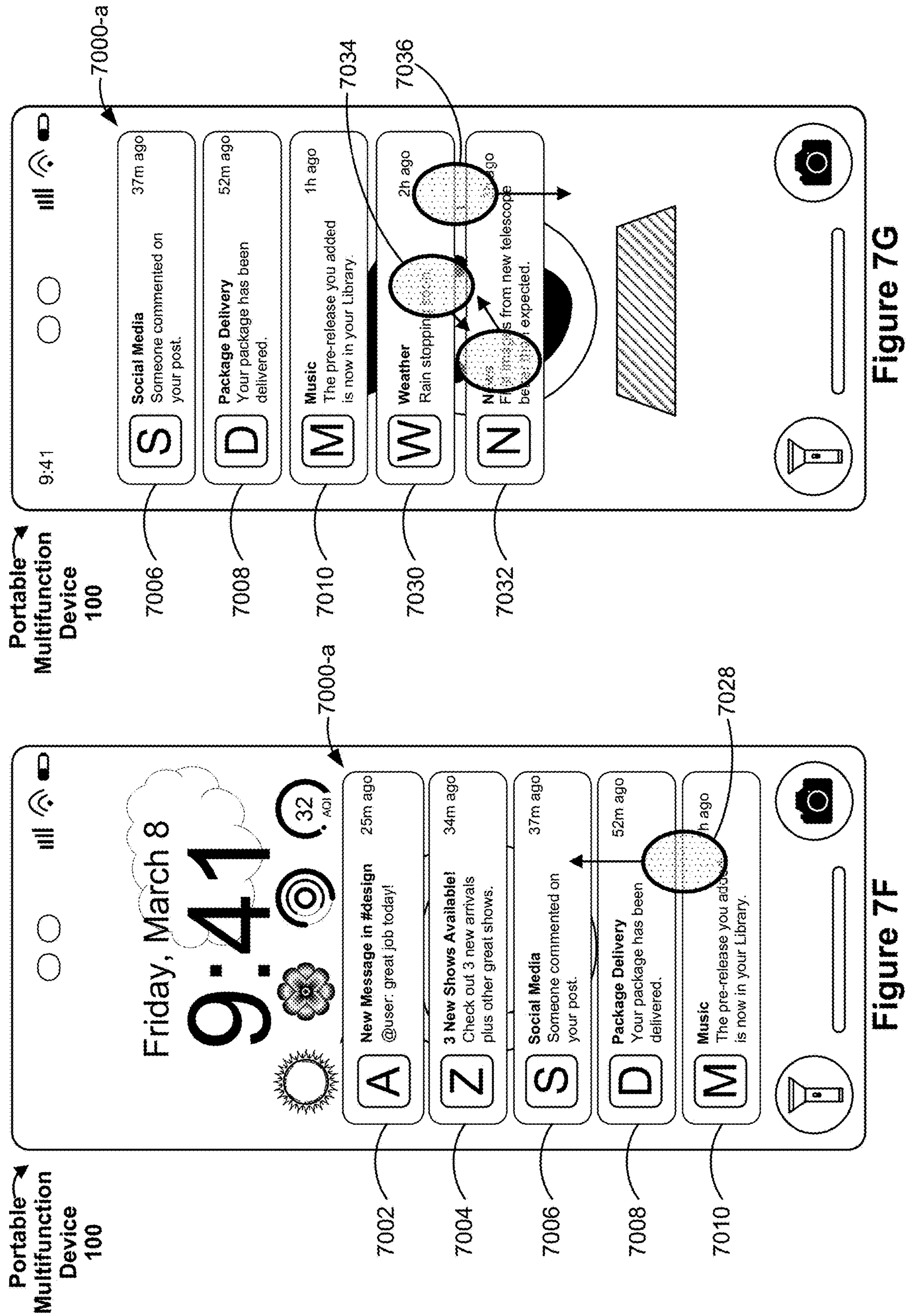
Figure 7I:
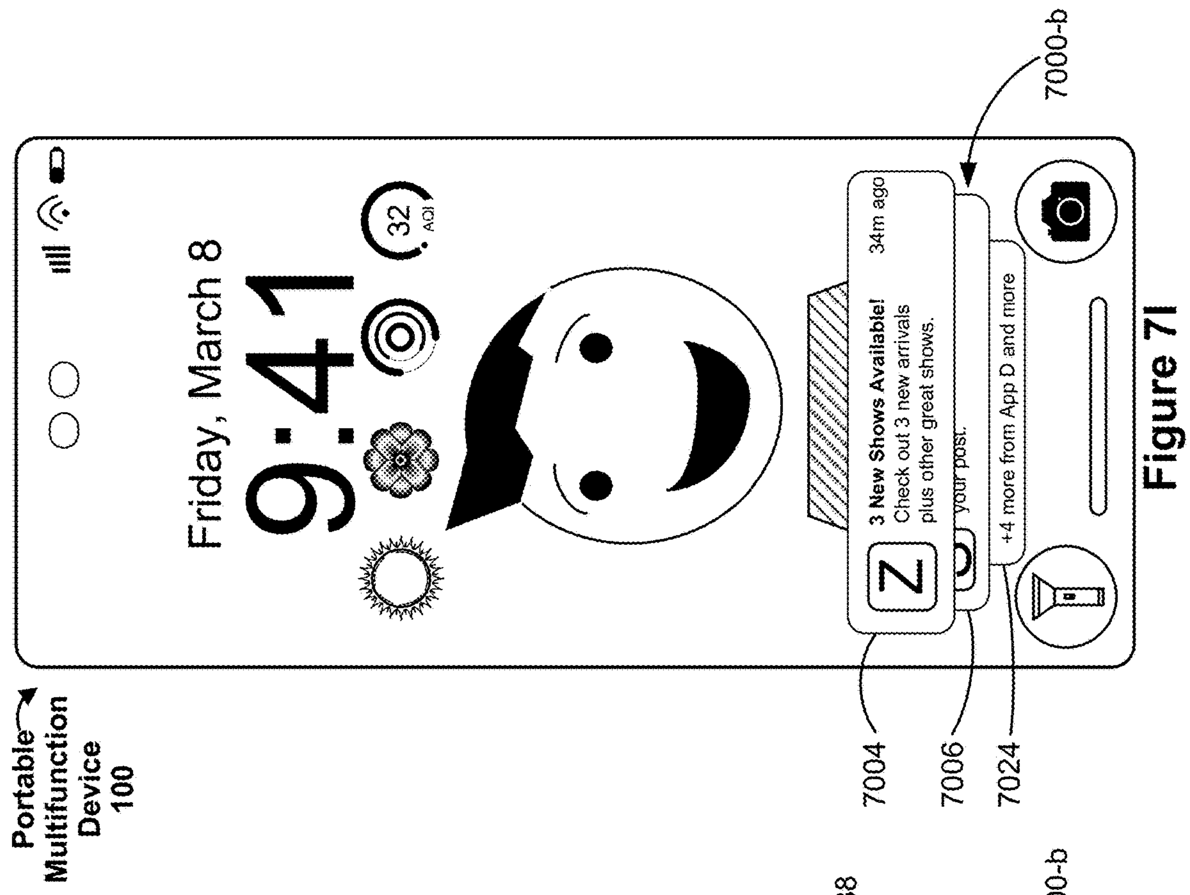
Figure 7H:
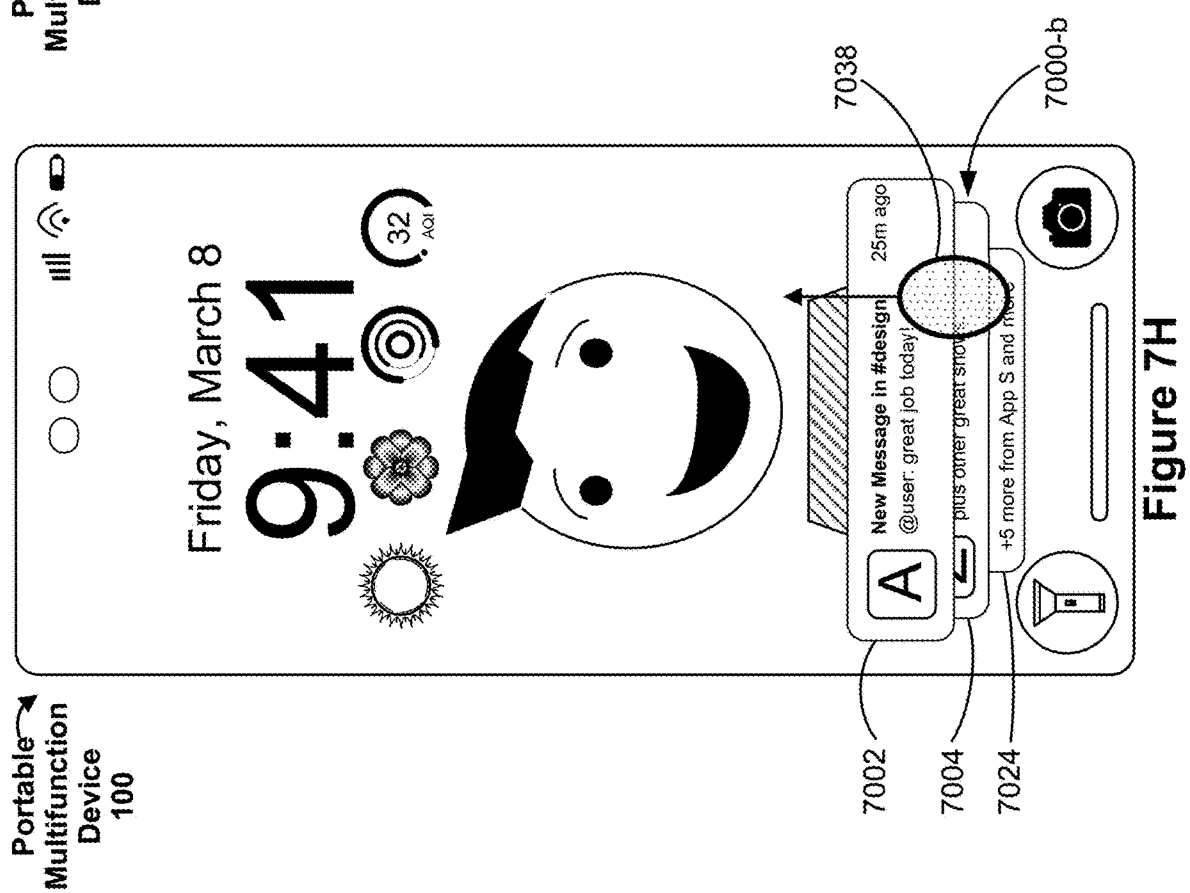
Figure 7K:
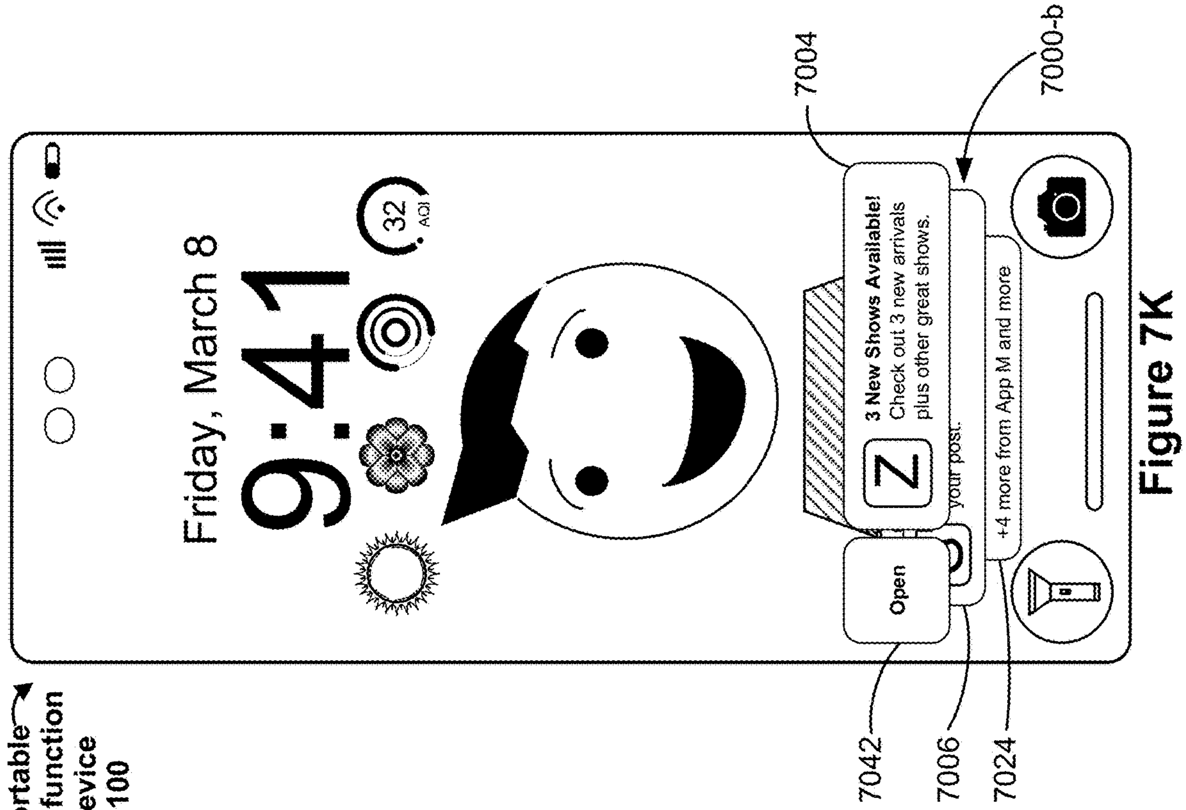
Figure 7J:
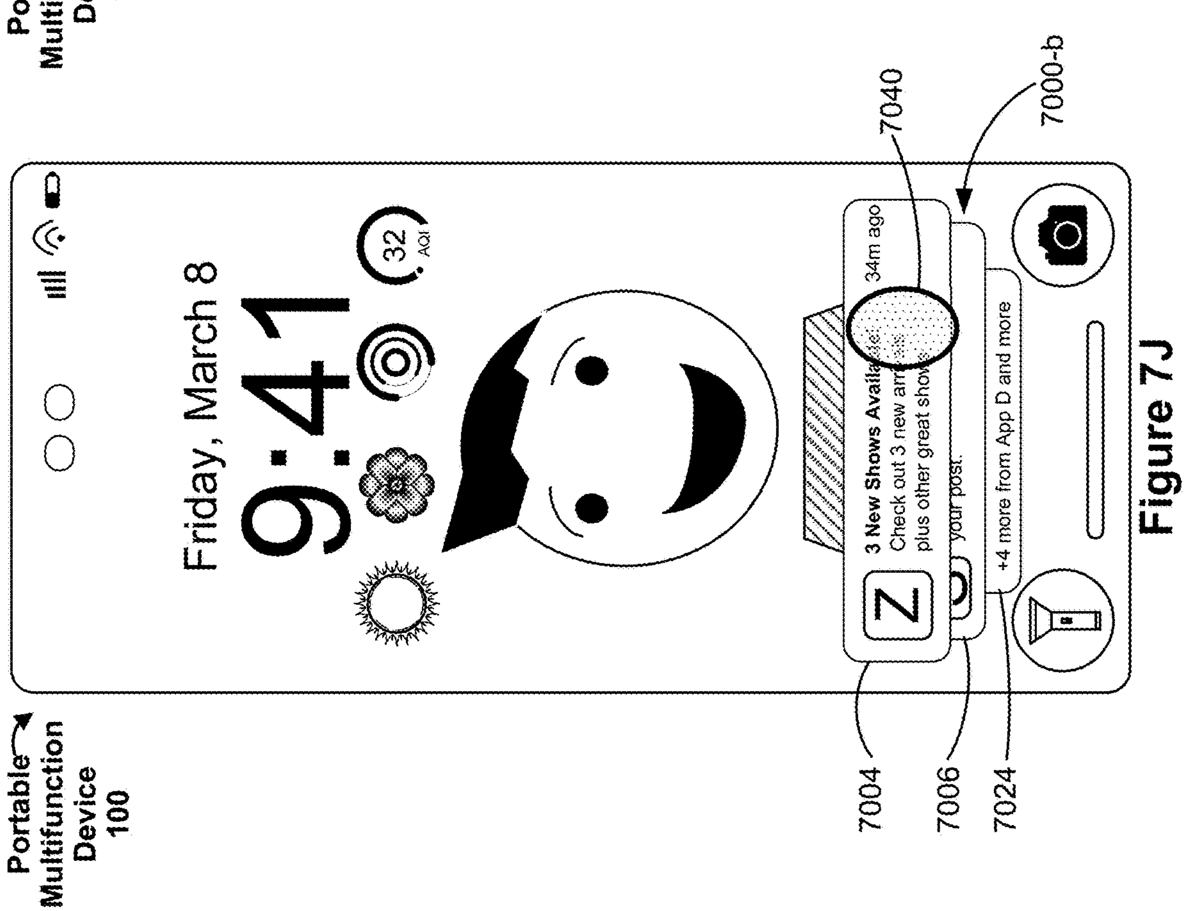
Figure 7M:
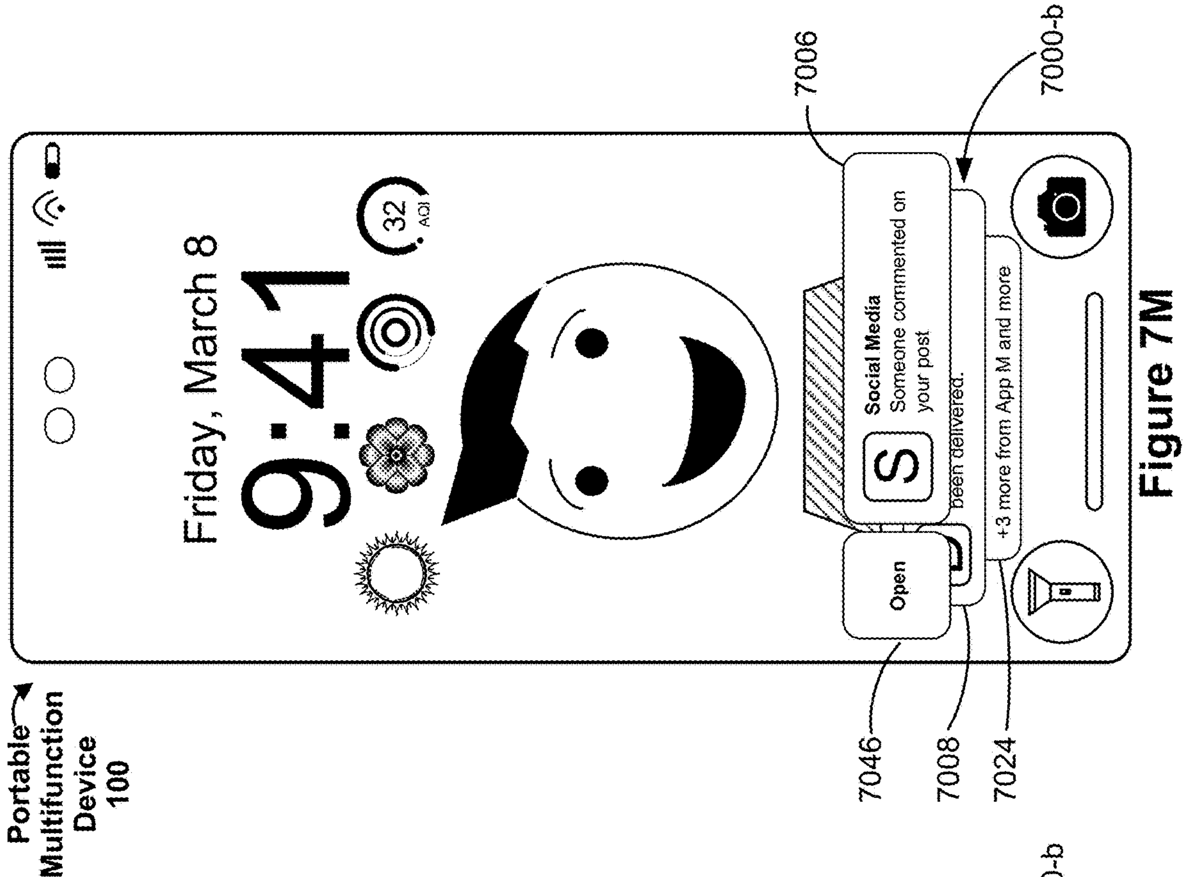
Figure 7L:
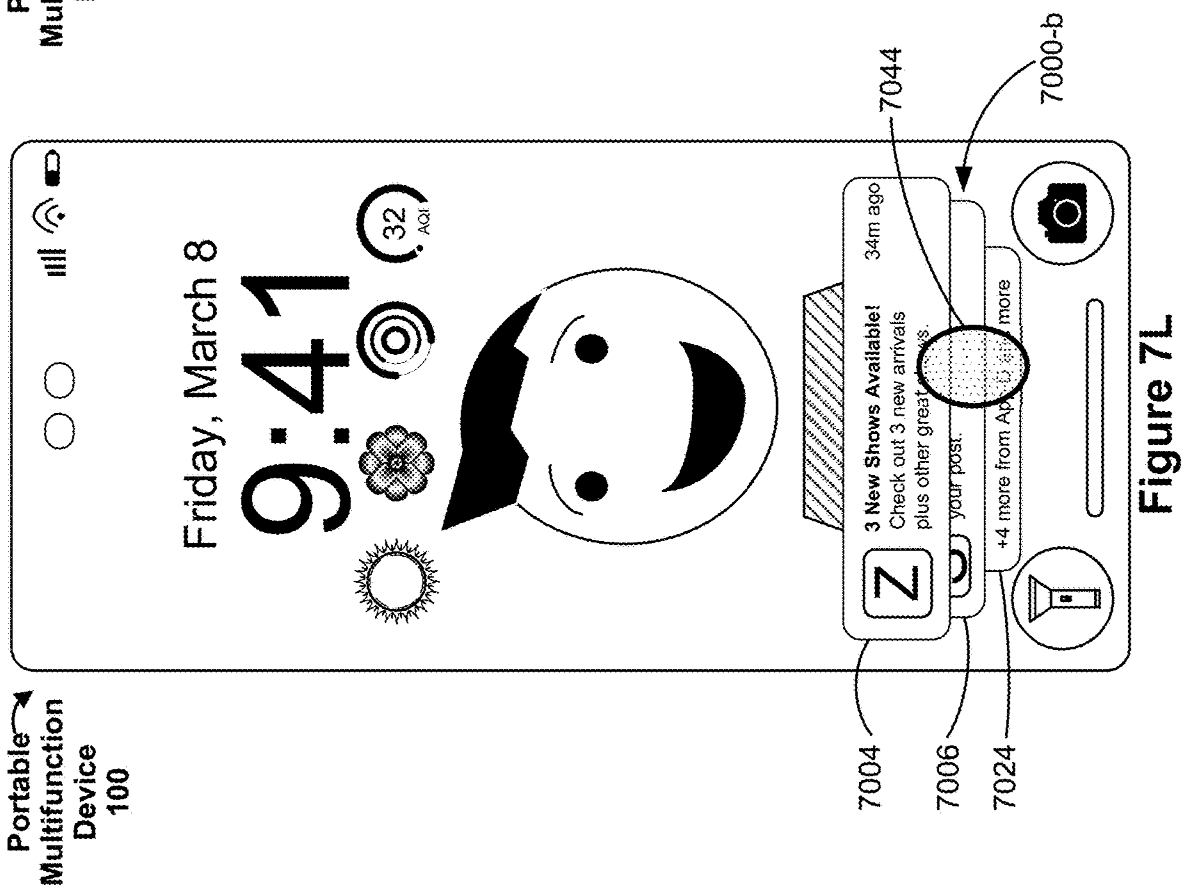
Figure 7O:
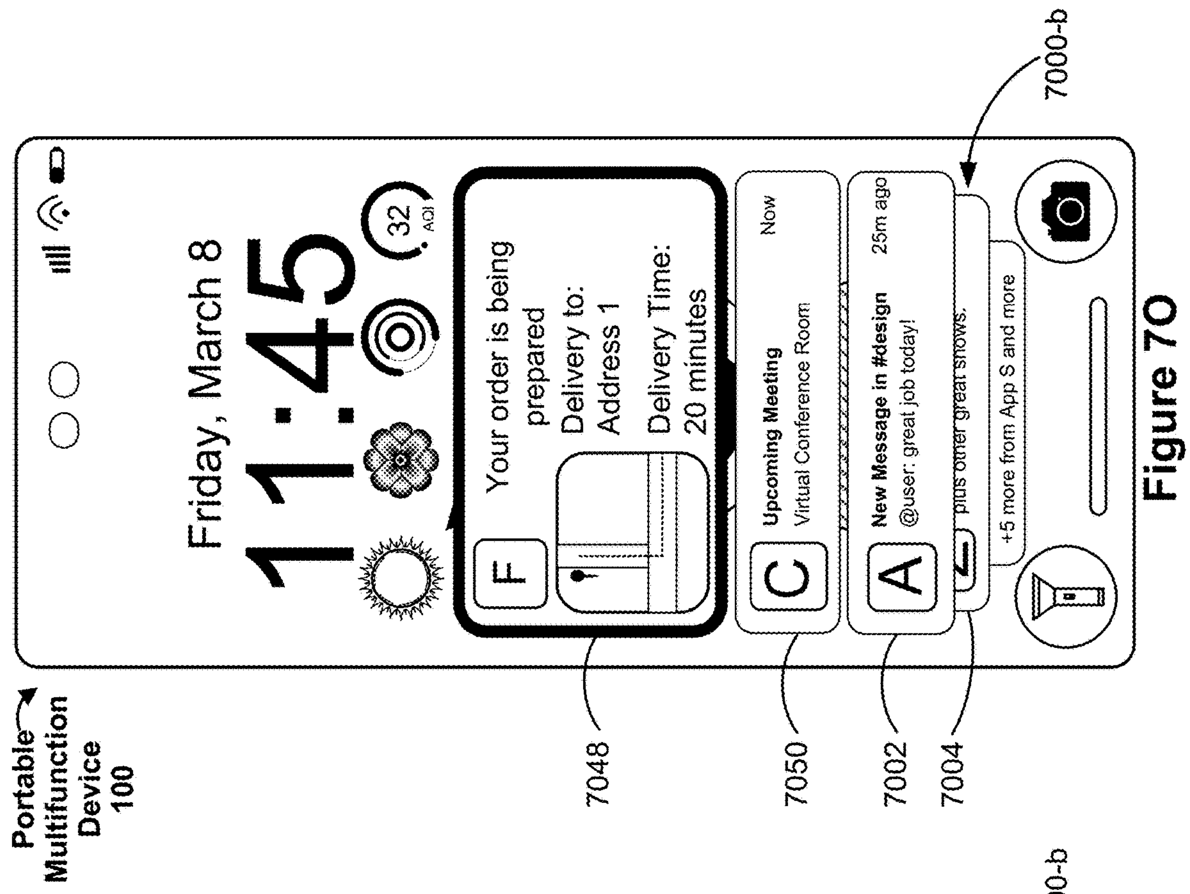
Figure 7N:
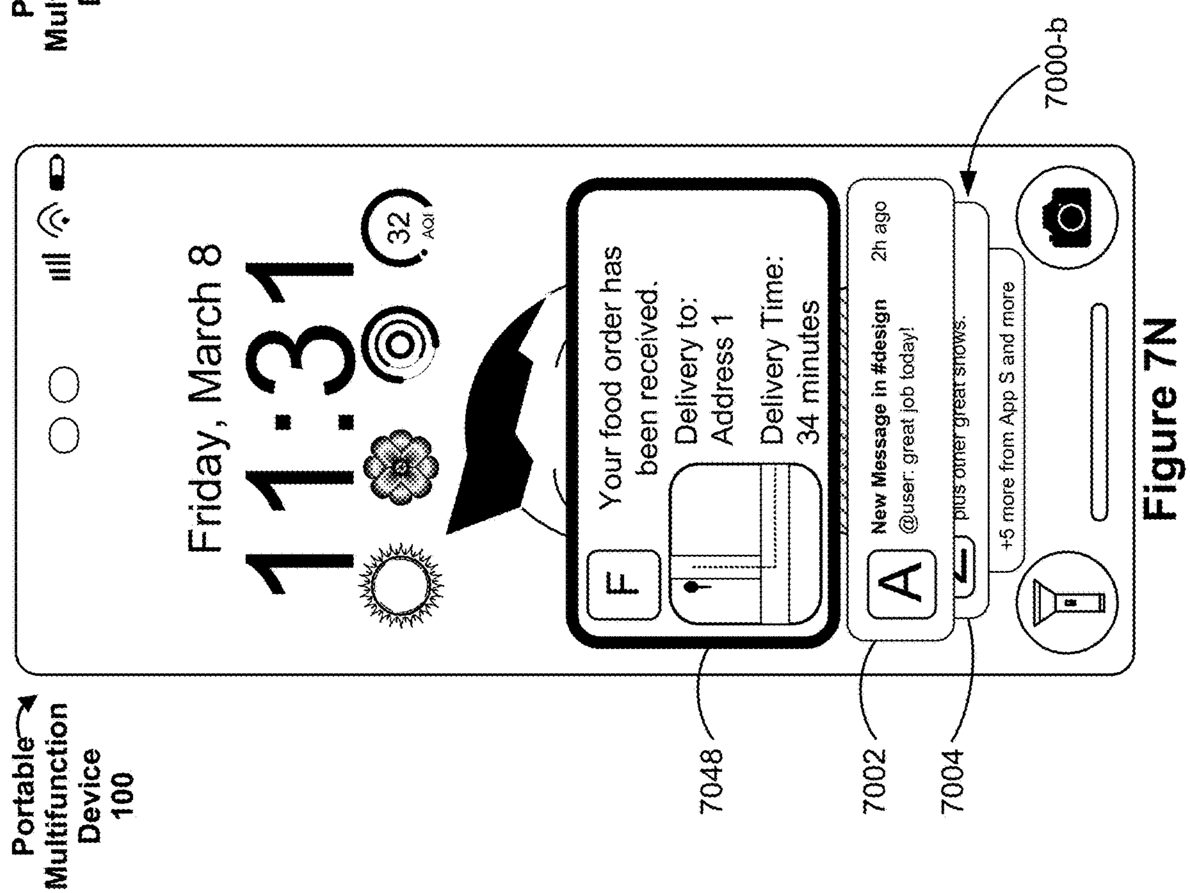
Figures 7P, 7Q:
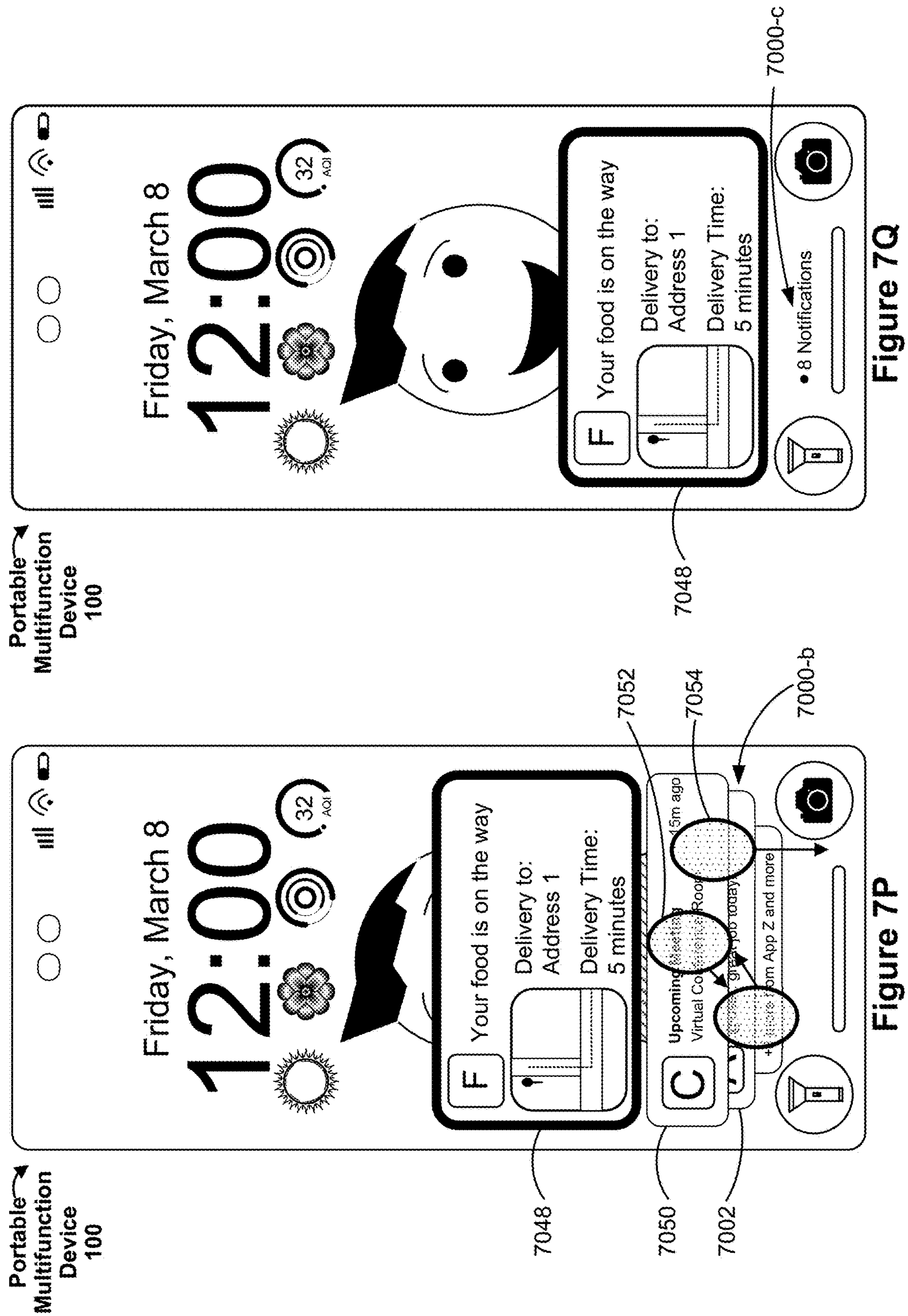
Figure 7S:
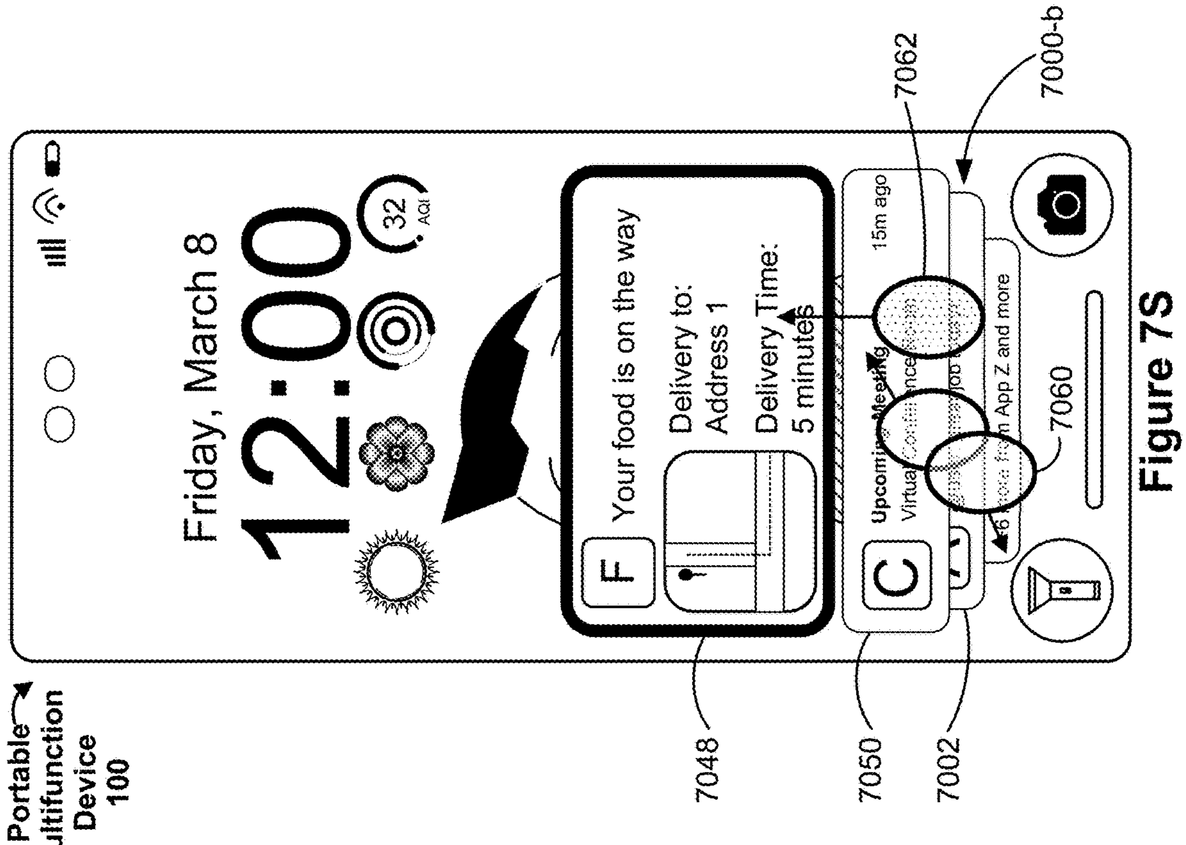
Figure 7R:
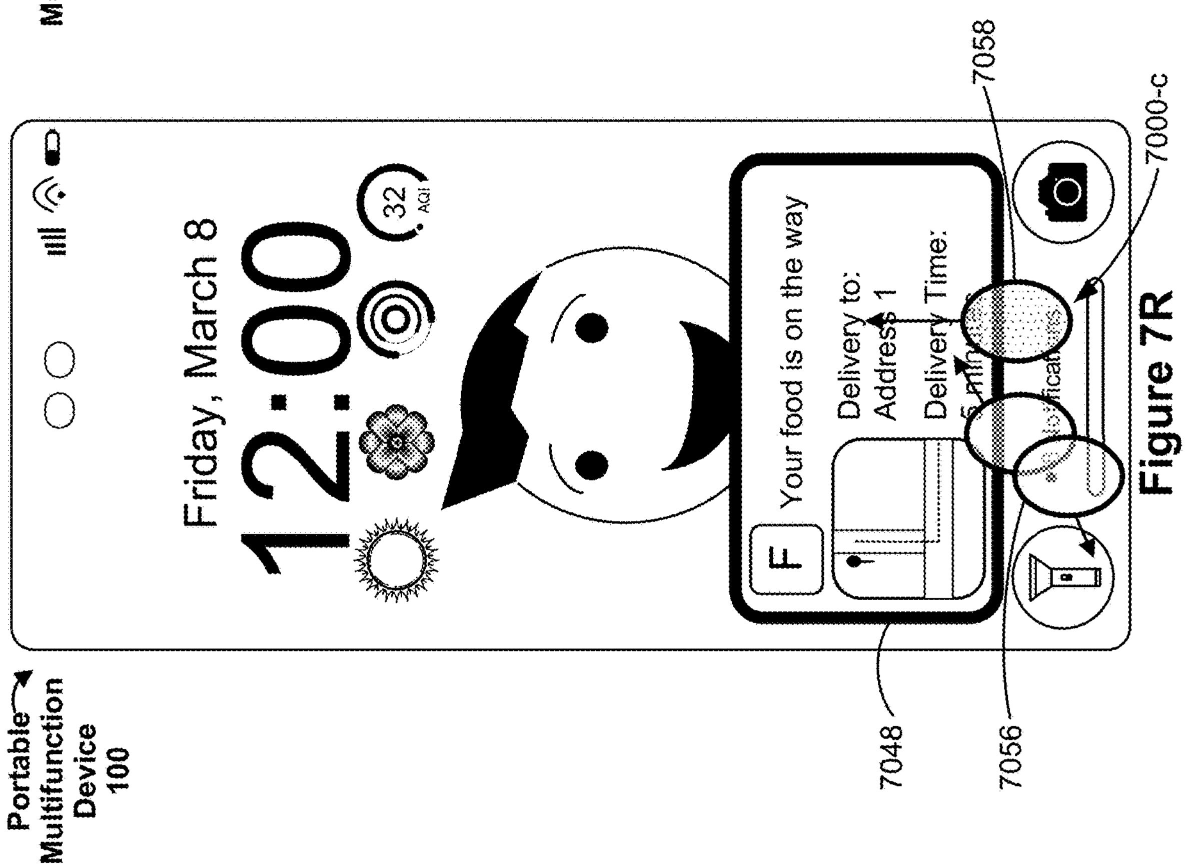
Figure 7U:
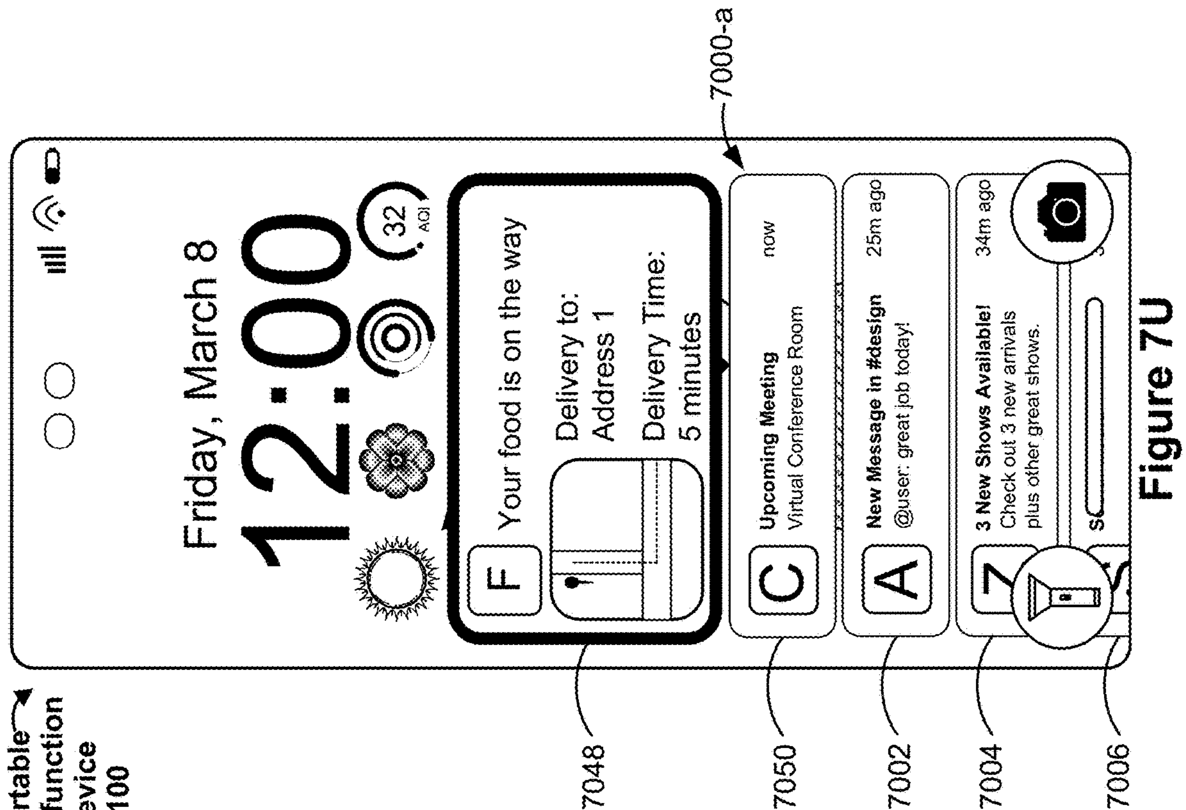
Figure 7T:
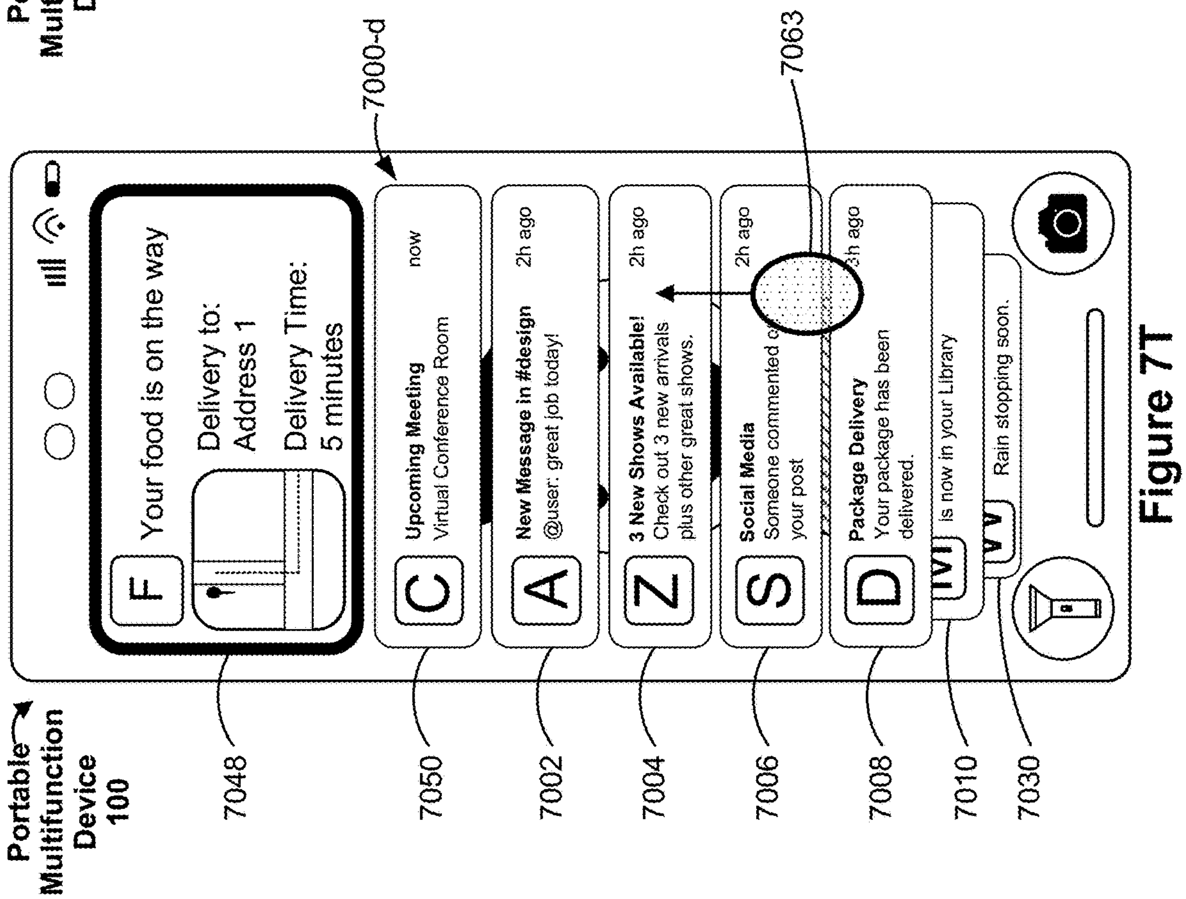
Figures 2, 7V:
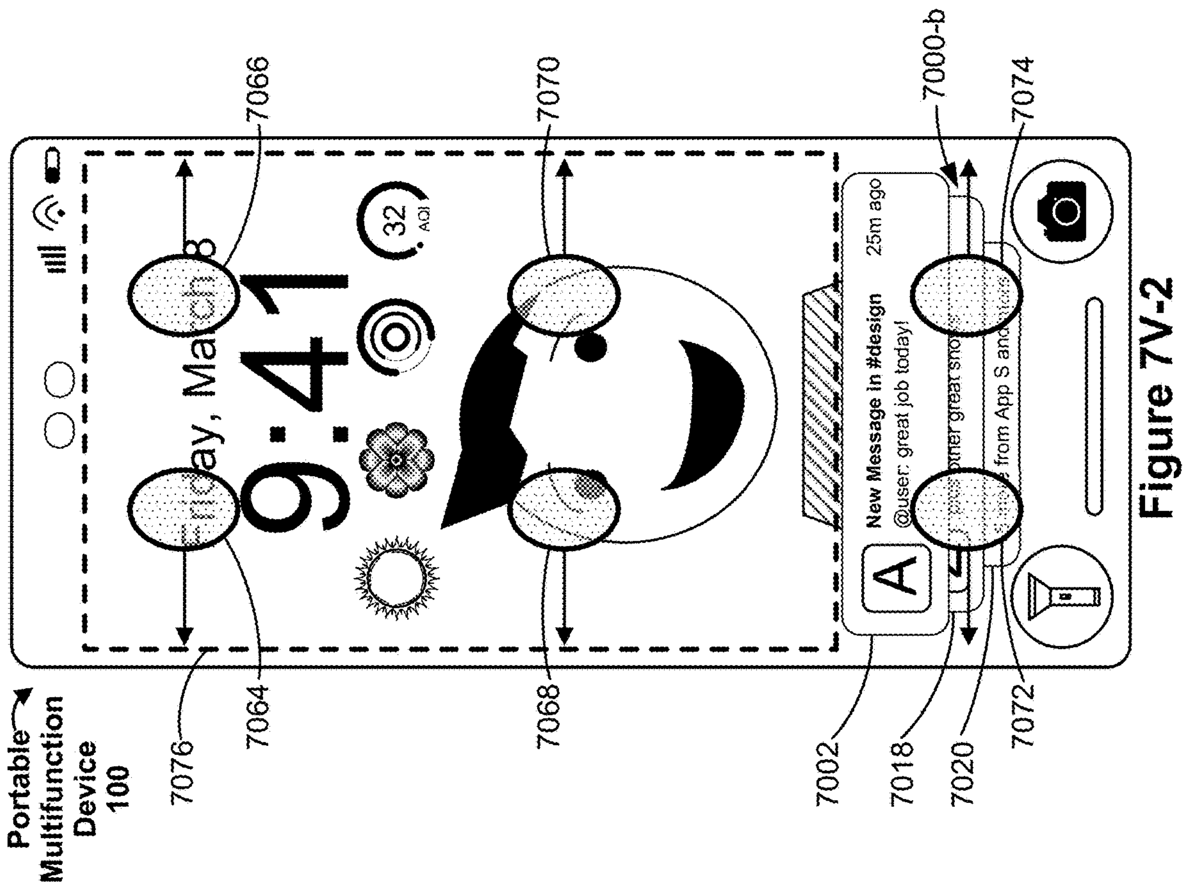
Figure 8A:
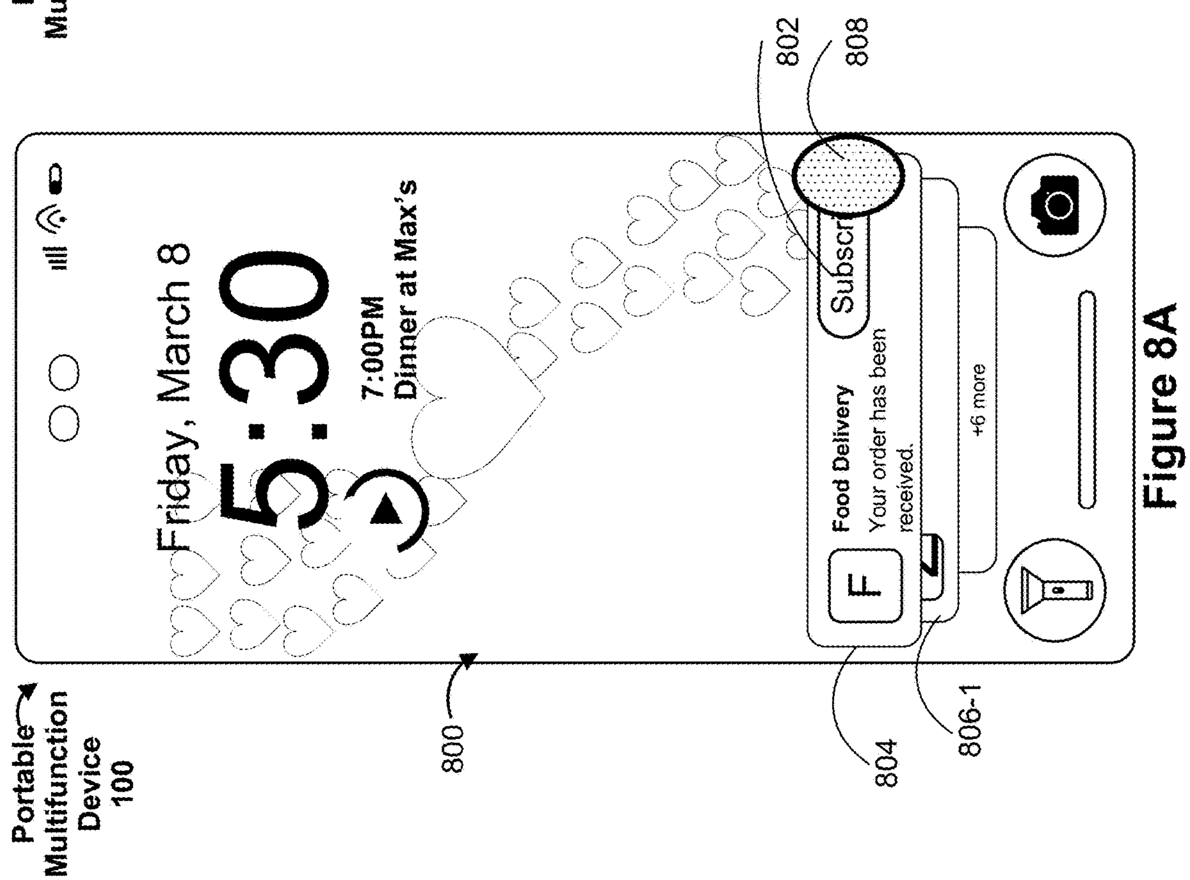
FIGS. 8A-8AN illustrate example user interfaces for displaying a session region for ongoing events in accordance with some embodiments.

FIGS. 5A-5CB illustrate example user interfaces for navigating and editing respective types of user interfaces, FIGS. 6A-6AR illustrate example user interfaces for an expanded face switcher, FIGS. 7A-7V-3 illustrate a representation of a plurality of notifications in different configurations, and user inputs for switching between the different configurations, and FIGS. 8A-8AN illustrate example user interfaces for displaying a session region for ongoing events, in accordance with some embodiments. The user interfaces in these figures are used to illustrate the processes described below, including the processes in FIGS. 9A-9I, 10A-10I, 11A-11H, 12A-12E, 13A-13G, 14A-14G, 15A-15I, 16A-16J, and 17A-17D. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 5A-5CB illustrate example user interfaces for navigating and editing respective types of user interfaces in accordance with some embodiments.

FIG. 5A illustrates a user interface 500 of a device 100 while the display of device 100 is in a low power state. In some embodiments, while the display is in the low power state, an "always on" display optionally displays an indication of a time and/or date. In some embodiments, in the low power state, the display of device 100 does not display any information (e.g., the display is off). In some embodiments, the display enters a low power state after a predetermined time of inactivity during which no user interactions with device 100 have been detected. In some embodiments, the display enters a low power state in response to a user input to lock and/or put the device 100 to sleep, such as by pressing a physical or virtual button on device 100. In some embodiments, the display of device 100 leaves the low power state in accordance with receiving an incoming alert (e.g., a system alert and/or a notification from an application). For example, the display of device 100 illuminates, and leaves the low power state, to display an indication of the alert. In some embodiments, the display of device 100 illuminates in response to a user input, such as a user input detected on the display, a user picking up the device, and/or a user input on a physical or virtual button of the device.

As used herein, a wake screen user interface is a user interface that is displayed after the display of device 100 has entered a low power state during which the display is at least partially off. In some embodiments, a wake screen user interface is also referred to herein as a face. For example, actions described as being performed with respect to a wake screen user interface may also be described as being performed with respect to a face (e.g., "switching between wake screen user interfaces" may also be stated as "switching between faces" and "editing a wake screen user interface" may also be stated as "editing a face"). In some embodiments, an "expanded face switcher" user interface includes display of one or more faces (e.g., one or more wake screen user interfaces), wherein a size of a respective face (e.g., wake screen user interface) is less than a full size of the display area (e.g., as illustrated in FIG. 5U). In some embodiments, in the low power state, the display optionally displays an "always on" indicator of a time and/or date and the device displays the wake screen user interface when the device is prompted to come out of the low power state. In some embodiments, optionally in response to a user input and/or in response to a threshold amount of time elapsing, the device enters a locked state in which a password, passcode and/or biometric authentication is required to unlock the device, wherein the device has limited functionality in the locked state and must be unlocked before accessing respective applications and/or data stored on device 100. In some embodiments, the wake screen user interface is displayed regardless of whether the device is in the locked state or has already been unlocked (e.g., the wake screen user interface is displayed upon waking the device before the user accesses a home screen user interface and/or other application user interfaces). In some embodiments, as used herein, a cover sheet user interface includes the same characteristics as the wake screen user interface, but the device displays the cover sheet user interface optionally without entering the locked and/or low power state of the device. In some embodiments, one or more alerts (e.g., system alerts and/or notifications) are displayed on the wake screen user interface and/or the cover sheet user interface, optionally in response to a user input (e.g., a swipe gesture upward in the middle of the display or another gesture).

As used herein, a home screen user interface includes icons for navigating to a plurality of applications that are executed by the device 100. In some embodiments, the device 100 detects and responds to interaction with the home screen user interface using one or more gestures, including touch inputs. For example, a tap input or other selection input on a respective application icon causes the respective application to launch, or otherwise open a user interface for the respective application, on the display area of device 100. In some embodiments, a plurality of views for the home screen user interface is available. For example, the device detects and responds to user inputs such as swipe gestures or other inputs (e.g., inputs directed to the currently displayed view of the home screen user interface) that correspond to requests to navigate between the plurality of views, wherein each view of the home screen user interface includes different application icons for different applications. In some embodiments, the application icons are different sizes, such as an application widget that displays information for the respective application, wherein the application widget is larger than the application icons.

As used herein, mini-application objects (or widgets) are user interface objects that provide a limited subset of functions and/or information available from their corresponding applications without requiring the applications to be launched. In some embodiments, mini-application objects (or widgets) contain application content that is dynamically updated based on the current context. In some embodiments, a tap input or other selection input on a mini-application object (widget) causes the corresponding application to be launched. In some embodiments, a respective mini application object operates as a standalone application residing in memory of the device, distinct from an associated application also residing in the memory of the device. In some embodiments, a respective mini application object operates as an extension or component of an associated application on the device. In some embodiments, a respective mini application object has a dedicated memory portion for temporary storage of information. In some embodiments, the memory portion is accessible by a corresponding full-featured application of the respective mini application object. In some embodiments, a mini application object is configured to perform a subset, less than all, of the functions of a corresponding application. In some embodiments, a mini application object displays an identifier for the corresponding application. In some embodiments, a mini application object displays a portion of the content from the corresponding application. For example, a map mini application object displays a portion of a map that is displayed in a map application that corresponds to the map mini application object. For example, a calendar mini application object displays a portion of a calendar that is displayed in a corresponding calendar application. In some embodiments, a predefined input on a mini application object launches the corresponding application. In some embodiments, a mini application object operates as a standalone application residing in memory of the device, distinct from an associated application also residing in the memory of the device. For example, a mini application object corresponding to a social networking application operates as a single-purpose or streamlined application with a subset, less than all, of the functionality of the corresponding application, but is associated with the full-featured social networking application. In this example, the mini application object operates independently of the social networking application, and in a scenario where the social networking application is not running, the mini application object continues to operate. In some embodiments, a mini application object operates as an extension or component of an associated application on the device. For example, a mini application object for a calendar application is a single feature or operational component of the full-featured calendar application. In this example, if the calendar application is not running (e.g., in the background), the calendar mini application object does not operate either. In some embodiments, a mini application object has a dedicated memory portion for temporary storage of information. In some embodiments, this memory portion can be accessed by the corresponding full-featured application. For example, a mini application object for an instant messaging application has a memory portion for temporary storage of partially written reply messages. In this example, if the user opens the corresponding application in the middle of writing a reply message, the contents of the reply message are retrieved from the temporary storage location and used by the full-featured application to allow the user to complete his reply message.

In some embodiments, while the device wakes up to leave the low power state, an animation is displayed to transition the device from being off (e.g., displaying a black background optionally with the "always on" time and/or date) to displaying a wake screen user interface 501 (also referred to herein as a lock screen user interface). In some embodiments, the wake screen user interface 501 is a user interface that includes an indication of a time and/or date, optionally one or more complications (e.g., workout complication 502-1, weather complication 502-2 and calendar complication 502-3) that correspond to respective applications and update with current status information of the respective applications, optionally one or more alerts (e.g., messages notification 503-1 and social media notification 503-2), optionally a shortcut to one or more applications (e.g., a flashlight and/or a camera), and a background (e.g., an image, a pattern, a color, and/or a photograph). In some embodiments, as explained in more detail below, the device detects and responds to user input(s) (e.g., inputs directed to the editing user interface 565-*a* in 5W1 or 565 in 5X) that correspond to request(s) to change one or more settings of the wake screen user interface, for example to change a font color and/or style of the time and/or date indication and/or to change the complications that are included in the wake screen user interface. In some embodiments, the device 100 stores a plurality of wake screen user interfaces and rotates and/or shuffles (optionally periodically and/or upon entering/leaving the low power state) through the plurality of wake screen user interfaces.

In some embodiments, the animation that is displayed to transition the device from being off to display the wake screen user interface is based on the wake screen user interface that is to be displayed. For example, FIGS. 5E-5L illustrate examples of different animated transitions for different wake screen user interfaces.

FIG. 5B illustrates a wake screen user interface 501 with a gradient background, having a dark grey at the top of the user interface background, a medium grey in the middle of the user interface background, and a light grey at the bottom of the user interface background. In some embodiments, a user input is detected for replacing display of the wake screen user interface with a home screen user interface, wherein the home screen user interface includes representations of a plurality of applications that the device 100 executes.

In some embodiments, in response to the user input 504, the wake screen user interface 505 is displayed as sliding up and off of the display area while maintaining one or more features of the wake screen user interface (e.g., the indication of the time and/or date, one or more complications, and/or the flashlight and camera shortcuts), as illustrated in FIG. 5C. In some embodiments, as the wake screen user interface slides off the display area, the gradient background is cycled through, as if on a carousel, such that the dark grey that was at the top of the user interface background is displayed as sliding up from the bottom of the screen, while the medium grey in the middle of the user interface background slides up and off the display, and the light grey slides up in the display area. In some embodiments, the gradient background completes a full cycle in accordance with the home screen user interface 506 being displayed.

Figure 5D:
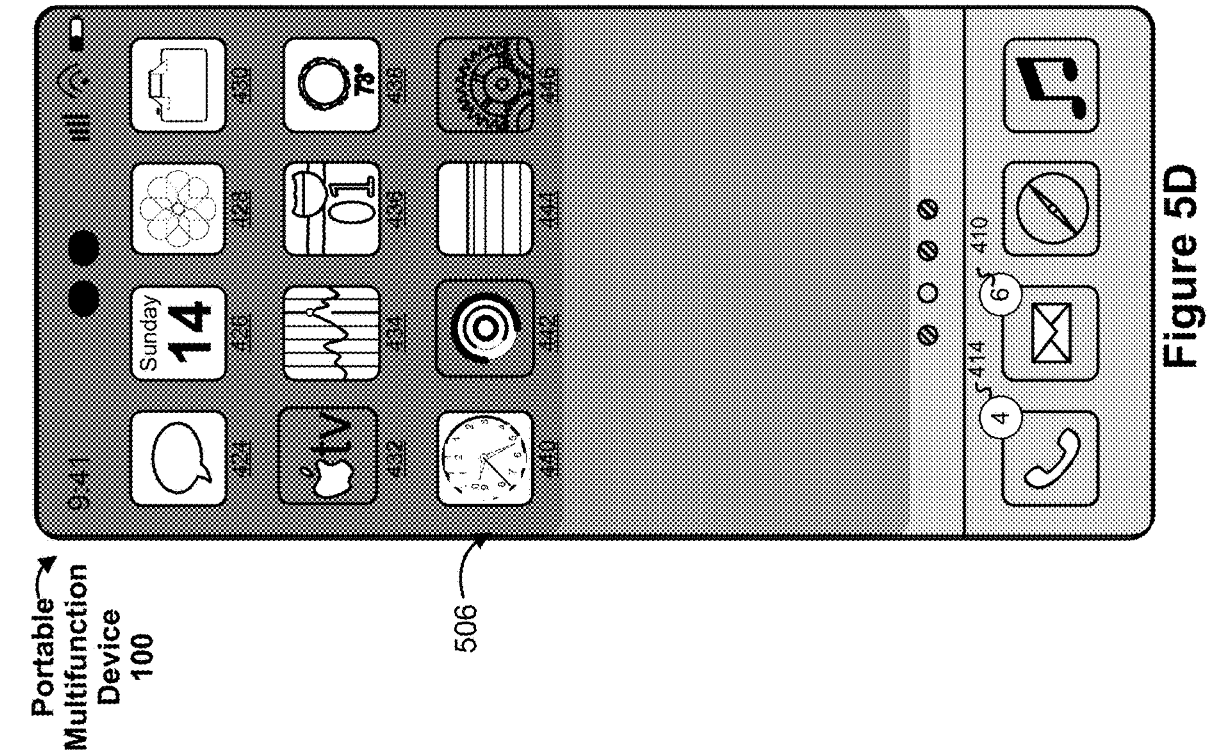

FIG. 5D illustrates the home screen user interface 506 with the gradient background having the different shades of grey arranged in the same arrangement as on the wake screen user interface. Accordingly, the animation that shifts the shades of grey completes a full cycle in response to the user swiping up to navigate to the home screen user interface.

Figure 5F:
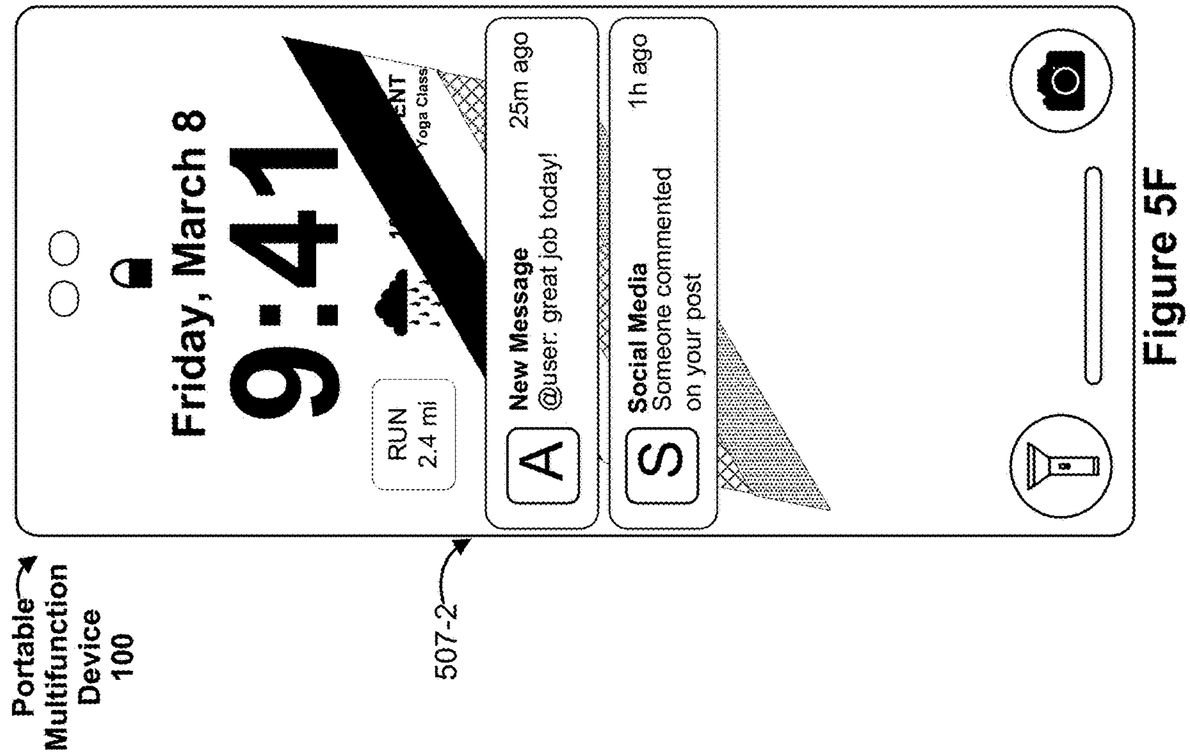
Figure 5E:
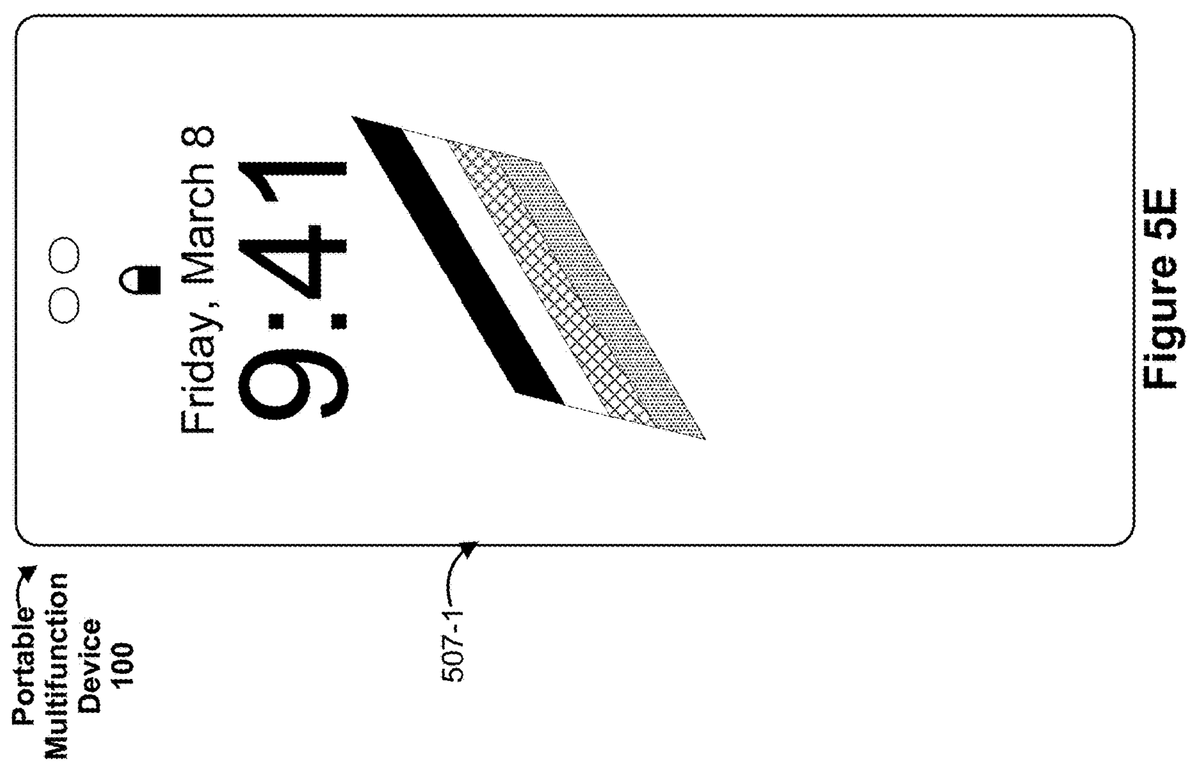

FIGS. 5E-5F illustrate an example of an animated transition while the device 100 transitions from the low power state to displaying the wake screen user interface 507-2. For example, user interface 507-1 is an intermediary wake screen user interface that is displayed during the animated transition. In some embodiments, the intermediary wake screen user interface 507-1 does not include one or more features of the wake screen user interface 507-2 (e.g., no complications, notifications, and/or flashlight or camera shortcuts). In some embodiments, the wake screen user interface 507-2 comprises an image, such as a plurality of colored lines (e.g., a rainbow or a pride flag). In some embodiments, the animated transition includes increasing a size of the image. In some embodiments, the animated transition includes changing one or more font properties of the indication of the time and/or date. In some embodiments, the animated transition includes displaying one or more complications, optionally by fading-in the one or more complications, and displaying one or more alerts, optionally by fading-in the one or more complications.

Figure 5H:
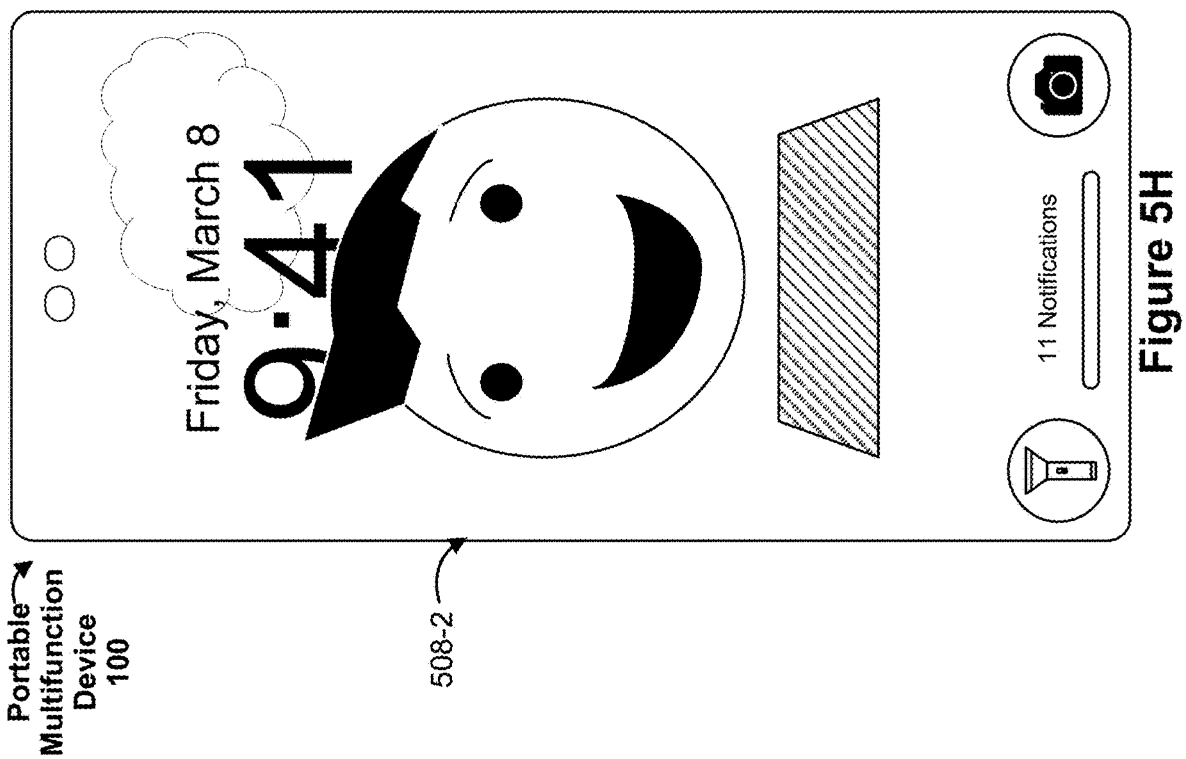
Figure 5G:
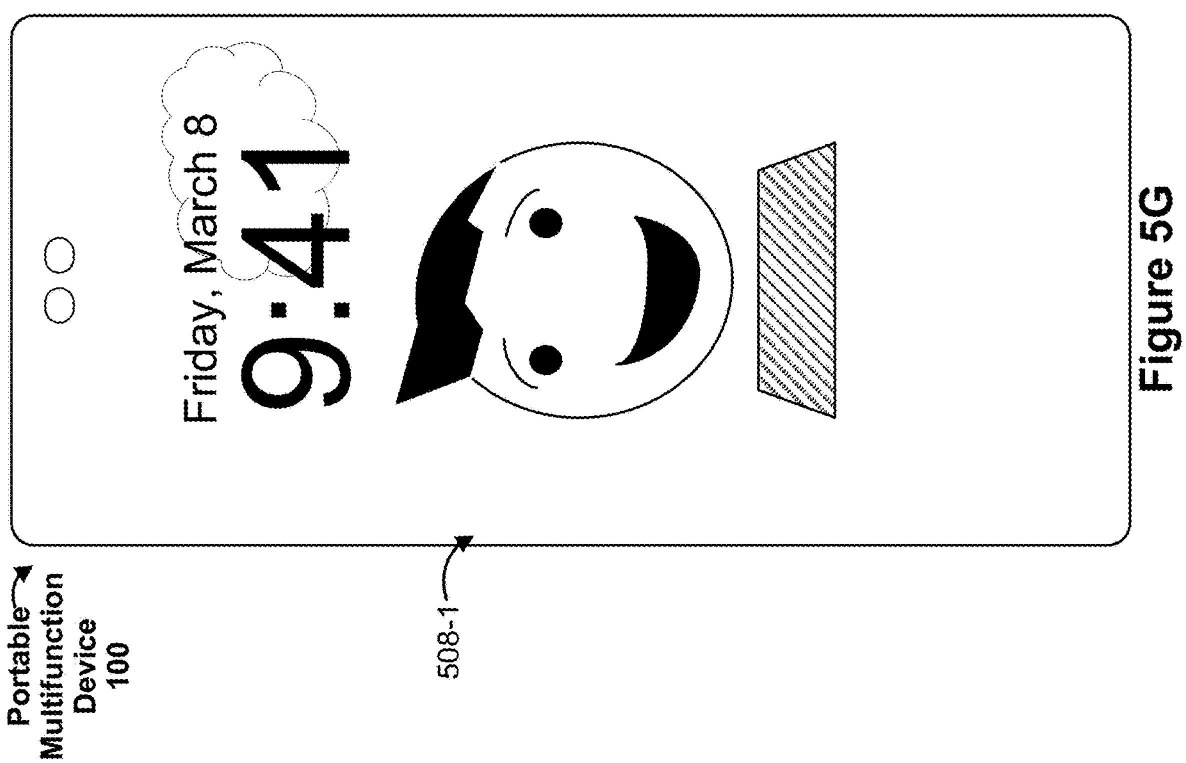

FIGS. 5G-5H illustrate an example of an animated transition for a wake screen user interface 508-2 that includes a portrait-style photo. In some embodiments, a portrait-style photo includes a subject (e.g., an individual and/or a face) that is optionally displayed with a simulated depth effect such that the subject appears closer in view than one or more background objects (e.g., the cloud) in the photo. In some embodiments, the animated transition for a wake screen user interface with a portrait-style photo includes increasing a size of the subject from the user interface 508-1 to the wake screen user interface 508-2, and optionally displaying the subject overlaid with the indication of the time and/or date. In some embodiments, the animated transition includes applying the depth effect (e.g., the photo appears flat in FIG. 5G and appears with the depth effect in FIG. 5H). In some embodiments, the wake screen user interface that includes a portrait-style photo does not include one or more complications (optionally, the device allows the user to add one or more complications by editing the wake screen user interface (e.g., using selectable options in user interface element 570 in the editing user interface 565 shown in FIG. 5X-5Y)).

Figure 5J:
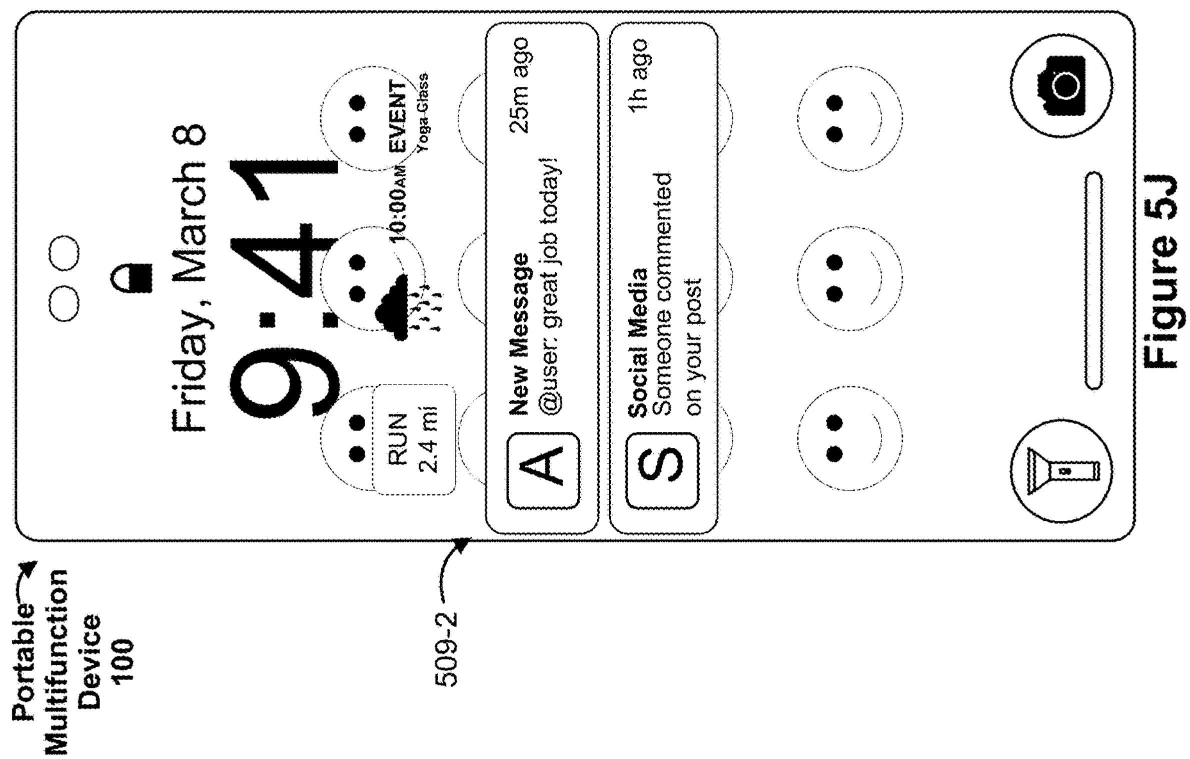
Figure 5I:
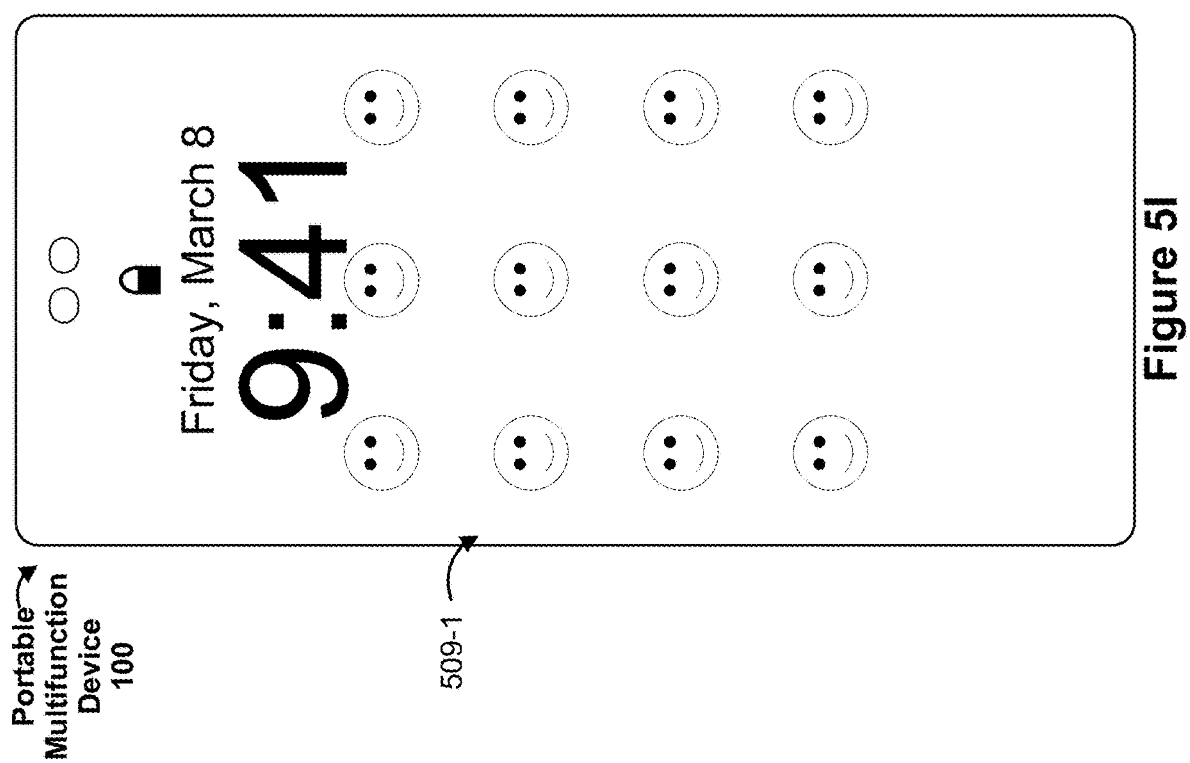

FIGS. 5I-5J illustrate an example of an animated transition for a wake screen user interface 509-2 that includes one or more emoji. In some embodiments, the wake screen user interface 509-2 includes one or more emoji arranged in a predefined pattern. For example, in FIGS. 5I-5J, the smiley face emoji is displayed in a grid pattern. In some embodiments, the animated transition includes changing a shadow effect applied to the smiley face emoji, as displayed in user interface 509-1, to a different shadow effect as displayed in wake screen user interface 509-2. In some embodiments, in at least one of the user interfaces 509-1 or 509-2, no shadow effect is displayed. For example, the size and/or opacity of the shadow increases or decreases during the animation.

Figure 5L:
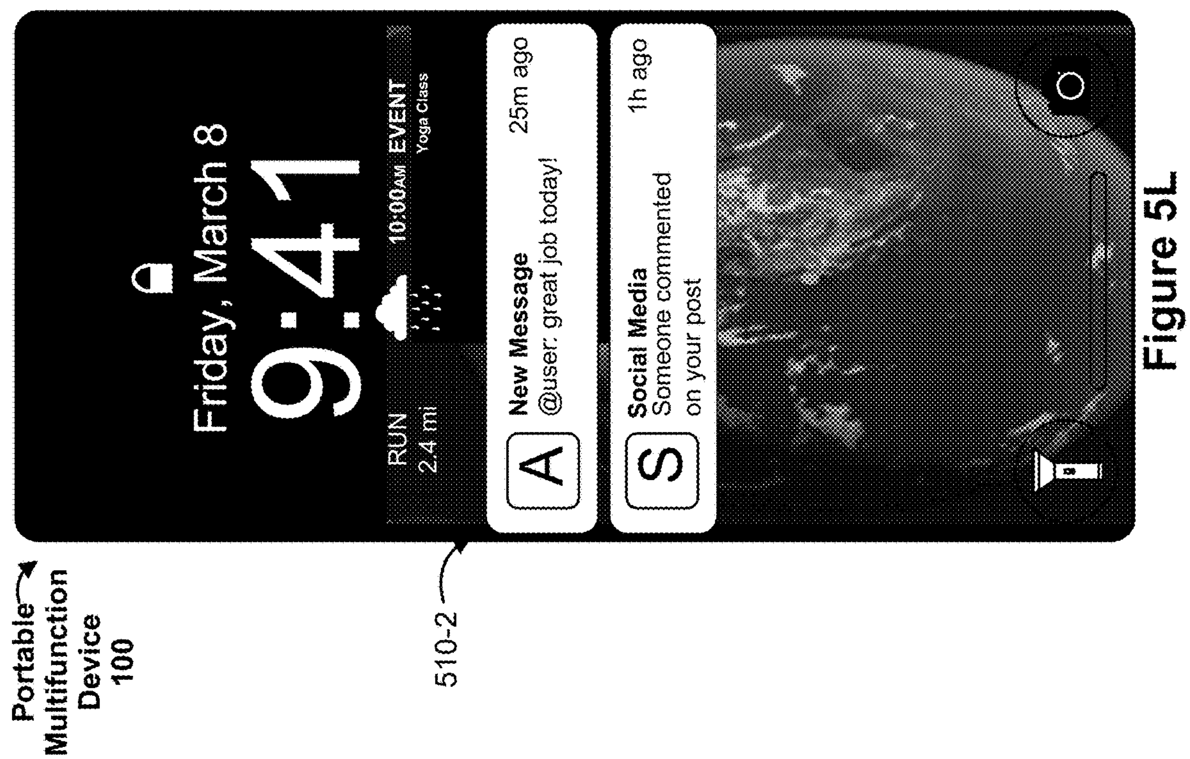
Figure 5K:
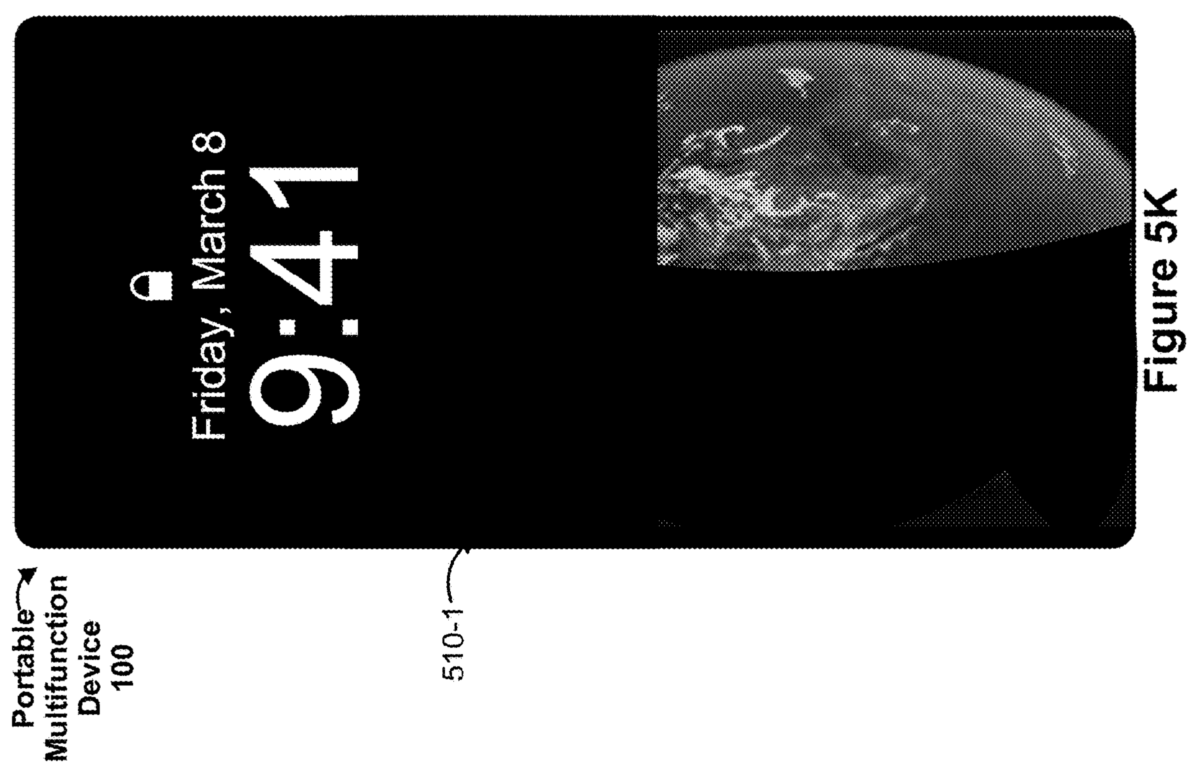
Figure 5N:
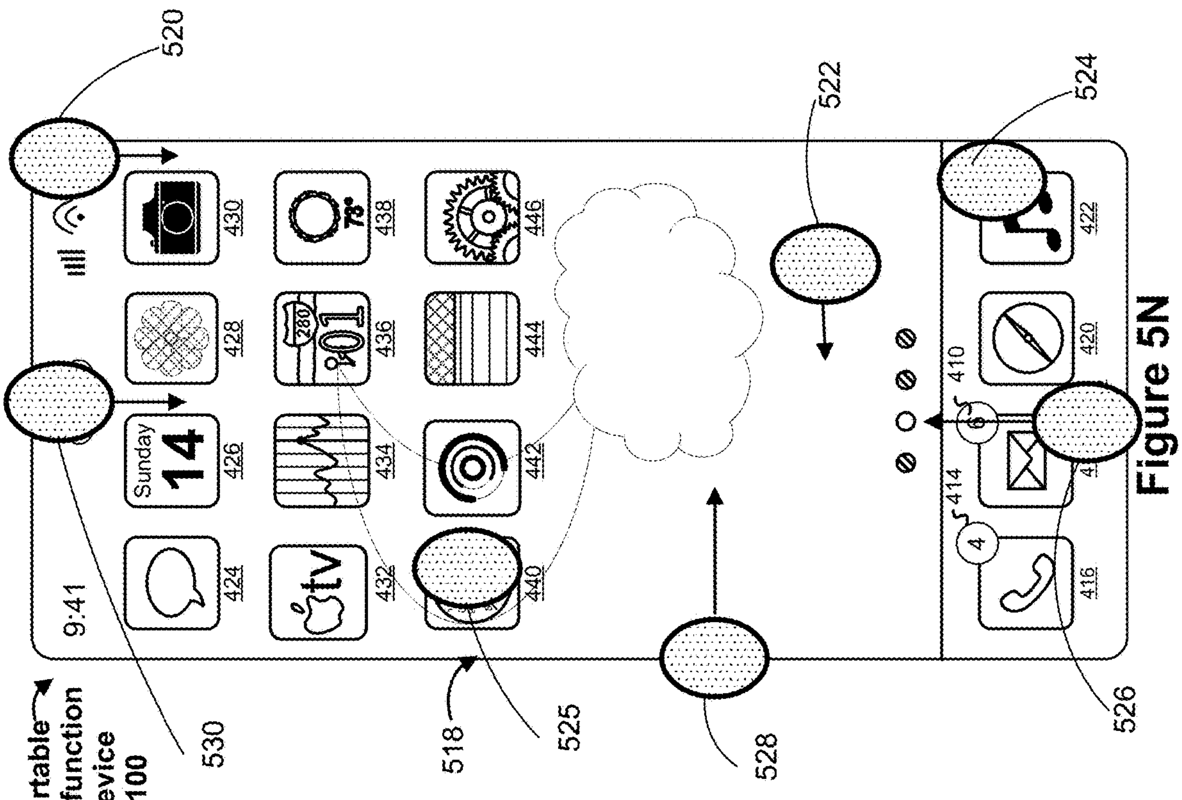

FIGS. 5K-5L illustrate an example of an animated transition for a wake screen user interface 510-2 that includes an astronomy background. In some embodiments, the astronomy background includes a celestial and/or planetary body (e.g., the earth, a moon, stars, solar system and/or a galaxy). In some embodiments, the animated transition includes changing a crop and/or changing a view angle of the astronomy background from the user interface 510-1 to the wake screen user interface 510-2. In some embodiments, the animated transition includes applying a visual effect, such as decreasing and/or moving a shadow displayed over the background. For example, the earth appears to rotate and the shadow on the left of the earth appears to rotate with the earth such that the shadow minimizes to the right side of the user interface. In some embodiments, the astronomy background 510-2 further includes an indication of a current location of the device 100 (e.g., a dot appears on the displayed earth in the user interface 510-2 at the device's location).

FIGS. 5L2-5L3 illustrate an example of an animated transition from a wake screen user interface 510-3 that includes an astronomy background to a home screen user interface 510-4 that includes an astronomy background. In some embodiments, wake screen user interface 510-3 includes a representation of one or more celestial bodies, for example the earth and the sun are illustrated in FIG. 5L2. In some embodiments, in response to user input 515 requesting to dismiss the wake screen user interface 510-3, the device 100 displays an animated transition and displays a home screen user interface 510-4. In some embodiments, home screen user interface 510-4 is displayed with a background that includes representation of the one or more celestial bodies that is distinct from the representation of the one or more celestial bodies displayed on wake screen user interface 510-3. For example, during the animated transition, the representation of the earth is displayed as rotating and shifting to a different portion of the display, and the representation of the sun is displayed as shifting in accordance with the rotation of the representation of the earth, as illustrated in FIG. 5L3. For example, the representation of the sun is shifted to be displayed relatively closer to the representation of the earth and/or is shifted to be displayed at a position directly behind the representation of the earth (e.g., as opposed to up and to the left, as illustrated in FIG. 5L2). In some embodiments, during the animated transition, the representation of the earth is shifted to increase in size (e.g., as if getting closer) and the representation of the sun updates in size relative to the increase in size of the representation of the earth.

Figure 5M:
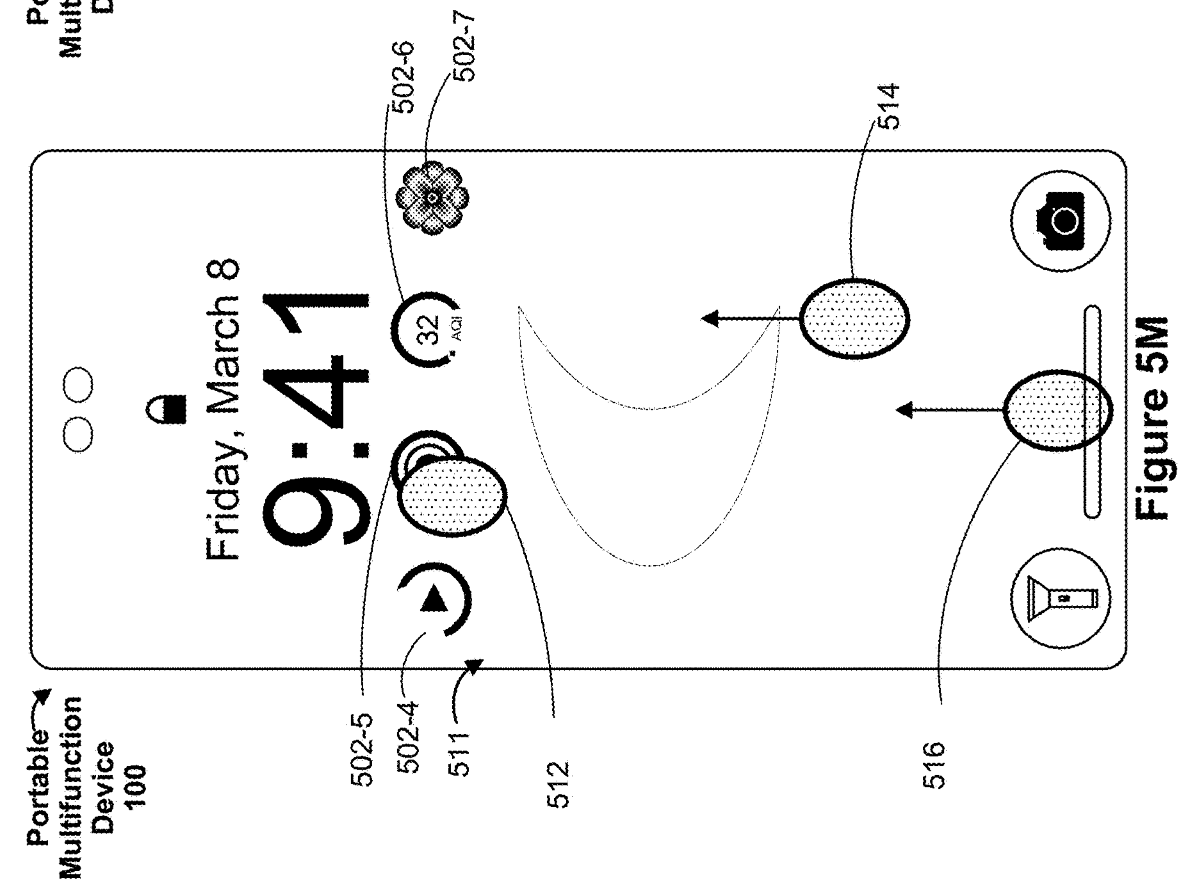
Figure 5P:
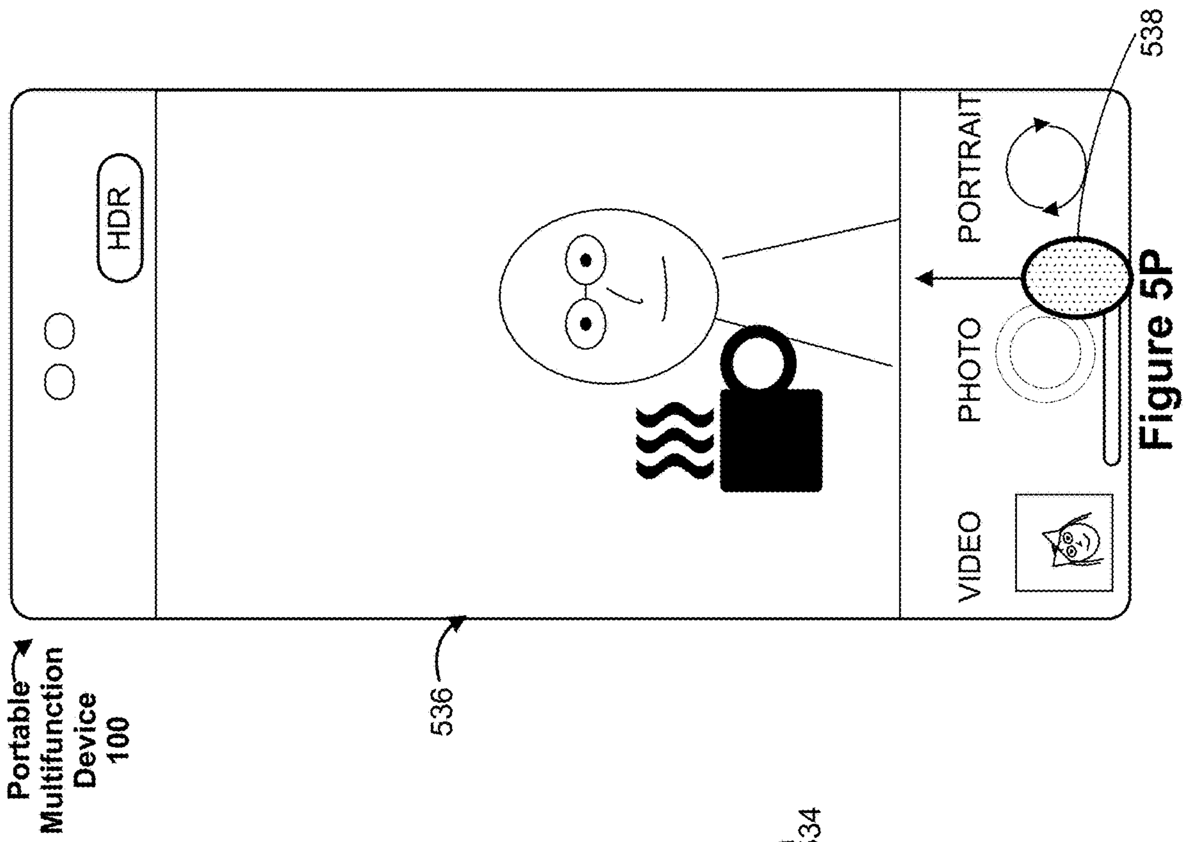

FIG. 5M illustrates an example of a wake screen user interface 511. In some embodiments, the wake screen user interface 511 is an example of an astronomy background (e.g., that includes a moon). In some embodiments, the device detects user interactions with the wake screen user interface 511 that cause the device 100 to perform respective operations (e.g., selecting a respective complication to displaying its corresponding application, navigating to the home screen user interface, displaying a plurality of previously received and/or stored notification, and/or navigating to another system user interface, such as a system search user interface, a widget screen, or a control panel user interface). For example, the wake screen user interface 511 includes music complication 502-4, health complication 502-5, weather complication 502-6 and breathe complication 502-7. In some embodiments, at least one complication updates with status information corresponding to the application associated with the complication. For example, music complication 502-4 updates with progress information (e.g., in a circular, curved, or linear shape) indicating an amount of time that a currently playing media item is played back, and weather complication 502-6 updates to indicate a real-time AQI level (e.g., "32") based on the status of the weather application.

In some embodiments, in response to a first type of user input, such as user input 512, selecting a respective complication, the device 100 displays an application user interface for the application associated with the respective complication. In some embodiments, the first type of user input is a tap input. For example, in response to user input 512 directed to health complication 502-5, the device 100 displays a user interface for a health/fitness application associated with health complication 502-5.

Figure 5O:
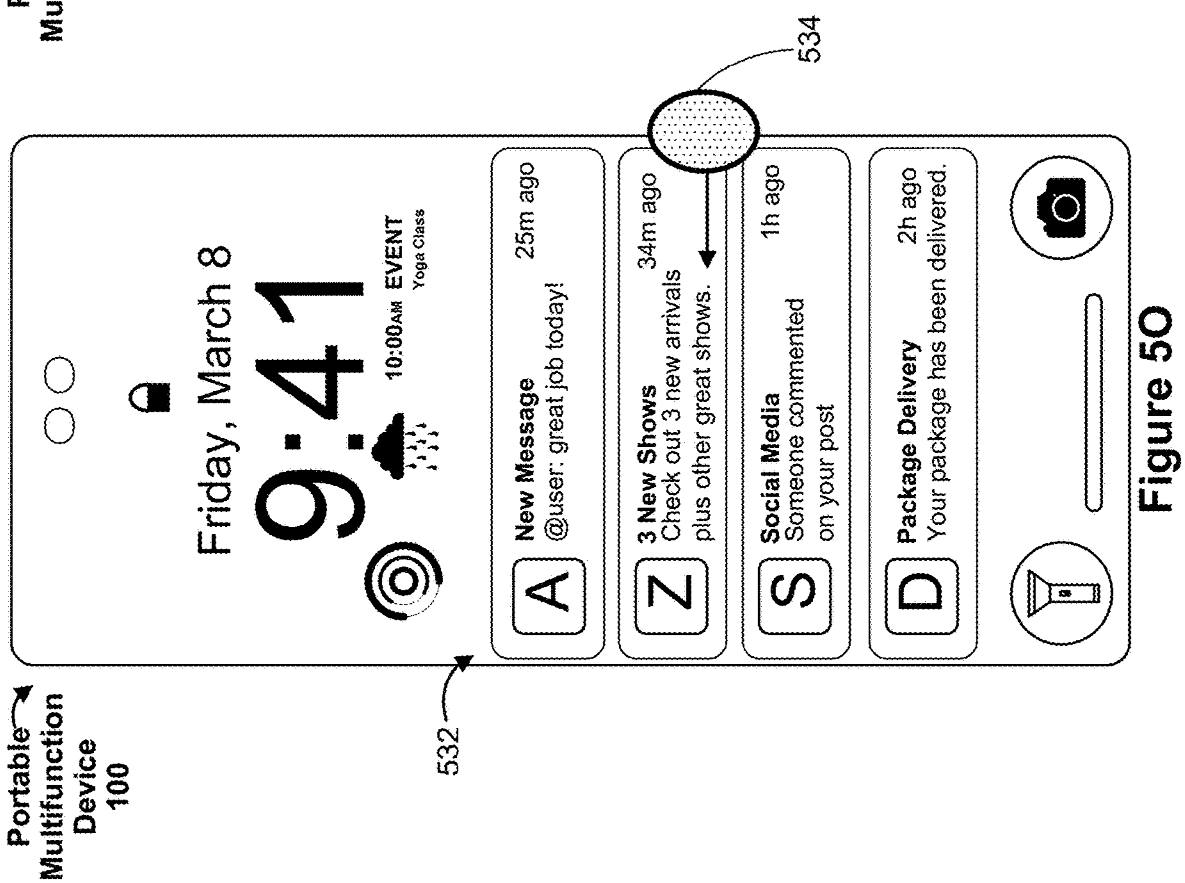

In some embodiments, in response to a second type of user input 514, such as a swipe input or a drag gesture in a first direction (e.g., upward, downward, rightward or leftward) that is detected within a predefined portion of the wake screen user interface 511 (e.g., within a middle of the wake screen and/or not on an edge of the wake screen), the device 100 displays a plurality of notifications, such as in user interface 532 illustrated in FIG. 5O.

In some embodiments, in response to a third type of user input 516, such as a swipe input or a drag gesture in a second direction (e.g., upward, downward, rightward, or leftward) that is optionally the same direction is the direction of second type of user input 514, the device displays a home screen user interface 518. In some embodiments, the third type of user input 516 is received on a user interface element that, when selected (optionally by initiating a swipe gesture over the user interface element) causes the device 100 to display a home screen user interface 518.

FIG. 5N illustrates home screen user interface 518 (also referred to as a home user interface). In some embodiments, the home screen user interface includes icons for navigating to a plurality of applications that are executed by the device 100. In some embodiments, the device detects and responds to user interactions with the home screen user interface using one or more gestures, including touch inputs, that cause the device to perform respective operations (e.g., selecting a respective application icon to display a corresponding application, and/or navigating to another system user interface such as the cover sheet user interface, the system search user interface, the control panel user interface, or the wake screen user interface). For example, a tap input (e.g., user input 524) on a respective application icon causes the respective application to launch, or otherwise open a user interface for the respective application, on the display area of device 100. In some embodiments, a plurality of views for the home screen user interface is available. For example, the device detects one or more swipe gestures or other types of navigation inputs directed to a currently displayed view for the home screen user interface to navigate between the plurality of views, wherein each view of the home screen user interface includes different application icons for different applications. In some embodiments, the application icons are different sizes, such as an application widget that displays information for the respective application, wherein the application widget is larger than the application icons.

In some embodiments, a user input 520 is a swipe user input in a third direction (e.g., downward or another direction) that is initiated at a top corner edge of the display of device 100. In some embodiments, in response to user input 520, the device 100 displays a control user interface for modifying one or more settings.

In some embodiments, a user input 522 is a swipe user input in a fourth direction (e.g., from right to left) and corresponds to a request to switch to another view of the home screen user interface. For example, different representations for different applications are displayed on different views of the home screen user interface.

In some embodiments, a user input 524 is a user input (e.g., a tap input or other selection input) that selects application icon 422 for a music application. In some embodiments, in response to user input 524, the device 100 displays a user interface for the application associated with application icon 422 (e.g., a music application user interface).

In some embodiments, a user input 525 (e.g., a tap input or other selection input) on another application icon 440 for a clock application causes device 100 to open the clock application and display a user interface for the clock application.

In some embodiments, a user input 526 is detected at a predefined portion of the user interface (e.g., a swipe up gesture that is initiated at an edge of the display of device 100). In some embodiments, in response to user input 526, the device displays a multitasking user interface with indications of one or more open applications that are optionally executing in the background on device 100.

In some embodiments, a different type of input, such as user input 528 (e.g., a swipe input from left to right that is initiated at a left edge of the display of device 100 or other gesture), causes the device 100 to display a user interface that includes a search bar and optionally one or more widgets and/or shortcuts that display information for a subset of applications.

In some embodiments, a user input 530 (e.g., a swipe input downward that is initiated at a top edge of the display of device 100 or other gesture) is detected, and in response to the user input 530, a user interface 532 (FIG. 5O) is displayed. Accordingly, device 100 detects different types of inputs and/or gestures (e.g., inputs 530, 520, 525, 528, 522, 526, and 524 directed to home screen user interface 518 in FIG. 5N) that cause the device 100 to perform sets of operations, including opening applications, navigating between views of the home screen user interface, and access other user interfaces for modifying settings and/or accessing shortcuts.

FIG. 5O illustrates a coversheet user interface 532 that includes information that is also displayed on wake screen user interface 511. For example, user interface 532 optionally includes an indication of the time and/or date, one or more complications, shortcut options to a flashlight and/or camera, and/or a plurality of notifications. In some embodiments, the device detects and responds to user inputs directed to user interface 532 in the same ways as user inputs directed to wake screen user interface 511, such as detecting a tap input on a complication and opening the respective application associated with the complication, or detecting a swipe input that is initiated on the right edge of the display of device 100, such as user input 534, and displaying a user interface 536 (FIG. 5P) for a camera application, wherein the device provides functions to capture and/or view photos using the camera application.

FIG. 5P illustrates a user input 538 corresponding to a request to return to a wake screen user interface. In some embodiments, in response to user input 538, user interface 540-1 is displayed, as illustrated in FIG. 5Q. In some embodiments, wake screen user interface 540-1 includes one or more properties that are distinct from the wake screen user interface 511 (FIG. 5M). In some embodiments, at least one complication is changed from wake screen user interface 511 to wake screen user interface 540-1. For example, music complication 502-4 (FIG. 5M) is replaced with weather complication 502-9 (FIG. 5Q), while optionally maintaining one or more other complications (e.g., health complication 502-5, weather complication 502-6 and breathe complication 502-7). In some embodiments, the complications update in accordance with a status of the application. For example, in FIG. 5M, weather complication

502-6 indicates an air quality index (AQI) of 32, and in FIG. 5Q, weather complication 502-6 indicates an AQI of 30. In some embodiments, the background of the wake screen is maintained (e.g., an image of a moon).

In some embodiments, as illustrated in FIG. 5Q, a user input 541, such as a swipe input from right to left that is detected within a predefined region of the display of device 100 (e.g., within a predefined distance of the bottom edge of the display), causes the device 100 to cycle the wake screen user interface 540-1 to another wake screen user interface 540-2. In some embodiments, the device 100 cycles through a predefined set of wake screen user interfaces. In some embodiments, the predefined set of wake screen user interfaces are related. For example, for an astronomy wake screen user interface (e.g., a moon image), cycling through the predefined set of astronomy wake screen user interfaces includes displaying different phases of the moon. In some embodiments, the predefined set of wake screen user interfaces are defined by the user, such that the user selects a collection of wake screen user interfaces to cycle through, regardless of whether the wake screens relate. For example, the user selects a photo album as a background image, and the wake screen user interfaces cycle through the photos in the photo album or photos automatically selected by the device based on criteria specified by the user.

In some embodiments, the user swipes on the wake screen user interface to change to a next wake screen user interface. In some embodiments, the wake screen user interface automatically changes periodically (e.g., every 2 minutes, every day, or every week). In some embodiments, the wake screen user interface automatically changes after the device has entered and/or exited a low power state (e.g., after the display has been off, the wake screen user interface updates the next time the display wakes up).

Figure 5R:
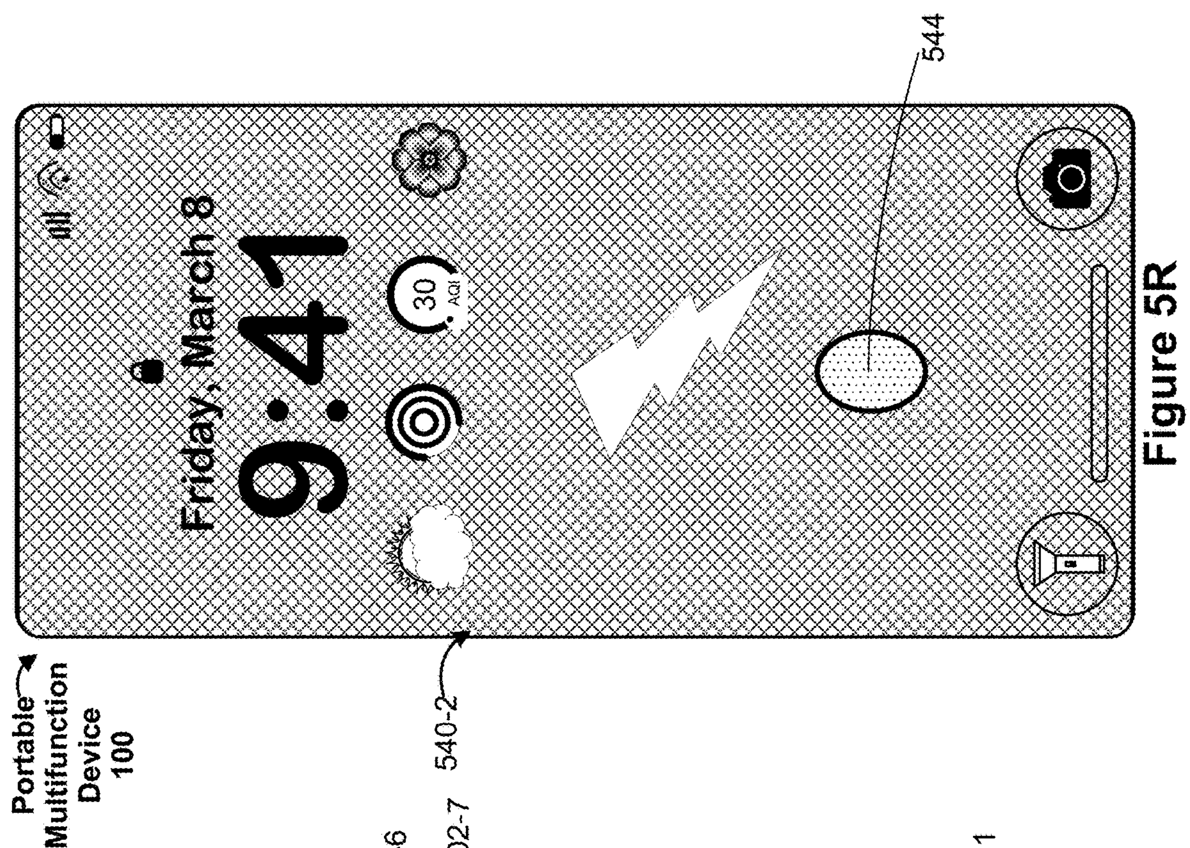
Figure 5Q:
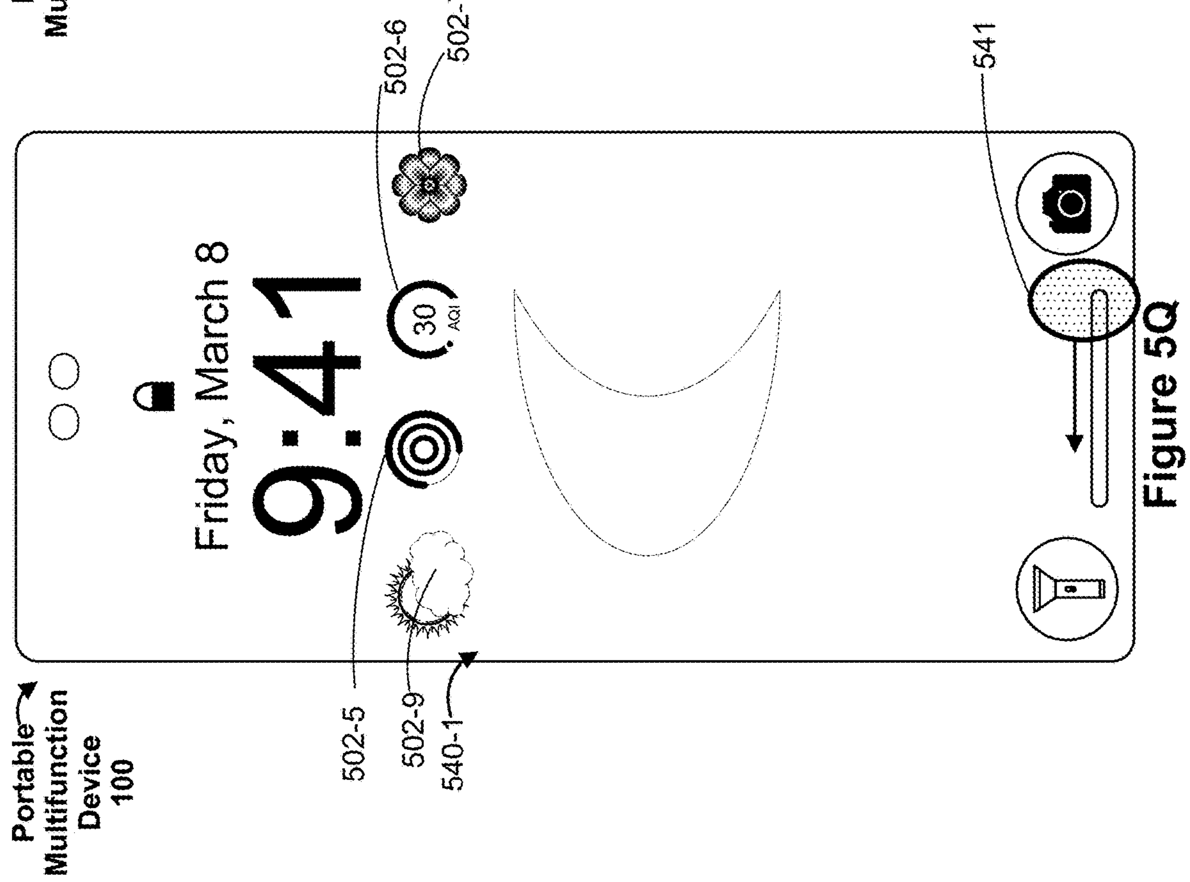
Figure 5T:
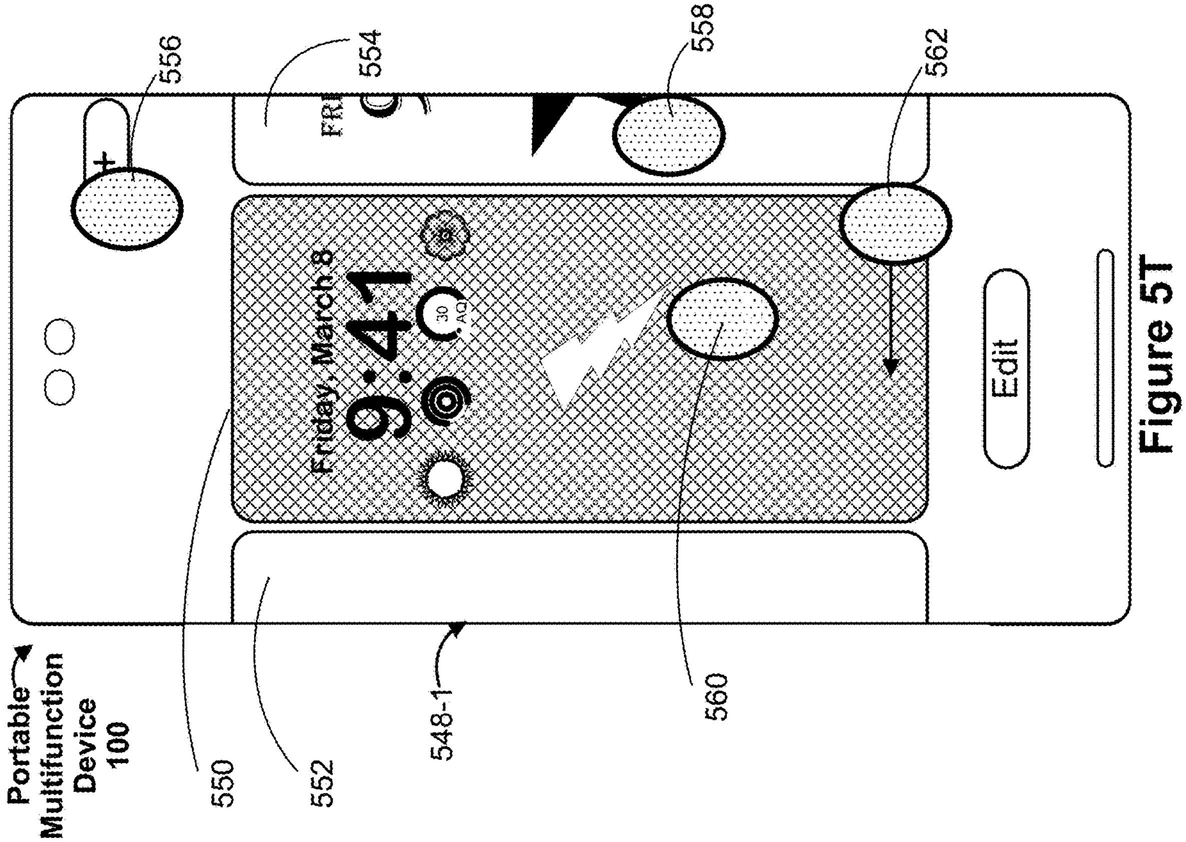

FIG. 5R illustrates wake screen user interface 540-2 that replaces wake screen user interface 540-1 in response to user input 541. In some embodiments, wake screen user interface 540-2 includes at least one feature that is different than wake screen user interface 540-1. For example, the font of the indication of the time and/or date is changed to a bolded font, and the background image and color of the background changes. In some embodiments, one or more other features of the wake screen user interface do not change, such as the type of complications. It will be understood that any combination of features may be updated between a first wake screen user interface and a second wake screen user interface, including a subset, less than all, or all of the complications changing, and/or font properties of the indication of the time and/or date.

FIG. 5R further illustrates a user input 544 corresponding to a request to switch to another wake screen user interface via a wake screen selector user interface. In some embodiments, user input 544 is a long press or other selection input, wherein the user input maintains contact with the display for a predetermined threshold amount of time (e.g., 2 seconds, 3 seconds, or 5 seconds) at a predefined portion of the user interface 540-2 (e.g., at a portion of the user interface that does not correspond to a complication, a shortcut to the flashlight and/or camera, or to the indication of the time and/or date). In some embodiments, in response to user input 544, the device 100 displays a wake screen selector user interface 548-1. In some embodiments, the user input 544 maintains contact with the device while the wake screen selector user interface 548-1 is displayed, and the timing and/or position of liftoff of user input 544 causes the device 100 to perform a respective operation (e.g., a long press that is let go after a timer without moving position, causes the device to display the expanded face switcher user interface 561 (FIG. 5U) and a long press with a change in position of the contact (e.g., a swipe to an adjacent face without lifting off) causes the device to go to the adjacent wake screen user interface without entering the expanded face switcher user interface 561).

Figure 5S:
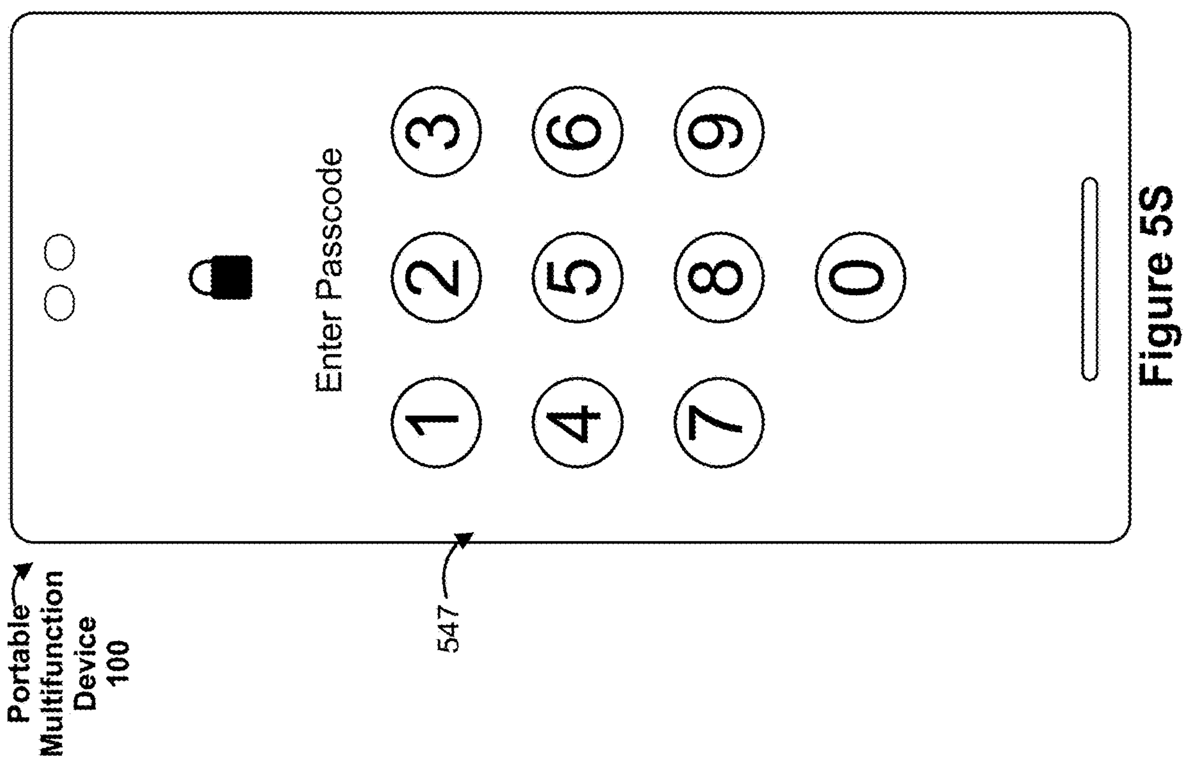

In some embodiments, in accordance with a determination that the device 100 is in a locked state, before displaying the wake screen selector user interface 548-1, the device 100 requires authentication to unlock the device, and displays a passcode user interface 547, as illustrated in FIG. 5S. In some embodiments, the device 100 prompts the user to enter a passcode and/or authenticate using a fingerprint, facial, or other biometric identification.

FIG. 5T illustrates the wake screen selector user interface 548-1 In some embodiments, the wake screen selector user interface 548 includes representations for a plurality of wake screen user interfaces, including a representation 552 of a portion of a first wake screen user interface (e.g., wake screen user interface 540-1), a representation 550 of a second wake screen user interface (e.g., wake screen user interface 540-2), and a representation 554 of a portion of a third wake screen user interface (e.g., wake screen user interface 507-1 (FIG. 5W)). In some embodiments, the wake screen selector user interface 548-1 displays representations for a set of wake screen interfaces that the device 100 stores, and optionally cycles through, as described above.

In some embodiments, the wake screen selector user interface 548-1 provides a plurality of options for the user to interact with the representations of wake screen user interfaces. For example, the device initiates a process to add a new wake screen user interface to the set of wake screen user interfaces in response to user input 556 (e.g., a tap input or other selection input) on the "+" button.

Figure 5V:
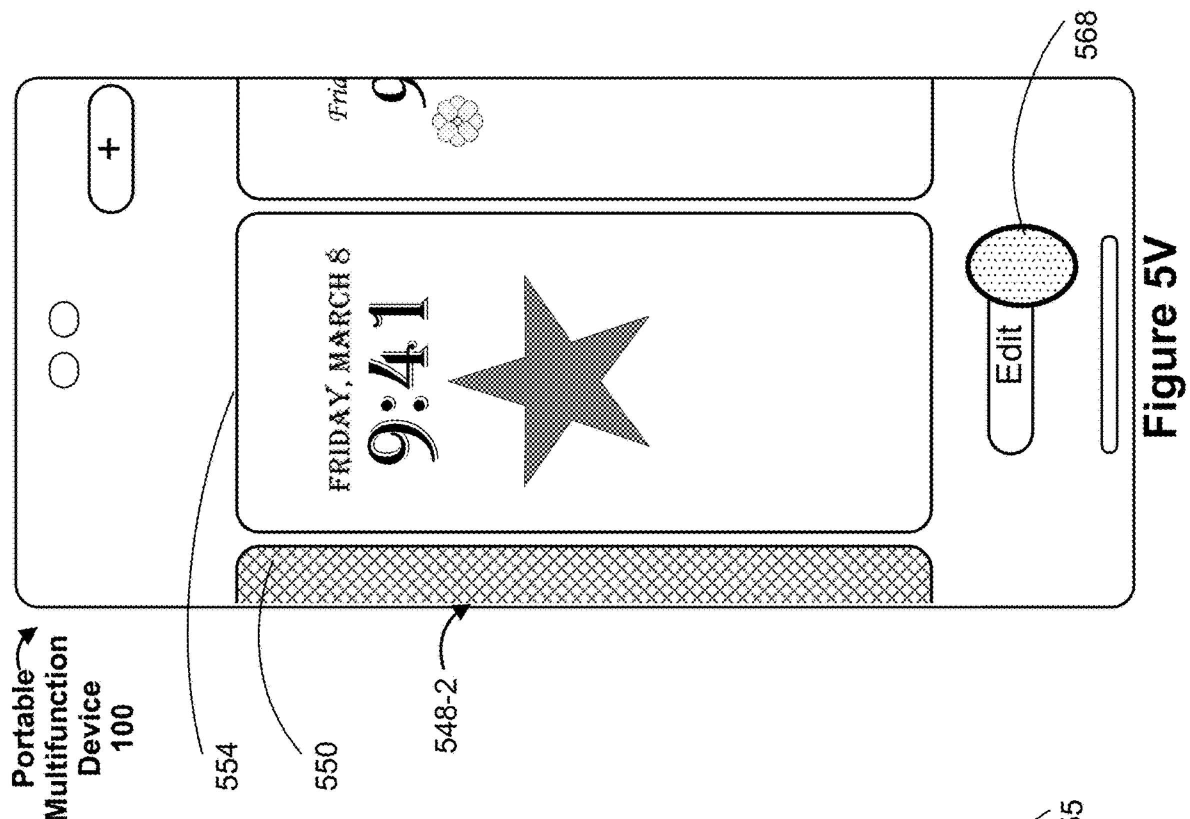
Figure 5U:
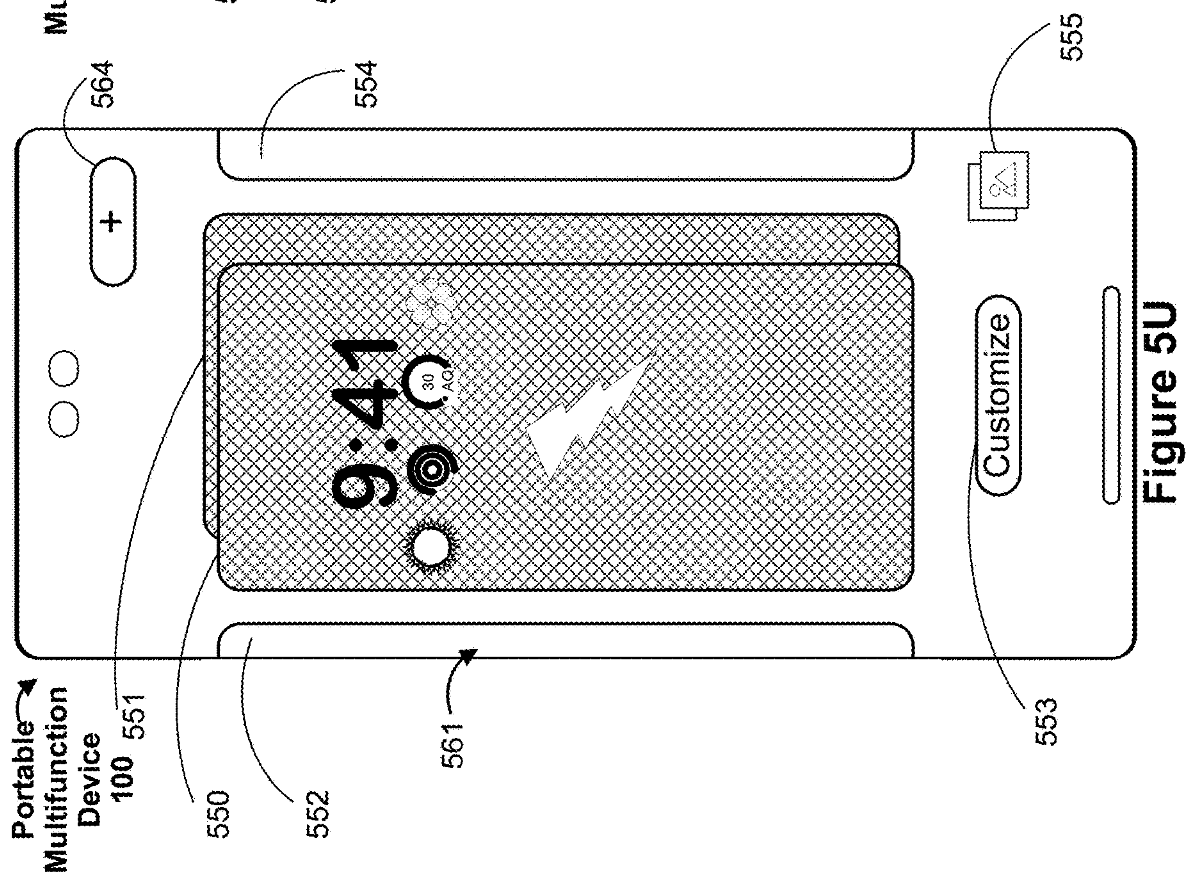

In some embodiments, in response to detecting a user input that selects a respective representation of a respective wake screen user interface in a wake screen selector interface displaying respective representations of multiple instances of the wake screen user interface, the device 100 displays the respective wake screen user interface as the current wake screen user interface. For example, in response to a user input 560, such as a tap input or other selection input, on or directed to the representation 550 of the second wake screen user interface, the device ceases display of the wake screen selector user interface 548-1 and redisplays the wake screen user interface 540-2 (FIG. 5R). In some embodiments, in response to a user input 558, such as a tap input or other input, the device scrolls to the right to bring the representation 554 to the center of the wake screen selector user interface 548-2 (FIG. 5V).

In some embodiments, in accordance with a determination that the user input 544 is maintained for a threshold amount of time (e.g., a long press user input that is held from the wake screen user interface 540-2 and while displaying wake screen selector user interface 548-1), and is lifted off without moving (e.g., swiping to the left or right), the device 100 displays an expanded face switcher user interface 561, as illustrated in FIG. 5U.

FIG. 5U illustrates that the expanded face switcher user interface 561 includes a representation 550 of a wake screen user interface (e.g., in the center of the expanded face switcher user interface 561) and at least a portion of a representation of a home screen user interface 551 that is associated with the representation 550 of the wake screen user interface. For example, one or more of the respective wake screen user interfaces have a corresponding respective home screen user interface. In some embodiments, changing display of a wake screen user interface from a first wake screen to a second wake screen automatically updates the home screen user interface from a first home screen associated with the first wake screen to a second home screen associated with or corresponding to the second wake screen. As such, in response to the user navigating from the wake screen to the home screen (e.g., by swiping up or performing another gesture), the displayed home screen is related to the currently displayed wake screen. In some embodiments, a color, pattern, and/or image of the home screen is selected in accordance with a color, pattern and/or image of the wake screen with which the home screen is associated.

In some embodiments, expanded face switcher user interface 561 optionally also displays at least a portion of a representation 552 and/or representation 554 of other wake screen user interfaces. In some embodiments, only the wake screen user interface that is currently centered in the expanded face switcher user interface 561 is displayed with a representation of its related home screen user interface. For example, representations 552 and 554 of wake screen user interfaces are not displayed with corresponding representations of home screen user interfaces.

In some embodiments, expanded face switcher user interface 561 includes a user-selectable button 564 for adding a new wake screen and/or home screen to the set of wake screens and home screens that are stored and displayed in the expanded face switcher user interface 561. In some embodiments, the computer system detects and responds to user inputs directed to the expanded face switcher user interface 561 that correspond to requests to scroll to the left and/or right to navigate between wake screen and home screen options in the set of wake screens and home screens in the expanded face switcher user interface 561. In some embodiments, expanded face switcher user interface 561 further includes a user-selectable option 553 to customize the wake screen that is centered in the expanded face switcher user interface 561. For example, a user selection input on option 553 would open the editing user interface (e.g., editing user interface 565, FIG. 5X) for the wake screen corresponding to representation 550. In some embodiments, expanded face switcher user interface 561 includes an option 555 for changing a background image of the background of the wake screen corresponding to representation 550. In some embodiments, in response to a user selection input on option 555, a photo picker is displayed in which the computer system detects and responds to user inputs that correspond to requests to select a photo or image to be used as the background of the wake screen corresponding to representation 550.

FIG. 5V illustrates updating the wake screen selector user interface 548-1 to wake screen selector user interface 548-2, which brings the representation 554 of a wake screen user interface into the center of the wake screen selector user interface. In some embodiments, the wake screen selector user interface 548-2 is displayed in response to a user input 558, such as a tap input or other selection input, on the representation 554, or a swipe input or other scroll input from right to left, which causes the device to shift the representations of wake screen user interfaces that are within view to bring representation 554 of a wake screen user interface into the center, and move representation 550 of the previously centered wake screen user interface to the left (optionally sliding a portion of the representation 550 off the display), of the wake screen selector user interface 548-2.

In some embodiments, wake screen selector user interface 548-2 includes a user-selectable option to edit the currently centered wake screen. For example, in response to user input 568 (e.g., a tap input or other selection input) on the Edit button, the device 100 displays an editing user interface 565 for the wake screen, as illustrated in FIG. 5X.

FIG. 5W illustrates a wake screen user interface 563 that is displayed in response to a user input (e.g., user input 562) that corresponds to a request to quick switch the wake screen user interface. In some embodiments, the user input to request to quick switch the wake screen user interface comprises a long press input that is initiated on a displayed wake screen user interface 540-2 (e.g., user input 544, FIG. 5R), wherein the long press input is maintained (e.g., the contact of the input is continued) while displaying the wake screen selector user interface 548-1 (FIG. 5T), and while the long press input is ongoing, the input changes position (e.g., swipes in a first direction), such as user input 562 that slides from right to left. In some embodiments, in accordance with a determination that the user input lifts off, the wake screen that is displayed in the center of wake screen selector user interface 548-1 is switched to, such that the wake screen is displayed as the current wake screen. For example, in FIG. 5T, the user swipes left until the representation 554 is centered (or substantially centered) in the wake screen selector user interface 548-1, then lifts off the user input to display the wake screen 563 that is associated with the representation 554, as illustrated in FIG. 5W. In some embodiments, the quick switch of the wake screen user interface does not display the expanded face switcher user interface 561.

In some embodiments, as illustrated in FIG. 5W, the device 100 displays the editing user interface 565-*a* (FIG. 5W1) or editing user interface 565 (FIG. 5X) in response to a user input 564 on the indication of a time and/or date displayed in the wake screen user interface 563. In some embodiments, the user input 564 is a tap input, a long press input, or another selection input. In some embodiments, editing user interface 565-*a*, illustrated in FIG. 5W1 includes reticle 572 for complications that is displayed behind, or at least partially occluded by, a subject of the background image (e.g., the star). In some embodiments, reticle 572 is displayed in front of the subject of the background image (e.g., the star) in response to a user interaction to edit one or more visual properties of the wake screen user interface, such as user input 571-*a* directed to the reticle 572.

Figure 5X:
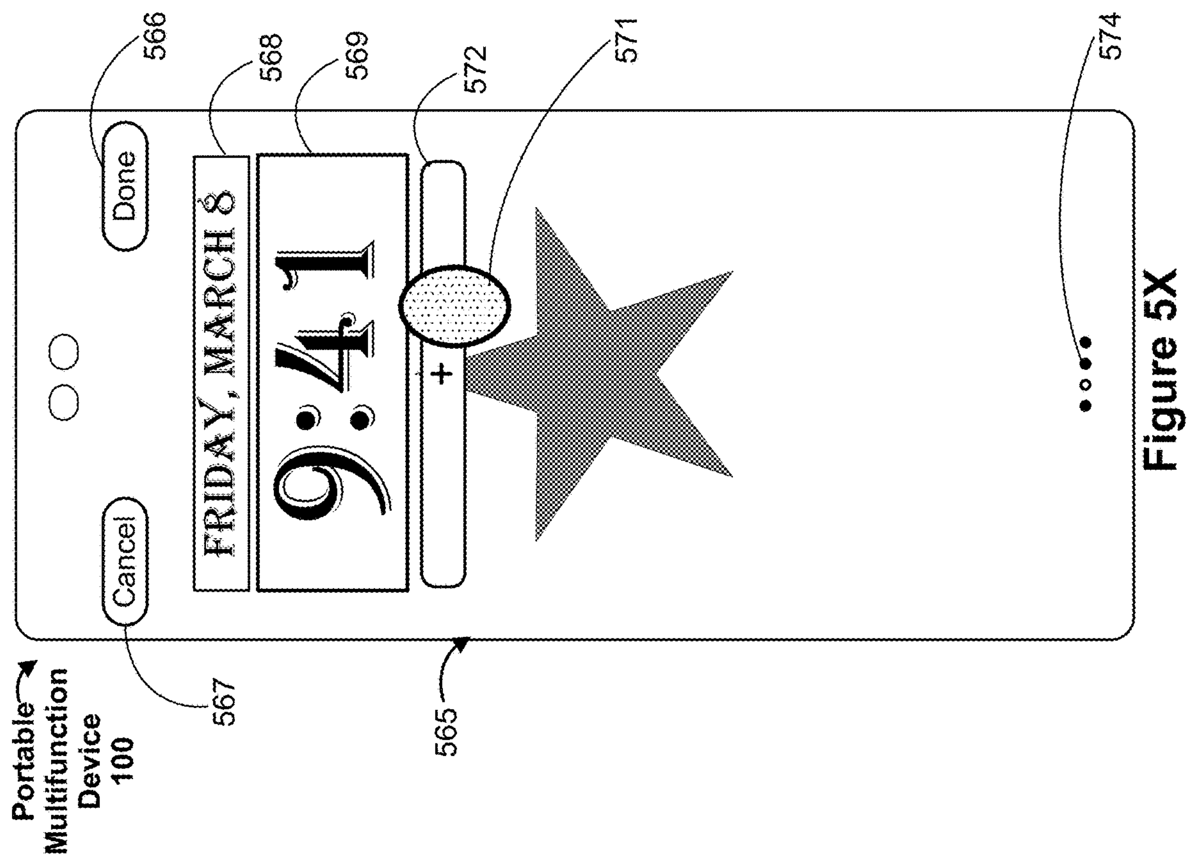

FIG. 5X illustrates editing user interface 565, which as explained above, can be accessed by a user input 564 on the wake screen user interface 563, or by selecting the Edit button via user input 568. In some embodiments, the editing user interface 565 is also accessible via a settings application on device 100, or while a user is creating a wallpaper, which is optionally displayed in a share menu that appears in response to a user requesting to share a selected image (e.g., from a photos application).

In some embodiments, editing user interface 565 includes a plurality of reticles indicating portions of the wake screen user interface that are customizable. For example, reticle 568 around the date and reticle 569 around the time indicate the date and time are editable (e.g., in text font and/or the type of information displayed), and reticle 572 indicates that one or more complications are customizable (e.g., the computer system detects and responds to a user input directed to reticle 572 that corresponds to a request to initiate a process to add, remove, and edit the complications displayed on wake screen user interface 563). In some embodiments, an indication 574 that other views (e.g., pre-generated views that change a color tone, apply a visual effect, and/or change a background view) are available for the selected wake screen user interface 563. In some embodiments, editing user interface 565 includes a user-selectable option to cancel 567 editing the wake screen user interface and/or a user-selectable option for saving any changes to the wake screen user interface and exiting the editing user interface 565 (in response to selection of "Done" option 566).

Figure 5Z:
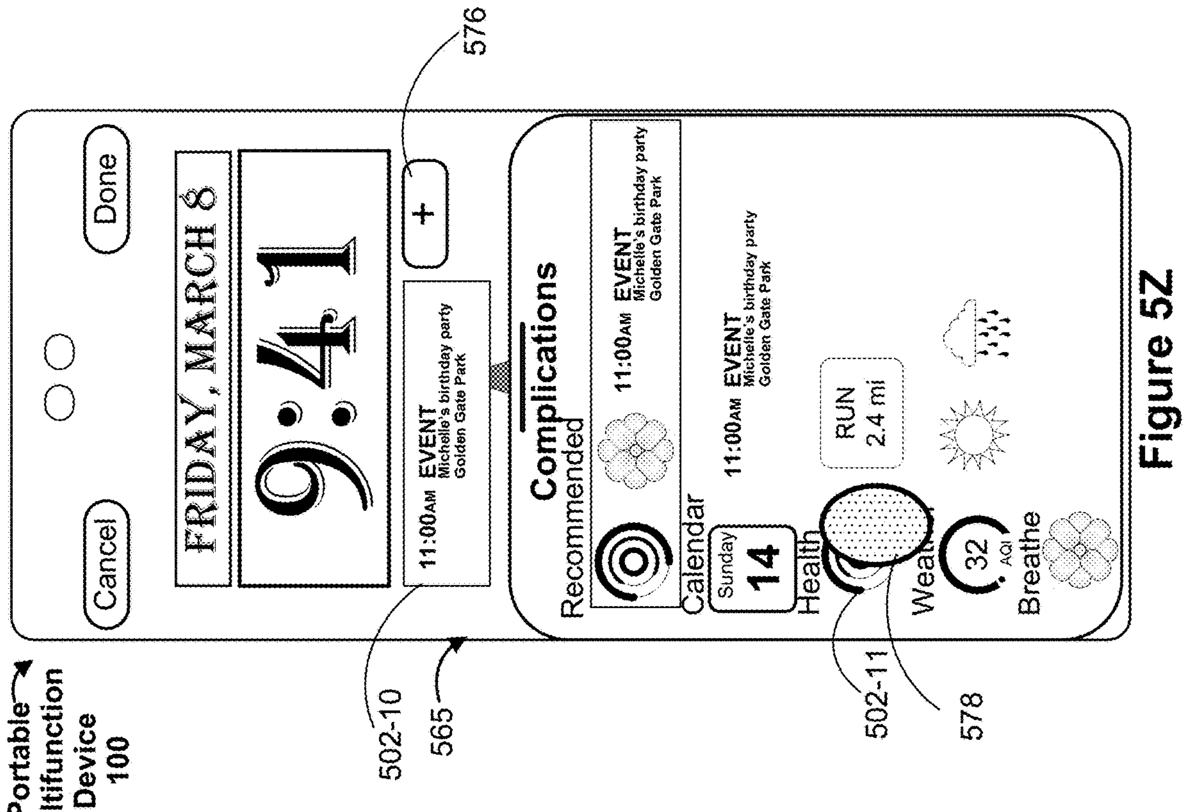
Figure 5Y:
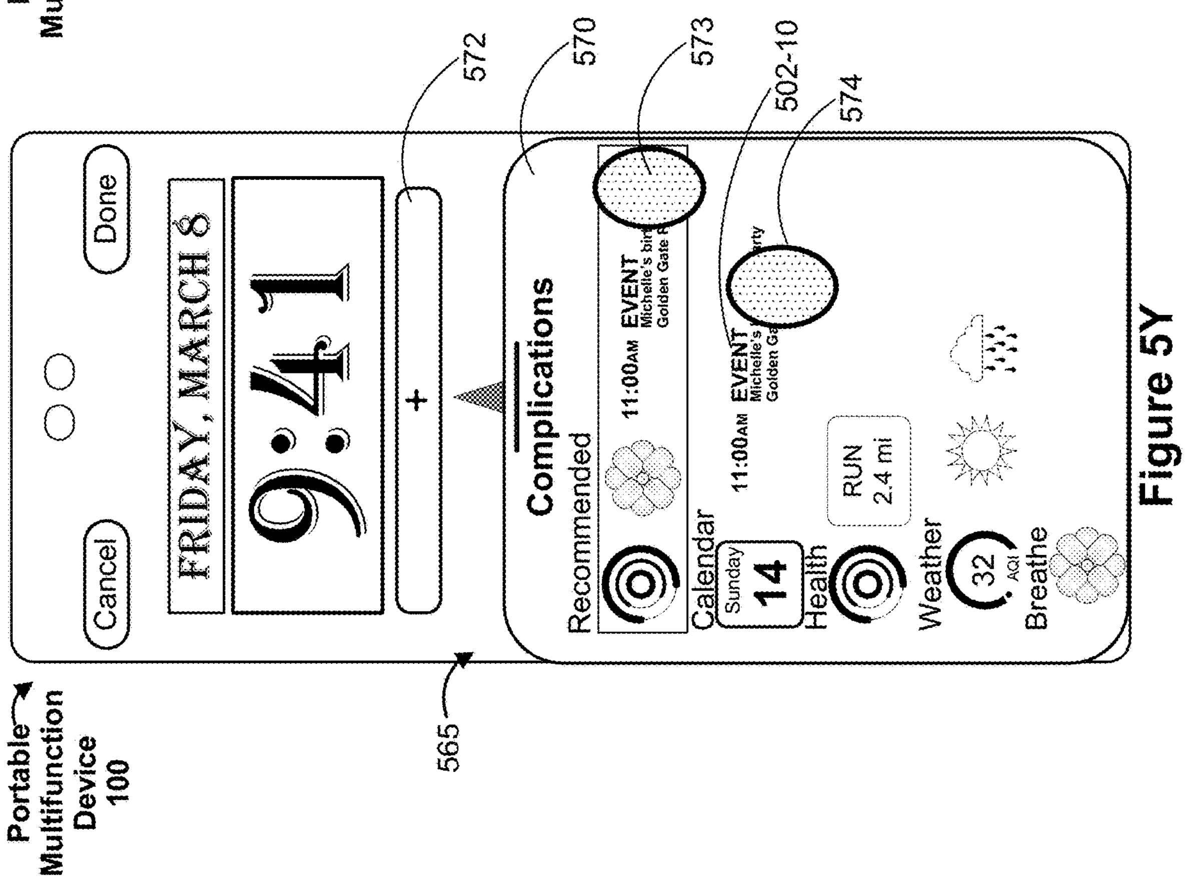
Figure 5A:
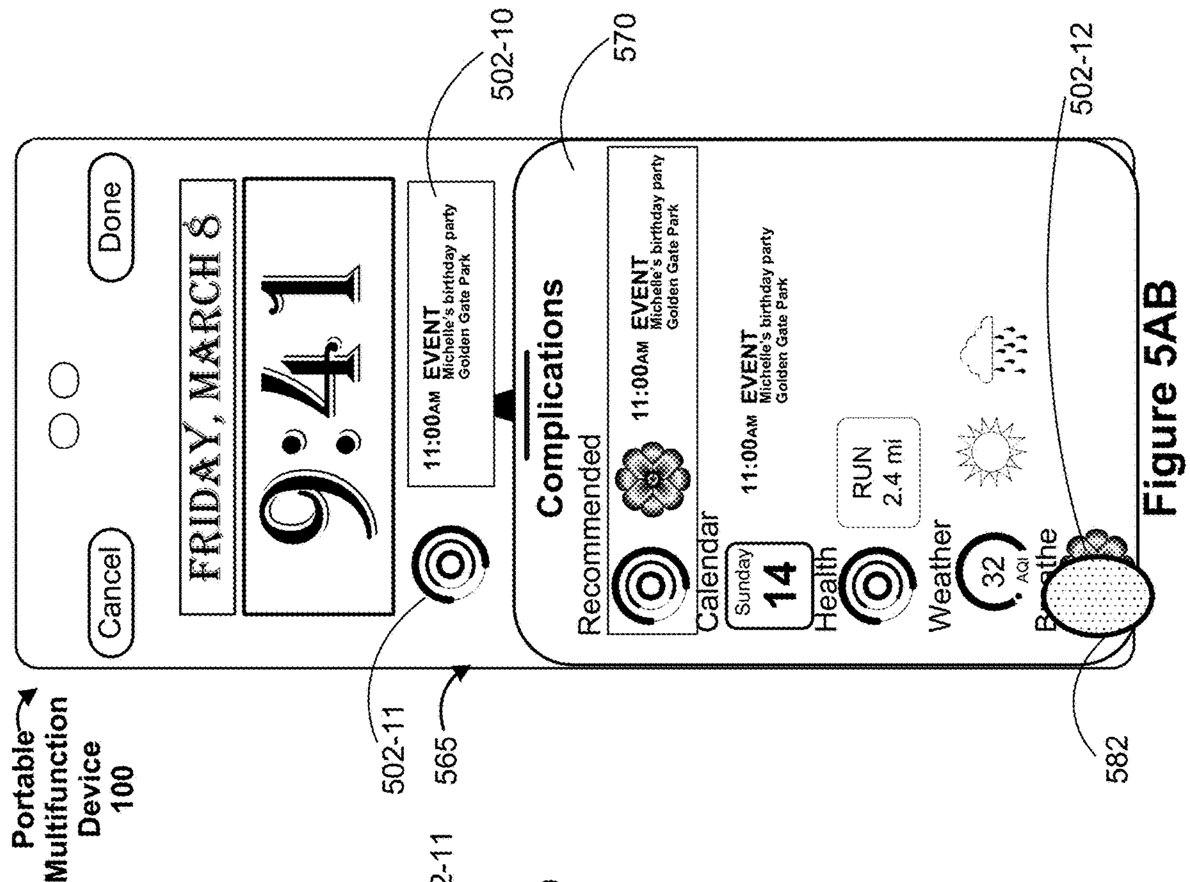
Figure 5A:
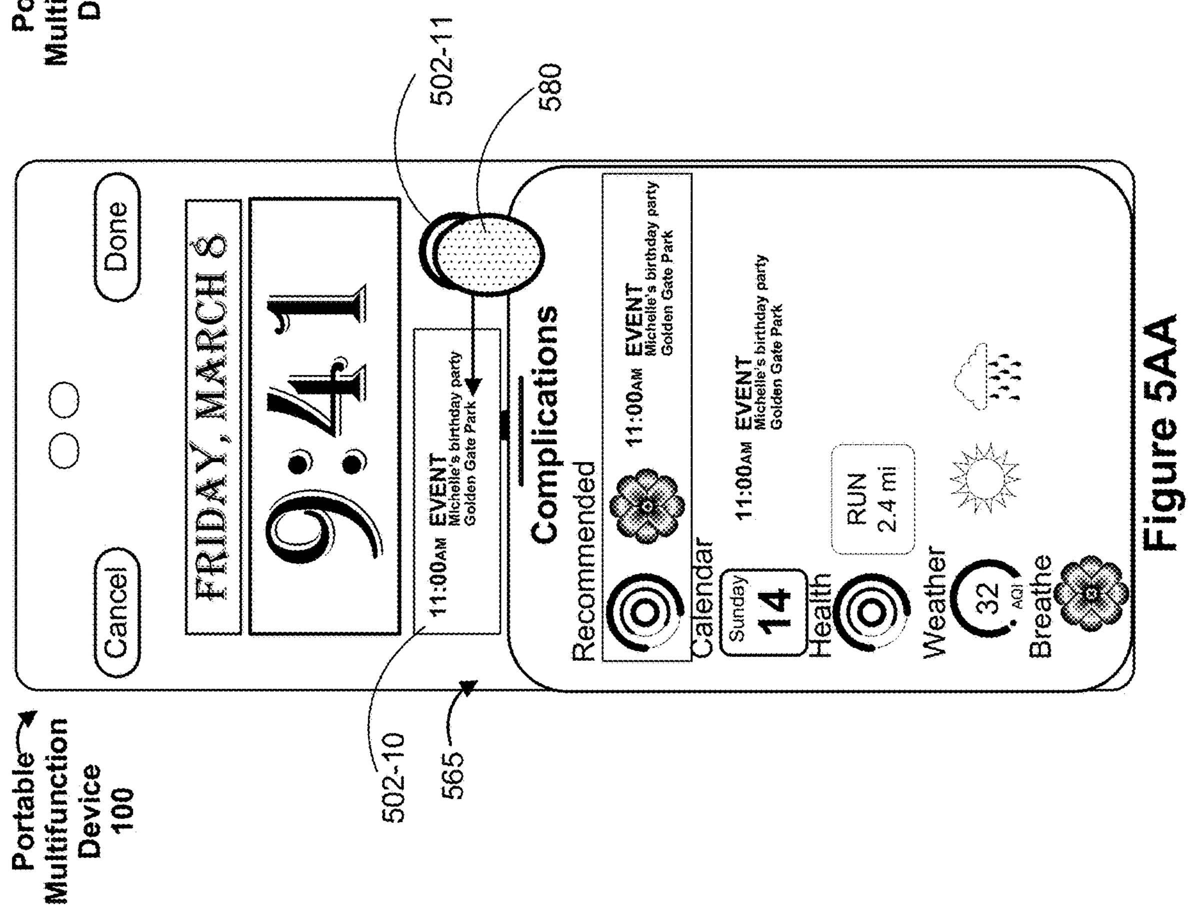
Figure 5A:
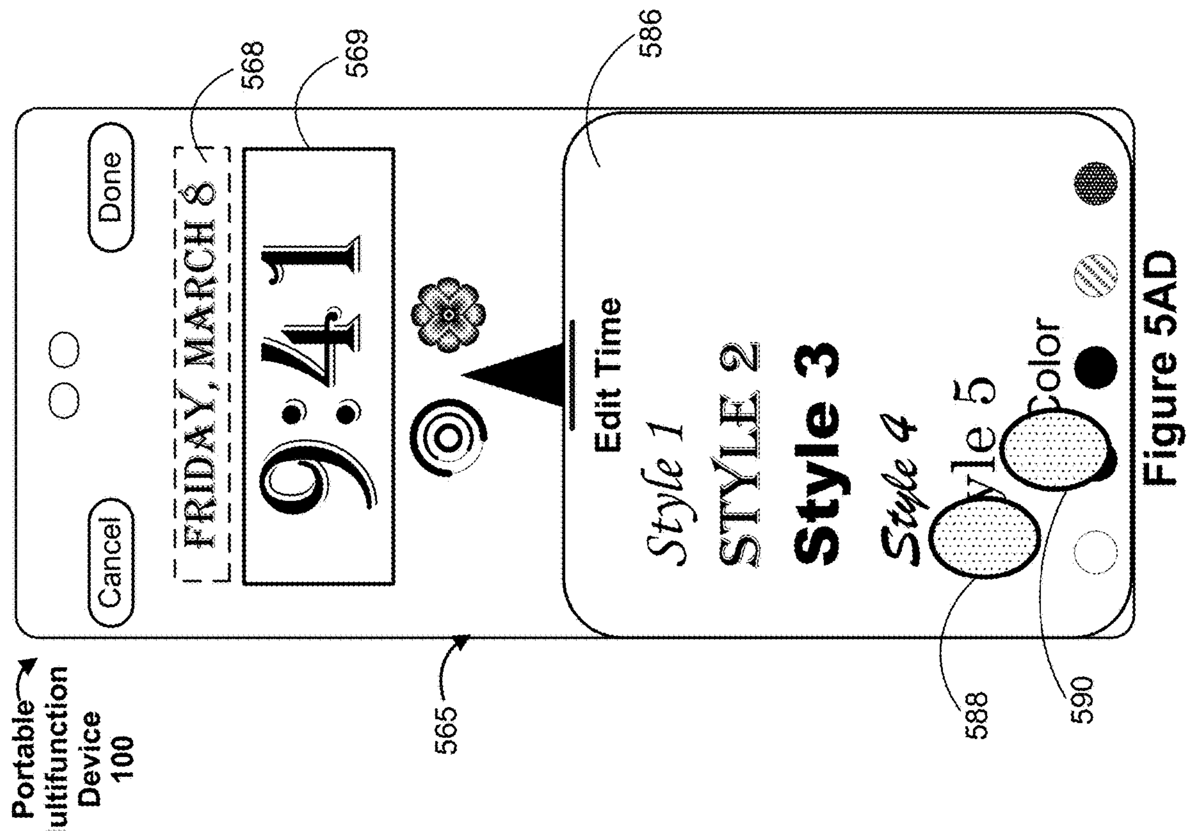
Figure 5A:
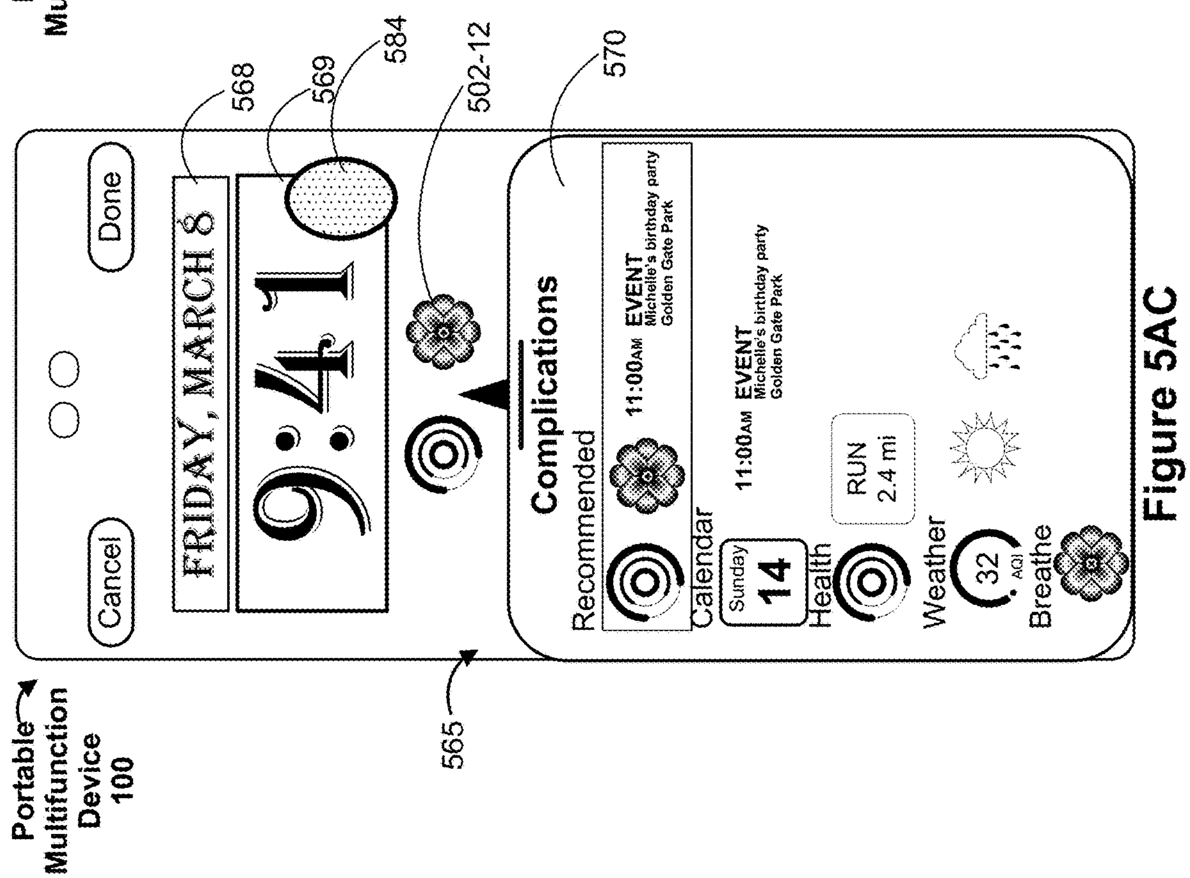
Figure 5A:
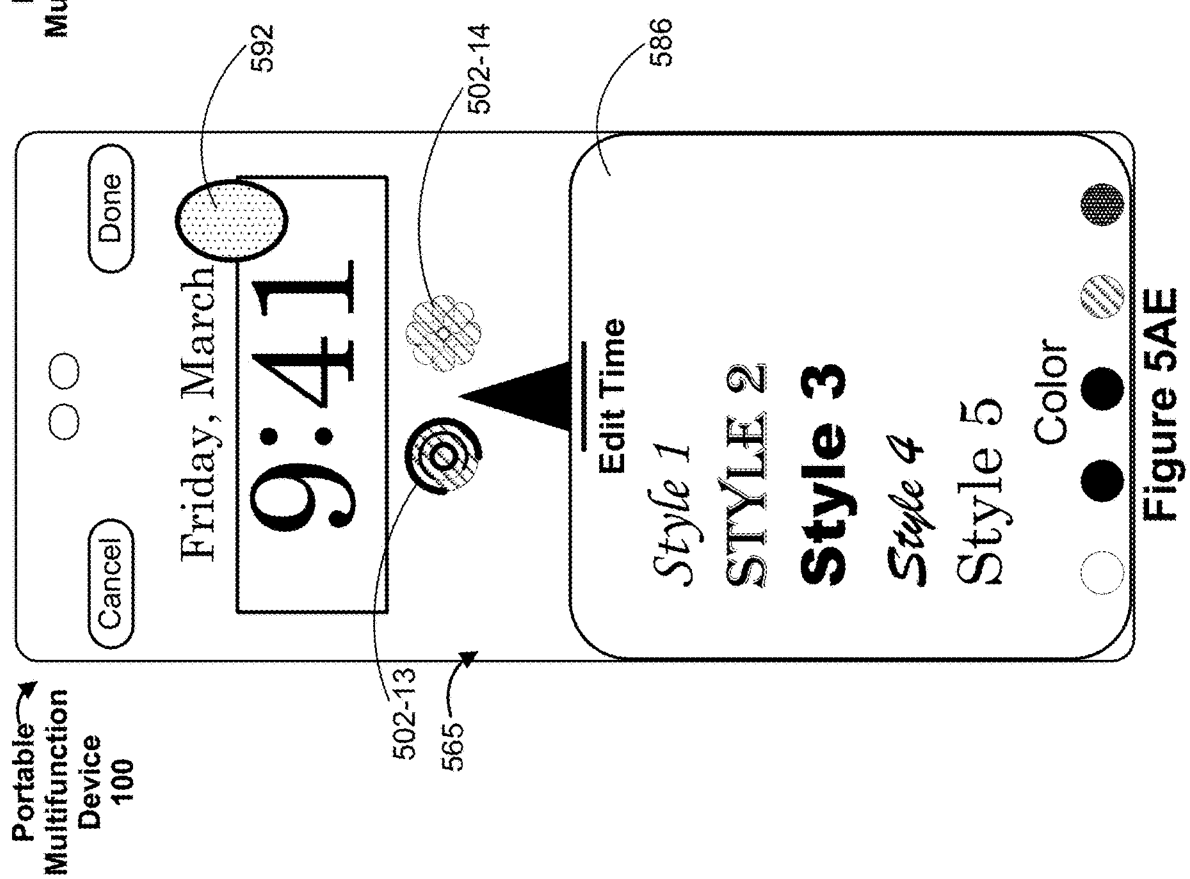
Figure 5A:
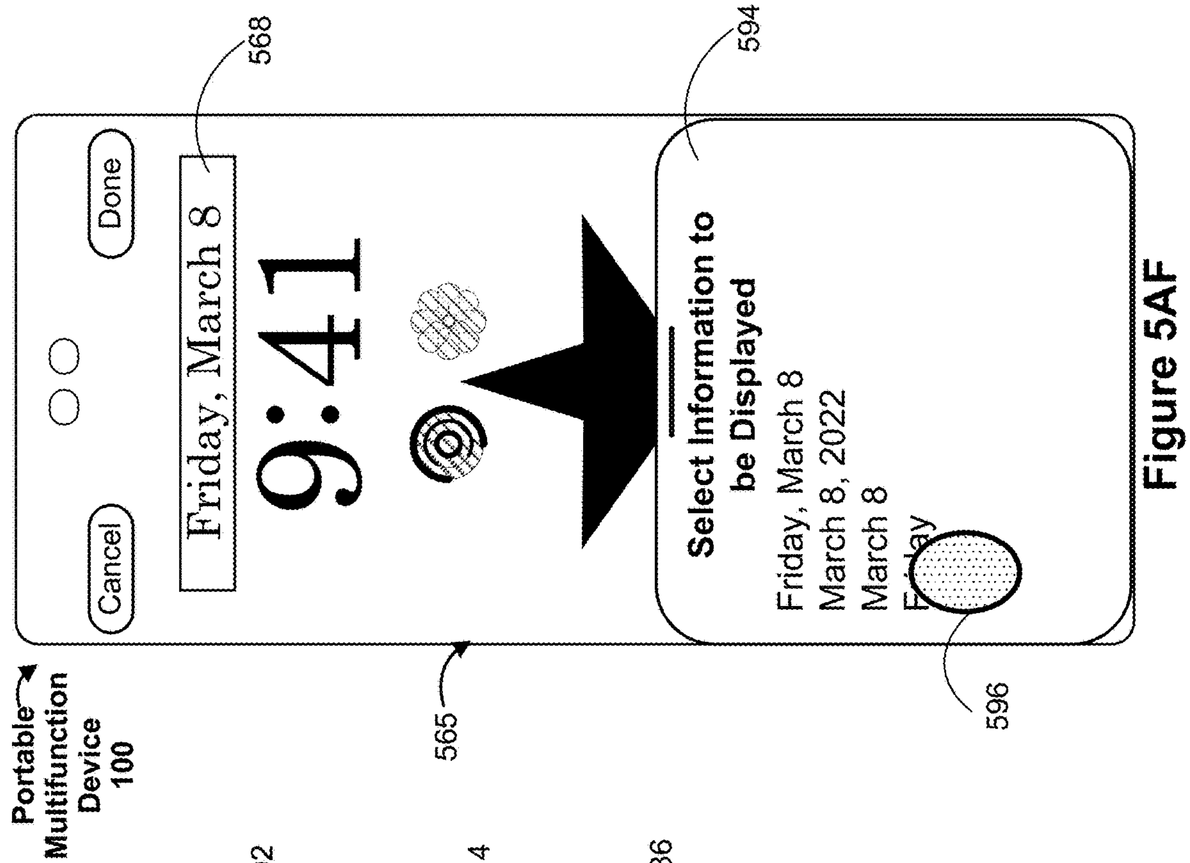
Figure 5A:
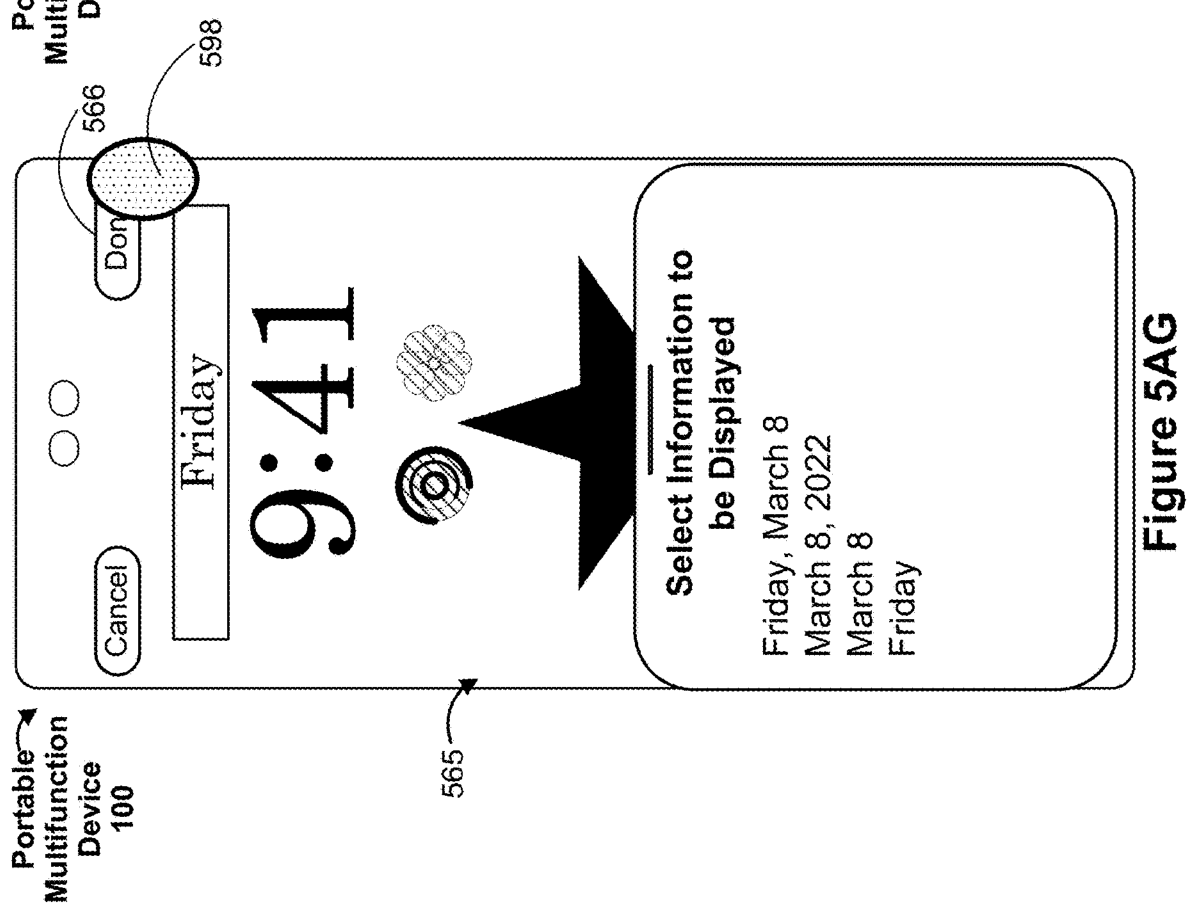
Figure 5A:
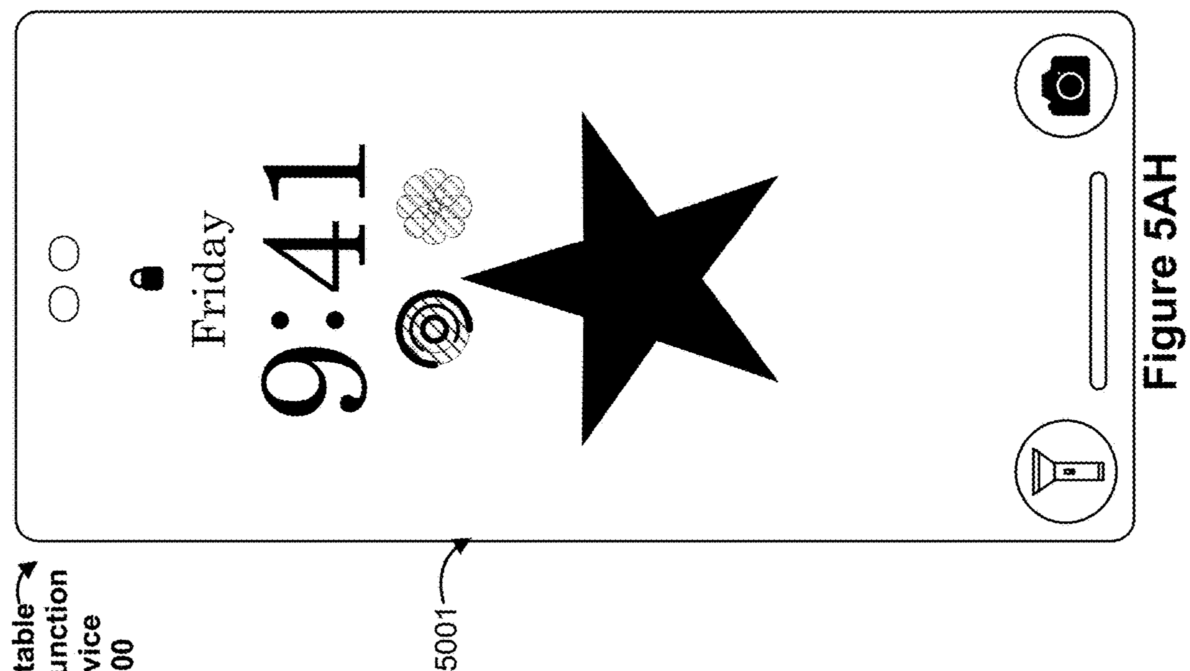
Figure 5A:
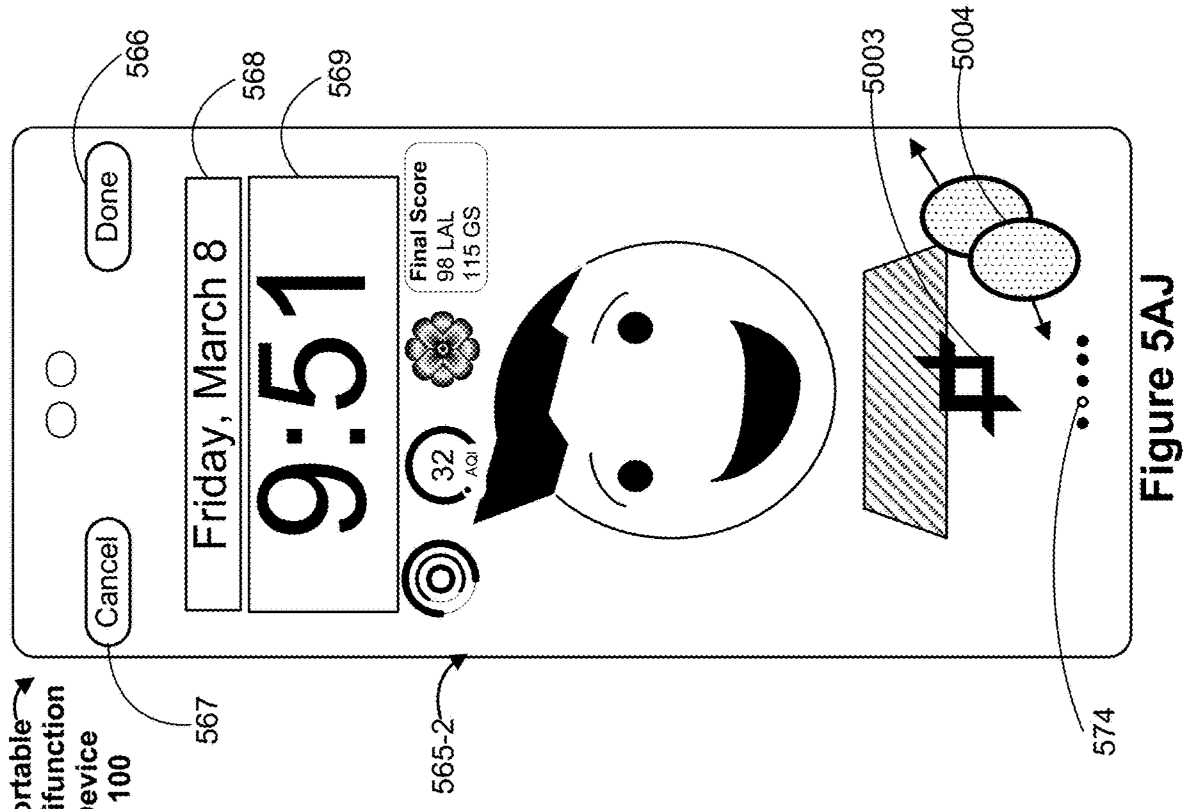
Figure 5A:
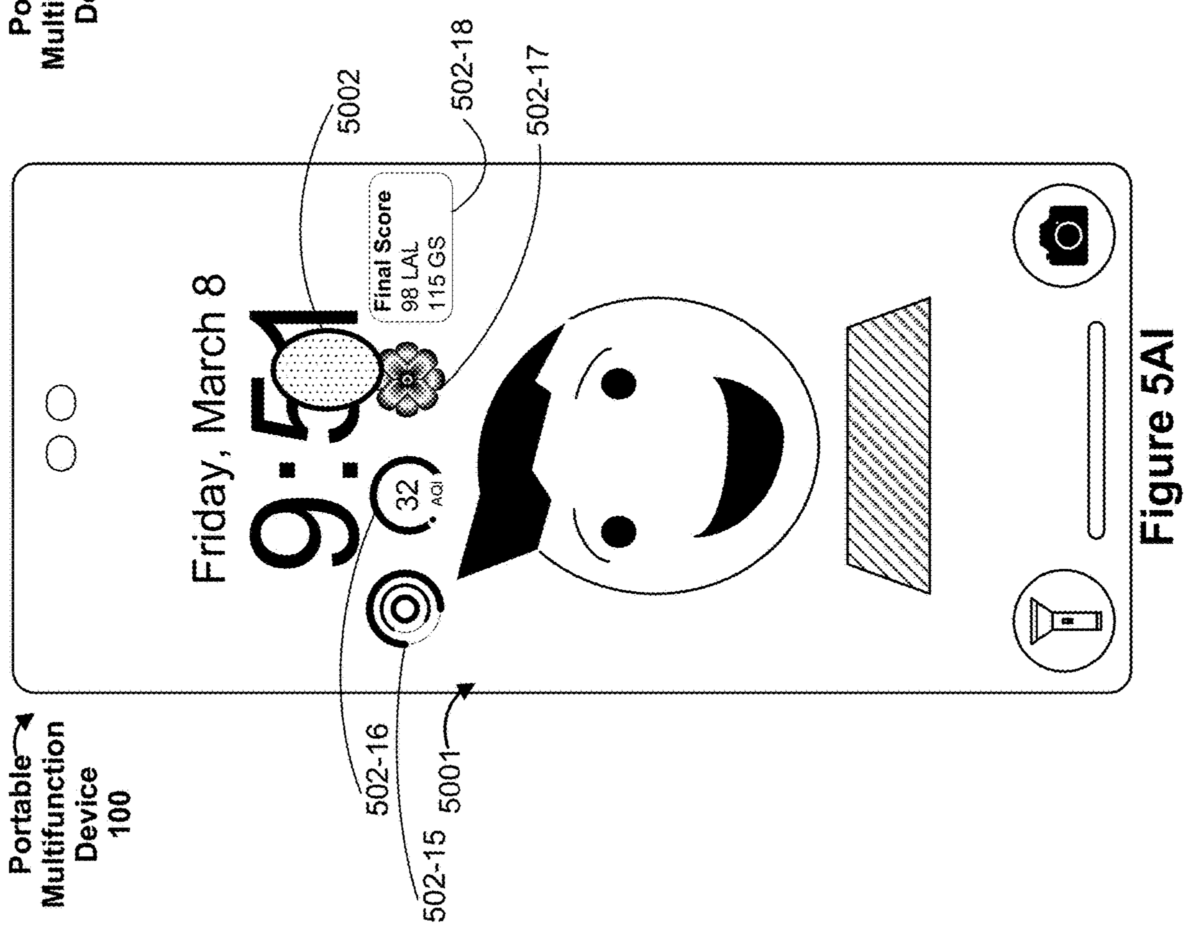
Figure 5A:
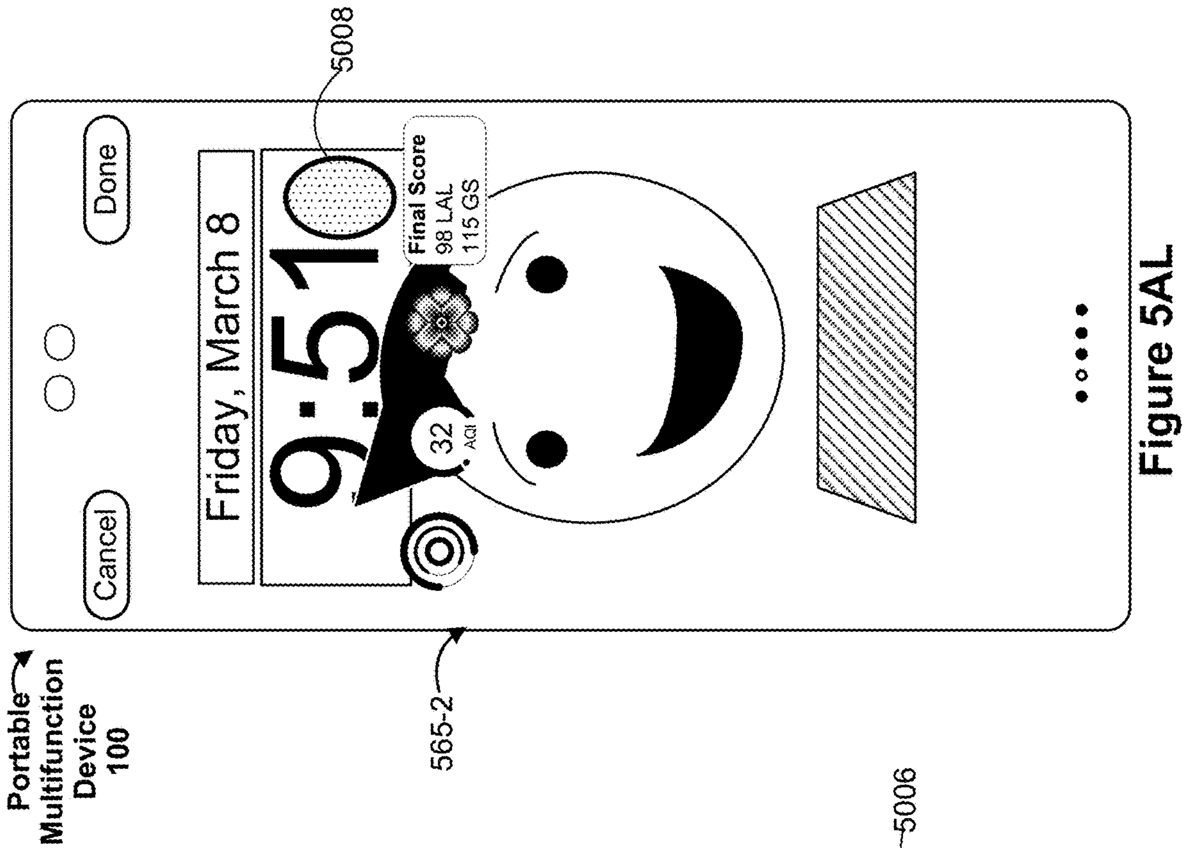
Figure 5A:
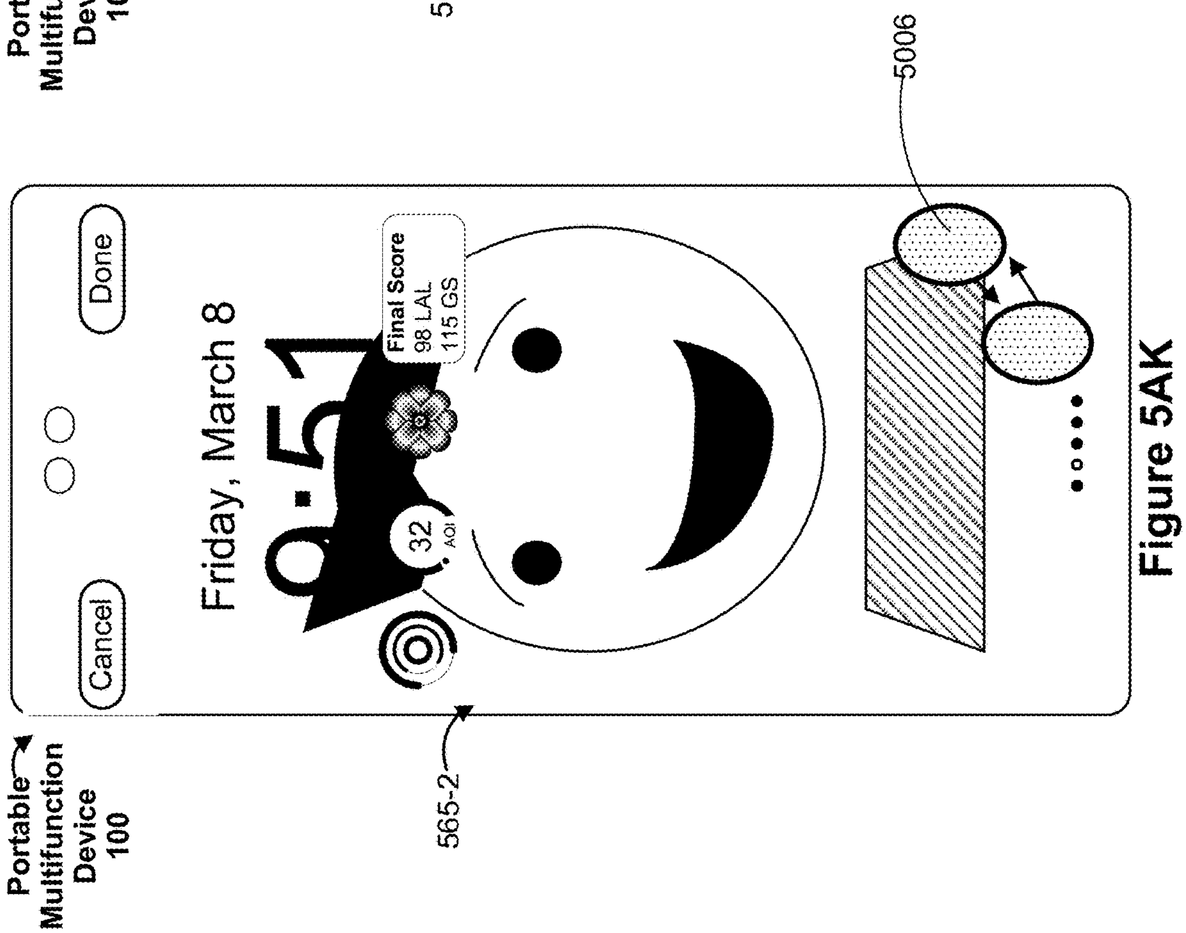
Figure 5A:
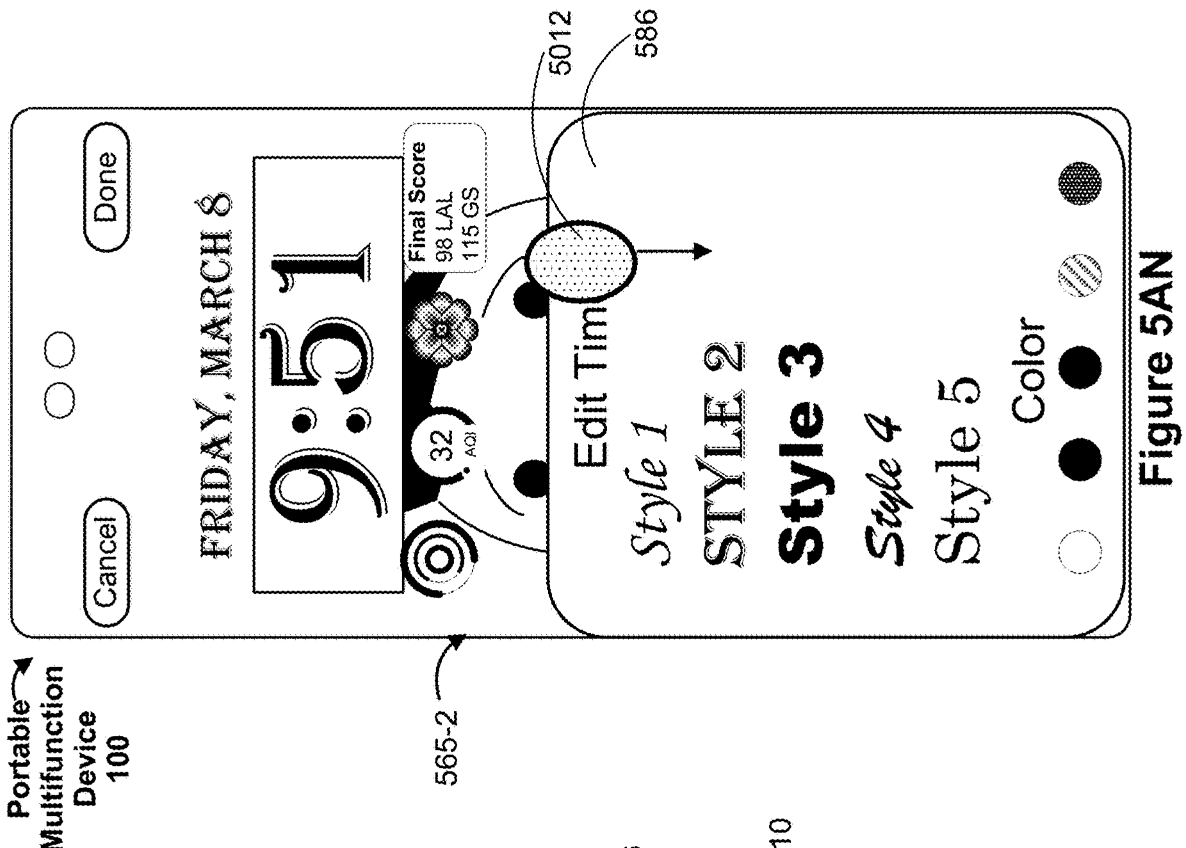
Figure 5A:
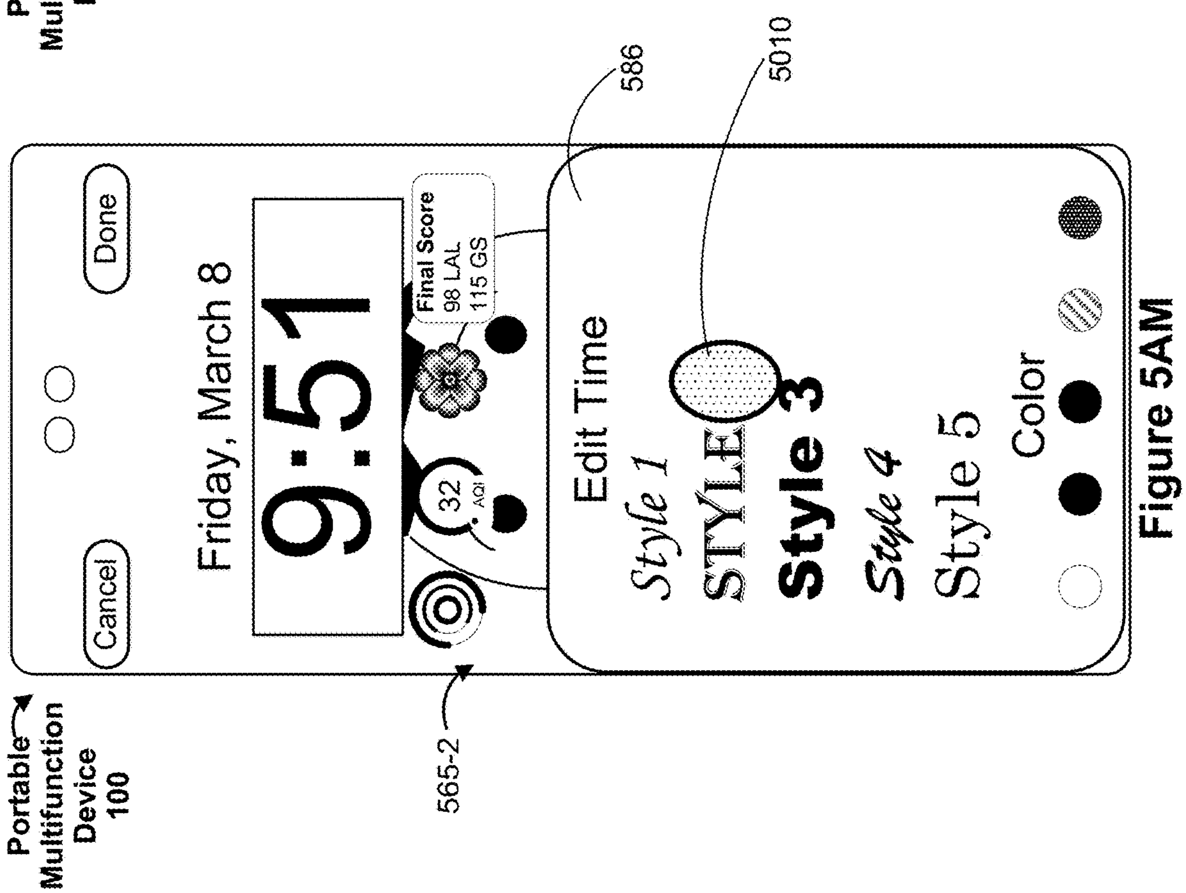
Figure 5A:
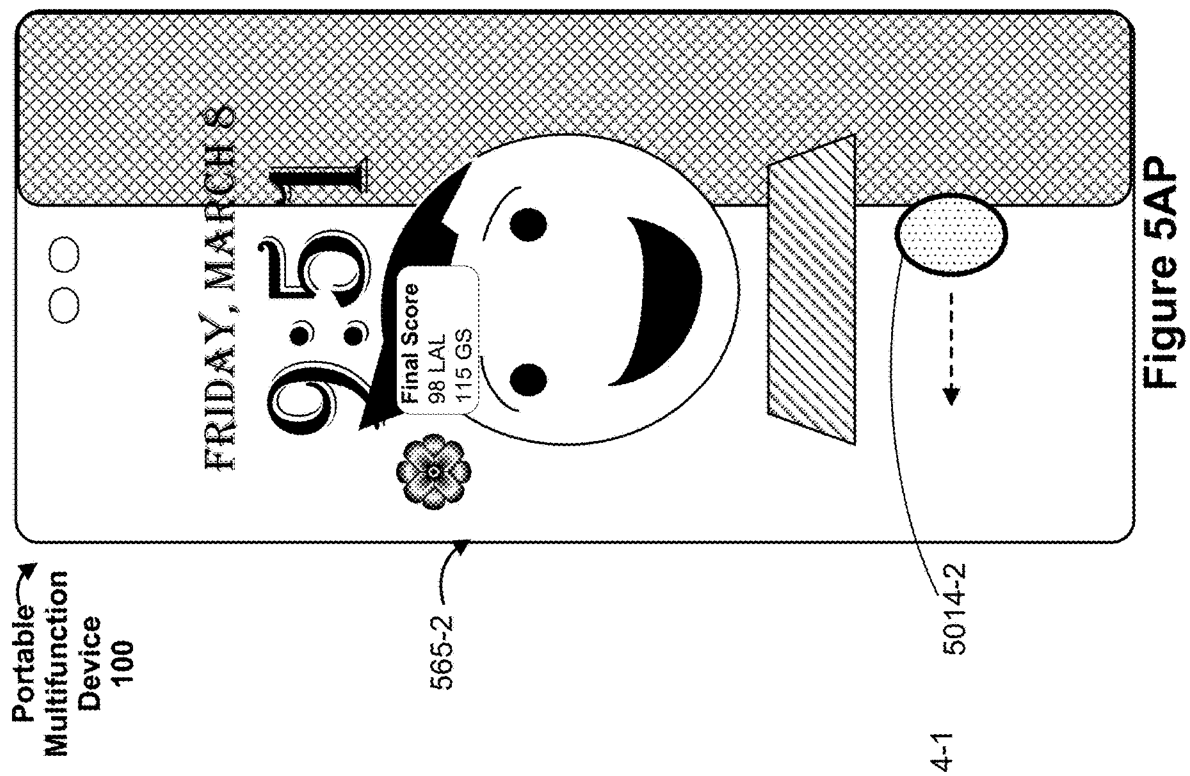
Figure 5A:
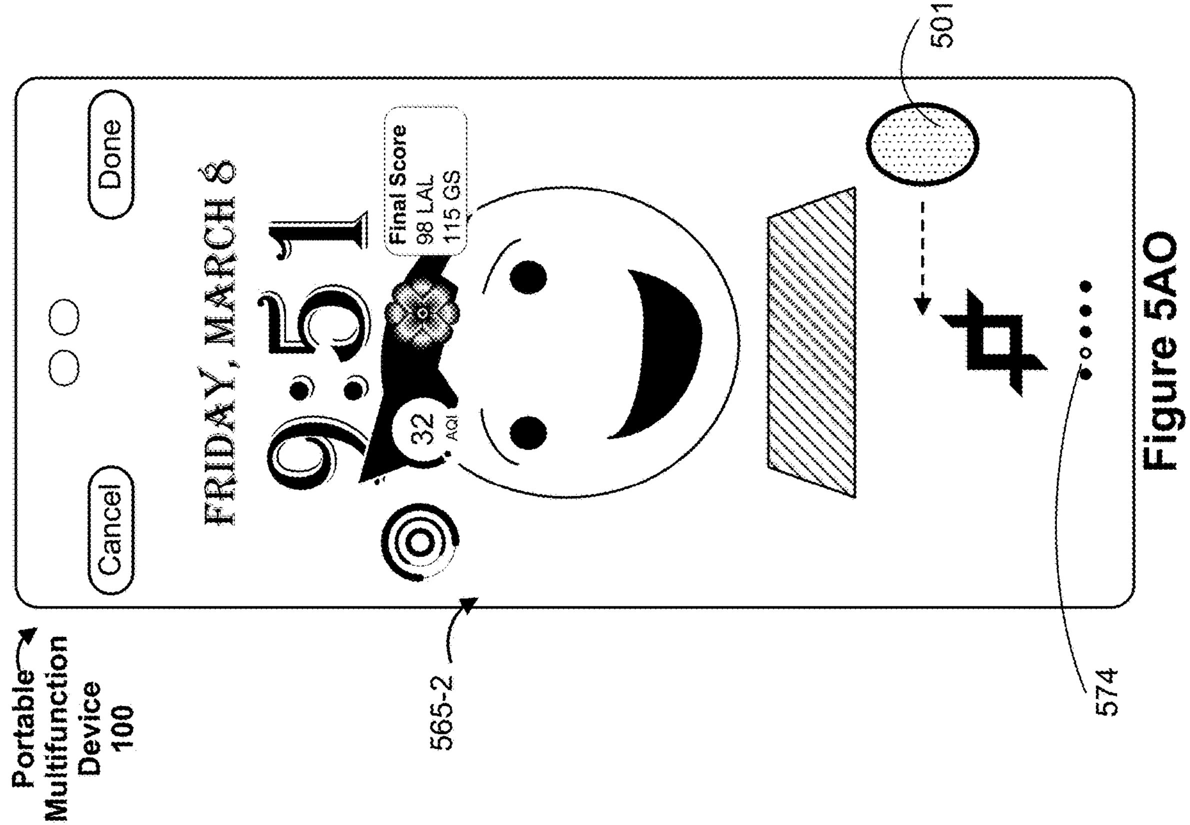
Figure 5A:
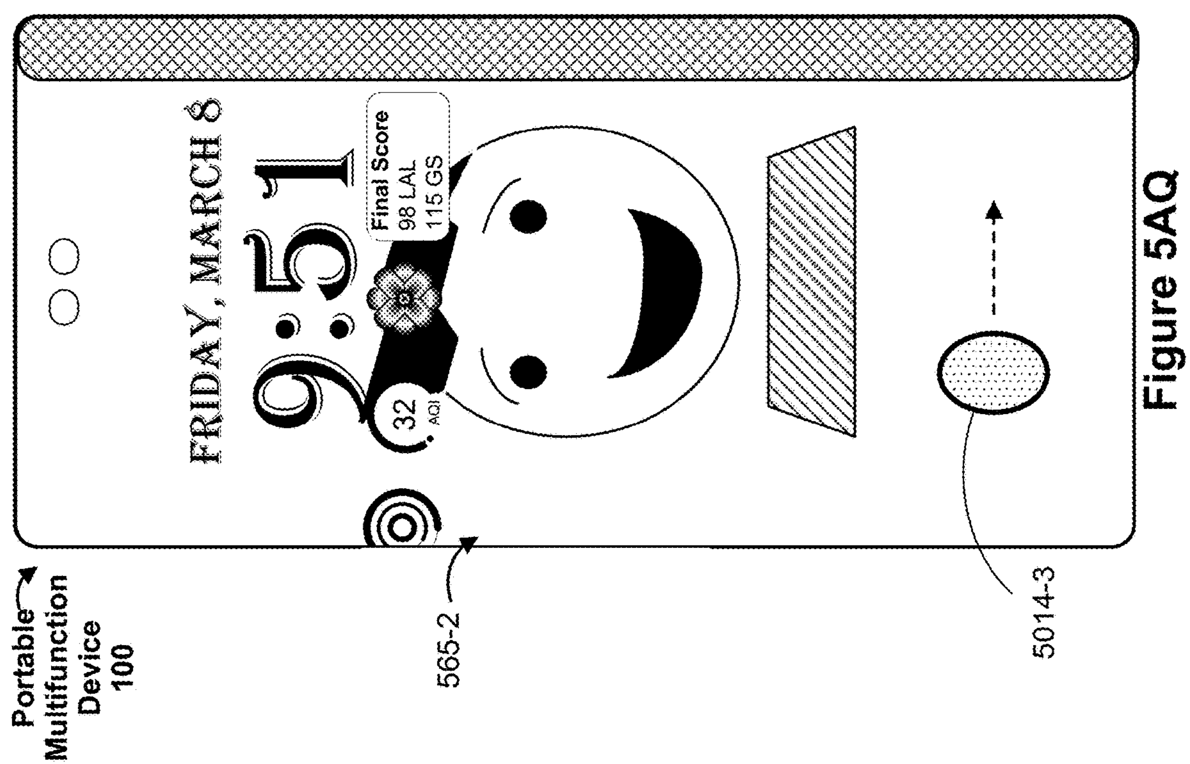
Figure 5A:
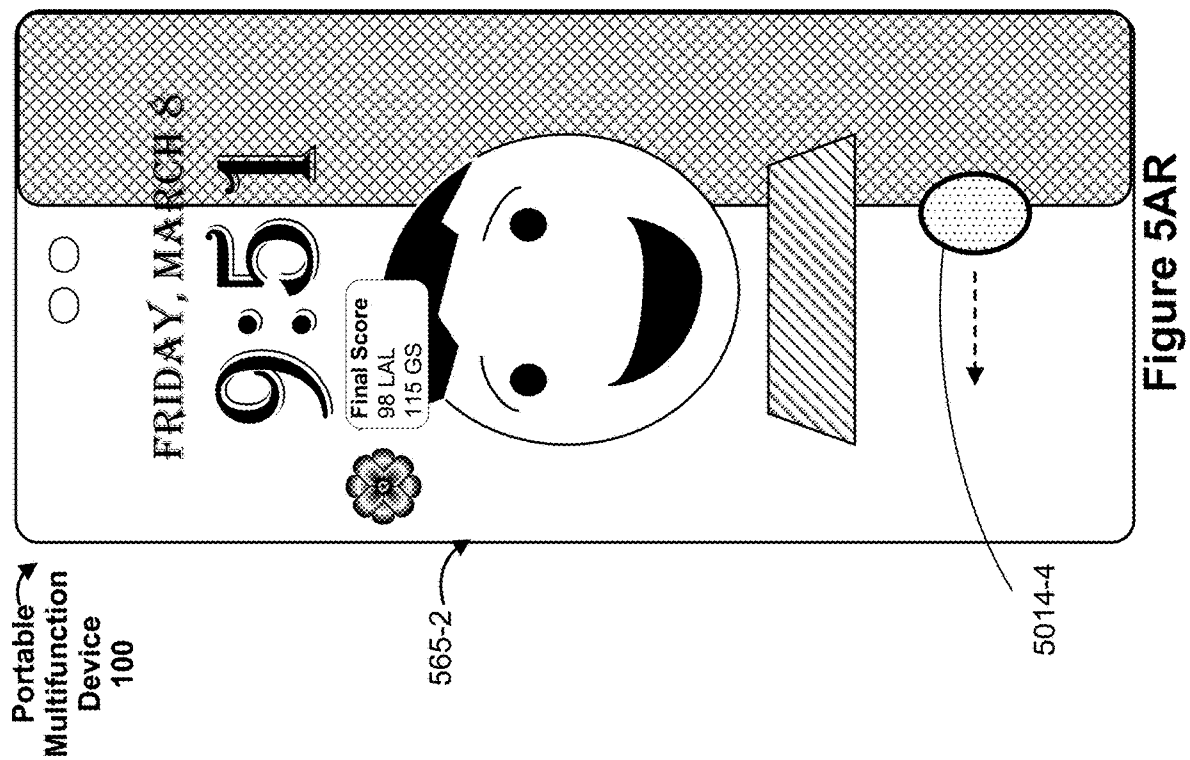
Figure 5A:
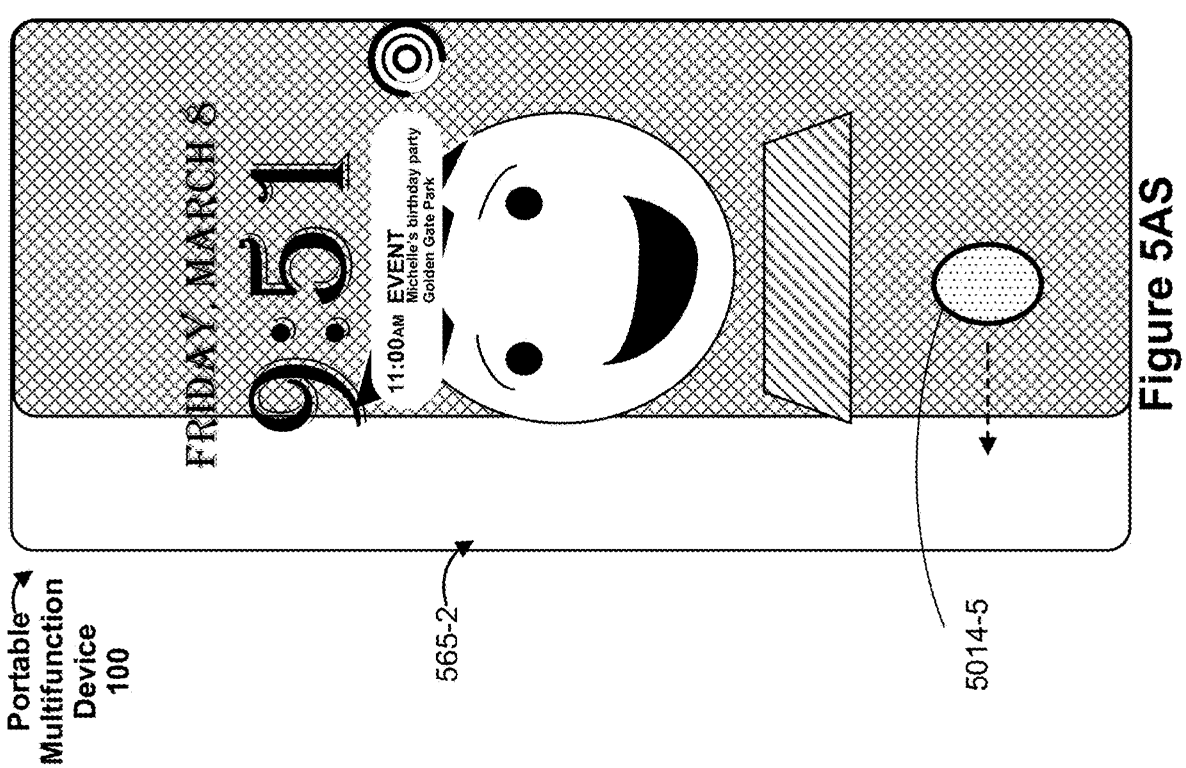
Figure 5A:
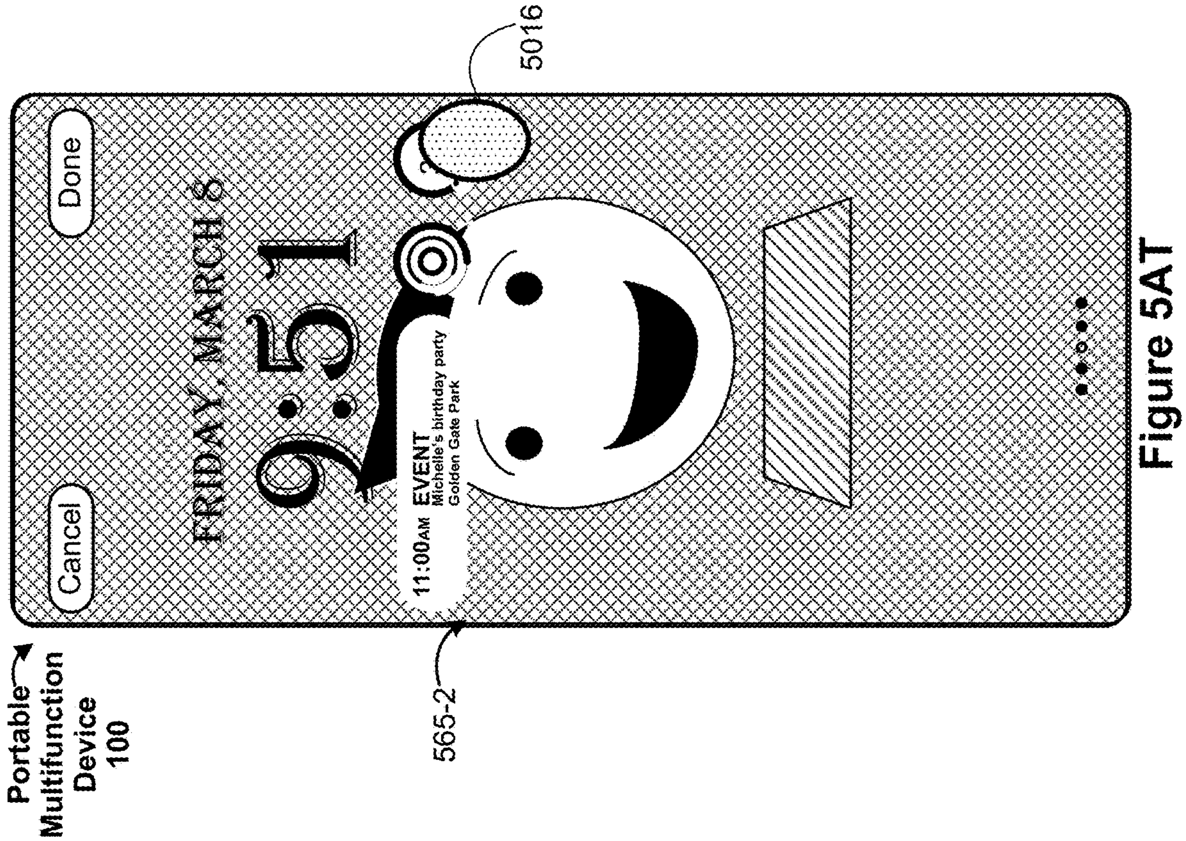
Figure 5A:
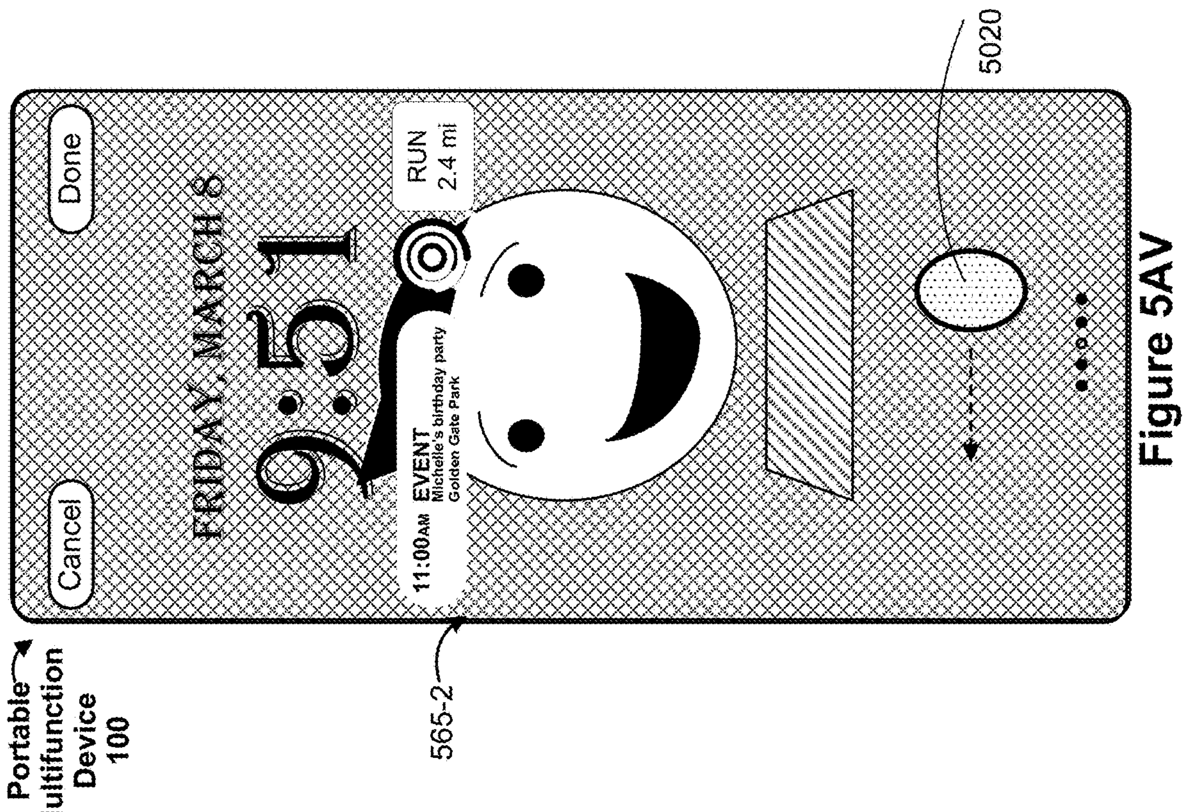
Figure 5A:
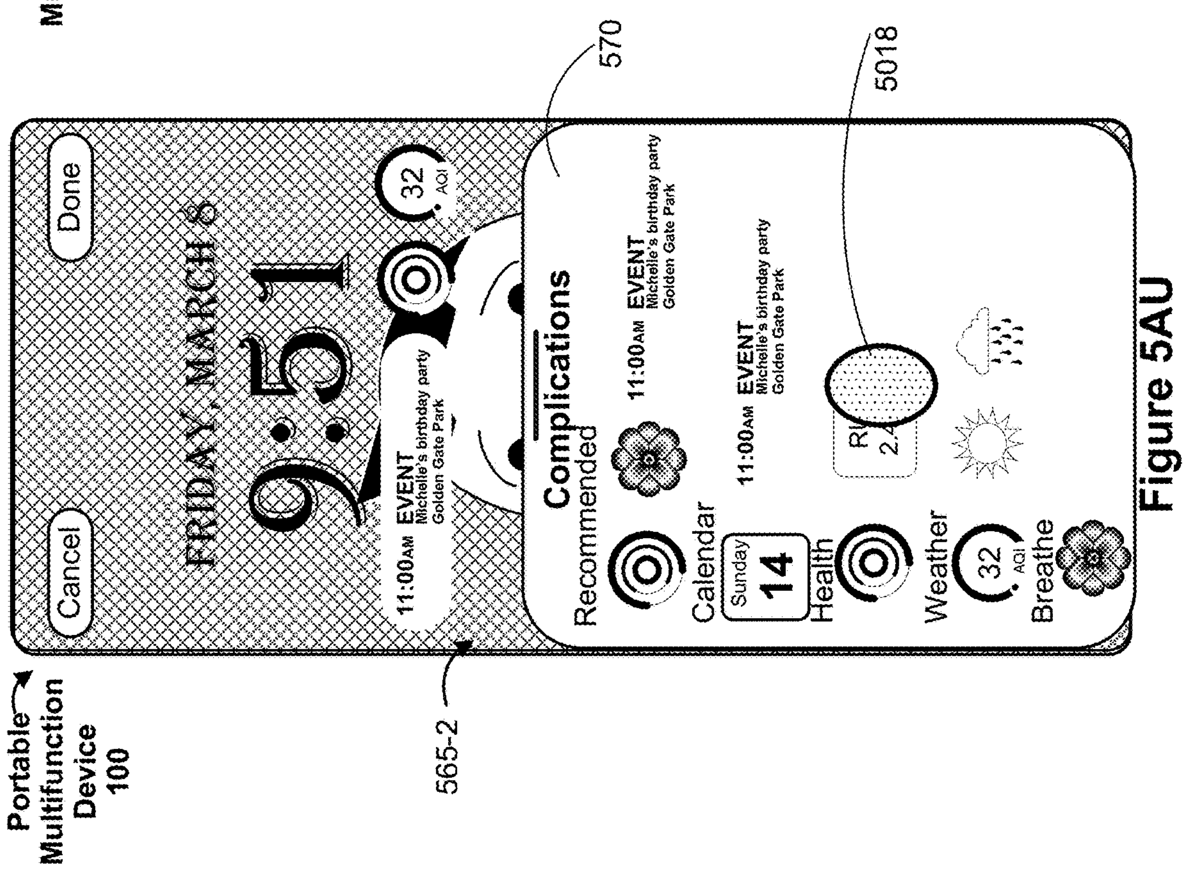
Figure 5A:
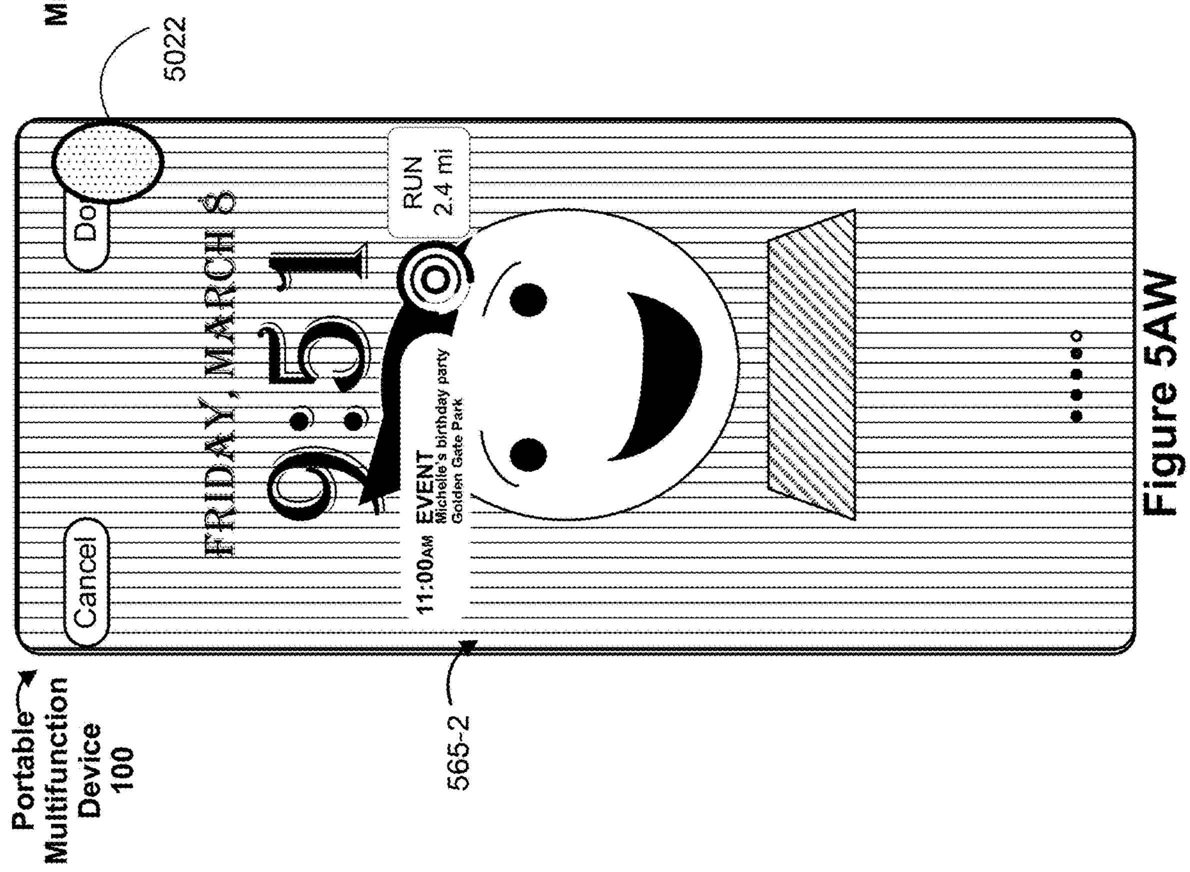
Figure 5A:
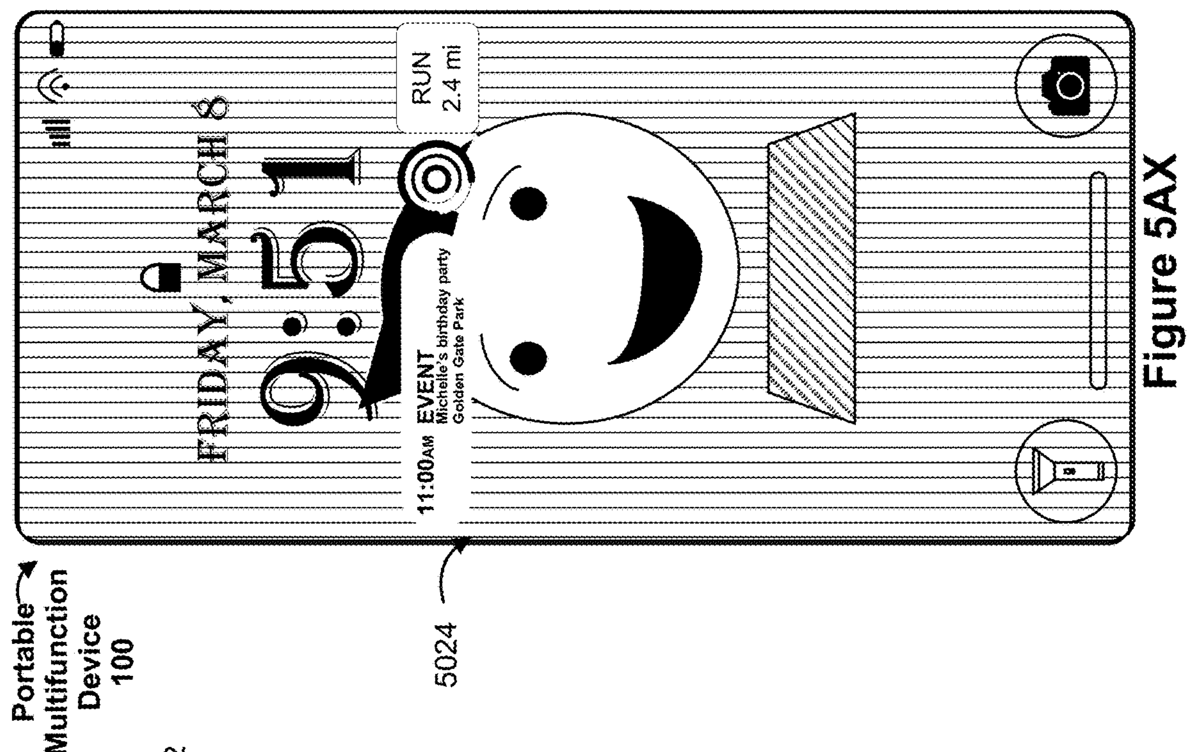
Figure 5A:
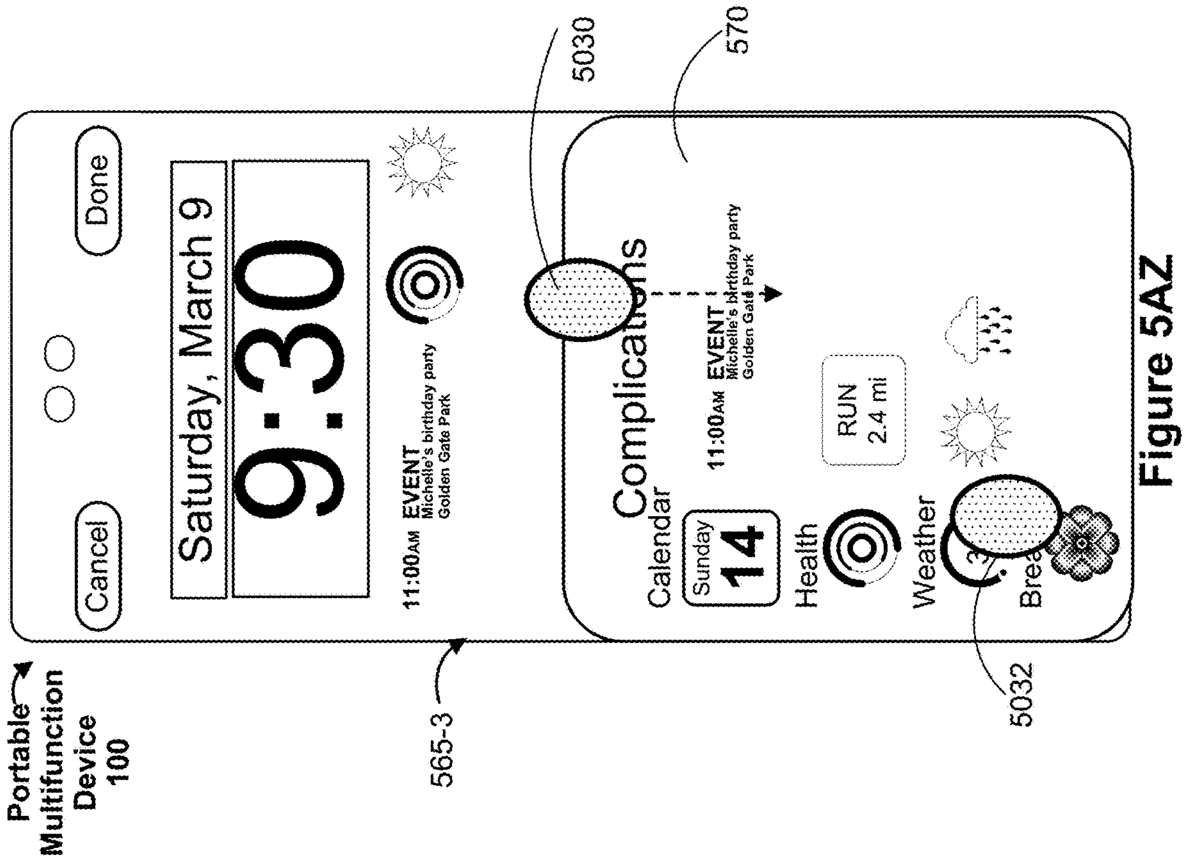
Figure 5A:
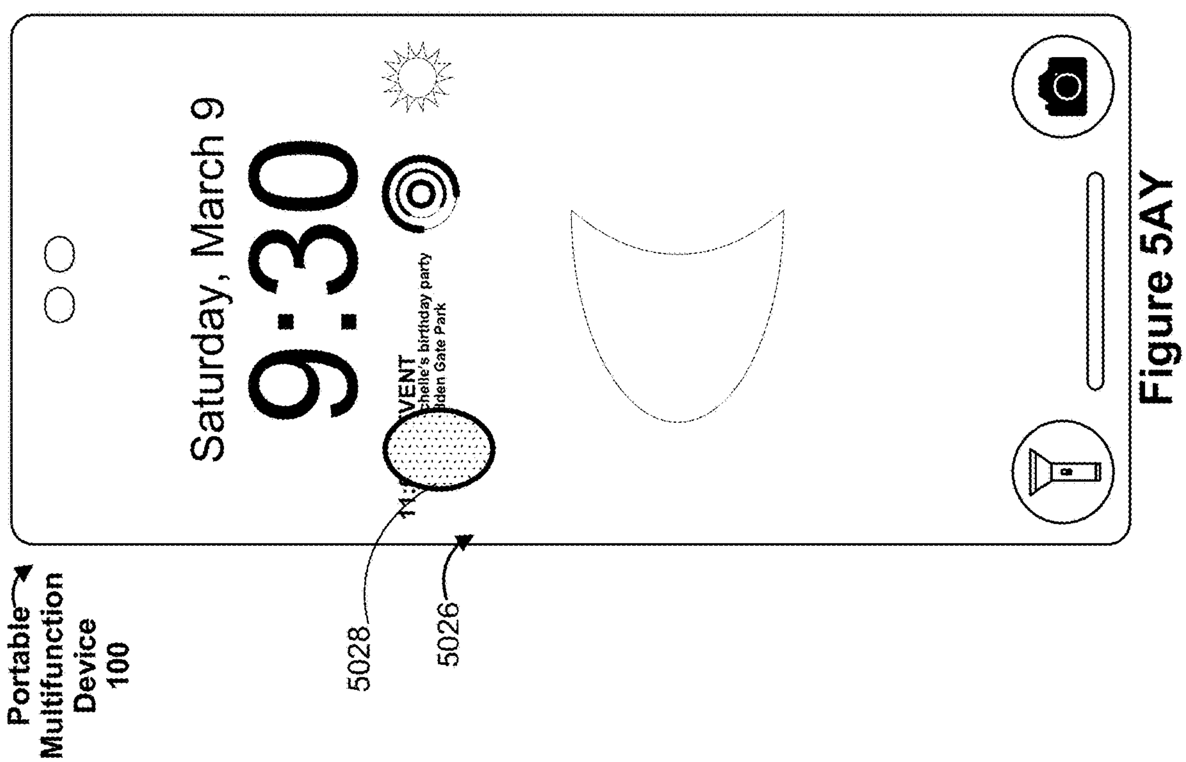
Figure 5B:
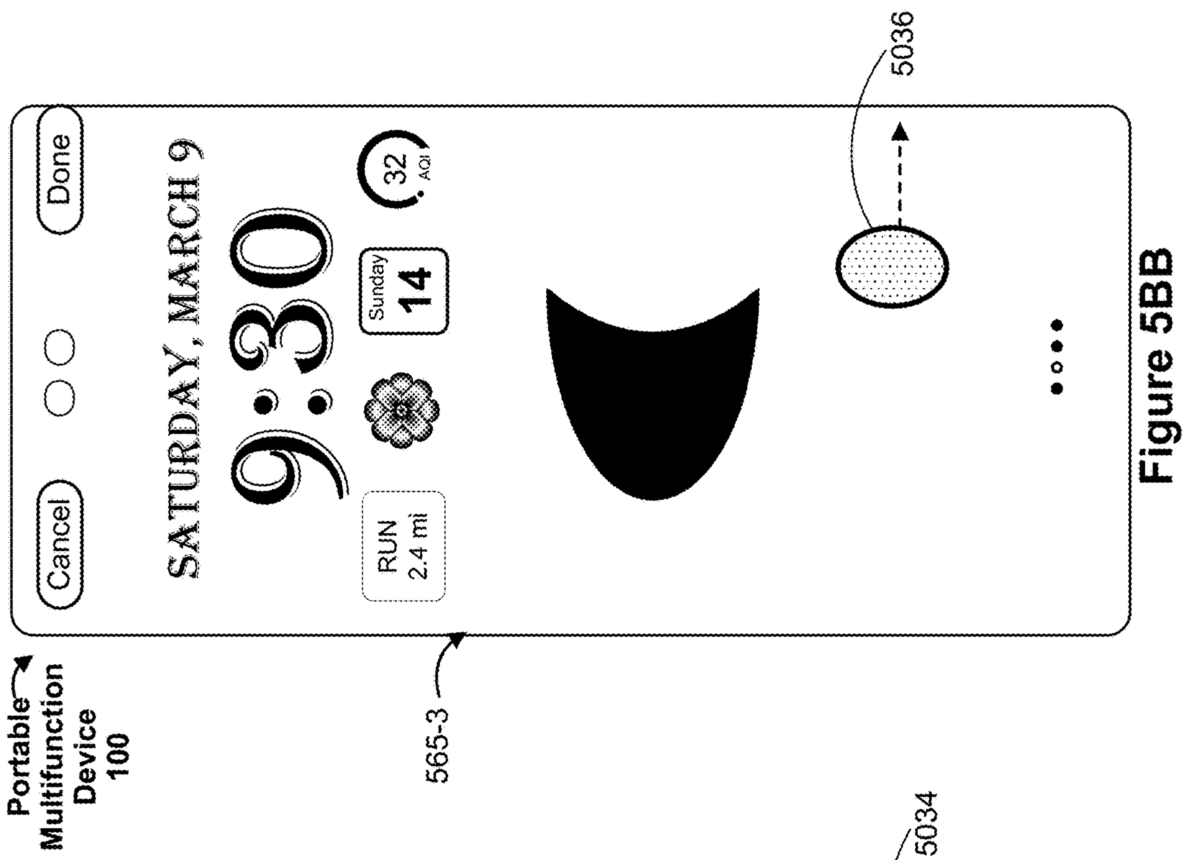
Figure 5B:
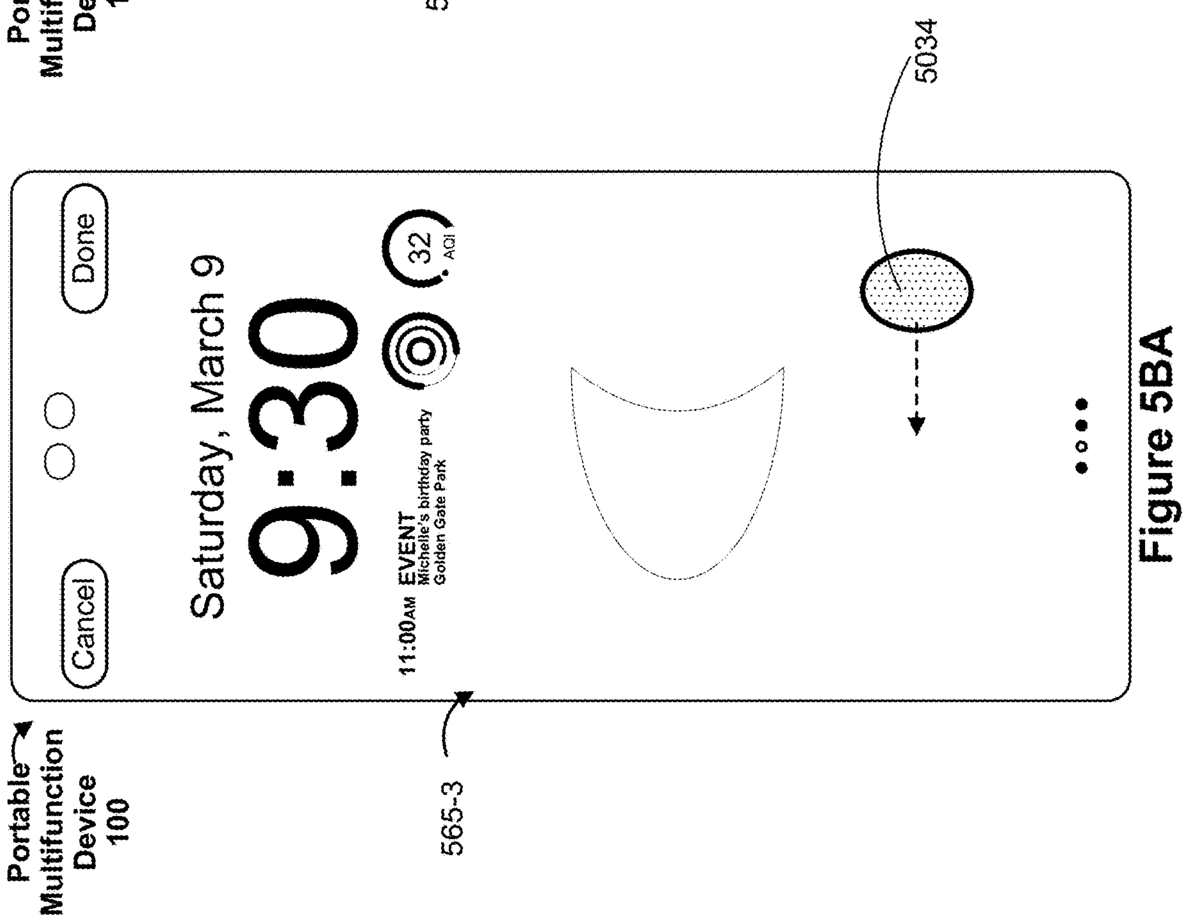
Figure 5B:
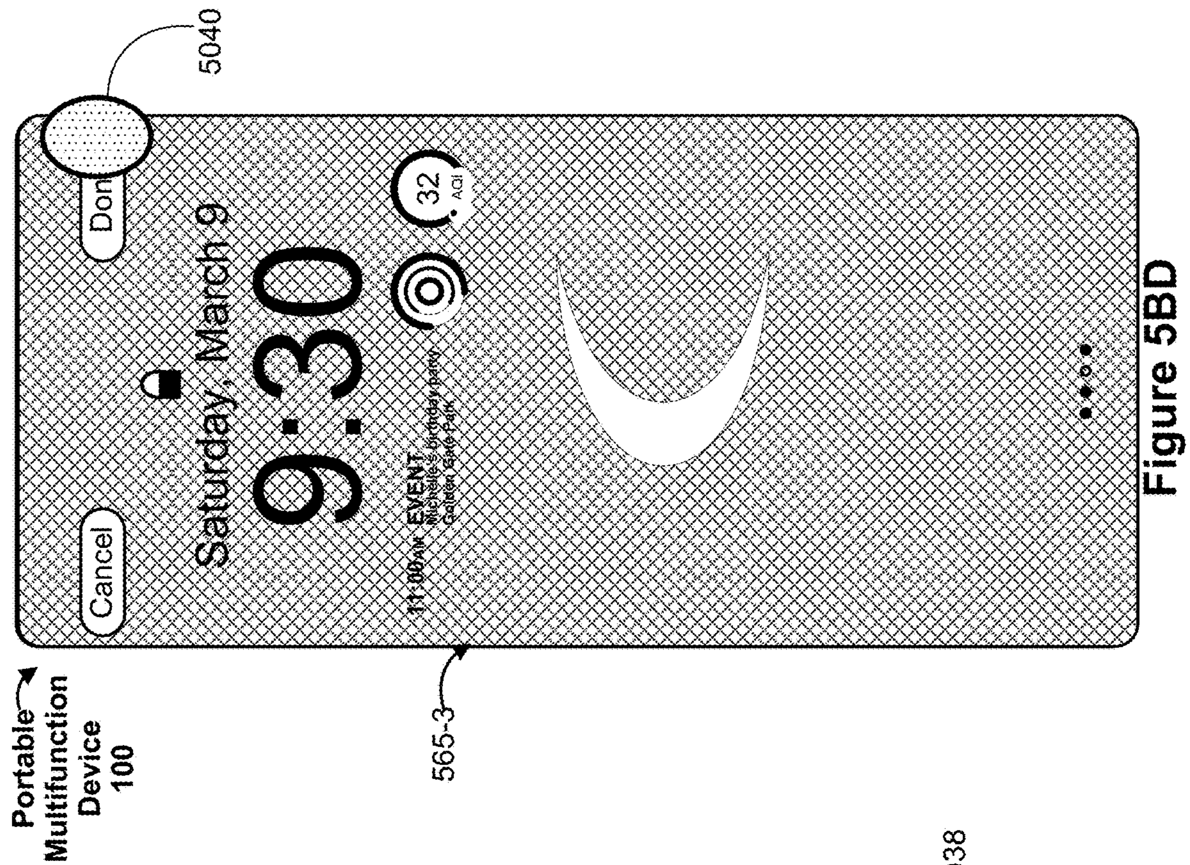
Figure 5B:
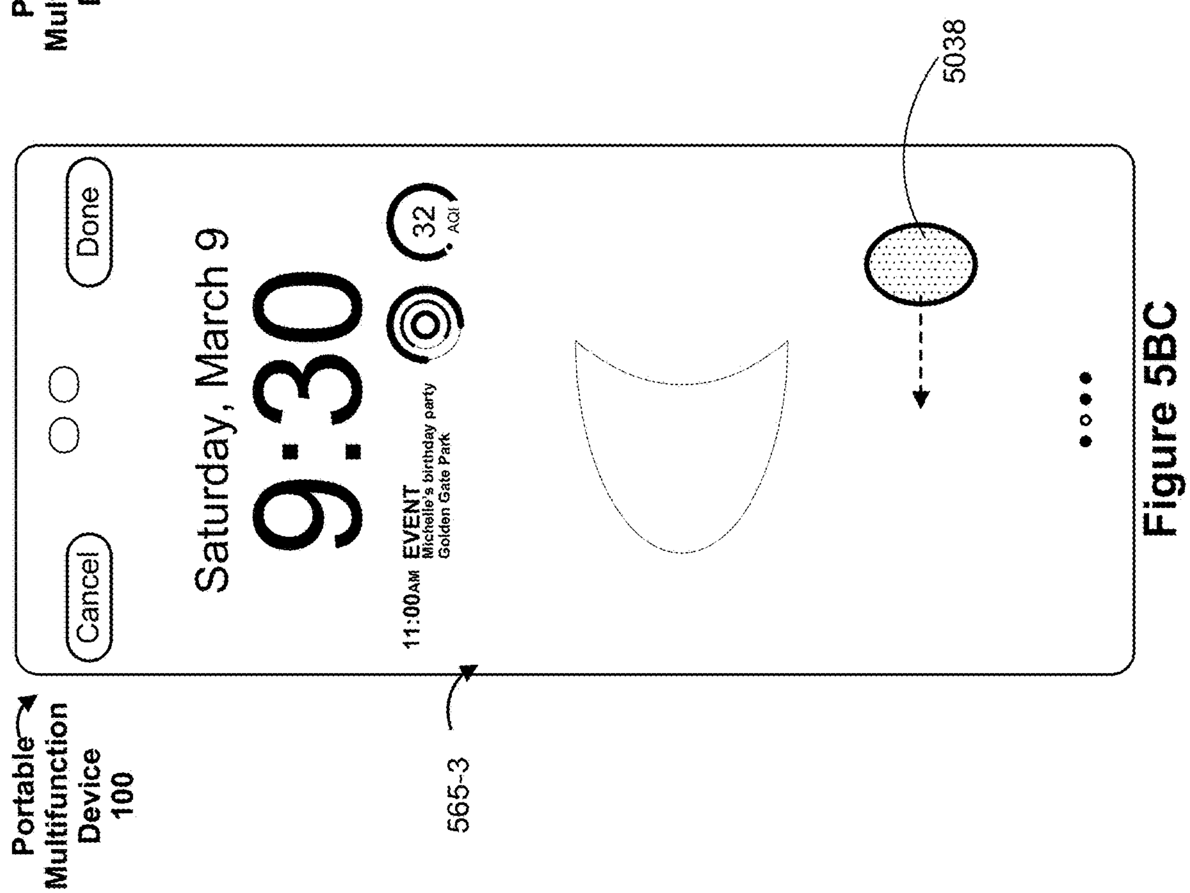
Figure 5B:
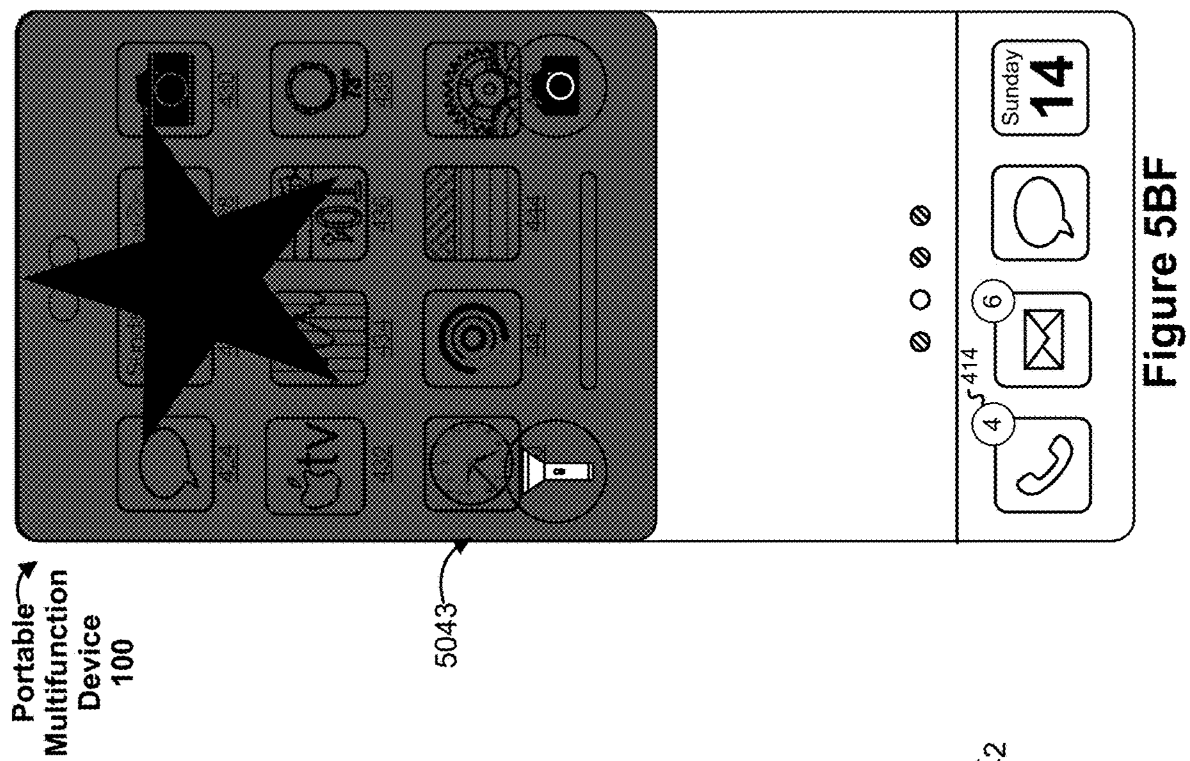
Figure 5B:
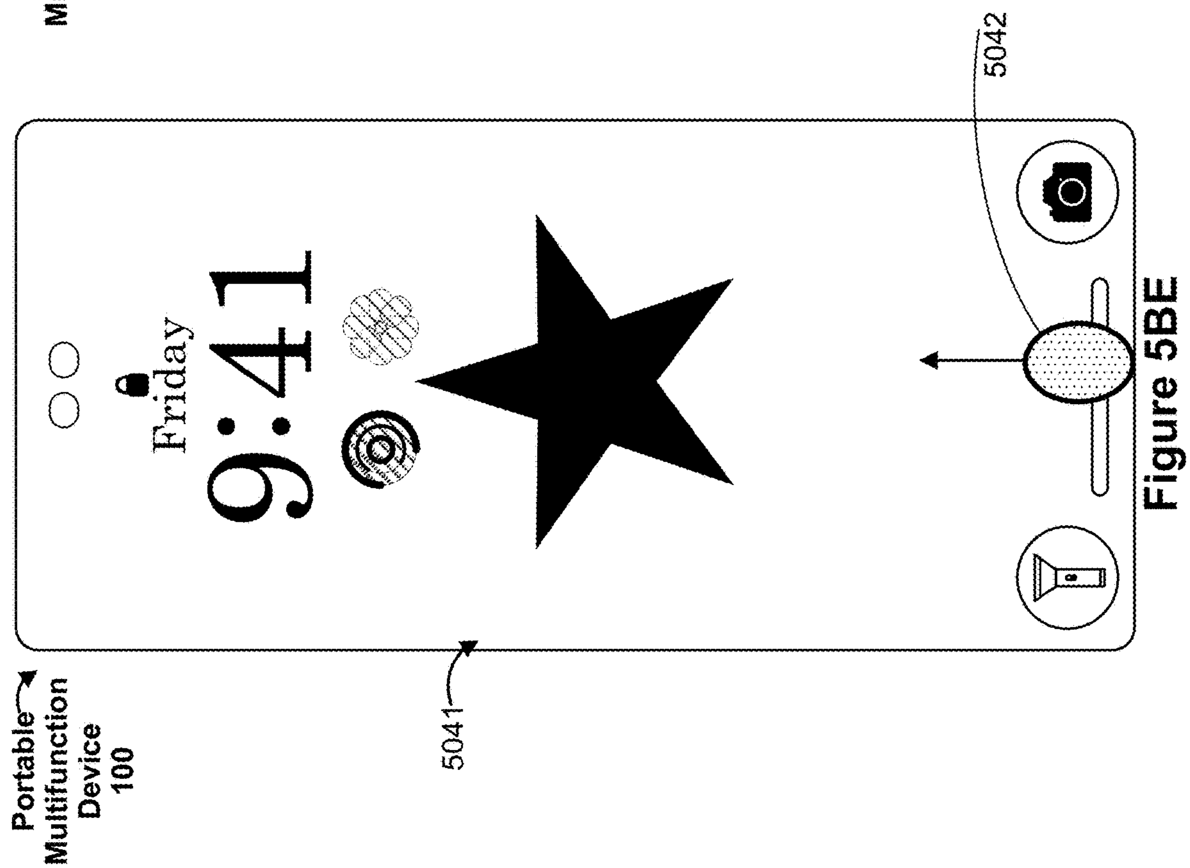
Figure 5B:
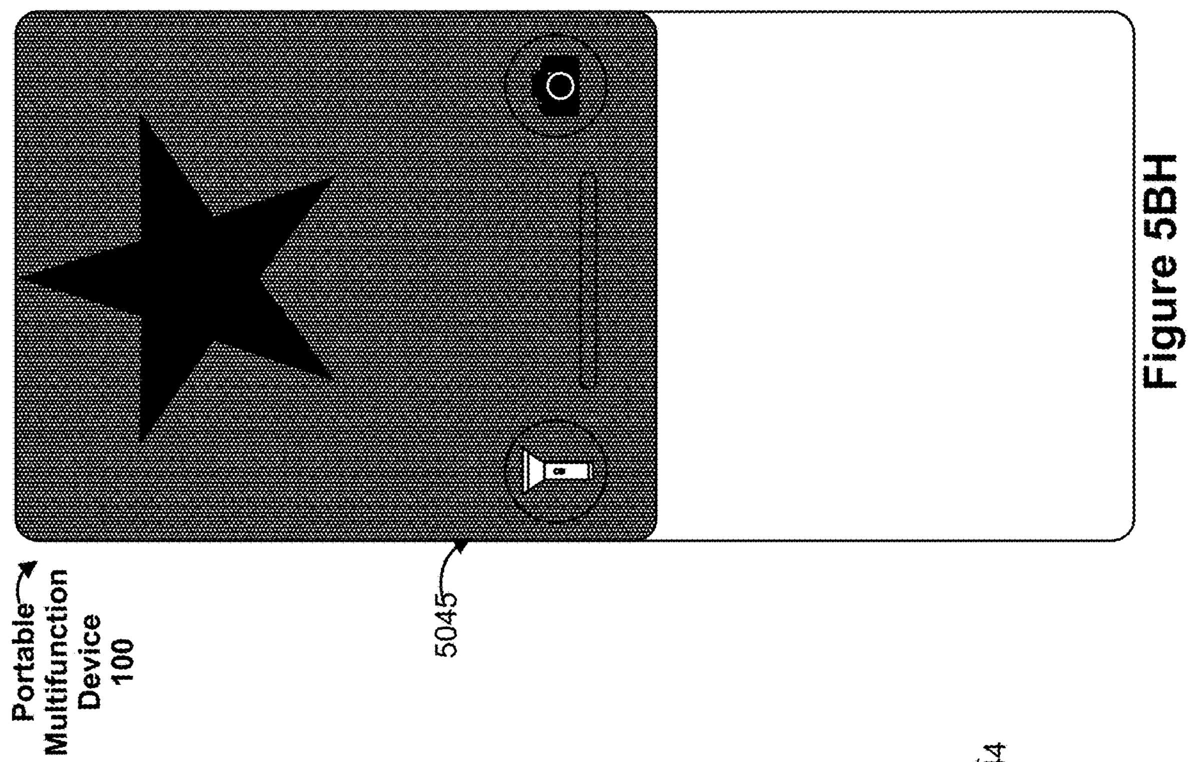
Figure 5B:
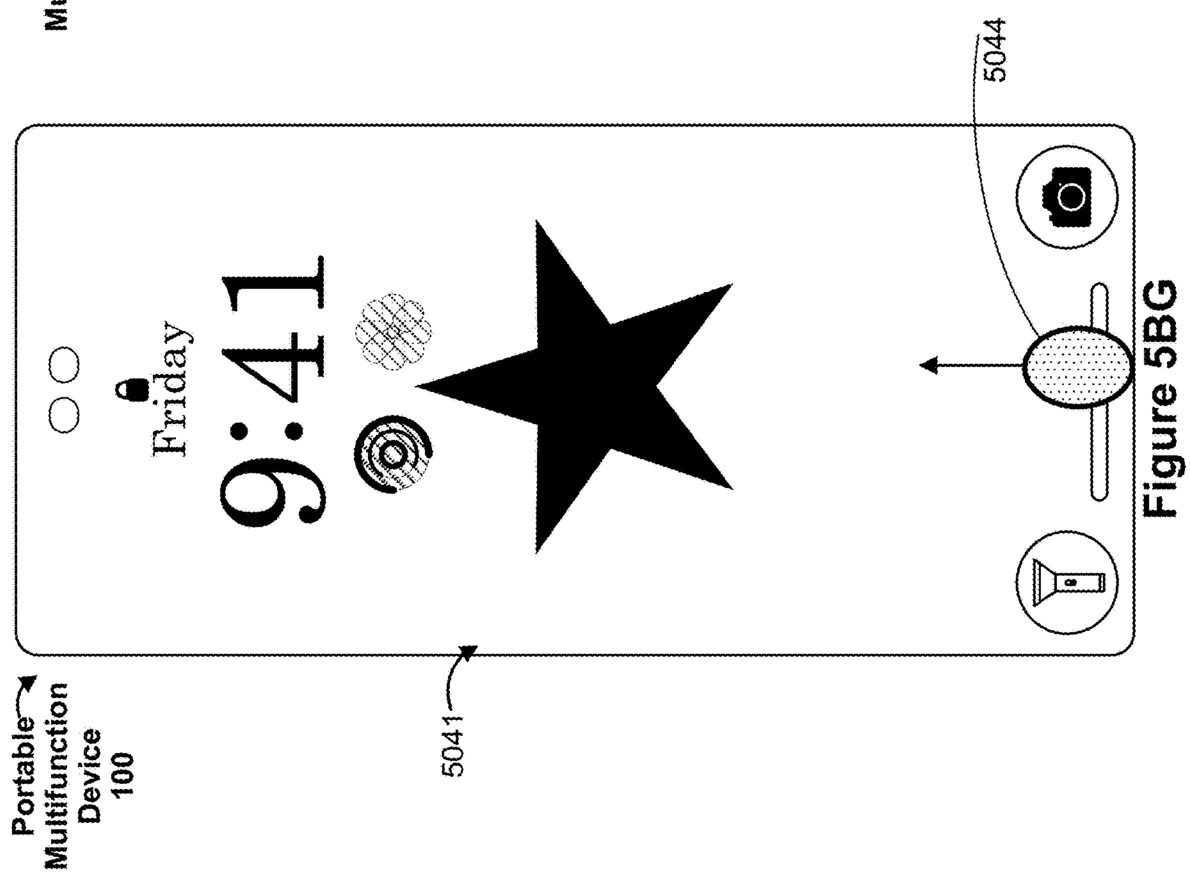
Figure 5B:
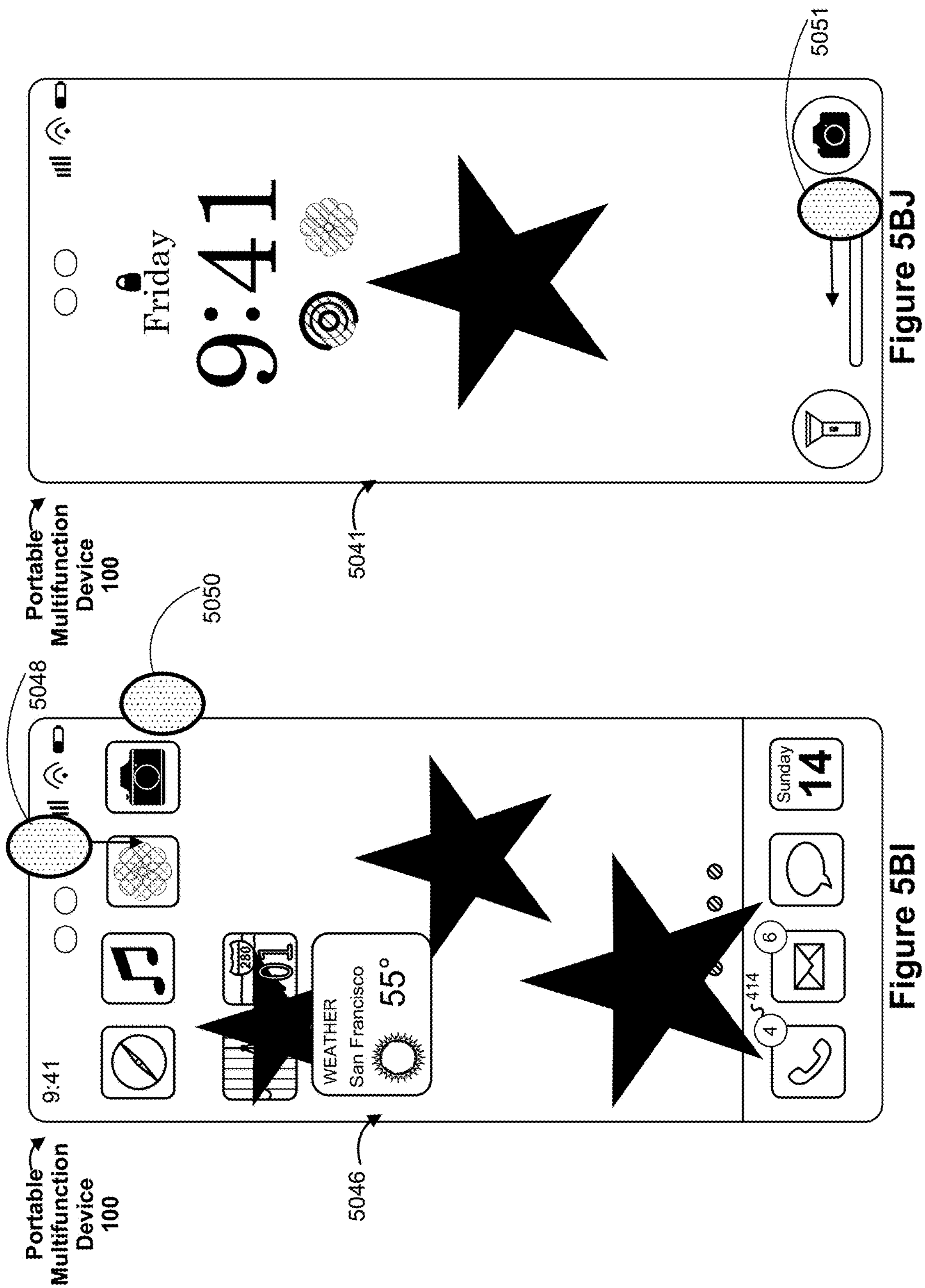
Figure 5B:
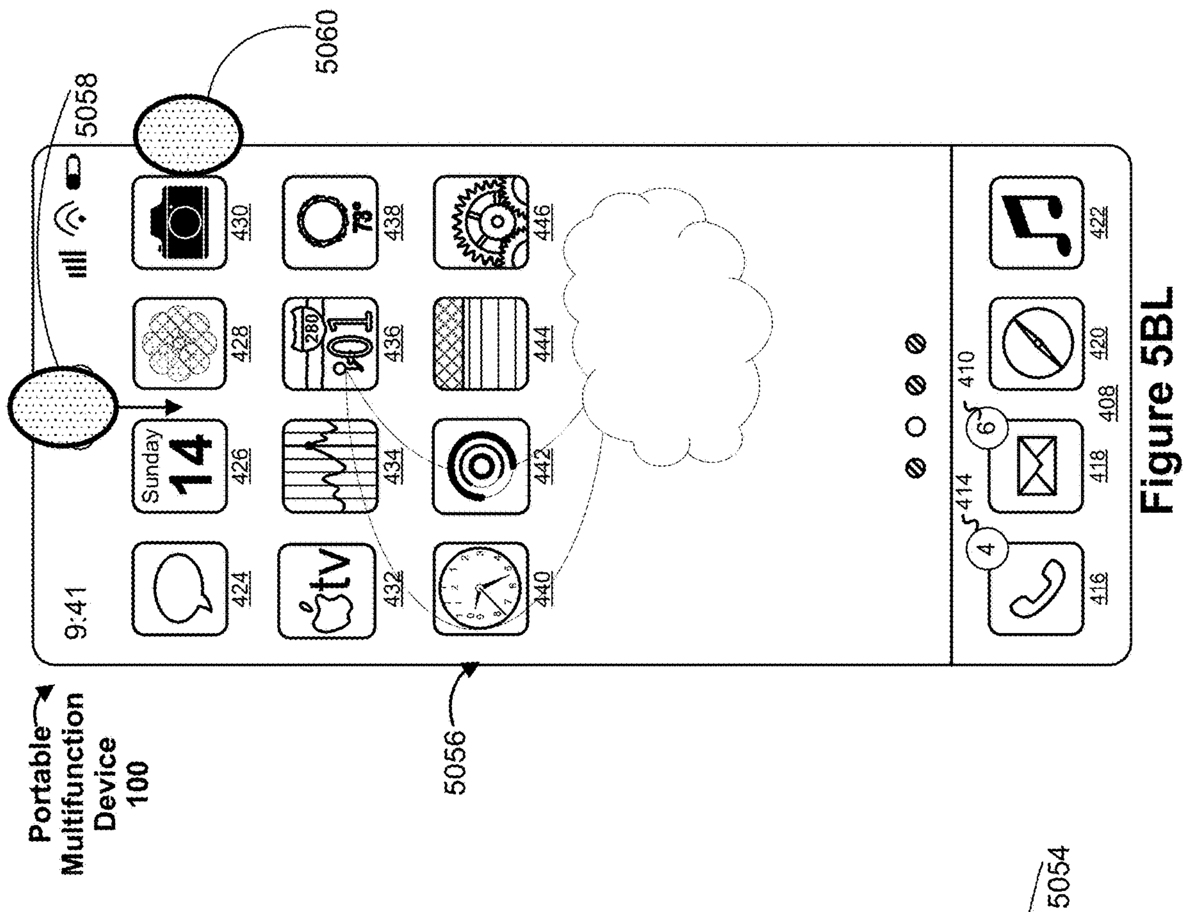
Figure 5B:
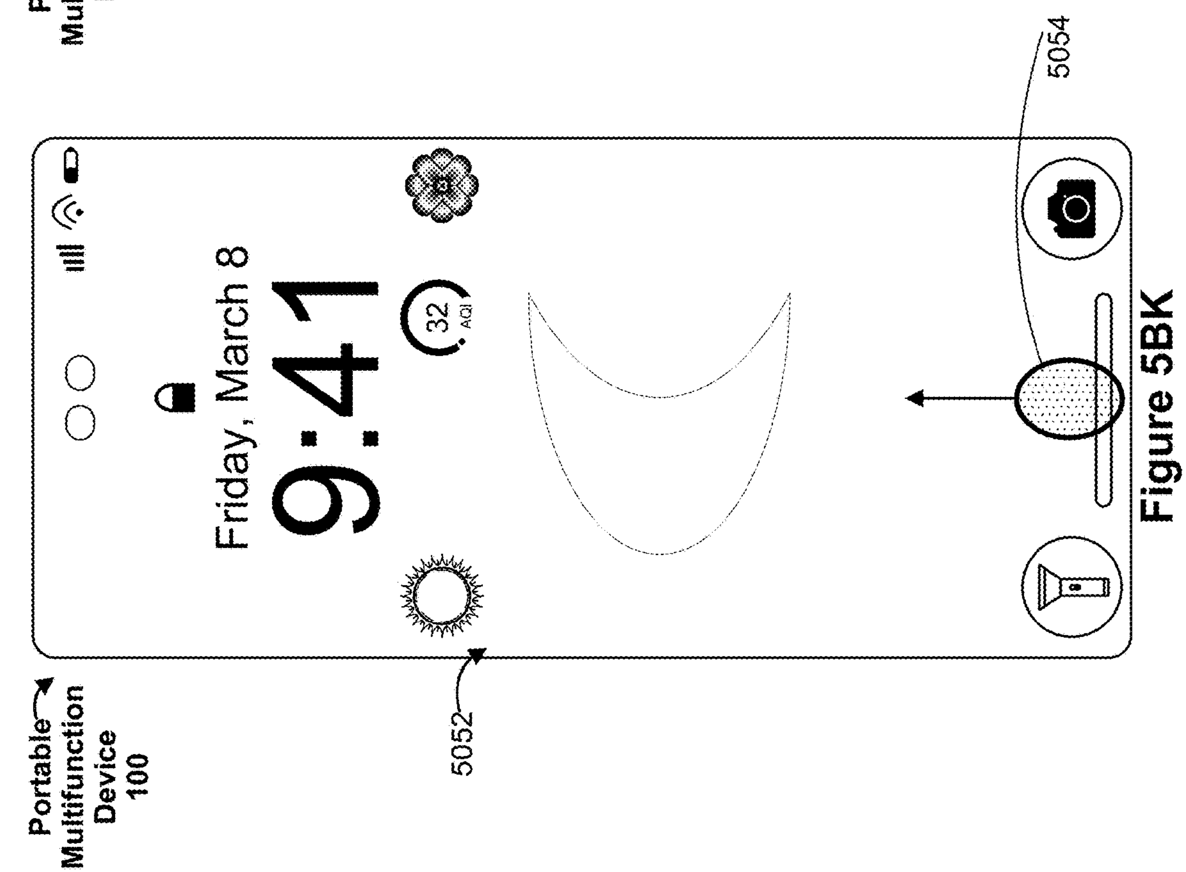
Figure 5B:
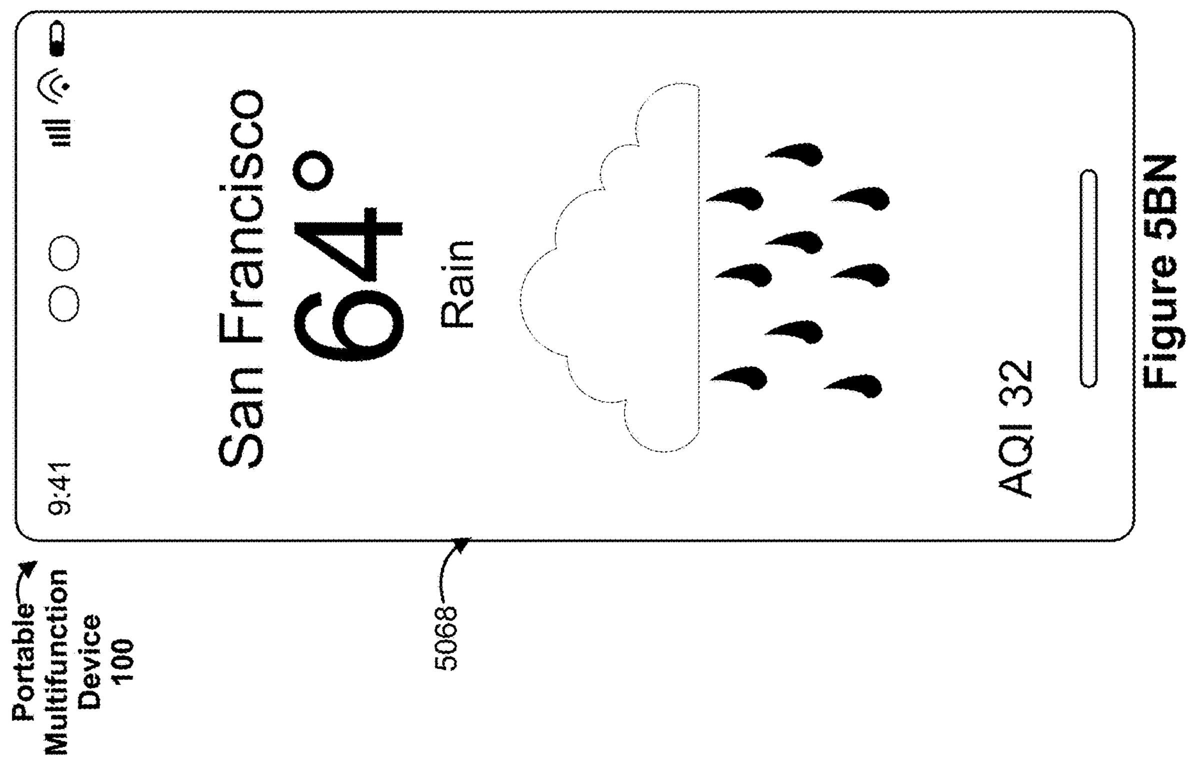
Figure 5B:
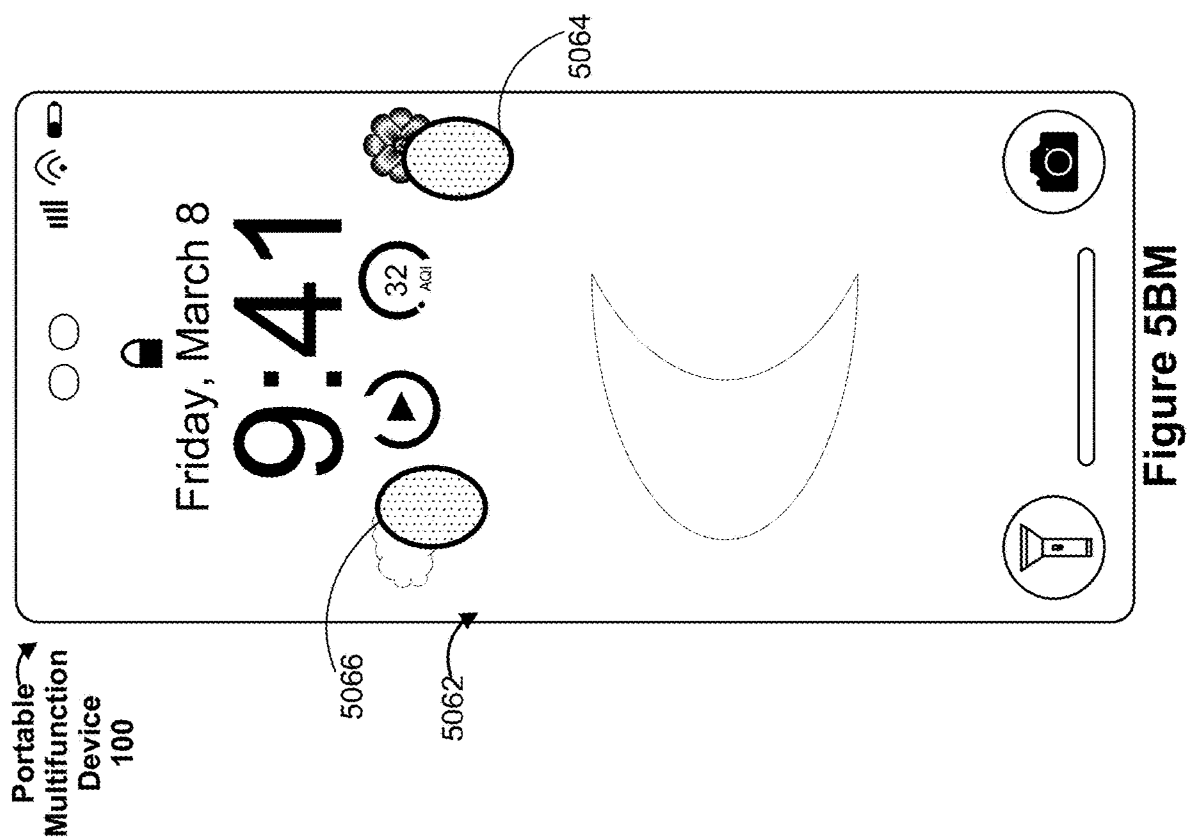
Figure 5B:
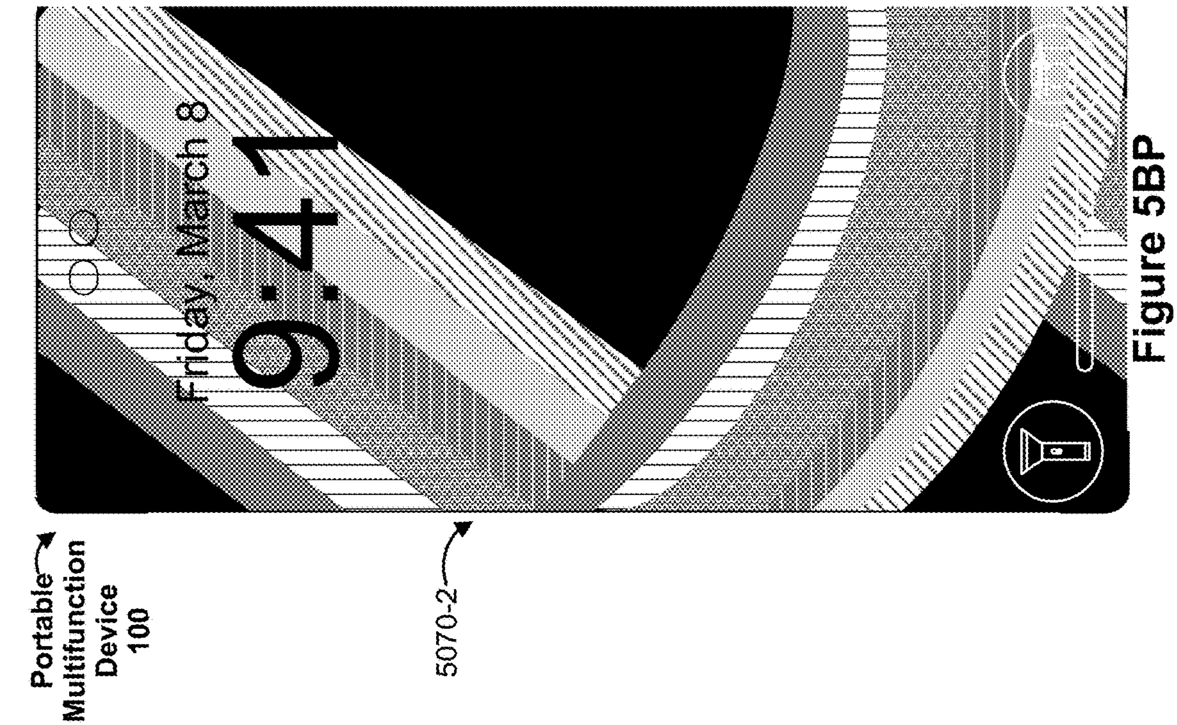
Figure 5B:
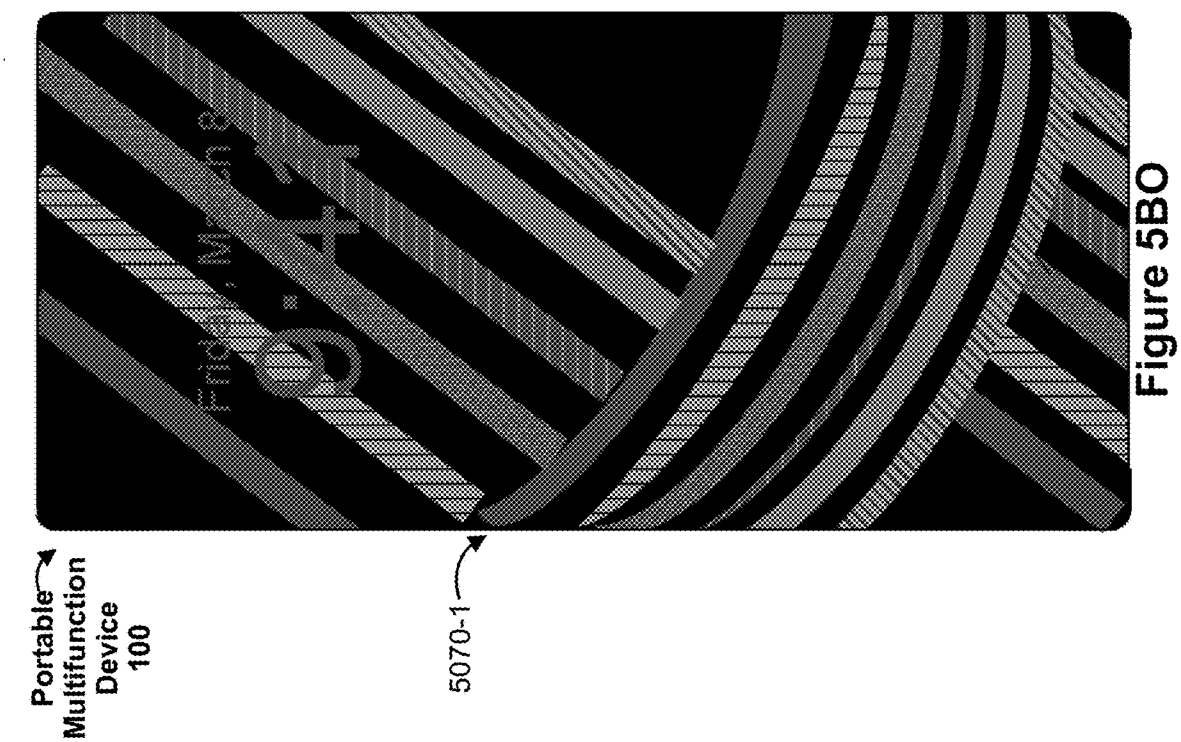
Figure 5B:
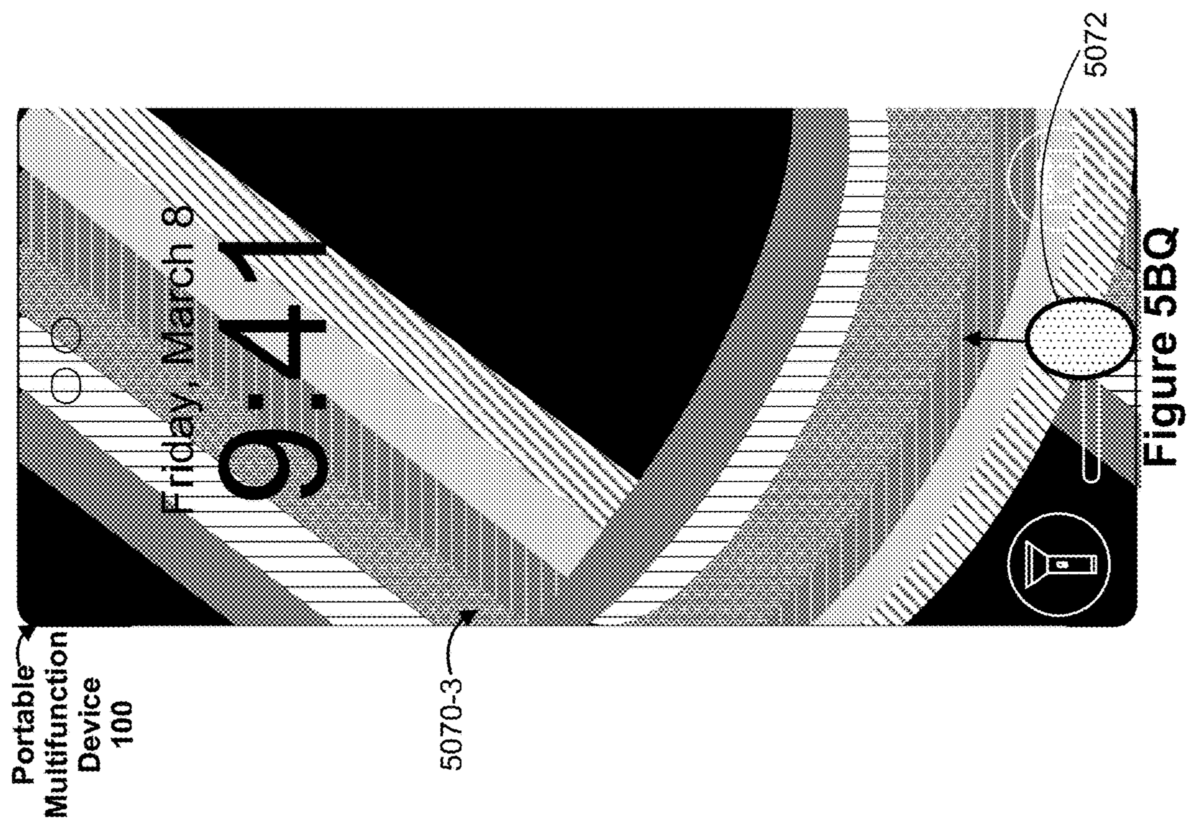
Figure 5B:
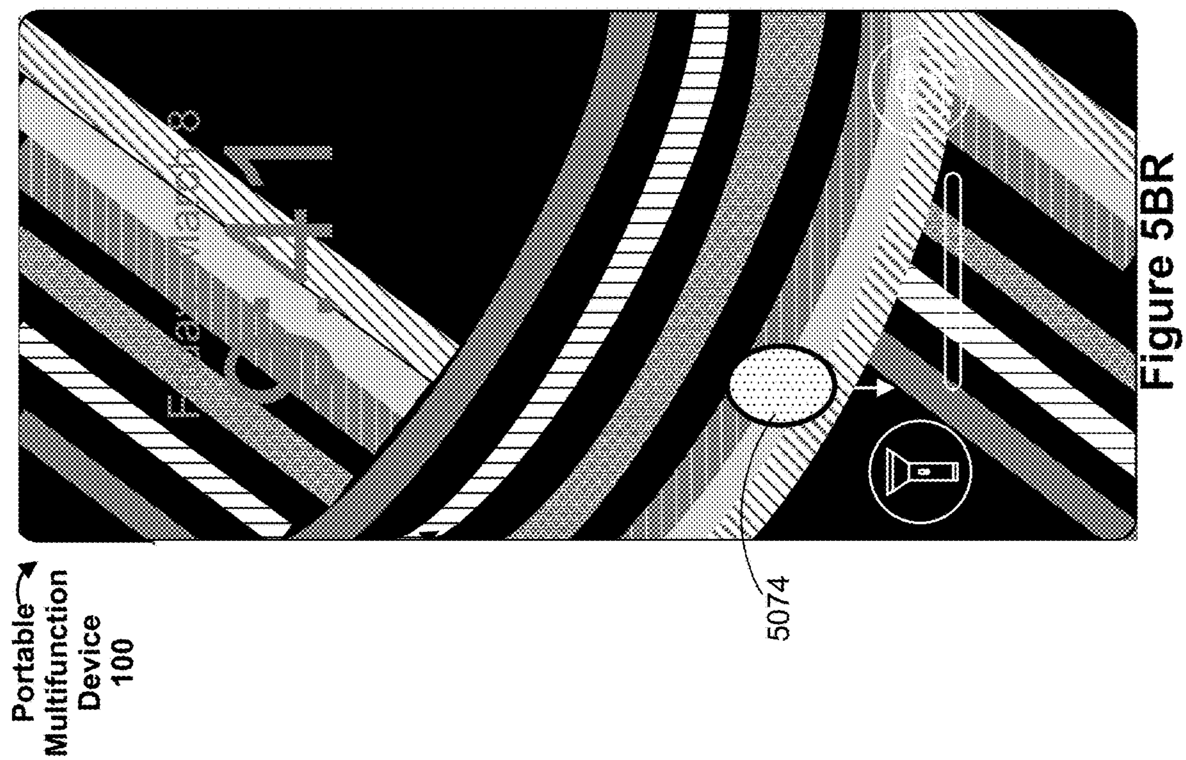
Figure 5B:
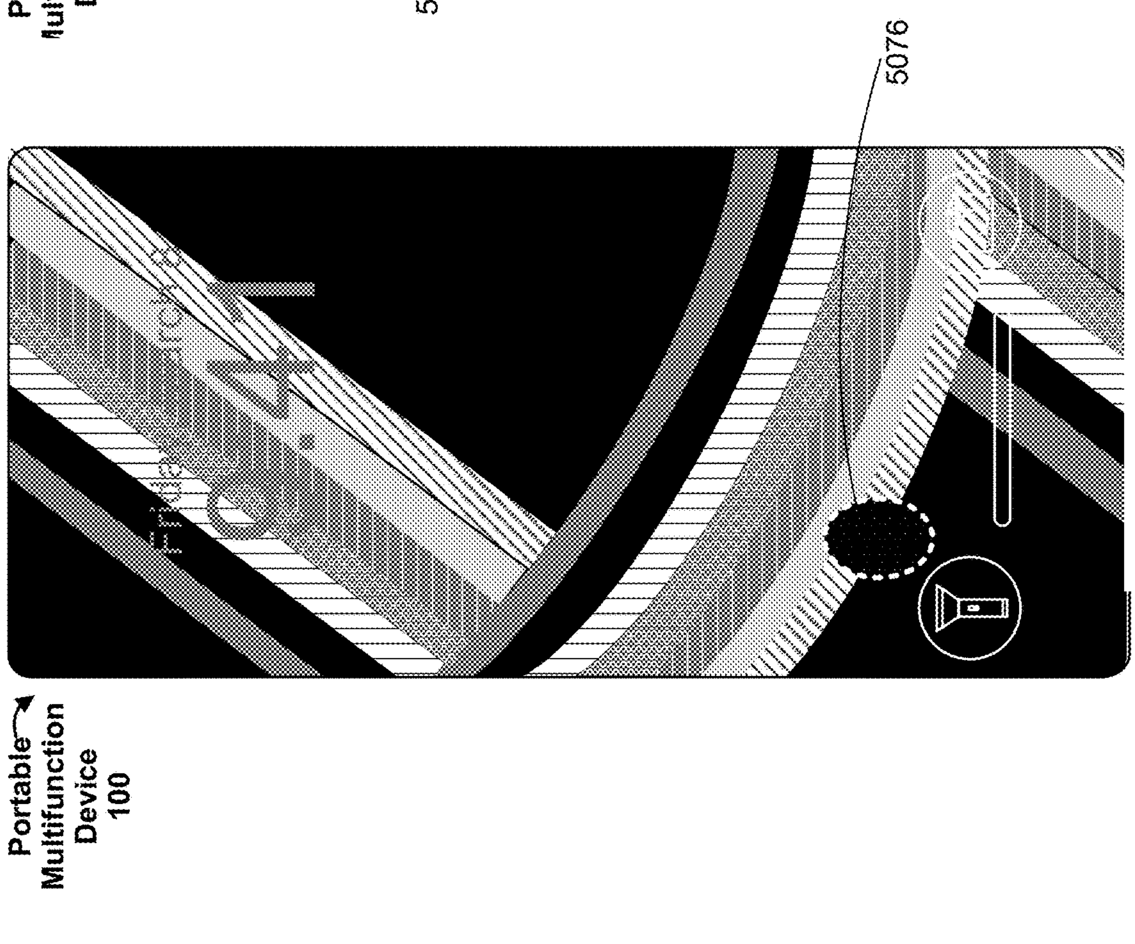
Figure 5B:
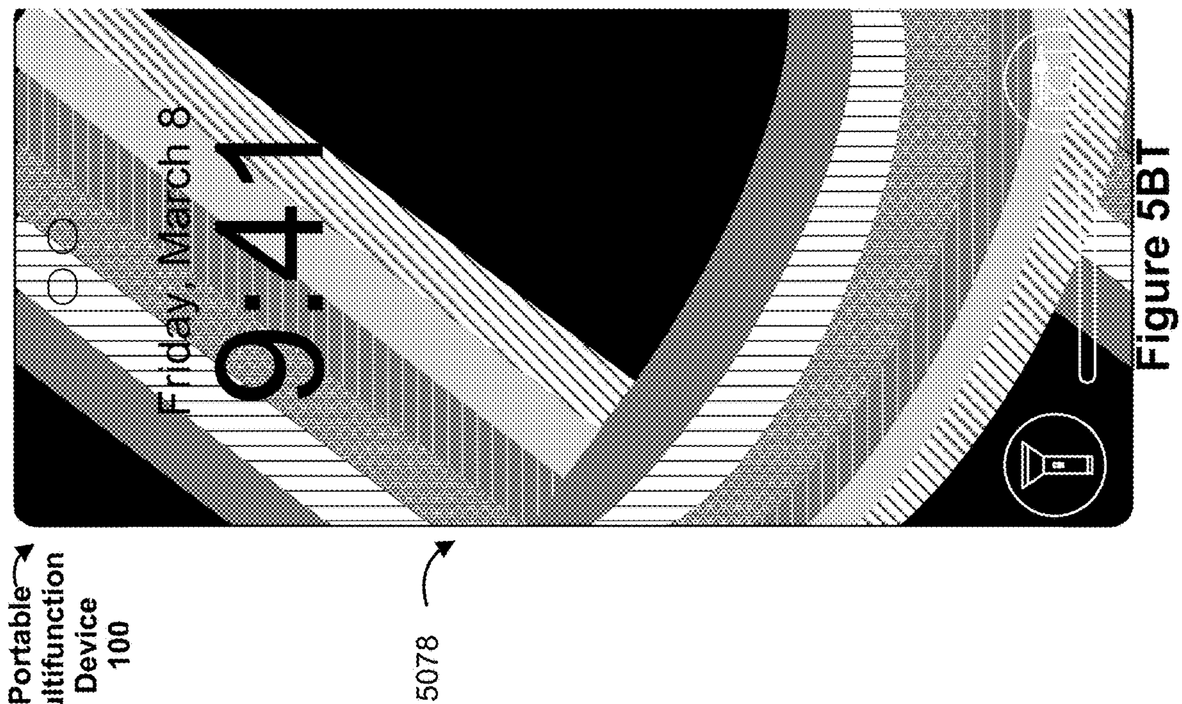
Figure 5B:
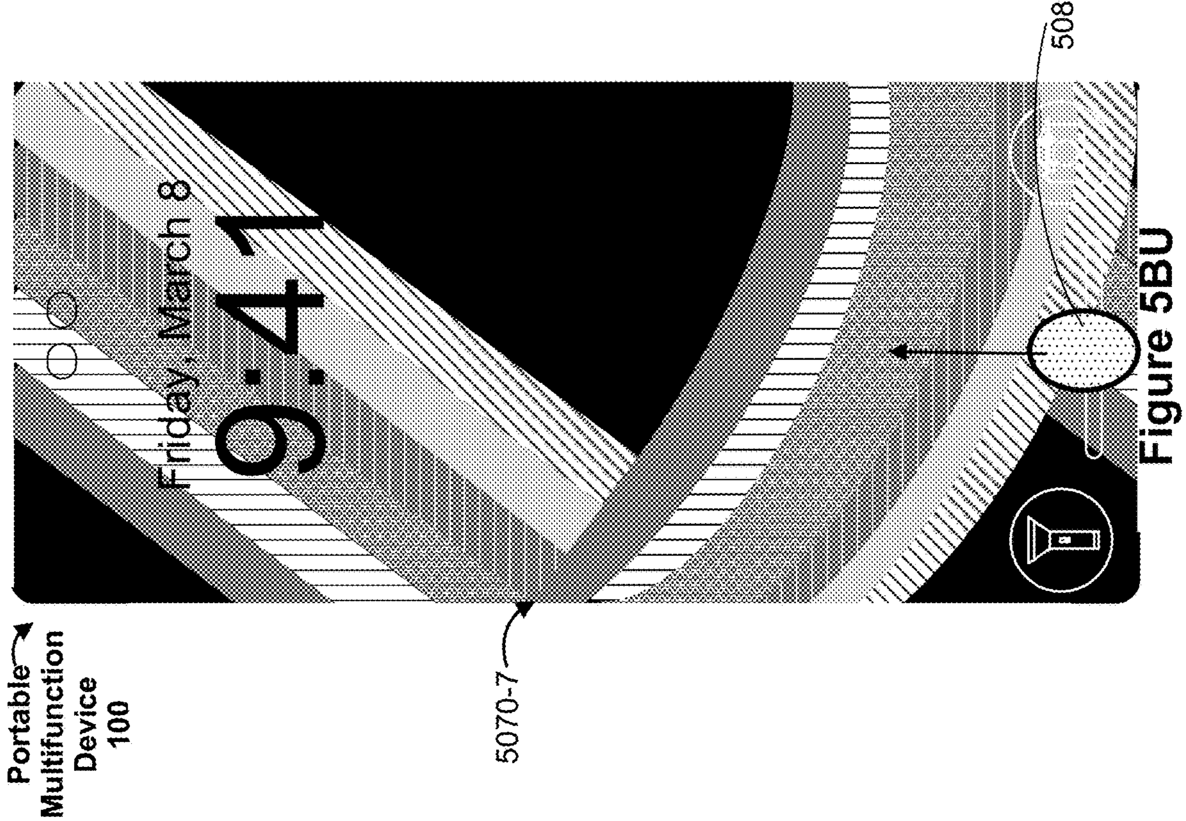
Figure 5B:
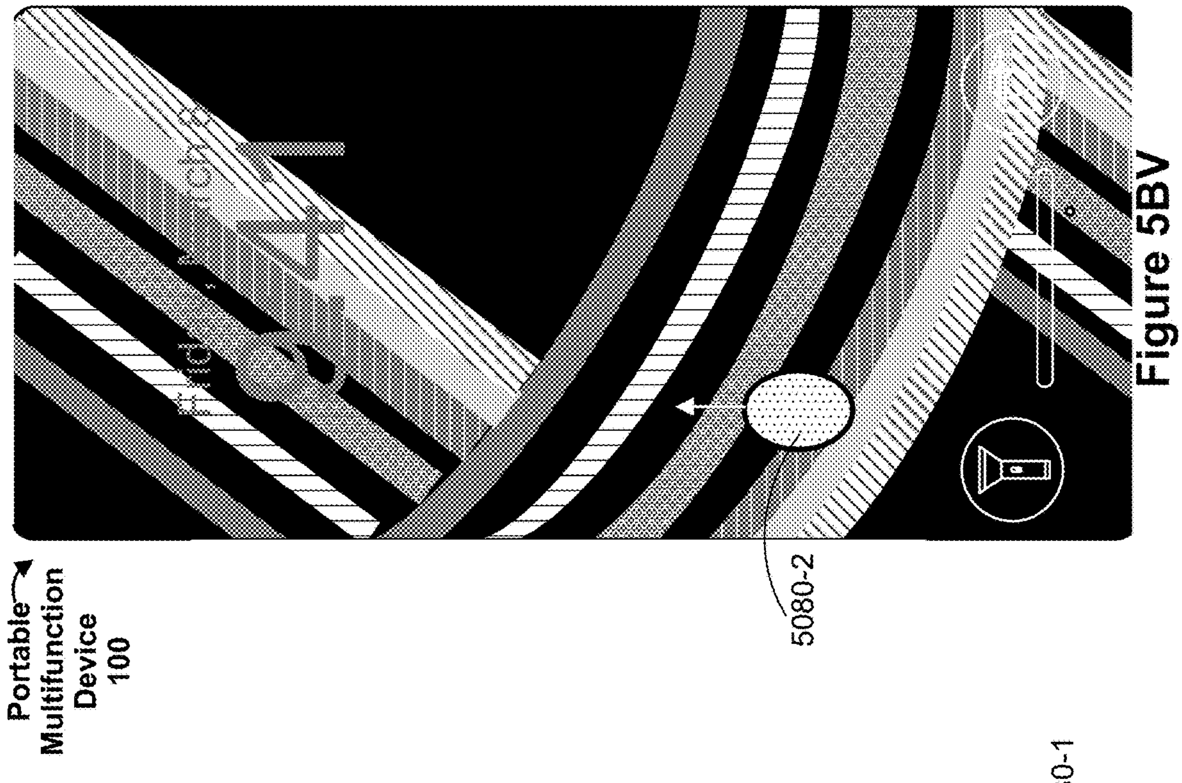
Figure 5B:
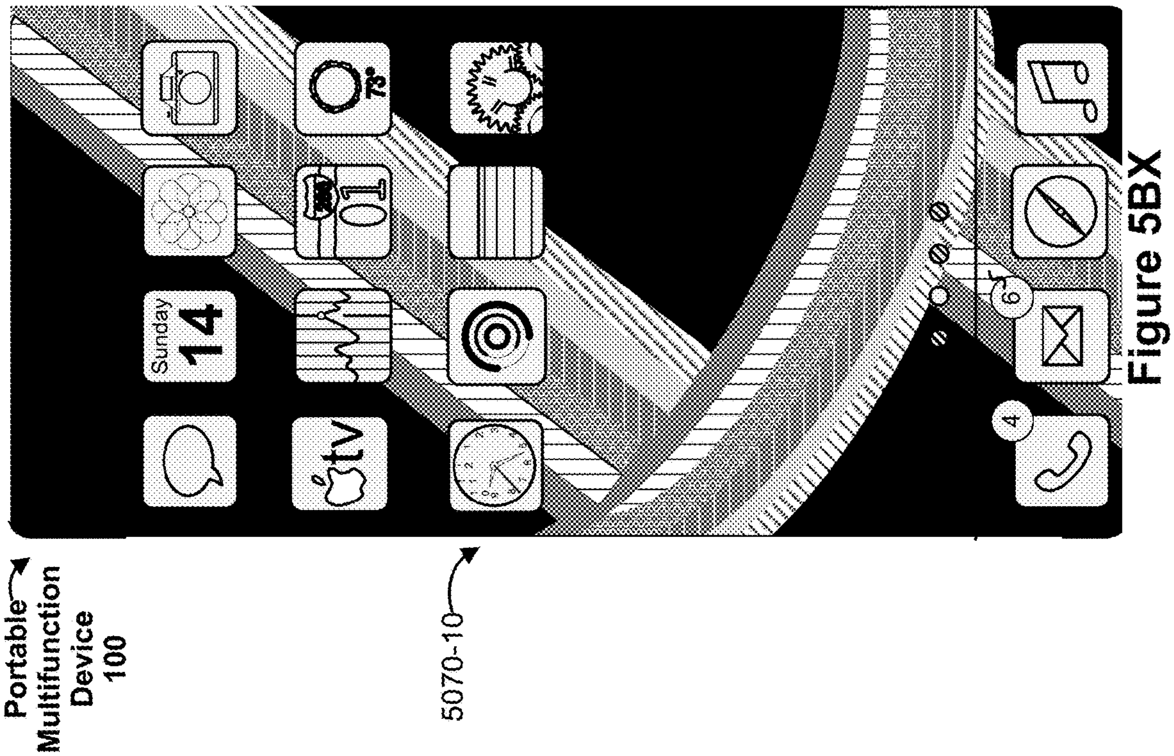
Figure 5B:
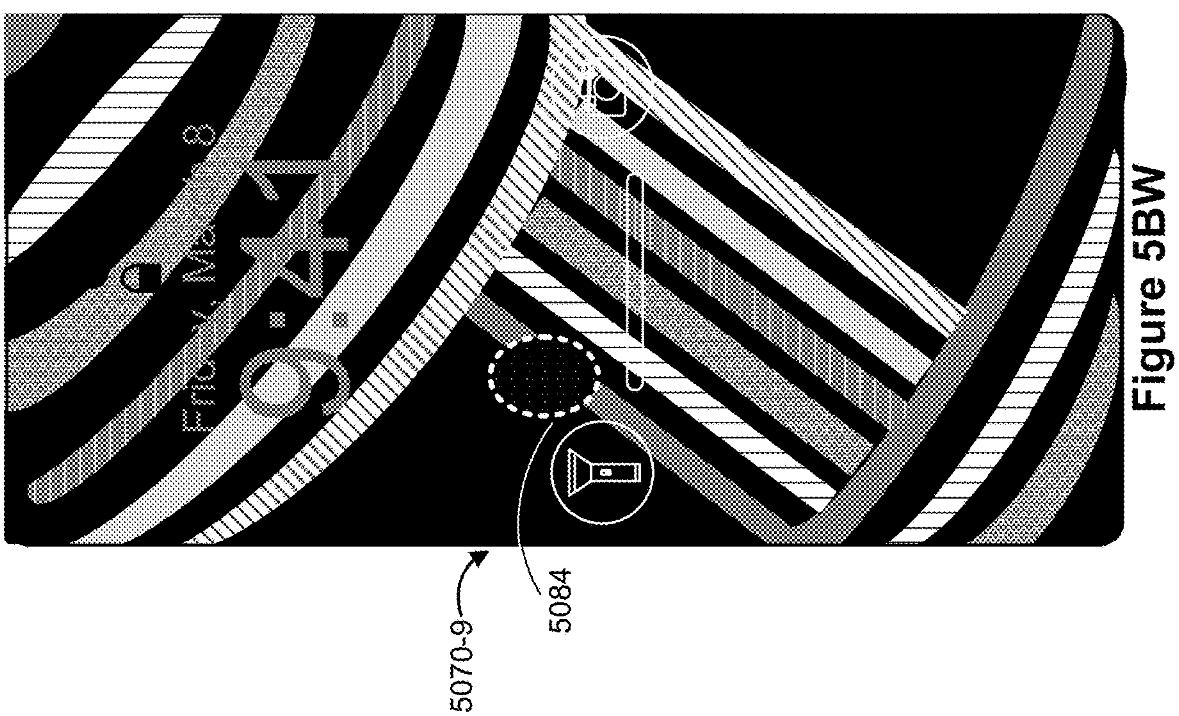
Figure 5B:
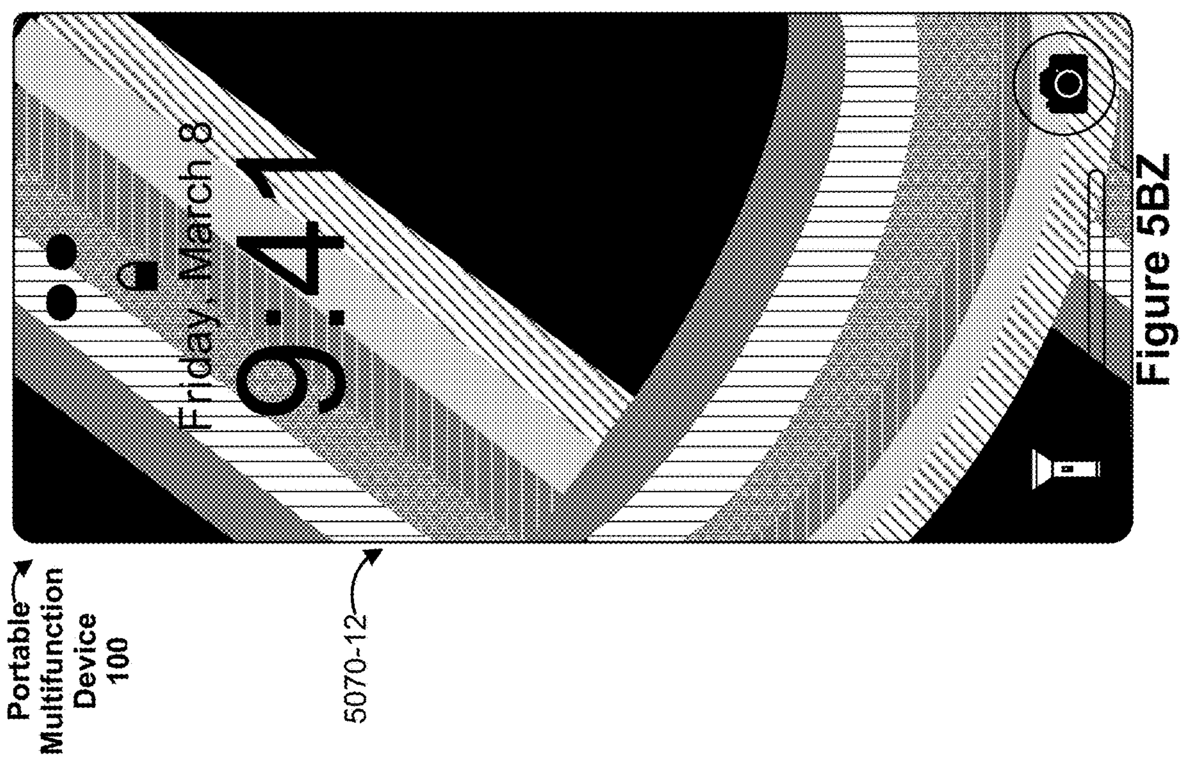
Figure 5B:
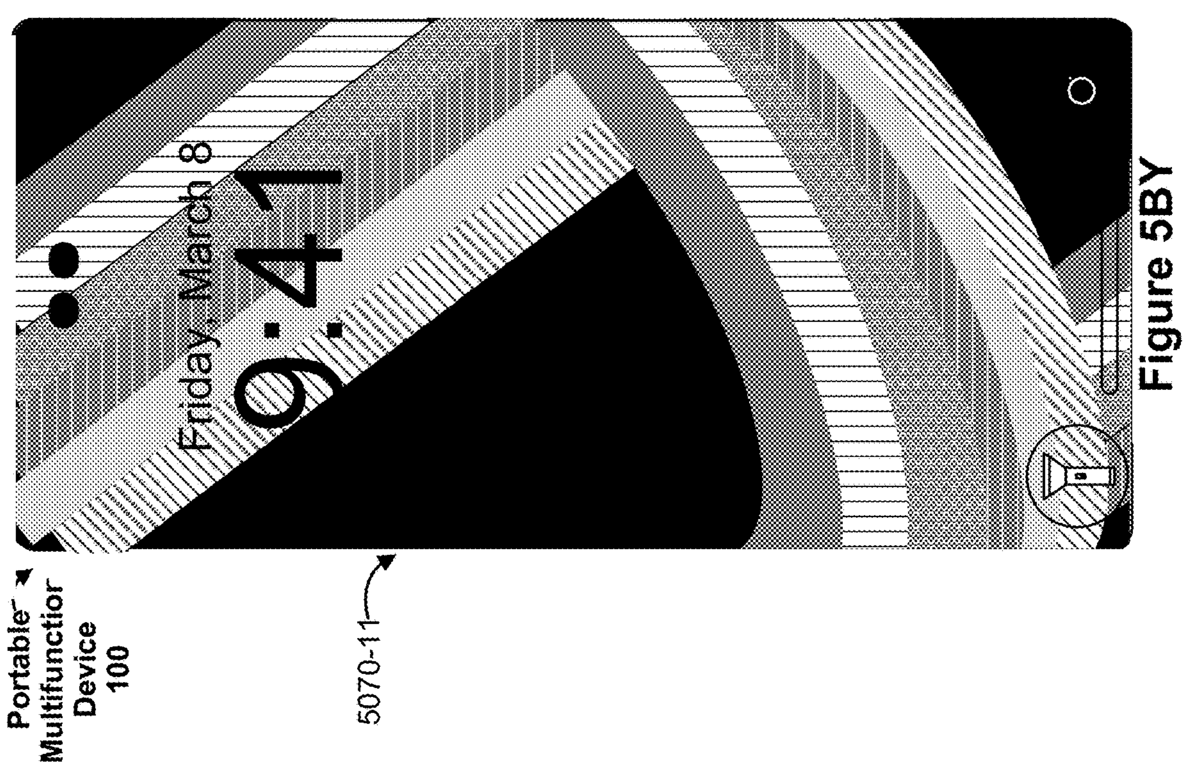
Figure 5C:
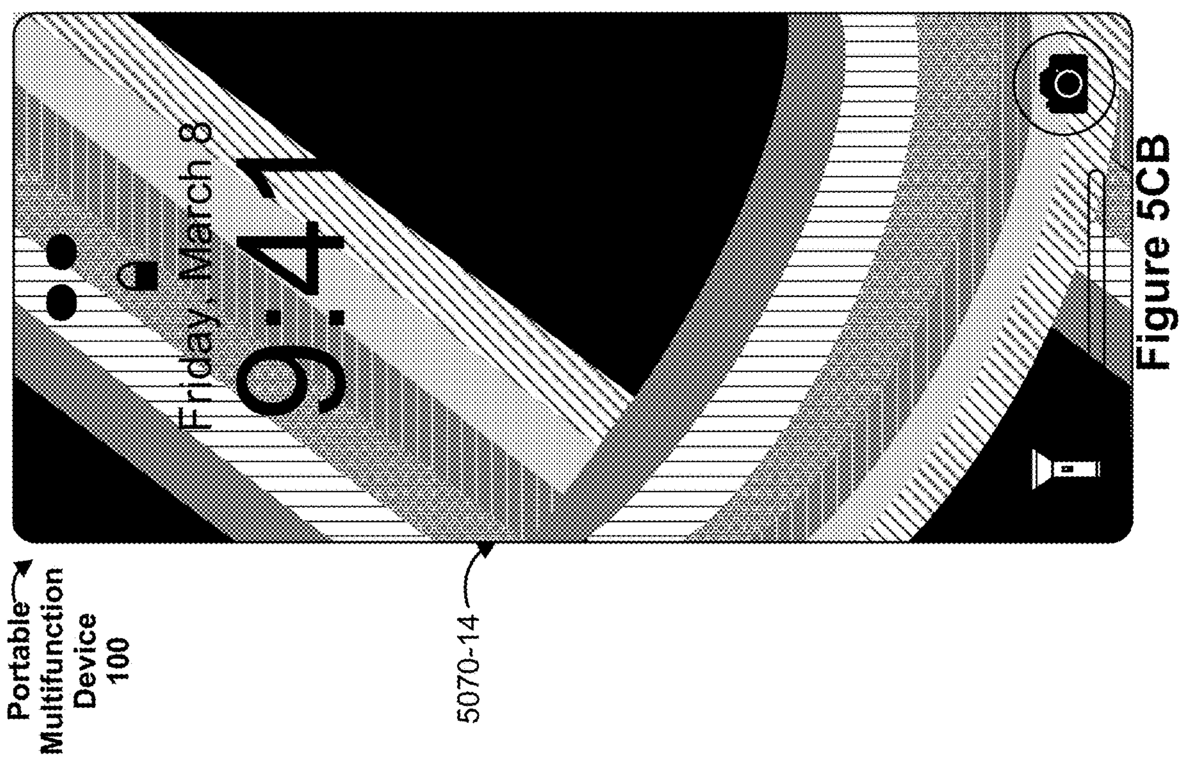
Figure 5C:
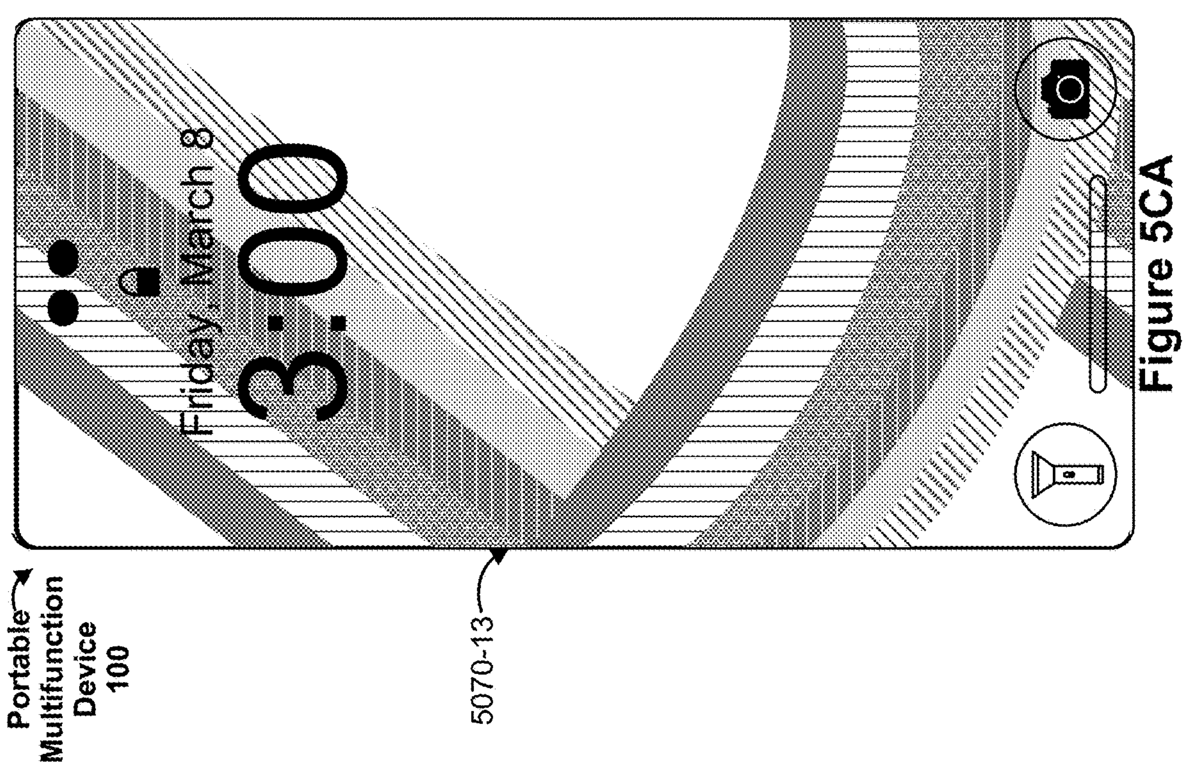

FIG. 5X illustrates a user input 571, such as a tap input or other selection input, to add complications to the wake screen user interface 563. In some embodiments, in response to user input 571, the device displays a user interface element 570 that includes a plurality of available and/or recommended complications as illustrated in FIG. 5Y, and the device detects and responds to user inputs selecting the displayed complications to add the selected complications to the wake screen user interface 563. For example, in response to user input 573 (e.g., a tap input or other selection input) selecting the recommended set of complications, including a health complication, a breathe complication, and a calendar complication), the device adds the set of complications to a predefined portion of the wake screen user interface, optionally below the time indication.

In some embodiments, user interface element 570 includes a plurality of complications, wherein each complication is associated with an application that executes on device 100. In some embodiments, an indication of the application associated with each complication is displayed (e.g., "Calendar" application, "Health" application, "Weather" application and "Breathe" application). In some embodiments, one application provides a plurality of complications (e.g., a plurality of options having different designs and/or displaying different status information for a complication for the respective application). In some embodiments, a third-party provider that provides a respective application optionally designs one or more complications for the respective application (e.g., using an API, programming guidelines, and/or toolkits) that are receives permission for display on one or more system user interfaces by the operating system. In some embodiments, each complication includes status information for a respective application. For example, the calendar complication includes an upcoming event that is saved on the user's calendar ("11:00 AM Event"). In some embodiments, a health complication includes a distance of a current workout, and/or an indication of a daily amount of activity. In some embodiments, a weather application is associated with a plurality of complications, including a complication that provides a current air quality index (AQI) and/or a complication that indicates a current weather (e.g., a sun for sunny weather or a cloud with rain for rainy weather).

In some embodiments, the computer system detects and responds to user inputs directed to user interface element 570 that correspond to requests to select one or more individual complications, as opposed to a recommended set, for example user input 574 selects a calendar complication 502-10, as shown in FIG. 5Y. In some embodiments, in response to user input 574, the device adds the calendar complication 502-10 to the predefined area in the wake screen user interface for complications, as illustrated in FIG. 5Z. In some embodiments, the device detects and responds to user input(s) directed to editing user interface 565 that correspond to request(s) to change a location of the predefined area (e.g., from below the time indication to above the date indication) in the wake screen user interface. In some embodiments, the indication to add complications (e.g., button 572 and/or button 576) is optionally displayed if there is additional space in the predefined area. In some embodiments, the indication to add complications is optionally displayed only if there are no complications in the predefined area.

FIG. 5Z illustrates a user input 578 selecting a health complication 502-11. FIG. 5AA illustrates that, in response to the user input 578, the device 100 adds the health complication 502-11 to the predefined area in the wake screen user interface for complications (e.g., next to calendar complication 502-10). In some embodiments, the device detects and responds to user input(s) directed to the predefined area that correspond to request(s) to change a position of the complications, for example an input 580 directed to complication 502-11 to arrange the health complication 502-11 to be on the left of the calendar complication 502-10, as illustrated in FIGS. 5AA-5AB.

FIG. 5AA illustrates a user input 580, such as a tap input or other selection input, selecting health complication 502-11. In some embodiments, user input 580 further indicates movement of health complication 502-11 (e.g., via a drag and/or swipe gesture) from right to left. In some embodiments, in response to user input 580, the complications are rearranged in user interface 565, with health complication 502-11 to the left of calendar complication 502-10, as illustrated in FIG. 5AB.

FIG. 5AB illustrates a user input 582 selecting a breathe complication 502-12, associated with a breathe application for reminding a user to periodically take deep breaths, from the set of complications displayed in user interface element 570. In some embodiments, user interface element 570 is scrollable, and the device detects and responds to user input(s) directed to user interface element 570 that correspond to request(s) to scroll and view additional complications that are available to add to the wake screen user interface.

FIG. 5AC illustrates that, in response to user input 582, the device 100 replaces display of calendar complication 502-10 with breathe complication 502-12. In some embodiments, the predefined area that displays complication has a maximum size and/or a maximum number of complications that fit within the predefined area. For example, the predefined area fits up to four complications of a first size (e.g., a single-slot size), or two complications of a second size (e.g., each having a double-slot size). In some embodiments, in accordance with a determination that an additional complication does not fit within the predefined area, one or more complications are automatically removed in response to a user input to add a complication to the predefined area. In some embodiments, in FIG. 5AC, user interface element 570 is optionally minimized or closed. In some embodiments, the device reopens user interface element 570 in response to detecting a user input tapping or otherwise selecting a complication in the editing user interface 565.

FIG. 5AD illustrates a user interface element 586 that is displayed in response to detecting a user input 584 at a position within the reticle 569 around the time. In some embodiments, user interface element 586 includes options for modifying properties of the time. For example, the device detects user input(s) directed to different font colors, fonts, and display styles in the user interface element 586 and modifies a text style (e.g., font, font size and/or font color) and/or modifies how the time is displayed (e.g., as a 24-hour indication or as a 12-hour indication). In some embodiments, reticle 568 around the date is optionally not displayed. In some embodiments, in response to a user input to change a text style, the text style of both the date and the time is updated. In some embodiments, the device detects separate user input(s) that select different text styles for the date and for the time (e.g., selecting the text style for the date while the reticle around the date is selected, and selecting the text style for the time while the reticle around the time is selected).

In some embodiments, the device detects and responds to user input(s) directed to user interface element 586 that correspond to request(s) to modify a color of the time. In some embodiments, recommended colors of the time are provided in response to a tap 592 on the time element (e.g., as illustrated in FIG. 5AE). In some embodiments, the recommended colors include a vibrant material, black and/or white (e.g., depending on a background color), and/or one or more colors derived from the background (e.g., a color that matches, or complements, a color in a photo used as the background). In some embodiments, the device provides one or more user interface objects in the user interface element 586 to customize a color (e.g., modifying one or more aspects (e.g., tint, tone, and/or saturation) of a currently displayed color option) and/or to select another color that is not included in the recommended colors (e.g., by selecting the color from a color wheel, and/or sampling the color from the background media item) to be applied to the time. In some embodiments, in response to detecting the user's selection of a user interface object that corresponds to a user request to customize the color by sampling a portion of the background, the device ceases to display the user interface element 586 and reveals the background of the wake screen user interface. In some embodiments, the device displays a color sampling object that moves across the currently displayed background in accordance with a user's movement input and updates the color of the color sampling object according to the color of the background at the current location of the color sampling object. Upon receiving a user's confirmation that the color sampling is completed, the user interface element 586 is redisplayed with the sampled color included in the set of available font colors, and, optionally, the selected color (and the displayed color of the time element) is matched to the sampled color obtained from the background.

In some embodiments, in response to user input 588 selecting "Style 5", a text style of the date and time are updated to be displayed with text style 5, as illustrated in FIG. 5AE. In some embodiments, in response to user input 590, a color of the text is updated to the color selected by user input 590, as illustrated in FIG. 5AE. In some embodiments, in response to a request to change a color of the text, a color scheme of one or more other wake screen user interface elements (e.g., one or more complications and/or a background image) are also updated. For example, in FIG. 5AE, the health complication 502-13 and the breathe complication 502-14 are displayed with a different color scheme. In some embodiments, a color of the complications is selected to match and/or complement a selected color for the text. FIG. 5AE further illustrates a user input 592 (e.g., a tap input or other selection input) selecting the date indication, optionally without displaying reticle 568 around the date. In some embodiments, in response to user input 592, a user interface element 594 is displayed for changing a type of information displayed for the date indication. In some embodiments, in response to user input 592, reticle 568 is optionally redisplayed to indicate that the user is modifying one or more properties of the date indication, as illustrated in FIG. 5AF.

FIG. 5AF illustrates a user input 596 selecting to modify the information displayed as the date indication to include the day of the week (e.g., instead of the day of the week and the current month and day). In some embodiments, user interface element 594 optionally includes one or more text properties (e.g., font and/or color options) that when selected, cause the device to modify the text properties of the date indication (e.g., separately from modifying the text properties of the time indication described above). FIG. 5AG illustrates, in response to user input 596, the indication of the date is updated to display the day of the week (e.g., "Friday") without displaying the current month and date. In some embodiments, a user input 598 selects done option 566 to exit the editing user interface 565. In some embodiments, in response to the user input 598 selecting done option 566, the device 100 ceases displaying the editing user interface 565, and displays a wake screen user interface 5001 having the properties, as selected by the user in the editing user interface, as illustrated in FIG. 5AH.

FIG. 5AI illustrates a portrait-style wake screen user interface 5001 that optionally includes a plurality of complications, including health complication 502-15, weather complication 502-16, breathe complication 502-17 and sports complication 502-18, and includes a background photo with a subject (e.g., an individual). In some embodiments, a portrait-style wake screen user interface 5001 is displayed with a simulated depth effect, as described with reference to FIG. 5H.

In some embodiments, a wake screen user interface that includes a photo as the background image (e.g., such as the portrait-style background image illustrated in FIG. 5AI), displays the photo with a different aspect ratio than the aspect ratio of the stored photo (e.g., as stored in a photos application). For example, the device 100 automatically centers, zooms and/or crops a photo stored in the photos application to be displayed as the background of the wake screen user interface.

In some embodiments, a photo-style wake screen user interface, including a portrait-style wake screen user interface illustrated in FIG. 5AI, comprises a live photo that animates over time, or optionally in response to a user input on the wake screen user interface. For example, a photo-style wake screen user interface includes a plurality of interpolated frames such that the photo appears animated (e.g., to show movement of the individual displayed in wake screen user interface 5001).

In some embodiments, in response to a user input 5002 of a first type, for example tap input or a press and hold input that satisfies a threshold amount of time (e.g., at least 1 second, 3 seconds or 5 seconds) over the indication of the time and/or date (or optionally over a complication of the plurality of complications), the device 100 displays an editing user interface 565-2 for the wake screen user interface 5001.

As illustrated in FIG. 5AJ, in some embodiments, editing user interface 565-2 includes a same set of features as editing user interface 565, for example reticles 568 and/or 569 for the date and/or time indications, cancel option 567, done option 566, and an indication 574 that additional views of the user interface are available. In some embodiments, a crop indication 5003 is optionally displayed to indicate that the device will resize and/or scale a background image for the wake screen user interface in response to user input(s) directed to the crop indication 5003. In some embodiments, crop indication 5003 optionally includes a textual indication such as, "pinch to crop" to inform the user that a pinch gesture, or other type of gesture, will cause the device 100 to crop the photo used as the background of wake user interface 5001.

FIG. 5AJ further illustrates detecting a pinch gesture 5004, or other user input, for changing a crop of the background photo. In some embodiments, pinch gesture 5004 includes two points of contact that move apart and/or closer together. In some embodiments, an inward pinch gesture that moves the points of contact closer together causes a size of the subject in the background photo to decrease (e.g., as if zooming out) and an outward pinch gesture that moves the points of contact farther apart causes a size of the subject in the background photo to increase (e.g., as if zooming in) and/or optionally cropping the photo. For example, pinch gesture 5004 is an outward pinch gesture that zooms in the subject, as illustrated in FIG. 5AK, while pinch gesture 5006 (e.g., an inward pinch gesture) causes the subject to zoom out, as illustrated in FIG. 5AL.

In some embodiments, while a user input is detected to change a crop of the background photo, the reticles 568 and/or 569 are optionally not displayed. In some embodiments, in accordance with a determination that the subject of a portrait-style user interface has a size such that the subject overlaps with a portion of the time and/or date indication, the subject is optionally displayed overlaying the time and/or date indication. In some embodiments, the subject is optionally displayed as overlaying the plurality of complications. In some embodiments, the plurality of complications is optionally displayed over the subject of the portrait-style wake screen user interface.

FIG. 5AL illustrates a user input 5008 selecting reticle 569 for the time indication. In some embodiments, in response to the user input 5008, the user interface element 586 for editing the time indication is displayed. In some embodiments, a user input 5010 is detected for changing a text style of the time and/or date indications to "Style 2." In some embodiments, in response to user input 5010, device 100 changes the time and optionally date indication to be displayed with text style "Style 2," as illustrated in Figure SAN.

Figure SAN illustrates a user input 5012 corresponding to a request to minimize, or close, user interface element 586. In some embodiments, the user input 5012 comprises a swipe down gesture, or another input selecting a close option.

FIG. 5AO illustrates the editing user interface 565-2 after minimizing, or closing, user interface element 586 in response to user input 5012. In some embodiments, as indicated by indicator 574, a plurality of views of the wake screen user interface are available. In some embodiments, each view in the plurality of views corresponds to a different set of visual properties, optionally without changing content of the background of the wake screen user interface. For example, for an emoji-style wake screen user interface, the plurality of views includes different patterns, or arrangements of one or more selected emoji used in the background and/or changes a color effect (e.g., monochrome, sepia, or neon) and/or a level of shadow displayed with the emoji in the background of the wake screen user interface. In some embodiments, for a portrait-style wake screen, or other wake screen user interface that includes a photo as a background image, the plurality of views include the background image with different visual effects applied (e.g., greyscale, sepia, or another filter). In some embodiments, for an astronomy-style wake screen, the plurality of views include different versions of the background image, for example different phases of the moon.

In some embodiments, the plurality of views available optionally include different sets of complications, different styles of text for the time and/or date indication (e.g., including a font style and/or a color), and/or different background colors for a photo (e.g., replacing a background color while maintaining a subject in a photo). In some embodiments, the plurality of views are views that are automatically, without user input, generated and/or selected by the device 100.

In some embodiments, while the device 100 displays the editing user interface 565-2, the device detects user inputs directed to a currently displayed view of the plurality of views to scroll the plurality of views in the editing user interface 565-2. FIG. 5AO illustrates a user input 5014-1, such as a swipe input or other input (e.g., a tap on a respective side of the user interface to scroll in the respective direction). In some embodiments, user input 5014-1 is initiated with a contact detected at a first position, and the contact moves in a first direction (e.g., from right to left or left to right). In some embodiments, in accordance with the user input 5014-1, which optionally continues in the same direction as user input 5014-2, the device 100 updates the view in the editing user interface to display at least a portion of a second view of the wake screen user interface. In some embodiments, a portion of the second view is gradually displayed, to appear as if the second view is sliding onto the display, while the first view is gradually removed from display, as if sliding off the display.

FIG. 5AP illustrates a portion of the second view, sliding onto the display while the first view slides off the display. In some embodiments, one or more visual elements in the first view are optionally maintained in both the first view and the second view. In some embodiments, the one or more visual elements that are maintained optionally do not move within the user interface. In some embodiments, the one or more visual elements that are maintained correspond to visual elements of the wake screen user interface that the user has previously modified (e.g., in current editing session and/or in a previous editing session). For example, the user modified the date and time indications, and the user modified a size of the subject in the background photo. In some embodiments, the date and time indications, and the subject in the background photo, do not move while the second view slides onto the display. In some embodiments, a set of visual elements, optionally that were not modified by the user in the current editing session and/or in a previous editing session, move off the display with the first view and are replaced by another set of visual elements. For example, the complications and a background color appear to slide off the display in accordance with user input 5014-2.

FIG. 5AQ illustrates user input 5014-3 swiping in an opposite direction from the direction of user input 5014-2. In some embodiments, user input 5014-3 is optionally a continuation of user input 5014-1 and 5014-2, wherein the user input 5014-3 has maintained contact with the display and changes to swipe in another direction. In some embodiments, the portion of the second view that was sliding onto the display in FIG. 5AP moves in the opposite direction, in accordance with user input 5014-3. Accordingly, user input 5014 (e.g., 5014-1, 5014-2 and 5014-3) control bringing view onto and/or removing views from the editing user interface 565-2.

FIG. 5AR illustrates user input 5014-4, optionally as a continuation of user input 5014-3, swiping in the same direction as user inter 5014-2 in order to slide the second view of the wake screen user interface onto the display. In some embodiments, as illustrated in FIG. 5AS, as the user input 5014-5 continues to swipe from right to left, a larger portion of the second view of the wake screen user interface slides onto the display, optionally until the second view of the wake screen user interface is displayed in the editing user interface 565-2 without displaying the first view of the wake screen user interface, as illustrated in FIG. 5AT.

FIG. 5AT illustrates the second view of the wake screen user interface, wherein the complications have been changed relative to the first view of the wake screen user interface, and/or a background color of the second view has been changed. In some embodiments, the background color(s) selected for the views in a portrait-style wake screen user interface are selected based on content in the photo. For example, an original background of the photo is replaced with a single color or colored gradient, wherein the color(s) are selected to match and/or complement colors that appear in the original background of the photo and/or that appear in the subject of the portrait-style wake screen user interface.

In some embodiments, while the user is switching between views of the wake screen user interface (e.g., via user input 5014), one or more editing options are optionally not displayed. For example, the reticles, done option, cancel option and/or indication of additional views are optionally not displayed until a single view is displayed. For example, in FIG. 5AT, the second view is displayed, and the first view is no longer displayed, and the one or more editing options are redisplayed.

In some embodiments, a user input 5016 is detected on a complication displayed in the second view of the editing user interface 565-2. In some embodiments, in response to user input 5016, user interface element 570 for changing complications is displayed, as illustrated in FIG. 5AU. In some embodiments, user input 5018 selects a health complication, and device 100 replaces display of the weather complication with the selected health complication.

FIG. 5AV illustrates user input 5020 requesting to switch views in the editing user interface after editing the complications.

FIG. 5AW illustrates that, in response to user input 5020, the view switches from the second view to a third view (e.g., with a different background color and/or pattern) without changing the time indication, the date indication, the subject, or the complications in accordance with each of these features having been manually edited by the user during the current (or optionally, during a previous) editing session. FIG. 5AW illustrates a user input 5022 selecting the "Done" option to exit out of the editing user interface.

FIG. 5AX illustrates wake screen user interface 5024, displayed with the visual features, as selected by the user during the editing process.

FIG. 5AX2 illustrates an editing user interface 565-3 for editing a wake screen user interface that includes a textual indication of the date, a textual indication of the time, and a plurality of complications. In some embodiments, a plurality of the complications are displayed with corresponding affordances for removing the complications. For example, a minus symbol, an "x" or another removal affordance is displayed, optionally at a corner of a complication that partially overlaps the complication; and selection of the minus symbol, "x" or other removal affordance causes the device to remove the complication from the wake screen user interface.

In some embodiments, device 100 detects a user input 5080 (e.g., a tap input or other selection input) selecting complication 5089-1. In some embodiments, in response to user input 5080, device 10 displays a user interface element 5082 for changing a size of the selected complication 5089-1. For example, device 100 provides a plurality of size options for displaying the information of complication 5089-1. In some embodiments, the plurality of size options correspond to different text sizes. In some embodiments, user input 5084 is detected as selecting a first size option for the complication 5089-1, and in response to the user input, the complication 5089-1 is updated to the selected size, as illustrated in FIG. 5AX4.

FIG. 5AX3 illustrates device 100 detecting user input 5086 selecting the affordance for removing complication 5089-2. In some embodiments, in response to user input 5086, the complication 5089-2 is removed from the wake screen user interface, as illustrated in FIG. 5AX4.

FIG. 5AX3 further illustrates user input 5088 corresponding to selection of the reticle for the textual indication of the date. In some embodiments, in response to user input 5088, device 100 displays user interface element 5090 for changing the content that is displayed in the area above the textual indication of the time. For example, the device displays a plurality of complications in user interface element 5090 and detects user input that corresponds to a request to select a complication from the plurality of complications displayed in user interface element 5090. In some embodiments, the plurality of complications that are selectable for display above the textual indication of the time is a distinct set of complications than the set of complications that are selectable for display below the textual indication of the time (e.g., the set of complications displayed in user interface element 570, as described with reference to FIGS. 5AA-5AC). For example, the complications to be displayed above the textual indication of the time are text-based complications and/or have a size (e.g., height and/or length) that is distinct from the complications to be displayed below the textual indication of the time.

FIG. 5AX4 illustrates user input 5092 selecting a complication to be displayed above the textual indication of the time. In some embodiments, in response to user input 5092, the selected complication is displayed in reticle 5094, as illustrated in FIG. 5AX5, above the textual indication of the time, and replaces display of the textual indication of the date. In some embodiments, more details about selection of a complication for displayed above the time and/or selecting a different set of information to display in a complication are described with reference to FIG. 5AF. For example, device 100 optionally displays the content of user interface element 594 (FIG. 5AF) and the content of user interface element 5090, such that the user can select the textual information and/or complications to be displayed above the indication of the time. FIGS. 5AY-5BD illustrate another example of editing a wake screen user interface, including switching between a plurality of views for a respective wake screen user interface in the editing user interface. FIG. 5AY illustrates device 100 displaying a wake screen user interface 5026 and receiving a user input 5028 selecting calendar complication. In some embodiments, if the user input 5028 is a first type of input (e.g., a tap input or other selection input), the device 100 displays an application user interface for the application associated with the selected complication (e.g., the calendar application). In some embodiments, if the user input 5028 is a second type of input (e.g., a press and hold or another gesture), the device 100 displays editing user interface 565-3 for editing the visual features of the wake screen user interface 5026.

FIG. 5AZ illustrates user interface element 570 for editing complications is displayed in the editing user interface 565-3, in response to the user input 5028. In some embodiments, a user input 5030 for minimizing, or closing, user interface element 570 is detected, optionally without detecting a user input to change or select a complication. In some embodiments, a user input 5032 is detected as selecting a complication (e.g., a weather complication) from user interface element 570, and the device 100 updates the wake screen user interface to include the selected complication, before minimizing the user interface element 570.

FIG. 5BA illustrates the editing user interface 565-3 after the user interface element 570 has been minimized or closed. In some embodiments, a user input 5034 to change the current view of the wake screen user interface is detected. In some embodiments, user input 5034 is a swipe gesture (e.g., from left to right or from right to left). In some embodiments, in response to user input 5034, the editing user interface 565-3 displays a second view of the wake screen user interface.

FIG. 5BB illustrates the second view of the wake screen user interface. In some embodiments, the background image of the wake screen user interface updates, for example, for an astronomy wake screen user interface, different phases of the moon are included in different views of the wake screen user interface. In some embodiments, a color palette, or other virtual effect, changes between different views of the wake screen user interface. In some embodiments, the second view of the wake screen user interface includes a different text style for the date and/or time indications. In some embodiments, a subset, less than all, of the complications are updated from the first view to the second view. For example, the complication that was manually selected by the user (e.g., the weather complication) does not change between the first view and the second view, while the other complications change. In some embodiments, an animated transition is displayed while changing display from the first view to the second view, such as the sliding animation described with reference to FIG. 5AP.

In some embodiments, in response to user input 5036 (e.g., a swipe user input in a direction opposite user input 5034) corresponding to a request to redisplay the first view of the wake screen user interface, the first view of the wake screen user interface is redisplayed in the editing user interface 565-3, as illustrated in FIG. 5BC.

In some embodiments, in response to detecting a user input 5038, such as a user input in a direction distinct from user input 5034, the device 100 displays a third view of the wake screen user interface, as illustrated in FIG. 5BD. In some embodiments, the third view of the wake screen user interface optionally displays a different phase of the moon and/or optionally displays the same complications as the first view of the wake screen user interface.

In some embodiments, in response to user input 5040 selecting the "Done" option, the device 100 ceases to display the editing user interface 565-3 and displays the view of the wake screen user interface that is displayed while the user input 5040 is detected as the current wake screen user interface.

FIGS. 5BE-5BF illustrate an example of navigating from a wake screen user interface to a home screen user interface. In some embodiments, in response to a user input 5042 (e.g., a swipe input initiated over a home icon or other selection input, such as on a home button) requesting to navigate away from wake screen user interface 5041 to a home screen user interface, the device 100 displays an animated transition 5043 in which the wake screen user interface is visually deemphasized (e.g., with a blur effect and/or by changing a level of translucency) as the wake screen user interface is animated as sliding off the display, optionally in an upward direction. In some embodiments, one or more application icons on the home screen user interface optionally animate as entering onto the display and/or are at least partially visible behind the visually deemphasized wake screen user interface during the animation.

FIGS. 5BG-5BH illustrate an example of navigating from a wake screen user interface to a user interface of an application. In some embodiments, in response to a request to navigate away from the wake user interface (e.g., via user input 5042 and/or user input 5044), the user interface that is displayed is based on a user interface that was displayed before displaying the wake screen user interface (e.g., before entering a low power state and/or a locked mode). For example, if the device 100 displays an application user interface as the most recently displayed user interface prior to the device entering a low power state and/or a locked mode, in response to a user input requesting to navigate away from the wake screen user interface 5041, the previously displayed application user interface is redisplayed. Similarly, in some embodiments, if the device 100 displays a home screen user interface as the most recently displayed user interface prior to the device entering a low power state and/or a locked mode, in response to a user input requesting to navigate away from the wake screen user interface 5041, the previously displayed home screen user interface is redisplayed.

In some embodiments, in response to a user input 5044 (e.g., a swipe input initiated over a home icon or other selection input, such as on a home button) requesting to navigate away from wake screen user interface 5041 to a home screen user interface, the device 100 displays an animated transition 5045 in which the wake screen user interface is optionally not visually deemphasized, or is visually deemphasized in a distinct manner than the animated transition 5043 (e.g., with a different blur effect and/or with a different level of translucency), while the wake screen user interface is animated as sliding off the display, optionally in an upward direction. In some embodiments, the user interface of the application is optionally displayed on the portion of the display that is not covered by the wake screen user interface as it slides off the display.

FIG. 5BI illustrates home screen user interface 5046. In some embodiments, home screen user interface 5046 includes one or more application icons and is displayed with a background image. In some embodiments, the background image displayed in home screen user interface 5046 is based at least in part on the wake screen user interface that the user navigated away from. For example, wake screen user interface 5041 includes a star image as the background, and the related home screen user interface 5046 also includes star images. In some embodiments, the backgrounds of the home screen and wake screen need not share content, but a respective home screen is stored in associated with a respective wake screen such that, if the current wake screen changes from a first wake screen to a second wake screen, the home screen that is displayed in response to a user input on the respective wake screen is associated with the respective wake screen.

FIG. 5BI illustrates a user input 5048 corresponding to a request to view a coversheet user interface, which optionally includes the same visual features as the wake screen user interface. In some embodiments, a user input 5050 is detected on a power button (e.g., push button 206) that causes the device 100 to enter a low-power state and/or a locked mode. In some embodiments, upon waking the device 100 from the low-power state and/or locked mode, the wake screen user interface 5041 is optionally redisplayed. In some embodiments, upon waking the device 100 from the low-power state and/or locked mode, the wake screen user interface is updated to a next wake screen user interface in the stored set of wake screen user interfaces (e.g., wherein the device 100 cycles through the stored set of wake screen user interfaces, optionally periodically and/or upon waking).

FIG. 5BJ illustrates a user input 5051, optionally a swipe user input in a first direction (e.g., from left to right or from right to left). In some embodiments, user input 5051 is detected within a predefined area of the wake screen user interface 5041. In some embodiments, an input within the predefined area of the wake screen user interface 5041 causes the device 100 to change to another wake screen user interface. For example, as illustrated in FIG. 5BK, the wake screen user interface is updated to display wake screen user interface 5052.

In some embodiments, after the wake screen user interface is updated to wake screen user interface 5052, user input 5054 requesting to navigate away from the wake screen user interface causes is detected. In some embodiments, in response to user input 5054, the device 100 displays a home screen user interface 5056 that is related to the wake screen user interface 5052.

FIG. 5BL illustrates user interactions with the home screen user interface in manners similarly to those described with respect to the home screen user interface 5046 (FIG. 5BI). For example, user input 5058 causes the device 100 to display a coversheet user interface (e.g., having the visual properties of wake screen user interface 5052) and user input 5060 causes the device 100 to enter a lower-power state and/or a locked mode.

FIGS. 5BM-5BN illustrates an example of a user input selecting a complication displayed on a wake screen user interface 5062. In some embodiments, user input 5064 is a tap input or other selection input on a breathe complication, and causes the device 100 to display an application user interface for the breathe application associated with the breathe complication. In some embodiments, user input 5066 (e.g., a tap input or other selection input) is detected on a weather complication, and in response to user input 5066, the device 100 displays an application user interface 5068 for the weather application associated with the weather complication, as illustrated in FIG. 5BN. In some embodiments, before displaying a respective application user interface associated with the selected complication, the device 100 optionally requires the user to unlock the device (e.g., using biometric authentication and/or a passcode).

FIGS. 5BO-5BP illustrate an example of an animated transition while the device 100 transitions from the low power state to displaying the wake screen user interface 5070-2. For example, user interface 5070-1 is displayed in an always-on (or dimmed) display (e.g., in the low power state). In some embodiments, user interface 5070-1 includes a plurality of colored stripes (or lines) that are animated as the device transitions between different user interfaces. For example, the colored stripes are representations of ribbons, ropes, strings, or fabrics. In some embodiments, each stripe is a different color (e.g., like a rainbow, a pride flag, or another set of stripes). In some embodiments, the colored stripes are arranged as if wrapped around an object, such as a cylinder. In some embodiments, the animated transition includes increasing a size of the stripes and/or decreasing a distance between the stripes. For example, in FIG. 5BO, each of the colored stripes are of a first size and there is space between the stripes. In some embodiments, in accordance with device 100 dismissing the low power state to display wake screen user interface 5070-2 in FIG. 5BP, the stripes are animated as coming together (e.g., such that there is no space, or less space, between the stripes) and the size of the stripes increases to a second size greater than the first size.

FIGS. 5BQ-5BS illustrate an example of animating the background, including the colored stripes, in response to one or more user inputs. In some embodiments, the device 100 detects user input 5072 (e.g., a swipe input or other input in a first direction). In some embodiments, in response to user input 5072, the colored stripes are animated as being pulled in a same direction (or opposite direction) as the user input 5072. For example, as user input 5072 moves in the upward direction, the colored stripes are animated to move upward, optionally while being displayed as winding around the object (e.g., cylinder). In some embodiments, the animation includes decreasing a size of one or more of the colored stripes and/or increasing a distance between at least two of the colored stripes. In some embodiments, a top-most stripe is animated as separating from, and increasing a distance from, its neighboring stripe. For example, first the top-most stripe separates from the set of stripes, then a second top-most stripe separates from the remaining stripes, optionally until there is space between each of the stripes in the set of stripes. For example, in FIG. 5BR, the top three stripes are illustrated as being separated, as indicated by the black space, from the remaining lower three stripes in the set of stripes.

In some embodiments, the animation is displayed in accordance with the user input 5072. For example, in FIG. 5BR, user input 5074 is detected as being in an opposite direction as user input 5072. For example, user input 5074 is a swipe input in a downward direction, while user input 5072 is a swipe input in an upward direction. In some embodiments, in accordance with a determination that user input 5072 did not meet dismiss criteria, the wake screen user interface 5070-3 is not dismissed, and in response to user input 5074, the animation reverses, as illustrated in FIG. 5BS. For example, in FIG. 5BS, the stripes have increased in size, relative to the stripes in FIG. 5BR, and the top stripes have shifted back down to remove the distance between the set of stripes. In some embodiments, the top-most stripe is the last stripe to rejoin the set of stripes. In some embodiments, after detecting user input 5074, the user input is no longer detected, for example in response to a lift off 5076 of the user input. In some embodiments, the reverse animation continues until the wake screen user interface 5078 is back to its original state (e.g., the state illustrated in FIG. 5BQ before detecting user input 5072), as illustrated in FIG. 5BT.

FIG. 5BU illustrates a user input 5080-1, such as a swipe input in the upward direction. In some embodiments, user input 5080-1 satisfies dismiss criteria for dismissing the wake screen user interface 5070-7. For example, the dismiss criteria is satisfied in accordance with a determination that user input 5080-1 satisfies a threshold swipe velocity and/or a threshold swipe distance. For example, the dismiss criteria is satisfied in accordance with user input 5080-2 (e.g., a continuation of input 5080-1) continuing to be detected as the user continues the swipe input upward. In some embodiments, in response to user input 5080-1, the device 100 displays the animation described with reference to FIG. 5BR, including separating the colored stripes and/or decreasing a size of the colored stripes, as shown in FIG. 5BV.

In some embodiments, in accordance with a determination that the user input 5080 (e.g., including user input 5080-1 and user input 5080-2) satisfies the dismiss criteria, the device 100 displays a complete animation as the device 100 transitions from displaying the wake screen user interface 5070-7 to displaying home screen user interface 5070-10. In some embodiments, as illustrated in FIG. 5BW, an intermediary user interface 5070-9 is displayed that includes the colored stripes moving up and twisting (e.g., around an invisible object, such as a cylinder) while the colored stripes are displayed as separated, as indicated by the black space between the stripes, and/or are displayed with a smaller width that the stripes displayed on the wake screen user interface 5070-7.

In some embodiments, after displaying the animation that twists and moves the stripes up, the stripes are displayed with the smaller width, as illustrated in FIG. 5BX, optionally the most narrow width displayed during the animation, as the background of the home screen user interface 5070-10, which also includes one or more application icons in the foreground. In some embodiments, the stripes displayed in the background of the home screen user interface 5070-10 are optionally displayed with a same width as the stripes displayed in the background of the wake screen user interface 5070-7 (FIG. 5BU) and optionally displayed as shifted upward from the stripes displayed in the wake screen user interface 5070-7. For example, the stripes are displayed as a same size but in a different position as the background of the home screen user interface 5070-10 as compared to the stripes of the background of the wake screen user interface 5070-7.

FIGS. 5BY and 5BZ illustrate examples of changing an orientation of the stripes of the wake screen user interface 5070-11 to wake screen user interface 5070-12. For example, a direction in which the stripes are wrapped around the invisible objects is updated to be in an opposite direction (e.g., clockwise or counter-clockwise). In some embodiments, the orientation of the stripes of the wake screen user interface 5070 is selected in accordance with a user input. For example, an option is provided to the user to select an orientation of the stripes to be used as the background of the wake screen user interface. In some embodiments, the orientation of the stripes is automatically determined, without user input. In some embodiments, the orientation of the stripes is alternated periodically, for example, each time the wake screen user interface is invoked, the orientation of the stripes changes from the previous orientation that was displayed the previous time the wake screen user interface was invoked. For example, upon a lock and unlock cycle and/or upon dismissing a low-power state, the wake screen user interface alternates the orientation of the stripes.

FIG. 5CA-5CB illustrate an example of changing a background color of the wake screen user interface 5070-13 to 5070-14. In some embodiments, the background color of the wake screen user interface is automatically selected in accordance with a current mode of operation of the device 100. For example, while the device 100 is in a first mode of operation, such as a light mode, the background is selected for the light mode of operation (e.g., a white background is selected), as illustrated in FIG. 5CA. In some embodiments, while the device 100 is in a second mode of operation, such as a dark mode, the background is selected for the dark mode of operation (e.g., a black background is selected), as illustrated in FIG. 5CB. In some embodiments, the current mode of operation is selected in accordance with a time of day (e.g., light mode in the daytime and/or between a predefined time period (e.g., from 6 AM to 8 PM or another time period) and dark mode in the nighttime and/or outside of the predefined time period (e.g., from 8 PM to 6 AM)). In some embodiments, the light mode and the dark mode have respective sets of visual characteristics that either increase or decrease the overall luminance of the user interface displayed by the display generation component. For example, in the dark mode, user interface elements and/or background platters of user interface elements displayed in a user interface are made darker (e.g., reduced in luminance) than their counterparts displayed in the light mode, to reduce the average luminance of the user interface (e.g., to suit a particular time of day, function, and/or mood). In some embodiments, text shown in a dark color or black on a light background in the light mode is optionally converted to text shown in a light color or white on a dark background, when the device switches from the light mode to the dark mode. In some embodiments, text is shown in a dark color or black on a light background in the dark mode is optionally converted to text shown in a light color or white on a dark background, when the device switches from the dark mode to the light mode. In some embodiments, the user is provided with an option to manually select the background color.

FIG. 6A illustrates detecting a user input 602 (e.g., a tap input, a long press input, or another selection input) on wake screen user interface 600. In some embodiments, user input 602 is detected at a portion of the wake screen user interface 600 that does not correspond to the date and/or time indication, a complication, or a flashlight and/or camera shortcut.

Figure 6B:
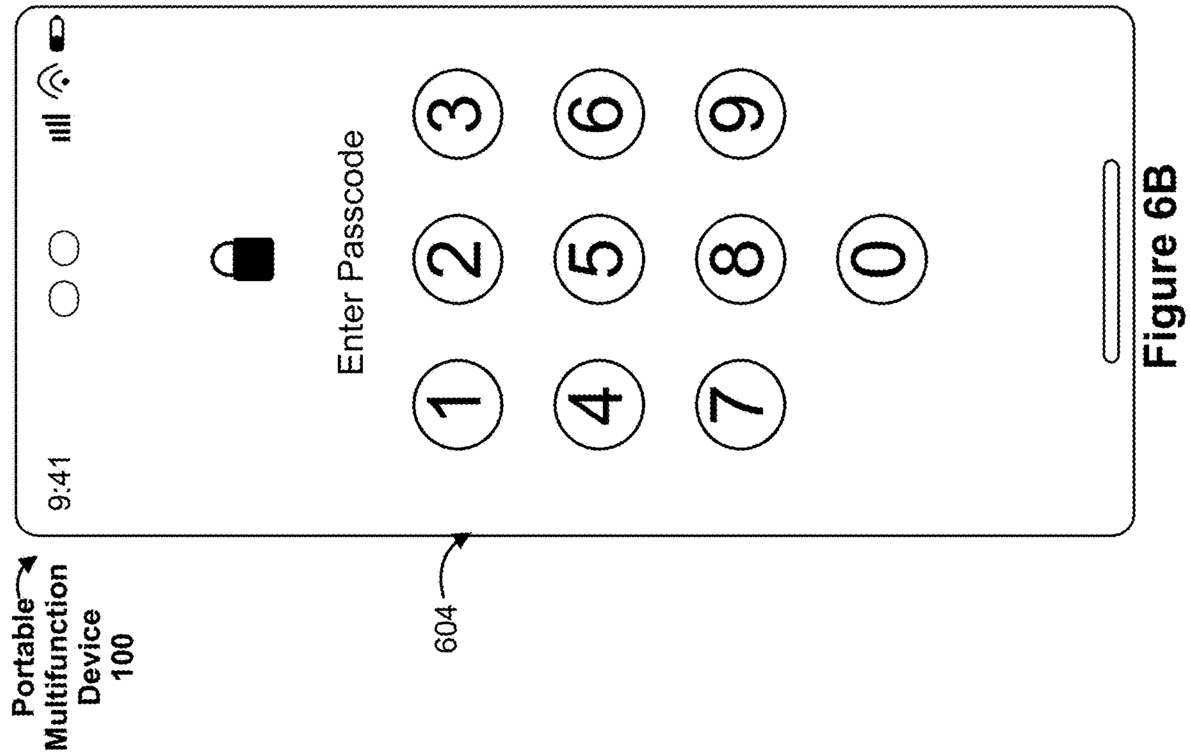

In some embodiments, in accordance with a determination that device 100 is in a locked mode (e.g., optionally indicated by the lock indicator above the date), the device 100 displays user interface 604 (FIG. 6B) for entering a passcode, or otherwise prompts the user to authenticate before allowing the user to access applications or data stored on device 100.

Figure 6D:
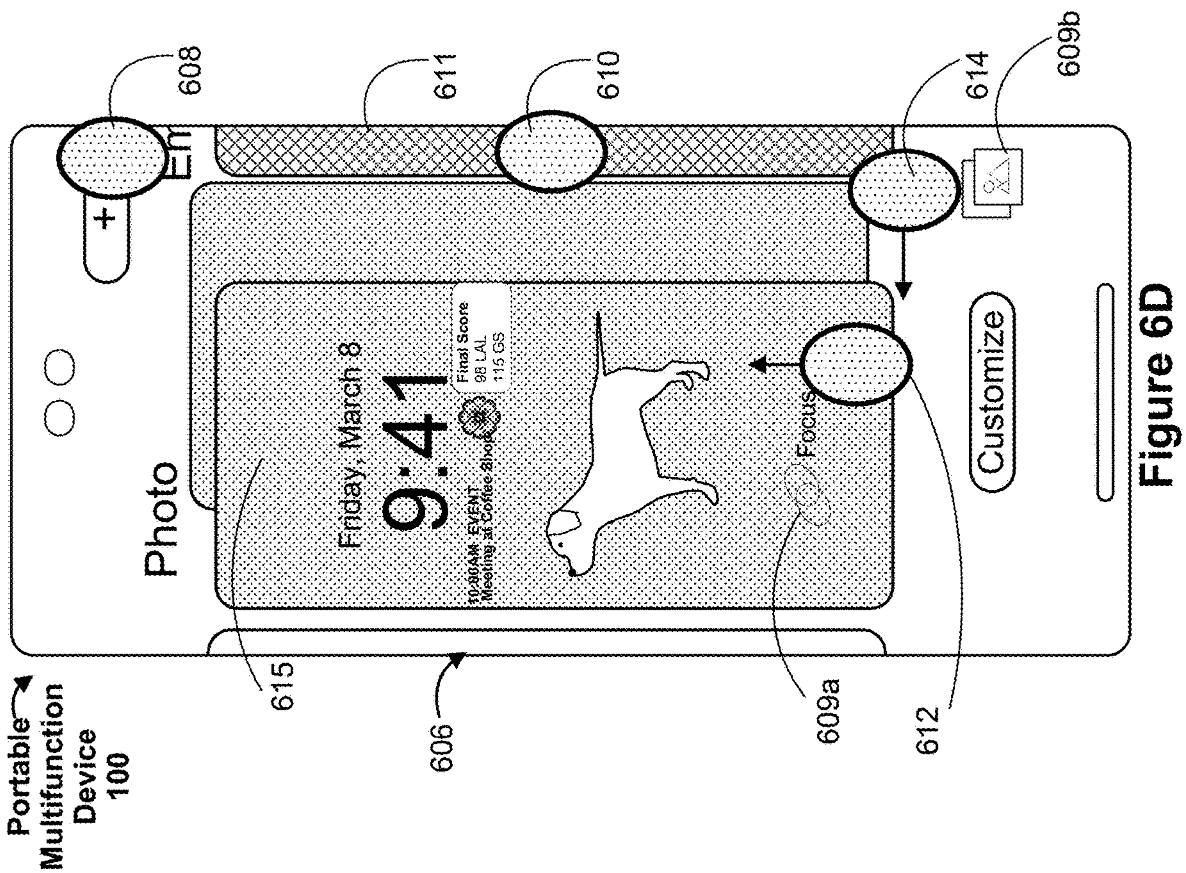
Figure 6C:
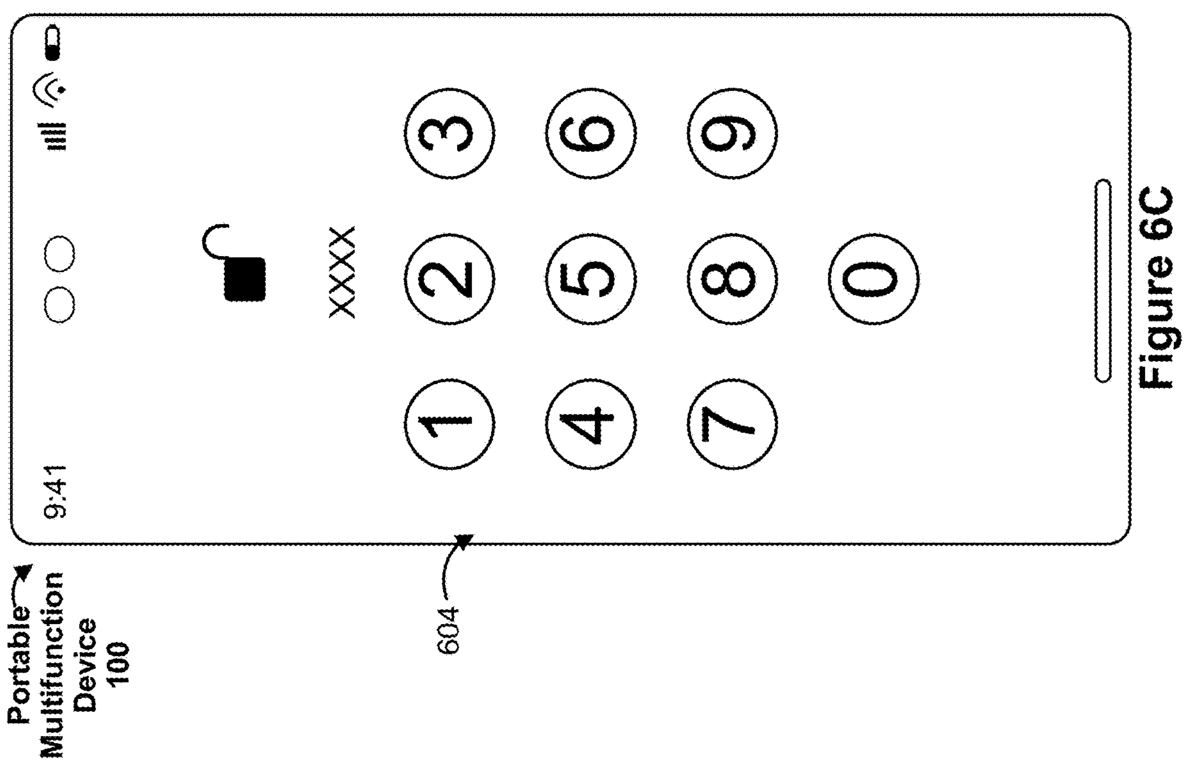

In some embodiments, the user authenticates using a passcode entered in user interface 604, as illustrated in FIG. 6C. In some embodiments, in response to user input 602, the device 100 displays the expanded face switcher user interface 606, as illustrated in FIG. 6D. In some embodiments, as described with reference to FIG. 5U, the expanded face switcher user interface (e.g., user interface 561) includes a plurality of representations of wake screen user interfaces (e.g., representation of wake screen user interface 611), with the centered wake screen user interface 615 being concurrently displayed with a portion of a related home screen user interface.

Figure 6F:
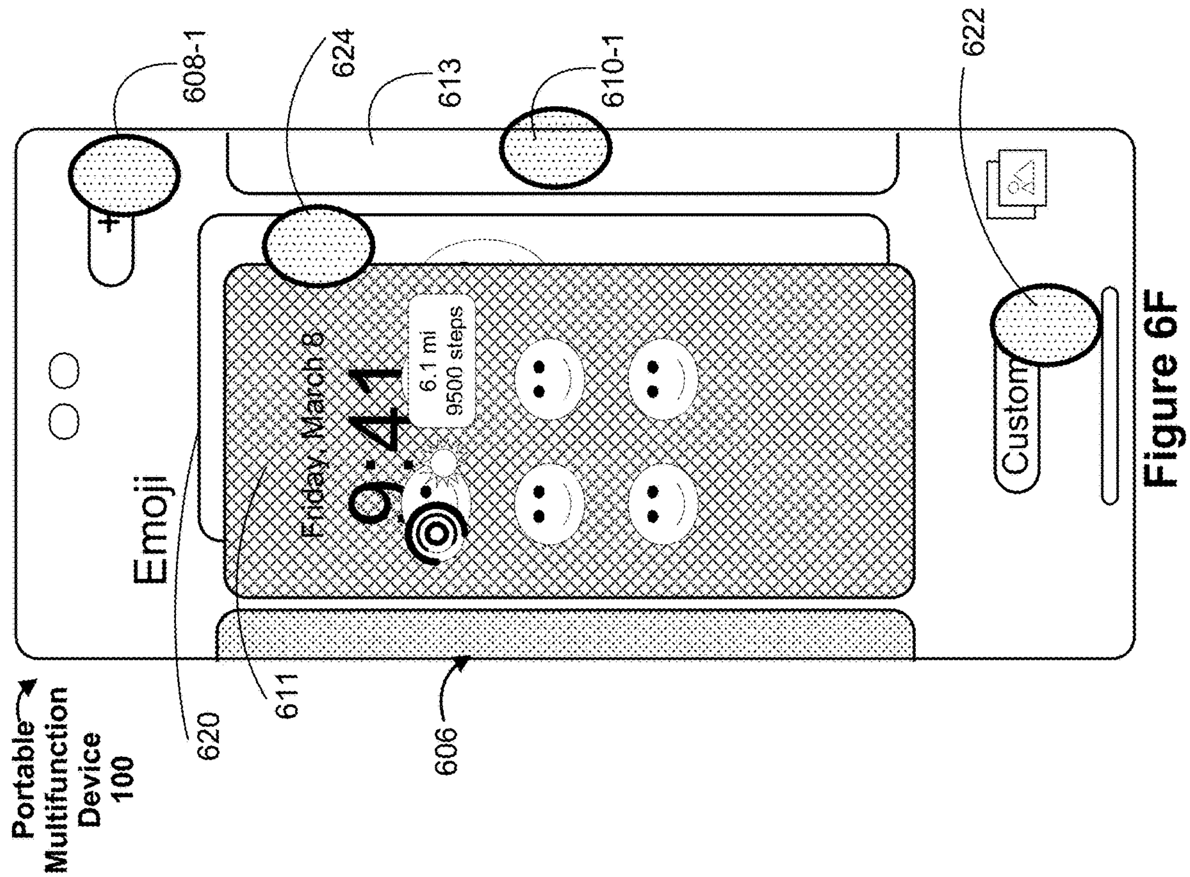

FIG. 6D illustrates a plurality of user interactions with expanded face switcher user interface 606. In some embodiments, user input 608 selecting the plus button causes the device 100 to display a user interface (e.g., an editing user interface) for creating a new wake screen user interface to add to the set of wake screen user interfaces. In some embodiments, user input 610 selecting a portion of a representation of a second wake screen user interface 611 causes the device 100 to display an editing user interface for the second wake screen user interface corresponding to the representation of the second wake screen user interface 611. In some embodiments, a user input selecting user interface element 609*a* ("Focus") enables the user to set a restricted notification mode (e.g., in which certain types of notifications are suppressed and/or delayed) for the wake screen corresponding to representation 615 of a wake screen. In some embodiments, a user input selecting option 609*b* enables a user to view a gallery view (e.g., user interface 652, FIG. 6K) for creating a new wake screen user interface to add to the set of user interfaces. In some embodiments, user input 614, such as a swipe input (e.g., from right to left), causes the device to bring the representation of the second wake screen user interface 611 to the center of the expanded face switcher user interface 606, as illustrated in FIG. 6F.

In some embodiments, the device detects and responses to user inputs directed to the expanded face switcher user interface 606 that correspond to requests to rearrange an order of the set of wake screen user interfaces in the expanded face switcher user interface 606. For example, in response to a long press user input, a touch-hold and drag input, or another type of user input directed to a respective representation of a wake screen user interface in the expanded face switcher user interface 606, the device selects and optionally drag the respective representation of the wake screen user interface to the left and/or right of the other representations of wake screen user interfaces to change the order in which the device 100 cycles through the set of wake screen user interface.

Figure 6E:
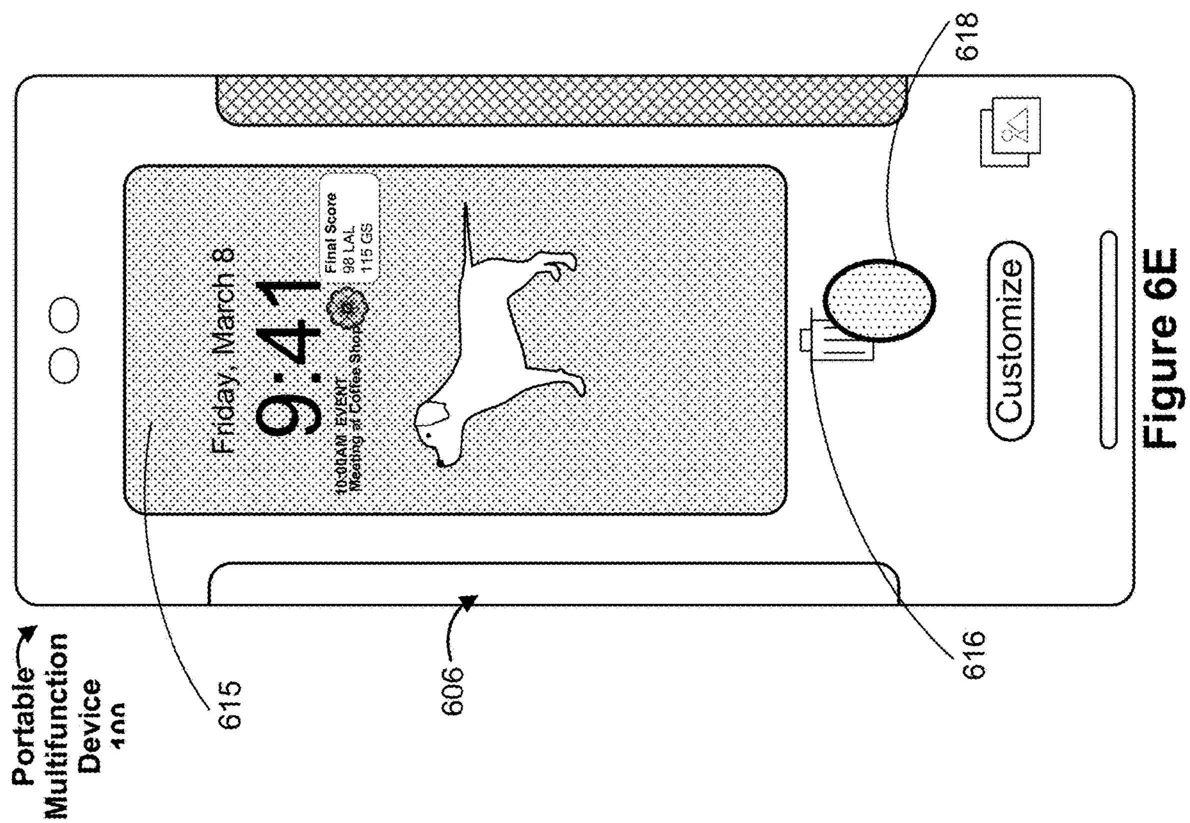
Figure 6H:
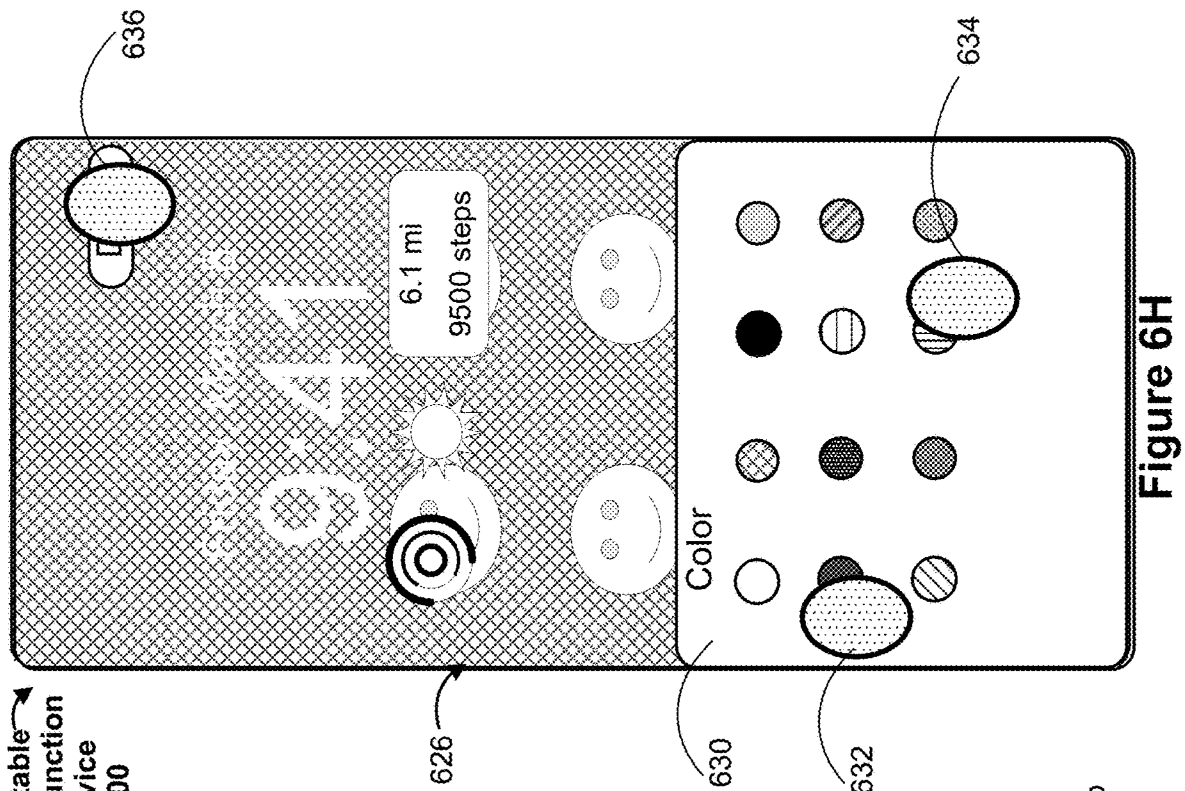
Figure 6G:
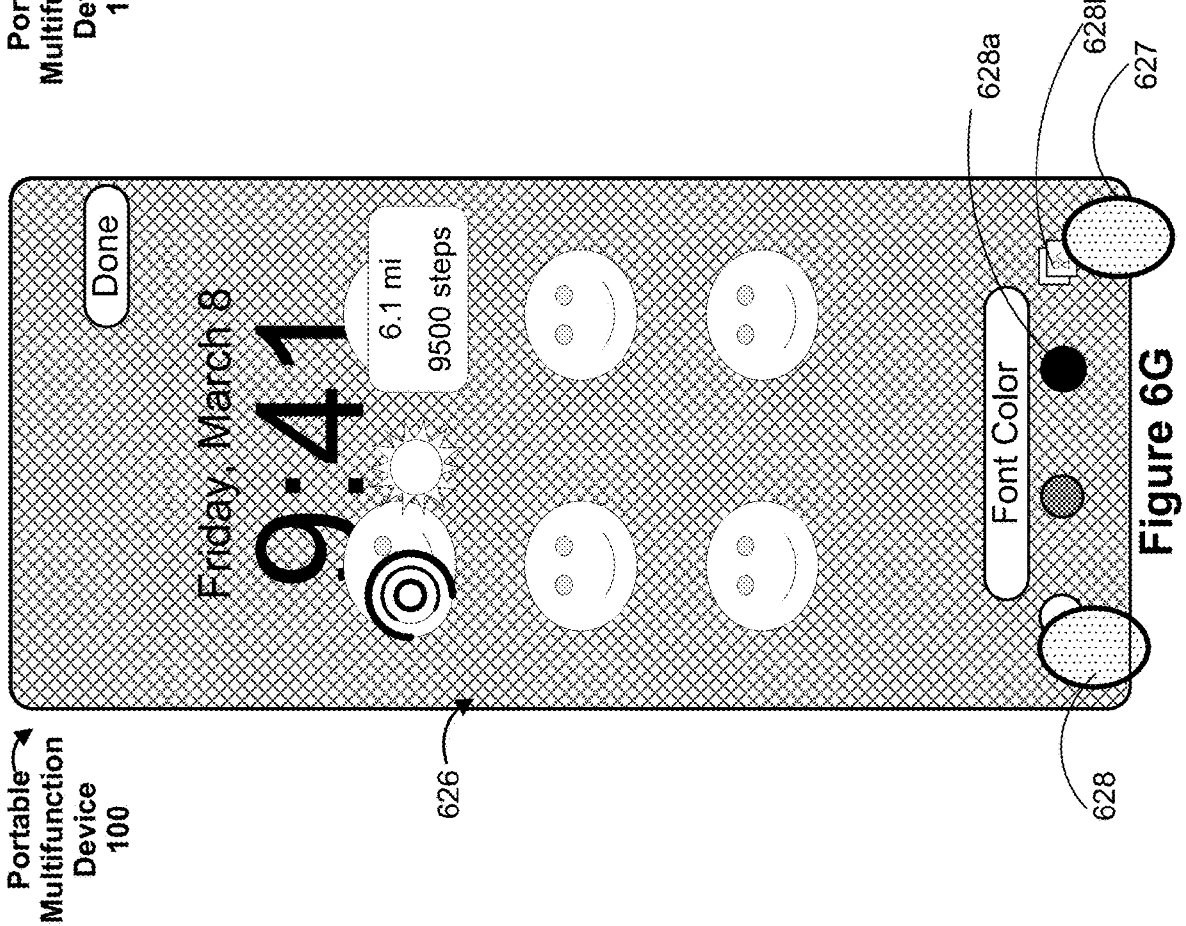
Figure 6J:
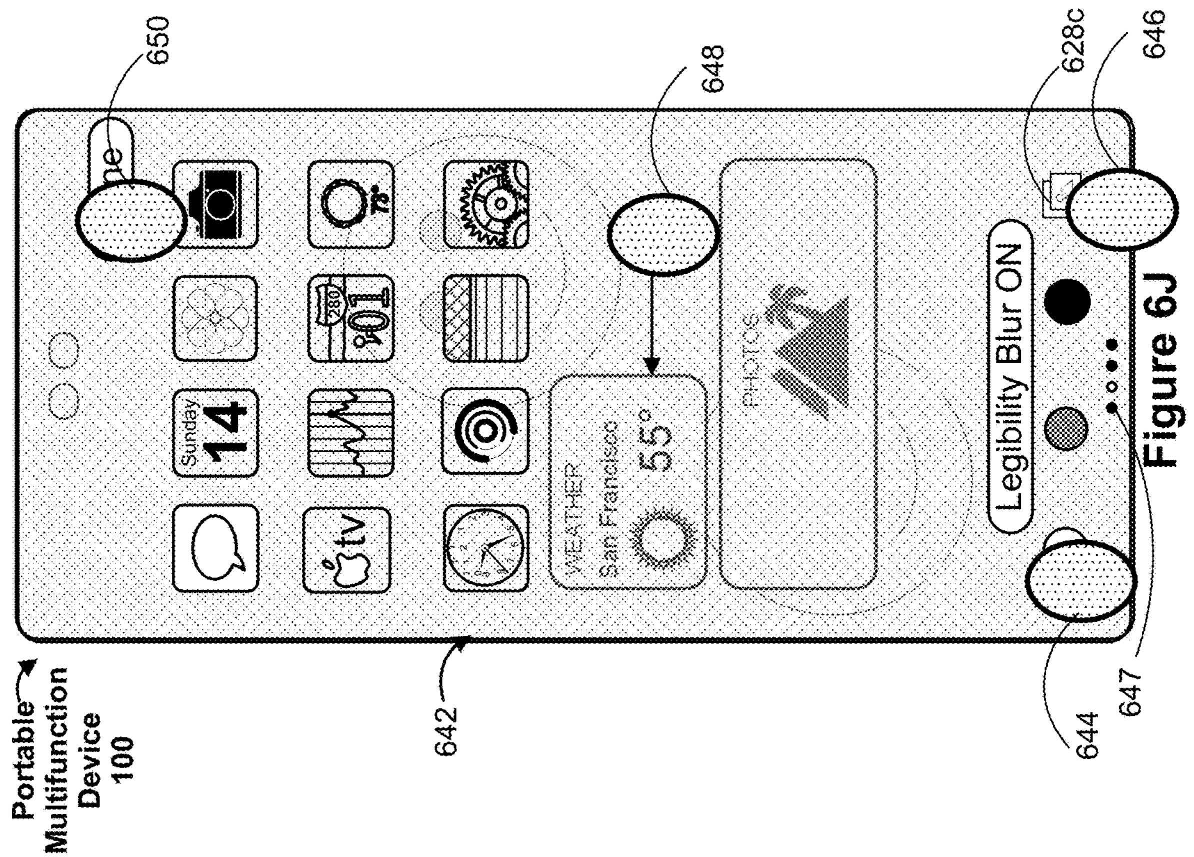

In some embodiments, one or more wake screen user interfaces in the set of wake screen user interfaces are associated with a respective type, or theme, of wake screen user interface. For example, a respective wake screen user interface is identified as a photo-style, an emoji-style, a portrait-style, or another style that is optionally pre-generated. For example, the device 100 optionally generates one or more themes, or styles, for wake screen user interfaces, such as a smart album that rotates through images and/or photos stored on device 100, a weather-style that includes a representation of a weather forecast at a current location of device 100, an astronomy, globe, or other celestial body style, and/or a style that represents a lifestyle or other event (e.g., Pride, Women's History Month, or other event). Examples of wake user interfaces that have a theme, or style, and that are generated automatically by device 100, optionally without user input, are illustrated in FIG. 6K.

In some embodiments, user input 612, such as a swipe gesture (e.g., upward or downward) causes the device 100 to provide the user with an option to delete the centered wake screen user interface 615. For example, as illustrated in FIG. 6E, the device 100 displays a delete icon 616. In some embodiments, in response to the user input 612 continuing (e.g., the swipe gesture continues in a same direction), the device 100 optionally displays the representation of the wake screen user interface 615 sliding off the display and removes the wake screen user interface 600 from the set of wake screen user interfaces. In some embodiments, a second user input 618 (e.g., a tap input or other selection input) selects the delete icon 616, and in response to user input 618, the device 100 removes the wake screen user interface 600 from the set of wake screen user interfaces and ceases display of the representation of the wake screen user interface 615.

FIG. 6F illustrates the representation of the second wake screen user interface 611 centered on the display (e.g., in response to user input 614). In some embodiments, while representation of second wake screen user interface 611 is centered on the display, a portion, less than all, of a representation 620 of an associated home screen user interface is optionally displayed as partially occluded behind the representation of second wake screen user interface 611. In some embodiments, representation of the second wake screen user interface 611 is concurrently displayed with a portion, less than all, of two or more other representations of wake screen user interfaces, for example representation 615 of a wake screen user interface on the left and representation 613 of a wake screen user interface on the right.

FIG. 6F illustrates a plurality of user inputs that enable the user to interact with the expanded face switcher user interface 606. For example, in response to user input 608-1 on the "+" button, the device 100 initiates a process for adding (optionally including designing and/or editing) a new wake screen user interface to be added to the set of wake screen user interfaces, as illustrated in FIG. 6K. In some embodiments, in response to user input 610-1 (e.g., a tap input or other selection input), the device brings the representation 613 of a wake screen user interface to the center of the expanded face switcher user interface. In some embodiments, user input 610-1 corresponds to a swipe input that causes the device 100 to scroll through the available representations of wake screen user interfaces that are in the set of wake screen user interface.

In some embodiments, in response to user input 622 selecting the "Customize" button, the device 100 displays the editing user interface 626 (FIGS. 6G-6H) for the representation of the wake screen that is currently in the center of the expanded face switcher user interface 606 when the user input 622 is detected.

Figure 6I:
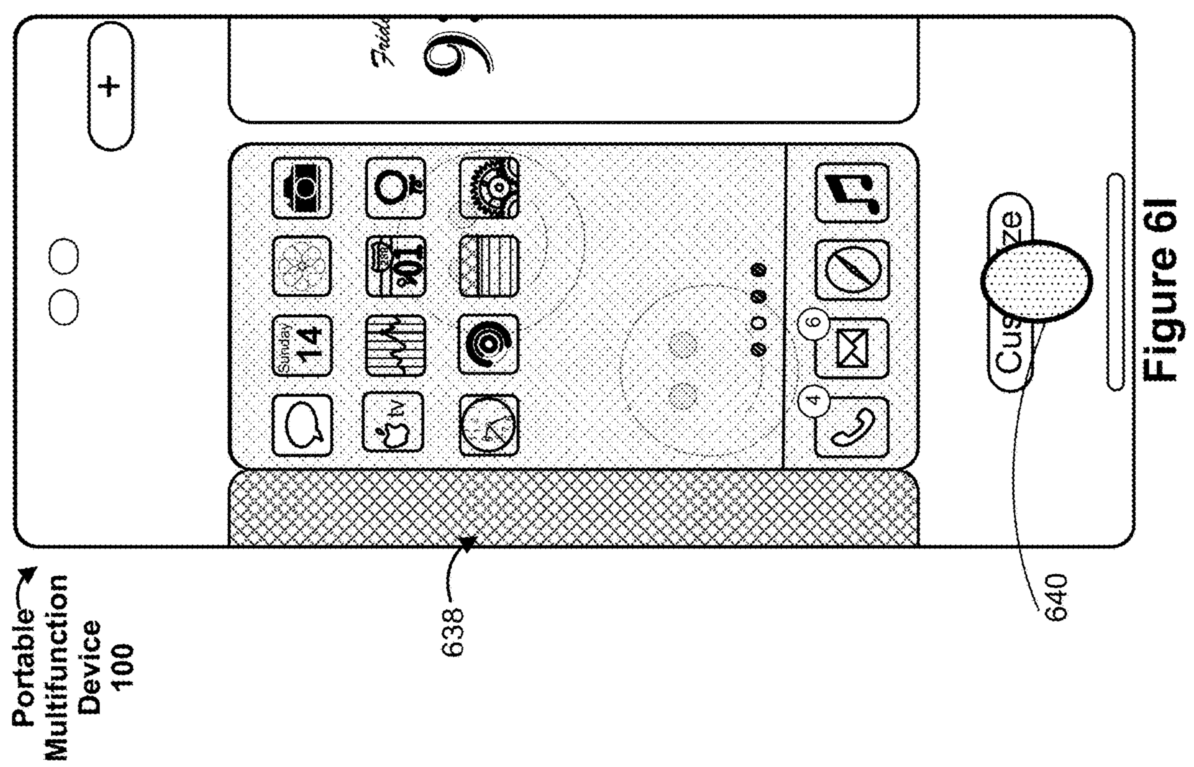

In some embodiments, in response to user input 624 selecting the representation 620 of the home screen user interface, the expanded face switcher user interface displays the representation of the home screen user interface in a center region of the user interface 638, as illustrated in FIG. 6I.

FIGS. 6G-6H illustrate an editing user interface 626 for a wake screen user interface corresponding to representation 611 of a wake screen user interface. In some embodiments, editing user interface 626 is optionally enabled with one or more of the same functionalities described with respect to editing user interface 565 (FIG. 5X). In some embodiments, editing user interface 626 includes user-selectable options for changing a font color of the user interface. In some embodiments, editing user interface 626 includes a user-selectable option for applying a visual filter (e.g., applying a color filter, a blur, a transparency filter and/or a gradient filter) to the wake screen user interface. In some embodiments, in response to user input 628 selecting a first color, a font color of the date and/or time indication is updated to the selected first color, as illustrated in FIG. 6H, where the date and/or time indication is displayed with a white font color. In some embodiments, in response a user input 628 and/or in response to a user input on the "Font Color" button in FIG. 6G, a user interface element 630, as illustrated in FIG. 6H is displayed.

In some embodiments, the background of the wake screen user interface is an emoji-style background (e.g., a smiley face emoji), in which one or more emojis are arranged in a pattern (e.g., a geometric pattern). In some embodiments, different views of the emoji user interface include changing a size and/or arrangement (e.g., pattern) of the emojis in the background of the wake screen user interface. In some embodiments, an option 628*b* for selecting additional and/or alternative emojis (e.g., using an emoji picker) is displayed in editing user interface 626. For example, the device displays a number of slots for chosen emojis to allow the user to select from the emoji keyboard 629 up to a threshold number of emojis (e.g., 3 or 4 emojis), and the device displays the selected emojis in a predefined pattern (e.g., a grid pattern, a swirl pattern, or another pattern) in the background of the wake screen user interface.

In some embodiments, user input 627 is detected as selecting option 628*b* to select an emoji, and in response to user input 627, an emoji keyboard 629 is displayed in the editing user interface 626, as illustrated in FIG. 6H2. In some embodiments, emoji keyboard 629 includes a user interface element that displays the currently selected emoji that are used in the pattern. For example, in FIG. 6H2, a smiley face emoji is selected, and the grid pattern includes the smiley face emoji. In some embodiments, while displaying the editing user interface 626 with the emoji-style background, the device 100 detects a user input 631-1, such as a swipe input in a first direction (e.g., from right to left). In some embodiments, in response to user input 631-1, the device 100 updates the editing user interface 626 to display the emoji-style background with a different pattern (and, optionally, with the same emoji(s) arranged in a different pattern). For example, the emoji are arranged in a first pattern (e.g., a grid pattern) in FIG. 6H2 and are arranged in a second pattern (e.g., a swirl pattern) in FIG. 6H3.

FIG. 6H3 illustrates a user input 633-1 selecting a first emoji (e.g., a thumbs-up emoji) and a user input 633-2 selecting a second emoji (e.g., a heart emoji). In some embodiments, in response to user input(s) 633-1 and/or 633-2, the emoji displayed in the background are updated in accordance with the user selection. In some embodiments, an order in which the emoji are selected is the order the emoji are shown (e.g., and alternated in the pattern of the background). For example, in FIG. 6H4, the thumbs-up emoji and the heart emoji are added after the smiley face emoji, and the pattern displays the selected emoji in an alternated manner. For example, the swirl pattern in FIG. 6H4 includes the smiley face emoji, the thumbs-up emoji, and the heart emoji. In some embodiments, the device sets an upper limit on the number of emojis that a user is allowed to select (e.g., 3 emoji, 5 emoji, or 10 emoji) to include in a same background, e.g., by showing the threshold number of input slots at the top of the emoji keyboard 629. Even though only a small fixed number of emoji's are shown as selected in this example, in some embodiments, different numbers of distinct emojis are optionally selected by the user to generate the emoji pattern of the wake screen user interface, and/or a large variety of different patterns is made available for user selection to arrange the selected emojis in the background of the wake screen user interface. In some embodiments, the set of emoji patterns made available for user selection is automatically updated in response to and in accordance with the set of emojis that have been selected by the user for inclusion in the background of the wake screen user interface. For example, the device optionally displays a first set of available patterns when a first set of emojis have been selected by the user, and the device optionally displays a second set of available patterns different from the first set of available patterns when a second set of emojis have been selected by the user. In some embodiments, in response to one or more inputs directed to the emoji keyboard (e.g., swipe inputs, and/or a tap input on a category symbol for a category of emojis), the device scrolls or replaces the emojis currently displayed in the emoji keyboard 629 to show additional emojis that are available for selection.

In some embodiments, in response to user input 631-2 (e.g., a swipe input), the device 100 updates the background to display a third pattern that is distinct from the first pattern (e.g., grid pattern) and second pattern (e.g., swirl pattern). For example, as illustrated in FIG. 6H5, the selected emoji, including the smiley face emoji, the thumbs-up emoji, and the heart emoji, are arranged in a geometric pattern that includes diagonal arrangement of the emojis.

FIG. 6H displays user interface element 630 for viewing and/or selecting a font color. In some embodiments, user interface element 630 includes additional options than the color options displayed in user interface 626 in FIG. 6G. In some embodiments, the device selects and/or changes a font color for the system generated text (e.g., the date and time elements) in response to detecting the user selecting a color sample in the list of color samples displayed in user interface element 630. For example, in response to user input 632, the device 100 updates the color to the color of the sample color selected by user input 632, and in response to user input 634, the device 100 updates the color of the font to the sample color selected by user input 634. In some embodiments, in response to user input on a "Done" button 636, the device 100 exits the editing user interface 626 and optionally returns to the expanded face switcher user interface 606, or displays the wake screen user interface (e.g., with the edited wake screen user interface as the current wake screen user interface). FIG. 6H6 illustrates that, in response to a user input selecting the Done affordance, device 100 displays respective user-selectable options to also use the newly edited background of the wake screen user interface as a background a home screen user interface associated with the wake screen user interface (e.g., "Use as Home Screen") or to customize the home screen user interface (e.g., to modify one or more aspects of the home screen user interface and/or use a distinct background for the home screen user interface from the wake screen user interface). For example, in response to user input 635-1 selecting a first affordance to use the newly edited background of the wake screen user interface as the background of the home screen user interface, device 100 sets the emoji user interface that includes the smiley face emoji, thumbs up emoji, and heart emoji arranged in the pattern illustrated in FIG. 6H5 as the background for the home screen user interface and displays representations of a plurality of applications overlaying the background of the home screen user interface. After setting the wake screen and home screen backgrounds, the device displays the wake screen user interface and the home screen user interface respectively with the same sets of selected emojis arranged in the same or substantially similar patterns in their backgrounds. In some embodiments, in response to user input 635-1, the device 100 exits the editing user interface(s) and displays a home screen user interface and/or a wake screen user interface with the newly edited background. In some embodiments, in response to user input 635-2 selecting a second affordance to customize the home screen user interface (e.g., "Customize the Home Screen"), the device 100 does not use the newly edited background of the currently selected wake screen user interface as the background of the home screen user interface associated with this wake screen user interface right away; instead the device provides an opportunity for the user to further customize one or more aspects of the home screen user interface, including but not limited to the background of the home screen user interface. In some embodiments, in response to a user request to customize the home screen user interface, the device 100 displays an editing user interface for the home screen user interface (e.g., analogous to the editing user interface 642 illustrated in FIG. 6J) for the user to customize the home screen user interface (e.g., without first navigating to the user interface 638 in FIG. 6I, and without requiring the user to select "Customize" button in user interface 638). In some embodiments, the editing user interface for the home screen user interface is initially displayed having the properties of the newly edited background of the currently selected wake screen user interface (e.g., having the same set of selected emojis, and/or having the same or substantially the same emoji pattern as the background of the wake screen user interface), such that the customization of the home screen user interface uses the newly edited background of the wake screen user interface as a starting point. In some embodiments, the device provides one or more selectable options for editing one or more aspects of the background of the home screen user interface, such as the background media item, filters, emoji patterns, selected emojis, colors, font colors, fonts, legibility blur of the background of the home screen user interface. In some embodiments, the editing user interface 642 of the home screen user interface optionally changes the visual properties of the application icons and/or widgets (e.g., making them more translucent, dimmed, and/or less saturated) to indicate that the editing user interface does not support selection and arrangement of the application icons and/or widgets on the home screen user interface. In some embodiments, representations of application icons and/or widgets are displayed in the editing user interface 642 in lieu of the application icons and widgets actually present in the home screen user interface.

FIG. 6I illustrates the representation of the home screen user interface in a center region of the expanded face switcher user interface 638 (e.g., in response to user input 624). In some embodiments, the device initiates a process to edit, or customize the home screen user interface in response to a user input selecting, via user input 640, the "Customize" button in FIG. 6I.

FIG. 6J illustrates editing user interface 642 for editing the home screen user interface. In some embodiments, user input 644 selects an option to change a color and/or a gradient of a background of the home screen user interface. In some embodiments, in response to user input 646 selecting a photo picker 628*c*, a user interface 668 (FIG. 6N) is displayed, wherein the device change a photo to include in the home screen user interface in response to a user input selecting the photo from the user interface 668. In some embodiments, the editing user interface 642 illustrated in FIG. 6J is displayed in response to a user's request to further edit the home screen user interface after selecting the Done affordance in the editing user interface for customizing the wake screen user interface (e.g., in response to user input 635-2 selecting the Customize the Home Screen affordance, as described with reference to FIG. 6H6). In some embodiments, the editing user interface 642 includes the newly edited background of the wake screen user interface if the editing user interface 642 was displayed in response to an input selecting the "Customize the Home Screen Affordance" after the end of the wake screen editing process. In some embodiments, the editing user interface 642 includes a default background that corresponds to a background of the currently selected wake screen user interface in the user interface 638, if the editing user interface 642 was displayed in response to an input selecting the "Customize" affordance in the user interface 638. In some embodiments, one or more of the application icons and/or widgets displayed in the home screen user interface that is being edited in FIG. 6J are replaced with translucent objects, optionally that do not include indications of applications associated with the objects. In some embodiments, the application icons and/or widgets are optionally displayed in a default arrangement (e.g., the application icons and/or widgets optionally do not correspond to an arrangement of the home screen user interface that is currently set for the device 100). In some embodiments, the application icons and/or widgets are replaced with translucent shapes that correspond to the shapes of icons and/or widgets but maintain a same arrangement (e.g., in size and/or position) as the arrangement of application icons and/or widgets in the home screen user interface that is currently set for the device 100.

In some embodiments, in the editing user interface 642, the device toggles "legibility blur" on and/or off in response to user inputs (e.g., tap inputs) directed to the legibility blur toggle control shown in the editing user interface 642. In some embodiments, legibility blur, when activated, provides a visual deemphasis (e.g., a blurred effect) on the background, such that text, for example textual labels that are optionally displayed with the icons for applications, are more easily read (e.g., legible) when displayed on top of the background.

In some embodiments, the editing user interface 642 includes an indication 647 that additional views of the home screen user interface are available. For example, the additional views correspond to one or more different visual effects applied to the background, including changing a color, a tone, or changing another visual effect of the background. In some embodiments, the additional views include one or more different patterns, or arrangements, of the background of the home screen user interface. For example, the smiley face emoji are rearranged in a different pattern and/or displayed at a different size in one or more additional views. In some embodiments, user input 648 (e.g., a swipe input or other gesture) corresponds to a request to change the currently displayed view of the home screen user interface, and in response to user input 648, the device 100 displays a different view (e.g., changes the background) of the home screen user interface.

In some embodiments, in response to user input 650 selecting the "Done" button, the device 100 exits out of the editing user interface 642 for the home screen user interface.

FIG. 6K illustrates a user interface 652 for creating a new wake screen user interface (also referred to herein as a face) to add to the set of wake screen user interfaces. In some embodiments, user interface 652 includes a plurality of options for creating a new face that is based on a portrait (e.g., a photo that includes a main subject or individual), based on a photo (optionally selected from a photos library stored on device 100), and/or based on one or more emoji (optionally up to a threshold number of emoji may be included in the face). In some embodiments, in response to user input 656 selecting to create a new face based on a photo, the device 100 displays a photo picker user interface 668 (FIG. 6N), for the user to select a photo to be used as the background of the new face, and enables the user to, after selecting the photo, modify other features of the face, including font features.

In some embodiments, user interface 652 includes one or more "Featured Faces" that correspond to wake screen user interfaces that have been automatically generated (e.g., by device 100), without user input. For example, the Featured Faces optionally includes a "Smart Album" that identifies a plurality of images (e.g., photos) to include in the wake screen user interface, and optionally rotates through the plurality of images while the "Smart Album" face is selected as the wake screen user interface. In some embodiments, the device 100 enables the user to select a subset of individuals, pets, locations, and/or photo albums to include in a "Smart Album" wake screen user interface. In some embodiments, the device 100 provides the user (e.g., in an editing user interface) an option to set a frequency of changing between respective photos in the "Smart Album" to be used as the current wake screen user interface. In some embodiments, in response to user input 6002 selecting the "Smart Album" face, device 100 displays user interface 6004 (FIG. 6U) for the user to select and/or deselect categories to include in the Smart Album and optionally to set a frequency of changing between the photos.

In some embodiments, the Featured Faces includes an emoji user interface, which includes a preselected emoji and/or pattern of emoji. In some embodiments, the Featured Faces includes a weather user interface that creates a visual effect that corresponds to a current weather forecast, a globe user interface that includes an image of a glob, an astronomy user interface that includes one or more celestial bodies, and/or a Pride user interface that includes a symbol representing Pride. In some embodiments, each of the automatically generated user interfaces optionally includes a set of complications that are automatically selected and included in the respective wake screen user interface.

Figure 6L:
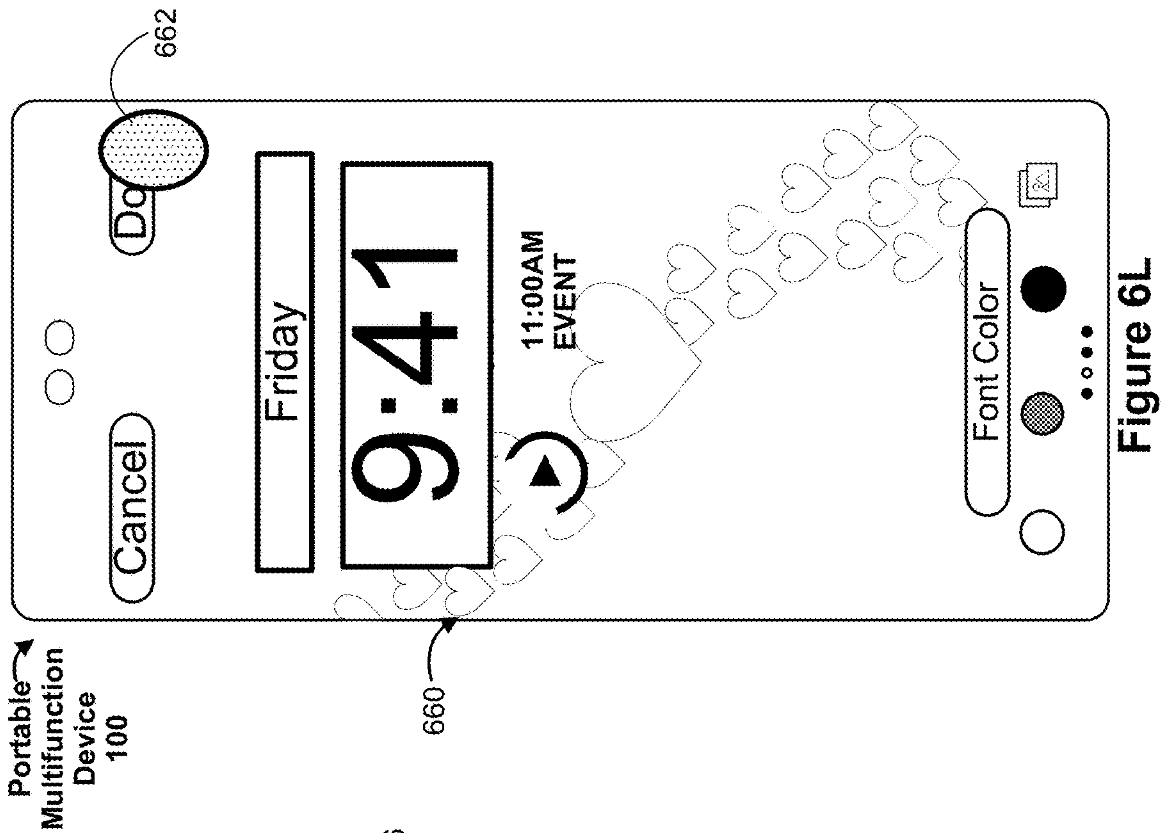
Figure 6K:
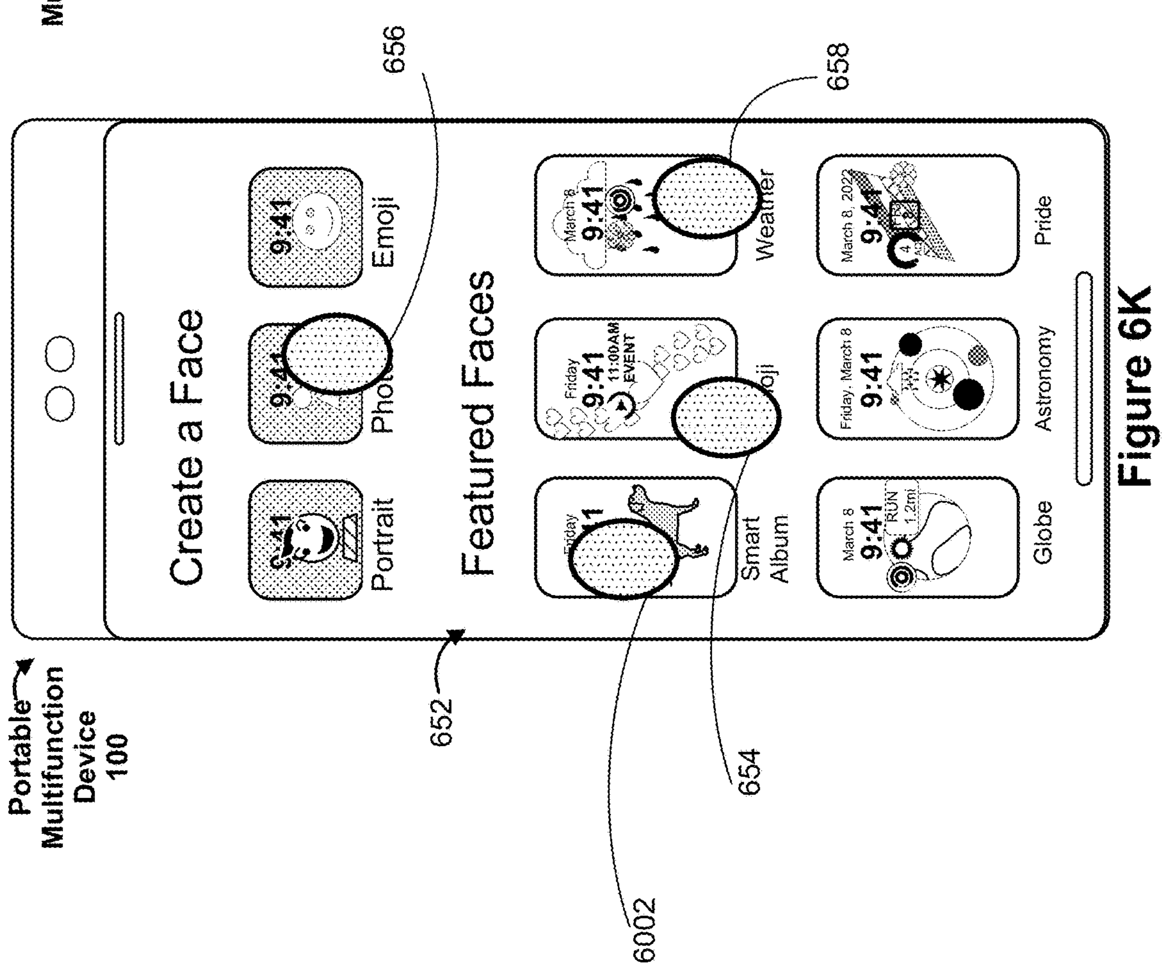

For example, in response to user input 654 selecting the emoji user interface, the device 100 displays an editing user interface 660 for editing the emoji user interface having the set of properties generated by device 100, as illustrated in FIG. 6L. For example, the complications, date indication, and font properties of the time and date are selected by the device 100 without user input. In some embodiments, the device provides one or more selectable options that allow the user to edit the emoji user interface by change one or more of the properties in the set of properties (e.g., in manners as described with respect to FIGS. 6G-6H5). In some embodiments, the device provides one or more selectable options to change the complications and/or change a font of the date and/or time indication (e.g., in manners as described with respect to FIGS. 5X-5AB and FIGS. 5AC-5AH). In some embodiments, in response to user input 662 selecting the "Done" button, the device 100 ceases display of the editing user interface and displays the emoji user interface as the current wake screen user interface, and optionally adds the emoji user interface to the set of wake screen user interfaces.

In some embodiments, in response to user input 658 (FIG. 6K) selecting the weather user interface, the device 100 displays an editing user interface 664 for editing the weather user interface. In some embodiments, the weather user interface is initially displayed with the set of properties as generated by device 100, and the device provides one or more selectable options to edit the weather user interface to change one or more properties in the set of properties (e.g., in manners as described with respect to FIGS. 6G-6H5, FIGS. 5X-5AB, and FIGS. 5AC-5AH). In response to user input 666 selecting the "Done" button, the device 100 ceases display of the editing user interface and displays the weather user interface as the current wake screen user interface, and optionally adds the weather user interface to the set of wake screen user interfaces.

Figure 6N:
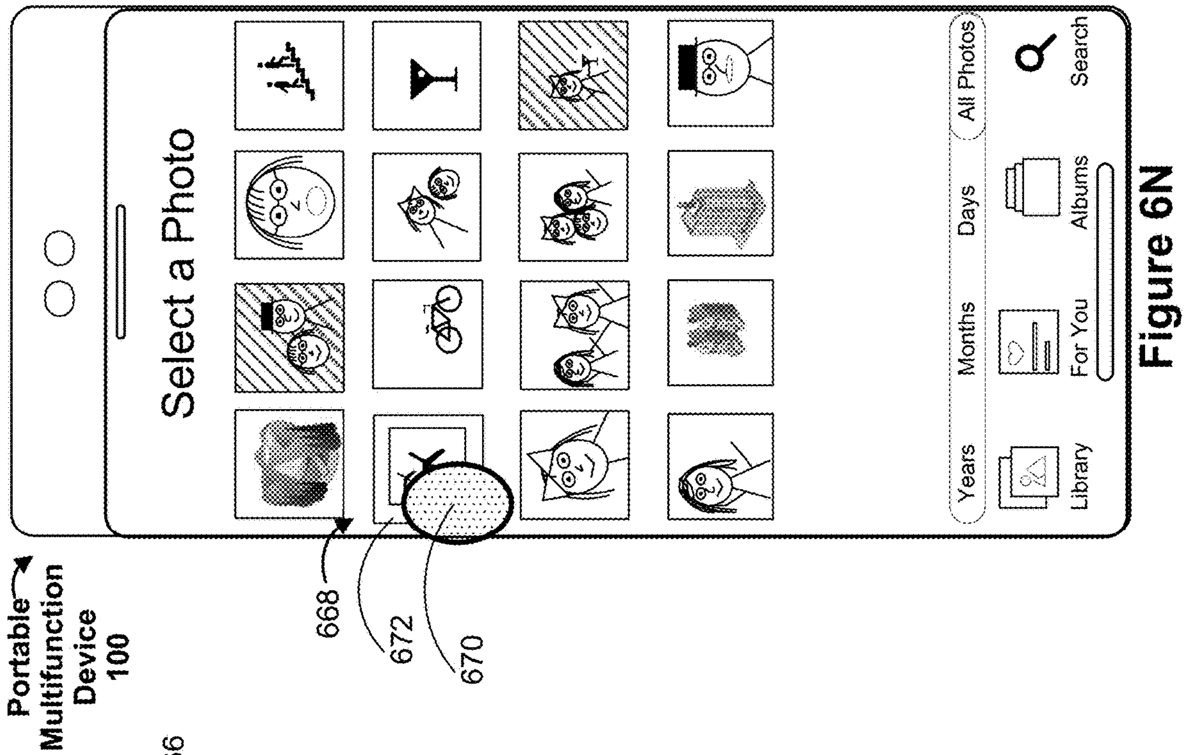

FIG. 6N illustrates photo picker user interface 668 for selecting a photo to use as a background image for the wake screen user interface. In some embodiments, in response to user input 670 selecting a photo 672, the device 100 displays user interface 674 (FIG. 6O) for viewing a preview of the photo 672 as the background of the wake screen user interface. In some embodiments, the device provides user interface elements and selectable options (e.g., in an editing user interface 678-*a* in FIG. 6O2) that allow the user to further edit, or customize, the wake screen user interface in response to detecting a user input selecting the "Customize" button via user input 676 in FIG. 6O.

In some embodiments, in response to user input 676, illustrated in FIG. 6O, the device 100 displays editing user interface 678-*a*, including displaying at least one reticle (e.g., a reticle 572 for editing one or more complications, and optionally a reticle for the time and/or date indication) behind, or at least partially occluded by, a portion of the background image, such as the subject of the background image (e.g., the airplanes). In some embodiments, in response to user input 682-*a* directed to a reticle 569 for editing the time indication, the reticles, including reticle 572, reticle 569 and reticle 568, are displayed in front of the subject of the background image, as illustrated in FIG. 6P.

Figure 6M:
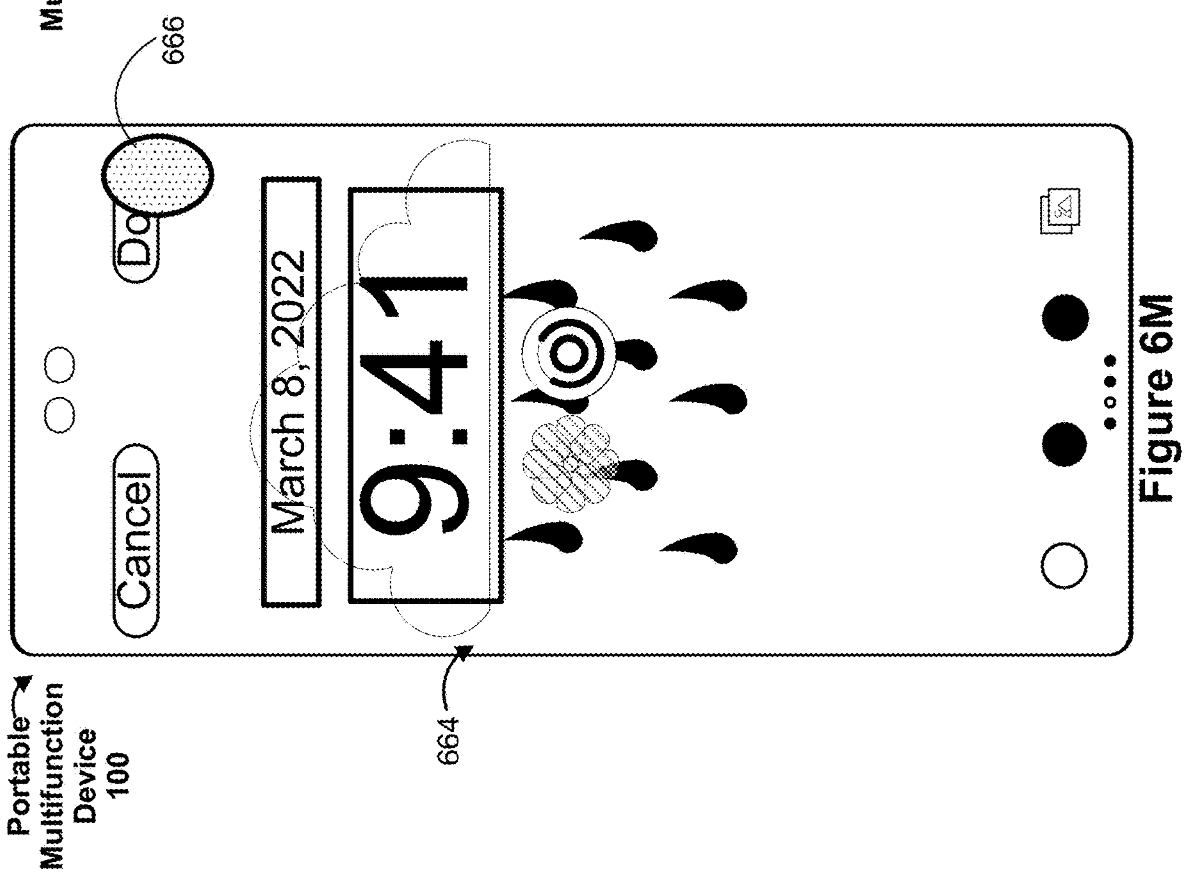
Figure 6P:
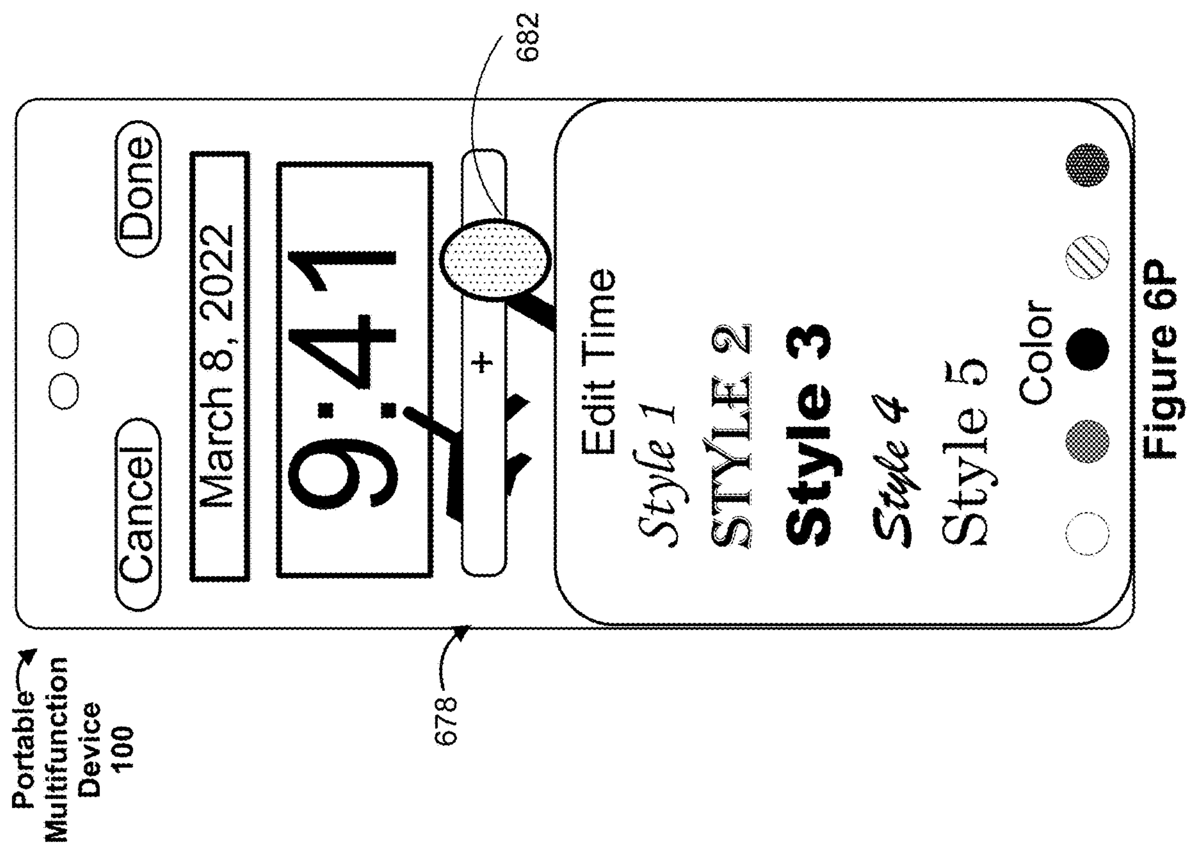
Figure 6R:
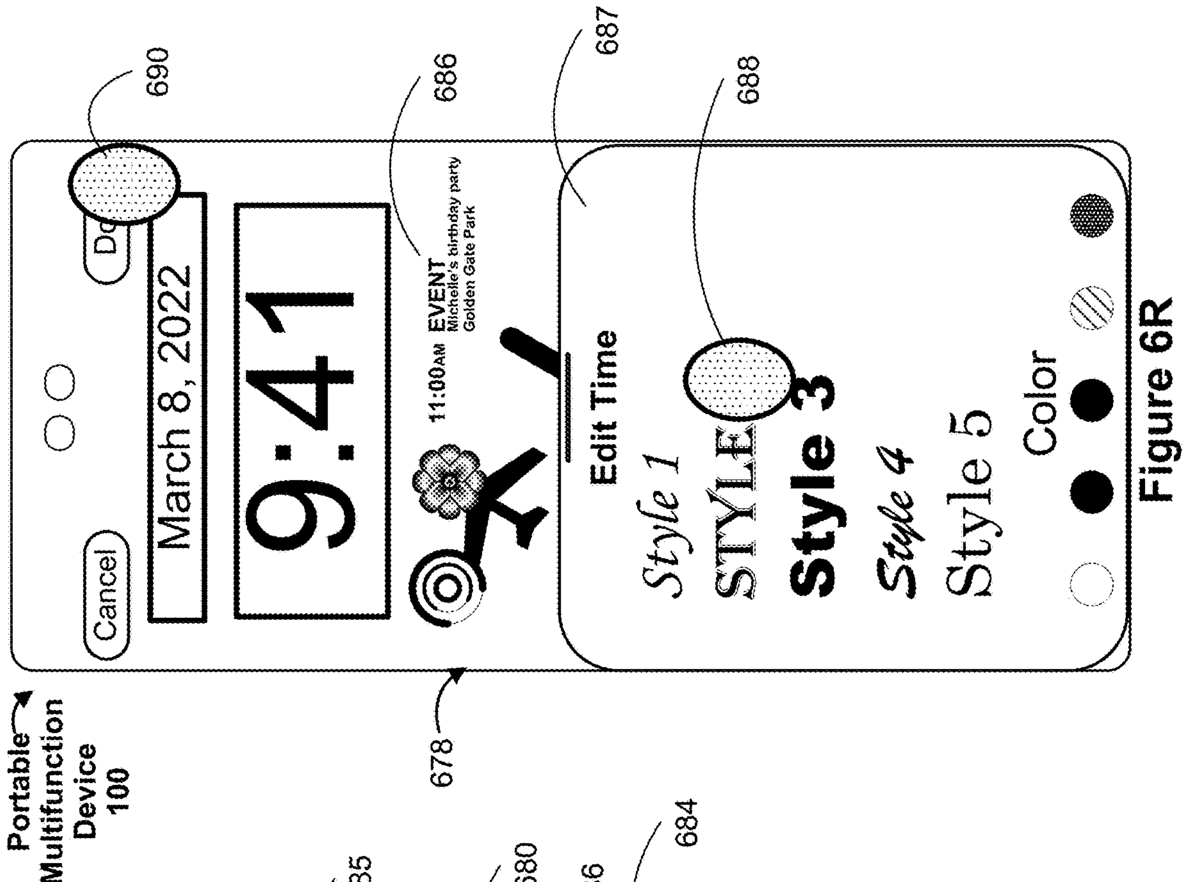
Figure 6Q:
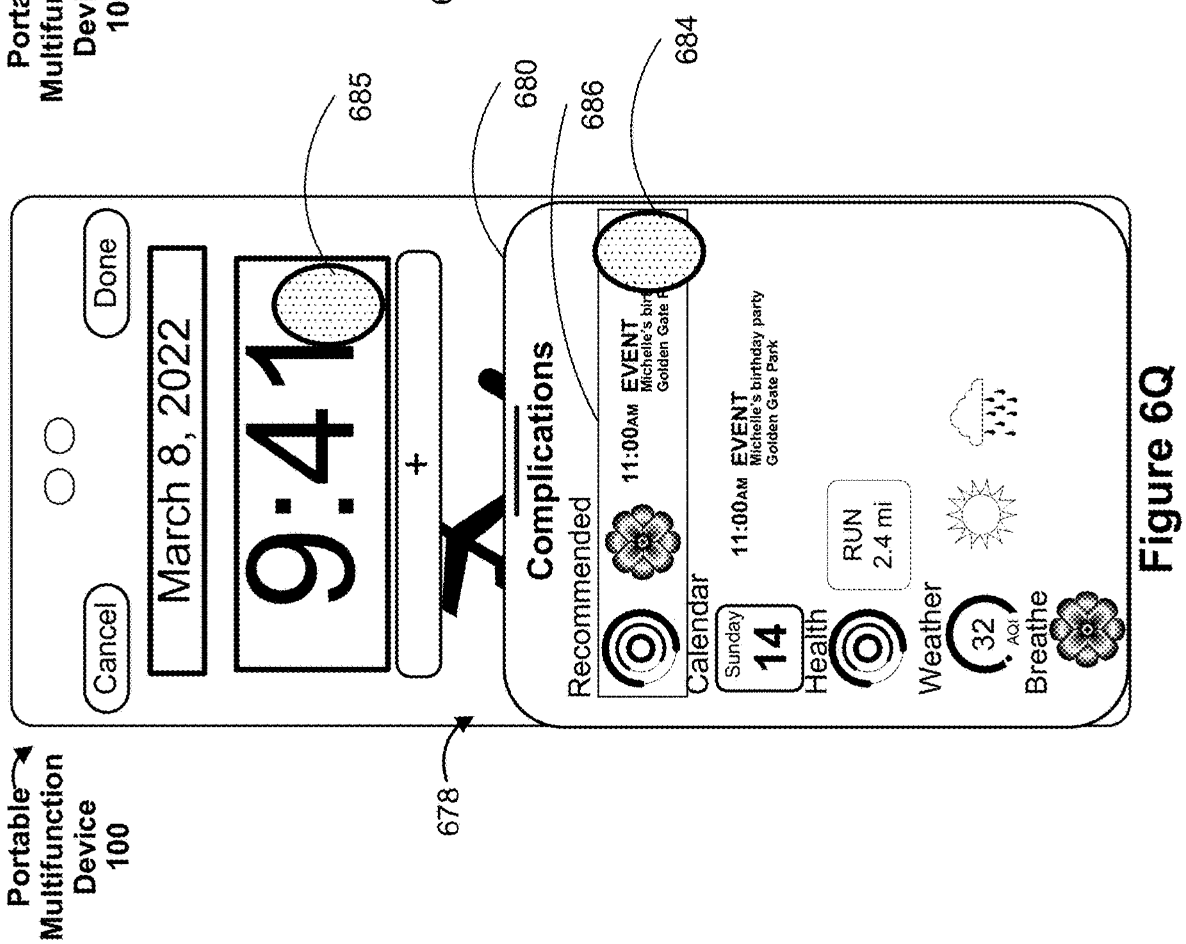

FIG. 6P illustrates editing user interface 678 for editing the wake screen user interface with the photo 672 as the background, in response to user input 676. In some embodiments, the device edits the wake screen user interface in response to a user's request to adding one or more complications to the wake screen user interface, as illustrated in FIGS. 6P-6Q. For example, in response to user input 682 selecting the plus button in editing user interface 678 in FIG. 6P, the device 100 displays user interface element 680 for adding complications as shown in FIG. 6Q.

FIG. 6Q illustrates user input 684 selecting a set of complications 686 to add to the wake screen user interface. In some embodiments, in response to user input 684, the device 100 displays the set of complications 686 under the time indication (FIG. 6R). In some embodiments, the device detects a respective user input directed to the set of recommended complications 686 displayed below the time indication and moves the set of complications 686, for example to above and/or to the side of the date and/or time indication, in response to the respective user input.

FIG. 6Q further illustrates user input 685 selecting a reticle for the time indication, and in response to user input 685, the device 100 displays user interface element 687 for modifying one or more properties (e.g., color and/or font style) of the time and/or date indication.

FIG. 6R illustrates user input 688 selecting a different style for the font of the time. In some embodiments, in response to user input 688, the device 100 updates the time and/or date indication to be displayed with "Style 2." FIG. 6R further illustrates user input 690 selecting the "Done" button, which causes the device 100 to exit the editing user interface 678, and display the user interface with the photo 672 as the background as the current user interface, and optionally adds the new user interface with photo 672 as the background to the set of wake screen user interfaces.

Figure 6S:
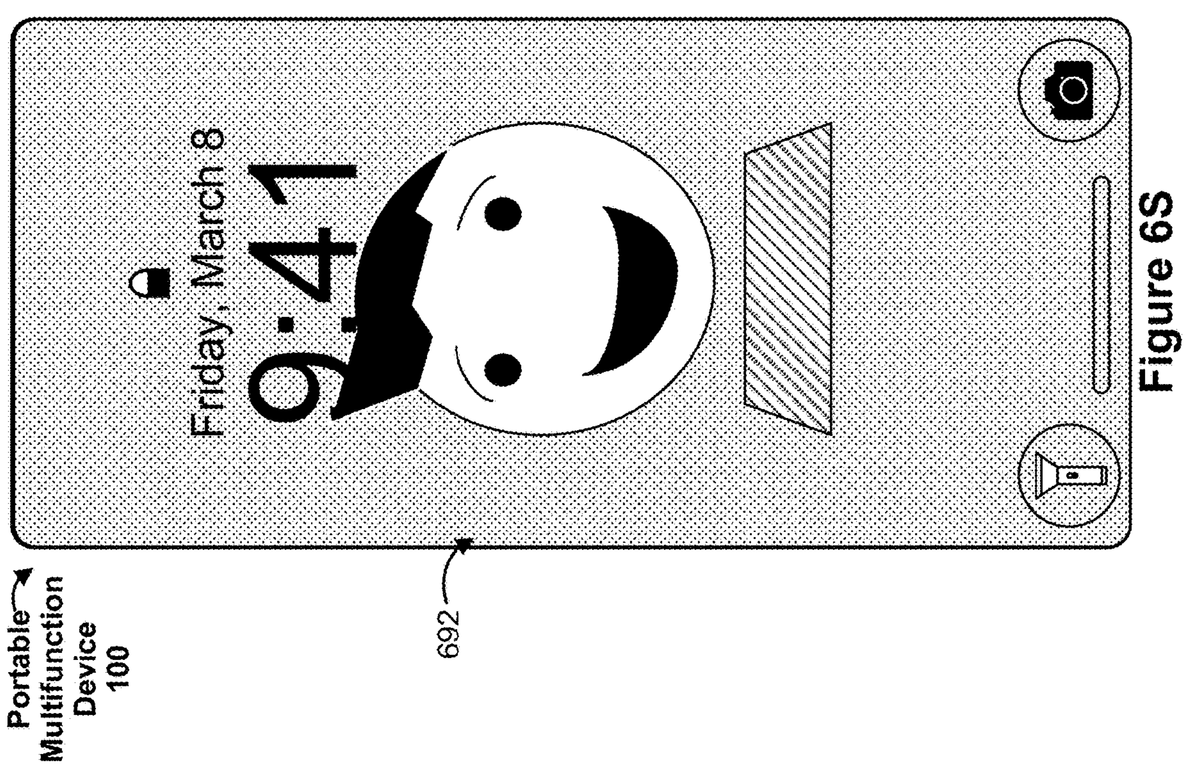
Figure 6T:
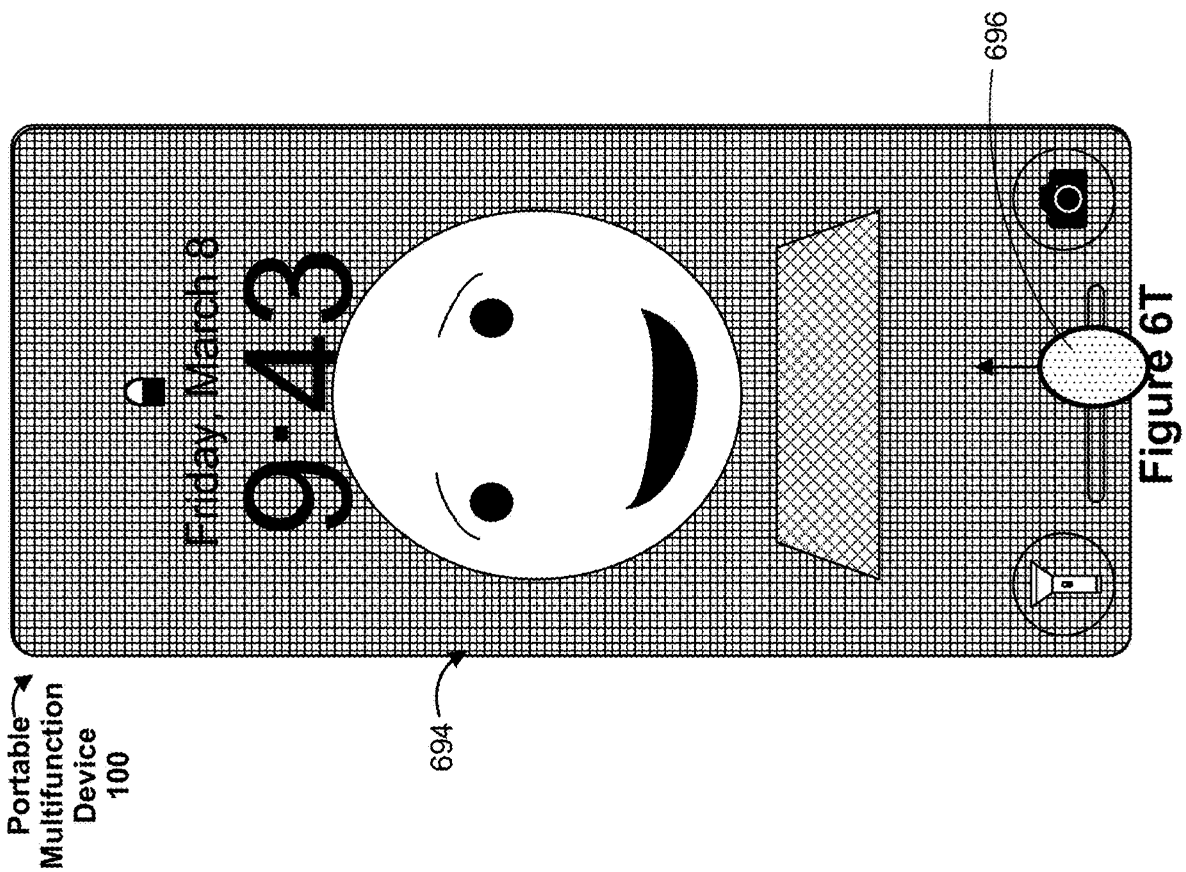

FIGS. 6S-6T illustrate examples of portrait-style wake screen user interfaces. In some embodiments, the portrait-style wake screen user interface 692 and the portrait-style wake screen user interface 694 are included in the set of wake screen user interfaces that device 100 automatically cycles through over time. For example, in some embodiments, the device 100 automatically changes the wake screen user interface from a first wake screen user interface to a second wake screen user interface from the set of wake screen user interfaces, optionally without detecting user input. In some embodiments, the device 100 automatically changes the wake screen user interface periodically (e.g., every 5 minutes, every day, every week). In some embodiments, the device 100 automatically changes the wake screen user interfaces in accordance with a determination that the device 100 has entered a locked state and/or a low-power state. For example, upon bringing the device 100 out of a low-power state, the wake screen user interface is updated to a next wake screen user interface in the set of wake screen user interfaces. FIG. 6T illustrates user input 696 requesting to dismiss the wake screen user interface 694, and, in response to user input 696, the device 100 displays a home screen user interface that is related to (or otherwise associated with) the wake screen user interface 694.

Figure 6V:
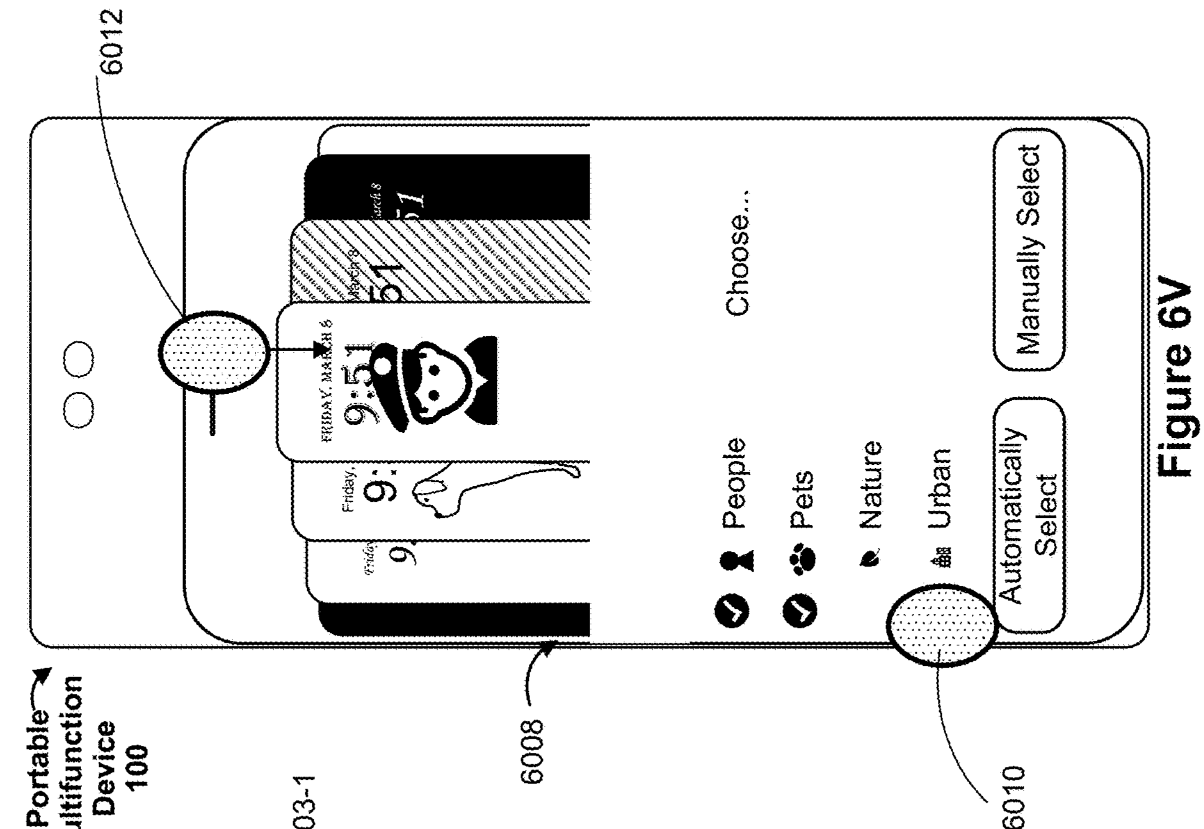
Figure 6U:
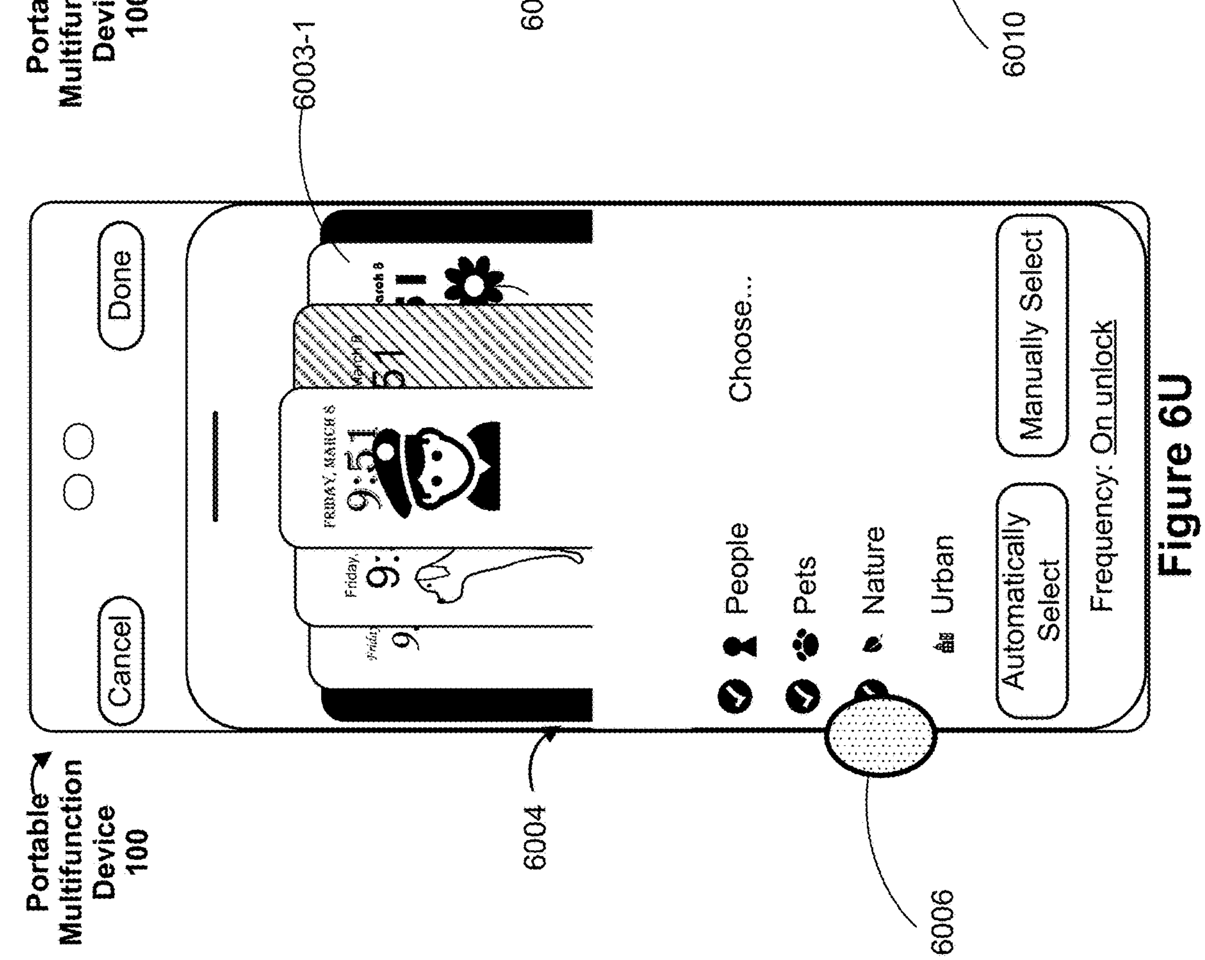

FIG. 6U illustrates a user interface 6004 for selecting one or more categories for photos to be included in a Smart Album, and an option for selecting a frequency for changing the background while a Smart Album is selected as the background of the wake screen user interface. In some embodiments, the Smart Album identifies a set of images, or photos, optionally that are stored on device 100 or otherwise associated with the user of device 100, and periodically rotates through the images as the wake screen user interface. In some embodiments, the visual properties (e.g., complications and textual indications of time and/or date) are also changed as the image changes from one wake screen user interface to another wake screen user interface. In some embodiments, the frequency of how often the images are refreshed, or rotated, is selected by the user.

In some embodiments, user interface 6004 provides an option to select, or deselect, one or more categories of photos, including a people category (e.g., corresponding to media items with a person or optionally a person's face as prominent subject(s)), a pets category (e.g., corresponding to media items with one or more animals or specific types of animals such as cats and dogs as prominent subject(s)), a nature category (e.g., corresponding to media items with one or more items found in nature as prominent subject(s)), and/or an urban category (e.g., corresponding to media items with one or more items found in an urban setting as prominent subject(s)). In some embodiments, photos are determined as belonging to a respective category based on the content of the photo, which is optionally automatically identified by device 100 without a user manually tagging the photo with a category.

In some embodiments, the user interface 6004 includes representations of wake screen user interfaces that are included in the Smart Album, including representation 6003-1. In some embodiments, the device displays selectable representations that corresponds to different categories of background media items, and the device updates a select/unselected state of a respective selectable representation in accordance with a user input directed to the respective representation. For example in FIG. 6U, user input 6006 selects the check mark to unselect the category of "Nature." In some embodiments, in accordance with a determination that the category "Nature" is deselected, the Smart Album does not include photos that have been identified as having content related to nature (e.g., trees, flowers, sunsets, or other landscapes). In some embodiments, the categories that are currently selected are indicated by a check mark next to the category.

In some embodiments, in response to the user deselecting the "Nature" category, the representation 6003-1 that includes a flower image is no longer included in the Smart Album, and device 100 optionally ceases to display the representation 6003-1, as illustrated in user interface 6008 in FIG. 6V. In some embodiments, the device detects and/or processes media items such as photos and videos stored in a user's media library and/or online account to determine whether they should be included in the "Nature" category. In some embodiments, the device detects and/or processes icons and/or stock images (e.g., stored on the device or online) in addition to media items stored in the user's media library and/or online account.

In some embodiments, as illustrated in FIG. 6V, the device includes one or more categories in the set of user-selected categories in accordance with user input 6010 directed to one or more currently unselected categories, such as the category "Urban". In some embodiments, in response to the user input 6010, the device 100 displays a representation 6003-2 of a wake screen user interface that is included in the urban category (e.g., an image that includes a house or building). In some embodiments, while the urban category is selected, images, or photos, that include content related to a city (e.g., skyscrapers, buildings, skyline views, cityscapes, billboards, or other urban images).

In some embodiments, the device ceases to display the user interface 6008 in response to detecting user input 6012 (e.g., a swipe down in FIG. 6V) that corresponds to a request to close, or otherwise cease display of, the category selection for the Smart Album. In some embodiments, in response to user input 6012, the device 100 returns to the user interface displayed in FIG. 6K.

Figure 6W:
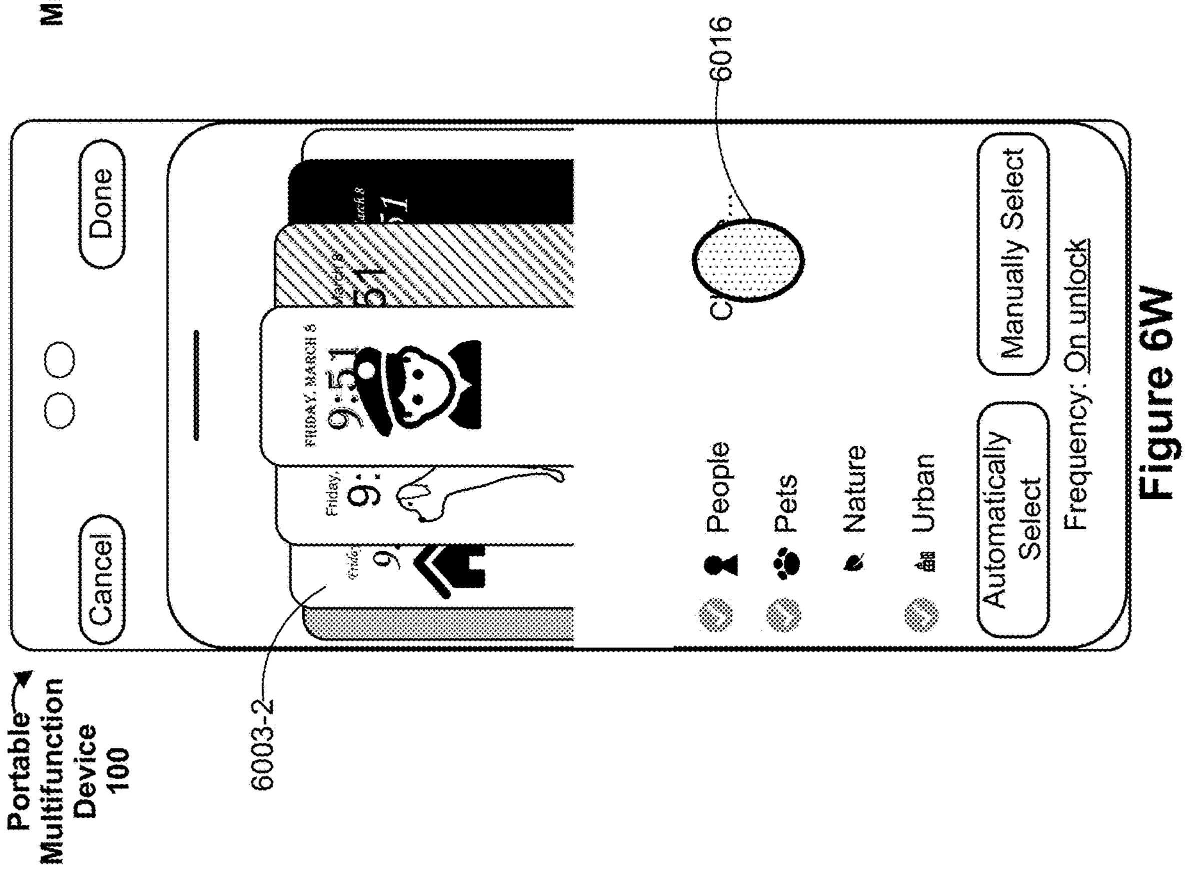

FIG. 6W illustrates user input 6016 selecting a "Choose . . . " option that enables the user to select which people to include in the Smart Album. For example, in response to user input 6016, the device 100 displays a user interface 6018 (FIG. 6X) for selecting one or more people to include in the Smart Album. In some embodiments, the one or more people displayed in user interface 6018 are automatically selected based on a media library of device 100 (e.g., a private or personal media library associated with a user of the device, including photos and/or videos taken by the user (e.g., with the device or another device different from the device)).

Figure 6X:
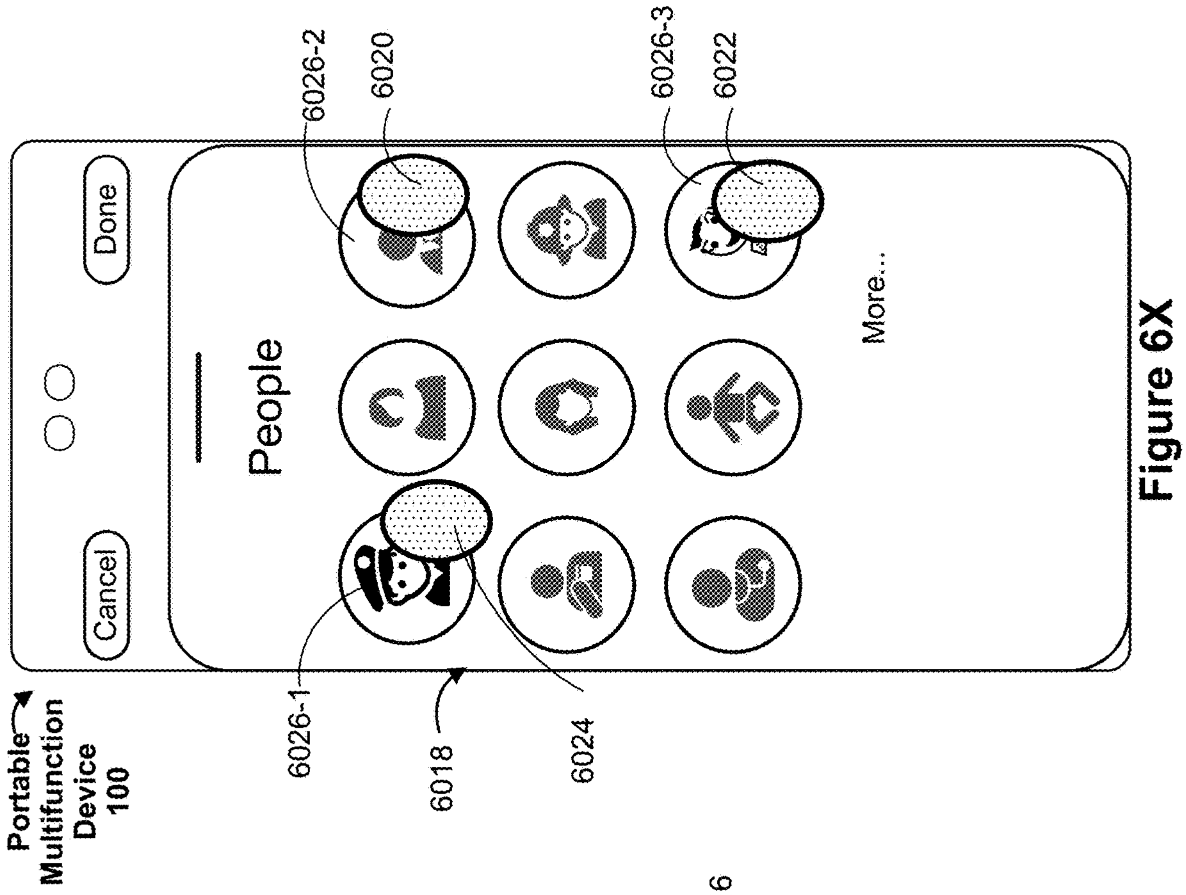

FIG. 6X illustrates a plurality of user inputs selecting one or more people to include in the Smart Album. For example, user input 6020 (e.g., a tap input or other selection input) selects representation 6026-2 of a first person, user input 6022 selects representation 6026-3 of a second person, and user input 6024 selects representation 6026-1 of a third person. In some embodiments, in accordance with a determination that a respective person is selected, one or more photos that include the respective person are included in the set of photos for the Smart Album. In some embodiments, an option for viewing and selecting additional people that are not displayed in user interface 6018 is provided (e.g., "More . . . ").

Figure 6Z:
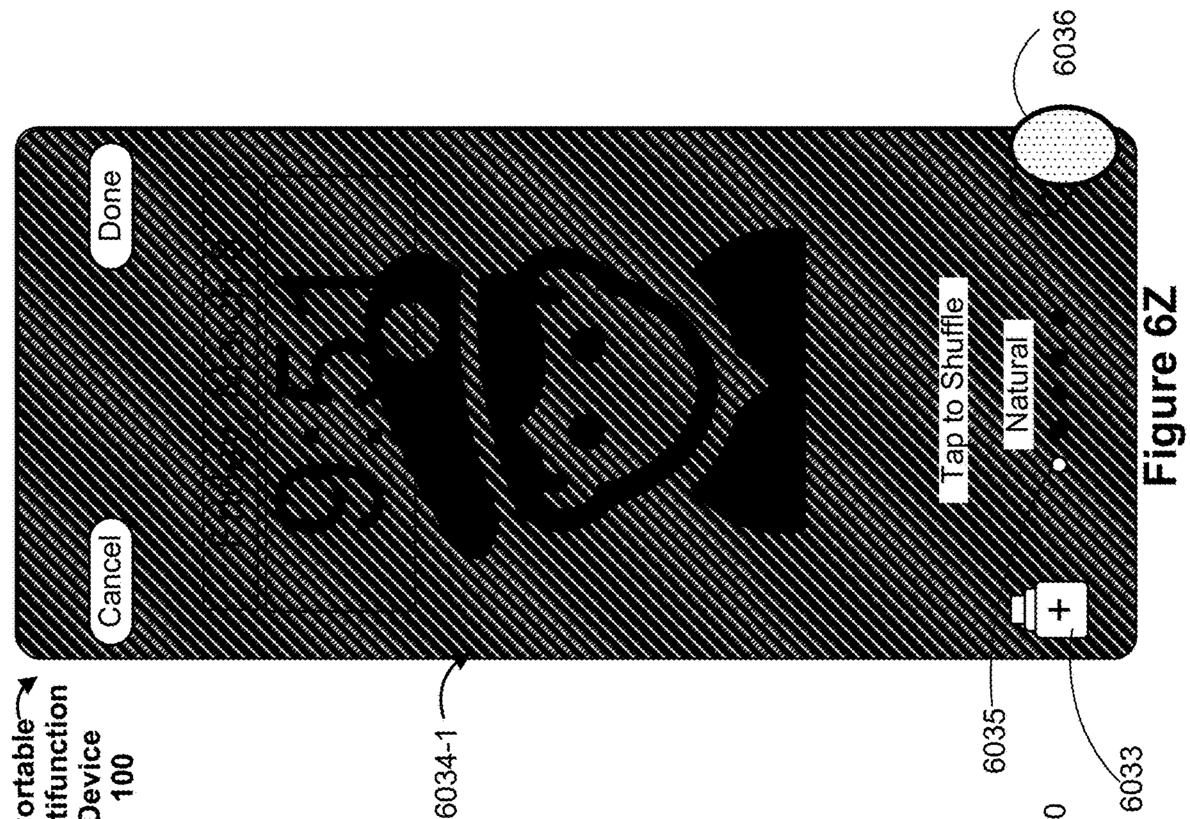
Figure 6Y:
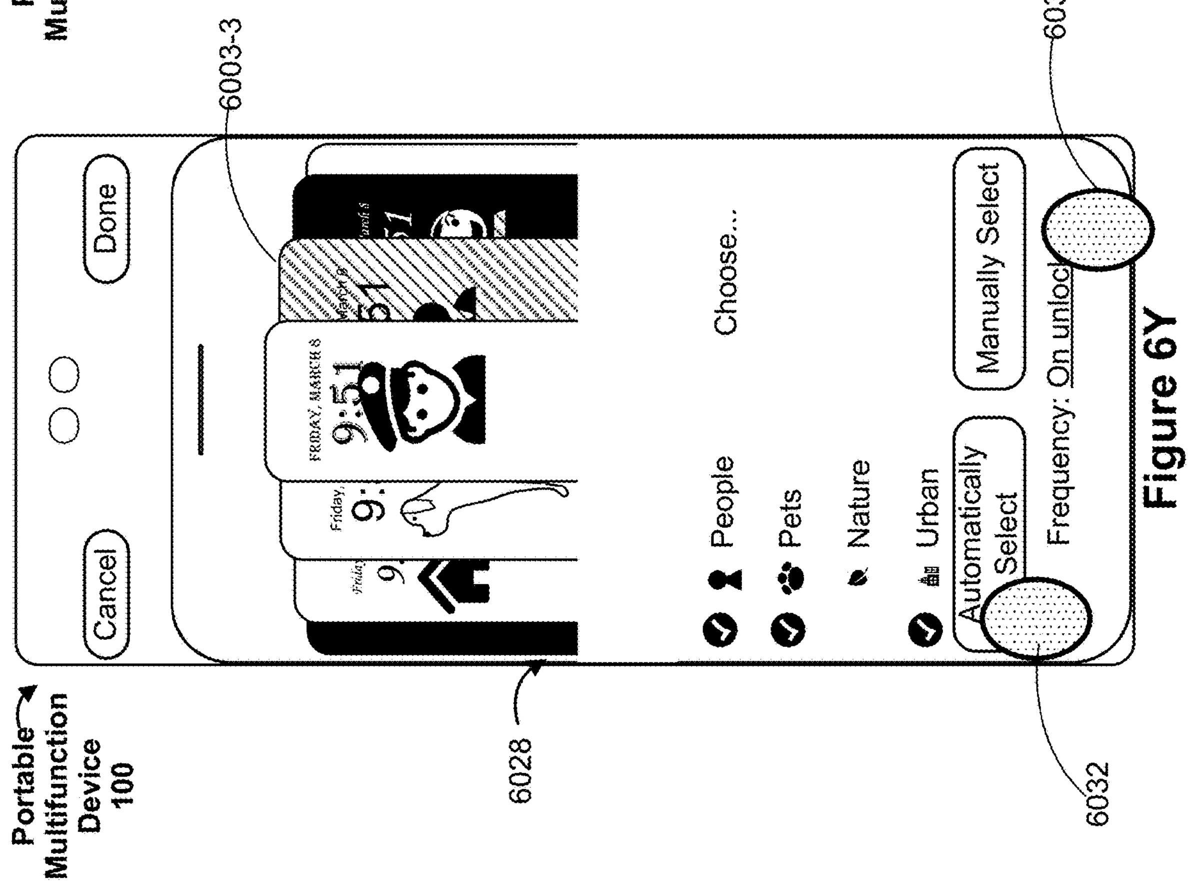
Figure 6A:
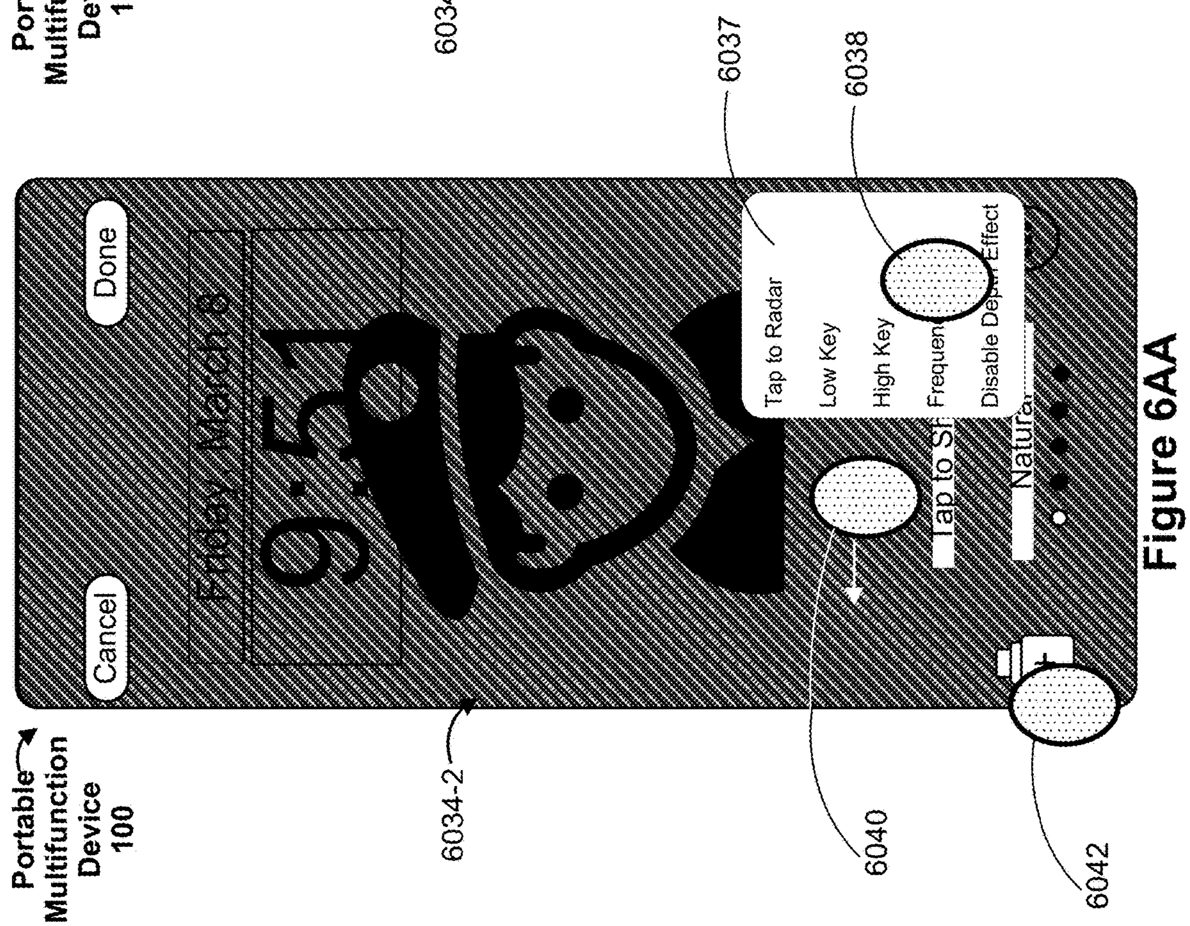
Figure 6A:
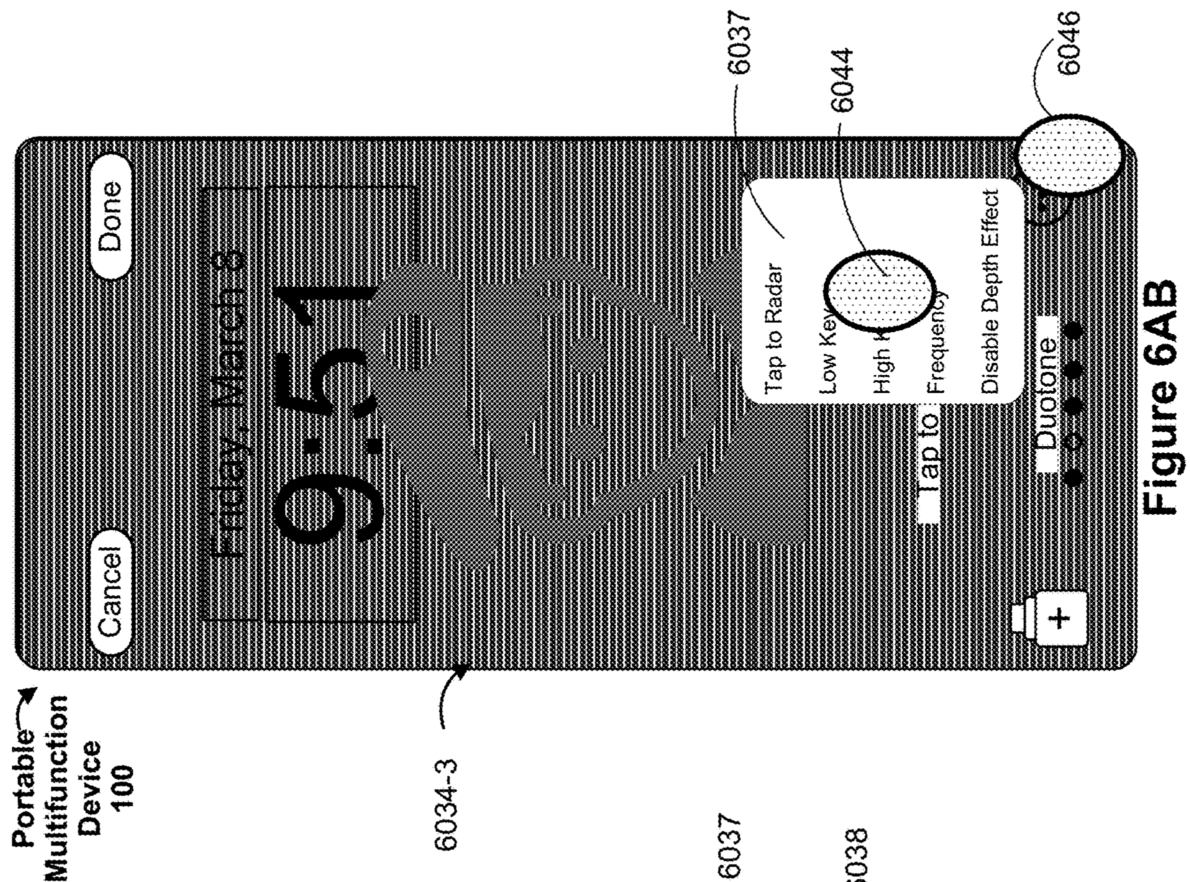
Figure 6A:
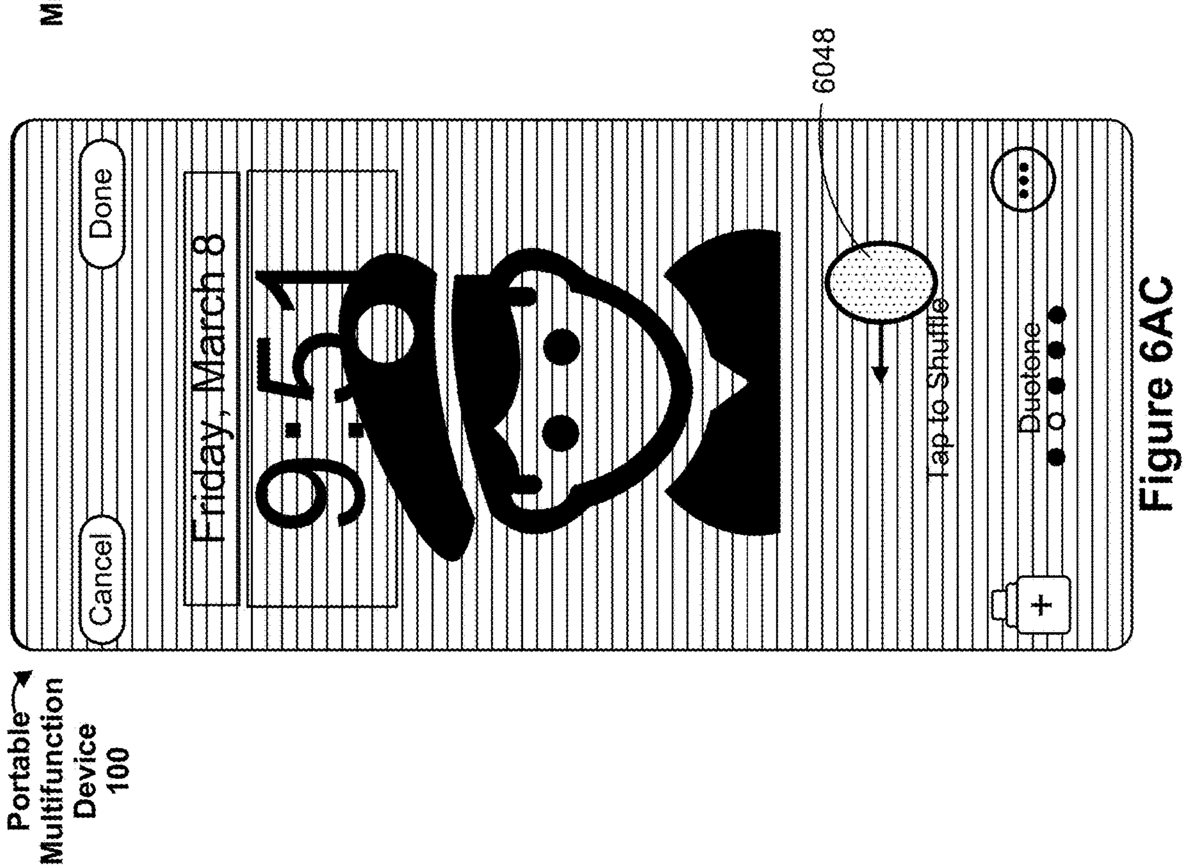
Figure 6A:
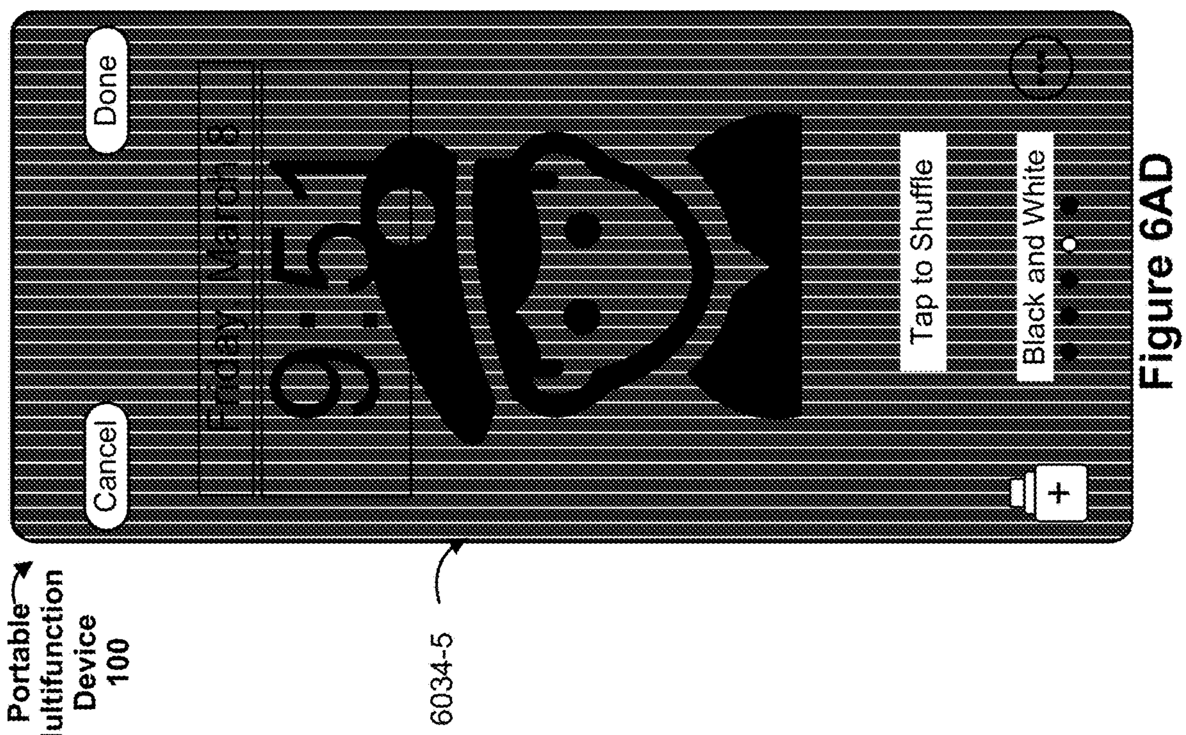
Figure 6A:
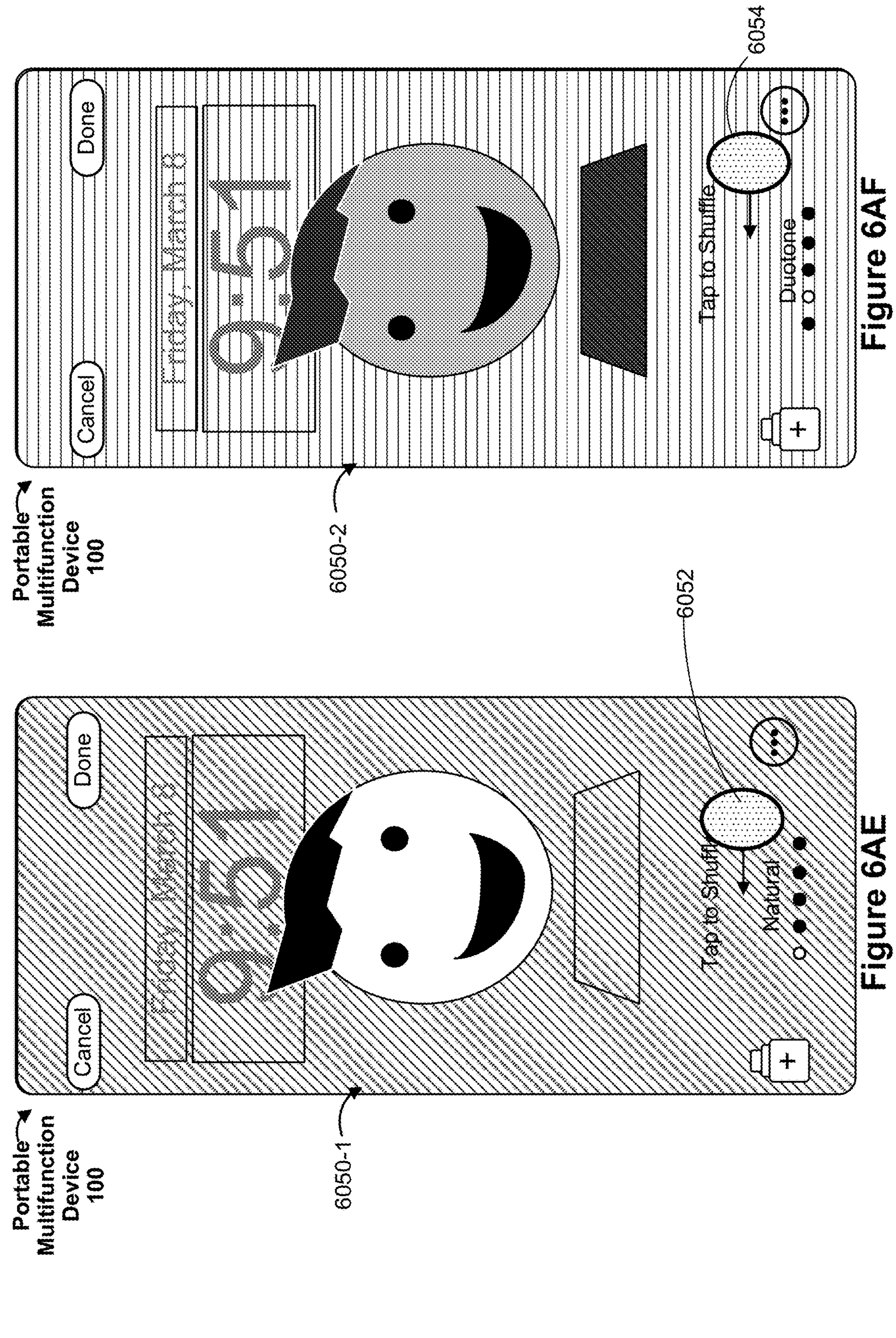
Figure 6A:
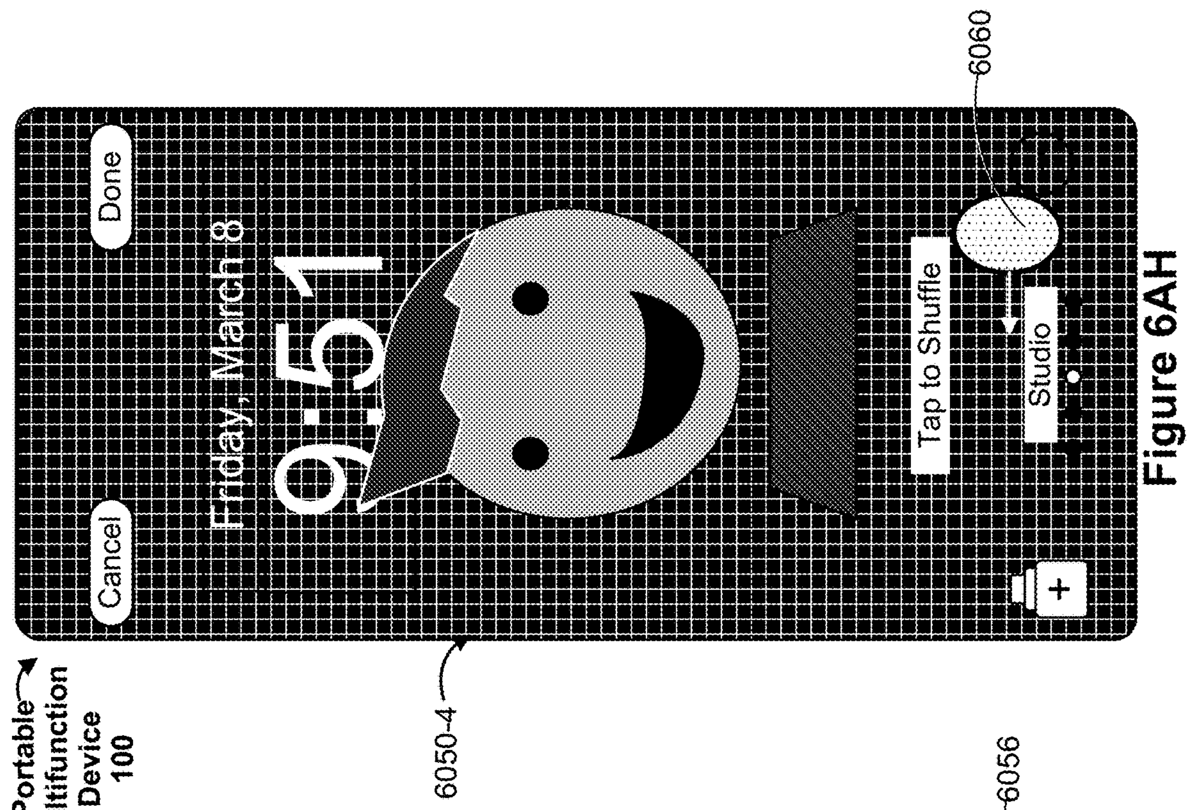
Figure 6A:
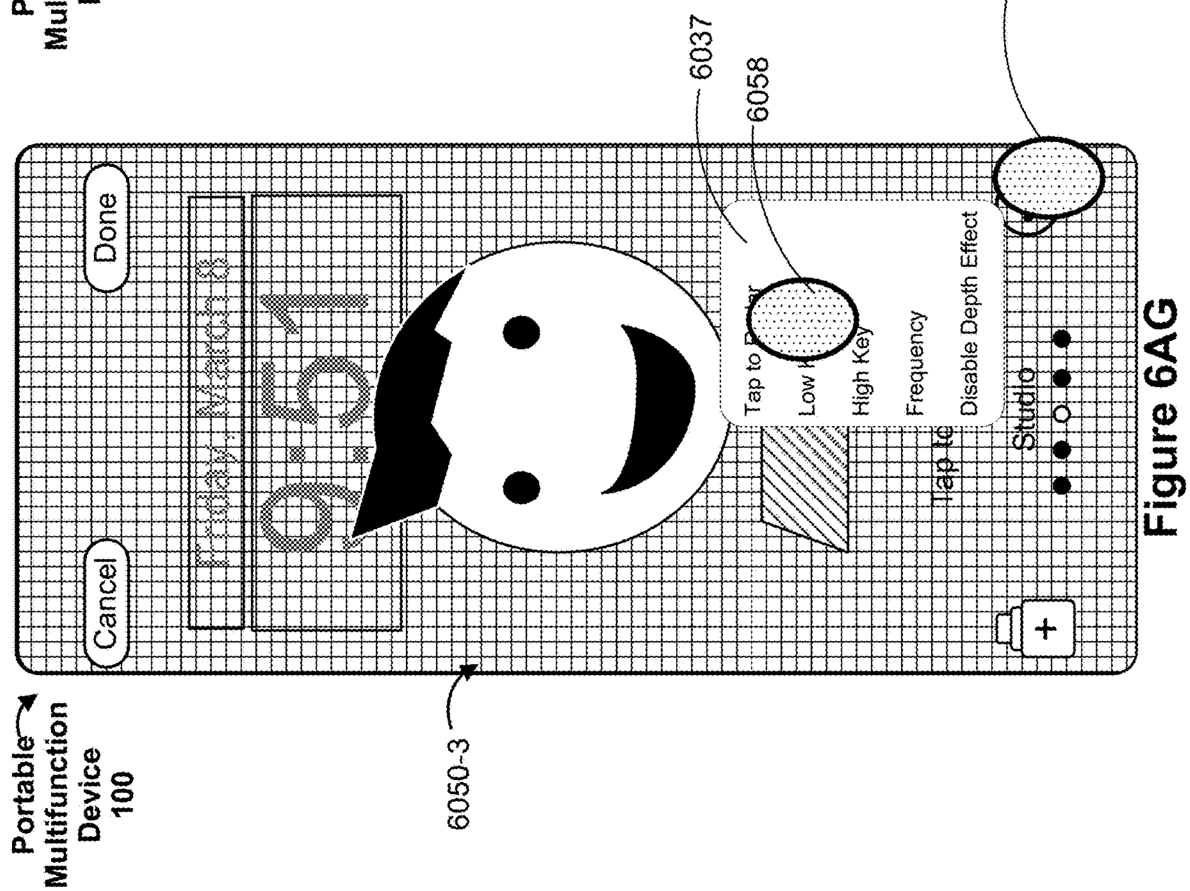
Figure 6A:
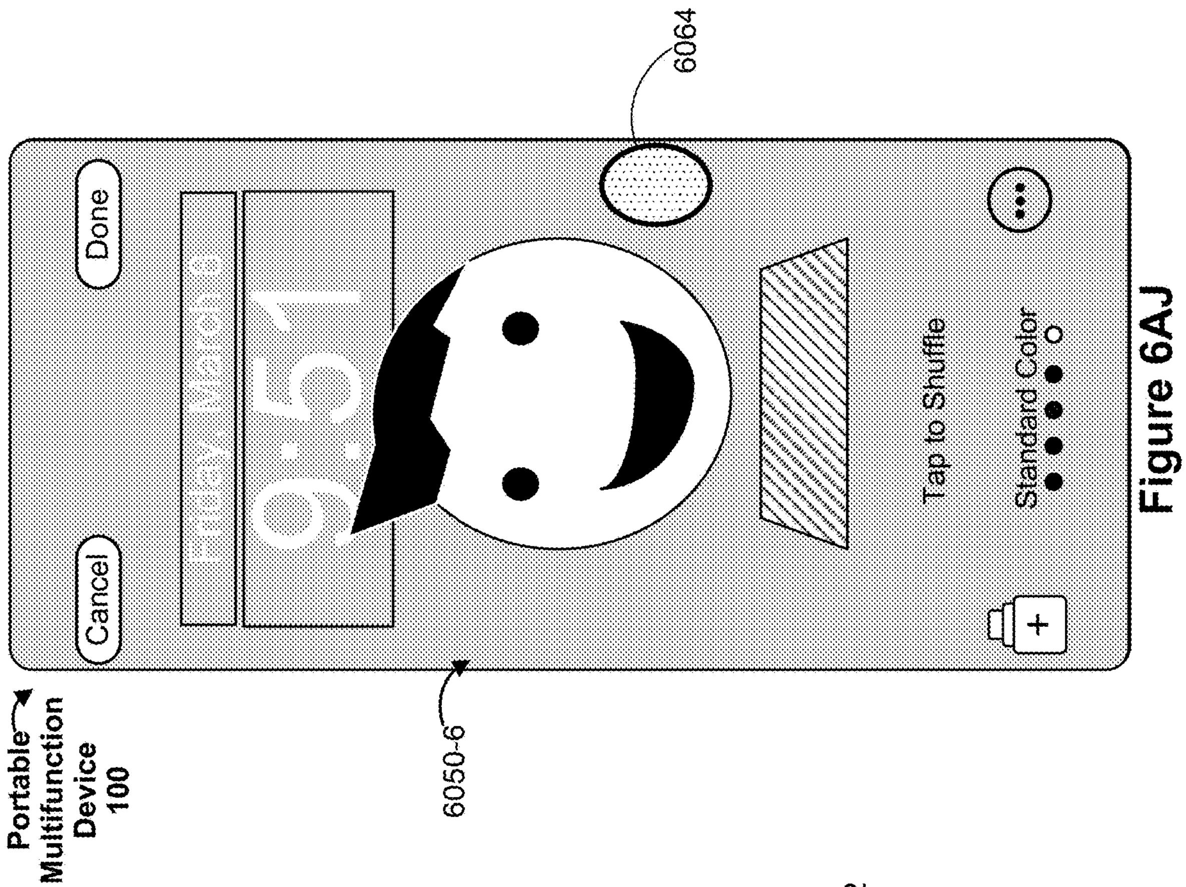
Figure 6A:
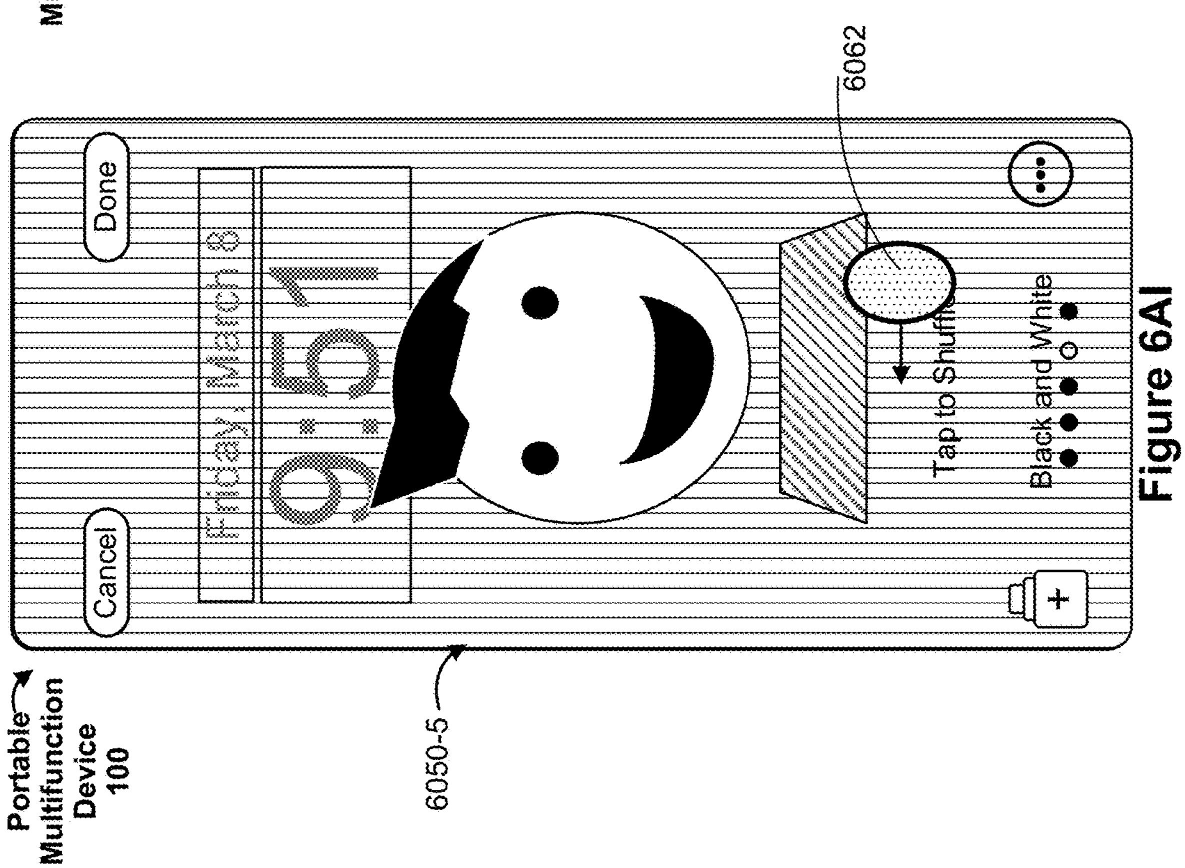
Figure 6A:
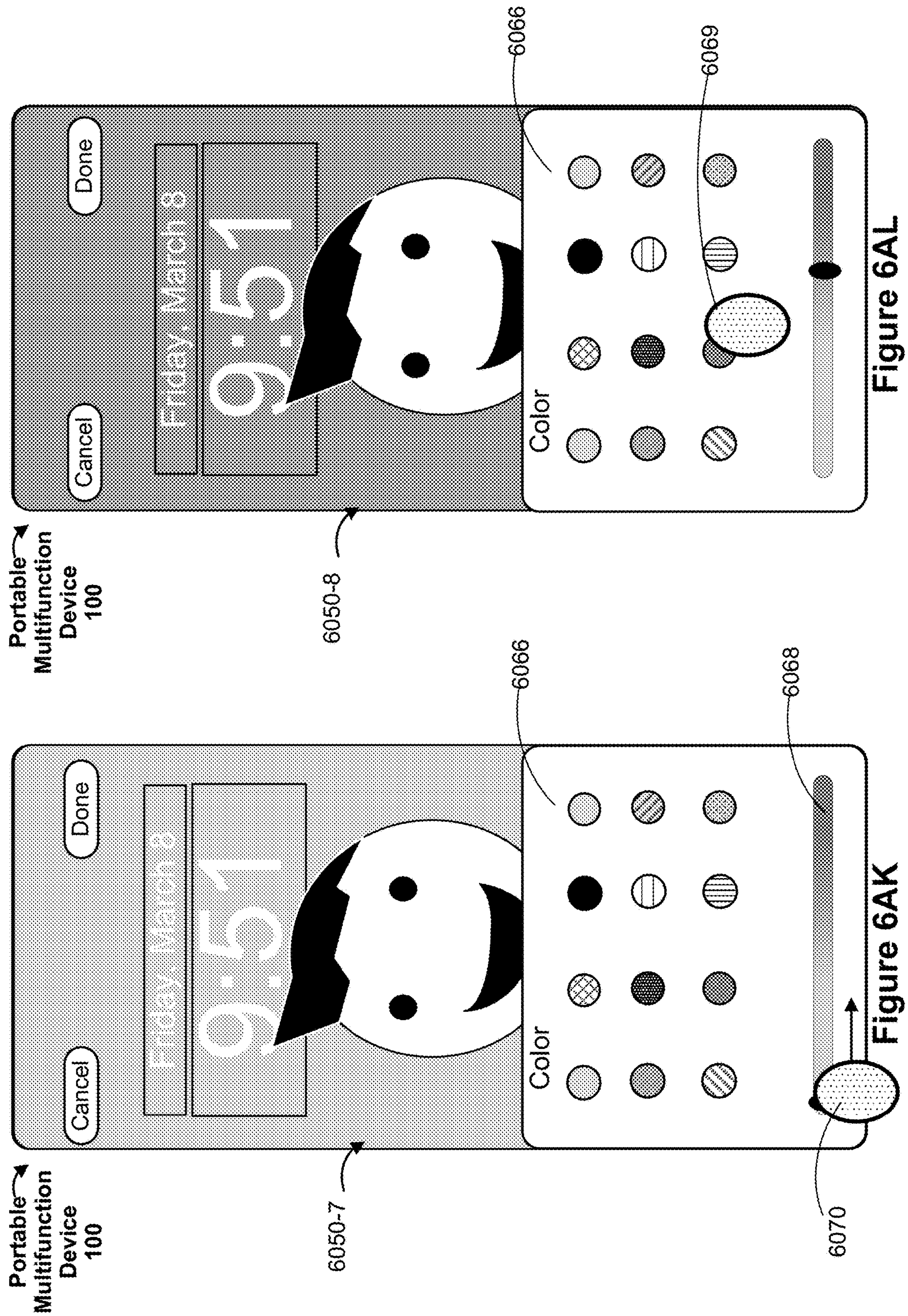
Figure 6A:
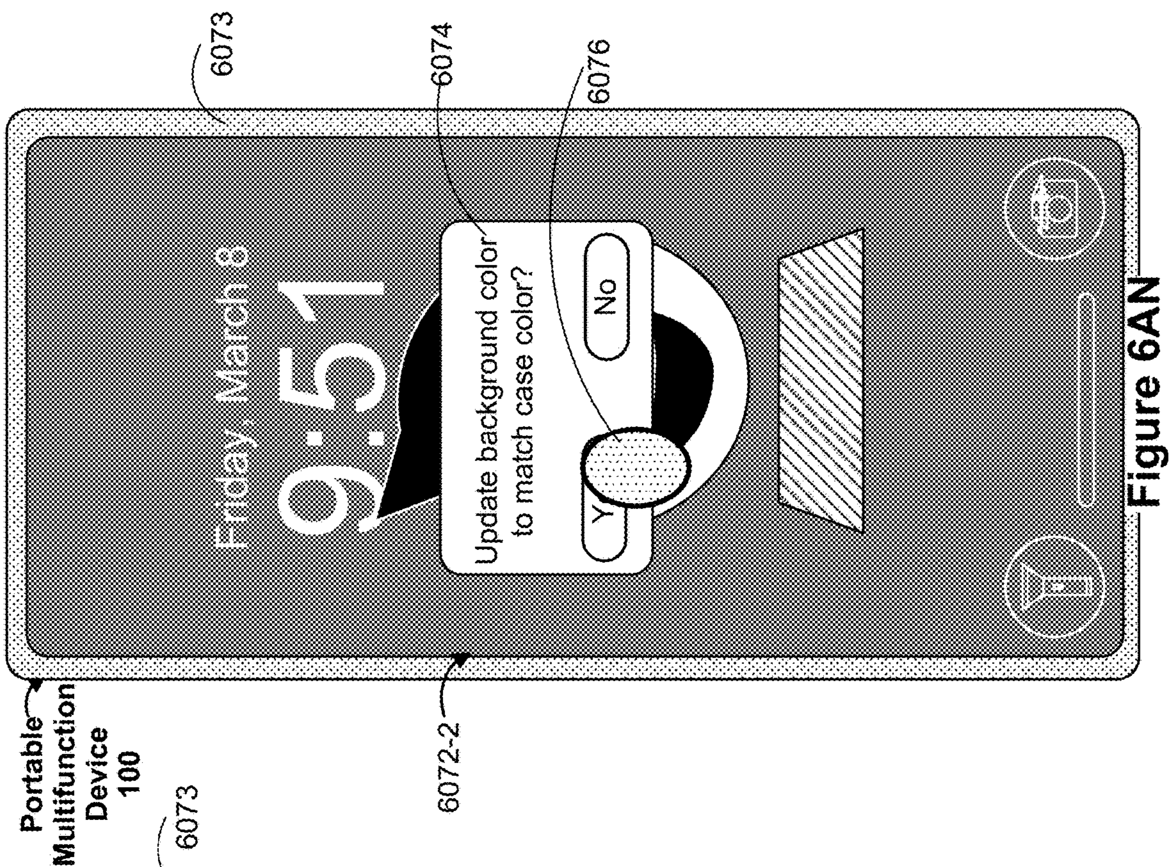
Figure 6A:
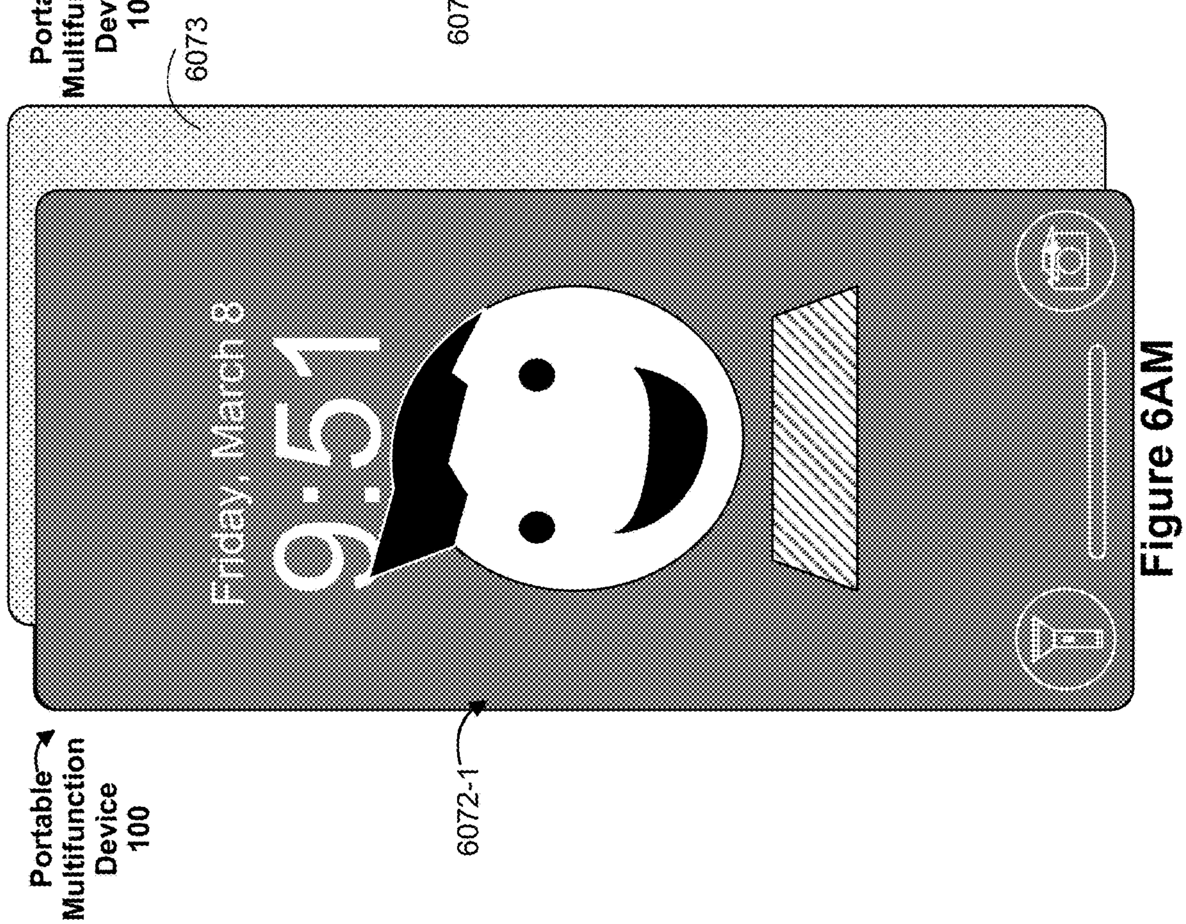
Figure 6A:
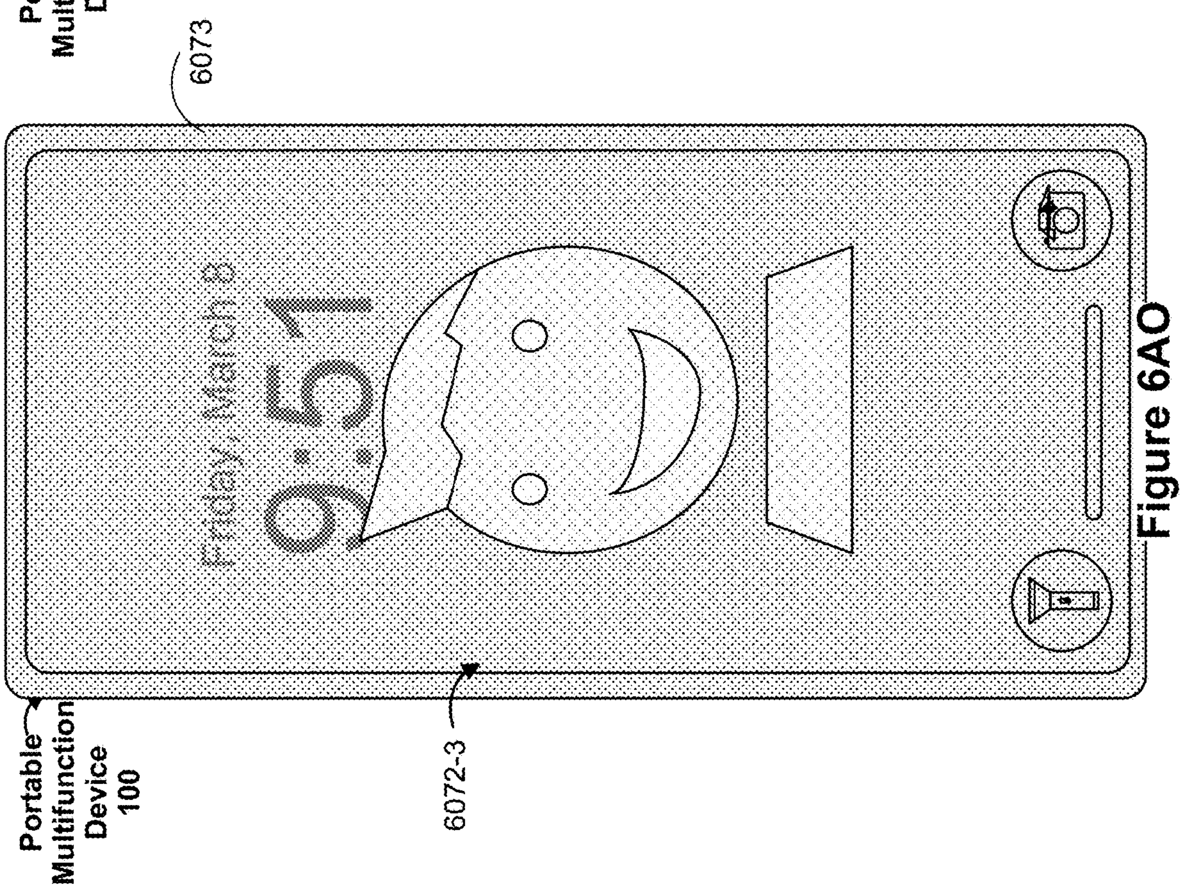
Figure 6A:
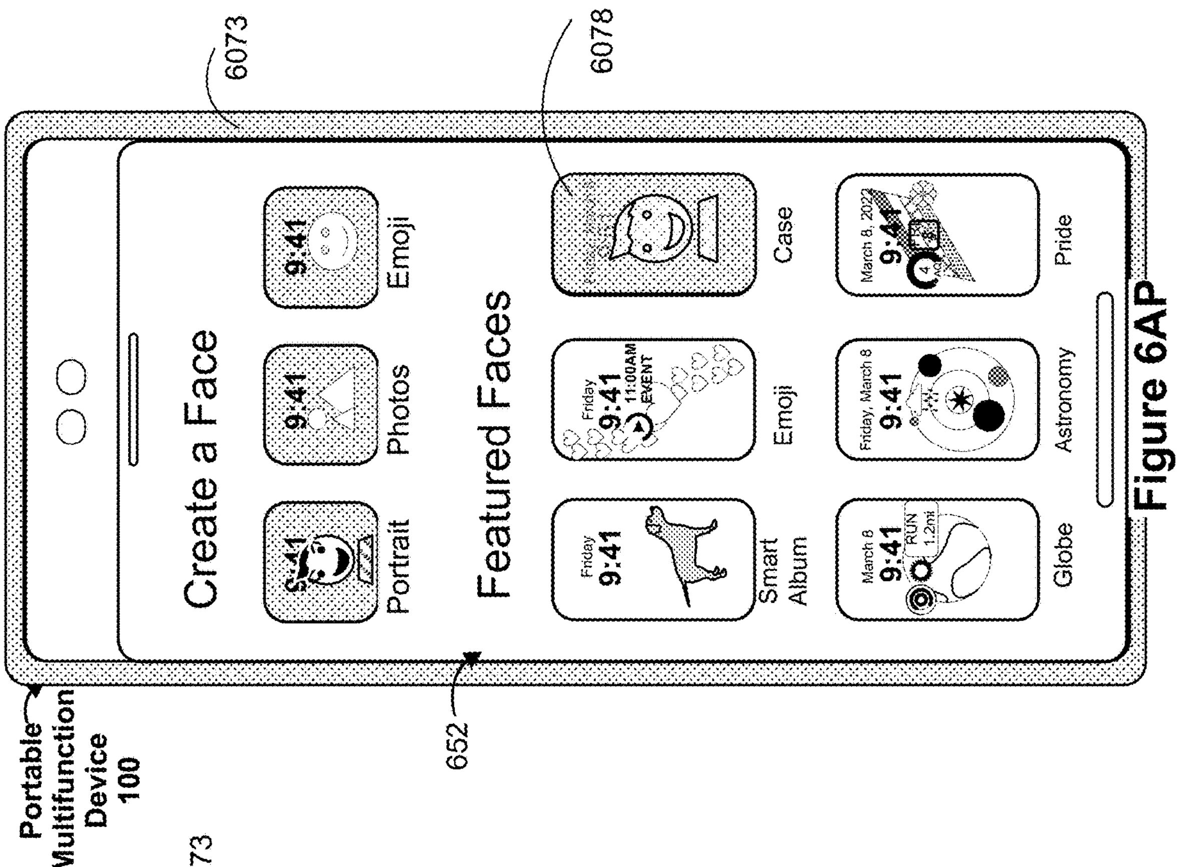
Figure 6A:
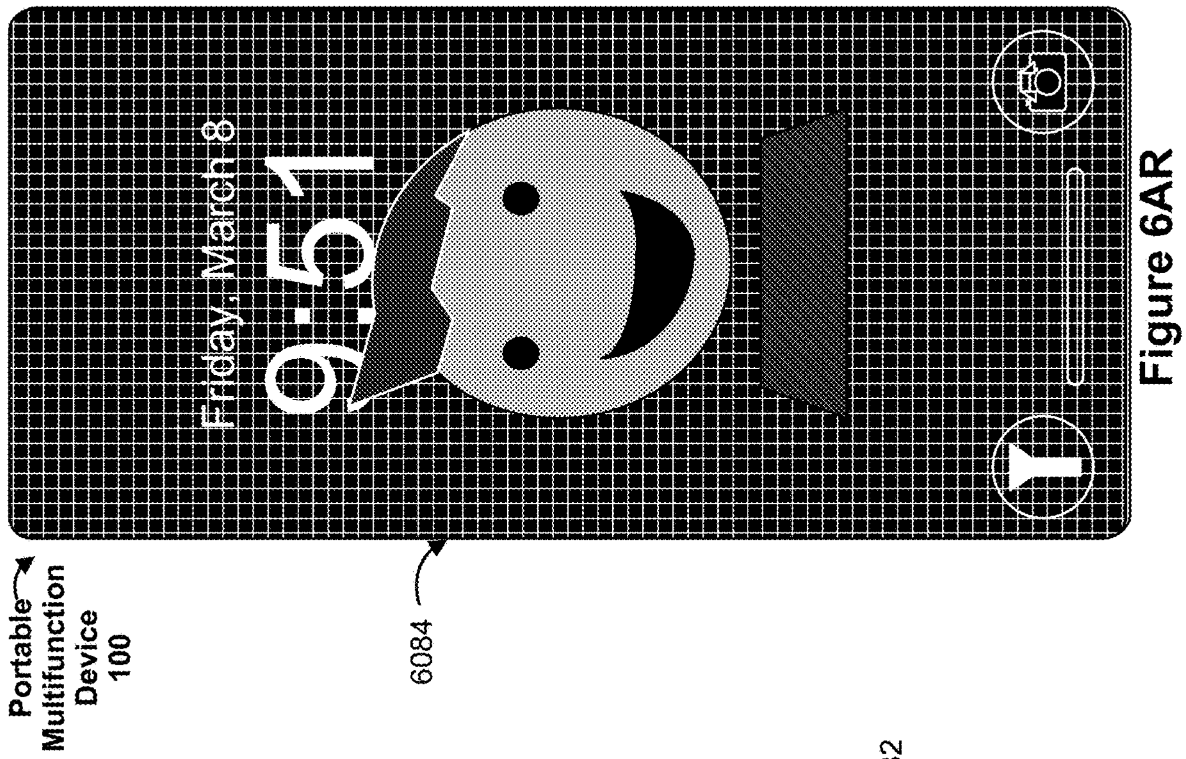
Figure 6A:
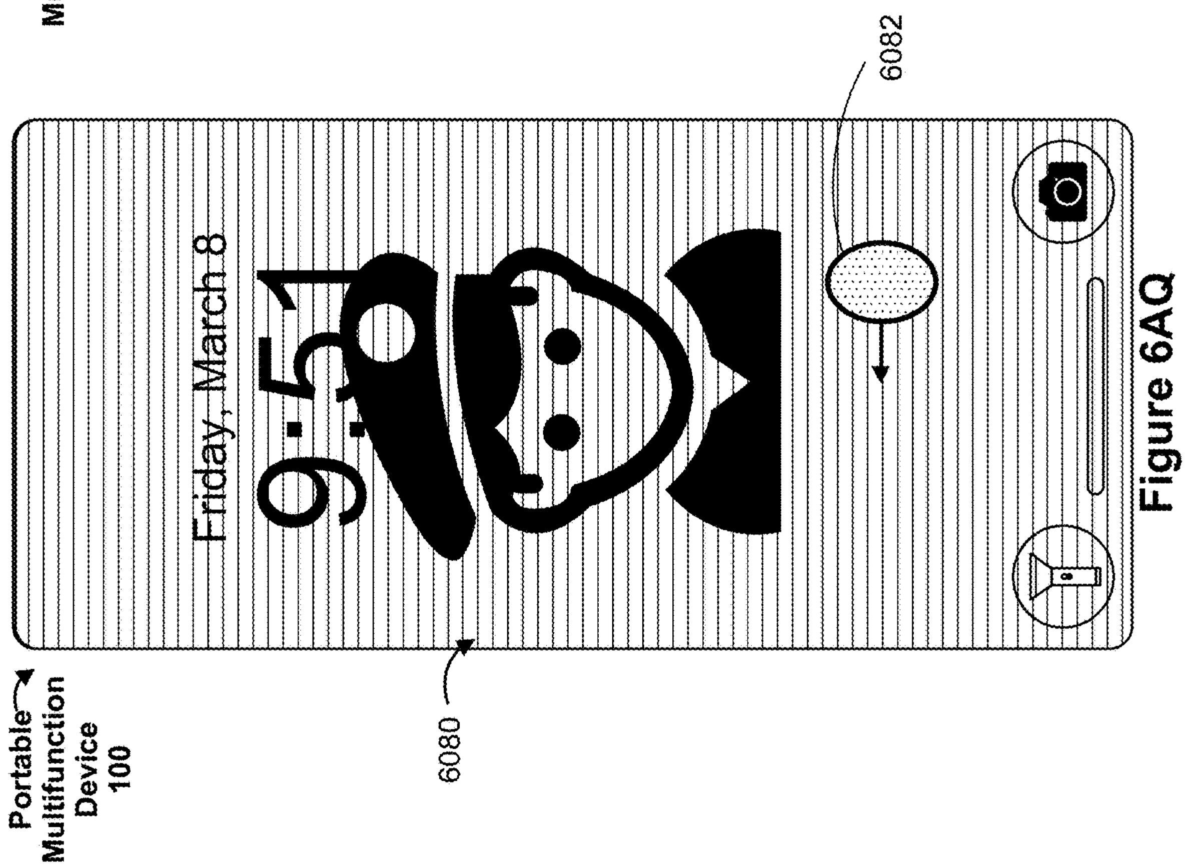

In some embodiments, the representations illustrated in user interface 6028 include representations of a wake screen user interface that includes a background of a respective selected person, as illustrated in FIG. 6Y. For example, representation 6003-3 includes a representation of the person associated with representation 6026-2.

FIG. 6Y illustrates user input 6030 detected on an option to select a frequency of changing the photos in the Smart Album. In some embodiments, in response to user input 6030, a menu of user-selectable options is displayed for the user. In some embodiments, the menu of user-selectable options includes one or more options to change frequency based on a time period (e.g., every 1 hour, every 5 hours, or every 1 day), and/or includes one or more options to change frequency based on a detected event of device 100 (e.g., on unlock, in a respective focus mode, or on initiating charge).

FIG. 6Y further illustrates user input 6032 selecting the option to automatically select images that correspond to the currently selected categories. For example, in response to user input 6032, device 100 identifies one or more images associated with a respective category that is selected (e.g., people, pets, and/or urban) and displays the one or more images as the background media item of the wake screen user interface. In some embodiments, the device provides an option for the user to manually select the images. For example, in response to a user input selecting the manually select option (e.g., in user interface 6028 as shown in FIG. 6Y), the device 100 displays a photo library, or photo picker (e.g., user interface 668, FIG. 6N) in which the device responds to user inputs that corresponds to requests to browse and select particular photos to include in the Smart Album background.

In some embodiments, in response to user input 6032, device 100 ceases display of the user interface 6028. In some embodiments, device 100 optionally displays an editing user interface for a first wake screen user interface of the Smart Album, as illustrated in FIG. 6Z. In some embodiments, device 100 displays editing user interface 6034-1 (FIG. 6Z) in response to one or more interactions as described with reference to FIGS. 6F-6G. For example, the device provides access to editing user interface 6034-1 using any of the methods described herein. In some embodiments, editing user interface 6034-1 is accessible from a settings user interface that provides an option for editing a wake screen user interface, and/or an option for editing a home screen user interface.

FIG. 6Z illustrates an editing user interface 6034-1 for a first wake screen user interface that includes a first person, optionally a person selected in a Smart Album. In some embodiments, an original photo (or "Natural" view) that is used as the background of the first wake screen user interface is displayed. In some embodiments, in accordance with a determination that the selected wake screen user interface for editing is within a Smart Album, an option to shuffle, or view another photo in the Smart Album, is provided (e.g., "Tap to Shuffle"). In some embodiments the original photo (or "Natural" view) is processed by device 100 and an initial tone is determined. For example, the initial tone represents an amount of luminance and/or brightness of a background (and/or a foreground) of the original photo. In some embodiments, the original photo in FIG. 6Z is identified as a low-key level of luminance (e.g., a low amount of luminance, such as in a relatively dark photo) in accordance with a calculated level of luminance satisfying a threshold amount of luminance. In some embodiments, editing user interface 6034-1 includes a photo picker 6033 to select a different background photo. For example, in response to user input 6042 (FIG. 6AA), the device 100 displays a photo library or photo picker user interface (e.g., as described with reference to FIG. 6N). In some embodiments, editing user interface 6034-1 includes an indicator 6035 of additional views of the wake screen user interface, for example a same foreground (e.g., subject or individual) of the photo and a different background and/or a different filter applied to the photo (e.g., as described with reference to swipe input 6040, FIG. 6AA).

In some embodiments, in response to user input 6036 selecting a menu option, a menu 6037 is displayed. In some embodiments, menu 6037 provides a plurality of options for modifying the wake screen user interface displayed in editing user interface 6034-2, including an option to radar, an option to change to low-key and/or high-key, an option to change a frequency (e.g., of switching background photos in a Smart Album), and/or an options to disable a depth effect of the photo. For example, user input 6038 selecting the option to change a frequency of the background enables the user to modify when device 100 changes the wake screen user interface (e.g., on a time basis and/or based on a device event).

In some embodiments, in response to detecting a swipe input 6040, device 100 displays editing user interface 6034-3 (FIG. 6AB), which includes another view (e.g., a duotone view) of the photo. In some embodiments, the duotone view is generated as a low-key version of duotone in accordance with a determination that the original photo is identified as a low-key level of luminance. For example, device 100 automatically displays the set of views with a level of luminance that is selected based on a level of luminance of the original photo.

FIG. 6AB illustrates user input 6046, and in response to user input 6046, displaying menu 6037. In some embodiments, the device 100 detects user input 6044 selecting to switch to a high-key version of the currently displayed view. In some embodiments, in response to user input 6044, device 100 updates the display to display the duotone view (also referred to herein as the duotone filter) as the high-key version, as illustrated in FIG. 6AC. For example, the duotone view is represented by horizontal stripes, but the high-key version of the duotone view (illustrated in FIG. 6AC) has a greater level of luminance than the low-key version of the duotone view (illustrated in FIG. 6AB). As such, device 100 automatically generates a respective version of each view based on an identified tone of the original photo. For example, because the original photo in FIG. 6AA is identified as a low-key photo (e.g., with less than a threshold amount of luminance), a plurality of low-key views are provided for the photo (e.g., low-key duotone view, low-key studio view, and/or low-key black and white view).

FIG. 6AC illustrates user input 6048 (e.g., a swipe input) corresponding to a request to switch to another view. In some embodiments, a low-key black and white view of the photo is displayed in user interface 6034-5, as illustrated in FIG. 6AD. In some embodiments, after the user has manually switched from a low-key version to a high-key version of a view (e.g., as described with reference to FIGS. 6AB-6AC), device 100 continues to recommend, or automatically provide, the low-key versions of the other views. For example, in FIG. 6AD, the device 100 provides the low-key version of the black and white view (e.g., because the original photo is a low-key photo). As such, the user is enabled the manually change a particular view, or filter, to switch between low-key and/or high-key, without changing the recommended views that are automatically generated and presented, which are likely to be visually pleasing because the views maintain a luminance (or other color tone) that is present in the original photo.

FIG. 6AE illustrates an example of an original high-key photo that is displayed in editing user interface 6050-1. For example, the original photo satisfies a threshold level of luminance that makes the photo relatively bright, or high-key. In some embodiments, in response to user input 6052, the device 100 displays another view of the photo. In some embodiments, the next view illustrated in user interface 6050-2 is a high-key version of the view, for example the high-key version of the duotone view, as illustrated in FIG. 6AF.

In some embodiments, in response to user input 6054, the device 100 replaces display of the user interface with another view, a high-key version of a studio view, as illustrated in user interface 6050-3 in FIG. 6AG. FIG. 6AG illustrates user input 6056 selecting a menu icon, and in response to user input 6056, the device 100 displays the menu 6037. In some embodiments, user input 6058 selects the option, within menu 6037, to switch the current view to the low-key version. For example, in response to user input 6058, the device 100 displays user interface 6050-4 in FIG. 6AH, corresponding to the low-key version of the studio view.

FIG. 6AH illustrates user input 6060 requesting to switch to another view. In some embodiments, in response to user input 6060, device 100 displays the high-key version of a black and white view (e.g., because the original photo is determined as a high-key photo), as illustrated in user interface 6050-5 in FIG. 6AI.

FIG. 6AI illustrates a user input 6062 corresponding to a request to switch to another view. In some embodiments, in response to user input 6062, device 100 displays a color view (also referred to herein as a color filter), as illustrated in user interface 6050-6 in FIG. 6AJ. In some embodiments, a tone of the color selected for the color view matches a tone identified in the original photo. For example, an overall tone (or luminance) of the original photo is calculated, and the color selected for the color view has a same overall tone (or luminance) as the original photo. In some embodiments, in the color view, a background of the photo is updated to include the selected color. In some embodiments, the selected color is applied to the entire photo (e.g., background and foreground), optionally including applying a different level (e.g., with a different transparency or luminance) of the selected color to various portions of the photo. For example, the selected color is optionally applied to the entire photo, wherein the foreground that includes the subject of the photo only faintly applies the selected color (e.g., as a filter), while the background is replaced with a solid fill, or more opaque version, of the selected color.

FIG. 6AJ illustrates user input 6064 corresponding to a request to modify a background of the wake screen user interface. In some embodiments, in response to user input 6064, device 100 displays a color picker 6066 for changing a color applied to the photo. In some embodiments, the initially selected color is selected to have a color tone that matches the tone of the original photo. For example, as indicated in FIG. 6AK, the selected color has a high level of luminance (e.g., for a high-key original photo), as indicated by the selector being to the left on the slider bar 6068 that indicates a level of luminance that defines the tone of the currently selected color. For example, if the original photo is a low-key original photo, the tone of the color would automatically be set to a low-key tone (e.g., on the right side of the slider 6068).

In some embodiments, user input 6070 corresponds to a request to change a tone of the selected color. For example, as illustrated in FIG. 6AL, in response to user input 6070, the background of user interface 6050-8 is displayed with a darker (e.g., more low-key) tone of the same color of the background in user interface 6050-7 in FIG. 6AK.

In some embodiments, each of the colors provided in the color picker 6066 are displayed with a same tone (e.g., that matches the tone of the original photo). For example, while the colors are distinct (e.g., purple, green, red, yellow, or another color), the level of luminance and/or the tone of each color is optionally automatically selected in accordance with the tone of the original photo. In some embodiments, one or more colors displayed as options in the color picker are not selected as having the tone of the original photo.

FIG. 6AL illustrates a user input 6069 selecting another color that is displayed in the color picker 6066. In some embodiments, in response to user input 6069, the background of the user interface is updated to display the selected color. In some embodiments, one or more of the views are used in the Smart Album as the wake screen user interface, as illustrated in FIG. 6AM.

FIG. 6AM illustrates a wake screen user interface 6072-1 and a case 6073 for device 100 that is near the. In some embodiments, case 6073 is a protective case that is physically placed on at least a portion of device 100. In some embodiments, device 100 detects one or more properties associated with case 6073 while case 6073 is on the device 100. For example, device 100 identifies a color of the case 6073.

FIG. 6AN illustrates case 6073 while placed on device 100. In some embodiments, the device 100 determines that the case 6073 is placed on device 100, and, in response to determining that case 6073 is on the device 100, device 100 optionally displays a prompt 6074 that asks the user if device 100 should update the background color (e.g., of wake screen user interface 6072-2) to match the case color (e.g., as detected by device 100). In some embodiments, the prompt 6074 includes an option for selecting yes and an option for selecting no.

In some embodiments, device 100 detects user input 6076 selecting yes to the prompt 6074, and in response to user input 6076, the device 100 updates the user interface 6072-3 to be displayed with a color (e.g., a color filter) that matches (or complements) the color of case 6073. In some embodiments, the color is applied to the background of the wake screen user interface 6072-3 only. In some embodiments, the color is applied to the foreground and background of the wake screen user interface 6072-3 (optionally with different portions being displayed with different levels of transparency or luminance of the color).

FIG. 6AP illustrates a user interface 652 (e.g., as described with reference to FIG. 6K). In some embodiments, the user interface 652 for creating a new wake screen includes a recommended face 6078 that is based on a color of a case that is detected as being on device 100. For example, in accordance with a determination that a case is on device 100, the user interface 652 is updated to automatically include a featured wake screen user interface that matches (or complements) the color of the case. It will be understood that additional recommendations may be provided to the user based at least in part on a color of a case that is detected as being on device 100.

FIG. 6AQ-6AR illustrate an example of displaying the Smart Album as the wake screen user interface. For example, one or more views of the wake screen user interfaces described with reference to FIGS. 6AA-6AJ are displayed as the wake screen user interface. In some embodiments, a first view of a first photo is displayed as wake screen user interface 6080, and the wake screen user interface is automatically updated, without additional user input, to display a second wake screen user interface 6084 that includes a second view of a second photo, in accordance with the selected frequency of the Smart Album. In some embodiments, a user input 6082 is optionally detected, and in response to user input 6082, the wake screen user interface is updated from wake screen user interface 6080 to wake screen user interface 6084.

FIGS. 7A-7V-3 illustrate a representation of a plurality of notifications in different configurations, as well as user inputs that can be used to switch between the different configurations.

FIG. 7A shows a representation of a first plurality of notifications in a first configuration 7000-*a*. For ease of description, the representation of the first plurality of notifications will be referred to as "the representation 7000" (e.g., regardless of what configuration the representation of the first plurality of notifications is displayed with), and the letter after the label 7000 (e.g., 7000-*a*, 7000-*b*, or 7000-*c*) refers to the particular configuration that the representation 7000 is displayed in (e.g., 7000-*a* refers to a first configuration, 7000-*b* refers to a second configuration different from the first configuration 7000-*a*, and 7000-*c* refers to a third configuration different from both the first configuration 7000-*a* and the second configuration 7000-*b*). In various circumstances, the representation 7000 may represent (e.g., include) different notifications (e.g., based on notification settings for an active mode of the portable multifunction device 100).

The plurality of notifications represented by the representation 7000 include at least: a notification 7002 associated with an application A, a notification 7004 associated with an application Z, a notification 7006 associated with an application S, a notification 7008 associated with an application D, and a notification 7010 associated with an application M. While the representation 7000 is displayed in the first configuration 7000-*a* (e.g., a "list" configuration), each notification of the plurality of notifications is displayed separately from other notification in the plurality of notifications (e.g., in a list format, without overlay between adjacent notifications).

In some embodiments, the representation 7000 is aligned with the bottom of a display of the portable multifunction device 100 (e.g., if notifications 7006, 7008, and 7010 were the only notifications to display, they would still be displayed at the same locations as shown in FIG. 7A, but without notifications 7002 and 7004). In some embodiments, the notifications are displayed in reverse chronological order (e.g., as shown in FIG. 7A), but in other embodiments, the order of the notifications may be different (e.g., chronological order or a user-defined order). In some embodiments, the first configuration 7000-*a* is a default configuration for displaying notifications.

A user can interact with the notifications in the first plurality of notifications through different gestures. For example, in response to a tap input 7012 on the notification 7002, the portable multifunction device 100 opens the application A corresponding to the notification 7002. Alternatively, in response to tap input 7012, the portable multifunction device 100 instead displays additional content associated with the notification 7002 (e.g., by expanding the area occupied by the notification 7002). In response to a rightward swipe input 7014, the portable multifunction device 100 displays one or more affordances for interacting with the notification 7006, and in response to a leftward swipe input 7016, the portable multifunction device 100 displays one or more affordances for configuring display options (e.g., for dismissing, deferring, and/or adjusting a prominence of) for the notification 7010.

FIG. 7B shows the representation 7000 in a second configuration 7000-*b*, while a "Work" mode of the portable multifunction device 100 is active. In some embodiments, the portable multifunction device 100 displays a visual indication, such as a "Work" indicator 7022, while a respective mode (e.g., the "Work" mode) is active. The "Work" mode of the portable multifunction device 100 may control how notifications are displayed. For example, while the "Work" mode is active, some notifications for certain applications (e.g., a social media application S, associated with notification 7006) are suppressed, while work-relevant applications (e.g., a messaging application A, associated with the notification 7002) are not suppressed. In addition, in some embodiments, the "Work" mode of the portable multifunction device 100 controls which configuration notifications are displayed in (e.g., activation of the "Work" mode activates the second configuration 7000-*b* and/or changes the portable multifunction device 100 from displaying notifications in the first configuration 7000-*a* to the second configuration 7000-*b*).

While the representation 7000 is displayed in the second configuration 7000-*b* (e.g., a "stack" configuration), some notifications (e.g., notification 7002) partially overlay other notifications. For example, the notifications 7002 partially overlays the notification 7018, and the notification 7018 partially overlays the notification 7020. In some embodiments, while in the second configuration 7000-*b*, the representation 7000 is aligned with the bottom of the display of the portable multifunction device 100. In such embodiments, some portions of the display are kept available for display of user interface elements other than notifications, thus increasing visibility of a background image or wallpaper (e.g., as shown in FIG. 7B). The configuration 7000-*b* also condenses the display area for notifications to allow better visibility (e.g., of contextually relevant or urgent notifications and/or system user interfaces, as described below with reference to FIG. 7N), or to position user interface elements closer to the user's hands (e.g., as a user's hands are frequently positioned closer to the bottom of the display portable multifunction device 100).

FIG. 7C is analogous to FIG. 7B, but shows the representation 7000 in the second configuration 7000-*b*, while a "Personal" mode of the portable multifunction device 100 is active (as shown by the "Personal" indicator 7026). The "Personal" mode may have different notification settings than the "Work" mode (e.g., allowing notifications from personal contacts but not work contacts, while the "Work" mode allows notifications from work contacts but not personal contacts), and visually, the representation 7000 includes a different set of notifications (e.g., as compared to FIG. 7B). The notification 7002 is displayed while either the "Work" mode or the "Personal" mode is active, but the notification 7004 that is suppressed while the "Work" mode is active is displayed while the "Personal" mode is active. A notification count 7024 displays additional information regarding the notifications that are not displayed (e.g., information regarding the number of notifications that are represented by the first representation of the plurality of notifications but not currently displayed, information regarding applications associated with the notifications that are not displayed and/or information regarding a sender associated with the notifications that are not displayed). In some embodiments, the notification count 7024 does not include a count of notifications that are suppressed (e.g., due to settings of the "Personal" mode). In other embodiments, the notification count 7024 includes a count of all notifications represented by the representation 7000 (e.g., even notifications that are not visually displayed due to notification settings of the "Personal" mode). In some embodiments the notification count 7024 includes separate indications for the number of notifications allowed by the notification settings of the "Personal" mode, and for the number of notifications suppressed in accordance with the notification settings of the "Personal" mode.

FIG. 7D shows the representation 7000 in a third configuration 7000-*c*. In the third configuration 7000-*c* (e.g., a "string" configuration), the first representation of the plurality of notifications includes a count of the number of notifications in the plurality of notifications, without displaying individual visual representations of notifications in the plurality of notifications.

FIG. 7E shows a side-by-side view of the representation 7000 in the first configuration 7000-*a*, the second configuration 7000-*b*, and the third configuration 7000-*c*. Each configuration is shown as representing a different set of notifications, to highlight different contexts in which different configurations may be beneficial and/or desirable.

In the leftmost display of FIG. 7E, the plurality of notifications includes 5 notifications. When there are a small number of notifications to display, the portable multifunction device 100 can display the entire representation 7000 in the first configuration 7000-*a*, which allows content from all of the notifications to be displayed simultaneously. Even in cases where there are more notifications (e.g., 6 to 8 notifications) than can fit on the display at the same time, the portable multifunction device 100 can still display notification content for at least some of the notifications in the plurality of notifications. Thus, the first configuration 7000-*a* allows the user to efficiently view notifications, as no additional inputs are needed to expand notifications for viewing, and, often, the number of notifications is low enough that no (or minimal) scrolling is needed to view additional notification content.

In the center display of FIG. 7E, the plurality of notifications includes 9 notifications. As the number of notifications increases, the first configuration 7000-*a* may become less desirable, as it is difficult to display the larger number of notifications on the display of the portable multifunction device 100 (e.g., without changing a text size, without changing an overall size of the representation of each respective notification, and/or without scrolling). In such cases, the second configuration 7000-*b* allows for some notification content to remain displayed, without cluttering the display with a large amount of detail (e.g., as would be the case if the representation 7000 were displayed in the first configuration 7000-*a*).

In the rightmost display of FIG. 7E, the plurality of notifications includes 11 notifications. In some scenarios, the third configuration 7000-*c* can be useful (e.g., in combination with a Do Not Disturb or other reduced notification mode) in order to avoid distractions (e.g., from incoming notifications that would be displayed in the first configuration 7000-*a* or the second configuration 7000-*b*), or simply because the number of notifications is so high that neither the first configuration 7000-*a* or the second configuration 7000-*b* is desirable due to the large amount of scrolling that would be required to view a particular notification (e.g., the oldest notification at the end of, or at the bottom of, the representation 7000).

As different configurations are advantageous in different contexts, the user can use different user inputs in order to efficiently switch between configurations. These user inputs allow users to select a suitable configuration as the circumstances change, and are described in further detail below, with reference to FIGS. 7F-7U.

In FIG. 7F, the plurality of notifications includes 7 notifications (with 2 notifications that are not displayed in FIG. 7F), and the representation 7000 is displayed in the first configuration 7000-*a*. In response to detecting an upward swipe gesture 7028, the portable multifunction device scrolls the displayed notifications. As shown in FIG. 7G, the notification 7002 and the notification 7004 have been scrolled off the display. A notifications 7030 associated with an application W, and a notifications 7032 associated with an application N, which were not displayed in FIG. 7F, are now displayed in FIG. 7G.

In response to detecting a pinch gesture 7034, or a downward swipe gesture 7036, at a location corresponding to the representation 7000 (e.g., over a notification of the plurality of notifications represented by the representation 7000), the portable multifunction device 100 transitions to displaying the representation 7000 in the second configuration 7000-*b*, as shown in FIG. 7H.

FIG. 7H shows that, while the first representation of the plurality of notifications is displayed in the second configuration 7000-*b*, in response to an upward swipe gesture 7038, the notifications in the plurality of notifications can be scrolled in the second configuration 7000-*b*. After scrolling, as shown in FIG. 7I, the notification 7002 has been scrolled off the display and the notification 7004 is now displayed at the top of the representation 7000 (e.g., at the top of the "stack" of notifications). The notification count 7024 updates to reflect that 4 additional notifications can be displayed if the user continue scrolling, and at least one notification of those 4 additional notifications is associated with the application D.

FIG. 7J shows that a user can interact with displayed notifications, for example, through a tap gesture 7040 on a notification 7004. As the notification 7004 is the topmost notification in the plurality of notifications, as shown in FIG. 7K, in response to detecting the tap gesture 7040, the portable multifunction device 100 displays an affordance 7042 for opening the application Z, associated with the notification 7004. In some embodiments, in response to detecting the tap gesture 7040, the portable multifunction device 100 instead launches the application Z and displays a user interface for the application Z.

FIG. 7L is analogous to FIG. 7H, but shows a tap input 7044 on the notification 7006 instead of the notification 7004. As the notification 7006 is not the topmost notification in the plurality of notifications, as shown in FIG. 7M, in response to detecting the tap gesture 7044, the portable multifunction device 100 scrolls the notifications in the plurality of notifications such that the notification 7006 is displayed as the topmost notification (e.g., the portable multifunction device 100 scrolls notification 7004 off the display). After scrolling the notifications (e.g., and without requiring further user input), the portable multifunction device 100 displays an affordance 7046 for opening the application S that is associated with the notification 7006. Alternatively, in some embodiments, the portable multifunction device 100 does not respond to the tap gesture 7044 (e.g., because the notification 7006 is not the topmost notification). In such embodiments, only the topmost notification (e.g., the notification 7004) is available for interaction.

In some embodiments, neither the notification 7004 nor the notification 7006 are available for interaction while the representation 7000 is displayed in the second configuration 7000-*b*. In some embodiments, none of the notifications visible in the representation 7000 are available for interaction while the representation 7000 is displayed in the second configuration 7000-*b*. In such embodiments, the user changes the configuration for the representation 7000 (e.g., via various user inputs, as described in further detail with reference to FIGS. 7G, 7P, 7R and 7S) to interact with notifications represented in the representation 7000.

FIG. 7N shows that the user-selected configuration is persistent. For example, as the time advances from 9:41 to 11:31, even if the display of the portable multifunction device 100 enters a sleep state or a low power state (e.g., after a threshold period of inactivity from the user, or in response to a user input), the first representation of the plurality of notifications remains displayed in the second configuration 7000-*b* (e.g., the next time the portable multifunction device is woken).

FIG. 7N also shows that a session 7048 has been received/generated. The session 7048 is a user interface that is contextually relevant, and is displayed separately from the representation of the plurality of notifications in the second configuration 7000-*b* (e.g., for clarity and/or ease of access). Examples of contextually relevant user interfaces include urgent (e.g., time sensitive) notifications, boarding passes, music player controls (e.g., while music is being played on the portable multifunction device 100), or a user interface associated with an ongoing event (e.g., a user interface that displays status information for a food delivery order that is in progress, a user interface that displays the score of an ongoing sports game, or a user interface that displays workout information while a user is exercising).

In some embodiments, the session 7048 is visually distinct from other notifications (e.g., notifications represented by the representation 7000). For example, as shown in FIG. 7N, the session 7048 has a bolded border to draw attention to the session 7048, and to distinguish the session 7048 from other user interface elements (e.g., non-urgent notifications, notifications that are not time sensitive, and/or old or older notifications) that are not contextually relevant.

As shown in FIG. 7N, the user has ordered food from an application F, and the session 7048 displays information related to the user's food delivery order. The session 7048 remains "contextually relevant," as the session 7048 can provide updates to the user throughout the food delivery process. Thus, until the user receives the food delivery, the session 7048 is displayed at the top of the displayed notifications (e.g., above, and separate from, the representation 7000 in the second configuration 7000-*b*), and provides relevant information to the user regarding the user's food delivery.

FIG. 7O shows that the session 7048 updates with new information as the time advances to 11:45. FIG. 7O also shows that a new notification 7050 associated with an application C has been received/generated. Because the session 7048 is contextually relevant, it remains displayed at the top of the displayed notifications, even though the notification 7050 is more recent (e.g., would normally be displayed above older notifications based on reverse chronological order).

In some embodiments, a newly received notification (e.g., a notification received after a user has changed the configuration for the representation 7000) such as the notification 7050 is initially displayed separate from the first representation of the plurality of notifications in the second configuration 7000-*b*. This provides visual feedback regarding which notifications are new (e.g., that the user has not previously viewed and/or interacted with). For example, in FIG. 7O, the notification 7050 is not displayed in the stack with the notification 7002 and the notification 7004 (e.g., does not at least partially overlay the notification 7002 and the notification 7004).

As shown in FIG. 7P, after a threshold amount of time (e.g., 30 seconds, 1 minute, 5 minutes, or 15 minutes), the notification 7050 is no longer considered recent, and is now displayed in the representation 7000 in the second configuration 7000-*b*. In contrast, since the session 7048 is still contextually relevant, it remains displayed separately, even though the threshold amount of time has already passed.

In response to detecting a pinch gesture 7052, or a downward swipe gesture 7054, at a location corresponding to the representation 7000, the portable multifunction device 100 transitions to displaying the representation 7000 in the third configuration 7000-*c*. As described above, the representation 7000 in the third configuration 7000-*c* includes a count of the number of notifications represented by the first representation. As shown in FIG. 7Q, the count of notifications is 8 notifications, including the most recently generated notification 7050. The session 7048 remains displayed separately from the representation 7000 of the plurality of notifications in the third configuration 7000-*c* (e.g., and the session 7048 is displayed separately, regardless of what configuration the representation 7000 of the plurality of notifications is displayed in). As the session 7048 is displayed separately from (e.g., not represented by) the representation 7000 of the plurality of notifications in the third configuration 7000-*c*, the session 7048 is not included in the count of notifications.

While FIG. 7G-7Q show changing from the first configuration 7000-*a* to the second configuration 7000-*b*, then changing from the second configuration 7000-*b* to the third configuration 7000-*c*, in some embodiments, the user can change from the first configuration 7000-*a* directly to the third configuration 7000-*c*. In such embodiments, a characteristic of the user input (e.g., a size of the movement of the user input) determines which configuration is selected. For example, returning to FIG. 7G, if the pinch gesture 7034 is a small pinch gesture (e.g., the pinch gesture 7034 include a small amount of movement of the two contacts of the pinch gesture 7034 towards one another), the portable multifunction device 100 transitions to displaying the representation 7000 in the second configuration 7000-*b* (e.g., as described above). If, however, the pinch gesture 7034 is a large (or larger) pinch gesture (e.g., includes a large or larger amount of movement of the two contacts of the pinch gesture 7034 towards one another), the portable multifunction device 100 instead transitions to displaying the representation 7000 in the third configuration 7000-*c* (e.g., as shown in FIG. 7Q) directly, and without first displaying the representation 7000 in the second configuration 7000-*b*. This allows the user to quickly switch to a desired configuration (e.g., with a single gesture), without being forced to switch through other undesired configurations (e.g., to switch through configurations in a predefined order).

FIG. 7R shows a depinch gesture 7056, or an upward swipe gesture 7058, at a location corresponding to the representation 7000 in the third configuration 7000-*c*. As shown in FIG. 7S, in response to detecting the depinch gesture 7056, or the upward swipe gesture 7058, the portable multifunction device 100 transitions from displaying the representation 7000 in the third configuration 7000-*c*, to displaying the representation 7000 in the second configuration 7000-*b*. FIG. 7R shows two possible gestures, but the exemplary gestures can be replaced by any suitable gesture. The two examples shown in FIG. 7R, however, are illustrative as a depinch gesture and an upward swipe gesture are opposite gestures compared to the exemplary gestures described above (e.g., the pinch gesture 7052 and the downward swipe gesture 7054, of FIG. 7P). For example, a pinch gesture can be used to switch from the first, to the second, to the third configuration (e.g., switching from configurations that occupy a larger amount of space on the display, to configurations that occupy less space on the display compared to the previous configuration), and a depinch gesture can be used to switch in the opposite direction (e.g., from the third, to the second, to the first configuration). Pairing gestures that have opposite types of movement provides an intuitive way for users to switch between configurations.

FIG. 7S shows a depinch gesture 7060, or an upward swipe gesture 7062, at a location corresponding to the representation 7000 in the second configuration 7000-*b*. While the representation 7000 is displayed in the second configuration 7000-*b*, the user can switch back to the third configuration 7000-*c* (e.g., via a user input such a pinch gesture or downward swipe gesture analogous to the gestures in FIG. 7P).

As shown in FIG. 7T, in response to detecting the depinch gesture 7060, or the upward swipe gesture 7062, the portable multifunction device 100 transitions from displaying the representation 7000 in the second configuration 7000-*b*, to displaying the representation 7000 of the plurality of notifications in an expanded configuration 7000-*d*, which is an expanded version of the second configuration 7000-*b*. In some embodiments, the expanded configuration 7000-*d* is temporary. After a threshold amount of time (e.g., 30 seconds, 1 minute, 5 minutes, or 15 minutes), the portable multifunction device 100 reverts to displaying (e.g., redisplays) the representation 7000 in the second configuration 7000-*b* (e.g., the state shown in FIG. 7S). The temporary nature of the expanded configuration 7000-*d* allows a user to view additional details regarding the notifications in the plurality of notifications, without having to switch to the first configuration 7000-*a* (e.g., and then needing to switch back to the second configuration 7000-*b*, after viewing the additional details). In some embodiments, the notifications can be scrolled in the expanded version of the second configuration 7000-*b* (e.g., in response to detecting an upward swipe gesture 7063) (e.g., in the same manner as described above with reference to FIGS. 7H and 7I).

In some embodiments, the notifications in the plurality of notifications are displayed in reverse chronological order, with the oldest notification being displayed at the bottom of the displayed notifications. In such embodiments, if one or more older notifications are not displayed (e.g., because there are enough recent notifications that the one or more older notifications do not fit on the display), in response to detecting the upward swipe gesture 7063, the portable multifunction device 100 scrolls notifications (e.g., such that at least one of the one or more older notifications is now displayed, while maintaining display of the representation 7000 in the expanded configuration 7000-*d*). If the oldest notification is already displayed (e.g., notifications cannot be scrolled further), in response to detecting the upward swipe gesture 7063, the portable multifunction device instead transitions to displaying the representation 7000 in the first configuration 7000-*a* (e.g., as shown in FIG. 7U).

In some embodiments, the representation 7000 is displayed in the expanded configuration 7000-*d* in response to a user request to scroll notifications (e.g., the upward swipe gesture 7038 in FIG. 7H). In such embodiments, the expanded configuration 7000-*d* is optionally a temporary configuration (e.g., for scrolling notifications). If the portable multifunction device 100 ceases to display the representation 7000 (e.g., in response to detecting a user input, or when the portable multifunction device transitions to a low power or sleep state), in response to a first event (e.g., that transitions the portable multifunction device 100 out of the low power or sleep state), the portable multifunction device 100 redisplays the representation 7000 in the second configuration 7000-*b* (e.g., and not in the expanded configuration 7000-*d*).

As an alternative to FIG. 7T, FIG. 7U shows that, in response to detecting the depinch gesture 7060, or the upward swipe gesture 7062 (shown in FIG. 7S), the portable multifunction device 100 instead transitions from displaying representation 7000 in the second configuration 7000-*b*, to displaying the first representation 7000 in the first configuration 7000-*a*. The session 7048 remains displayed at the top of the displayed notifications (e.g., even though it is out of reverse chronological order with the other notifications).

While FIG. 7R-7U show changing from the third configuration 7000-*c* to the second configuration 7000-*b*, then changing from the second configuration 7000-*b* to the first configuration 7000-*a*, in some embodiments, the user can change from the third configuration 7000-*c* directly to the first configuration 7000-*a*. In such embodiments, a characteristic of the user input (e.g., a size of the movement of the user input) determines which configuration is selected (e.g., as described above with reference to FIGS. 7R-7U). For example, returning to FIG. 7R, if the upward swipe gesture 7058 is a small swipe gesture (e.g., the swipe gesture 7058 include a small amount of upward movement), the portable multifunction device 100 transitions to displaying the representation 7000 in the second configuration 7000-*b* (e.g., as described above). If, however, the upward swipe gesture 7058 is a large (or larger) swipe gesture (e.g., includes a large or larger amount of upward movement), the portable multifunction device 100 instead transitions to displaying the representation 7000 in the first configuration 7000-*a* (e.g., as shown in FIG. 7U) directly, and without needing to first display the representation 7000 in the second configuration 7000-*b*.

Figures 1, 7V:
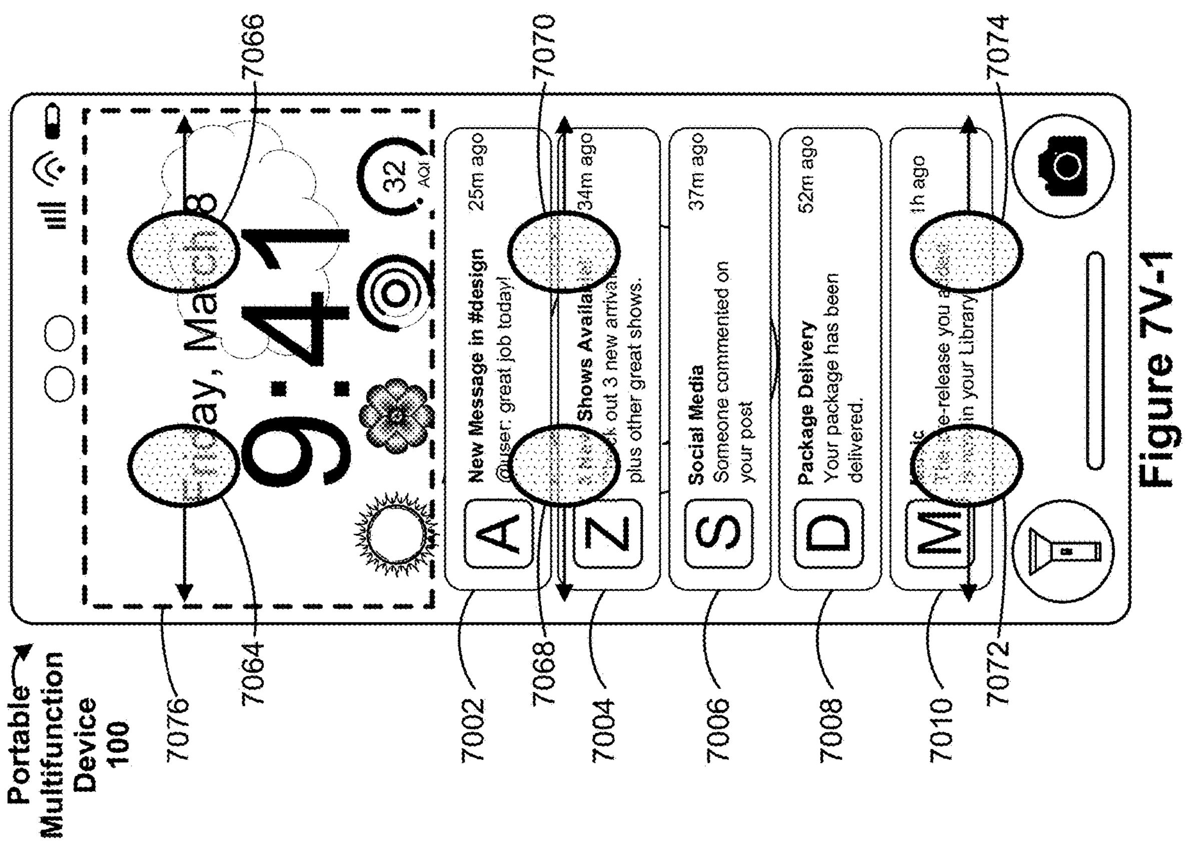
Figures 3, 7V:
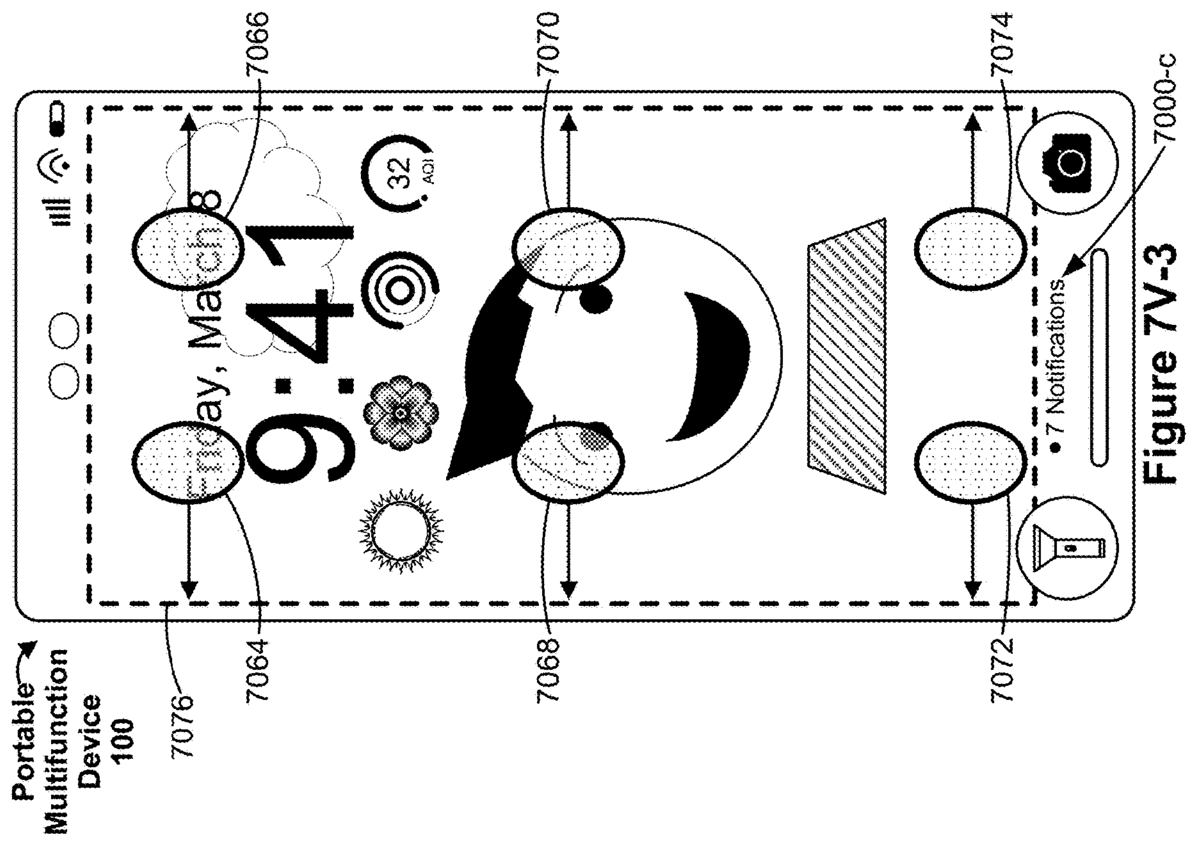

FIGS. 7V-1 through 7V-3 shows a region 7076 for invoking a system user interface of the portable multifunction device 100 (e.g., a system user interface for accessing functions of the portable multifunction device 100, or a camera user interface). A size of the region 7076 changes depending on which configuration the representation 7000 is displayed in.

For example, when the representation 7000 is displayed in the first configuration 7000-*a*, the region 7076 is confined to an upper portion of the display, as shown in FIG. 7V-1. A first leftward swipe gesture 7064 and a first rightward swipe gesture 7066 are shown in the region 7076. In response to detecting the first leftward swipe gesture 7064, and because the first leftward swipe gesture 7064 is within the region 7076, the portable multifunction device 100 displays a system user interface for accessing functions of the portable multifunction device 100. In response to detecting the first rightward swipe gesture 7066, the portable multifunction device 100 displays a camera user interface.

FIG. 7V-1 also shows two additional pairs of swipe gestures: a second leftward swipe gesture 7068 and a second rightward swipe gesture 7070, and a third leftward swipe gesture 7072 and a third rightward swipe gesture 7074. In FIG. 7V-1, the second leftward swipe gesture 7068 and the second rightward swipe gesture 7070 are not in the region 7076, and so the portable multifunction device does not display a system user interface.

As the second set of swipe gestures falls between the notification 7002 and the notification 7004, without being detected at a location corresponding to (e.g., over, or predominately over, a specific notification), the portable multifunction device 100 forgoes displaying any affordances (e.g., for opening an application associated with a notification, for dismissing a notification, for deferring the notification, and/or for configuring display settings for the notification) for interacting with a notification, and forgoes performing any actions associated with a notification.

In contrast, the third set of swipe gestures are detected at a location corresponding to the notification 7010. In response to detecting the third leftward swipe gesture 7072, the portable multifunction device 100 dismisses the notification 7072 (e.g., if the movement of the third leftward swipe gesture meets a distance threshold), or displays one or more affordances for interacting with the notification (e.g., an affordance for deferring the notification, an affordance for dismissing the notification, and/or an affordance for configuring display settings for the notification 7010). In response to detecting the third rightward swipe gesture 7074, the portable multifunction device 100 opens the application M associated with the notification 7010 (e.g., if the movement of the third rightward swipe gesture 7074 meets a distance threshold), or displays one or more affordances for interacting with the notification (e.g., one or more affordances different than the one or more affordances displayed in response to the third leftward swipe gesture 7072, and/or an affordance such as the affordance 7042 described above with reference to FIG. 7K).

FIG. 7V-2 shows the same six swipe gestures as FIG. 7V-1, but the region 7076 has a larger size (e.g., because the representation 7000 in the second configuration 7000-*b* occupies less space on the display). The first leftward swipe gesture and the first rightward swipe gesture are both within the region 7076, and the portable multifunction device performs the same functions in response to these gestures, as described above with reference to FIG. 7V-1. For the second set of swipe gestures, the second leftward swipe gesture 7068 and the second rightward swipe gesture 7070 are also within the region 7076, and so behave in an analogous way to the first leftward swipe gesture 7064 and the first rightward swipe gesture 7066 (e.g., the portable multifunction device 100 performs the same functions in response to detecting the first leftward swipe gesture 7064 and the second leftward swipe gesture 7068, and in response to detecting the first rightward swipe gesture 7066 and the second leftward swipe gesture 7070).

For the third set of swipe gestures, the third leftward swipe gesture 7072 and the third rightward swipe gesture 7074 are still located outside the region 7076, and so the portable multifunction device 100 forgoes displaying a system user interface in response to detecting the third leftward swipe gesture 7072 or the third rightward swipe gesture 7074. As shown in FIG. 7V-2, the third set of swipe gestures is detected at a location over the notification 7018. In some embodiments, the portable multifunction device 100 forgoes performing any actions in response to detecting the third leftward swipe gesture 7072 or the third rightward swipe gesture 7074, as the notification 7018 is not displayed at the top of the representation 7000. In some embodiments, the portable multifunction device 100 scrolls notifications such that the notification 7018 is displayed at the top of the stack of notifications (e.g., in an analogous fashion to the scrolling described above with reference to FIGS. 7L and 7M). In such embodiments, the portable multifunction device 100 performs the same functions, or displays the same affordances, in response to detecting the third leftward swipe gesture 7072 or the third rightward swipe gesture 7074, as described above with reference to FIG. 7V-1.

FIG. 7V-3 shows the same six swipe gestures as FIG. 7V-1 and FIG. 7V-2, but the region 7076 has an even larger size (e.g., e.g., because the representation 7000 in the third configuration 7000-*c* occupies less space on than the first configuration 7000-*a* and the second configuration 7000-*b* on the display). As shown in FIG. 7V-3, all three sets of swipe gestures are located within the region 7076. In response to detecting the first leftward swipe gesture 7064, the second leftward swipe gesture 7068, or the third leftward swipe gesture, 7072, the portable multifunction device 100 displays a system user interface for accessing functions of the portable multifunction device 100. In response to detecting the first rightward swipe gesture 7066, the rightward swipe gesture 7070, or the rightward swipe gesture 7074, the portable multifunction device 100 displays a camera user interface.

FIGS. 8A-8AN illustrate example user interfaces for displaying one or more sessions in a session region of a user interface in accordance with some embodiments. FIG. 8A illustrates a wake screen user interface 800 that optionally includes a date indication, a time indication, one or more complications, and/or icons for accessing a camera and/or flashlight. In some embodiments, indications of one or more notifications are optionally displayed on wake screen user interface 800. For example, indications for notification 804, notification 806-1, and "+6 more notifications" are displayed.

In some embodiments, in accordance with a determination that a respective notification corresponds to an application that supports event updates, an option 802 for subscribing to the event of the respective notification 804 is optionally displayed. For example, notification 804 corresponds to a notification for a food delivery application, and in response to user input 808, the device 100 subscribes to the food delivery order indicated in notification 804. In some embodiments, in accordance with a determination that the user has requested to subscribe to the food delivery order, the device displays a session 816-1 for the food delivery order, as described with reference to FIG. 8D.

Figure 8B:
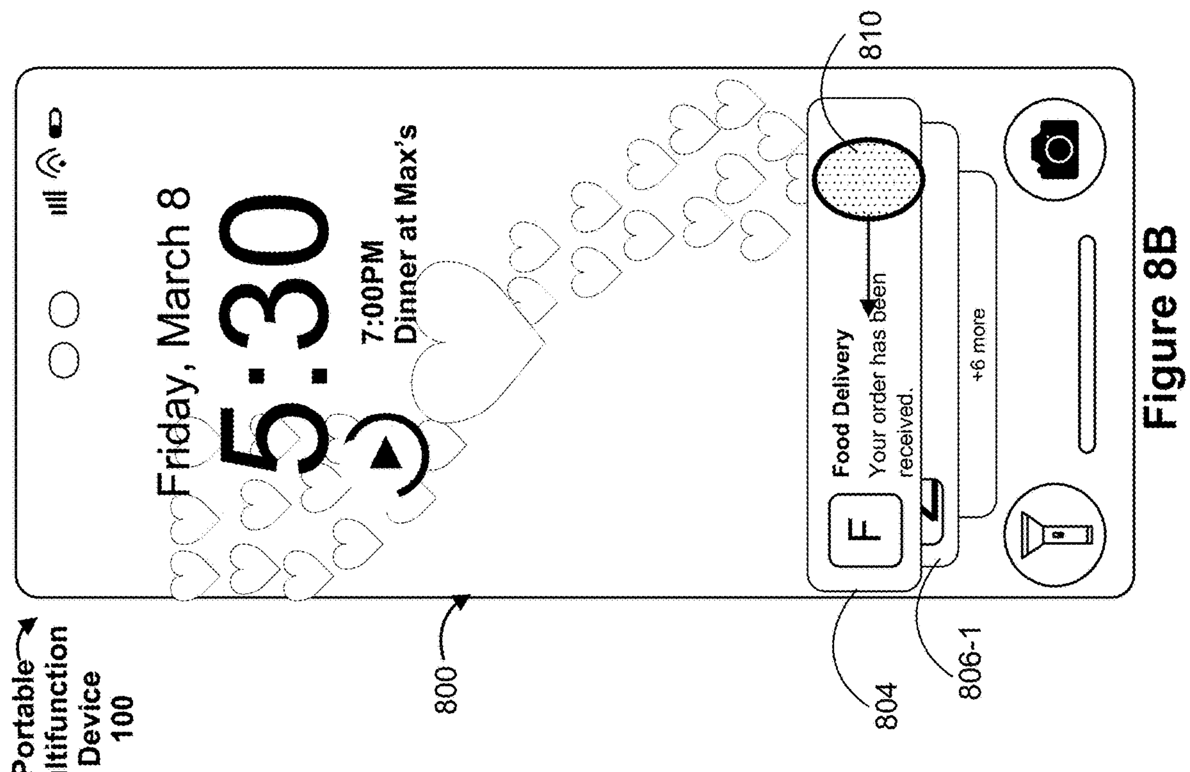

In some embodiments, as illustrated in FIG. 8B, option 802 is not displayed with the notification 804. In some embodiments, the device displays options for the notification, for example in response to a swipe user input 810 (or other gesture) directed to the notification 804. In some embodiments, in response to user input 810, the device 100 displays one or more options for the notification 804, for example an option to subscribe to the event associated with the notification and/or an option to dismiss the notification (e.g., to remove the notification from display in the wake screen user interface 800, as illustrated in FIG. 8C).

Figure 8D:
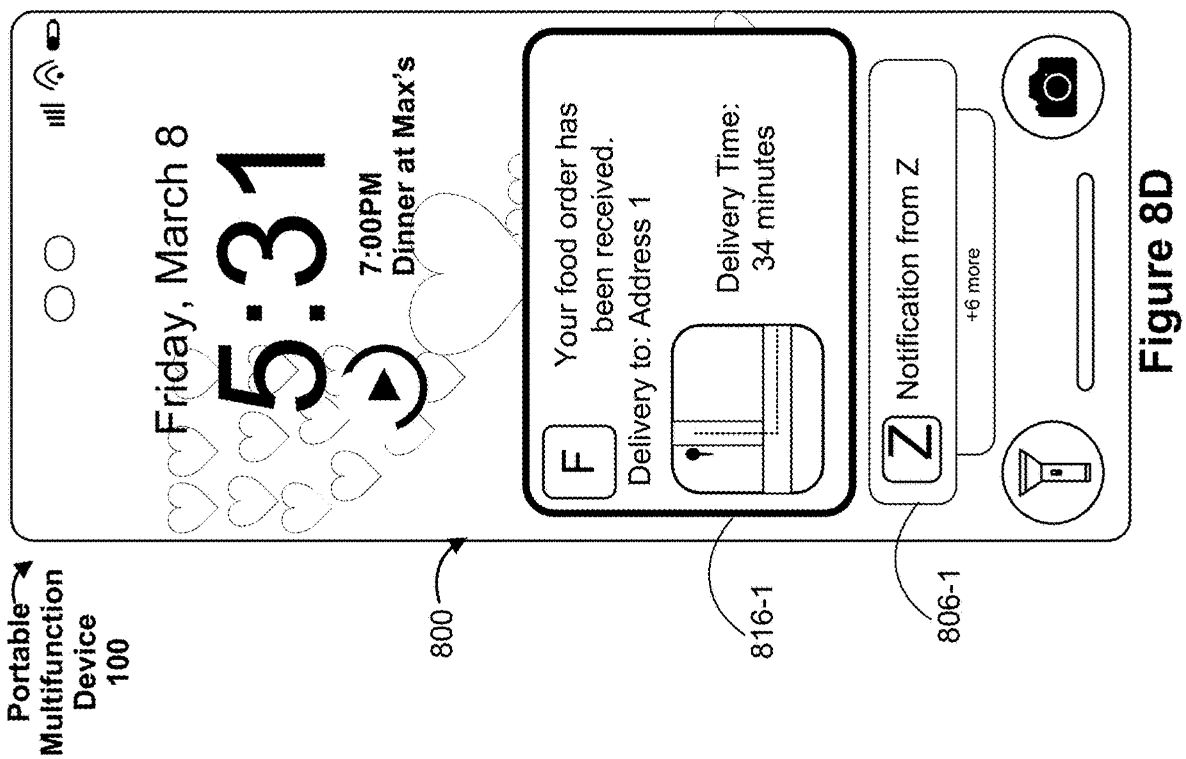
Figure 8C:
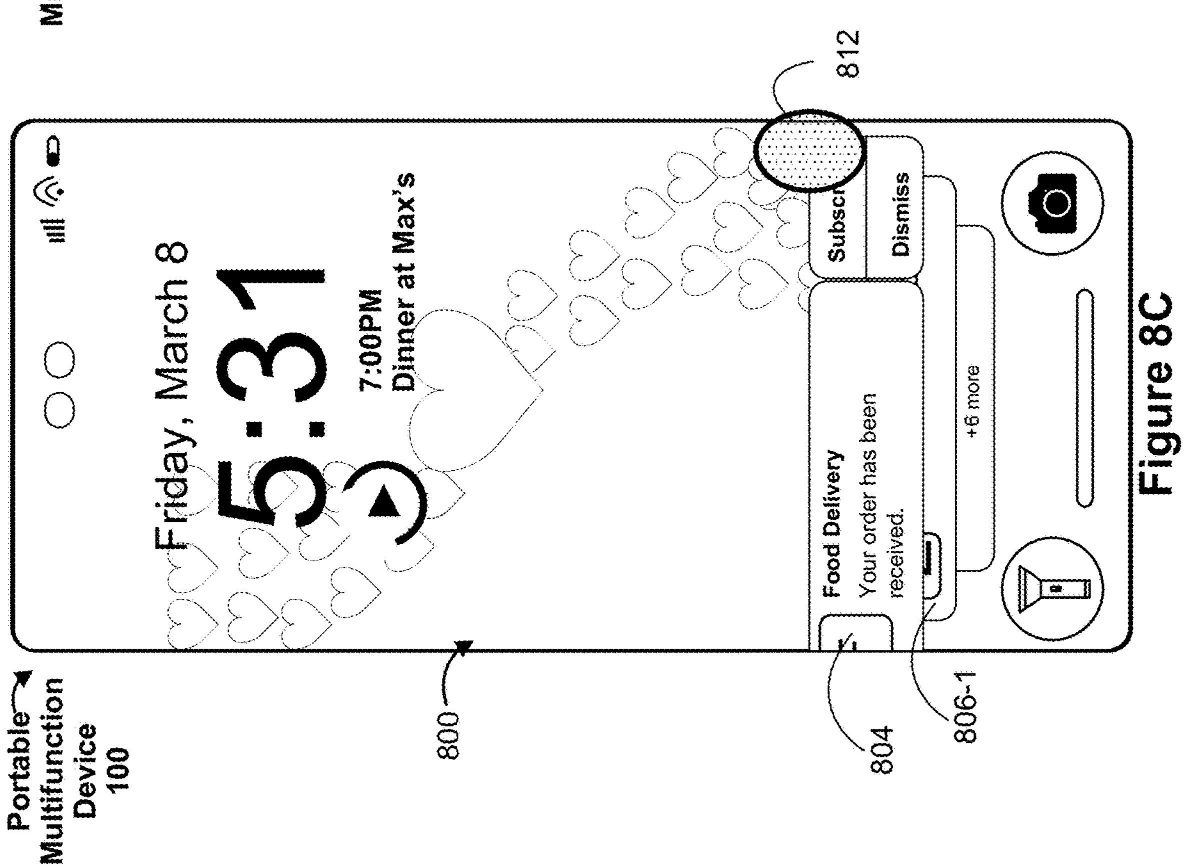

FIG. 8C illustrates a user input 812 selecting the option to subscribe to the event (e.g., the food delivery event corresponding to notification 804). In some embodiments, in response to user input 812, the device 100 displays a session 816-1 for the food delivery event, as illustrated in FIG. 8D, optionally while continuing to display indications for notifications, such as notification 806-1, that have not been dismissed from the wake screen user interface 800.

Figure 8F:
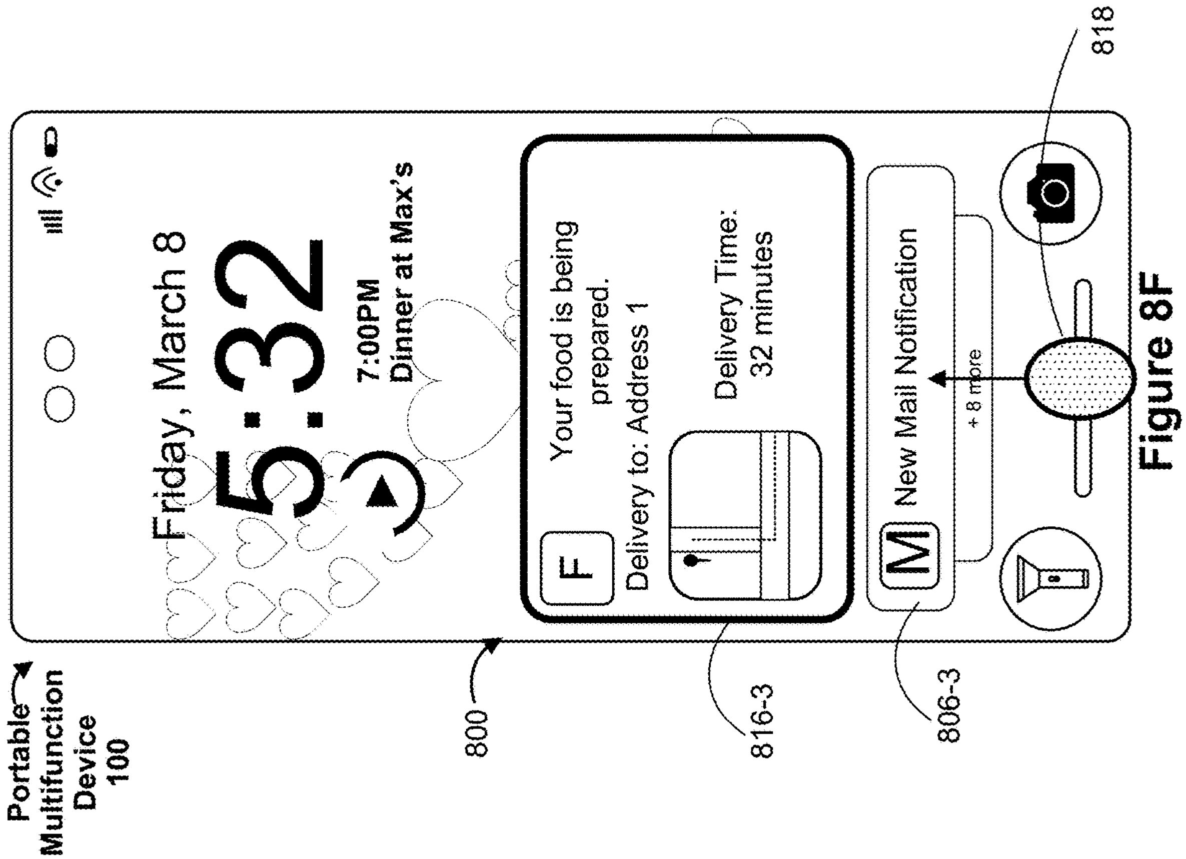
Figure 8E:
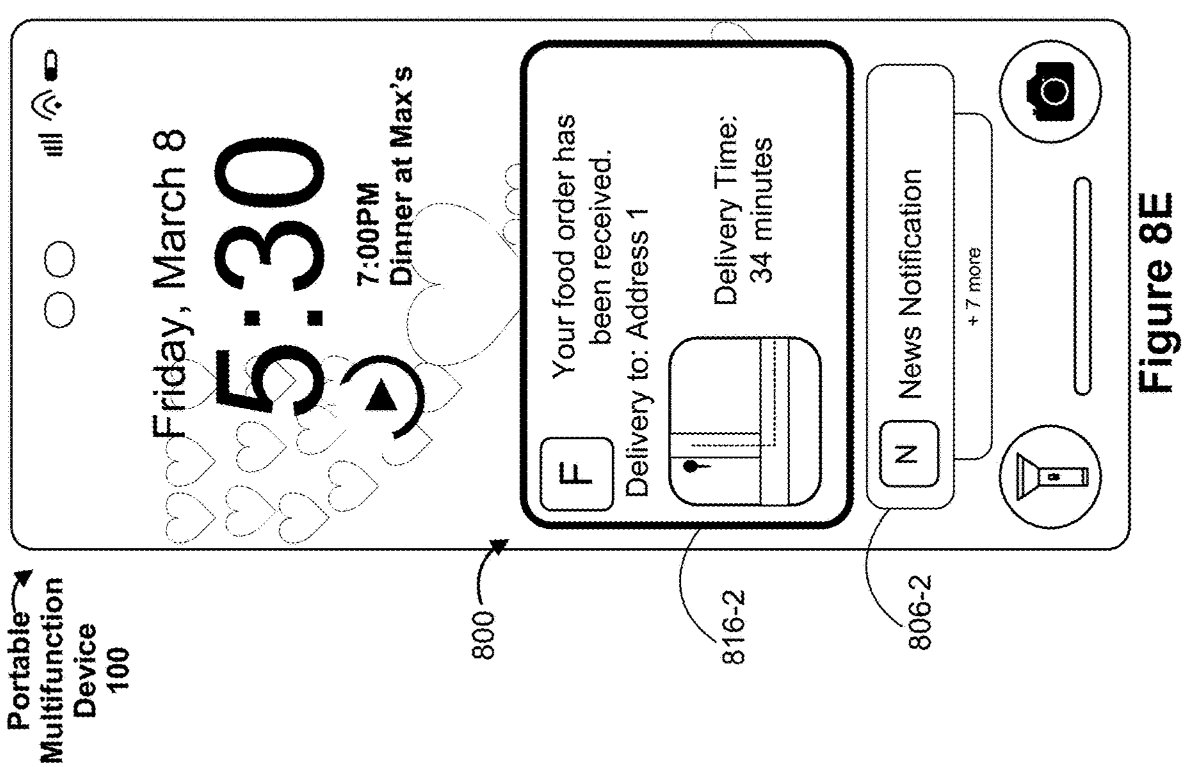

In some embodiments, session 816-1 for the food delivery event is displayed within a predefined session region of the user interface. In some embodiments, the session region is above a notification region of the user interface (e.g., that displays notifications, including notification 806-1). In some embodiments, session 816-1 updates with status information related to the event of the session. For example, session 816-1 updates an estimated delivery time (e.g., as illustrated in FIGS. 8E-8F). In some embodiments, session 816-1 includes additional status information for the event that is not displayed in a notification for the event. For example, session 816-1 includes additional status information, such as a map indicating a location of the delivery, and/or an estimated delivery time, that is not displayed in notification 804.

FIG. 8E illustrates that, while displaying session 816-2, a notification 806-2 is received. In some embodiments, notification 806-2 is displayed in the wake screen user interface without ceasing display of the session 816-2. In some embodiments, session 816-2 continues to be displayed at a same position in the wake screen user interface 800. For example, session 816-2 is maintained in the session region that is above the region of the wake screen user interface 800 that displays notifications, even if one or more notifications, or other alerts, are received after the session 816-2 is displayed.

FIG. 8F illustrates device 100 receiving another notification 806-3, and displaying the notification 806-3 while maintaining display of session 816-3. In some embodiments, session 816-3 includes updated status information for the food delivery event. For example, the session 816-3 states the delivery time is "32 minutes" whereas session 816-3, displays the delivery time in "34 minutes." In some embodiments, the status information displayed in the session 816 is retrieved from the application associated with the session, for example the food delivery application.

FIG. 8F illustrates a user input 818 corresponding to a request to dismiss the wake screen user interface 800. For example, user input 818 is a swipe gesture (e.g., an upward swipe). In some embodiments, in response to user input 818, the device 100 ceases display of the wake screen user interface 800 and optionally displays a home screen user interface or an application user interface. As such, the device 100 remains responsive to user inputs while session 816 is ongoing.

Figure 8H:
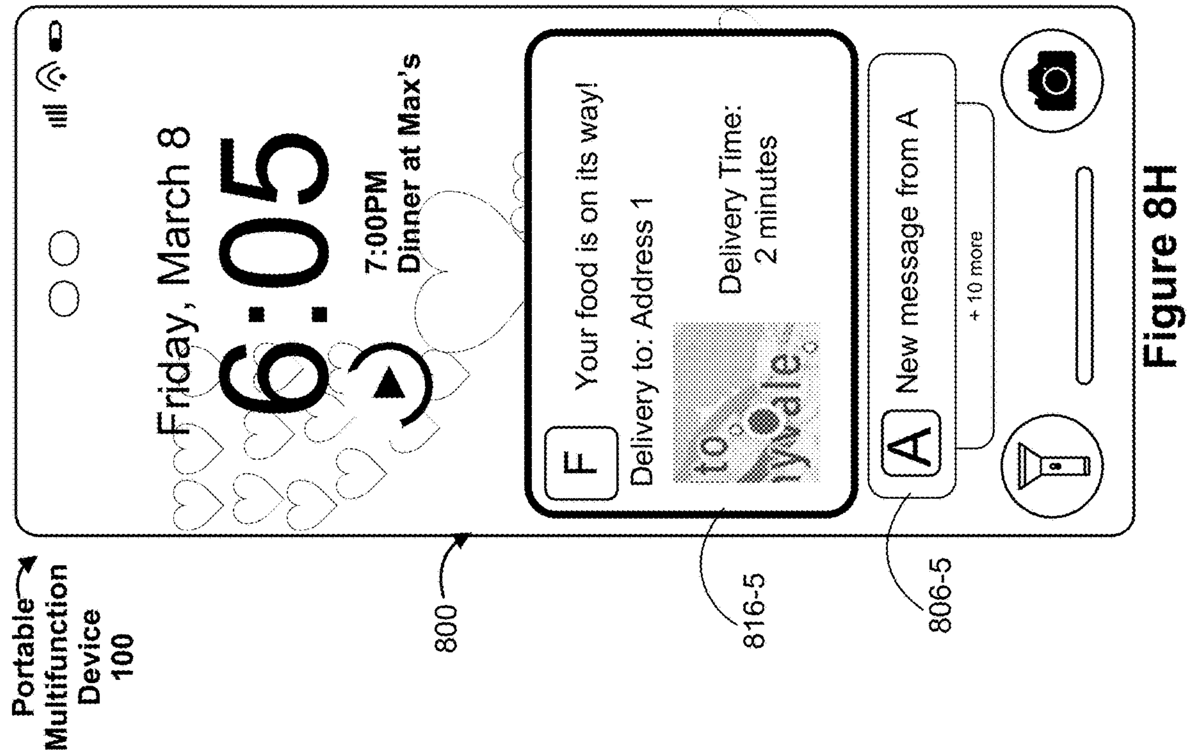
Figure 8G:
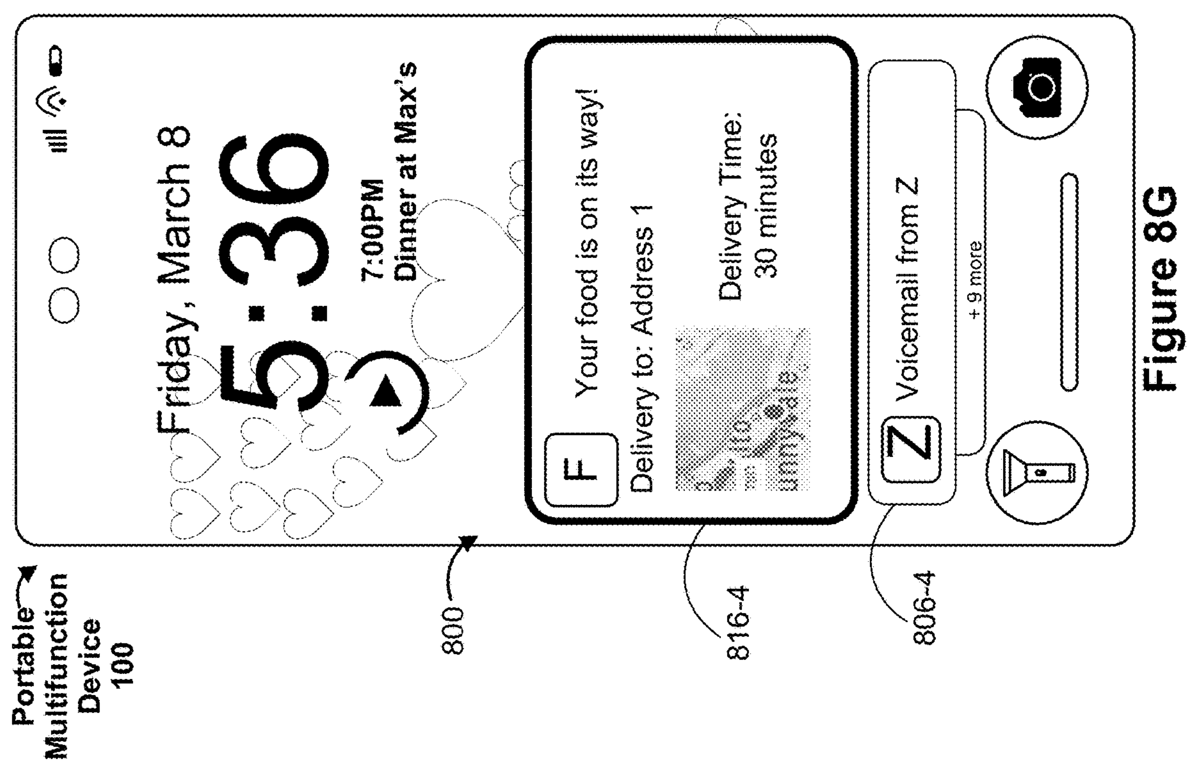

FIG. 8G illustrates session 816-4 updating the status information for the food delivery event. In some embodiments, updating the status information includes updating a map that indicates a location of the delivery. In some embodiments, updating the status information includes updating the estimated time until delivery. In some embodiments, the type of status information displayed, and updated, in a respective session is based on the type of event. For example, status information for an event for a food delivery, package delivery, workout (e.g., workout route) and/or ride share application optionally includes a map. In some embodiments, additional and/or alternative status information is included in the status region. FIG. 8G further illustrates a new notification 806-4 is received and displayed in the notification region below the status region.

In some embodiments, as illustrated in FIG. 8H, the session 816-5 continues to update, in real-time, the status information, and continues to display additional notifications, such as notification 806-5 on the wake screen user interface 800.

Figure 8I:
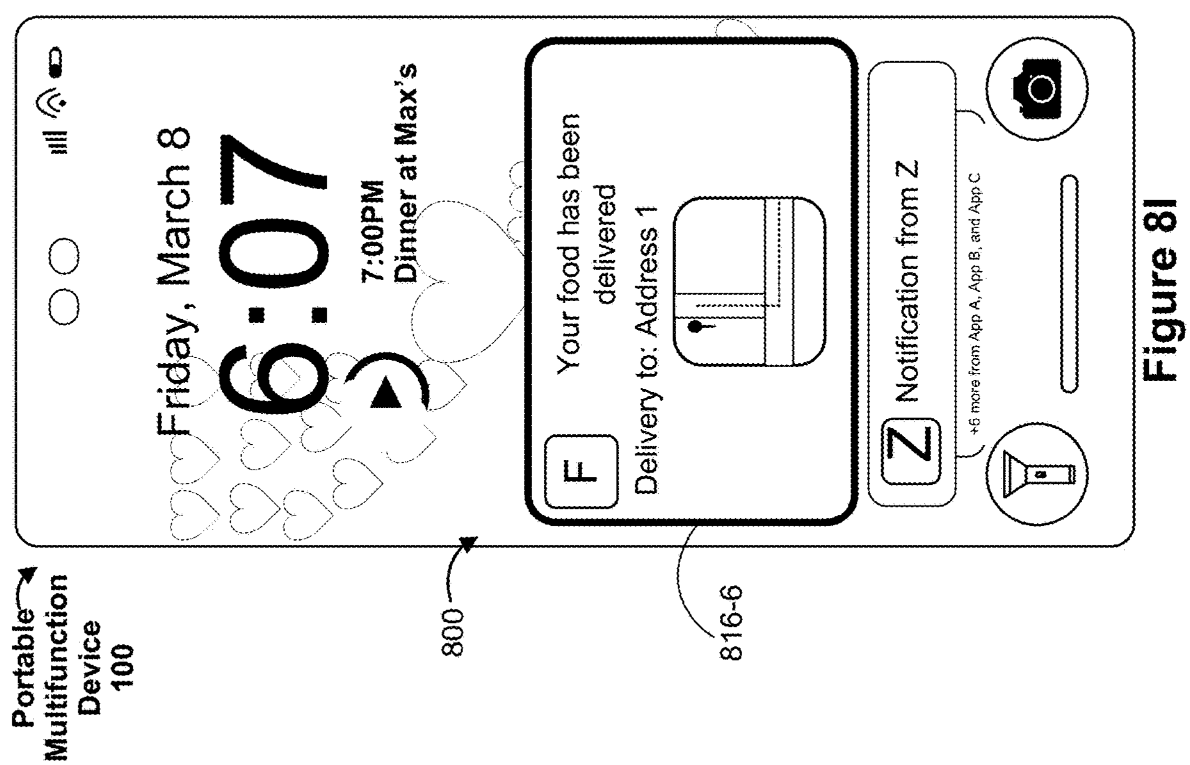

FIG. 8I illustrates the session 816-6 updating the status information to indicate the food delivery has arrived. In some embodiments, as the session 816 (e.g., session 816-1 through 816-6) updates, a size of the session is optionally maintained.

Figure 8J:
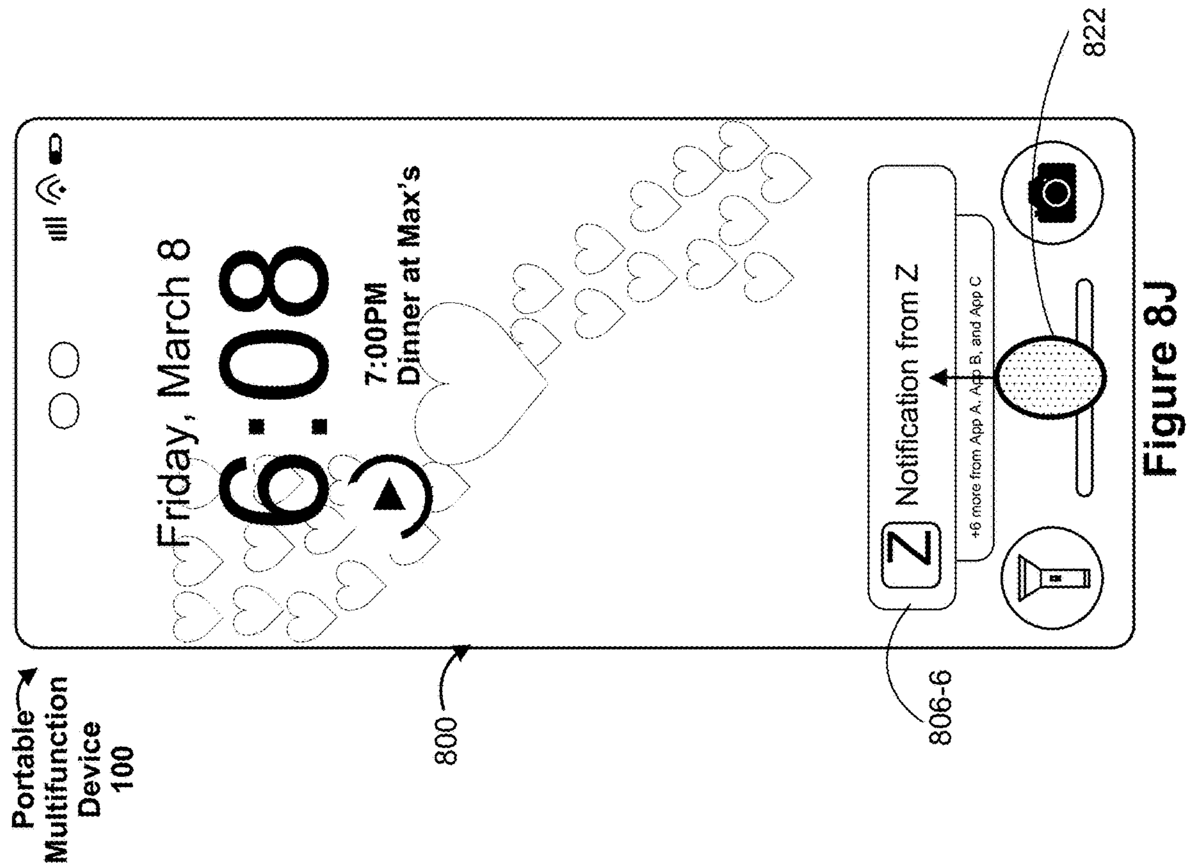

FIG. 8J illustrates that, in accordance with a determination that the event associated with session 816 is ended, complete, or otherwise no longer active, the session 816 is automatically, without user input, removed from display on wake screen user interface 800. For example, the user is not required to acknowledge, or provide any user input directed to, the session 816, and the device 100 ceases displaying the session 816. In some embodiments, a final status of the session 816 is maintained on the wake screen user interface 800 until the device has completed at least one wake cycle, including entering and exiting a low-power state (e.g., such that the device makes the final status available for viewing upon waking device 100 out of the low-power state, before the final status disappears). Thus, the session is persistent and maintained on the wake screen user interface 800 (e.g., in the session region), while the event corresponding to the session (e.g., the food delivery order) is ongoing, or active.

FIG. 8J illustrates that, although session 816 is automatically removed from the wake screen user interface 800, indications for notifications (e.g., notification 806-6) that have not been acknowledged and/or dismissed by the user, remain displayed. In some embodiments, the device 100 detects user input 822 corresponding to a request to navigate away from the wake screen user interface 800, and in response to user input 822, the device 100 displays a home screen user interface 801 (e.g., a first view of a home screen user interface), as illustrated in FIG. 8K.

Figure 8K:
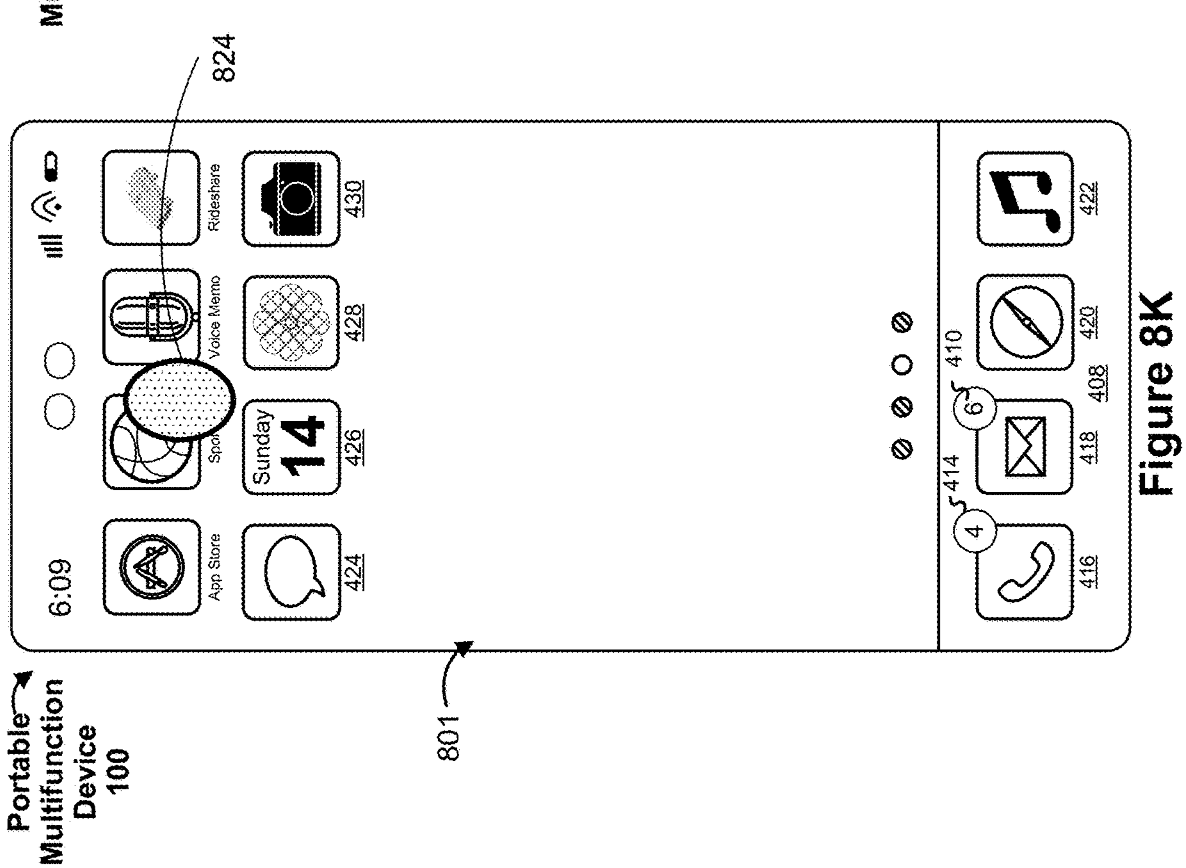
Figure 8L:
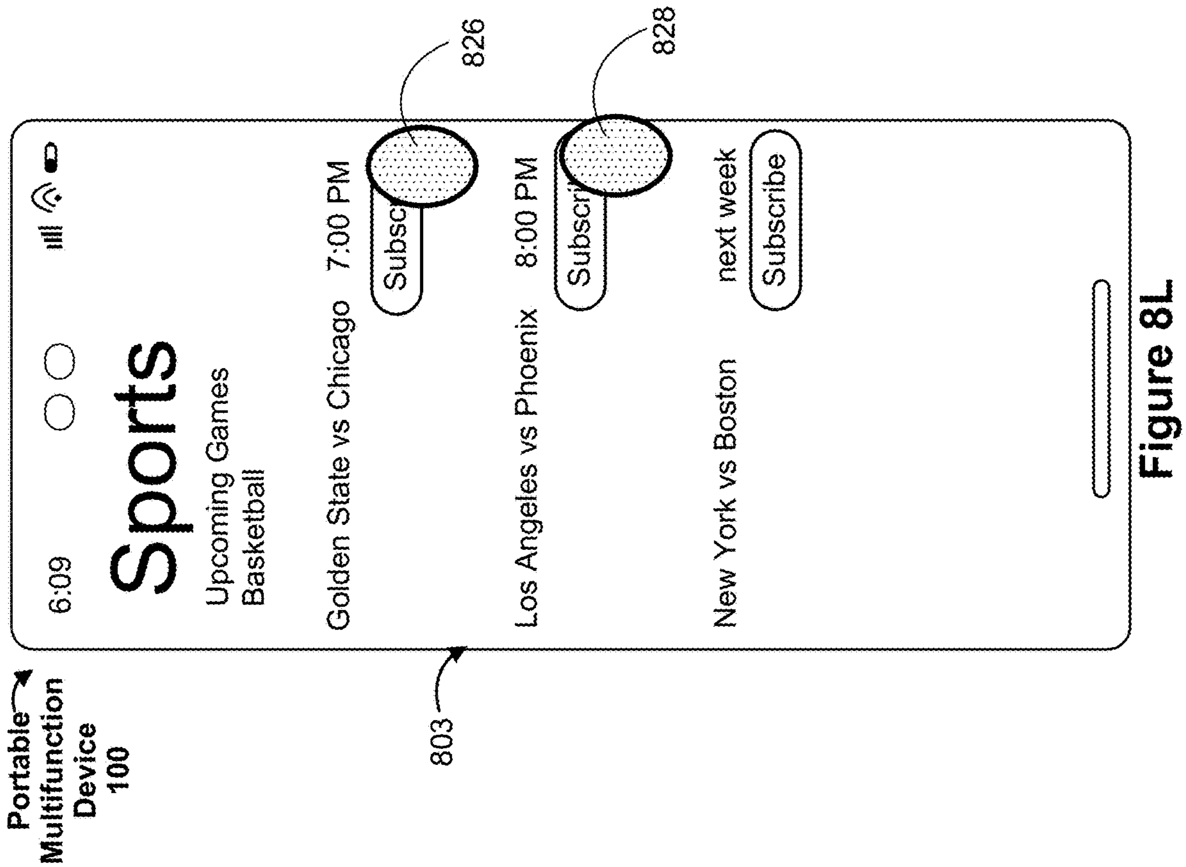

FIG. 8K illustrates user input 824 (e.g., a tap input or other selection input) requesting to open a sports application by selecting an application icon for the sports application. In response to user input 824, the device 100 displays an application user interface 803 for the sports application, as illustrated in FIG. 8L. In some embodiments, the application user interface 803 for the sports application includes indications for one or more upcoming basketball games. In some embodiments, each basketball game corresponds to an event that is made available to a user for subscription. In some embodiments, the device provides respective selectable user interface objects for subscribing to a particular event (e.g., game). For example, in response to a user input 826 directed to a "Subscribe" button for a first game (e.g., Golden State vs Chicago), a first event corresponding to the first game is subscribed, and/or in response to a user input 828 directed to a "Subscribe" button for a second game (e.g., Los Angeles vs Phoenix), a second event corresponding to the second game is subscribed.

In some embodiments, the device provide selectable options to subscribe to individual events (e.g., games), and/or to a set of events. For example, the device optionally provides respective selectable options that, when selected by respective user inputs, cause the device to subscribe to all events for an application (e.g., all events in the sports application, events that include a particular team (e.g., Golden State, Chicago, or Nets) and/or events of a certain type (e.g., football games, baseball games, or basketball games). In some embodiments, device 100 automatically subscribes to one or more events, without additional user input, based on past events that the user has previously subscribed. In some embodiments, the device unsubscribes from an event (e.g., as described with reference to FIG. 8AM) in response to detecting a user input that is directed to an un-subscription affordance and/or option corresponding to the event.

Figure 8N:
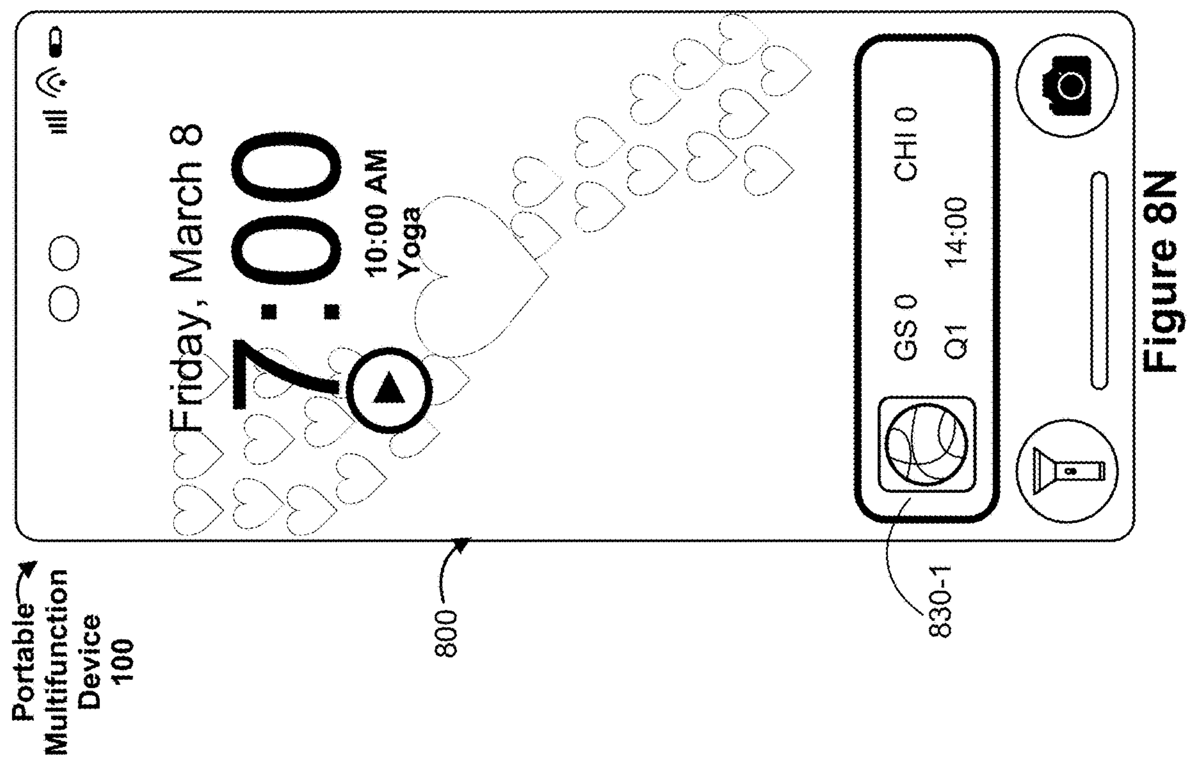
Figure 8M:
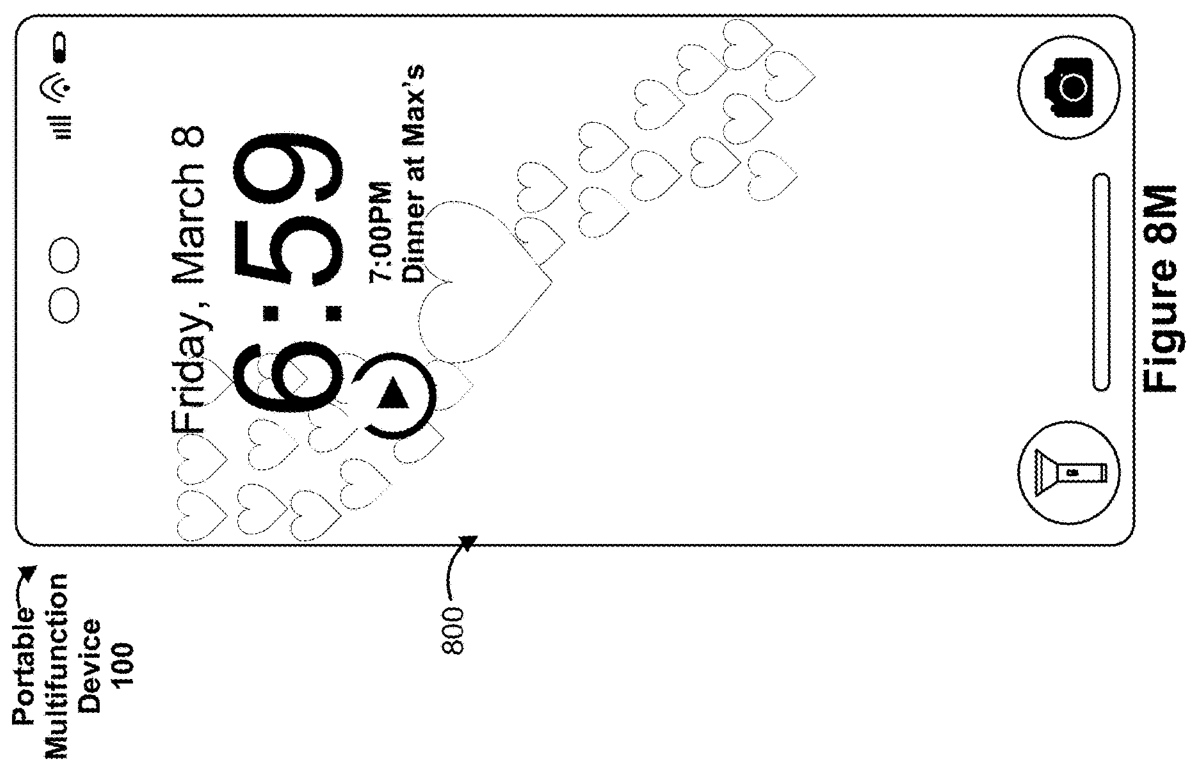

In some embodiments, after a user is subscribed to an event, the session for the event is not displayed in the session region on the wake screen user interface until the event has started, or is otherwise ongoing. For example, as illustrated in FIGS. 8M-8N, after the user has subscribed to the Golden State vs Chicago game that starts at 7:00 pm, in FIG. 8M, before the event (e.g., game) has started at 6:59 pm, the wake screen user interface 800 does not display a session for the event. In FIG. 8N, in accordance with the event starting (e.g., at 7:00 pm), the wake screen user interface 800 automatically displays session 830-1 for the event.

In some embodiments, one or more complications that are displayed in the wake screen user interface are also updated as the status of the respective application changes. For example, the music complication that indicates a playback completion of a media item is updated over time (e.g., between 6:59 and 7:00), and the calendar complication that displays an upcoming event ceases displaying "7:00 PM Dinner at Max's" and instead displays "10:00 AM Yoga" in accordance with a current time (e.g., at 7:00 pm the next upcoming event changes from dinner to yoga).

Figure 8P:
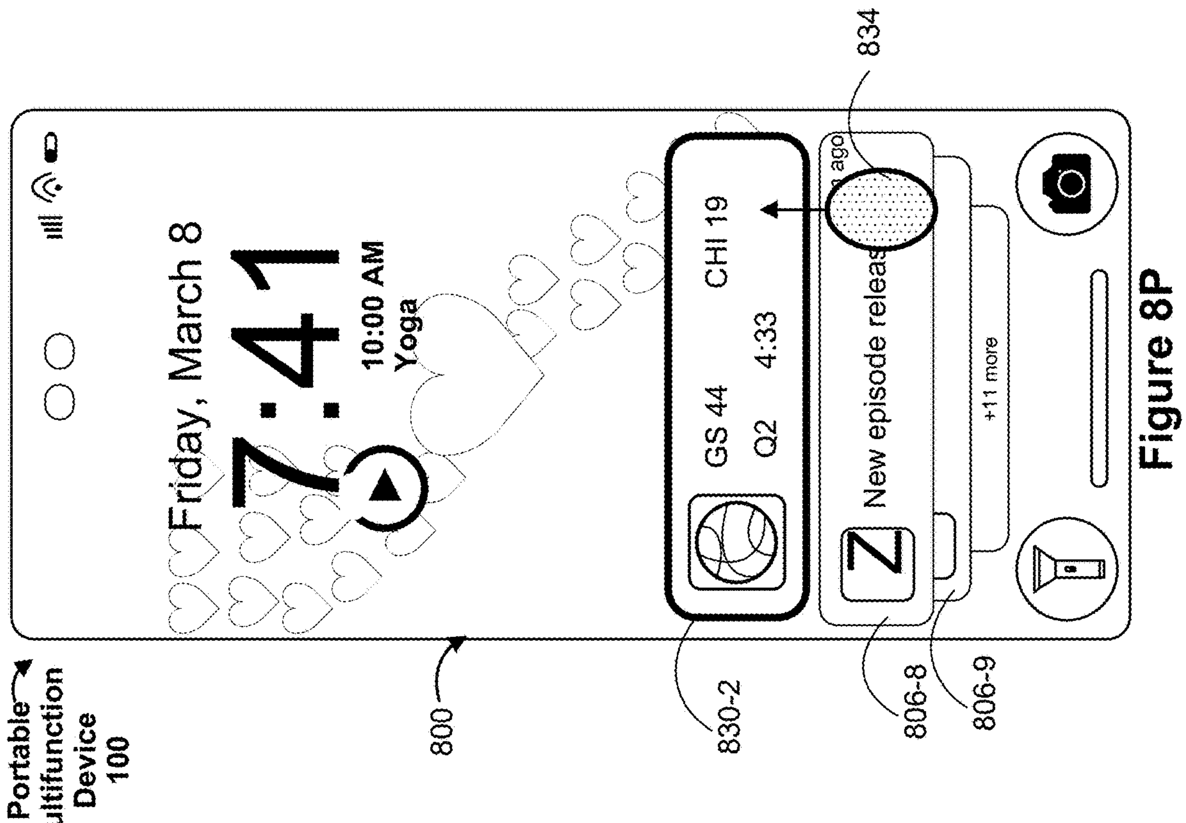
Figure 8O:
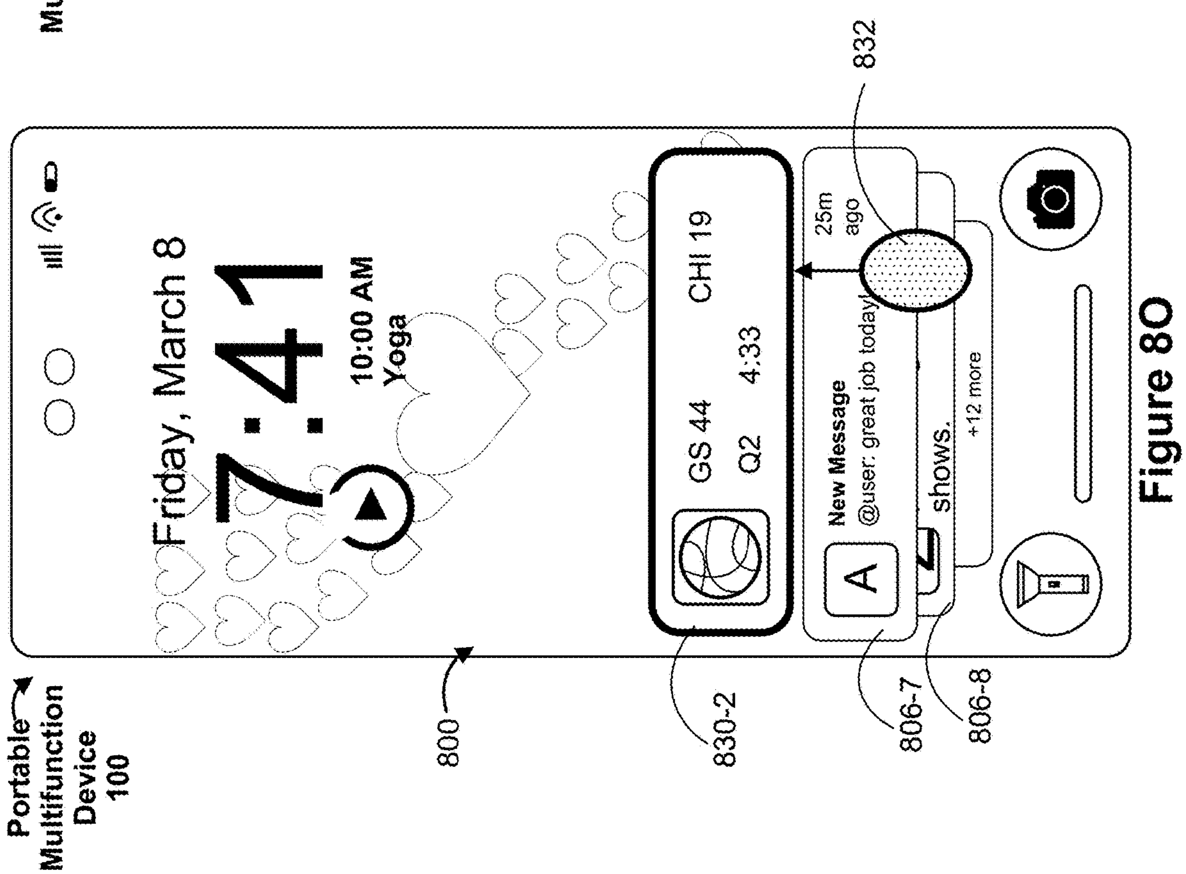

FIG. 8O illustrates session 830-2 updating over time (e.g., at 7:41 pm). In some embodiments, session 830-2 includes status information about the event, including a current quarter of the basketball game, a current score, and/or an amount of time remaining in the quarter.

FIG. 8O further illustrates a plurality of notifications that are concurrently displayed with session 830-2, including notification 806-7 and notification 806-8. In some embodiments, the device scrolls through the plurality of notifications in response to a user input that corresponds to a request to scroll through the plurality of notifications, for example user input 832 corresponds to a swipe gesture to cycle through the plurality of notifications.

FIG. 8P illustrates that, in response to user input 832, the device 100 scrolls through the notifications to bring notification 806-8 to the top of the stack, and displays a portion of an underlying notification 806-9. In some embodiments, the device responds to user interactions with the notifications according to any of the methods described with reference to FIGS. 7A-7V-3.

Figure 8R:
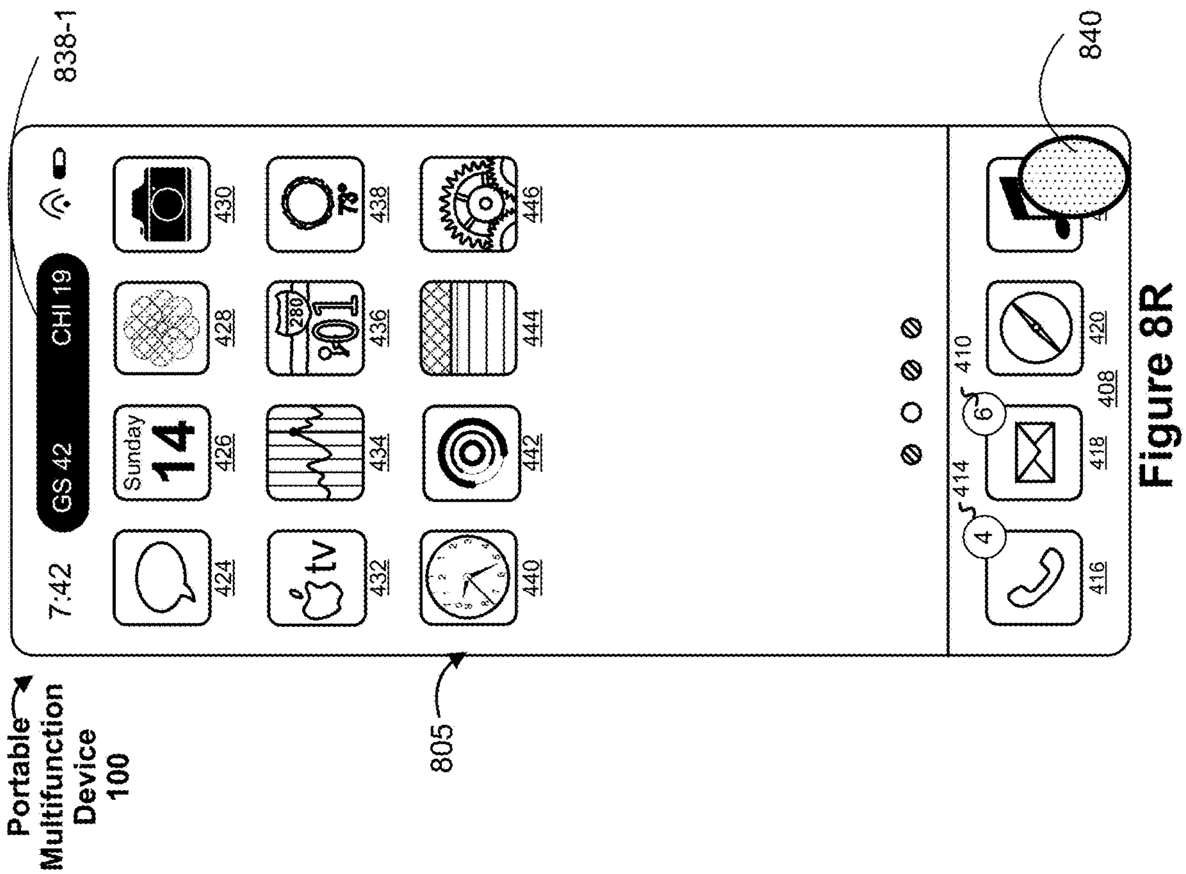
Figure 8Q:
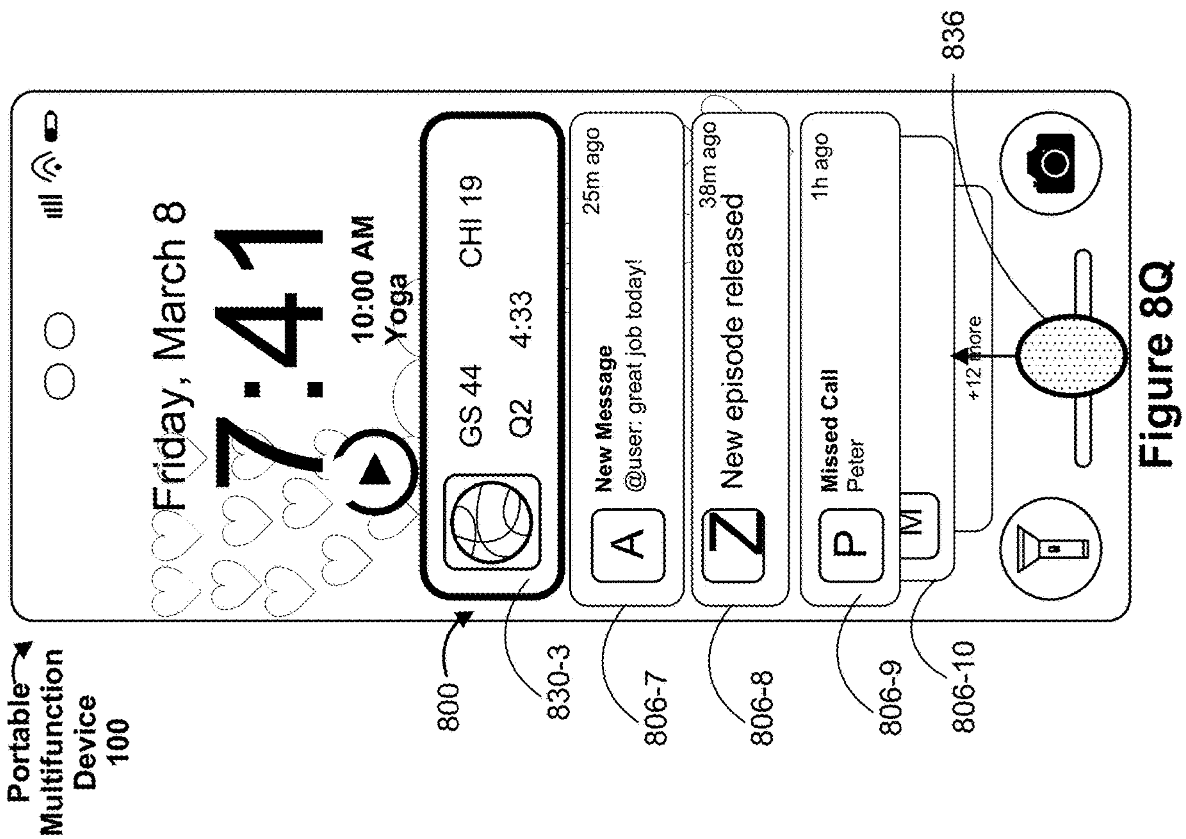

FIG. 8Q illustrates that, in response to user input 834, corresponding to a request to expand the stack of notifications into a list of notifications, the device 100 displays a list of notifications, including notifications 806-7 through 806-10. In some embodiments, the session region is maintained above the top-most notification, and continues to update the status information in the session 830-3. In some embodiments, in response to a user input to scroll through the notifications in FIG. 8Q, one or more notifications are displayed as scrolling under session 830-3 before scrolling off of the display.

FIG. 8Q illustrates user input 836 requesting to dismiss the wake screen user interface 800, and in response to user input 836, the device 100 displays home screen user interface 805 (e.g., a second view of the home screen user interface), as illustrated in FIG. 8R. In some embodiments, while the session is active, an indication of the session is displayed in a session region 838-1 of the home screen user interface (e.g., that is distinct from the session region displayed in the wake screen user interface), as shown in FIG. 8R. In some embodiments, the session region of the home screen user interface is displayed between one or more status indicators (e.g., a time, a cellular network connection, a WiFi indicator, and/or a battery indicator). In some embodiments, session region 838-1 displays status information for the event associated with the active session. In some embodiments, the status information is different, or a subset less than all of, the status information provided in the session region on the wake screen user interface. For example, session region 838-1 displays a score of the game (e.g., without displaying the timing information). In some embodiments, in response to detecting a user input directed to session region 838-1, the device expands session region 838-1 to display additional status information.

FIG. 8R illustrates user input 840 selecting an application icon for a music application. In some embodiments, in response to user input 840, the device 100 launches the music application and displays application user interface 807-1 for the music application, as illustrated in FIG. 8S. In some embodiments, while displaying an application user interface (e.g., application user interface 807-1 and 807-2), the session region 838 (e.g., 838-2 and 838-3) is maintained, and the status information in the session region 838 continues to be updated. FIG. 8S illustrates a user input 842 requesting to begin playback of a media item ("Song A").

Figure 8T:
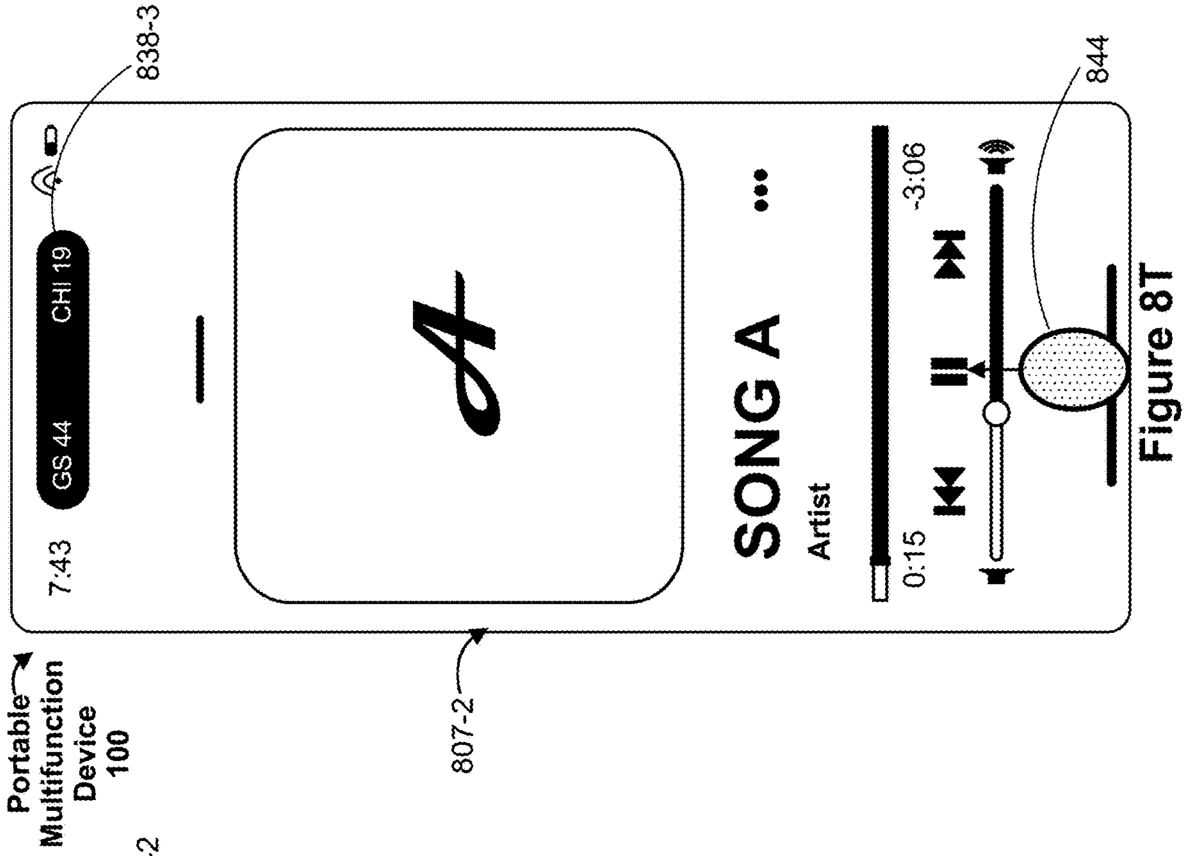
Figure 8S:
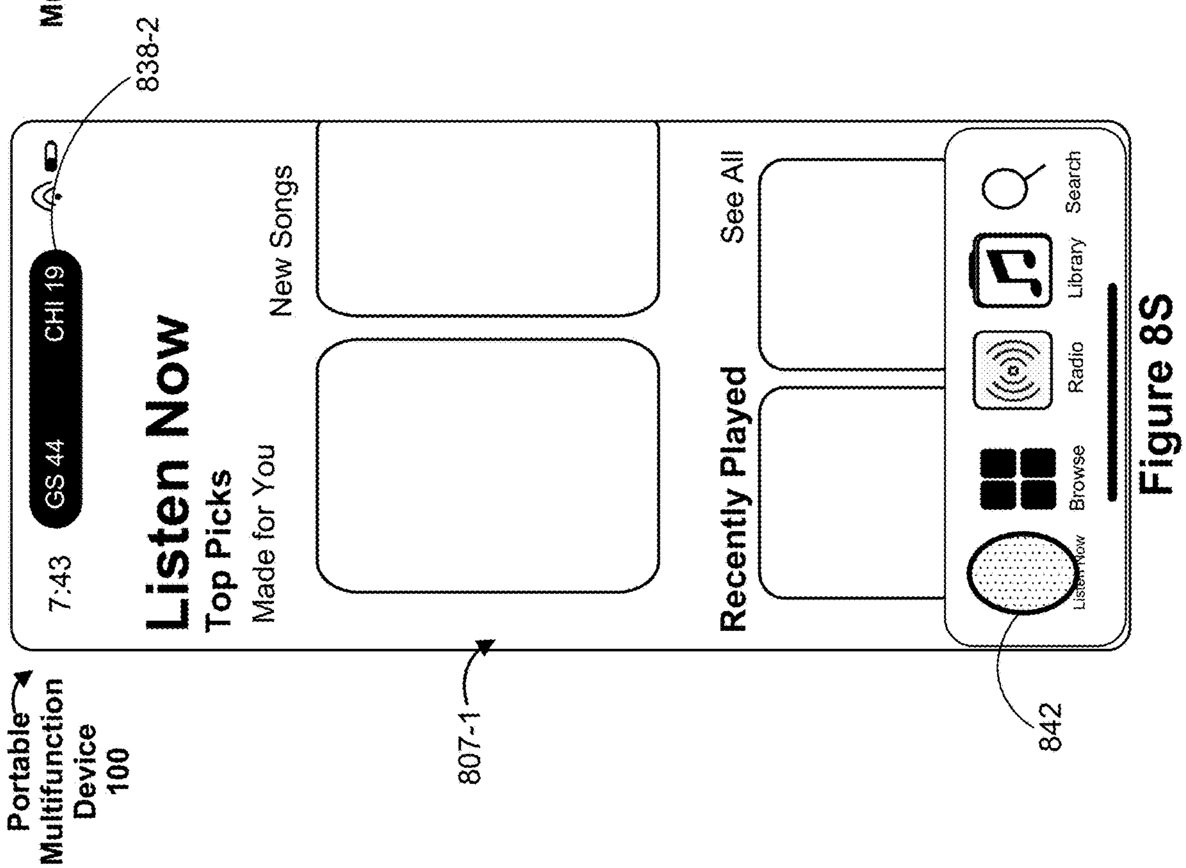

FIG. 8T illustrates an application user interface 807-2 for the music application that includes information about a currently playing media item. In some embodiments, the device 100 detects user input 844, corresponding to a request to dismiss application user interface 807-2, and display the home screen user interface 805.

Figure 8U:
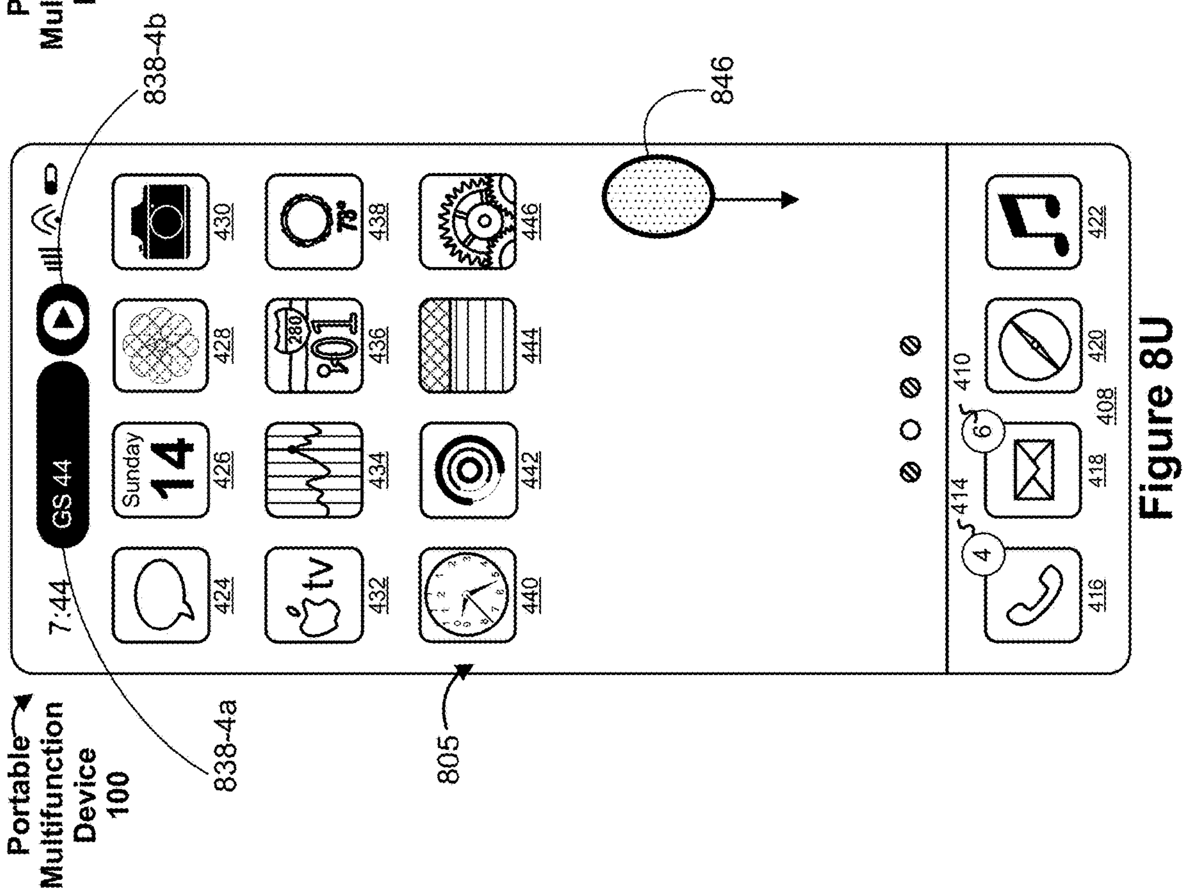
Figure 8V:
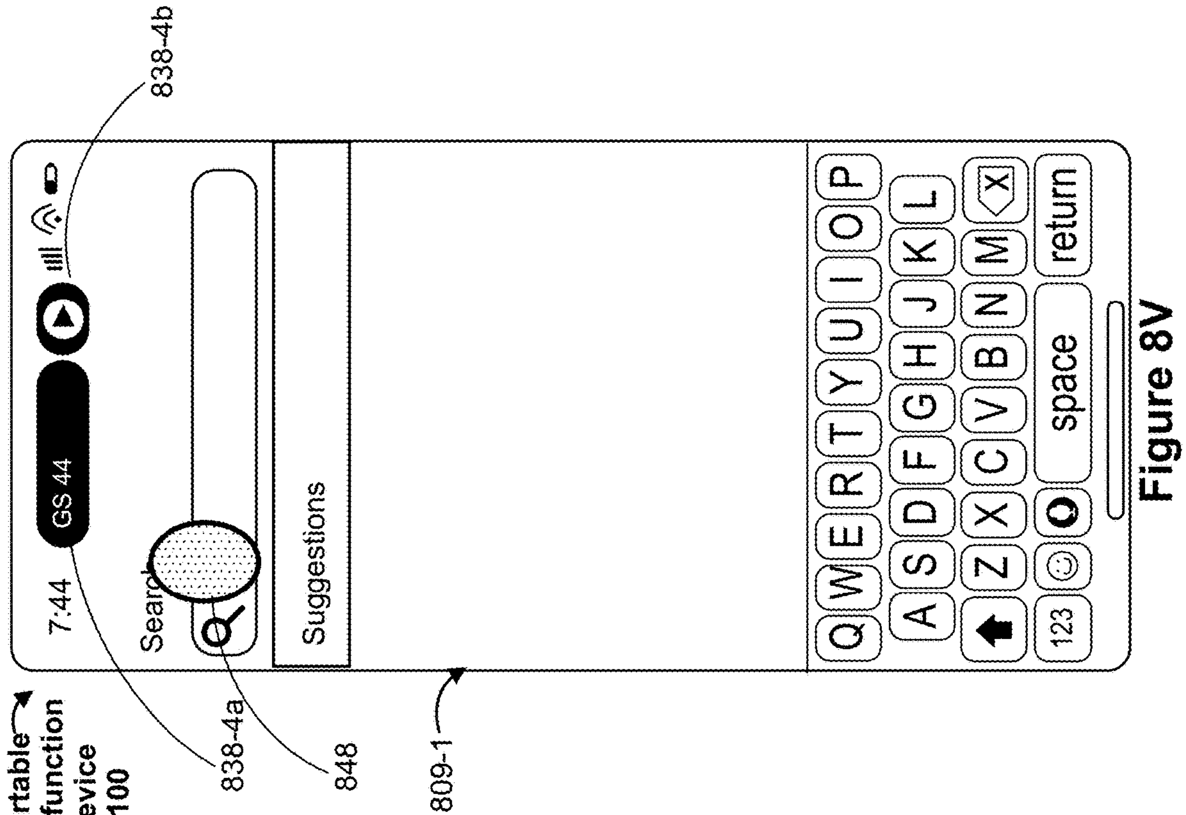

FIG. 8U illustrates, in response to user input 844, the device 100 displays home screen user interface 805. In some embodiments, the session region 838 is updated to include information for two sessions, including the sports session **838-4*a* and the music session 838-4*b*. FIG. 8U further illustrates user input 846 corresponding to a request to display a search user interface 809-1 (e.g., as illustrated in FIG. 8V**).

In some embodiments, in response to user input 846, the device 100 displays search user interface 809-1, which includes a search bar and optionally search suggestions (e.g., application icons and/or widgets of recently used or often used applications). In some embodiments, while displaying search user interface 809-1, the device 100 continues displaying, in the session region, indications of the active sessions (e.g., the sports session **838-4*a* and the music session 838-4*b*). In some embodiments, the device 100 detects user input 848 directed to the search bar and/or a user input requesting to search for "workout" (e.g., as illustrated in FIG. 8W**).

Figure 8X:
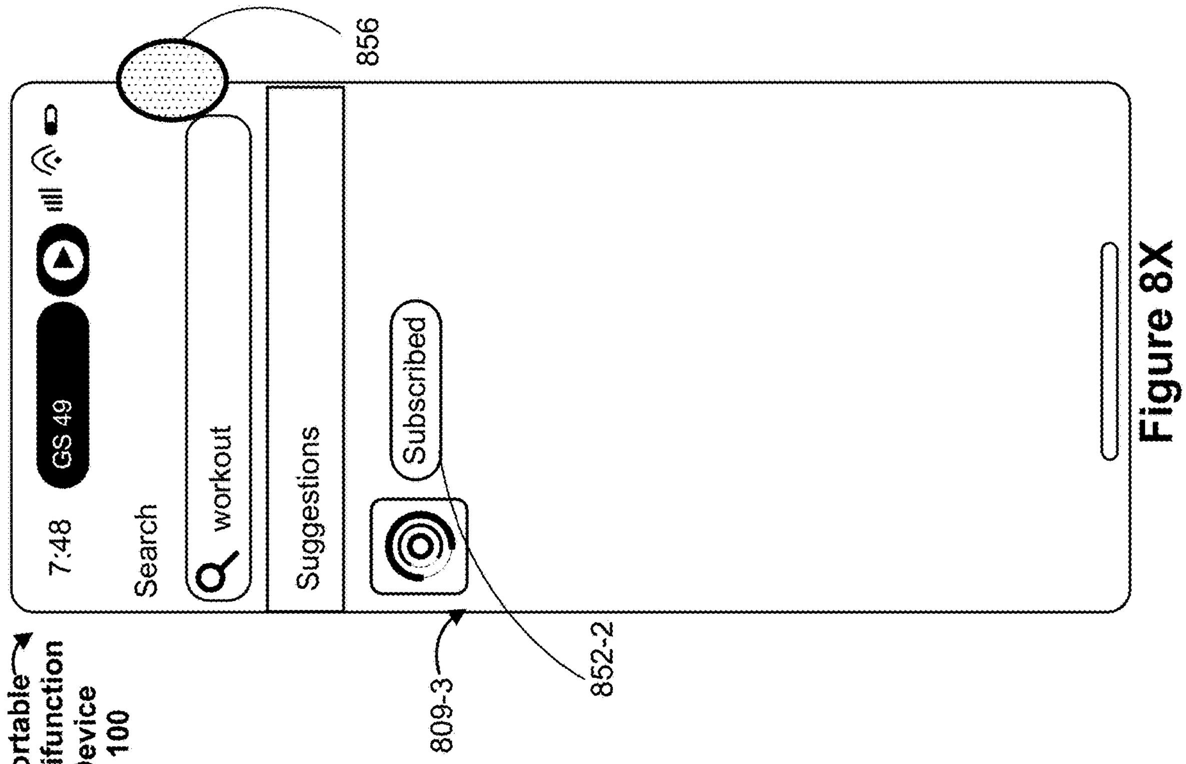
Figure 8W:
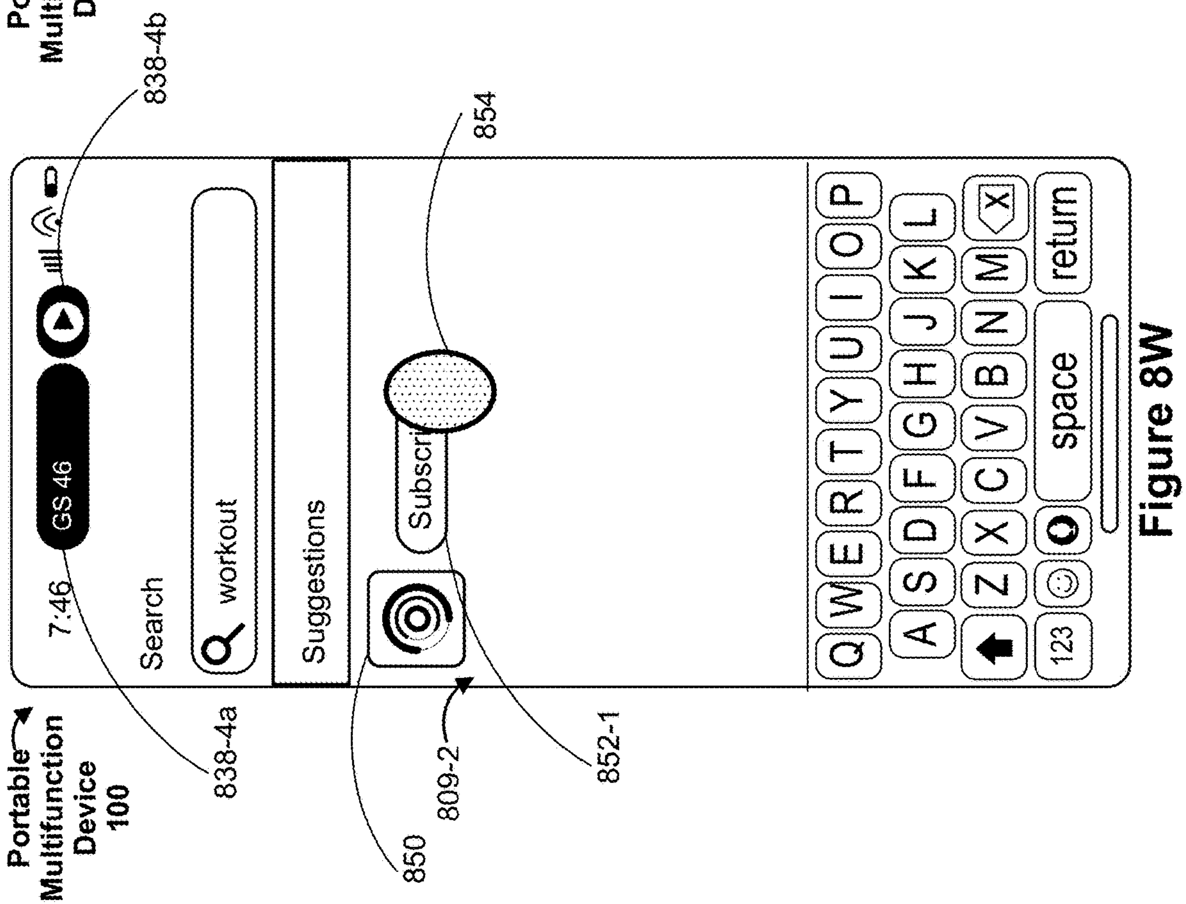

FIG. 8W illustrates user interface 809-2 that displays search results responsive to user input 848 to search for workout. In some embodiments, the device 100 continues displaying, in the session region, indications of the active sessions (e.g., the sports session **838-4*a* and the music session 838-4*b*), and updates the active sessions (e.g., the score is updated from 44 (FIG. 8V) to 46 (FIG. 8W)). In some embodiments, the search results include an application icon 850 for a workout and/or health, application, and optionally includes an option for subscribing to events for the workout and/or health application. For example, user input 854 is directed to "Subscribe" button 852-1, and in response to user input 854, the device 100 subscribes the user to events (e.g., activities and/or workouts) for the workout and/or health application. In some embodiments, the user interface 809-3 provides an indication 852-2 that the user has subscribed to the respective application. In some embodiments, an option to toggle the subscription on and/or off is provided. For example, in response to detecting a user input selecting indication 852-2**, the device unsubscribes from events for the workout and/or health application.

FIG. 8X illustrates user input 856, optionally a physical activation of a button such as a power button or another user input, requesting to put the device 100 in a low-power state.

Figure 8Z:
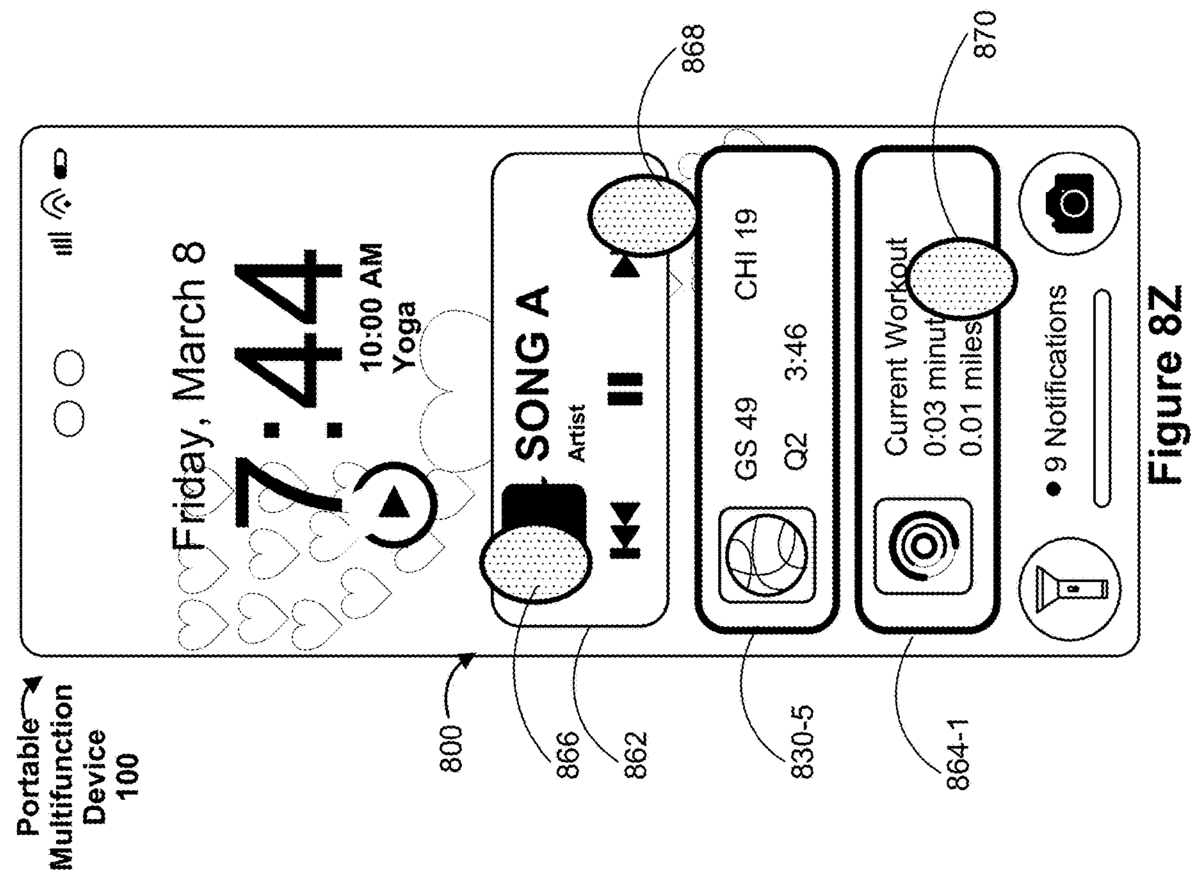
Figure 8Y:
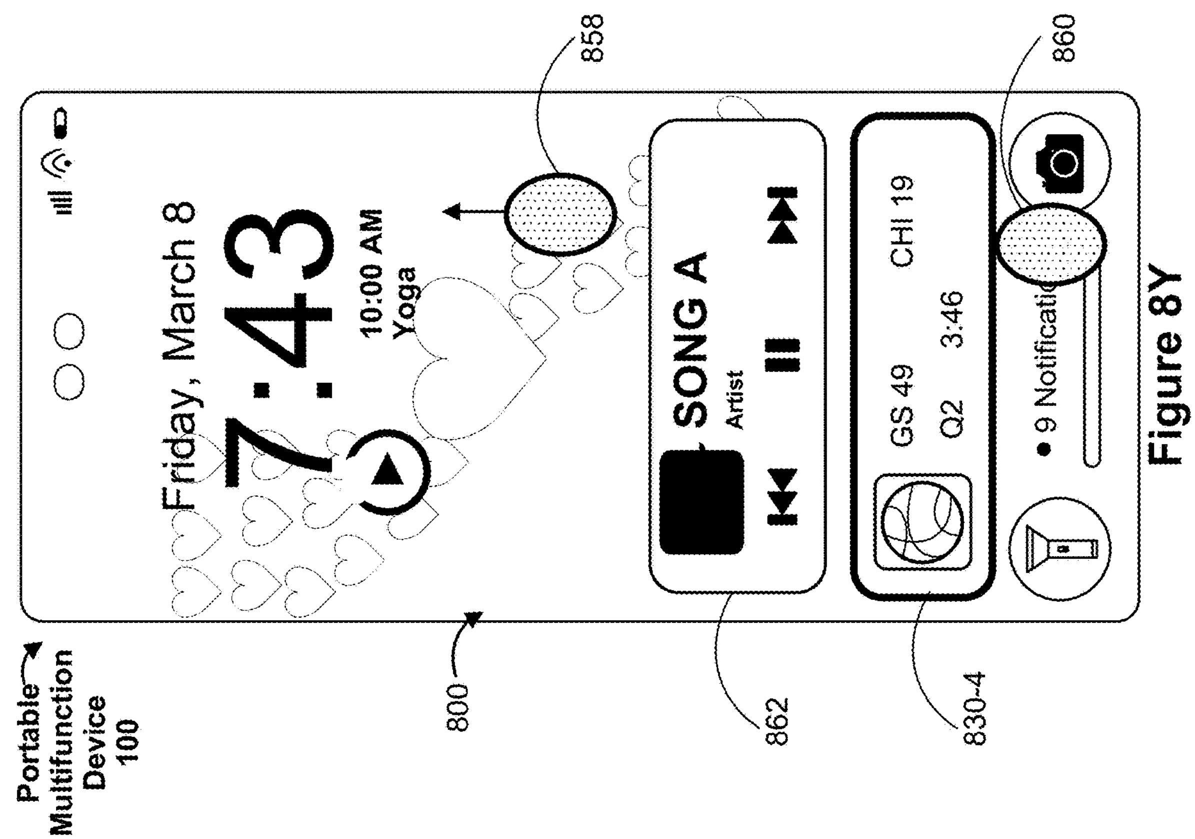
Figure 8A:
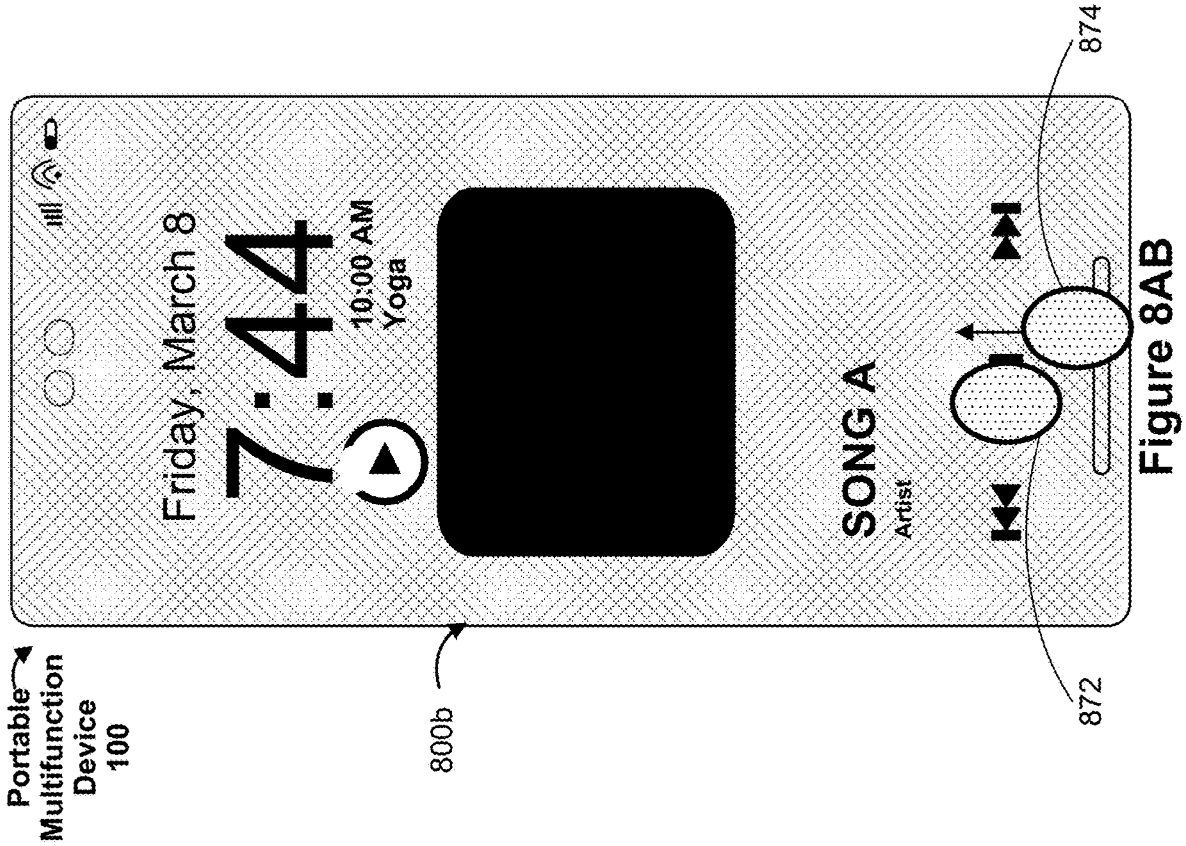
Figure 8A:
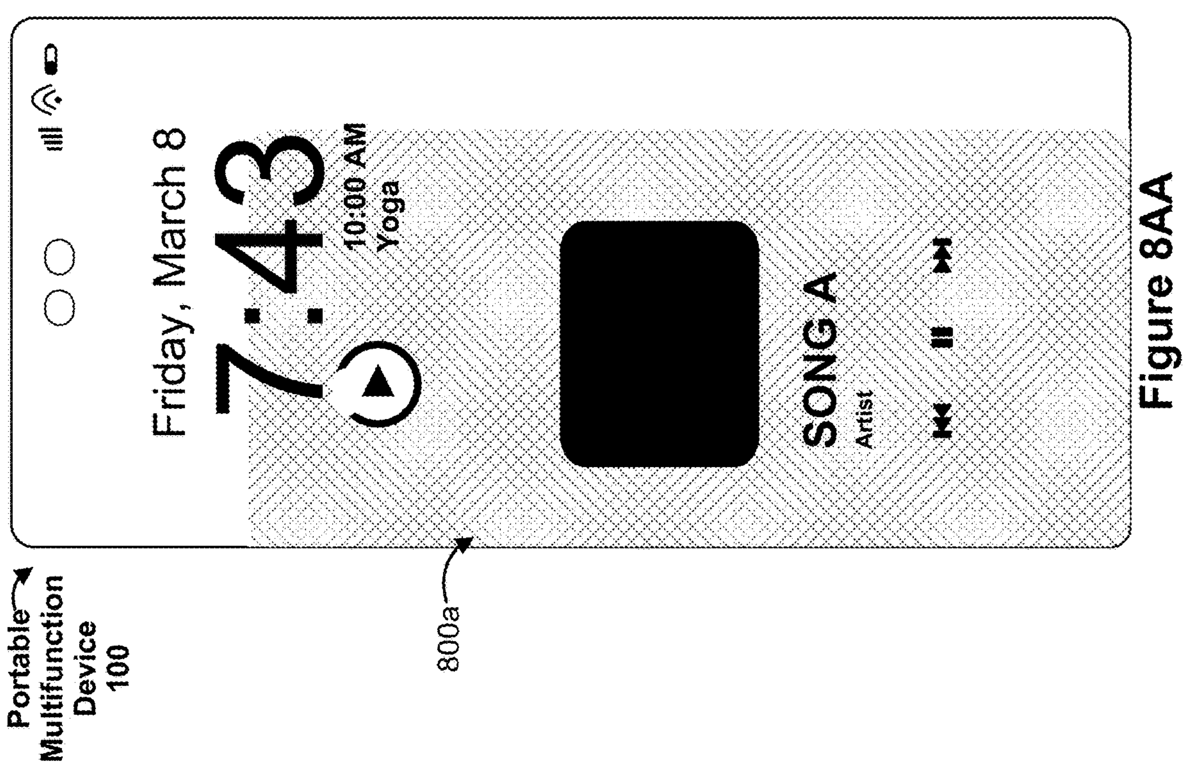
Figure 8A:
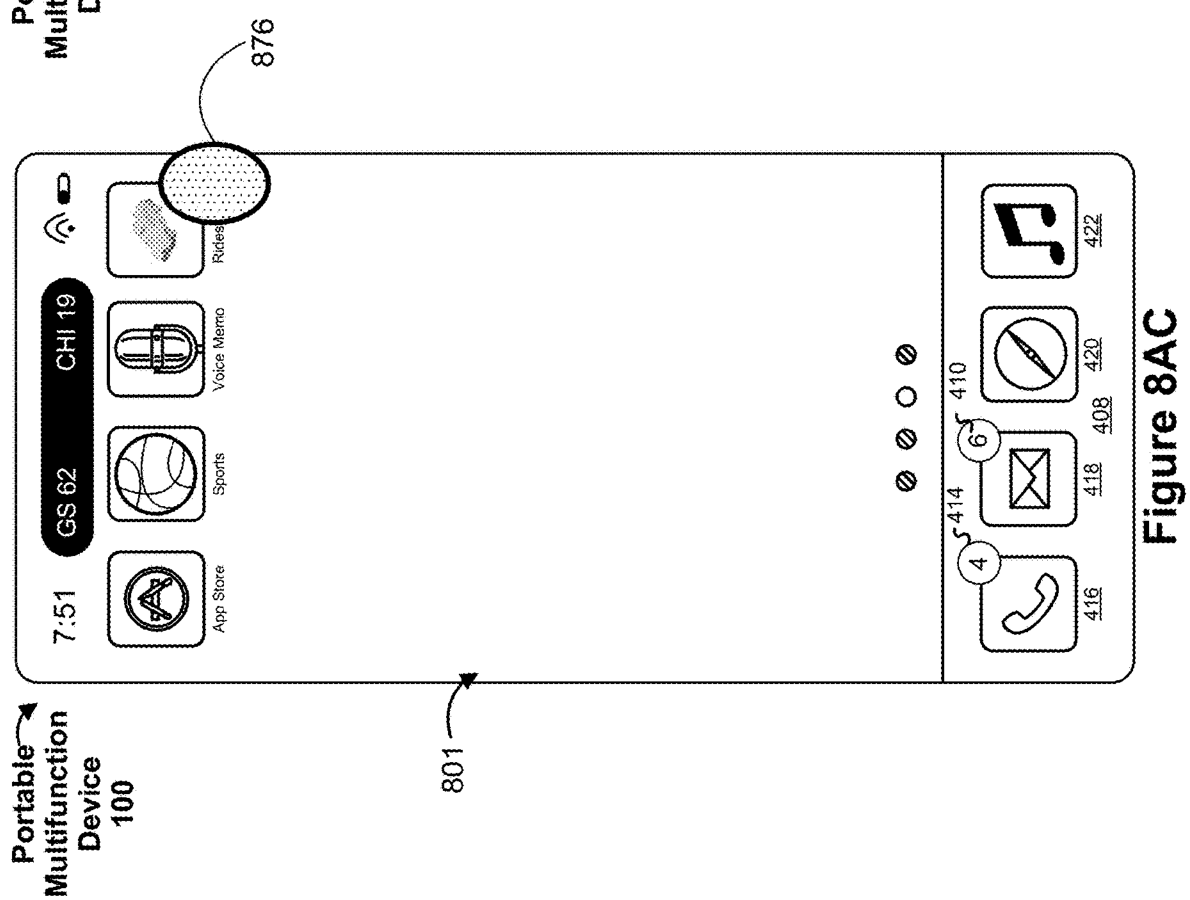
Figure 8A:
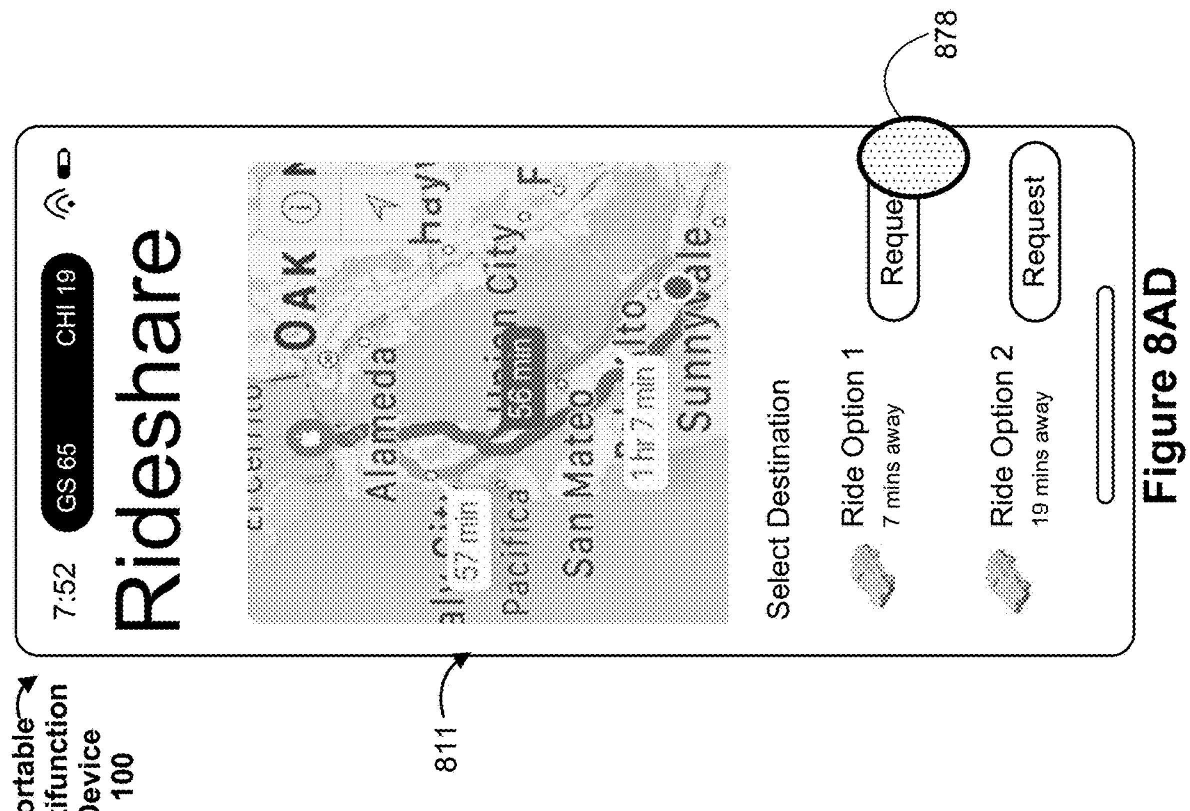
Figure 8A:
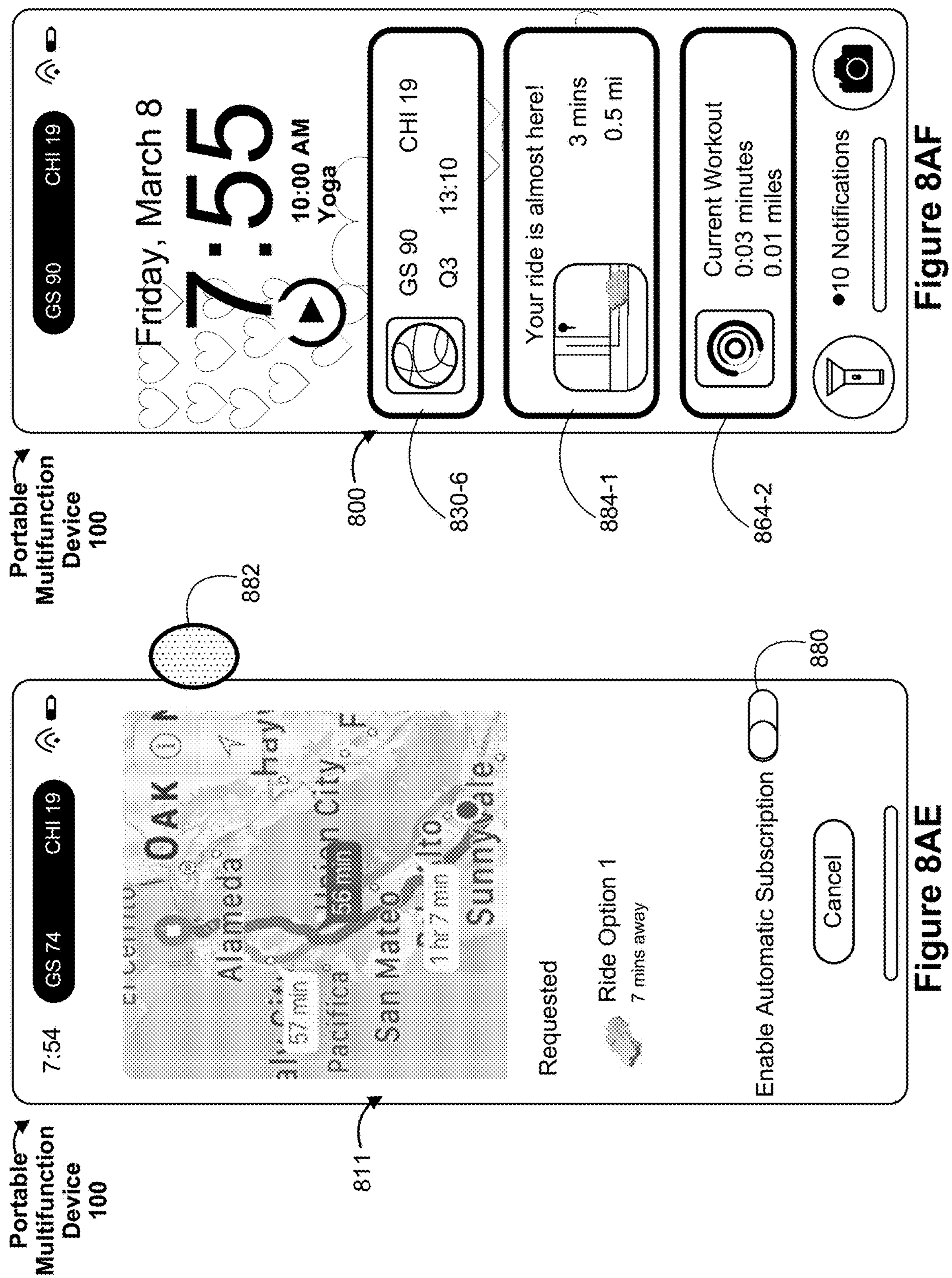
Figure 8A:
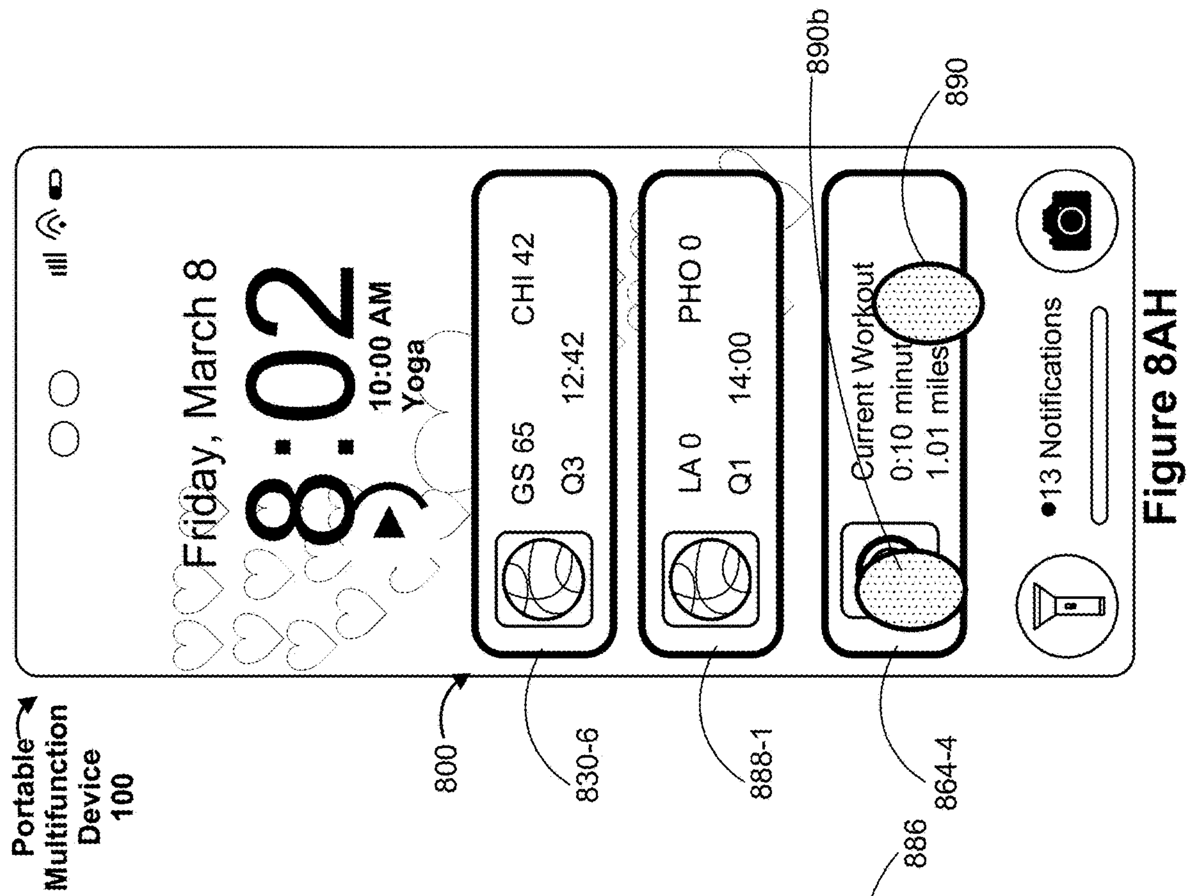
Figure 8A:
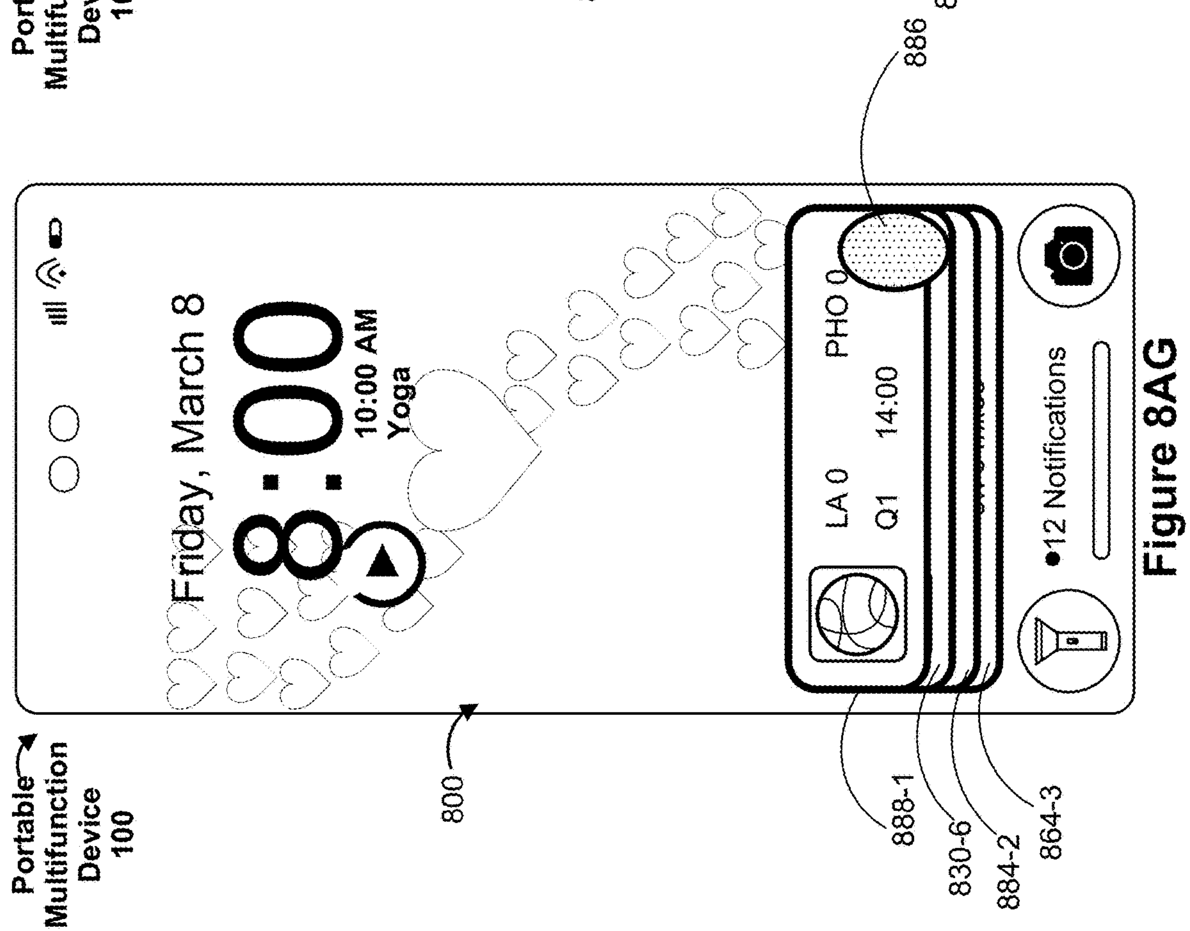
Figure 8A:
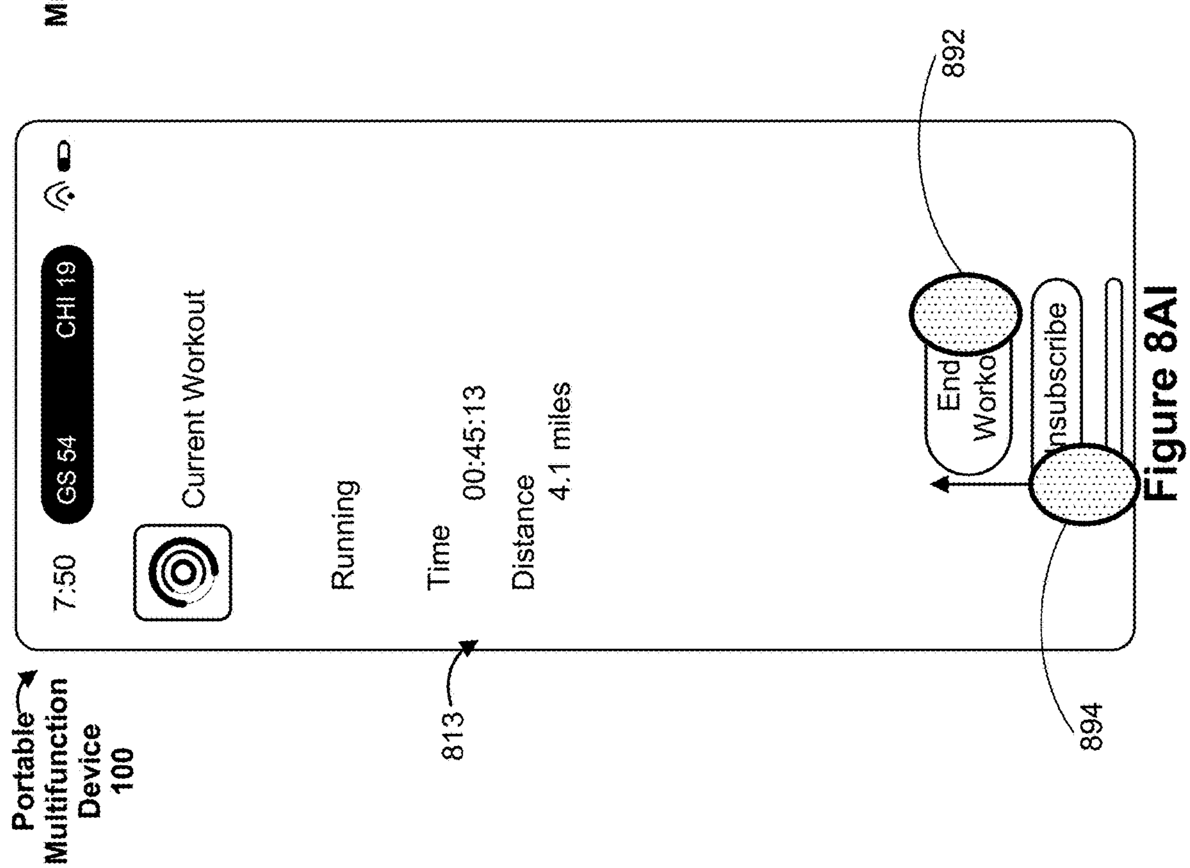
Figure 8A:
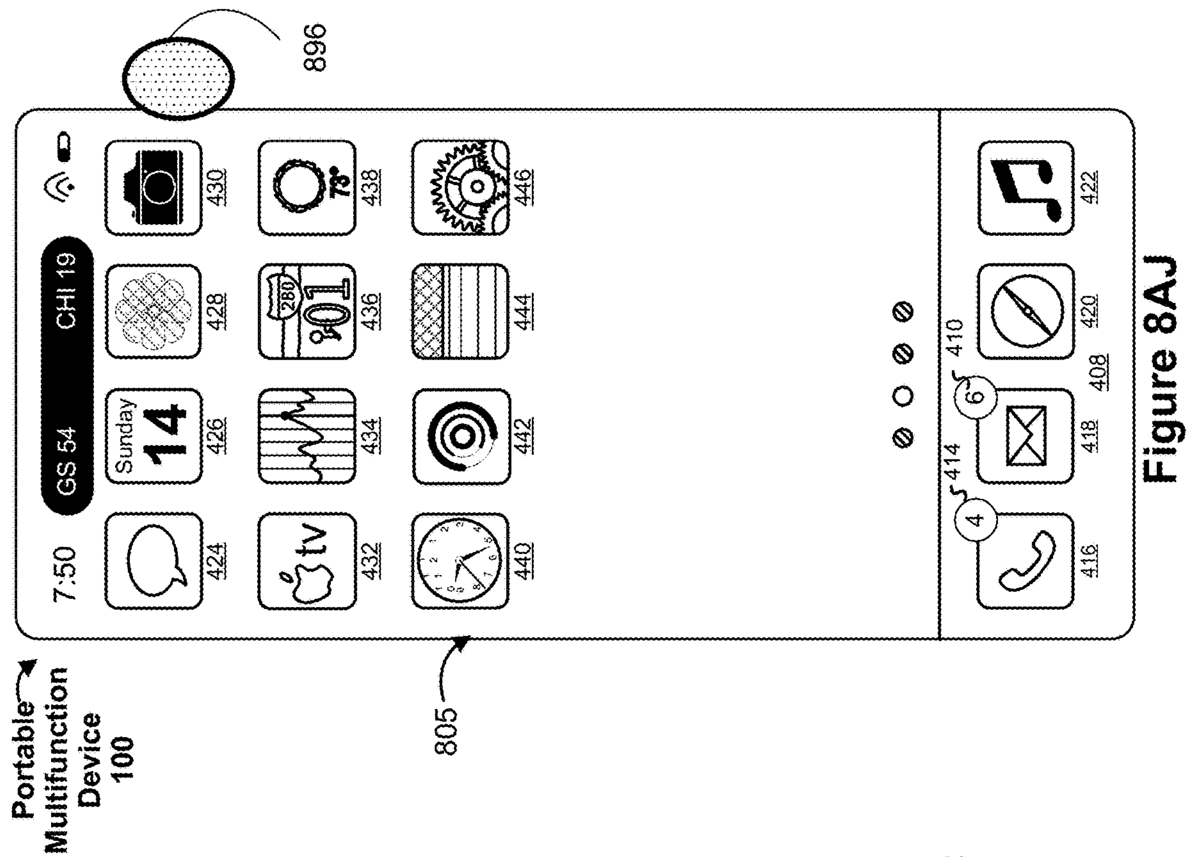
Figure 8A:
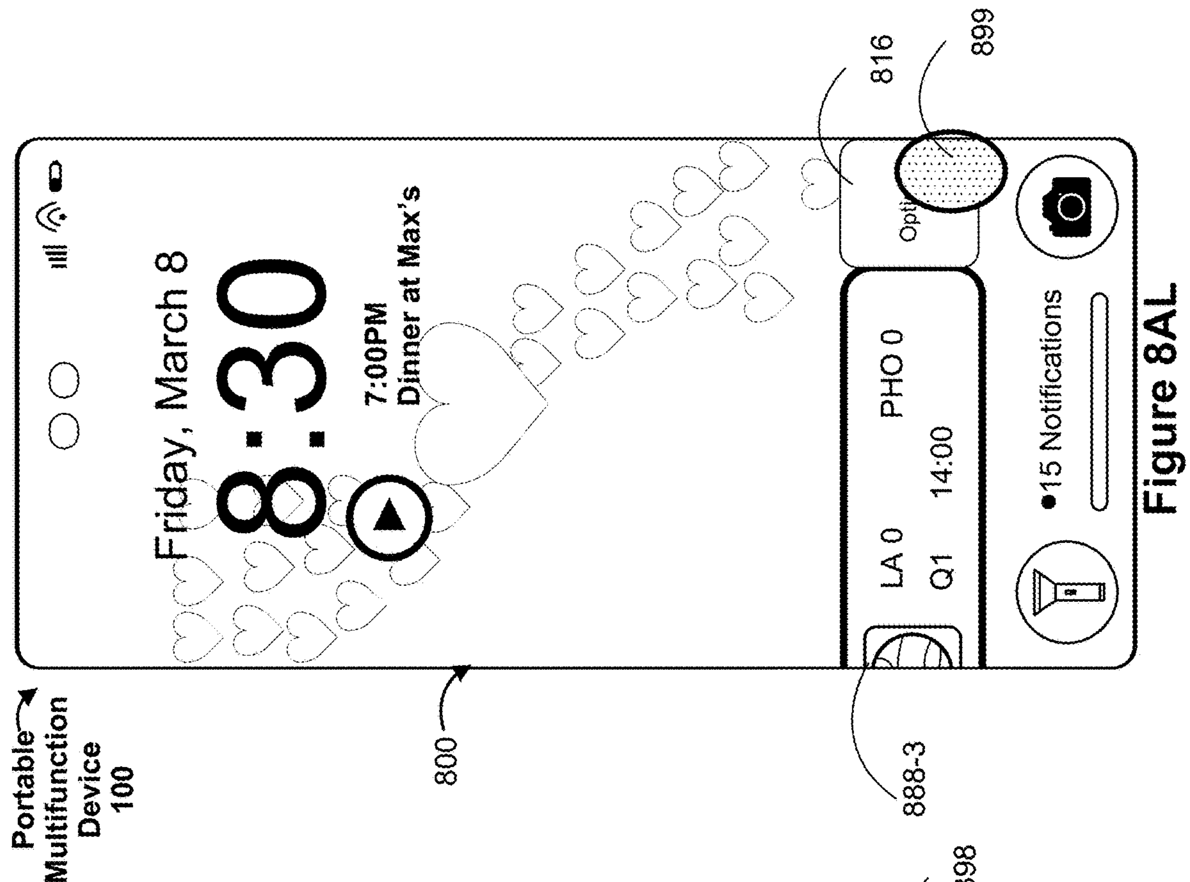
Figure 8A:
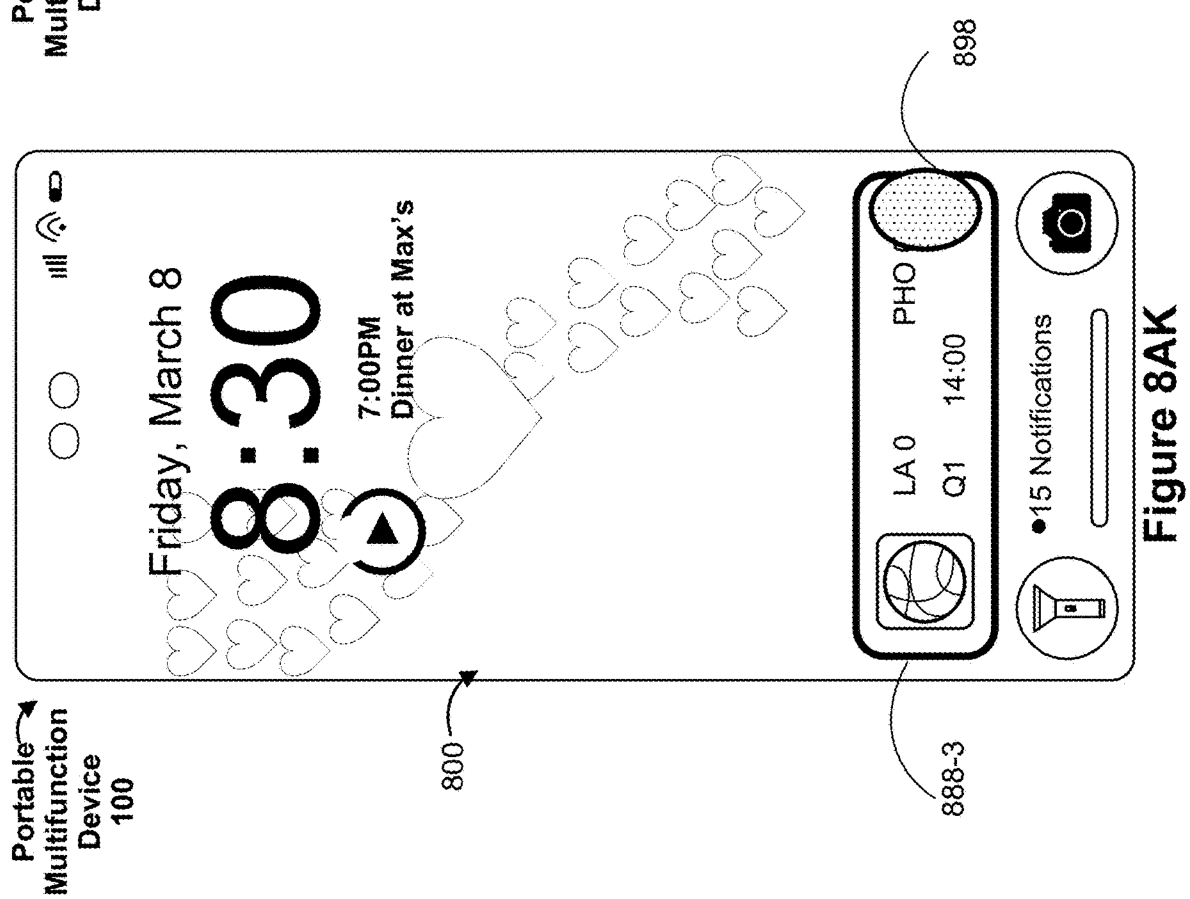
Figure 8A:
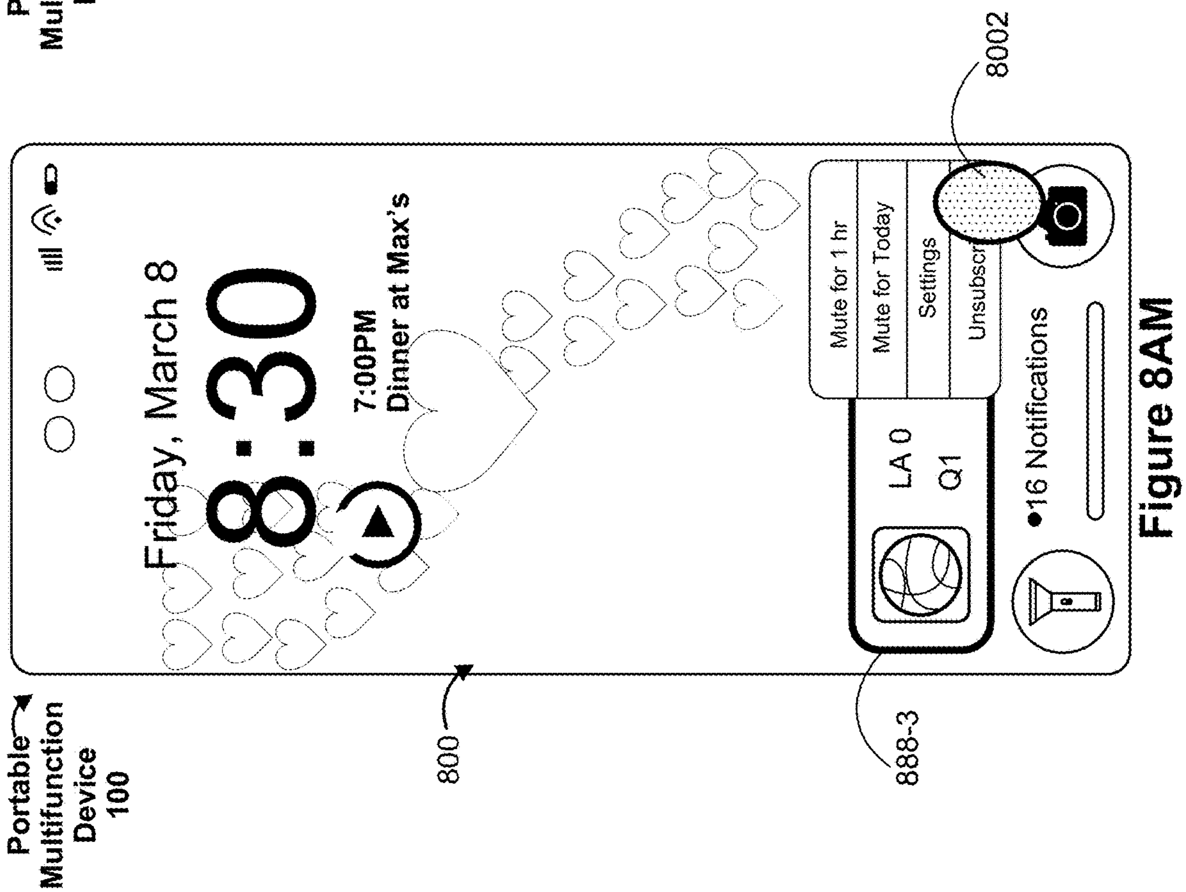
Figure 8A:
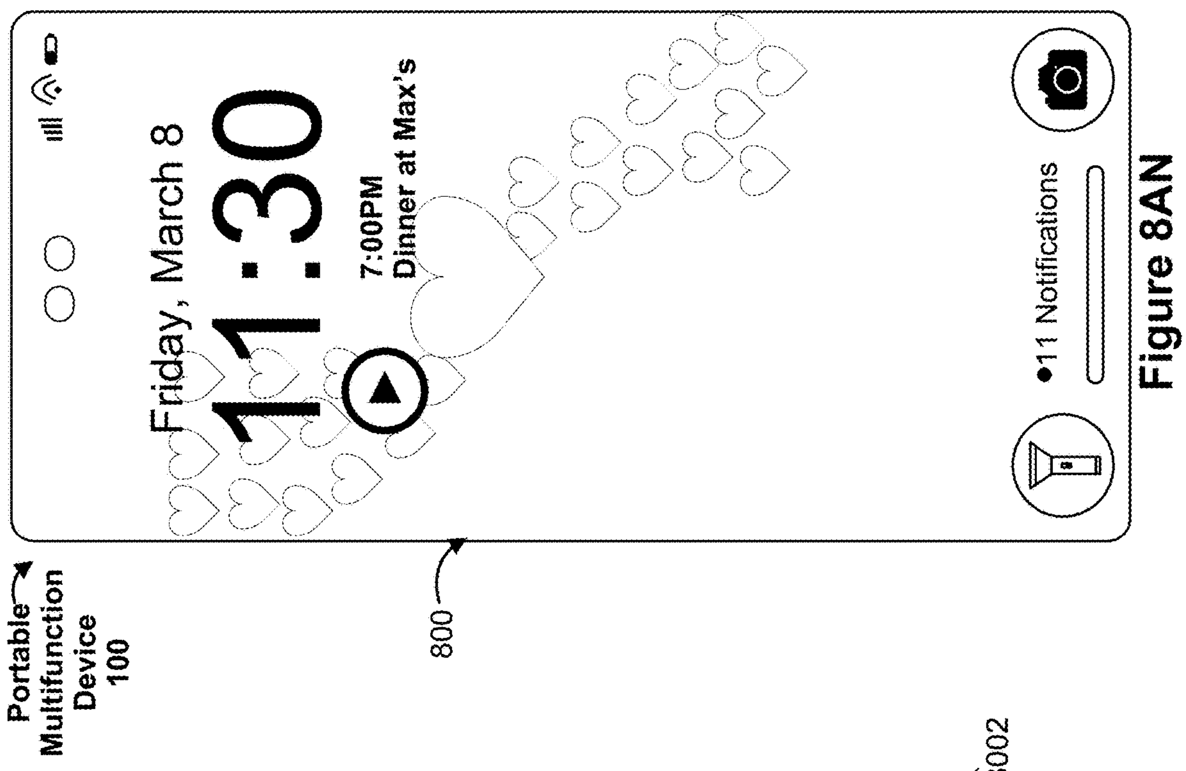
Figure 11A:
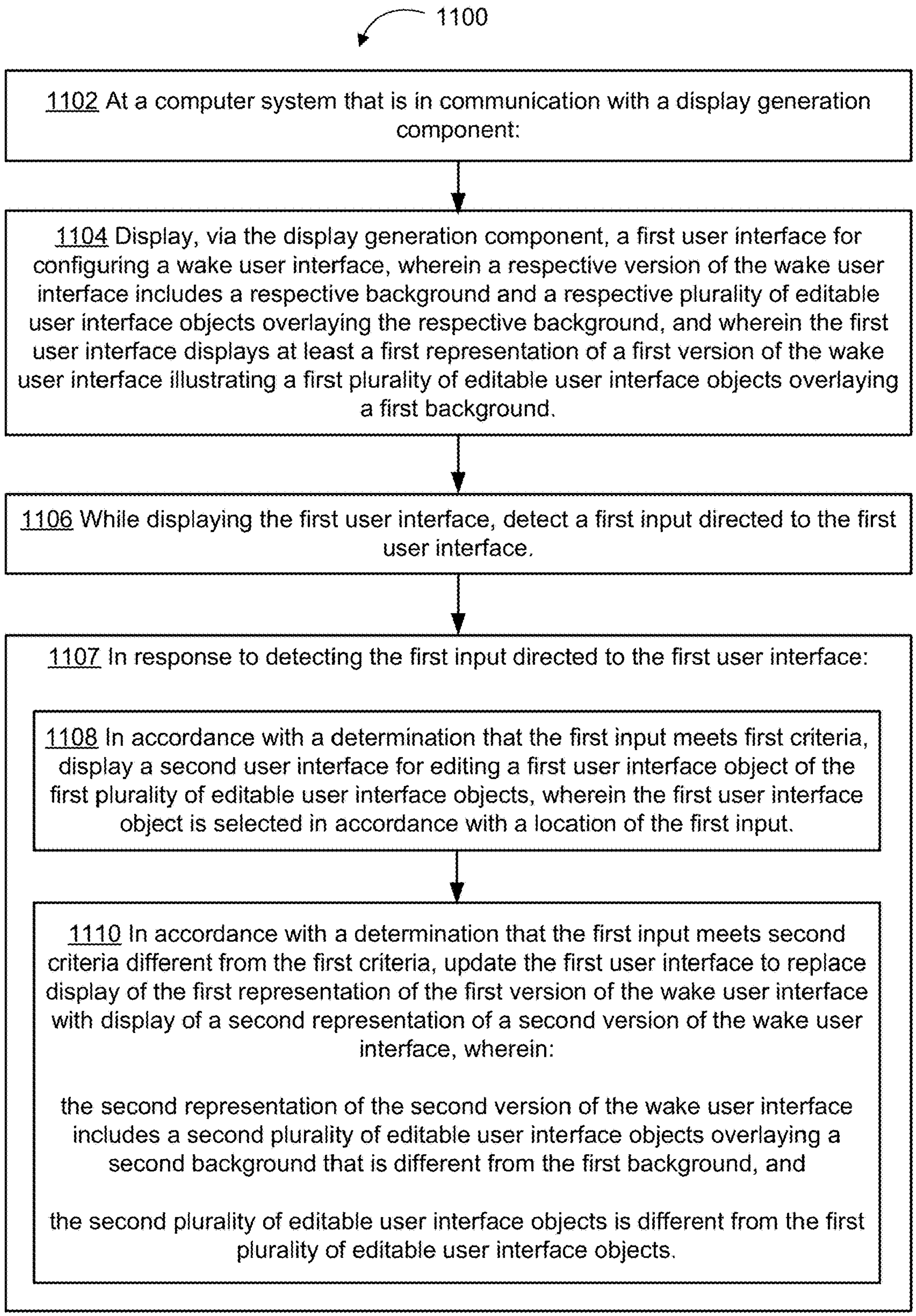

FIG. 8Y illustrates that, at a later time, the wake screen user interface 800 is displayed, including displaying session 830-4 in the session region (e.g., above the notifications, including collapsed notifications), and a user interface element 862 (e.g., a platter) corresponding to the active music session. In some embodiments, in response to user input 860 (e.g., a tap input or other selection input) directed to the collapsed notifications, the notifications expand into a list view, optionally under the session 830-4 and/or the user interface element 862. In some embodiments, in response to user input 858, corresponding to a swipe up gesture in a center portion of the display, the device 100 expands the notifications into the list view.

FIG. 8Z illustrates another active session, for a current workout session 864-1, displayed concurrently with session 830-5 and user interface element 862. In some embodiments, status information for the current workout is retrieved from a workout and/or health application executing on device 100, and/or is retrieved from a distinct device (e.g., a wearable device, such as a watch or fitness tracker). In some embodiments, because the user subscribed to the workout and/or health application (e.g., as illustrated in FIG. 8W), device 100 displays session 864-1 in accordance with a determination that a workout (e.g., event or activity) has been initiated. For example, the session 864-1 is displayed on the wake screen user interface 800 optionally without the user interacting with device 100.

FIG. 8Z illustrates example user inputs for interacting with a session and/or user interface element 862. For example, user input 870 (e.g., a tap or a long press) directed to session 864-1 causes the device 100 to open an application user interface for the application associated with session 864-1 (e.g., the workout and/or health application), and optionally displays an application user interface that includes session information. For example, instead of launching the workout and/or health application to a typical initial user interface, the user interface that is displayed includes session information.

In some embodiments, a user input directed to a respective control within user interface element 862 causes the device 100 to control playback of the media content in accordance with the respective control. For example, user input 868 directed to the skip forward control causes the device 100 to begin playback of a next media item. In some embodiments, a user input directed to a predefined portion of user interface element 862, for example, user input 866 directed to an image associated with the media item (e.g., cover art or album art), causes the device 100 to expand the user interface element 862 such that the wake screen user interface is displayed with an overlay that includes information about the current media playback, as illustrated in user interface 800*b* (FIG. 8AB).

In some embodiments, in response to user input 868, the device 100 displays an animated transition, as illustrated in user interface 800*a* (FIG. 8AA), for expanding an overlay the information about the current media playback. In some embodiments, the overlay covers a background of the wake screen user interface (e.g., the hearts image background), optionally without covering display of the date and/or time indication and/or the complications of the wake screen user interface. In some embodiments, the icons for accessing a camera and/or flashlight are occluded by the overlay. In some embodiments, the overlay is displayed with a background color or gradient. In some embodiments, the background color or gradient is selected based on one or more colors associated with the currently playing media item, such as one or more colors that appear in the cover art for the media item. In some embodiments, the overlay is a visually deemphasized version of the cover art (e.g., a blurred version of the cover art). In some embodiments, the animated transition includes increasing a size of the overlay from a first corner of the display (e.g., the lower left corner), until the overlay is displayed over the entire display.

In some embodiments, the overlay is maintained over the wake screen user interface for a threshold amount of time, before automatically returning to the wake screen user interface and displaying the user interface element 862. In some embodiments, the device 100 ceases display of the overlay in response to a user input requesting to dismiss the overlay.

In some embodiments, as illustrated in FIG. 8AB, the device detects and responds to user input directed to one or more controls displayed in the overlay of user interface 800*b*. For example, in response to user input 872 directed to a pause control, the device 100 ceases playback of the current media item. In some embodiments, in response to user input 874, corresponding to a request to dismiss the overlay, the device 100 optionally displays a home screen user interface 801 (or an application user interface) and dismisses the overlay over the wake screen user interface, as illustrated in FIG. 8AC.

FIG. 8AC illustrates a user input 876 directed to a rideshare application icon. In some embodiments, in response to user input 876, the device 100 launches the rideshare application and displays user interface 811 for the rideshare application, as illustrated in FIG. 8AD. In some embodiments, in response to user input 878, to request ride option 1, the device 100 updates the user interface to indicate that ride option 1 has been requested.

FIG. 8AE also illustrates that, after requesting ride option 1, the device 100 optionally displays an option 880 for enabling automatic subscription for the rideshare application. For example, in response to a user input directed to toggle option 880, the device toggles the on and/or off state of the toggle option and subscribe and/or unsubscribe to a particular type of event (e.g., rides requested) for the rideshare application depending on whether the particular type of event is currently subscribed. In some embodiments, the device 100 optionally provides an option for subscribing only to the current event (e.g., ride option 1).

In some embodiments, an option to enable automatic subscription for any application (e.g., including the rideshare application) is provided, for example, in a settings user interface of device 100. In some embodiments, if the user has enabled automatic subscription for all applications, or a subset of applications, the device 100 automatically subscribes the user to certain events. In some embodiments, automatic subscription does not necessarily subscribe the user to all events from an application. For example, automatic subscription enables device 100 to determine which subset of events the user is likely interested in subscribing, such as if the user has shown an interest in a particular team for a first sport, the device 100 automatically subscribes the user to all events that the particular team participates, but not all sporting events of the first sport.

FIG. 8AE illustrates user input 882 corresponding to a request to enter a low-power state and/or lock the device.

FIG. 8AF illustrates wake screen user interface 800, optionally after the device 100 has transitioned out of the low-power state. In some embodiments, the three active sessions: sports session 830-6, rideshare session 884-1 and workout session 864-2 are concurrently displayed on the wake screen user interface 800. In some embodiments, an indication of notifications are optionally displayed (e.g., below the session region displaying the three active sessions).

FIG. 8AG illustrates that, in accordance with a determination that a fourth session is active (e.g., Los Angeles vs. Phoenix game starts at 8:00), the sessions are displayed in a condensed, or collapsed view. For example, in some embodiments, the device 100 concurrently displays up to a threshold number of sessions (e.g., 3 sessions), and if there are more than the threshold number of sessions, the sessions are displayed in a condensed view in the session region. For example, sports session 888-1 for the Los Angeles vs. Phoenix game, is displayed at the top of the condensed view, with session 830-6, session 884-2 and session 864-3 displayed below the sports session 888-1. In some embodiments, an order of the sessions (e.g., and/or which session is displayed at the top) is determined based on a respective priority of the applications associated with the sessions. For example, applications are assigned a priority, and a session associated with the application having the highest priority is displayed at the top of the sessions. In some embodiments, the sessions are organized based on a time the session was initiated. For example, the most recently initiated session is displayed at the top (or bottom) of the sessions.

FIG. 8AG illustrates a user input 886 directed to the condensed view of the sessions. In some embodiments, in response to user input 886, the device 100 displays the sessions concurrently, as illustrated in FIG. 8AH. In some embodiments, the device scrolls through additional sessions (e.g., the rideshare session 884) that are not displayed in the user interface 800 in response to detecting one or more user inputs directed to the currently displayed sessions (e.g., in response to one or more swipe gestures directed on the displayed sessions).

FIG. 8AH illustrates user input 890 directed to workout session 864-4. In some embodiments, in response to user input 890, the device 100 displays an application user interface 813 for the workout application, including a view of the current workout corresponding to the current workout session 864-4. In some embodiments, the device unsubscribes and/or ends the current workout session 864-4 in response to detecting a user input directed to the view of the current workout session 864-4 that meets preset criteria. For example, in response to user input 892 selecting the button "End Workout" in FIG. 8AI, the current workout session 864-4 is stopped. In some embodiments, the device 100 detects user input 894 corresponding to a request to display the home screen user interface 805. In some embodiments, user input 890*b* detected at a different portion of the workout session 864-4 causes the device 100 to display additional information related to the session. For example, in response to user input 890*b*, the device 100 increases a size of session 864-4 and optionally displays additional status information, such as a map of a route of the workout.

FIG. 8AJ illustrates, in response to user input 894, the device 100 displays home screen user interface 805. In some embodiments, user input 896 is detected, and in response to user input 896, the device enters the low-power state.

FIG. 8AK illustrates that, at 8:30, only one session, sports session 888-3, is still active. For example, device 100 ceases displaying each respective session in accordance with the event of the session ending. For example, the Golden State vs Chicago game has ended, the user ended the current workout session (FIG. 8AH), and the rideshare session 884-1 has also ended (e.g., in accordance with completing the ride and/or in accordance with the ride arriving for pickup). Thus session 830, session 884 and session 864 are no longer displayed.

In some embodiments, a user input 898 (e.g., distinct from a type of user input of user input 890 (FIG. 8AH)) corresponds to a request to display options for session 888-3. For example, user input 898 is a swipe input (e.g., from right to left). In some embodiments, in response to user input 898, device 100 slides the session 888-3 at least partially off the display, optionally in the direction of user input 898, and displays an options button 816, as illustrated in FIG. 8AL. In some embodiments, user input 899 selects the options button 816, and in response to the user input 899, the device 100 displays a menu for controlling the session 888-3, as illustrated in FIG. 8AM.

FIG. 8AM illustrates the menu for controlling the session 888-3 includes an option to mute the session (e.g., forgo providing updates and/or alerts) for 1 hour, an option to mute the session for the rest of the day, an option to view and/or edit settings for the session, and an option to unsubscribe. In some embodiments, user input 8002 selects the option to unsubscribe from the session 888-3.

FIG. 8AN illustrates that, in response to user input 8002, the session 888-3 is removed from display in the wake screen user interface 800, even if the event associated with session 888-3 is still ongoing, because the user has unsubscribed from the session.

FIGS. 9A-9I are flow diagrams illustrating method 900 of changing a user interface based on a user input in accordance with some embodiments. Method 900 is performed (901) at a computer system (e.g., device 300, FIG. 3, or portable multifunction device 80, FIG. 1A) that is in communication with a display generation component (e.g., a hardware element, comprising one or more display devices, such as a display, a projector, a touch-screen display, a heads-up display, a head-mounted display, or the like) (and optionally, the computer system is further in communication with one or more input devices, one or more cameras, and/or one or more 3D sensing and/or determination devices, such as lidars, depth sensors, and/or distance sensors) Some operations in method 900 are, optionally, combined and/or the order of some operations is, optionally, changed.

To that end, method 900 provides a wake screen user interface that includes a first set of complications, whereby the user can optionally navigate to another wake screen user interface that includes a second set of complications. Displaying a wake screen user interface with complications corresponding to different applications, where an input in one direction navigates to a different page of the wake screen, whereas an input in a different direction navigates to a different type of user interface of the computer system, reduces the number of inputs needed to access different user interfaces of the computer system.

The computer system displays (902), via the display generation component, a first version (e.g., a currently selected one of a plurality of preset and/or customizable versions) of a first user interface (e.g., a wake user interface, also referred to herein as a wake screen user interface, and/or a lock user interface) that corresponds to a restricted state of the computer system to a normal operation mode. In some embodiments, the first user interface is an initial user interface that is displayed when the computer system transitions from a power-saving mode (e.g., display is turned off, and/or in a dimmed always-on state, as illustrated in FIG. 5A) and the normal operation mode corresponds to a mode wherein the display is turned on and/or restored to a higher power state, as illustrated in FIG. 5B. In some embodiments, the first user interface is a basic limited function user interface that needs to be dismissed before a home screen or application launching user interface is displayed, and/or a coversheet user interface that can be displayed to block a currently displayed application user interface and/or home screen and that can be dismissed to redisplay the blocked application user interface and/or home screen.

In some embodiments, displaying the first version of the first user interface includes displaying a first plurality of user interface objects displayed concurrently with (e.g., displayed adjacent to or overlaying) a first background (e.g., image and/or wallpaper) in accordance with a first configuration (e.g., a first theme, a first layout, and/or a first style), wherein the first plurality of user interface objects correspond to a first plurality of applications and include respective content from the first plurality of applications and are updated periodically as information represented by the first plurality of user interface objects changes (e.g., the first plurality of user interface objects include a first plurality of complications, widgets, and/or other similar user interface elements that correspond to different applications). For example, in FIG. 5B, the wake screen user interface 501 is displayed with a gradient background and complications 502-1 through 502-3.

While displaying the first version of the first user interface, the computer system (904) detects a first input (e.g., a touch input such as a swipe input on a touch-sensitive display, or a touch-sensitive surface, and/or an air gesture such as an air swipe gesture (e.g., movement of an input object such as a controller or finger in the air, while a gaze input is directed to a target region or while a target region has input focus)). For example, the first input corresponds to user input 516 (FIG. 5M) or user input 541 (FIG. 5Q).

In response to detecting the first input (906): in accordance with a determination that the first input meets first criteria, wherein the first criteria require that the first input includes first movement in a first direction in order for the first criteria to be met (e.g., the first movement meets first speed, and/or position requirements for navigating to the home screen from the first user interface), the computer system replaces (908) display of the first version of the first user interface (e.g., a first version of the wake user interface, or a first version of the lock user interface) with display of a second user interface (e.g., a respective version of the second user interface that corresponds to the currently selected version of the first user interface) that includes respective representations (e.g., application icons) of a second plurality of applications. In some embodiments, the first input is an upward swipe that is initiated from a bottom region of the touch-sensitive display, or an upward swipe that is started from the top edge region of the touch-sensitive display. In some embodiments, the second user interface includes a home screen or application launching user interface that includes application icons corresponding to different applications, and that, optionally, includes widgets corresponding to different applications. In some embodiments, the respective representations of the second plurality of applications, when activated (e.g., by a tap input on a touch-sensitive surface, a double tap on a touch-screen display, and/or an air tap or an air flick input), cause the computer system to launch corresponding applications of the respective representations (e.g., the second user interface is a home screen user interface or application launch pad with application icons that are a distinct type of user interface objects from the first plurality of user interface objects (e.g., the complications and/or widgets) shown on the first user interface (e.g., wake user interface, lock user interface, and/or a coversheet user interface)). For example, in response to user input 516 (FIG. 5M), the device 100 displays user interface 518 (FIG. 5N).

In response to detecting the first input (906): in accordance with a determination that the first input meets second criteria, wherein the second criteria require that the first input includes second movement in a second direction, different from the first direction, in order for the second criteria to be met (e.g., the second movement meets second speed and/or position requirements for navigating to another version of the first user interface), the computer system replaces (910) display of the first version of the first user interface with display of a second version of the first user interface (e.g., a currently unselected version of the plurality of preset and/or customizable versions of the first user interface). In some embodiments, the second version of the first user interface is a currently unselected version of the plurality of preset and/or customizable versions of the first user interface. In some embodiments, the first input is a horizontal swipe and/or a horizontal arc swipe that is within a bottom region of the touch-sensitive display, or a horizontal swipe that is within the top edge region of the touch-sensitive display. In some embodiments, displaying the second version of the first user interface includes displaying a second plurality of user interface objects concurrently with (e.g., displayed adjacent to or overlaying) a second background (e.g., image and/or wallpaper) in accordance with a second configuration (e.g., a second theme, a second preset layout, and/or a second style), wherein the second plurality of user interface objects correspond to a third plurality of applications and include respective content from the third plurality of applications (e.g., the plurality of user interface objects include a second plurality of complications, and/or widgets that correspond to different applications (e.g., the third plurality of applications)) and are updated periodically as information represented by the second plurality of user interface objects changes. In some embodiments, the first background is different from the second background, the first plurality of user interface objects is different from the second plurality of user interface objects, and/or the first configuration is different from the second configuration. For example, in response to user input 541 (FIG. 5Q), the device 100 replaces display of wake screen user interface 540-1 with wake screen user interface 540-2 (FIG. 5R), having a different background and/or a different set of complications and/or different visual properties for text than the wake screen user interface 540-1.

In some embodiments, the first version of the first user interface and the second version of the first user interface differ in at least one aspect of multiple aspects of the first user interface, such as the number and/or type of complications/widgets that are included in the first user interface, the appearance of the user interface objects (e.g., time and/or date), the layout of the objects on the background, the type and/or visual properties of the background, and/or the interactions between the background and the objects overlaying the background. As described herein, the first plurality of user interface objects and the second plurality of user interface objects are of a distinct object type from application icons, notifications, date and time, and application shortcuts that may be displayed on a wake user interface, a lock user interface, and/or a coversheet user interface. In some embodiments, in response to detecting selection of a respective one of the first and second plurality of user interface objects (e.g., selection by a tap input, or an air selection gesture), the computer system ceases to display the currently displayed version of the first user interface and displays a user interface of the application corresponding to the selected user interface object, or optionally displays an authentication user interface if access to the application requires authentication first. In some embodiments, the first user interface includes a plurality of user interface objects (optionally distinct from the first plurality of user interface objects, and the second plurality of user interface objects) that provide respective functions that are available on different versions of the first user interface, where the set of functions include a time object that displays the current time, a date object that displays the current date, a lock/unlock icon that indicates the current locked/unlocked status of the computer system, and/or a plurality of device status indicators (e.g., network connectivity, WIFI connectivity, battery status, mobile carrier, unread notifications, and/or shortcut to frequently accessed applications and/or device functions). In some embodiments, different versions of the first user interface can be displayed according to a user's preferences, and/or new versions of the first user interface can be created according to a user's configuration inputs (e.g., inputs directed to a currently displayed version of the first user interface, inputs directed to a selection user interface that displays different versions of the first user interface, and/or inputs directed to a configuration user interface that provides customization options for the first user interface). The computer system displays only one version of the first user interface at a time, unless when switching between different versions of the first user interface and/or when a wake screen switcher user interface (E.g., user interface 548-1, FIG. 5T) is displayed. In some embodiments, a respective version of the first user interface (e.g., the first version or the second version) has a respective background (e.g., a first background or a second background) and a respective plurality of user interface objects (e.g., a first plurality of user interface object, or a second plurality of user interface objects) that are configured according to a respective style (e.g., a first theme, or a second theme), and in the respective style, one or more visual properties and/or behaviors of the respective background, one or more visual properties, functions, type, and/or quantities of the respective plurality of user interface objects, and/or one or more visual properties and/or functions, of the plurality of user interface objects (e.g., time object and/or date object) are selected to correspond to the first style (e.g., portrait mode, text color, and/or font of time and/or plurality of icons change with the background image). In some embodiments, one or more aspects of the first style can be modified (e.g., in editing user interface 565 (FIG. 5X)) according to user inputs to create a new style and a new version of the first user interface that is stored among the plurality of selectable versions of the first user interface or that becomes the currently selected version of the first user interface.

In some embodiments, while the display generation component is in a power-saving state (e.g., a display-off state, and/or a dimmed always-on state), the computer system detects (912) a second input that corresponds to a request to display the first user interface (e.g., an input that activates a power button of the computer system, a touch input on a touch-screen display, and/or a change in the posture of the display generation component). In response to detecting the second input that corresponds to the request to display the first user interface: in accordance with a determination that the first version of the first user interface is a currently selected version for the first user interface, the computer system displays a first animated transition that corresponds to the first version of the first user interface and display the first version of the first user interface upon completion of the first animated transition; and in accordance with a determination that the second version of the first user interface is the currently selected version of the first user interface, the computer system displays a second animated transition that corresponds to the second version of the first user interface and display the second version of the first user interface upon completion of the second animated transition, wherein the first animated transition is different from the second animated transition. In some embodiments, the displayed animated transition (e.g., the first animated transition, the second animated transition, or another animated transition that corresponds to a respective version of the first user interface that is currently selected) is a wake animation from an inactive or power-saving (e.g., a display-off state, and/or a dimmed always-on state) state of the computer system. In some embodiments, the animated transition starts from a dark or dimmed user interface that is displayed. In some embodiments, there are a plurality of versions of the first user interfaces, and a plurality of animated transitions, wherein the animated transition changes based on the version of the first user interface that was displayed right before the device waking input is detected. For example, as described with reference to FIGS. 5E-5L, a plurality of animated transitions are provided, each animated transition corresponding to a respective wake screen user interface. Displaying a first animated transition to display a first wake screen user interface, versus displaying a second animated transition to display a second wake screen user interface, causes the device to automatically adjust how the wake screen user interface is initially presented based on the current wake screen user interface, to present an additional indication of which user interface is selected and to make more efficient use of the display area.

In some embodiments, in response to detecting the second input that corresponds to the request to display the first user interface (914): in accordance with a determination that the currently selected version of the first user interface is a respective version of first user interface that includes a plurality of weather-based elements (e.g., weather-related background, and/or user interface objects), the computer system displays the currently selected version of the first user interface after displaying animated changes of one or more elements of the plurality of weather-based elements (e.g., showing clouds moving and/or raindrops falling, in the background, showing animations to representations of real local weather in the background, showing animations to complications related to weather (e.g., AQI and/or weather forecast) on the background). In some embodiments, the plurality of weather-based elements are selected at least in part based on a current location of the computer system. For example, the local weather is determined for a geographic region in which the computer system is currently located. For example, a weather-style wake screen user interface is illustrated in FIG. 6M. Displaying an animated transition that includes changing display of weather components indicates that the user interface will be displayed as a weather-themed user interface, thereby providing feedback about a state of the device.

In some embodiments, in response to detecting the second input that corresponds to the request to display the first user interface (916): in accordance with a determination that the currently selected version of the first user interface is a respective version of first user interface that includes an image of at least a portion of a planetary or celestial body (e.g., a globe, the earth, a moon, and/or a star), the computer system displays the currently selected version of the first user interface after displaying animated movement of the planetary or celestial body. In some embodiments, the animated transition shows different crops of the globe, or different phases of the moon. For example, a first crop of the globe (or other celestial body) corresponds to displaying a first portion of the globe from a first perspective (e.g., approximately ¼ of the globe is displayed, optionally with a shadow blocking another portion of the globe), and the animated movement changes an amount of the displayed portion of the globe (optionally decreasing a size of the shadow) to a second crop of the globe that displays a second portion of the globe, optionally from the first perspective, or from another perspective (e.g., the globe appears to rotate, clockwise or counter-clockwise), such that a larger portion (e.g., approximately ½) of the globe is displayed in the second crop. In some embodiments, after the animated movement, a current location of the computer system is indicated on the globe displayed with the second crop (e.g., a green dot is displayed on a position of the globe corresponding to the computer system's current location). For example, an animation for a globe wake screen user interface is described with reference to FIGS. 5K-5L. Displaying an animated transition that includes changing an amount of a displayed globe or planet, indicates that the user interface will be displayed as a planetary-themed user interface, thereby providing feedback about a state of the device.

In some embodiments, in response to detecting the second input that corresponds to the request to display the first user interface (918): in accordance with a determination that the currently selected version of the first user interface is a respective version of first user interface that includes a photo (e.g., a scenic photo, a landscape photo, and/or a portrait), the computer system displays the currently selected version of the first user interface after changing at least a first visual property (e.g., a blur radius, a luminance level, a saturation level, and/or a translucency level) of at least a portion of the photo through a plurality of values for the first visual property (e.g., gradually changing a blur filter, a luminance filter, a saturation filter, and/or a translucency filter applied to the photo). For example, an animation for a wake screen user interface that includes a photo (e.g., a portrait-style photo) is described with reference to FIGS. 5G-5H. Displaying an animation of a visual property of a photo displayed as a background of the user interface, such as by the photo becoming less visually deemphasized (e.g., less blurred and/or less transparent) while appearing makes the photo background increasingly prominent, thereby providing feedback about a state of the device.

In some embodiments, in response to detecting the second input that corresponds to the request to display the first user interface (920): in accordance with a determination that the currently selected version of the first user interface is a respective version of first user interface that includes a first color gradient, the computer system displays animated changes of the first colored gradient before displaying the currently selected version of the first user interface (e.g., changing a position at which the gradient lines are located and/or changing one or more colors in the color gradient before displaying the exact color gradient shown in the first user interface). For example, an animation for a wake screen user interface with a gradient is described with reference to FIGS. 5B-5D. Displaying an animation of a colored gradient selected as a background of the user interface, such as by the colored gradient shifting in accordance with a user input, indicates to the user that the user input is causing the device to update a displayed user interface, thereby providing feedback about a state of the device.

In some embodiments, in response to detecting the second input that corresponds to the request to display the first user interface (922): in accordance with a determination that the currently selected version of the first user interface is a respective version of first user interface that includes one or more graphical objects (e.g., emojis, icons, and/or avatars), the computer system displays animated movements of the one or more graphical objects before displaying the currently selected version of the first user interface (e.g., displaying the emojis, icons, and/or avatars, shifting in position, displaying a parallax effect of the graphical objects in response to detecting movement of the display generation component in the physical environment, and/or animating the one or more emojis, icons, and/or avatars bouncing into the first user interface from the edges of the display region). In some embodiments, the animated movements of the one or more graphical objects include displaying and/or moving the one or more graphical objects in a repeating pattern (e.g., a geometric pattern). For example, an animation for a wake screen user interface that includes emojis is illustrated in FIGS. 5I-5J. In response to an input selecting a version of a user interface, displaying an animation of graphical objects such as emojis, icons, and/or avatars in the selected version of the user interface, including by displaying shifts in position and/or a parallax effect, indicates to the user that the user input is causing the device to update a displayed user interface, thereby providing feedback about a state of the device.

In some embodiments, while displaying a currently selected version of the first user interface (924) (e.g., the first version of the first user interface, the second version of the first user interface, or another preset and/or customizable version of the first user interface), the computer system detects a third input that meets the first criteria (e.g., the third input corresponds to a request to display the second user interface (e.g., the home screen or the application launching user interface)). In response to detecting the third input that meets the first criteria, the computer system replaces display of the currently selected version of the first user interface with a respective version of the second user interface that corresponds to the currently selected version of the first user interface, including: in accordance with a determination that the currently selected version of the first user interface is the first version of the first user interface, displaying a third animated transition that corresponds to the first version of the first user interface and display a first version of the second user interface upon completion of the third animated transition; and in accordance with a determination that the currently selected version of the first user interface is the second version of the first user interface, displaying a fourth animated transition that corresponds to the second version of the first user interface and display a second version of the second user interface upon completion of the fourth animated transition, wherein the third animated transition is different from the fourth animated transition. In some embodiments, different version of the first user interface have corresponding versions of the second user interface that share one or more visual characteristics, themes, and/or elements; and the animated transitions that are displayed when transitioning from displaying the first user interface to displaying the second user interface are tailored to the visual characteristics, themes, and/or elements of the currently selected versions of the first user interface and the second user interface. For example, the third input corresponds to user input 5042 (FIG. 5BE) for dismissing the wake screen user interface 5041, and/or the third input corresponds to user input 5044 (FIG. 5BG) for dismissing the wake screen user interface 5041. When transitioning from a wake screen user interface to a different type of user interface of the computer system, displaying different animations based on which version of the wake screen user interface is currently displayed, and displaying a corresponding version of the other type of user interface, causes the device to automatically maintain visual consistency when transitioning between different types of user interfaces.

In some embodiments, replacing display of the currently selected version of the first user interface with the respective version of the second user interface that corresponds to the currently selected version of the first user interface includes (926): in accordance with a determination that the currently selected version of the first user interface is a respective version of first user interface that includes a respective color gradient (e.g., the first color gradient, or a second color gradient different from the first color gradient), displaying animated changes of the respective color gradient before displaying the respective version of the second user interface that corresponds to the currently selected version of the first user interface. In some embodiments, in accordance with a determination that the currently selected version of the first user interface includes a first color gradient, the computer system displays a first animated change of the first color gradient; and in accordance with a determination that the currently selected version of the first user interface includes a second color gradient, distinct from the first color gradient (e.g., distinct in gradient pattern and/or color), displays a second animated change, optionally distinct from the first animated change, of the second color gradient. In some embodiments, the animated changes of the respective color gradient include changing respective positions (and the gradient line positions) of colors in the respective colored gradient to create a series of new colored gradients (e.g., displaying the initial top color of the colored gradient at the bottom of a new colored gradient, and the new colored gradient corresponding to the colored gradient that is displayed halfway through the animation). In some embodiments, the respective version of the second user interface displays the last new colored gradient shown in the animation as its initial colored gradient. In some embodiments, the animated transition between the currently selected color gradient to the respective version of the second user interface includes shifting the color values in the color gradient in one direction (e.g., the first direction) in response to the input that meets the first criteria (e.g., the swipe gesture in the first direction), followed by shifting the color values in the color gradient in another direction (e.g., a direction opposite the first direction) after termination of the input that meets the first criteria to restore the original appearance of the color gradient the respective version of the second user interface is displayed. In some embodiments, the animated transition between the currently selected color gradient to the respective version of the second user interface includes shifting the color values in the color gradient in a same direction as a direction of the input, as described with reference to the gradient animation illustrated in FIGS. 5B-5D. When transitioning from a wake screen user interface that includes a color gradient to a different type of user interface of the computer system, displaying an animation of the color gradient indicates to the user that the user interface is being updated, thereby providing feedback about a state of the device.

In some embodiments, replacing display of the currently selected version of the first user interface with the respective version of the second user interface that corresponds to the currently selected version of the first user interface includes (928): in accordance with a determination that the currently selected version of the first user interface is a respective version of first user interface that includes a portrait (e.g., a photo of a person's face, and/or a portrait of an animal), displaying animated increase of a scale of at least a portion of the portrait (e.g., at least a main subject in the portrait, and/or at least a central portion of the portrait) before displaying the respective version of the second user interface that corresponds to the currently selected version of the first user interface. In some embodiments, the portrait includes a portrait style photo or image that includes a main subject, such as an individual and/or an animal, and the main subject of the portrait-style photo is enlarged during the animated transition, while one or more other objects in the background and/or foreground of the photo do not change in scale, or optionally, is enlarged by a smaller amount as compared to the main subject of the photo. For example, the animated transition for the portrait-style wake screen user interface illustrated in FIGS. 5G-5H is displayed while dismissing the wake screen user interface and displaying a home screen user interface. When transitioning from a wake screen user interface that includes a portrait to a different type of user interface of the computer system, displaying an animation of the portrait increasing in scale indicates to the user that the user interface is being updated, thereby providing feedback about a state of the device.

In some embodiments, replacing display of the currently selected version of the first user interface with the respective version of the second user interface that corresponds to the currently selected version of the first user interface includes (930): in accordance with a determination that the currently selected version of the first user interface is a respective version of first user interface that includes one or more objects in a foreground of the first user interface (e.g., emojis, icons, avatars, and/or image of a planetary or celestial body), displaying animated movements of the one or more objects in the foreground of the first user interface (optionally without animating movement of a background of the first user interface, such that the one or more objects animate in movement relative to the background of the first user interface) before displaying the respective version of the second user interface that corresponds to the currently selected version of the first user interface, as illustrated in FIGS. 5I-5J In some embodiments, displaying the animated movements include displaying the emojis, icons, and/or avatars, shifting in position, displaying a parallax effect of the graphical objects in response to detecting movement of the display generation component in the physical environment (e.g., a simulated parallax effect), and/or animating the one or more emojis, icons, and/or avatars bouncing into the first user interface from the edges of the display region. In some embodiments, the animated movement of the one or more objects that simulates a parallax effect is displayed in accordance with a determination that the currently selected version of the first user interface includes at least a portion of a planetary or celestial body (e.g., a globe, the earth, a moon, and/or a star). For example, the animation described with reference to FIGS. 5K-5L is replicated while dismissing the wake screen user interface and displaying a home screen user interface. In some embodiments, the animation described with reference to FIGS. 5L2-5L3 is displayed in response to a request to dismiss the wake screen user interface. When transitioning from a wake screen user interface that includes graphical objects to a different type of user interface of the computer system, displaying an animation of the graphical objects moving, optionally with a parallax effect, indicates to the user that the user interface is being updated, thereby providing feedback about a state of the device.

In some embodiments, replacing display of the currently selected version of the first user interface with the respective version of the second user interface that corresponds to the currently selected version of the first user interface includes (932): in accordance with a determination that the currently selected version of the first user interface is a respective version of first user interface that includes one or more preset objects (e.g., emojis, icons, avatars, and/or image of a planetary or celestial body), increasing respective visual depths of the one or more objects before displaying the respective version of the second user interface that corresponds to the currently selected version of the first user interface. In some embodiments, the animated transition between displaying the first user interface and displaying the second user interface shows the one or more objects in the first user interface being pushed back in the background away from the viewer. For example, the animation is a reverse animation from the animation described with reference to FIGS. 5I-5J while dismissing the wake screen user interface and displaying a home screen user interface. When transitioning from a wake screen user interface that includes graphical objects to a different type of user interface of the computer system, displaying an animation of the graphical objects appearing to move further away visually deemphasizes the graphical objects and indicates to the user that the user interface is being changed to a different user interface, thereby providing feedback about a state of the device.

In some embodiments replacing display of the currently selected version of the first user interface with the respective version of the second user interface that corresponds to the currently selected version of the first user interface includes (934): in accordance with a determination that the currently selected version of the first user interface is a respective version of first user interface that includes a pattern (e.g., a geometric pattern) of objects (e.g., emojis, icons, and/or avatars), moving the pattern of objects in accordance with a preset movement pattern (e.g., moving in a geometric pattern such as a spiral pattern, and/or moving along a predefined path such as a curved path). For example, as described with reference to FIGS. 6H2-6H6, a plurality of patterns for a selected set of emojis are displayed as the background of the wake screen user interface. In some embodiments, the emojis are animated as moving, wherein the animation is optionally selected based on a currently selected pattern of the emojis. When transitioning from a wake screen user interface that includes graphical objects to a different type of user interface of the computer system, displaying an animation of the graphical objects appearing to move in a preset movement pattern indicates to the user that the user interface is being changed to a different user interface, thereby providing feedback about a state of the device.

In some embodiments, replacing display of the currently selected version of the first user interface with the respective version of the second user interface that corresponds to the currently selected version of the first user interface includes (936): in accordance with a determination that the currently selected version of the first user interface is a respective version of first user interface that includes a preset scene (e.g., a landscape, a cityscape, weather scene, and/or nature scene), displaying different views of the scene that corresponds to movement of a virtual viewpoint within the scene before displaying the respective version of the second user interface that corresponds to the currently displayed version of the first user interface. In some embodiments, simulating movement of the virtual viewpoint within the scene is performed in accordance with a determination that the currently selected version of the first user interface includes one or more weather-based elements, and displaying the different views of the scene simulates a view of a user moving through the scene in weather shown by the one or more weather elements (e.g., the animated transition displays a camera view of moving through the rain and/or clouds represented by the weather elements). For example, the weather wake screen user interface (FIG. 6M) includes animated raindrops and/or dynamically updates to change a viewpoint of the user, as if the user is walking through the rain. When transitioning from a wake screen user interface that includes a preset scene (e.g., weather changes), displaying an animation of the user's viewpoint appearing to travel through the scene indicates to the user that the user interface is being changed to a different user interface and provides information about a state of the weather that is visible from farther away than other indications of weather such as a weather widget or complication, thereby providing feedback about a state of the device.

In some embodiments, while displaying a currently selected version of the first user interface (e.g., the first version of the first user interface, the second version of the first user interface, another preset and/or customizable version of the first user interface), the computer system detects (938) a fourth input that corresponds to a request to dismiss the first user interface (e.g., the fourth input meets the first criteria). In some embodiments, prior to detecting the fourth input, the currently-selected version of the first user interface was displayed in response to an input that causes the display generation component to transition from a power-saving mode to a normal operation mode. In some embodiments, prior to detecting the fourth input, the currently-selected version of the first user interface was displayed in response to an input that replaces display of an application user interface of a respective application with display of the first user interface. In some embodiments, prior to detecting the fourth input, the currently-selected version of the first user interface was displayed in response to an input that replaces display of the second user interface (e.g., the home screen, or the application launching user interface) with display of the first user interface. In some embodiments, prior to detecting the fourth input, the currently-selected version of the first user interface was displayed in response to an input that replaces display of a widget screen with display of the first user interface. In response to detecting the fourth input that corresponds to the request to dismiss the first user interface: in accordance with a determination that a respective user interface that is to replace display of the first user interface in response to the fourth input includes the second user interface (e.g., a respective version of the second user interface that corresponds to the currently selected version of the first user interface) (and, optionally, in accordance with a determination that the first user interface was had been displayed as a wake screen rather than a coversheet user interface that had blocked access to the second user interface prior to the detection of the fourth input), the computer system displays a first intermediate view of the first user interface that visually obscures at least a portion of the second user interface before displaying the second user interface (e.g., the respective portion of the second user interface that corresponds to the currently selected version of the first user interface, and/or a standard version of the second user interface); and in accordance with a determination that the respective user interface that is to replace display of the first user interface in response to the fourth input includes a respective user interface of a first application (e.g., the user interface of the last-displayed application prior to displaying the first user interface (e.g., the first user interface is a coversheet that blocks the view of the last-displayed application)), the computer system displays a second intermediate view of the first user interface that visually obscures at least a portion of the respective user interface of the first application, wherein the first intermediate view of the first user interface and the second intermediate view of the first user interface have different values for a first display property (e.g., opacity, blur radius, translucency, and/or luminance) of the first user interface (e.g., for respective positions on the first user interface). In some embodiments, the computer system displays the first user interface moving out of the display area (e.g., shifting in the first direction in accordance with the movement in the fourth input) and revealing the underlying user interface (e.g., the second user interface, and/or a respective user interface of the first application), wherein the first user interface is more opaque and visually obscures the underlying user interface to a greater degree when the underlying user interface is the second user interface (e.g., the home screen); and the first user interface is more translucent and visually obscure the underlying user interface to a lesser degree when the underlying user interface is a respective user interface of an application. In some embodiments, both the first intermediate view and the second intermediate view of the currently displayed version of the first user interface become increasingly translucent as the currently displayed version of the first user interface gradually shifts out of the display region, but the first intermediate view of the currently displayed version of the first user interface is displayed with a greater blur radius as compared to the second intermediate view of the currently displayed version of the first user interface, such that the intermediate view of the first user interface visually obscures the portion of the second user interface underlying the first user interface more than it does to the portion of application user interface underlying the first user interface. For example, as described with reference to FIGS. 5BE-5BF and FIGS. 5BG-5BH, the animated transition for dismissing the wake screen user interface 5041 is selected in accordance with the content that is displayed after the wake screen user interface 5041 is dismissed (e.g., the home screen user interface is to be displayed in FIG. 5BF and an application user interface is to be displayed in FIG. 5BH). In response to a request to dismiss a displayed wake screen user interface, while navigating away from the wake screen, displaying an intermediate view of the wake screen that changes one or more visual properties of the wake screen in different ways depending on which user interface will be displayed once the wake screen is dismissed (e.g., whether the user is navigating to a home or application launching user interface or to an application user interface) provides feedback about a state of the device.

In some embodiments, while the display generation component is in a power-saving state (e.g., a display-off state, and/or a dimmed always-on state), the computer system detects (940) a fifth input (e.g., same as the second input, or another input that is different from the second input) that corresponds to a request to display the first user interface (e.g., an input that activates a power button of the computer system, a touch input on a touch-screen display, and/or a change in the posture of the display generation component). In response to detecting the fifth input that corresponds to the request to display the first user interface: the computer system displays a respective animated transition (e.g., the first animated transition, the second animated transition, another animated transition that corresponds to another version of the first user interface). In some embodiments, a respective animated transition that corresponds to a currently selected version of the first user interface (e.g., the first version of the first user interface, the second version of the first user interface, or another preset or customizable version of the first user interface)) and the computer system displays a currently selected version of the first user interface upon completion of the respective animated transition, wherein displaying the respective animated transition includes changing an appearance of a textual element in the currently selected version of the first user interface (e.g., changing a thickness, fill, and/or size of the font of the textual element (e.g., a time element, a date element, and/or textual header in the first user interface)). For example, in the animated transition described with reference to FIG. 5E-5F, the text of the date and time is changed (e.g., to a bold version of the font). In response to an input, received while the computer system is in a power-saving display state, corresponding to a request to display a wake screen user interface, displaying an animated transition to the requested wake screen user interface that includes a transition in an appearance of a textual element indicates to the user that the user interface is being changed from a power-saving display state user interface to a different user interface, thereby providing feedback about a state of the device.

In some embodiments, displaying the first version of the first user interface includes (942) displaying an indication of a current time, and the first plurality of user interface objects are displayed proximate to (e.g., above, next to, or below) the indication of the current time. In some embodiments, the location of the indication of the current time has a fixed position on different versions of the first user interface and if a respective version of the first user interface includes complications (e.g., complications associated with weather, health, compass, fitness, and/or third-party applications), the complications are displayed adjacent to the indication of the current time on the respective version of the first user interface. For example, in FIG. 5B, the date and/or time indication are displayed above the complications 502-1 through 502-3. Displaying an indication of a current time, and a plurality of user interface objects that are periodically updated with content from active applications near the current time, causes the device to automatically present current information that is likely to be of interest to the user in an efficient way in the display area, thereby reducing an amount of time that is needed for the user to view the information.

In some embodiments, while displaying the first version of the first user interface, the computer system detects (944) a user input that corresponds to a request to update the first plurality of user interface objects that are displayed concurrently with the first background. In response to detecting the user input that corresponds to the request to update the first plurality of user interface objects, the computer system displays one or more selectable options that, when selected, modify at least one of the first plurality of user interface objects. In some embodiments, the user input is to change the applications associated with at least one user interface object of the first plurality of user interface objects. In some embodiments, the user input is to change a style (and/or icon) of the user interface object in the first plurality of user interface objects. In some embodiments, the user input is an input to change a position of at least one user interface object of the first plurality of user interface objects (e.g., to be displayed above and/or below the indication of the current time and/or to change where the first user interface object is positioned relative to the other user interface objects in the first plurality of user interface objects (e.g., move a complication to the left and/or right)). In some embodiments, while displaying the one or more selectable options, the computer system detects selection of a first option of the one or more selectable options, and in response, the computer system changes at least one aspect (e.g., absolute position, style, ordinal position, and/or application) of at least one of the first plurality of user interface objects in the first version of the first user interface. For example, user input 564 (FIG. 5W), the device 100 displays editing user interface 565 for the user to edit the wake screen user interface, including adding complications and/or changing a style of the complications, as described with reference to FIGS. 5Y-5AG. Displaying, in a wake screen user interface, a plurality of user interface objects that are periodically updated with content from active applications, and that can a user can customize (e.g., by adding, removing, rearranging, or other modification), improves privacy and security by enabling the user to select which applications will have their content displayed in the wake screen user interface and in what configuration or order, thereby reducing the amount of time that is needed for the user to view current information about the device.

In some embodiments, while the first version of the first user interface is displayed, the computer system detects (946) a first condition that causes the display generation component to cease display of the first user interface (e.g., an inactivity time-out or an activation of the power button that causes the display generation component to transition into a power-saving mode (e.g., a display-off state, and/or a dimmed always-on state), an input that dismisses the first user interface and displays another user interface (e.g., the home screen or an application user interface)). In response to detecting the first condition that causes the display generation component to cease display of the first user interface, the computer system ceases to display the first version of the first user interface (e.g., turns off the display, dims the display to only shown a time element, or displays another user interface such as the home screen or an application user interface). While the first user interface is not displayed (e.g., while the display is turned off, the display is dimmed, or a home screen or application user interface is displayed), the computer system detects a second condition that causes the display generation component to redisplay the first user interface (e.g., activation of the power button, an input that wakes the display, or a user input for displaying the coversheet user interface to block the currently displayed user interface). In response to detecting the second condition that causes the display generation component to redisplay the first user interface, the computer system redisplays the first version of the first user interface (e.g., while the first version of the first user interface is the currently selected version of the first user interface), including: redisplaying the first plurality of user interface objects with updated application content (e.g., based on updated information that is generated between occurrences of the first condition and the second condition) from the first plurality of applications, in the first version of the first user interface; and in accordance with a determination that one or more notifications have been received between occurrences of the first condition and the second condition (e.g., a first notification from a first application, and/or a second notification from a second application that were not displayed in the first version of the first user interface prior to the detection of the first condition), displaying the one or more notifications in the first version of the first user interface, along with the first plurality of user interface objects that include the updated application content. For example, in FIG. 6S-6T, in some embodiments, the device 100 optionally changes the wake screen user interface 692 to wake screen user interface 694 in accordance with a determination that the device 100 has entered, and exited, a low-power state. In some embodiments, in accordance with a determination that device 100 has entered and exited a low-power state, wake screen user interface 692 remains displayed (and is not replaced with wake screen user interface 694). Displaying, in a wake screen user interface, a plurality of user interface objects that are periodically updated with content from active applications, including redisplaying the plurality of user interface objects with updated application content as well as interim notifications received when the wake screen user interface is redisplayed after being dismissed or turned off, causes the device to automatically present current information that is likely to be of interest to the user in an efficient way in the display area, thereby reducing an amount of time that is needed for the user to view the information.

In some embodiments, displaying the first version of the first user interface including the first plurality of user interface objects includes (948): at a first time: displaying the first version of the first user interface with a first user interface object corresponding to a first application and a second user interface object corresponding to a second application, wherein the first user interface object includes first application information from the first application and the second user interface object includes second application information from the second application; and at a second time later than the first time: displaying the first version of the first user interface with the first user interface object corresponding to the first application and the second user interface object corresponding to the second application, wherein the first user interface object includes updated application information from the first application that is different from the first application information from the first application. In some embodiments, optionally, the first user interface object and the second user interface object are updated according to the same updating schedule, and the second user interface object optionally includes second updated information from the second application that is different from the second application. In some embodiments, the first user interface object and the second user interface object are automatically updated (e.g., independently of each other), when new information becomes available from their corresponding applications. In some embodiments, the first user interface object is updated in accordance with a first set of rules and conditions, and the second user interface object is updated in accordance with a second, different set of rules and conditions from the first set of rules and conditions. For example, as described with reference to FIGS. 5M and 5Q, one or more complications on the wake screen user interface are updated (e.g., weather complication 502-6 is updated to display an AQI of 30 (FIG. 5Q) instead of an AQI of 32 (FIG. 5M)). Displaying, in a wake screen user interface, a plurality of user interface objects that are updated over time with content from active applications, causes the device to automatically present current information that is likely to be of interest to the user, thereby reducing an amount of time that is needed for the user to view the information.

In some embodiments, the first plurality of user interface object includes (950) at least a first user interface object that is associated with a first application published by a first third-party provider and a second user interface object that is associated with a second application published by a second third-party provider different from the first third-party provider. For example, different application vendors may utilize an API provided by the maker of the operating system that designs the first user interface and its operations, and allow their respective applications to have corresponding complications included in the first user interface, as described with reference to FIG. 5Y. Displaying, in a wake screen user interface, a plurality of user interface objects that are updated over time with content from active applications, including applications from third-party providers, causes the device to automatically present current information that is likely to be of interest to the user regardless of source, thereby reducing an amount of time that is needed for the user to view the information.

In some embodiments, while displaying the first version of the first user interface (952): the computer system detects a sixth input that meets third criteria different from the first criteria and the second criteria. In some embodiments, the third criteria include a criterion that is satisfied in accordance with a determination that the input has been maintained for at least a threshold amount of time (e.g., a long press input for at least 1 second, 2 seconds, or 5 seconds). In response to detecting the sixth input that meets the third criteria (e.g., in accordance with a determination that the sixth input corresponds to a request to launch an editing user interface (e.g., editing user interface 565 (FIG. 5X)) to edit the currently displayed version of the first user interface or select another version of the first user interface as the currently selected version of the first user interface): the computer system initiates a process to display an editing user interface (e.g., displaying the editing user interface directly, or displaying an authentication user interface (e.g., user interface 547 (FIG. 5S)) before displaying the editing user interface), including displaying one or more selectable options for editing one or more aspects (e.g., background, theme, style, set of complications, time element, date element, notification display style, font, color scheme, and/or display properties) of the first user interface. In some embodiments, the sixth user input is a long press that lasts a predefined amount of time on a touch-sensitive display at a location that corresponds to a portion of the first user interface (e.g., the time element, the background, and/or an unoccupied portion). For example, the editing user interface 565 (FIG. 5X) includes reticles 568 and 569 indicating that the time and/or date are editable. In response to a different type of user input that the types of user input used to transition from the wake screen user interface to a different user interface of the computer system, initiating a process to edit one or more aspects of the wake screen user interface enables a transition to an editing mode of the wake screen user interface without displaying additional controls.

In some embodiments, initiating the process to display the editing user interface includes (954): in accordance with a determination that the computer system is in an unauthenticated state (e.g., locked state), acquiring authentication information prior to displaying the editing user interface (e.g., displaying an authentication user interface with information about a status of acquiring authentication information, instructions for providing authentication information, and/or one or more controls to initiate a process for acquiring authentication information or inputting authentication information); and in response to acquiring the authentication information, in accordance with a determination that the authentication information is consistent with authorized authentication information (e.g., a password, passcode, unlocking gesture, and/or biometric information such as fingerprint, facial scan, iris scan, and/or voice pattern that matches an authorized password, passcode, unlocking gesture, and/or biometric information such as fingerprint, facial scan, iris scan, and/or voice pattern) required to transition the computer system from the unauthenticated state to an authenticated state (e.g., unlocked state), dismissing the authentication user interface and displaying the editing user interface. In some embodiments, in accordance with a determination that authentication information is not received or the authentication information that is received is not consistent with authorized authentication information, the computer system redisplays or maintains display of the first user interface and the editing user interface is not displayed. In some embodiments, the computer system displays a prompt for authentication information if the user attempts to edit the first user interface when the computer system is in an unauthenticated state. For example, before displaying editing user interface 565 (FIG. 5X), the device 100 displays a user interface 547, or another authentication user interface. Before displaying an editing user interface to edit one or more aspects of the wake screen user interface, acquiring valid authentication information if the computer system is in an unauthenticated state provides improved privacy and security by requiring user authentication to enable editing of the wake screen user interface.

In some embodiments, the second criteria require that the second movement in the second direction is detected (956) at a location that corresponds to a predefined portion of the first user interface. In some embodiments, the predefined portion comprises the bottom edge region of the first user interface. In some embodiments, when the first user interface is displayed on a touch-screen display, the second criteria require the second movement in the second direction to be detected in the bottom edge region of the touch-screen display. In some embodiments, the first direction is a vertical direction (e.g., upward or downward), and the second direction is a horizontal direction (e.g., leftward or rightward) relative to the first user interface. In some embodiments, the second criteria are met when the first input further includes a movement component in the first direction along with the second movement in the second direction (e.g., the first input is an arc swipe in the horizontal direction). For example, the first input is detected within a predefined edge region of the touch-sensitive surface (e.g., detecting the first input at an initial touch-down location that is within a predefined region of the device in proximity to the bottom edge of the display), and an initial portion of first movement of the first input includes movement in a vertical direction (e.g., upward) and movement in a horizontal direction (e.g., rightward) relative to a predefined edge (e.g., bottom edge) of the display (e.g., a touch-sensitive surface). In some embodiments, the movement of the first input does not have to be completely vertical and can include a small horizontal component along with the vertical component in order to cause display of the second version of the first user interface. In some embodiments, the initial portion of the first movement includes the movement in the vertical direction followed by the movement in the horizontal direction. In some embodiments, the initial portion of the first movement includes the movement in the vertical direction concurrent with the movement in the horizontal direction. In some embodiments, user input 541 (FIG. 5Q) satisfies the second criteria, and in response to user input 541, the wake screen user interface changes from user interface 540-1 to user interface 540-2 (FIGS. 5Q-5R). In some embodiments, user input 5051 (FIG. 5BJ) is an arc swipe user input that satisfies the second criteria. Requiring that the input for navigating to a different version or page of the wake screen user interface be directed to a predefined portion of the wake screen user interface causes the device to automatically require more intentional input as well as leaves other portions of the wake screen user interface available for performing other types of operations without displaying additional controls.

In some embodiments, replacing display of the first version of the first user interface with the second user interface in accordance with the determination that the first input meets the first criteria includes (958) replacing display of the first version of the first user interface with a first version of the second user interface that corresponds to the first version of the first user interface. While displaying the second version of the first user interface as a result of the first input meeting the second criteria, the computer system detects a seventh input. In response to detecting the seventh input: in accordance with a determination that the seventh input meets the first criteria, the computer system replaces display of the second version of the first user interface with a second version of the second user interface that corresponds to the second version of the first user interface. For example, in some embodiments, when the currently selected version of the first user interface is changed in response to user input (e.g., the first input), the currently selected version of the second user interface is also changed automatically without further user input. For example, while displaying a first wake user interface (e.g., wake screen user interface 5041 (FIG. 5BG)), in response to dismissing the wake user interface (or another application user interface) (e.g., user input 5044 (FIG. 5BG)), a first home screen user interface is displayed (optionally the first home screen user interface is selected as being related to the first wake user interface) (e.g., home screen user interface 5046 (FIG. 5BI)). In some embodiments, after changing the currently displayed wake user interface (e.g., from the first wake user interface to a second wake user interface), in response to dismissing the second wake user interface (or another application user interface) (e.g., wake screen user interface 5052 (FIG. 5BK)), a second home screen user interface that is related to the second wake user interface is displayed (e.g., home screen user interface 5056 (FIG. 5BL)). As such, the home screen user interface is automatically updated in accordance with the current respective wake user interface. When transitioning from a wake screen user interface to another type of user interface of the computer system, displaying a version of the other type of user interface that corresponds to the version of the wake screen user interface that was displayed causes the device to automatically maintain visual consistency when transitioning between different types of user interfaces.

In some embodiments, the first version of the second user interface includes (960) a third background and the second version of the second user interface includes a fourth background that is different from the third background. In some embodiments, the third background of first version of the second user interface corresponds to the first background of the first version of the first user interface; and the fourth background of the second version of the second user interface corresponds to the second background of the second version of the first user interface. For example, the background (e.g., stars background) of home screen user interface 5041 (FIG. 5BG), is related to the background (e.g., star background) of the wake screen user interface 5046 (FIG. 5BI), and the background (e.g., moon and cloud) of home screen user interface 5056 (FIG. 5BL) is related to the background (e.g., moon) of the wake screen user interface 5052 (FIG. 5BK). When transitioning from a wake screen user interface to another type of user interface of the computer system, displaying different backgrounds for the other type of user interface based on which version of the other type of user interface is being transitioned to (where the background optionally corresponds to the background of the version of the wake screen user interface that was displayed) causes the device to automatically maintain visual consistency when transitioning between different types of user interfaces.

In some embodiments, the second version of the second user interface includes (962) respective representations of a third plurality of applications that are distinct from the respective representations of the second plurality of applications that are included in the first version of the second user interface. In some embodiments, the third plurality of applications and the second plurality of applications includes one or more same applications that are optionally arranged at different positions and/or with different sizes of icons (e.g., a weather application icon in the third plurality of applications and a weather application widget in the second plurality of applications). For example, in some embodiments, the application icons displayed in the home screen user interface 5056 (FIG. 5BL) are distinct from one or more of the application icons displayed in the home screen user interface 5046 (FIG. 5BI). When transitioning from a wake screen user interface to another type of user interface of the computer system, displaying representations of different pluralities of applications in the other type of user interface based on which version of the other type of user interface is being transitioned to causes the device to automatically present different control options consistent with a current context of the other type of user interface.

It should be understood that the particular order in which the operations in FIGS. 9A-9I have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1000, 1100, 12000, 1300, 14000, 15000, 16000, and 17000) are also applicable in an analogous manner to method 900 described above with respect to FIGS. 9A-9I. For example, the contacts, gestures, user interface objects and animations described above with reference to method 900 optionally have one or more of the characteristics of the contacts, gestures, user interface objects and animations described herein with reference to other methods described herein (e.g., methods 1000, 1100, 12000, 1300, 14000, 15000, 16000, and 17000). For brevity, these details are not repeated here.

FIGS. 10A-10I are flow diagrams illustrating method 1000 of selecting and/or modifying a user interface in accordance with some embodiments. Method 1000 is performed (1002) at a computer system (e.g., device 300, FIG. 3, or portable multifunction device 80, FIG. 1A) that is in communication with a display generation component (e.g., a hardware element, comprising one or more display devices, such as a display, a projector, a touch-screen display, a heads-up display, a head-mounted display, or the like) (and optionally, the computer system is further in communication with one or more input devices, one or more cameras, and/or one or more 3D sensing and/or determination devices, such as lidars, depth sensors, and/or distance sensors) Some operations in method 1000 are, optionally, combined and/or the order of some operations is, optionally, changed.

In response to a request to change the wake user interface, displaying a preview of the wake user interface concurrently with at least a part of a preview of a home user interface reduces the number of inputs needed to view the effect that potential changes may have on both the wake user interface and the home user interface.

The computer system detects (1004) a request to change a wake user interface of the computer system, wherein a wake user interface is a user interface that is displayed when the computer system is turned on or transitioned from a low power state to a higher power state (e.g., from an off state to a dimmed state, and/or from an off state or a dimmed, always-on state to a normal state) and corresponds to a restricted mode of operation for the computer system. In some embodiments, the request to change the wake user interface satisfies criteria for invoking a first user interface that allows a user to customize a wake user interface, including selecting a background, one or more visual properties and/or a display style for the wake user interface. In some embodiments, the wake user interface includes a user interface that corresponds to a restricted state of the computer system, such as a wake user interface user interface and/or a lock user interface user interface. In some embodiments, the wake user interface can be redisplayed as a coversheet user interface to block a currently displayed home screen or application user interface in response to a user input and then dismissed to reveal the last displayed home screen or application user interface in response to another user input. In some embodiments, the first user input includes a gesture that corresponds to a request to display a wake user interface selection user interface (e.g., user input 602 (FIG. 6A) causes the device 100 to display expanded face switcher user interface 606 (FIG. 6D)). In some embodiments, the first user input is a user input that corresponds to a request enter a customization mode for customizing the one or more backgrounds for the wake user interface user interface. In some embodiments, the first input is required to meet different sets of requirements in order to cause display of a customization user interface or selection user interface for the wake user interface, depending on what user interface is currently displayed at the time of the first input.

In response to detecting the request to change the wake user interface of the computer system, the computer system displays, via the display generation component, a first user interface (e.g., expanded face switcher user interface 606 (FIG. 6D)) for changing the wake user interface for the computer system (e.g., a wake user interface selection user interface). While displaying the first user interface (1008): the computer system displays a first representation (e.g., a preview) of the wake user interface, and a first representation (e.g., at least part of a preview) of a home user interface, where the home user interface (e.g., a home screen, and/or an application launching user interface) is a user interface that is displayed when the wake user interface is dismissed and the computer system has exited the restricted mode of operation. For example, in FIG. 6F, the representation 611 of a wake screen user interface is displayed with a portion of a representation of a related home screen user interface 620. In some embodiments, the home user interface includes user interface objects corresponding to multiple applications that can be selected to open different applications (e.g., as illustrated in FIGS. 6I-6J, the home screen user interface includes a plurality of application icons). The first representation of the wake user interface corresponds to a first set of one or more wake user interface settings including a first wake user interface background. The first representation of the home user interface corresponds to a first set of one or more home user interface settings including a first home user interface background (e.g., the first wake user interface background and the first home user interface background are a predefined pair that is to be used respectively for the wake user interface and the home user interface in accordance with user selection of the first representation of the wake user interface, and/or if the first wake user interface background is already the currently selected background for the wake user interface). For example, as described with reference to FIGS. 6F-6J, the representation of smiley face emoji wake screen user interface 611 is associated with the representation of smiley face emoji home screen user interface 620.

The computer system displays, concurrently with the first representation, a second representation (e.g., a preview) of the wake user interface (e.g., a wake user interface user interface, a lock user interface user interface) (and, optionally, a second representation (e.g., at least part of a preview) of the home user interface). For example, in FIG. 6F, at least a portion of representation 613 is displayed with the representation 611 of the wake screen user interface. The second representation of the wake user interface corresponds to a second set of one or more wake user interface settings including a second wake user interface background that is different from the first wake user interface background. In some embodiments, the first user interface also includes a second representation of the home user interface that includes a second home user interface background to be displayed in the home user interface when the second wake user interface background is selected for the wake user interface (e.g., the second wake user interface background and the second home user interface background are a predefined pair that is to be used respectively for the wake user interface and the home user interface at a given time).

The computer system detects (1010) a sequence of one or more inputs corresponding to selection of a respective representation of the wake user interface for the computer system from the first user interface. For example, the user selects a wake screen user interface from the representations displayed in the expanded face switcher user interface 606 (FIG. 6D) to set as a current wake screen user interface.

In response to detecting the sequence of one or more inputs (1012), in accordance with a determination that the first representation of the wake user interface was selected based on the sequence of one or more inputs, the computer system sets (1014) the wake user interface of the computer system based on the first set of one or more wake user interface settings associated with the first representation of the wake user interface, including using the first wake user interface background as a respective background for the wake user interface and set the home user interface of the computer system based on the first set of one or more home user interface settings, including using the first home user interface background as a respective background for the home user interface. For example, if the user selects representation 615 of the wake screen user interface (FIG. 6D), the selected wake screen having the dog photo is set as the current wake screen, and the corresponding home screen user interface is set as the current home screen user interface.

In accordance with a determination that the second representation of the wake user interface was selected based on the sequence of one or more inputs, the computer system sets (1016) the wake user interface of the computer system based on the second set of one or more wake user interface settings associated with the second representation of the wake user interface, including using the second wake user interface background as the background for the wake user interface. For example, if the user selects representation 611 if the wake screen user interface, the emoji smiley face wake screen and corresponding emoji smiley face home screen are set as the current wake screen and home screen.

In some embodiments, detecting the request to change the wake user interface of the computer system includes (1018) detecting a long press input (e.g., a touch input on a touch-screen display at a location that corresponds to an unoccupied background region of the first user interface, and that is maintained without substantial movement for at least a threshold amount of time). For example, user input 602 is a long press input in the wake screen user interface 600 that is not detected over any of the one or more complications or the date and/or time indication. In some embodiments, before displaying the first user interface for changing the wake user interface, the computer system displays an authentication user interface in accordance with a determination that the computer system is in a restricted, or locked, mode, and the computer system displays the first user interface after receiving valid authentication information, as described with reference to FIGS. 6B-6C. Enabling the user to provide a long press input to enter a wake user interface selection mode reduces the number of inputs needed to change the wake user interface without displaying additional controls, and requiring valid authentication information to enter the wake user interface selection mode provides improved security and privacy by preventing unauthorized users from changing the wake user interface.

In some embodiments, the first representation of the home user interface is displayed (1020) in response to detecting an end of the long press input. In some embodiments, in response to detecting the long press input meeting the time threshold, the computer system initially displays the first representation of the wake user interface and the second representation of the wake user interface, without displaying the first representation of the home user interface; and upon detecting the termination of the long press input (e.g., upon an end or liftoff of the long-press input), the computer system displays the first representation of the home user interface. In some embodiments, in response to detecting the long press input meeting the time threshold, the computer system initially displays the first representation of the wake user interface and the second representation of the wake user interface, and a hind of the first representation of the home user interface (e.g., peeking from behind the first representation of the wake user interface); and upon detecting the termination of the long press input (e.g., upon liftoff of the long-press input), the computer system displays the first representation of the home user interface expanding out from behind the first representation of the wake user interface. For example, optionally upon liftoff of user input 624 (FIG. 6F), the device displays user interface 638 (FIG. 6I). Enabling the user to provide a long press input to enter a wake user interface selection mode, and displaying a preview of a corresponding home user interface with a preview of a respective candidate version of the wake user interface reduces the number of inputs needed to view the effect that potential changes may have on both the wake user interface and the home user interface.

In some embodiments, while displaying the first user interface for changing the wake user interface for the computer system, the computer system detects (1022) a first user input corresponding to a request to rearrange an order of the first representation of the wake user interface and the second representation of the wake user interface in the first user interface. In response to detecting the first user input, the computer system enters a state in which ordinal positions of the first representation of the wake user interface and the second representation of the wake user interface are adjustable in accordance with one or more user inputs. In some embodiments, the first user input that corresponds to a request to rearrange the order of the representations of wake user interface in the first user interface includes a long press on a location corresponding to one of the representations of the wake user interface, after the long press input the ordinal positions of the representations of the wake user interface are adjustable in accordance with one or more drag inputs on one or more of the representations of the wake user interface (e.g., dragging one representation of the wake user interface from a left side to a right side of another representation of the wake user interface), as described with reference to FIG. 6D. In some embodiments, the representations of the wake user interface are displayed in an order of automatic rotation (e.g., the wake user interface automatically and/or periodically update from one version of the wake user interface to another based on an order of their representations in the first user interface). In some embodiments, when the user manually swipes through different versions of the wake user interface while the wake user interface is displayed, the order that different versions of the wake user interface is presented is based on the order of their representations in the first user interface. Therefore, after the user changed the order of the representations of the wake user interface in the first user interface, the order that different version of the wake user interface is presented in response to the user's swipe through the different versions of the wake user interface (e.g., horizontal, and/or arc swipes at the bottom edge region of the wake user interface) would be changed accordingly. Enabling the user to provide a long press input while in the wake user interface selection mode to rearrange different candidate versions of the wake user interface enables custom organization of the different wake user interface options to be performed without displaying additional controls.

In some embodiments, the computer system detects (1024) a second user input corresponding to a request to remove the first representation of the wake user interface from the first user interface (e.g., the second user input is a swipe input in a first direction (e.g., a swipe up) that is detected at a location corresponding to the first representation of the wake user interface in the first user interface) (e.g., in some embodiments, the second user input includes a touch-hold input followed by an upward swipe input). In response to detecting the second user input corresponding to the request to remove the first representation of the wake user interface from the first user interface, the computer system initiates a wake screen removal process for removing the first representation of the wake user interface from the first user interface. In some embodiments, in response to detecting the second user input, the computer system displays a user-selectable affordance (e.g., a deletion button and/or a deletion confirmation button) for deleting the first representation of the wake user interface, and in response to detecting a user input selecting the user-selectable affordance, the computer system removes the first representation of the wake user interface from the first user interface. In some embodiments, removing the first representation of the wake user interface removes the respective version of the wake user interface from the set of different versions of the wake user interface that is accessible through the automatic rotation that automatically cycles through the different versions of the wake user interface and/or through manually swiping through the different versions of the wake user interface when the wake user interface is displayed. For example, as described with reference to FIG. 6E, the device deletes a wake screen user interface in response to detecting user input 618 selecting delete icon 616 displayed under a respective representation 615 of a wake screen user interface in the expanded face switcher user interface 606). Enabling the user to request to remove a candidate version of the wake user interface causes the device to automatically enable custom organization of and reduction of clutter in the wake user interface selection mode, while in some embodiments further reducing user mistakes by requiring the user to confirm the removal.

In some embodiments, while displaying the first user interface concurrently including the first representation of the wake user interface, the first representation of the home user interface, and the second representation of the wake user interface, the computer system detects (1026) a second sequence of one or more user inputs corresponding to a request to navigate through one or more representations of the wake user interface in the first user interface (e.g., a sequence of swipe inputs in the first direction (e.g., horizontal direction, vertical direction, clockwise direction, or counterclockwise direction), such as user input 614 (FIG. 6D), a tap input on the edge of the first user interface (e.g., a tap on the right edge, or a tap on the left edge), such as user input 610 (FIG. 6D)). In response to detecting the second sequence of one or more user inputs: in accordance with a determination that the second sequence of one or more user inputs includes a third user input corresponding to the request to navigate to the second representation of the wake user interface (e.g., a tap on the second representation while the second representation is partially or fully displayed in the first user interface, or a swipe that brings the second representation into the position of the first representation), the computer system displays the second representation of the wake user interface at an initial location of the first representation of the wake user interface in the first user interface (e.g., the location of the currently selected version of the wake user interface). In accordance with a determination that the second sequence of one or more user inputs includes a fourth user input corresponding to the request to navigate to a third representation of the wake user interface different from the first representation of the wake user interface and the second representation of the wake user interface (e.g., a tap on the third representation while the third representation is partially or fully displayed in the first user interface, a swipe that brings the third representation into view on the first user interface and into the initial display position of the first representation), the computer system displays the third representation of the wake user interface at the initial location of the first representation of the wake user interface in the first user interface. In some embodiments, the second sequence of user inputs cause the representations of the wake user interface in the first user interface to scroll (e.g., to the right and/or left) in accordance with the direction of the user inputs; and the representations of the wake user interface shift into and out of an initial location at which the representation of the currently selected wake user interface was displayed in the first user interface. In some embodiments, during the scrolling of the representations of the wake user interface, some earlier displayed representations may shift out of the display region of the display generation component, while other representations may shift into view of the display region of the display generation component. For example, as described with reference to FIGS. 6D and 6F, in response to a user's request to scroll left and/or right within expanded face switcher user interface 606 (FIG. 6D), the device changes from displaying representation 615 of a wake screen user interface as the centered representation to displaying representation 611 of a wake screen user interface as the centered representation (FIG. 6F). Enabling the user to provide different types of inputs (e.g., swipes and/or edge taps) to navigate through different candidate versions of the wake user interface in the wake user interface selection mode reduces the number of inputs needed to select a different wake user interface while providing the user with greater control over the precision with which to navigate.

In some embodiments, in response to detecting the second sequence of one or more user inputs (1028): in accordance with a determination that the second sequence of one or more user inputs includes the third user input corresponding to the request to navigate to the second representation of the wake user interface (e.g., a tap on the second representation while the second representation is partially or fully displayed in the first user interface, or a swipe that brings the second representation into the position of the first representation), the computer system ceases display of the first representation of the home user interface, and displays a second representation of the home user interface concurrently with the second representation of the wake user interface. For example, in FIG. 6F, second representation 611 of a wake screen user interface is displayed concurrently with representation 620 of the related home screen user interface, while the representation of the home screen user interface associated with representation 615 of a wake screen user interface (FIG. 6D) is no longer displayed. In some embodiments, in accordance with a determination that the second sequence of one or more user inputs includes the fourth user input corresponding to the request to navigate to a third representation of the wake user interface different from the first representation of the wake user interface and the second representation of the wake user interface (e.g., a tap on the third representation while the third representation is partially or fully displayed in the first user interface, or a swipe that brings the third representation into view on the first user interface and into the initial display position of the first representation), the computer system ceases display of the first representation of the home user interface, and displays a third representation of the home user interface concurrently with the third representation of the wake user interface. In some embodiments, the second sequence of one or more user inputs includes a request to navigate to representations of a plurality of different wake user interfaces in the set of wake user interfaces (e.g., from a representation of a first wake user interface to a representation of a second wake user interface and/or to a representation of a third wake user interface) by one or more user inputs in a same direction (e.g., a plurality of swipe user inputs, or a single user input of different swipe amounts and/or duration, in a first direction (e.g., left to right or right to left)). In some embodiments, the second sequence of one or more user inputs includes a first user input in a first direction (e.g., changing from a first wake screen to a second wake screen) and a second user input in a second direction (e.g., changing from the second wake screen back to the first wake screen, and/or optionally changing from the first wake screen to a fourth wake screen in the set of wake screens). As such, the device navigates (e.g., scroll left and/or right) between representations of wake user interfaces in response to user inputs swiping in different directions. In some embodiments, only the respective representation of the currently selected version of the wake screen is displayed with a representation of a corresponding version of the home user interface (e.g., a hint of a corresponding version of the home screen). In some embodiments, the representation of the currently selected version of the wake user interface is the respective representation of the wake user interface that is displayed in a center portion of the first user interface. In some embodiments, after exiting the first user interface, the version of the wake user interface that has its representation displayed in the center portion of the first user interface (e.g., the position of the currently selected version of the wake user interface) is displayed as the wake user interface. While in the wake user interface selection mode, displaying a preview of a corresponding home user interface with a preview of just the currently selected candidate version of the wake user interface causes the device to automatically provide relevant feedback about the effect that potential changes may have on both the wake user interface and the home user interface without displaying too many additional controls.

In some embodiments, the computer system displays (1030) (e.g., in response to detecting the second sequence of one or more user inputs and in accordance with a determination that an end of a list of representations of the wake user interface has been reached in the first user interface) a second user-selectable affordance for adding an additional representation of the wake user interface (e.g., an "add" button, a "+" button, and/or a "new" button) displayed at the end of the scrollable listing of representations of the wake user interface. In response to detecting a fourth user input (e.g., a tap input, a double tap input, and/or an air tap), the computer system selects the second user-selectable affordance for adding the additional representation of the wake user interface and display a second user interface that includes one or more selectable options for customizing a set of one or more wake user interface settings for the wake user interface corresponding to the additional representation of the wake user interface. In some embodiments, the second user-selectable affordance is displayed in a predefined position in the first user interface for changing a wake user interface for the computer system (e.g., in a top right corner of the first user interface). In some embodiments, the device provides one or more user interfaces and/or selectable options for adding an additional version of the wake user interface from a distinct application. For example, the device provides access to the first user interface for changing a wake user interface, or adding a new wake user interface, from a photos application, a settings application and/or from a wake screen gallery that includes a plurality of automatically generated versions for the wake user interface. For example, in response to user input 608 (FIG. 6D) directed to the "+" button, the user interface 652 (FIG. 6K) is displayed for the user to create a new wake screen user interface to add to the set of wake screen user interfaces. While in the wake user interface selection mode, displaying a user-selectable affordance for adding another candidate version of the wake user interface (e.g., upon navigating to an end of the list of candidate versions) reduces the number of inputs needed to customize the wake user interface, particularly if none of the listed options are of interest to the user.

In some embodiments, in response to detecting the second sequence of one or more user inputs and in accordance with a determination that an end of a list of representations of the wake user interface has been reached in the first user interface (e.g., in accordance with a determination that the representation of the wake user interface that is currently displayed in the initial location of the first representation of the wake user interface is a last representation of the wake user interface in the list of representations of wake user interfaces), the computer system displays (1032) a third user interface (e.g., a wake screen gallery) that includes a plurality of representations of wake user interface corresponding to a plurality of automatically configured versions of the wake user interface. In some embodiments, the third user interface corresponds to user interface user interface 652 for creating a new wake screen user interface, as described with reference to FIG. 6K. Upon navigating to an end of the list of (e.g., user-selected) candidate versions of the wake user interface, displaying a gallery of wake user interfaces corresponding to automatically configured versions of the wake user interface causes the device to present multiple wake user interface options for the user to consider at the same time, thereby reducing the number of inputs needed to customize the wake user interface, particularly if none of the listed options are of interest to the user.

In some embodiments, at least one representation of the wake user interface in the plurality of representations of wake user interface corresponds (1034) to an automatically generated version of the wake user interface that includes a third set of one or more wake user interface settings that are set by the computer system. In some embodiments, to the device provides one or more editing user interfaces and/or selectable options for modifying the one or more wake user interface settings that are set by the computer system. For example, the device displays selectable representations of one or more pre-generated versions of the wake user interface in a wake screen gallery and the device selects a pre-generated version of the wake user interface in response to a selection input directed to the respective representation of the pre-generated version of the wake user interface in the wake screen gallery, and then the device optionally modifies one or more of the wake user interface settings for the pre-generated version of the wake user interface in response to user inputs directed to one or more selectable options corresponding to those settings that have been displayed by the device. For example, as described with reference to FIG. 6K, the Featured Faces includes one or more wake screen user interfaces that are generated by the device 100. Displaying, in a gallery of automatically configured versions of the wake user interface, at least one version that is automatically system generated causes the device to automatically suggest an intelligently generated version of the wake user interface, thereby reducing the number of inputs needed to customize the wake user interface.

In some embodiments, while displaying the first user interface, the computer system displays (1036) a selectable option to set, for a respective representation of the wake user interface (e.g., the currently selected representation of the wake user interface, or the representation that has the input focus), a restricted notification mode in which certain types of notifications are suppressed and/or delayed. In some embodiments, the restricted notification mode is selected from a plurality of focus modes, wherein each focus mode that defines when certain alerts are provided to the user based on a current set of circumstances, such as a current time of day, a current location of the user, a current status of the user (e.g., driving mode, sleeping mode), and/or do not disturb mode. For example, in FIG. 6D, the user-selectable user interface element 609*a* ("Focus") enables the user to set a restricted notification mode for the wake screen corresponding to representation 615 of a wake screen. While in the wake user interface selection mode, displaying for a respective candidate version of the wake user interface a user-selectable option to set a restricted notification mode for suppressing and/or delaying certain types of notifications improves privacy and security by limiting the amount of information that is automatically displayed and reduces an amount of time needed to perform a particular operation on the device by helping the user focus.

In some embodiments, while displaying the first user interface, the computer system displays (1038) a selectable option to navigate to a third user interface (e.g., a wake screen gallery) that includes a plurality of representations of wake user interface corresponding to a plurality of automatically configured versions of the wake user interface. In some embodiments, the plurality of automatically configured versions of the wake user interface are generated by the computer system (e.g., based on parameters selected automatically by the computer system). In some embodiments, selection of the selectable option in the first user interface for navigating to the third user interface, causes display of the first user interface to be replaced by the display of the third user interface (e.g., selection of option 609*b* (FIG. 6D) causes the device 100 to display the user interface 652 (FIG. 6K)). Displaying, in the wake user interface selection mode, a user-selectable option to view a gallery of wake user interfaces corresponding to automatically configured versions of the wake user interface enables the user to consider multiple wake user interface options at the same time, thereby reducing the number of inputs needed to customize the wake user interface.

In some embodiments, the third user interface that includes the plurality of representations of wake user interface corresponding to the plurality of automatically configured versions of the wake user interface includes (1040) one or more affordances for initiating corresponding wake user interface creation flows for creating new versions of the wake user interface. In some embodiments, the wake screen gallery includes one or more affordances for entering a multi-step wake screen creation flow (optionally multiple different affordances for entering different wake screen creation flows). For example, user interface 652 in FIG. 6K enables the user to add and/or edit wake screen user interfaces to the set of wake screen user interfaces that device 100 rotates through periodically. Displaying, in a user interface that includes a gallery of wake user interfaces corresponding to automatically configured versions of the wake user interface, a user-selectable option for initiating a wake user interface creation flow or wizard helps the user through the process of creating a new wake user interface version, thereby reducing an amount of time needed to perform a particular operation on the device.

In some embodiments, selection of the first representation of the wake user interface is based on (1042) a tap input in the sequence of one or more inputs that is detected on the first representation of the wake user interface, and selection of the second representation of the wake user interface is based on a selection input (e.g., a tap input or other selection input) in the sequence of one or more inputs that is directed to (e.g., detected on or detected while attention is directed to) the second representation of the wake user interface. In some embodiments, the tap input detected on the representation that is displayed in the center region of the first user interface is recognized as a selection input that causes the version of the wake user interface corresponding to the selected representation to be displayed when the computer system exits the first user interface and returns to the wake user interface (e.g., a tap input directed to representation 615 (FIG. 6D) causes the wake screen user interface corresponding to representation 615 to be set as the current wake screen user interface). In some embodiments, the tap input detected on the representation that is displayed in a peripheral region of the first user interface is recognized as a navigation input that causes the selected representation to be moved to the central portion of the first user interface (e.g., tap input 610 on representation 611, FIG. 6D), and, optionally, causes the version of the wake user interface corresponding to the selected representation to be displayed when the computer system exits the first user interface and returns to the wake user interface (e.g., optionally, another tap input is required on the representation when the representation is displayed in the central portion of the first user interface). While in the wake user interface selection mode that presents a plurality of candidate wake user interface versions, enabling a user to simply provide a tap input on the candidate version that has focus (e.g., is centered) reduces the number and extent of inputs needed to select a current wake user interface.

In some embodiments, while displaying the first user interface (e.g., including displaying a respective representation of the wake user interface as a currently selected representation of the wake user interface), the computer system detects (1044) a fifth user input corresponding to a request to edit a respective representation of the wake user interface (e.g., detecting a tap input on a “customize” button while the respective representation of the wake user interface is displayed in the center portion of the first user interface) from the first user interface; and in response to detecting the fifth user input corresponding to the request to edit the respective representation of the wake user interface, displays a first plurality of selectable options (e.g., in an overlay on the first user interface, or an editing user interface that replaces display of the first user interface) for changing a respective set of one or more wake user interface settings for a respective version of the wake user interface that corresponds to the respective representation of the wake user interface. In some embodiments, the respective representation of the wake user interface is selected in accordance with the respective representation of the wake user interface being positioned in the center of the first user interface (and optionally displays other representations of the wake user interface on either side of the respective representation). In some embodiments, the user input is received on a user-selectable affordance (e.g., an edit button). For example, user input 622 (FIG. 6F) on the Customize button causes device 100 display editing user interface 626 (FIG. 6G). While in the wake user interface selection mode that presents a plurality of candidate wake user interface versions, in response to a user input corresponding to a request to edit a respective candidate version, presenting a plurality of selectable options for changing one or more features and/or settings of the respective candidate version causes the device to automatically facilitate wake screen user interface editing, thereby reducing an amount of time needed to perform a particular operation on the device.

In some embodiments, while displaying the first user interface, including concurrently displaying the first representation of the wake user interface and the first representation of the home user interface, the computer system detects (1046) a sixth user input corresponding to a request to view the first representation of the home user interface; and in response to detecting the sixth user input corresponding to the request to view the first representation of the home user interface, displays an expanded view of the first representation of the home user interface in the first user interface (including, e.g., moving the first representation of the home user interface into the center of the first user interface, increasing a size of the first representation of the home user interface, and/or moving the first representation of the home user interface from behind the first representation of the wake user interface, and optionally decreasing and/or moving the first representation of the wake user interface). In some embodiments, the first representation of the home user interface is initially displayed as at least partially occluded by the first representation of the wake user interface; and in response to the user input, the first representation of the home user interface is displayed without being occluded by the first representation of the wake user interface in the first user interface. For example, in response to user input 624 directed to the representation of a home screen user interface 620 (FIG. 6F), the device displays user interface 638 (FIG. 6I). While displaying a preview of a respective candidate wake user interface version in the wake user interface selection mode, enabling a user to direct an input to a displayed preview of a corresponding home user interface to view an expanded view of the corresponding home user interface reduces the number of inputs needed to view the effect that changes to the wake user interface would have on the corresponding home user interface.

In some embodiments, while displaying the first user interface, including concurrently displaying the first representation of the wake user interface and the first representation of the home user interface, the computer system detects (1048) a seventh user input corresponding to a request for displaying a plurality of customization options (e.g., options for changing color scheme, options for changing font, and/or options for changing gradient). In response to detecting the seventh user input: in accordance with a determination that the first representation of the home user interface is positioned at a respective position (e.g., in the center or center region) of the first user interface, the computer system displays a first plurality of customization options for changing a first set of one or more home user interface settings for the first representation of the home user interface; and in accordance with a determination that the first representation of the wake user interface is positioned at the respective position of the first user interface, the computer system displays a second plurality of customization options for changing a first set of one or more wake user interface settings for the first representation of the wake user interface. For example, user input 640 (FIG. 6I) on the "Customize" button causes the device 100 to display editing user interface 642 for the home screen user interface (FIG. 6J). In some embodiments, the first plurality of customization options and the second plurality of customization options include at least one customization option (e.g., color, font, and/or gradient) that appears in both the first plurality and the second plurality of customization options. While in the wake user interface selection mode, displaying customization options for a respective wake user interface if the wake user interface is displayed at a particular position when a request for customization is received, or alternatively displaying customization options for the corresponding home user interface if the home user interface is at the particular position when the request for customization is received, causes the device to automatically enable customization for the user interface that has focus when the request for customization is received, thereby reducing an amount of time needed to perform a particular operation on the device.

In some embodiments, the first plurality of customization options includes (1050) a first set of user-selectable options for configuring the first wake user interface background and the second plurality of customization options include a second set of user-selectable options for configuring the first home user interface background. In some embodiments, the respective sets of user-selectable option(s) for configuring the wake user interface background and/or the home user interface background includes one or more selectable photos, one or more selectable gradients, and/or one or more colors, that can be used as the background(s) of the wake user interface and/or home user interface. In some embodiments, the respective sets of user-selectable option(s) for configuring the wake user interface background and/or the home user interface background includes one or more selectable visual treatments, e.g., blur, transparency, and/or gradient that can be applied to a selected background image of the wake user interface and/or home user interface. For example, editing user interface 642 (FIG. 6J) includes an option for changing a color and/or gradient applied to the background, and includes an option for turning legibility blur on and/or off. Enabling the user to configure the background of a respective wake user interface and/or the corresponding home user interface while in the wake user interface selection mode reduces the number and extent of inputs needed to customize user interfaces on the device.

In some embodiments, while displaying the first set of user-selectable options for configuring the first wake user interface background or the second set of user-selectable options for configuring the first home user interface background, the computer system detects (1052) an eighth user input that meets selection criteria (e.g., the eighth user input is a tap input on the respective user-selectable option, or the eighth user input is an air tap that is detected while a gaze input is on the respective user-selectable option). In some embodiments, in response to detecting the eighth user input: in accordance with a determination that a respective user-selectable option in the first set of user-selectable options is selected by the eighth user input, the computer system displays a first set of additional options associated with the respective user-selectable control function for configuring the first wake user interface; and in accordance with the determination that a respective user-selectable option in the second set of user-selectable options is selected by the eighth user input, the computer system displays a second set of additional options associated with the respective user-selectable control function for configuring the first home user interface. In some embodiments, the respective user-selectable option in the first set of user-selectable options for configuring the first wake user interface background and the respective user-selectable option in the second set of user-selectable options for configuring the first home user interface background include the same selectable option, and/or the first set of additional options and the second set of additional options include the same set of additional options. In some embodiments, the first set of additional options and/or the second set of additional functions include a color picker for selecting a color for the background and/or a photo picker for selecting a photo for the background. For example, in response to user input 628 (FIG. 6G), the device 100 displays user interface element 630 (FIG. 6H) for changing a color (e.g., a font color and/or a background color). In response to the user selecting a particular user interface feature to modify for the background of a respective wake user interface and/or the corresponding home user interface, displaying additional options for modifying the particular feature causes the device to automatically enable additional levels of customization without displaying additional controls when not needed.

In some embodiments, the first set of user-selectable options includes (1054) a first option for selecting a background (e.g., a solid color background, an image background, and/or a photo background) as the first wake user interface background for the wake user interface. In some embodiments, the second set of user-selectable options includes an option for selecting a background (e.g., a solid color background, an image background, and/or a photo background) as the first home user interface background for the home user interface. For example, option 628*c* (FIG. 6J) enables the user to view a photo picker (e.g., user interface 668, FIG. 6N) to change a background of the home screen user interface. Enabling the user to configure the background of a respective wake user interface and/or the corresponding home user interface by choosing the background graphic reduces the number and extent of inputs needed to customize user interfaces on the device.

The In some embodiments, the second set of user-selectable options includes (1056) a second option for applying a respective visual effect (e.g., a blur, a transparency filter, a color filter, and/or a gradient filter) to the first wake user interface background. In some embodiments, the second set of user-selectable options includes an option for applying a respective visual effect (e.g., a blur, a transparency filter, a color filter, and/or a gradient filter) to the first home user interface background. For example, user interface 626 includes an option 628*a* for applying visual filter to the background of the wake screen user interface. Enabling the user to configure the background of a respective wake user interface and/or the corresponding home user interface by applying a visual effect such as blurring, transparency, color scheme, or other effect reduces the number and extent of inputs needed to customize user interfaces on the device.

In some embodiments, while displaying a first version of the wake user interface that corresponds to the first representation of the wake user interface, the computer system detects (1058) a ninth user input directed to a respective portion of the first version of the wake user interface. In response to detecting the ninth user input: in accordance with a determination that the first version of the wake user interface includes one or more user interface objects that correspond to one or more applications and include respective content from the one or more applications and are updated periodically as information represented by the one or more user interface objects changes (e.g., the one or more user interface objects include one or more complications, widgets, and/or other similar user interface elements that correspond to different applications), and a determination that the ninth user input is directed to at least one of the one or more user interface objects (e.g., a tap input and/or a touch-hold input on the at least one of the one or more user interface objects), the computer system displays the first version of the wake user interface in an editing view, wherein the first version of the wake user interface displayed in the editing view includes one or more selectable options for configuring one or more elements of the first version of the wake user interface (e.g., selectable options for configuring the date element, time element, the one or more user interface objects, and/or the background of the first version of the wake user interface). For example, as described with reference to FIG. 5AY, while displaying wake screen user interface 5026, a user input 5028 is detected on a calendar complication, and in response to user input 5028, the device 100 displays editing user interface 565-3 (FIG. 5AZ), including an option to modify the one or more complications of wake screen user interface 5026. Displaying an editing view that enables the user to configure user interface objects in a wake user interface that are periodically updated with content from active applications makes more efficient use of the display area and reduces the number and extent of inputs needed for the user to view current relevant information about a state of the device.

In some embodiments, while displaying a second version of the wake user interface that corresponds to the first representation of the wake user interface, the computer system detects (1060) a tenth user input directed to a respective portion of the second version of the wake user interface. In response to detecting the tenth user input: in accordance with a determination that the second version of the wake user interface does not include one or more user interface objects that correspond to one or more applications and include respective content from the one or more applications and are updated periodically as information represented by the one or more user interface objects changes (e.g., the one or more user interface objects include one or more complications, widgets, and/or other similar user interface elements that correspond to different applications), the computer system displays the second version of the wake user interface in an editing view, wherein the second version of the wake user interface displayed in the editing view includes a respective selectable option for adding one or more user interface objects that correspond to one or more applications and include respective content from the one or more applications and are updated periodically as information represented by the one or more user interface objects changes (e.g., the one or more user interface objects include one or more complications, widgets, and/or other similar user interface elements that correspond to different applications). For example, as described with reference to FIG. 5W-5X, user input 564 on wake screen user interface 563, which does not include complications, causes device 100 to display editing user interface 565, and includes an option 572 to add complications. In some embodiments, the second version of the wake user interface also includes one or more selectable options for configuring one or more elements of the second version of the wake user interface (e.g., selectable options for configuring the date element, time element, the one or more user interface objects, and/or the background of the first version of the wake user interface), for example reticles 568 and 569 (FIG. 5X). In some embodiments, the respective user-selectable affordance includes a plus symbol. In some embodiments, the respective user-selectable affordance is displayed in accordance with a determination that there are no user interface objects that correspond to respective applications and include respective content from the respective application that is updated periodically as information represented by the one or more user interface objects changes (e.g., a wake user interface that does not include complications is displayed with a "+" symbol to add complications, and a wake user interface that includes at least one complication is not displayed with a "+" symbol to add complications). In some embodiments, the respective selectable option for adding one or more user interface objects that correspond to one or more applications and include respective content from the one or more applications and are updated periodically as information represented by the one or more user interface objects changes (e.g., the option for adding one or more complications) is displayed in accordance with a determination that the second version of the wake user interface is of a first type (e.g., photo, color gradient, emoji, weather, nature, and/or astronomy type); and is not displayed if the second version of the wake user interface is of a second type (e.g., a portrait) different from the first type. In some embodiments, the device adds one or more complications, and overrides the default setting of not adding complications to a portrait mode background in response to detecting a user input at a predefined portion of the editing user interface (e.g., at the region above and/or below the time indication). Enabling the user to add, to a wake user interface, user interface objects that are periodically updated with content from active applications makes more efficient use of the display area and reduces the number and extent of inputs needed for the user to view current relevant information about a state of the device.

In some embodiments, the first version of the wake user interface displayed (1062) in the editing view includes respective representations of one or more sets of recommended user interface objects that are selectable for inclusion in the first version of the wake user interface, wherein the recommended user interface objects correspond to respective applications and include respective content from the respective applications that is updated periodically as information represented by the recommended user interface objects changes. In some embodiments, each recommended user interface object is displayed with an indication of the respective application that contributed the user interface object in the editing view. For example, an application icon and/or badge is displayed with each complication to indicate which application is associated with the complication. For example, FIG. 5AZ illustrates user interface object 570 that displays a plurality of complications, and indications of respective applications associated with each complication. While displaying an editing view that enables the user to configure user interface objects in a wake user interface that are periodically updated with content from active applications, displaying recommendations for one or more such user interface objects causes the device to automatically suggest options that are more likely to be of interest to the user, thereby reducing the number of inputs needed to customize the wake user interface and view current relevant information about a state of the device.

In some embodiments, while displaying the first version of the wake user interface that corresponds to the first representation of the wake user interface in the editing view (or optionally, while displaying the second version of the wake user interface in the editing view), the computer system detects (1064) an eleventh user input directed to a respective portion of the first version of the wake user interface (or optionally, directed to a respective portion of the second version of the wake user interface). In response to detecting the eleventh user input: in accordance with a determination that the eleventh user input is directed to a textual element of the first version of the wake user interface (e.g., the date element, the time and/or element), the computer system displays one or more selectable options for changing a font of the textual element displayed in the first version of the wake user interface, for example user interface element 586 (FIG. 5AD) includes a plurality of style and/or color options to change a font of the time and/or date indication. In some embodiments, the one or more options to change a font includes an option to change a font (e.g., typeface), a font style (e.g., a font size, style, and/or weight), an option to change a font vibrancy, an option to change a color tint, and/or an option to change a luminance (e.g., light or dark). In some embodiments, the one or more options to change a font further control visual properties of complications, as described with reference to FIGS. 5AD-5AE. In some embodiments, changing a color of a font for the time element also causes the font of the date to be updated. In some embodiments, in response to detecting a user input that selects an option to change font properties for a first textual element, the device, in addition to changing the font properties for the first textual element, automatically changes font properties for a second textual element in accordance with the change to the font properties for the first textual element (e.g., a change to the time font causes a change to the date font). In some embodiments, the fonts are complimentary and/or the same font is applied to both textual elements (e.g., date and time). Enabling the user to configure the font of a textual element in a candidate wake user interface version using one or more displayed selectable options reduces the number and extent of inputs needed to customize user interfaces on the device.

In some embodiments, while displaying the one or more selectable options for changing the font of the textual element displayed in the first version of the wake user interface, the computer system detects (1066) a twelfth user input selecting a respective one of the one or more selectable options for changing the font of the textual element. In response to detecting the twelfth user input: the computer system changes the font of the textual element in a first manner in accordance with the selected respective one of the one or more selectable options for changing the font of the textual element; and changes the one or more visual properties of the one or more user interface objects that correspond to respective applications and include respective content from the respective application that is updated periodically as information represented by the one or more user interface objects changes that are displayed on the wake user interface, in the first version of the wake user interface. In some embodiments, the visual properties include a color scheme for the complications. For example, the complications are displayed in greyscale and/or as monochrome in accordance with the selection of a respective font color for the time and/or date element. In some embodiments, the complications are displayed with a color scheme that is automatically selected based on the background (e.g., wallpaper image) and/or based on the current settings for the font for the time and/or date element. In some embodiments, the same color scheme is used for the complications as the changed font color for the date and/or time element. In some embodiments, complimentary color schemes are used for the complications and the changed date and/or time elements. For example, in FIG. 5AD, in response to user input 588, the font of the time and/or date indication of the wake screen user interface is updated to be displayed with "Style 5," as illustrated in FIG. 5AE. In response to a user input to configure the font of a textual element in a wake user interface, changing both the font of the textual element as well as the font of one or more user interface objects in the wake user interface that are periodically updated with content from active applications reduces the number and extent of inputs needed to customize user interfaces on the device and causes the device to automatically maintain visual consistency between different parts of the wake user interface.

In some embodiments, the computer system displays (1068), in the first user interface, a respective user-selectable affordance (e.g., a "+" button in the upper right corner of the wake screen selector user interface, as illustrated in FIG. 6D) for creating new versions of the wake user interface, wherein selection of the respective user-selectable affordance causes display of a third user interface that includes a set of selectable options for creating a new version of the wake user interface independent of the first version of the wake user interface. In some embodiments, the third user interface is a gallery user interface that includes options to create a new version of the wake user interface from different styles, display modes, and/or background types. While in the wake user interface selection mode, displaying a user-selectable affordance for adding another candidate version of the wake user interface reduces the number of inputs needed to customize the wake user interface, particularly if none of the listed options are of interest to the user.

It should be understood that the particular order in which the operations in FIGS. 10A-10I have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1100, 12000, 1300, 14000, 15000, 16000, and 17000) are also applicable in an analogous manner to method 1000 described above with respect to FIGS. 10A-10I. For example, the contacts, gestures, user interface objects and animations described above with reference to method 1000 optionally have one or more of the characteristics of the contacts, gestures, user interface objects and animations described herein with reference to other methods described herein (e.g., methods 900, 1100, 12000, 1300, 14000, 15000, 16000, and 17000). For brevity, these details are not repeated here.

FIGS. 11A-11H are flow diagrams illustrating method 1100 of for modifying a user interface in accordance with some embodiments. Method 1100 is performed (1102) at a computer system (e.g., device 300, FIG. 3, or portable multifunction device 80, FIG. 1A) that is in communication with a display generation component (e.g., a hardware element, comprising one or more display devices, such as a display, a projector, a touch-screen display, a heads-up display, a head-mounted display, or the like) (and optionally, the computer system is further in communication with one or more input devices, one or more cameras, and/or one or more 3D sensing and/or determination devices, such as lidars, depth sensors, and/or distance sensors) Some operations in method 1100 are, optionally, combined and/or the order of some operations is, optionally, changed.

To that end, method 1100 provides a method for customizing a wake screen user interface. In response to an input directed to a wake screen configuration user interface, displaying a user interface for editing a respective editable object in a first version of the wake screen in response to a first type of input, versus switching between different versions of the wake screen in response to a second type of input, reduces the number of inputs needed to make different types of configuration changes to the wake screen.

The computer system displays (1104), via the display generation component, a first user interface for configuring a wake user interface (e.g., an editing user interface 565 (FIG. 5X) for configuring a wake screen user interface, for configuring a home screen user interface associated with a wake screen user interface, and/or for configuring a lock screen user interface), wherein a respective version of the wake user interface includes a respective background and a respective plurality of editable user interface objects (e.g., a plurality of user selectable objects, such as complications, widgets, shortcuts and/or a plurality of user interface objects such as a time object, and/or a date object) overlaying the respective background, and wherein the first user interface displays at least a first representation of a first version of the wake user interface illustrating a first plurality of editable user interface objects overlaying a first background (e.g., the first user interface displays the first version of the wake user interface in an editing view). For example, FIG. 5AL illustrates an editing user interface 565-2 for a wake screen user interface.

While displaying the first user interface, the computer system detects (1106) a first input directed to the first user interface. For example, while displaying editing user interface 565-2 (FIG. 5AO), the device 100 detects a user input 5014-1.

In response to detecting the first input directed to the first user interface (1107): in accordance with a determination that the first input meets first criteria (e.g., criteria for detecting a tap input, and/or a double tap input, and optionally, criteria requiring a location of the first input to correspond to a respective portion of the first representation of the first version of the wake user interface that corresponds to a respective user interface object or the first background of the first version of the wake user interface), the computer system displays (1108) a second user interface for editing a first user interface object of the first plurality of editable user interface objects (e.g., editing on the basis of the first user interface object as shown in the first version of the wake user interface), wherein the first user interface object is selected in accordance with a location of the first input (e.g., a user interface object located at or within a threshold range of a location of the tap input or double tap input is selected to be edited, and the second user interface provides various controls of editing one or more aspects of the selected user interface object). For example, as described with reference to FIG. 5AC, in accordance with a determination that user input 584 in the editing user interface 565 is directed to reticle 569 for the time indication, the device 100 displays option for editing visual properties (e.g., font properties) of the time indication, as illustrated in FIG. 5AD.

In accordance with a determination that the first input meets second criteria different from the first criteria (e.g., the second criteria include criteria for detecting a swipe input, a flick input, and/or a swipe gesture in a first direction) (e.g., the second criteria do not require the first input to be directed to one specific user interface object on the first representation of the first version of the wake user interface, and the first input may start from any of a plurality of locations (e.g., from a location of a first user interface object, a second user interface object, and/or an unoccupied portion of the background) on the first representation of the first version of the wake user interface and still meet the second criteria), the computer system updates (1110) the first user interface to replace display of the first representation of the first version of the wake user interface with display of a second representation of a second version of the wake user interface. The second representation of the second version of the wake user interface includes a second plurality of editable user interface objects (e.g., widgets and/or complications, time object and/or date object) overlaying a second background that is different from the first background (e.g., wallpaper, image, and/or photo). The second plurality of editable user interface objects is different from the first plurality of editable user interface objects (e.g., one or more objects in the second plurality of editable user interface objects have a different appearance and/or functionality than one or more corresponding objects in the first set of editable user interface objects). For example, in FIG. 5AO, in response to user input 5014-1 the background and/or complications are changed from the wake screen user interface illustrated in FIG. 5AO to the wake screen user interface illustrated in FIG. 5AT.

In some embodiments, updating the first user interface to replace display of the first representation of the first version of the wake user interface with display of the second representation of a second version of the wake user interface includes (1112) changing one or more font properties of system generated text that is displayed in the wake user interface from a first set of font properties shown in the first representation of the first version of the wake user interface to a second set of font properties shown in the second representation of the second version of the wake user interface. In some embodiments, the system generated text includes text in a date object and/or time object in the wake user interface. In some embodiments, the system generated text further includes subject lines, and/or object names in system-generated objects that are displayed in the wake user interface (e.g., notification history, system prompts, and/or alerts). In some embodiments, the system generated text further includes text in complications or widgets included in the wake user interface. In some embodiments, the one or more font properties include one or more of: a typeface, a color, a size, and a weight of the font of the system generated text. For example, as described with reference to FIG. 5AO-FIG. 5AT, optionally the time and/or date indication is updated to be displayed with a different font, font style, and/or font color (e.g., optionally in accordance with a determination that the user has not explicitly modified the time and/or date indication in the current and/or a previous editing session). Enabling a user to direct an input to a wake screen configuration user interface to switch between different versions of the wake screen, including to a version in which a different font is used for system generated text, reduces the number of inputs needed to make different types of configuration changes to the wake screen.

In some embodiments, updating the first user interface to replace display of the first representation of the first version of the wake user interface with display of the second representation of the second version of the wake user interface includes (1114) shifting the second representation of the second version of the wake user interface and moving system generated text on the wake user interface in accordance with the first input (e.g., moving the system generated text in the second representation of the second version of the wake user interface and/or moving the system generated text in the first representation of the first version of the wake user interface, in accordance with the first input that meets the second criteria). In some embodiments, in accordance with a determination that the first input meets the second criteria, the computer system displays a sliding visual effect over the first background to generate the second background. In some embodiments, the computer system moves the system generated text in a direction of the first input (e.g., a swipe input to the left moves the system generated text of the first representation of the first version of the wake user interface to the left to appear as if it is scrolling off the display area of the display generation component, while the system generated text of the second representation of the second version of the wake user interface slides onto the display generation component from right to left), as illustrated in FIGS. 5AO-5AT. In some embodiments, the system generated text is not moved. For example, in accordance with a determination that the user has edited font properties of the system generated text during the current editing session and/or in a past editing session, the system generated text is not moved when the background of the wake user interface is updated. Switching between different versions of the wake screen, in response to an input directed to the wake screen configuration user interface, by shifting the new version including system generated text onto the display in accordance with the input (e.g., by an amount controlled by the movement of the input) causes the device to automatically provide the user with a preview of the new version before the end of the input and optionally gives the user an opportunity to change their mind.

In some embodiments, the system generated text includes (1116) one or more of a date indication, a time indication, and/or one or more user interface objects that correspond to a first plurality of applications and include respective content from the first plurality of applications and are updated periodically as information represented by the first plurality of user interface objects changes (e.g., complications, or widgets). For example, the wake screen user interface in FIG. 5AO includes a date indication, a time indication, and complications. When switching between different versions of the wake screen, including in the new version system generated text such as the date, the time, and/or one or more user interface objects that are periodically updated with content from active applications causes the device to automatically present current information that is likely to be of interest to the user in an efficient way in the display area, thereby reducing the number of inputs and amount of time that is needed for the user to view the information.

In some embodiments, updating the first user interface to replace display of the first representation of the first version of the wake user interface with display of the second representation of the second version of the wake user interface includes (1118): in accordance with a determination that system generated text in the first version of the wake user interface meets editing criteria (e.g., criteria that are met in accordance with a determination that a user has edited the system generated text with a predetermined time period, during the current editing session, and/or in a previous editing session), shifting at least the second background of the second representation of the second version of the wake user interface in accordance with the first input, while maintaining display position of the system generated text in the first representation of the first version of the wake user interface (e.g., moving the background in the second representation of the second version of the wake user interface underneath the system generated text of the first representation of the first version of the wake user interface, in accordance with the first input that meets the second criteria) (e.g., the system generated text that has been edited becomes part of the second representation of the second version of the wake user interface after the update of the first user interface). For example, in FIG. 5AP, the background of the wake screen user interface is updated without moving the date and/or time indications because the user has edited the date and/or time indications. When switching between different versions of the wake screen, maintaining the display position of system generated text that the user has previously edited causes the device to automatically present current information that the user, through interacting with the system generated text, has already indicated is of interest to them, thereby reducing the number of inputs and amount of time that is needed for the user to view the information.

In some embodiments, updating the first user interface to replace display of the first representation of the first version of the wake user interface with display of the second representation of the second version of the wake user interface includes (1120) replacing display of the first background with the second background. For example, the background in FIG. 5AO is distinct from the background in FIG. 5AT. Enabling a user to direct an input to a wake screen configuration user interface to switch between different versions of the wake screen, including to a version with a different background, reduces the number of inputs needed to make different types of configuration changes to the wake screen.

In some embodiments, the first background includes (1122) at least a first portion of the first background (e.g., foreground portion, central portion, top portion, left portion, one or more foreground objects, or a main subject) and a second portion of the first background (e.g., background portion, peripheral portion, bottom portion, right portion, one or more far away objects, and/or one or more secondary subjects), and updating the first user interface to replace display of the first representation of the first version of the wake user interface with display of the second representation of the second version of the wake user interface includes changing at least a first display property (e.g., color scheme, blur radius, opacity, and/or luminance) of the first portion of the first background (and, optionally, maintaining an appearance of the second portion of the first background in the first representation of the first version of the wake user interface and/or changing at least a second display property (e.g., different from the first display property, or same as the first display property but by a different amount or manner of change) of a third portion (e.g., different from the first portion and second portion) of the first background in the first representation of the first version of the wake user interface) to display the second background in the second representation of the second version of the wake user interface. For example, the background in FIG. 5AO includes a foreground portion that includes an individual (e.g., the subject) and a background color behind the individual. In FIG. 5AT, the foreground portion does not change from the foreground in FIG. 5AO, but the background color changes. In some embodiments, updating the first user interface to change a display mode of the wake user interface includes changing a color scheme, a level of blur, a level of luminance, and/or a level of opacity of one portion of the current background of the wake user interface in one manner and changing a color scheme, a level of blur, a level of luminance, and/or a level of opacity of another portion of the current background in a different manner and/or maintaining the appearance of other portions of the current background. The updated background becomes the background of the second representation of the second version of the wake user interface (e.g., the new display mode for the wake user interface). Enabling a user to direct an input to a wake screen configuration user interface to switch between different versions of the wake screen, including to a version in which a visual property such color scheme, blurring, opacity, and/or luminance is changed in at least a portion of the background of the wake screen, reduces the number of inputs needed to make different types of configuration changes to the wake screen.

In some embodiments, while displaying the first user interface, including the first representation of the first version of the wake user interface, the computer system detects (1124) a second input. In response to detecting the second input: in accordance with a determination that the second input meets third criteria different from the first criteria and the second criteria (e.g., the third criteria include a requirement that the second input is a pinch gesture, and/or a two-finger translation gesture, optionally a requirement that the second input is directed to the first background (e.g., region of the first representation of the first version of the wake user interface that is not occupied by a user interface object)), the computer system changes one or more spatial properties of the first background in the first representation of the first version of the wake user interface (e.g., changing a zoom level, dimensions, and/or center of the image of the first background in the first representation of the first version of the wake user interface). In some embodiments, an input meeting the third criteria can be directed to a second representation of a second version of the wake user interface and change the zoom level, center, and/or cropping style of the second background in the second representation of the second version of the wake user interface. In some embodiments, the respective background in a respective representation of a respective version of the wake user interface displayed in the first user interface is a photo, and the second input causes the photo to be cropped, recentered, and/or zoomed in the respective representation in accordance with the second input. For example, a pinch gesture inwards (e.g., the two contact points move toward each other) zooms out, a pinch gesture outwards (e.g., the two contact points move away from each other) zooms in, and/or a translation gesture (e.g., a geometric center of the two contacts moving in the same direction) shifts the center of the photo, and crops the photo at the selected zoom and/or with the selected center to fit the display region of the display generation component. For example, as described with reference to FIGS. 5AJ and 5AK, a user input 5004 (e.g., an outward pinch gesture) and/or user input 5006 (e.g., an inward pinch gesture) causes the device 100 to change a size and/or crop of the background image (e.g., the subject of the portrait-style photo). Enabling a user to direct a different type of input to a wake screen configuration user interface to resize, rescale, and/or reposition at least a portion of the background of the wake screen reduces the number of inputs needed to make different types of configuration changes to the wake screen without displaying additional controls.

In some embodiments, updating the first user interface to replace display of the first representation of the first version of the wake user interface with display of the second representation of the second version of the wake user interface includes (1125): (optionally, in accordance with a determination that the first user interface is displayed in a first display mode (e.g., a photos mode) (e.g., a first mode of a plurality of modes such as photos mode, portrait mode, astronomy mode, weather mode, or emoji mode)) changing a first set of one or more photo visual effects displayed in the first representation of the first version of the wake user interface to a second set of one or more photo visual effects displayed in the second representation of the second version of the wake user interface (e.g., while maintaining the same basic image in the background). In some embodiments, the photo visual effects are effects applied to a photograph that is used as the background of the wake user interface. In some embodiments, the first set of one or more photo visual effects includes original coloring and the second set of one or more visual effects includes duotone, studio color, studio black/white, sepia and/or other display effects that change a tone and/or color of the image in the first background. In some embodiments, as multiple inputs that meet the second criteria are provided in a sequence, the computer system switches the photo visual effect applied to the background image of the first representation of the first version of the wake user interface to generate the updated representations of the updated versions of the wake user interface one by one. For example, as described with reference to FIG. 5AV, user input 5020 causes device 100 to change a visual effect, such by applying a filter and/or changing a background color, of the background from a first background of the wake screen user interface (FIG. 5AV) to a second background of the wake screen user interface (FIG. 5AW). Optionally, the visual effect (e.g., filter) is applied to the subject of the photo (e.g., the individual) and the background of the photo. Enabling a user to direct an input to a wake screen configuration user interface to switch between different versions of the wake screen, including to a version with different photo visual effects applied, reduces the number of inputs needed to make different types of configuration changes to the wake screen.

In some embodiments, updating the first user interface to replace display of the first representation of the first version of the wake user interface with display of the second representation of the second version of the wake user interface includes (1126): (optionally, in accordance with a determination that the first user interface is displayed in a second display mode (e.g., a portrait mode) (e.g., a second mode of a plurality of modes such as photos mode, portrait mode, astronomy mode, weather mode, or emoji mode)) replacing display of a first photo in the first representation of the first version of the wake user interface with display of a second photo, distinct from the first photo, in the second representation of the second version of the wake user interface. In some embodiments, the first photo is displayed as the first background and the second photo is displayed as the second background. In some embodiments, the first photo and the second photo include a main subject (e.g., an individual, a pet, and/or a landmark) and one or more secondary subjects (e.g., background objects and/or environment). For example, FIGS. 5BC-5BD illustrate changing a background image, including a foreground portion (e.g., the moon) and a background environment (e.g., the color and/or pattern behind the moon). Enabling a user to direct an input to a wake screen configuration user interface to switch between different versions of the wake screen, including to a version that shows a different photo or portrait, reduces the number of inputs needed to make different types of configuration changes to the wake screen.

In some embodiments, the first photo includes a first main portion (e.g., a person, a pet, and/or a landmark) and one or more first peripheral portions (e.g., peripheral and/or background objects, and/or environment) and the second photo includes (1128) a second main portion (e.g., a person, a pet, and/or a landmark) and one or more second peripheral portions (e.g., peripheral and/or background objects, and/or environment), and wherein the first background includes the first main portion with the one or more first peripheral portions replaced with a first texture (e.g., a first color, a first pattern, and/or a first color gradient), and the second background includes the second main portion with the one or more second peripheral portions replaced with a second texture (e.g., a second color, a second pattern, and/or a second color gradient). In some embodiments, the first texture and/or the second texture include a translucency gradient (e.g., increasing translucency from the center to the edge, from top to bottom, or vice versa). In some embodiments, the wake user interface displayed in the portrait mode includes a photo of an individual, wherein the individual is maintained, for example in the foreground, and background objects and/or colors in the original photo are replaced with a system-generated texture and/or color. In some embodiments, the system-generated texture and/or color has a translucency gradient. For example, the individual in the photo is displayed over a colored background that is not part of the original photo. In some embodiments, the system-generated texture and/or color is selected in accordance with one or more features (e.g., colors, color tones, or background objects) that are present in the original photo. For example, in FIGS. 5AV-5AW, for a portrait-style background, the foreground (e.g., the subject) remains displayed while the background having a color, texture and/or gradient is updated. When switching from one version of the wake screen to another version that includes a different photo or portrait, replacing the background of a respective photo or portrait with a visual texture causes the device to automatically give visual emphasis to objects in the foreground of the photo or portrait, thereby reducing an amount of time needed to choose between different versions of the wake screen by helping the user focus.

In some embodiments, updating the first user interface to replace display of the first representation of the first version of the wake user interface with display of the second representation of the second version of the wake user interface includes (1130): (optionally, in accordance with a determination that the first user interface is displayed in a third display mode (e.g., an emoji mode) (e.g., a third mode of a plurality of modes such as photos mode, portrait mode, astronomy mode, weather mode, or emoji mode)) replacing display of a first pattern of one or more selected emojis displayed in the first representation of the first version of the wake user interface with display of a second pattern of the one or more selected emojis, distinct from the first pattern, in the second representation of the second version of the wake user interface. In some embodiments, the device provides an input region (e.g., an input region at the top of the emoji keyboard) that allows the user to select up to a predefined number of emojis to include in the respective wake user interface. For example, the device provides input slots for up to three (e.g., one, two, or three) distinct emojis in the input region where the emojis entered into the input region are to be displayed in a pattern on the wake user interface. In some embodiments, different versions of the wake user interface include different patterns (e.g., a swirl pattern, a grid pattern, and/or a line pattern) of the same emoji. In some embodiments, different versions of the wake user interface include different sets of emojis, as described with reference to FIG. 6G. Enabling a user to direct an input to a wake screen configuration user interface to switch between different versions of the wake screen, including to a version that includes a different set or pattern of emojis, reduces the number of inputs needed to make different types of configuration changes to the wake screen.

In some embodiments, updating the first user interface to replace display of the first representation of the first version of the wake user interface with display of the second representation of the second version of the wake user interface includes (1131): (optionally, in accordance with a determination that the first user interface is displayed in a fourth display mode (e.g., an astronomy mode) (e.g., a fourth mode of a plurality of modes such as photos mode, portrait mode, astronomy mode, weather mode, or emoji mode)) replacing display of a first type of celestial object displayed in the first representation of the first version of the wake user interface with display of a second type of celestial object, distinct from the first type of celestial object, in the second representation of the second version of the wake user interface. In some embodiments, the first type and the second type of celestial objects are selected from the group consisting of: a moon, a planet, earth, and/or an orrery that includes a plurality of celestial objects and illustrates a relationship between the motion and/or location of the different celestial objects represented by the orrery. For example, FIGS. 5BA-5BD illustrate different phases of a moon as the background image of the wake screen user interface. Enabling a user to direct an input to a wake screen configuration user interface to switch between different versions of the wake screen, including to a version that shows a different celestial object or scene, reduces the number of inputs needed to make different types of configuration changes to the wake screen.

In some embodiments, the first representation of the first version of the wake user interface is (1132) displayed in a motion mode, and displaying the first background (e.g., in the first representation of the first version of the wake user interface, and/or in the first version of the wake user interface) includes displaying an animated sequence of frames selected from a video. In some embodiments, the computer system also generates and displays additional interpolated frames to generate a motion visual effect, as described with reference to FIG. 5AI. Enabling a wake screen user interface to be displayed in a motion mode in which the wake screen includes a video clip that plays in the background of the wake screen causes the device to automatically enable the user to add a favorite video clip to the wake screen, thereby reducing the number of inputs and amount of time needed to navigate on the device to view the favorite video clip.

In some embodiments, the computer system displays (1134), in the first user interface for configuring the wake user interface, a respective user interface object that indicates availability of one or more additional versions of the wake user interface, including the second version of the wake user interface. In some embodiments, the respective user interface object is a series of paging dots. For example, indication 574 (FIG. 5AJ) indicates additional views of the wake screen user interface are available. In some embodiments, the respective user interface object changes its appearance, e.g., highlights a different paging dot in a series of paging dots, in response to an input that meet the second criteria, to indicate that a next, different version of the wake user interface is now displayed in response to the input. In some embodiments, in accordance with a determination that one or more additional versions of the wake user interface are available, the device navigates between the one or more additional versions, including the second version, in response to user inputs that correspond to a user's requests to navigate between the different versions of the wake user interface. For example, in response to one or more swipe inputs, or other navigation inputs directed to the different versions of the wake user interface, the device continues switching to additional versions of the wake user interface (e.g., 3 or more versions of the wake user interface are available to be viewed in the wake screen configuration user interface). Displaying, in a wake screen configuration user interface, an indication of whether additional versions of the wake user interface are available for previewing and optionally selection provides feedback about a state of the device.

In some embodiments, the first user interface object includes (1136) system generated text (e.g., the first user interface object includes a time element, a date element, and/or system prompt, shown in the first representation of the first version of the wake user interface) and a respective user interface object (e.g., reticles, bounding boxes, and/or highlighting) is displayed at a respective location that corresponds to the first user interface object in the first user interface to indicate that the first user interface object is editable in the first user interface (e.g., in response to the first input that meets the first criteria and when the first input is directed to the respective location that corresponds to the first user interface object including system generated text). For example, reticles 568 and 569 are displayed as encompassing the textual indication of the date and time in FIG. 5X. In some embodiments, displaying the second user interface for editing the first user interface object includes displaying a user interface for configuring the system generated text included in the first user interface object. In some embodiments, a first reticle is displayed at a first location that corresponds to a first portion of the system generated text (e.g., a time indication) and a second reticle is displayed at a second location that corresponds to a second portion of the system generated text (e.g., a date indication). In some embodiments, only one reticle is displayed (e.g., the reticle for the time is displayed without displaying the reticle for the date). In some embodiments, the second user interface for configuring the system generated text includes one or more options for changing font properties, a color of the font, and/or a type of information that is displayed (e.g., day of the week, month, date, and/or year). Displaying, in a wake screen configuration user interface, an indication that system-generated text in the wake screen is editable provides feedback about a state of the device that reduces the number of inputs needed to edit system information.

In some embodiments, the first background of the first representation of the first version of the wake user interface includes (1138) a first photo comprising a first main portion (e.g., a person, a pet, and/or a landmark) and one or more first peripheral portions (e.g., one or more background objects, secondary objects, and/or environment) (e.g., the first main portion is displayed at a first depth, the first peripheral portion is displayed at a second depth different from (e.g., larger than) the first depth, in the first representation of the first version of the wake user interface, as the first background of the first version of the wake user interface). Prior to detecting the first input, the first user interface object is displayed behind the first main portion of the first photo in the first representation of the first portion of the wake user interface (e.g., the first user interface object is partially occluded by the first main portion of the first photo in the first representation of the first version of the wake user interface) (optionally, the first user interface object is displayed in front of other peripheral portions of the photo in the first representation of the first version of the wake user interface). In response to detecting the first input, the first user interface object is displayed in front of the first main portion of the first photo in the first representation of the first portion of the wake user interface while displaying the second user interface for editing the first user interface object (optionally, the main portion of the first photo is displayed at a visual depth that is smaller than the other peripheral portions of the photo). For example, in FIG. 5AL, the individual (e.g., the main portion of the photo) is displayed over the time indication after detecting one or more user inputs. When displaying, in a wake screen configuration user interface, an indication that system-generated text in a wake screen that includes a photo is editable, displaying the indication about the system-generated text behind a main portion of the photo until a user input selecting the system-generated text for editing is detected, and then displaying the system-generated text in front of the main portion of the photo in response, causes the device to automatically give visual emphasis to the main portion of the photo while providing feedback about a state of the device that reduces the number of inputs needed to edit system information, and then to automatically give visual emphasis to the portion of the wake screen with which the user has indicated intent to interact.

In some embodiments, displaying the second user interface for editing the first user interface object of the plurality of editable user interface objects includes (1140): in accordance with a determination that the first user interface object includes system generated text (e.g., in accordance with a determination that the first user interface object is a time indication, a date indication, a set of complications, and/or a system generated prompt) (e.g., in accordance with a determination that the first input is directed to a respective object that is displayed with a reticle, a bounding box, or highlight that indicates the respective object is editable), displaying a first plurality of user-selectable color options (e.g., contrasting colors, complimentary colors, and/or matching colors) that are selected based on the first background of the first version of the wake user interface (e.g., based on the colors detected in the first background). In some embodiments, matching and/or complimentary color options are selected based on colors detected in the first background of the first version of the wake user interface. In some embodiments, matching and/or complimentary color options are selected based on colors detected in the second background of the second version of the wake user interface, if an input meeting the first criteria is detected on objects containing system generated text in the second representation of the second version of the wake user interface. In some embodiments, contrasting color options are provided based on the colors in the background of the currently displayed representation of a version of the wake user interface. In some embodiments, in addition to displaying the color options, the computer system also provides a selectable option in the second user interface that, when selected, causes display of a full set of color options that is independent of the colors in the background of the currently displayed representation of a version of the wake user interface. For example, in FIG. 5AD, user interface object 586 includes a plurality of selectable color options for the user to select to change a color of the text in the wake screen user interface. In response to an input selecting system-generated text in a wake screen for editing, displaying a palette of user-selectable color options for the system-generated text that are based on the background of the wake screen causes the device to automatically suggest color options that are intelligently generated so as to complement the wake screen, thereby reducing the number of inputs and amount of time needed for the user to select a text color.

In some embodiments, displaying the second user interface for editing the first user interface object of the plurality of editable user interface objects includes (1142): in accordance with a determination that the first user interface object includes system generated text (e.g., in accordance with a determination that the first user interface object is a time indication, a date indication, a set of complications, and/or a system generated prompt) (e.g., in accordance with a determination that the first input is directed to a respective object that is displayed with a reticle, a bounding box, or highlight that indicates the respective object is editable), displaying respective user-selectable options for changing one or more visual properties (e.g., translucency, opacity, luminance, contrast, brightness, and/or saturation) of the system generated text. In some embodiments, in response to the user selecting (e.g., using a tap input) one of the options for the changing the one or more visual properties to edit the corresponding visual property (e.g., to change translucency, brightness, and/or saturation), the computer system displays a value selector (e.g., a slider control, or a radial button control) for the user to select the desired value(s) for the corresponding visual property. For example, in FIG. 5AD, the user interface object 586 optionally includes a setting for changing a translucency, opacity, luminance, contract, brightness and/or saturation of the text in the wake screen user interface. In response to an input selecting system-generated text in a wake screen for editing, displaying a palette of user-selectable options for one or more visual properties of the system-generated text, such as translucency/opacity, luminance, contrast, brightness, and/or saturation, causes the device to automatically suggest text display options, thereby reducing the number of inputs and amount of time needed for the user to edit the appearance of the text.

In some embodiments, in accordance with a determination that the first version of the wake user interface corresponds to a first display mode (e.g., a photos mode) (e.g., a first mode of a plurality of modes such as photos mode, portrait mode, astronomy mode, weather mode, and/or emoji mode) in which the first background includes a currently displayed photo selected from a plurality of photos (e.g., photos from a selected album or photo set), the computer system displays (1144), in the first user interface, one or more respective selectable options (e.g., a set of selectors corresponding to different rotation frequencies) for configuring a frequency for switching the currently displayed photo in the first background, as described with reference to the "Smart Album" wake screen user interface in FIG. 6K. In some embodiments, the currently displayed photo is part of a smart album or other collection of a plurality of photos. In some embodiments, the frequency is based on a predefined amount of time elapsing. In some embodiments, at least one selectable frequency is based on a current time (e.g., a time of day and/or a day of the week). In some embodiments, one or more selectable frequencies are based on one or more events of the computer system, such as an inactive period (e.g., after being locked) or in accordance with focus mode settings (e.g., a do not disturb (DND) mode, a sleep mode, or a work mode). For a wake screen that includes a photo in the background, enabling a user to select a frequency with which to switch the currently displayed photo (e.g., so as to present a slideshow of photos) reduces the number of inputs and amount of time needed to customize the wake screen.

In some embodiments, the computer system detects (1146) a respective plurality of user inputs that correspond to a request to add, to the first version of the wake user interface (e.g., by adding, to the first representation of the first version of the wake user interface displayed in the first user interface), one or more user interface objects that correspond to a plurality of applications and include respective content from the plurality of applications and that are updated periodically as information represented by the plurality of user interface objects changes (e.g., a request to add one or more complications corresponding to different applications and include content that is periodically updated as the information represented by the complications changes). In response to detecting the respective plurality of user inputs: the computer system adds the one or more user interface objects to the first representation of the first version of the wake user interface in the first user interface. In accordance with a determination that the first background of the first version of the wake user interface includes a first photo (e.g., in accordance with a determination that the first version of the wake user interface corresponds to a first display mode (e.g., a photos mode) (e.g., a first mode of a plurality of modes such as photos mode, portrait mode, astronomy mode, weather mode, emoji mode, and so on) in which the first background includes a currently displayed photo selected from a plurality of photos (e.g., photos from a selected album or photo set)), and that a main subject (e.g., a person, a pet, a landmark, and/or a central portion) of the first photo overlaps with at least one of the one or more user interface objects that are added to the first representation of the first version of the wake user interface, the computer system changes one or more spatial properties of the first photo in the first background (e.g., changing a zoom level, a cropping dimensions, a center, and/or a size of the first photo) such that the main subject of the first photo does not overlap with the one or more user interface objects in the first representation of the first version of the wake user interface. For example, in FIG. 5AI, in some embodiments, after the user has added the complications 502-15 through 502-18, the device 100 automatically adjusted a size of the individual of the portrait-style photo as to not overlap with the complications. In some embodiments, the device adjusts the size of the individual in response to a user's input that corresponds to a request to resize the portion of the background corresponding to the individual, even if the individual will overlap the complications, as illustrated in FIGS. 5AJ-5AL. When adding one or more user interface objects that are periodically updated with content from active applications to a wake screen that includes a photo in the background, resizing, rescaling, and/or repositioning the photo as needed so that the main subject of the photo and the one or more user interface objects do not overlap causes the device to automatically optimize the arrangement of various elements of the wake screen to reduce truncation or occlusion and make more efficient use of the display area.

In some embodiments, in conjunction with changing the one or more spatial properties of the first photo in the first background (e.g., changing a zoom level, a cropping dimensions, a center, and/or a size of the first photo) such that the main subject of the first photo does not overlap with the one or more user interface objects in the first representation of the first version of the wake user interface, and in accordance with a determination that the main subject overlaps with system generated text in the first representation of the first version of the wake user interface, the computer system removes (1148) a visual effect applied to the main subject that adjusts a perceived depth of the main subject in the first photo (e.g., the first photo is initially displayed with a depth visual effect which places the main subject in front of the system generated text (e.g., before the complications were added), and the depth visual effect is removed if the main subject is moved and/or resized in the first photo to avoid overlapping with the newly added complications). For example, in FIG. 5AI, a perceived depth of the subject is automatically removed after the complications have been added. When adding one or more user interface objects that are periodically updated with content from active applications to a wake screen that includes a photo in the background, removing a visual effect of depth in the photo and/or between the photo and other elements in the wake screen when resizing, rescaling, and/or repositioning the photo as needed so that the main subject of the photo and the one or more user interface objects do not overlap causes the device to automatically optimize the arrangement of various elements of the wake screen to reduce truncation or occlusion and make more efficient use of the display area.

In some embodiments, changing the one or more spatial properties of the first photo in the first background (e.g., changing a zoom level, a cropping dimensions, a center, and/or a size of the first photo) is performed (1150) in accordance with a determination that a user has not modified the one or more spatial properties of the first photo. In some embodiments, in accordance with a determination that the user has specified a size, center, and/or dimensions of the first photo (e.g., the user manually cropped the first photo) in the current editing session, and/or in a previous editing session, the computer system forgoes changing the size, center, and/or dimensions of the first photo in the first background, even if the main subject would overlap with the one or more newly added complications. For example, after a user has manually edited the spatial properties of the first photo, the computer system forgoes automatically changing the spatial properties of the first photo (and/or the main subject) for other rules. For example, as described with reference to FIGS. 5AO-5AT, after a user has manually modified a feature (e.g., in a current editing session and/or a previous editing session), that feature is not automatically updated, or changed, by the device 100. When adding one or more user interface objects that are periodically updated with content from active applications to a wake screen that includes a photo in the background, modifying one or more spatial properties of the photo (e.g., by resizing, rescaling, and/or repositioning the photo), so that the main subject of the photo and the one or more user interface objects do not overlap, only if a user has not previously modified the spatial properties of the photo causes the device to automatically defer to previously-received user specification when determining how to arrange various elements of the wake screen to reduce truncation or occlusion and make more efficient use of the display area.

In some embodiments, in accordance with a determination that the first version of the wake user interface corresponds to a first display mode (e.g., a photos mode) (e.g., a first mode of a plurality of modes such as photos mode, portrait mode, astronomy mode, weather mode, or emoji mode) in which the first background includes a currently displayed photo selected from a plurality of photos (e.g., photos from a selected album or photo set), the computer system displays (1152), in the first user interface, a respective user-selectable option for specifying one or more rules for automatically selecting the plurality of photos (e.g., rather than manually selecting the photos using selection input(s) directed to one or more individual photos or sets of photos) to display in the first background of the first version of the wake user interface. In some embodiments, the user selects rule(s) to include one or more types of photos (e.g., one or more individuals, pets, and/or albums) and/or selects rule(s) to exclude one or more types of photos (e.g., photos without people, photos of objects, photos of webpages, text, and/or screenshots). In some embodiments, the user selects rules that define a time period of photos (e.g., the creation date and/or most recent editing date) to display. In some embodiments, the user selects rule(s) that define an orientation of photos to be included and/or excluded (e.g., include portrait orientation photos and exclude landscape orientation photos). For example, in FIG. 6K, a "Smart Album" is provided as an option under the Featured Faces. In some embodiments, a "Smart Album" enables the user to select certain types of photos to be included in the Smart Album wake screen user interface, such as pictures of a pet, pictures from a particular album, and/or pictures of an individual. For a wake screen user interface that includes a photo in the background, enabling a user to specify one or more rules for automatically selecting candidate photos to display in the background of the wake screen reduces the number of inputs and amount of time needed to select the candidate photos.

In some embodiments, in accordance with a determination that the first version of the wake user interface corresponds to a first display mode (e.g., a photos mode) (e.g., a first mode of a plurality of modes such as photos mode, portrait mode, astronomy mode, weather mode, or emoji mode) in which the first background includes a currently displayed photo selected from a plurality of photos (e.g., photos from a selected album or photo set), the computer system displays (1154) the currently displayed photo with a first aspect ratio in the first version of the wake user interface, wherein the first aspect ratio is distinct from a second aspect ratio corresponding to the first photo stored in a photo library of the computer system. For example, in some embodiments, a different aspect ratio is used for photos on the wake user interface than the photos stored and/or viewed in the photo library. In some embodiments, the aspect ratio of the first photo in the photo library is a square, and the aspect ratio of the first photo displayed on the wake user interface is a rectangle such that it fits a size of the display. For example, in FIG. 5AI, an aspect ratio of the portrait-style photo is distinct from the stored photo (e.g., as viewed in a photos application). For a wake screen user interface that includes a photo in the background, displaying the photo in the wake screen with an aspect ratio that is different from an aspect ratio with which the photo is displayed in a different type of user interface of the computer system, such as in a photo library, causes the device to automatically optimize the arrangement of various elements in the wake screen.

In some embodiments, displaying the second user interface for editing the first user interface object of the first plurality of editable user interface objects includes (1156): in accordance with a determination that the location of the first input is a first location in the first user interface (e.g., the first user interface object is an object of a first type at the first location), displaying a first set of selectable options for editing the first user interface object; and in accordance with a determination that the location of the first input is a second location in the first user interface (e.g., the first user interface object is an object of a second type at the second location) different from the first location in the first user interface, displaying a second set of selectable options for editing the first user interface object, the second set of selectable options being different from the first set of selectable options. For example, in some embodiments, the second user interface includes a respective editing panel that is specific to the user interface object that has been selected for editing by the location of the first input in the first user interface. If the location of the first input is the location of a time element or a date element, a first set of selectable options including options to edit the font and/or font color of the time element, and/or a format of the time element is displayed; and if the location of the first input is the location of a complication below the time element, a second set of selectable options including options to change the style of the complication, the information to be included in the complication, and/or the size and format of the complication. In some embodiments, while displaying the second user interface that includes the respective editing panel that is specific to the user interface object that has been selected by the first input, the computer system detects another input directed to a different location that corresponds to a second user interface object in the first user interface (e.g., some elements of the first user interface remain visible and selectable while the second user interface is displayed); and in response to detect the additional input, the computer system updates the second user interface to indicate selection of the second user interface object and deselection of the first user interface object, and displays an editing panel with a set of selectable options that is specific to the second user interface object (and ceases to display the editing panel with the set of selectable options that is specific to the first user interface object). For example, the user interface element 570 (e.g., as illustrated in FIG. 5AC) for editing complications that are positioned below the indication of the time is distinct from the user interface element 5090 (e.g., illustrated in FIG. 5AX4) for editing complications (e.g., textual complications) that are positioned above the indication of the time. Enabling a user to direct inputs to objects at different locations in a wake screen configuration user interface to bring up different sets of selectable options enables the user to customize different objects in the wake screen and causes the device to automatically display a set of selectable options that is appropriate for the particular object that the user wants to edit.

In some embodiments, the first user interface object is (1158) a user interface object that corresponds to a respective application, that includes respective content from the respective applications (e.g., the first user interface object is a complication and/or widget that corresponds to an application), and is updated periodically as information represented by the first user interface object changes, and wherein displaying the second user interface for editing the first user interface object of the first plurality of editable user interface objects includes: in accordance with a determination that the location of the first input is the first location in the first user interface (e.g., the first user interface object is a textual complication displayed above the time element), displaying the first set of selectable options (e.g., font, font size, and/or font color) including at least one selectable option for editing the first user interface object in a first format (e.g., textual format, and/or simplified format) (e.g., user interface element 5090 in FIG. 5AX4 is displayed to edit the complications above the time indication); and in accordance with a determination that the location of the first input is the second location in the first user interface (e.g., the first user interface object is a graphical complication displayed below the time element), displaying the second set of selectable options for editing the first user interface object including at least one selectable option for editing the first user interface object in a second format (e.g., size of complication, content to be included in the complication, and/or color of complication, optionally in addition to the font, font color, font size options for editing the textual content of the graphical complication) different from the first format. For example, user interface element 5082 illustrated in FIG. 5AX3 enables the user to modify a size of one or more complications that are positioned below the time indication. Enabling a user to direct inputs to objects, which are periodically updated with content from associated active applications, at different locations in a wake screen configuration user interface to bring up different sets of selectable options enables the user to customize different objects in the wake screen and causes the device to automatically display a set of selectable options that is appropriate for the particular object that the user wants to edit.

In some embodiments, displaying the second user interface for editing the first user interface object of the first plurality of editable user interface objects includes (1160): in accordance with a determination that the first user interface object includes system generated text (e.g., in accordance with a determination that the first user interface object is a time element, or a date element), displaying a third set of selectable options for editing a font and/or font color of the system generated text. In some embodiments, the third set of selectable options includes a set of vibrant materials that can be selected to use as the font color of the system generated text. In some embodiments, the third set of selectable options includes black or white font color depending on the visual properties (e.g., brightness, saturation level, and/or luminance) of the respective background currently used in the first user interface. In some embodiments, as the respective background is changed (e.g., through changing the media item and/or the filter that are used to generate the respective background), the third set of selectable options is also updated in accordance with the visual properties of the changed background. In some embodiments, the third set of selectable options include colors that are selected based on the colors that are automatically detected from the respective background that is currently used in the first user interface (e.g., colors that are similar in tone and tint as the colors in the background, and/or colors that have high contrast with the colors in the background). In some embodiments, the third set of selectable options include a respective option for displaying a color picker that allows the user to sample a color from the background media item. In some embodiments, once the user uses the color picker to sample a color from a location within the background media item, the sampled color is added to the third set of selectable options. In some embodiments, the third set of selectable options (e.g., font and color sheet) is removed from view to allow the user access to the entirety of the respective background to sample a color from it, and once the color is collected from the respective background, the third set of selectable options is redisplayed and now includes the newly collected color from the respective background. For example, as illustrated in FIGS. 5AE, user interface object 586 enables the user to modify a style of the text (e.g., a typeface or other font properties) of the indication of the time, and enables the user to modify a color of the text of the indication of the time. In response to an input selecting system-generated text in a wake screen for editing, displaying a set of selectable options for the system-generated text causes the device to automatically display a set of selectable options that is appropriate for the particular object that the user wants to edit.

In some embodiments, displaying the second user interface for editing the first user interface object of the first plurality of editable user interface objects includes: in accordance with a determination that the first user interface object is a user (1162) interface object that corresponds to a respective application, that includes respective content from the respective applications (e.g., the first user interface object is a complication and/or widget that corresponds to an application), and is updated periodically as information represented by the first user interface object changes (and optionally, further in accordance with a determination that the location of the first input and/or the location of the first user interface object is below the time element), displaying a fourth set of selectable options including one or more selectable options to edit a respective size of the first user interface object. For example, as described with reference to FIG. 5AX2, in response to user input 5080 selecting a calendar complication, a plurality of options for modifying a size of the calendar complication is displayed in user interface element 5082, illustrated in FIG. 5AX3. In response to an input selecting, for editing in a wake screen, a user interface object that is periodically updated with content from an associated active application, displaying a set of selectable options for the user interface object that includes one or more size options for the user interface object causes the device to automatically display a set of selectable options that is appropriate for the particular object that the user wants to edit.

In some embodiments, in response to detecting the first input directed to the first user interface in accordance with a determination that the first input meets the first criteria, the computer system displays (1162) respective affordances at locations corresponding to a subset of user interface objects of the first plurality of editable user interface objects, wherein the subset of user interface objects correspond to different applications and include respective content from the different applications and are updated periodically as information represented by the subset of user interface objects change, and wherein the respective affordances, when selected, remove corresponding user interface objects of the subset of user interface objects from the first user interface. In some embodiments, in accordance with a determination that the first input does not meet the first criteria, forgoing displaying respective affordances at locations corresponding to a subset of user interface objects of the first plurality of editable user interface objects (e.g., without displaying the editing user interface illustrated in FIGS. 5AX2-5AX3). For example, as illustrated in FIGS. 5AX2-5AX3, the one or more complications, including complication 5089-1 and 5089-2 are each displayed with a removal affordance (e.g., a minus symbol) that, when selected by the user (e.g., via user input 5086), causes the device to remove the complication associated with the selected removal affordance, as illustrated in FIG. 5AX4. While displaying a user interface for editing one or more editable objects in a wake screen, displaying, for a subset of objects that are periodically updated with content from associated active applications, corresponding affordances that are selectable to remove the corresponding object from the wake screen, reduces the number of inputs and amount of time needed to customize the wake screen.

It should be understood that the particular order in which the operations in FIGS. 11A-11H have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1000, 12000, 1300, 14000, 15000, 16000, and 17000) are also applicable in an analogous manner to method 1100 described above with respect to FIGS. 11A-11H. For example, the contacts, gestures, user interface objects and animations described above with reference to method 1100 optionally have one or more of the characteristics of the contacts, gestures, user interface objects and animations described herein with reference to other methods described herein (e.g., methods 900, 1000, 12000, 1300, 14000, 15000, 16000, and 17000). For brevity, these details are not repeated here.

FIGS. 12A-12E are flow diagrams illustrating method 12000 for displaying a representation of a plurality of notifications in different configurations, in accordance with some embodiments. Method 12000 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 12000 are, optionally, combined and/or the order of some operations is, optionally, changed.

As described below, method 12000 is a method for displaying a representation of a plurality of notifications in different configurations, thereby providing the user with different configurations for displaying notifications (e.g., based on different circumstances), which provides additional control options without cluttering the user interface with additional displayed controls. Additionally, the available configurations are persistent, which reduces the number of user inputs needed to display notifications in a desired configuration (e.g., the user does not need to select the configuration every time a new notification comes in, or every time the device transitions to a wake state).

The method 12000 is performed at a computer system with a display component and one or more input devices. The computer system displays (12002), via the display generation component, a first user interface (e.g., a wake screen user interface) that includes a plurality of notifications (e.g., notifications that have been recently received by the computer system). In accordance with a determination that the computer system has a first mode for displaying notifications enabled, the computer system displays (12004) a representation of the plurality of notifications in a first configuration in a first region of the first user interface. In accordance with a determination that the computer system has a second mode for displaying notifications enabled, the computer system displays (12006) the representation of the plurality of notifications in a second configuration in a second region of the first user interface that is smaller than the first region of the first user interface. In some embodiments, the device allows the user to select from a plurality of user-selectable modes, including the first mode and the second mode, that allow the user to control how notifications are displayed on the wake screen. In some embodiments, the first mode is a regular mode of the computer system (e.g., the first configuration is a default configuration and/or the first mode does not include any rules that affect notification delivery or display). In some embodiments, the second mode includes one or more rules that control notification delivery or display (e.g., while the second mode is active, some notifications are deferred or hidden by default).

While displaying the first user interface, the computer system detects (12008) a first user input (e.g., a tap, a long press, or a swipe) at a respective location on the first user interface corresponding to the representation of the plurality of notifications. In response to detecting (12010) the first user input, and while continuing to detect the first user input: in accordance with a determination that the first user input meets first criteria (e.g., the first criteria require that the first user input is of a first input type and that the first user input is detected at a location that corresponds to a region of the first user interface occupied by the representation of the plurality of notifications in order to be met) and in accordance with a determination that the representation of the plurality of notifications is displayed with the first configuration (e.g., a regular configuration), the computer system scrolls (12012) notifications in the plurality of notifications in the first region of the first user interface (e.g., without expanding the display of the plurality of notifications in the first configuration and/or without expanding the first region of the first user interface) in accordance with the first user input; and in accordance with a determination that the first user input meets the first criteria and in accordance with a determination that the representation of the plurality of notifications is displayed with the second configuration (e.g., a condensed, minimized, or reduced prominence configuration), the computer system scrolls (12014) the notifications in the plurality of notifications in a third region of the first user interface, in accordance with the first user input. In some embodiments, the third region is the same as the second region (e.g., notifications are scrolled without changing a size of the second region). In some embodiments, the third region is larger than the second region (e.g., the second configuration is "expanded" such that more notifications of the plurality of notifications are visible, and/or more content from the notifications of the plurality of notifications is visible, when the representation of the plurality of notifications is displayed in the third region).

In some embodiments, after scrolling the notifications in the plurality of notifications, the computer system detects (12016) the occurrence of a first event (e.g., timeout without user input, or the computer system entering a low power state). In some embodiments, in response to the first event, the computer system ceases to display the first user interface. In response to detecting the occurrence of the first event: in accordance with a determination that the computer system has the first mode for displaying notifications enabled, the computer system maintains display of the representation of the plurality of notifications in the first configuration in the first region; and in accordance with a determination that the computer system has the second mode for displaying notifications enabled, the computer system redisplays the representation of the plurality of notifications in the second configuration in the second region. In some embodiments, the third region is different from the second region. In some embodiments, the third region is an expanded region of the second region, and after scrolling the notifications in the plurality of notifications in the third region, the notifications collapse back into the second region (e.g., after a threshold amount of time has passed without further scrolling). For example, in FIG. 7T, the expanded configuration 7000-*d* is a temporary configuration (e.g., for scrolling notifications), and if the portable multifunction device 100 ceases to display the representation 7000 (e.g., in response to detecting a user input, or when the portable multifunction device transitions to a low power or sleep state), in response to a first event (e.g., that transitions the portable multifunction device 100 out of the low power or sleep state), the portable multifunction device 100 redisplays the representation 7000 in the second configuration 7000-*b* (e.g., and not in the expanded configuration 7000-*d*). Maintaining display of the representation of the plurality of notifications in the first configuration in the first region, in accordance with a determination that the computer system has the first mode for displaying notifications enabled, and redisplaying the representation of the plurality of notifications in the second configuration in the second region, in accordance with a determination that the computer system has the second mode for displaying notifications enabled, automatically redisplays the representation of the notifications in the second configuration (e.g., automatically collapses an expanded view of notifications back into a default view) without requiring further user input (e.g., a separate user input to redisplay the representation of the plurality of notifications in the second configuration in the second region).

In some embodiments, after scrolling the notifications, the computer system ceases (12018) to display the first user interface (e.g., the computer transitions into a sleep state after a threshold amount of time passes, the computer system transitions into the sleep state in response to a user input, the computer system replaces display of the first user interface with another user interface (e.g., an application launch user interface, a user interface for adjusting one or more settings of the computer system, a camera user interface or other application user interface, a second user interface including one or more widgets)). After ceasing to display the first user interface, the computer system redisplays the first user interface (e.g., in response to a request to wake the computer system). In accordance with a determination that the computer system has the first mode for displaying notifications enabled, the computer system displays the representation of the plurality of notifications in the first configuration in the first region of the first user interface. In accordance with a determination that the computer system has the second mode for displaying notifications enabled, the computer system displays the representation of the plurality of notifications in the second configuration in the second region of the first user interface.

In some embodiments, the computer system ceases to display the first user interface when the computer system transitions to a low power state (e.g., a sleep state) or an off state, and the computer system redisplays the first user interface when the computer system transitions out of the low power state or off state (e.g., in response to a user input, in response to receiving/generating a new notification, or automatically based off settings of the computer system). In some embodiments, the first user interface is displayed immediately as and/or when the computer system transitions out of the low power state or off state (e.g., if the computer system was in a sleep state, the next time the computer system is woken, the first user interface is the first displayed user interface when the computer system is woken). For example, in FIGS. 7M-7P, even as the time advances from 9:41 to 12:00, the representation 7000 remains displayed in the second configuration 7000-*b*.

Redisplaying the first user interface, including displaying the representation of the plurality of notifications in the first configuration in the first region of the first user interface in accordance with a determination that the computer system has the first mode for displaying notifications enabled, and displaying the representation of the plurality of notifications in the second configuration in the second region of the first user interface in accordance with a determination that the computer system has the second mode for displaying notifications enabled, reduces the number of inputs needed to display notifications in a desired configuration (e.g., the user does not need reselect the desired configuration for the plurality of notifications each time the first user interface is redisplayed).

In some embodiments, the first user interface includes (12020) a first portion of a background image (e.g., a wallpaper for a wake screen), and the second region of the first user interface does not overlay the first portion of the background image. In accordance with a determination that the first user input meets the first criteria and in accordance with a determination that the representation of the plurality of notifications is displayed with the second configuration, the computer system scrolls the notifications in the plurality of notifications in the third region of the first user interface, in accordance with the first user input, and without overlaying the first portion of the background image. For example, in FIGS. 7H and 7I, in response to the upward swipe gesture 7038, notifications are scrolled in the representation 7000 while maintaining the second configuration 7000-*b*, and without changing the size of the region in which the representation 7000 is displayed in.

Scrolling the notifications in the plurality of notifications in the third region of the first user interface, in accordance with the first user input, and without overlaying the first background image, reduces the number of user inputs needed to display the representation of the plurality of notifications in the desired configuration (e.g., and without losing the ability to interact with, view content from, and scroll through, notifications in the plurality of notifications) (e.g., as the user does not need to perform additional user inputs to transition to a different configuration before scrolling the notifications).

In some embodiments, in accordance with a determination that the representation of the plurality of notifications is displayed in the first configuration, the computer system displays (12022) text of a respective notification of the plurality of notifications with a first text size. In accordance with a determination that the representation of the plurality of notifications is displayed in the second configuration, the computer system displays the text of the respective notification of the plurality of notifications with a second text size that is different from (e.g., smaller than) the first text size. For example, with reference to FIG. 7H, the notification 7002 could be displayed with a second text size in the second configuration 7000-*b*, and the notification 7002 could be displayed with a first text size (e.g., where the second text size is different from the first text size) when the notification 7002 is displayed in the first configuration 7000-*a* (e.g., as in FIG. 7G).

In some embodiments, in accordance with a determination that the representation of the plurality of notifications is displayed in the first configuration, the computer system displays first text from a first notification of the plurality of notifications with the first text size and displays second text from a second notification of the plurality of notifications with the first text size. In accordance with a determination that the representation of the plurality of notifications is displayed in the second configuration, the computer system displays the first text with the second text size that is different from the first text size and displays the second text with the second text size. In some embodiments, the computer system displays subsequent notifications (e.g., notifications received after, or notifications generated after, detecting the first user input) with the respective text size (e.g., based on which configuration the representation of the plurality of notifications is displayed in). For example, with reference to FIG. 7G, the notification 7002 and the notification 7004 could both be displayed with a first text size in the first configuration 7000-*a*, and the notification 7002 and the notification 7004 could both be displayed with a second text size in the second configuration 7000-*b* (e.g., in FIG. 7H).

In some embodiments, in accordance with the determination that the representation of the plurality of notifications is displayed in the first configuration, the computer system displays text of a subset of notifications of the plurality of notifications with the first text size, and in accordance with a determination that the representation of the plurality of notifications is displayed in the second configuration, the computer system displays the text of the subset of notifications of the plurality of notifications with the second text size that is different from the first text size. In some embodiments, the subset of notifications includes multiple notifications, but not all notifications, in the plurality of notifications. For example, with reference to FIG. 7H, the notification 7004 could be displayed with a different text size (e.g., a smaller text size) in the second configuration 7000-*b*, as compared to the same notification 7004 in the first configuration 7000-*a* (e.g., in FIG. 7G). In contrast, the notification 7002 could be displayed with the same text size in both the second configuration 7000-*b* and the first configuration 7000-*a* (e.g., because the notification 7002 is the topmost notification in the stack of notifications in the second configuration 7000-*b*, reducing a text size of the notification 7002 would reduce visibility and/or readability).

In some embodiments, the first text size and the second text size are selected based on characteristics of the first configuration and the second configuration, respectively. For example, the first configuration may take up a large amount of room on the display generation component, and the second configuration may be more compact and take up less room on the display generation component (e.g., is more compact and/or takes up less vertical space on the display generation component), relative to the first configuration. In such cases, the second text size is smaller than the first text size (e.g., is scaled to fit the size of the respective configuration). In some embodiments, the difference in size between the first text size and the second text size is proportional to the difference between the room occupied by the first configuration (on the display generation component) and the room occupied by the second configuration. For example, with reference to FIG. 7H, one or more notifications (e.g., the notification 7002 and the notification 7004) may have a different (e.g., smaller) text size in the second configuration 7000-*b*, as compared to the displayed text size in the first configuration 7000-*a* (e.g., in FIG. 7G), because the second configuration 7000-*b* takes up a smaller amount of room on the display as compared to the first configuration 7000-*a*.

Displaying the text of the respective notification of the plurality of notifications with a second text size that is different from the first text size reduces the number of inputs needed to display notifications in a desired configuration (e.g., the user does not need to perform additional user inputs to adjust the text size of notification after displaying the representation of the plurality of notifications in a different configuration).

In some embodiments, a respective notification of the plurality of notifications includes a first image. In accordance with a determination that the representation of the plurality of notifications is displayed in the first configuration, the computer system displays (12024) the first image of the respective notification with a first image size. In accordance with a determination that the representation of the plurality of notifications is displayed in the second configuration, displays the first image of the respective notification with a second image size different from (e.g., smaller than) the first image size. For example, with reference to FIG. 7H, the notification 7002 could include a first image (e.g., an application icon for the application A) displayed with a second image size, and the first image is displayed with a first image size (e.g., where the second image size is different from the first image size) when the notification 7002 is displayed in the first configuration 7000-*a* (e.g., as in FIG. 7G).

In some embodiments, a first notification of the plurality of notifications includes a first image, and a second notification of the plurality of notification includes a second image. In accordance with a determination that the representation of the plurality of notifications is displayed in the first configuration, the computer system displays the first image with the first image size and displays the second image with the first image size. In accordance with a determination that the representation of the plurality of notifications is displayed in the second configuration, the computer system displays the first image with the second image size and displays the second image with the second image size. In some embodiments, if a subsequent notification (e.g., a notification received or generated after detecting the first user input) includes a corresponding image, the computer system displays the corresponding image with the respective image size (e.g., based on which configuration the representation of the plurality of notifications is displayed in). For example, with reference to FIG. 7H, the notification 7002 could include a first image (e.g., an application icon for the application A) and the notification 7004 could include a second image (e.g., an application icon for the application Z), and both the first image and the second image are displayed with a second image size in the second configuration 7000-*b*. The first image and the second image could be displayed with a first image size (e.g., different from the second image size) when the notification 7002 and the notification 7004 are displayed in the first configuration 7000-*a* (e.g., in FIG. 7G).

Displaying the first image of the respective notification with a second image size different from the first image size reduces the number of inputs needed to display notifications in a desired configuration (e.g., the user does not need to perform additional user inputs to adjust the image size of images in notifications after displaying the representation of the plurality of notifications in a different configuration).

In some embodiments, while the representation of the plurality of notifications is displayed in the second configuration, the computer system detects (12026) a second user input that meets second criteria (e.g., the second user input is a swipe, a pinch, a de-pinch), wherein the second criteria are different than the first criteria. In response to detecting the second user input, the computer system expands the representation of the plurality of notifications. For example, in FIGS. 7S and 7T, in response to detecting the depinch gesture 7060, or the upward swipe gesture 7062, the portable multifunction device 100 displays the representation 7000 in an expanded configuration 7000-*d* (e.g., where the expanded configuration 7000-*d* is an expanded version of the second configuration 7000-*b*).

In some embodiments, expanding the representation of the plurality of notifications includes displaying the plurality of notifications with the first configuration (e.g., the computer system transitions from displaying the plurality of notification in the second configuration, to displaying the plurality of notifications in the first configuration, in response to detecting the second user input). In some embodiments, expanding the representation of the plurality of notifications includes displaying the plurality of notifications in a third configuration different than the first configuration and the second configuration (e.g., the first configuration is a regular or default configuration, the second configuration is a condensed, minimized, or reduced prominence configuration, and the third configuration is an intermediate configuration (e.g., the third configuration is less condensed, minimized, or has an increased prominence relative to the second configuration, but is more condensed, minimized, or has a reduced prominence relative to the first configuration)). For example, in FIGS. 7S and 7T, in response to detecting the depinch gesture 7060, or the upward swipe gesture 7062, the portable multifunction device 100 displays the representation 7000 in an expanded configuration 7000-*d*, which is different from the first configuration 7000-*a* (e.g., as shown in FIG. 7U) and the second configuration 7000-*b* (e.g., as shown in FIG. 7S)

In some embodiments, before detecting the second user input, the representation of the plurality of notifications is displayed with a default view of the second configuration, and expanding the representation of the plurality of notifications includes displaying the plurality of notification with an expanded view of the second configuration that is different from the default view of the second configuration. In some embodiments, the plurality of notifications remains expanded until collapsed (e.g., in response to a subsequent user input). In some embodiments, the plurality of notifications automatically collapse after a predetermined amount of time (e.g., 15 seconds, 30 seconds, 1 minute), and return to a default view of the second notification configuration. For example, with reference to FIGS. 7S and 7T, the portable multifunction device 100 could display the representation 7000 in the expanded configuration 7000-*d* for a predetermined amount of time, after which the representation 7000 is displayed in the second configuration 7000-*b*. Expanding the representation of the plurality of notifications in response to detecting the second user input, provides additional control options without cluttering the UI with additional displayed controls (e.g., a separate control for expanding the representation of the plurality of notifications.

In some embodiments, displaying the representation of the plurality of notifications in the second configuration includes (12028) displaying the representation of the plurality of notifications as a stack of notifications; a first notification of the plurality of notifications is displayed at the top of the stack of notifications, and partially overlays other notifications of the plurality of notifications in the stack of notifications; and a first portion of a second notification of the plurality of notifications, different from the first notification, is visible in the stack of notifications. In some embodiments, the notifications in the plurality of notifications are stacked one on top of the other, and each a respective notification of the plurality of notifications overlays the notifications underneath it. In some embodiments, the first notification is the most recently received notification of the plurality of notifications. In some embodiments, at least some content for the second notification is visible in the stack of notifications. For example, in FIG. 7B, some notifications in the plurality of notifications partially overlay other notifications while in the second configuration 7000-*b*, forming a "stack" of notifications. Displaying the representation of the plurality of notifications as a stack of notifications, wherein a first notification displayed at the top of stack partially overlays other notifications in the stack, provides improved visual feedback to the user (e.g., improved visual feedback regarding the number of notifications in the plurality of notifications).

In some embodiments, the second notification of the plurality of notifications is displayed (12030) at the bottom of the stack of notifications, and the first portion of the second notification of the plurality of notifications includes a count of notifications in the stack of notifications. In some embodiments, the second notification represents a group of notifications (e.g., those notifications that aren't represented visually in the stack). In some embodiments, the count is a count of remaining notifications in the stack of notifications (e.g., notifications beyond those that are visible in the stack). For example, in Figure C, the notification counter 7024 indicates the number of notifications remaining in the stack of notifications (e.g., that are not currently displayed, and have not previously been scrolled off the display). Displaying the first portion of the second notification, including a count of notifications in the stack of notifications, provides improved visual feedback to the user (e.g., improved visual feedback regarding the number of notifications represented by the representation of the plurality of notifications and/or content associated with one or more notifications represented by the representation of the plurality of notifications).

In some embodiments, the second notification of the plurality of notifications is displayed (12032) at the bottom of the stack of notifications, and the first portion of the second notification of the plurality of notifications includes visual representations (e.g., application icons) of respective applications corresponding to (e.g., applications that generated) respective notifications in the stack of notifications. In some embodiments, the visible portion of the second notification includes a visual representation of each application associated with a notification in the stack of notifications. In some embodiments, the visible portion of the second notification includes up to a preset maximum number of visual representations (e.g., three application icons). For example, although there are eight applications that generated notifications that are included in the stack of notifications, the visible portion of the second notification includes only (the present maximum number of) three visual representations. For example, in FIG. 7C, the notification count 7024 indicates that at least one notification that is not currently displayed (e.g., and has not been scrolled off the display) has been generated and/or is associated with the application A ("App A"). Displaying the first portion of the second notifications, including visual representations of respective applications corresponding to respective notifications in the stack of notifications, provides improved visual feedback to the user (e.g., improved visual feedback regarding the specific applications and/or the number of applications associated with notifications in the stack of notifications).

In some embodiments, in accordance with a determination that the computer system has the second mode (e.g., a Do Not Disturb mode or a focus mode, that causes at least some notifications to be suppressed in accordance with settings of the Do Not Disturb mode or focus mode) for displaying notifications enabled, the computer system displays (12034) a visual representation (e.g., an icon, a text label, or a combination of icon and text label) of the second mode for displaying notifications (e.g., a Do Not Disturb icon, an icon corresponding to the active focus mode, and/or a text label identifying the name of the second mode).

In some embodiments, in accordance with a determination that the computer system has the first mode for displaying notifications enabled, the computer system displays the representation of the plurality of notifications in the first configuration, including displaying a visual representation (e.g., icon) of the first mode for displaying notifications. In some embodiments, the first mode for displaying notifications is a normal mode of the computer system (e.g., and notifications are not suppressed in accordance with settings of the normal mode of the computer system), and in accordance with a determination that the computer system has the first mode for displaying notifications enabled, the computer system displays the plurality of notifications in the first configuration without displaying a visual representation of the first mode for displaying notifications.

In some embodiments, the second mode is a reduced notification mode (e.g., a Do Not disturb mode or focus mode). A reduced notification mode can be associated with different contexts (e.g., a productivity mode, a social mode, a sleep mode, and/or an exercise mode), and can have a whitelist (e.g., or different whitelists, depending on the corresponding context) that lists users and/or applications from which notifications are allowed to "break through" the reduced notification mode. While active, a reduced notification mode causes the device to at least partially block notifications that are not whitelisted for that particular reduced notification mode.

For example, a notification that is whitelisted for an active reduced notification mode will be displayed and the user will be notified of its arrival by a sound and/or a haptic alert. In contrast, a notification that is not whitelisted for the active reduced notification mode will be displayed without a sound or haptic alert (or will not be provided at all while the particular reduced notification mode is active). Thus, a user can, for example, set the device to a productivity mode at work and not be distracted by social media (e.g., as shown in FIG. 7B), or can set the device to a social mode at home to avoid being bothered by work emails (e.g., as shown in FIG. 7C).

For example, in FIGS. 7B and 7C, FIG. 7B shows the representation 7000 includes a "Work" indicator 7022 corresponding to an active "Work" mode, and FIG. 7C shows a "Personal" indicator 7026 corresponding to an active "Personal" mode. Displaying a visual representation of the second mode for displaying notifications provides improved visual feedback to the user (e.g., improved visual feedback regarding the currently active mode for displaying notifications).

In some embodiments, the computer system displays (12036) the representation of the plurality of notifications with the second configuration, detects occurrence of a second event at a first time. In response to detecting the occurrence of the second event, the computer system displays a notification corresponding to the second event (e.g., in a fourth region different from the first region and the second region) separately from the representation of the plurality of notifications. In accordance with a determination that a threshold amount of time (e.g., 30 seconds, 1 minute, 5 minutes, or 10 minutes) has passed since the first time, the computer system displays the notification corresponding to the second event with the representation of the plurality of notifications in the second configuration. In some embodiments, recent notifications are displayed separately (e.g., in a different region from) the representation of the plurality of notifications (e.g., in the first or second region), for increased visibility. After the threshold amount of time has passed (e.g., the notification is no longer considered recent), the notification is included in the plurality of notifications (e.g., collapses into or is coalesced with the representation of the plurality of notifications). For example, in FIG. 7O, the notification 7050 has just been received or generated, and so the notification 7050 is displayed separately from the representation 7000. In FIG. 7P, after a threshold amount of time, the notification 7050 is displayed with the representation 7000. Displaying a notification corresponding to the second event separately from the representation of the plurality of notifications, and displaying the notification corresponding to the second event with the representation of the plurality of notifications in the second configuration after a threshold amount of time has passed, provides improved visual feedback to the user (e.g., improved visual feedback regarding whether the notification corresponding to the second event was recently received or generated).

In some embodiments, the computer system detects (12038) a third user input at a location corresponding to the representation of the plurality of notifications. In response to detecting the third user input, in accordance with a determination that the third user input meets third criteria (e.g., the third user input is a tap, a long press, an upward swipe, or a pinch gesture), and in accordance with a determination that the representation of the plurality of notifications is displayed in the second configuration, the computer system transitions to displaying the representation of the plurality of notifications in a third configuration that is different from the first configuration and the second configuration. In some embodiments, the third configuration is the same as the first configuration. In some embodiments, the first configuration is a regular or default configuration, the second configuration is a condensed, minimized, or reduced prominence configuration, and the third configuration is an intermediate configuration (e.g., the third configuration is less condensed, less minimized, or has increased prominence relative to the second configuration, but more condensed, more minimized, or reduced prominence relative to the first configuration). For example, in FIGS. 7R, 7S, and 7U, in response to detecting depinch gestures, or upward swipe gestures, the portable multifunction device transitions to displaying the representation 7000 in a different configuration (e.g., transitions from the third configuration 7000-*c* to the second configuration 7000-*b* between FIGS. 7R and 7S, and transitions from the second configuration 7000-*b* to the first configuration 7000-*a* between FIGS. 7S and 7U). Transitioning to displaying the representation of the plurality of notifications in a third configuration different from the first configuration and second configuration, in accordance with a determination that the third user input meets third criteria, and in accordance with a determination that the representation of the plurality of notifications is displayed in the second configuration, provides additional control options without cluttering the UI with additional displayed controls (e.g., additional displayed controls for transitioning and/or changing the configuration that the plurality of notifications is displayed in).

In some embodiments, the computer system detects (12040) a fourth user input at a location corresponding to the representation of the plurality of notifications. In response to detecting the fourth user input, in accordance with a determination that the fourth user input meets fourth criteria (e.g., the fourth user input is a downward swipe or a de-pinch gesture), and in accordance with a determination that the representation of the plurality of notifications is displayed in the first configuration, the computer system transitions to displaying the representation of the plurality of notifications in the second configuration. For example, in FIGS. 7G-7H and 7P-7Q, in response to detecting pinch gestures, or downward swipe gestures, the portable multifunction device transitions to displaying the representation 7000 in a different configuration (e.g., transitions from the first configuration 7000-*a* to the second configuration 7000-*b* between FIGS. 7G and 7H, and transitions from the second configuration 7000-*b* to the third configuration 7000-*c* between FIGS. 7P and 7Q). Transitioning to displaying the representation of the plurality of notifications in the second configuration, in accordance with a determination that the fourth user input meets fourth criteria, and in accordance with a determination that the representation of the plurality of notifications is displayed in the first configuration, provides additional control options without cluttering the UI with additional displayed controls (e.g., additional displayed controls for transitioning and/or changing the configuration that the plurality of notifications is displayed in).

In some embodiments, before detecting the first user input, the first user interface includes (12042) a first system user interface (e.g., a system user interface that should always be displayed in certain scenarios, such as a live session, media information and controls, an emergency notification, a time-sensitive notification, an urgent or emergency notification, and/or a contextually relevant system user interface such as a boarding pass) that is displayed separately from the plurality of notifications. In response to detecting the first user input, the computer system maintains display of the first system user interface, separate from the plurality of notifications. In some embodiments, the first system user interface is displayed separate from the plurality of notifications regardless of which configuration the plurality of notifications is displayed with. In some embodiments, the first system user interface is displayed separate from the plurality of notifications regardless of which mode for displaying notifications is enabled for the computer system. For example, in FIGS. 7N-7U, the session 7048 is displayed separate from the representation 7000 (e.g., regardless of which configuration the representation 7000 is displayed in). Maintaining display of the first system user interface, separate from the plurality of notifications, reduces the number of user inputs needed to display and/or interact with the first system user interface (e.g., there is a high probability the user will need to view and/or interact with the first system user interface, if the first system user interface is contextually relevant and/or time-sensitive, and the user does not need to perform additional user inputs to navigate to and/or interact with the first system user interface, when the first system user interface is displayed separate from the plurality of notifications).

In some embodiments, the computer system detects (12044) a fifth user input (e.g., a tap, a swipe, or a long press) at a location corresponding to a respective notification of the plurality of notifications. In response to detecting the fifth user input: in accordance with a determination that the representation of the plurality of notifications is displayed in the first configuration, the computer system performs an operation associated with the respective notification without performing an operation associated with other concurrently displayed notifications (e.g., displaying an application associated with the respective notification or displaying one or more affordances (e.g., including an affordance for opening the notification, an affordance for dismissing the notifications, and/or an affordance for adjusting one or more notification settings for an application associated with the notification) for interacting with the respective notifications); and in accordance with a determination that the representation of the plurality of notifications is displayed in the second configuration, the computer system forgoes performing the operation associated with the respective notification (e.g., forgoing displaying the application associated with the respective notification and/or forgoing display of the one or more affordances for interacting with the respective notification). In some embodiments, a user can only interact with the respective notification while the plurality of notifications is displayed in the first configuration, and cannot interact with the respective notification while the plurality of notifications is displayed with the second configuration (e.g., without first changing the configuration for the plurality of notifications). For example, in FIGS. 7L and 7M, in some embodiments, neither the notification 7004 nor the notification 7006 are available for interaction (e.g., because, or while, the representation 7000 is displayed in the second configuration 7000-*b*). Forgoing display of the one or more affordances for interacting with the respective notification, in accordance with a determination that the representation of the plurality of notifications is displayed in the second configuration, and displaying the one or more affordances for interacting with the respective notification in accordance with a determination that the representation of the plurality of notifications is displayed in the first configuration, provides additional control options without cluttering the UI with additional displayed controls (e.g., the second configuration is a minimalist configuration, and forgoing display of the one or more affordances for interacting with the respective notifications avoid cluttering the UI with the one or more affordances because the user has selected a minimalist configuration).

In some embodiments, the computer system detects (12046) a sixth user input (e.g., a tap, a swipe, or a long press) at a location corresponding to a respective notification of the plurality of notifications. In response to detecting the sixth user input, the computer system performs an operation associated with the respective notification (e.g., displaying an application associated with the respective notification or displaying one or more affordances (e.g., including an affordance for opening the notification, an affordance for dismissing the notifications, and/or an affordance for adjusting one or more notification settings for an application associated with the notification) for interacting with the respective notification). In some embodiments, a user can interact with the respective notification regardless of which configuration the plurality of notifications is displayed with (e.g., the user can interact with the respective notification when the plurality of notifications is displayed in the first configuration, and when the plurality of notifications is displayed in the second configuration). For example, as described above with reference to FIG. 7A, for example, where the user can interact (e.g., via the tap input 7012, the rightward swipe input 7014, or the leftward swipe input 7016) with notifications while the representation 7000 is in the first configuration 7000-*a*. Displaying one or more affordances for interacting with the respective notification, in response to detecting the sixth user input at a location corresponding to a respective notification of the plurality of notifications, provides additional control option without cluttering the UI with permanent display of certain controls (e.g., the one or more affordances for interacting with the respective notification).

In some embodiments, the computer system detects (12048) a seventh user input (e.g., a tap, a swipe, or a long press) at a location corresponding to a respective notification of the plurality of notifications. In response to detecting the seventh user input: in accordance with a determination that a threshold amount of the respective notification is visible while the representation of the plurality of notifications is displayed in the second configuration, the computer system performs an operation associated with the respective notification without performing an operation associated with other concurrently displayed notifications (e.g., displaying an application associated with the respective notification or displaying one or more affordances (e.g., including an affordance for opening the notification, an affordance for dismissing the notifications, and/or an affordance for adjusting one or more notification settings for an application associated with the notification) for interacting with the respective notification); and in accordance with a determination that less than the threshold amount of the respective notification is visible while the representation of plurality of notifications is displayed in the second configuration, the computer system forgoes performing the operation associated with the respective notification. For example, in FIGS. 7J-7L, the notification 7004 (e.g., which is fully visible) is available for interaction (e.g., as shown in FIG. 7K), but in some embodiments, the notification 7006 (e.g., for which the threshold amount is not visible) is not available for interaction. Displaying one or more affordances for interacting with the respective notification in accordance with a determination that a threshold amount of the respective notification is visible while the representation of the plurality of notifications is displayed in the second configuration, and forgoing display of the one or more affordances for interacting with the respective notification in accordance with a determination that less than the threshold amount of the respective notification is visible while the representation of the plurality of notifications is displayed in the second configuration, provides additional control options without cluttering the UI with permanently displayed controls (e.g., without permanently displaying the one or more affordances for interacting with the respective notification, particularly if the relevant notification is not sufficiently visible).

In some embodiments, in accordance with a determination that less than the threshold amount of the respective notification is visible while the plurality of notifications is displayed with the second configuration, the computer system scrolls (12050) the notifications in the plurality of notifications in the third region of the first user interface, wherein scrolling the notifications includes displaying at least the threshold amount of the respective notification. In some embodiments, displaying the plurality of notifications in the second configuration includes displaying the plurality of notifications are displayed in a stack of notifications, and scrolling the notifications in the plurality of notifications includes displaying the respective notification at the top of the stack of notifications. Stated differently, in some embodiments, the computer system responds differently to the same input depending on how much of the respective notification (e.g., over which the input is received) is displayed. For example, in FIGS. 7L and 7M, in response to the tap input 7044 (e.g., and because the threshold amount of the notification 7006 is not visible), the portable multifunction device 100 scrolls notifications (e.g., so that the threshold amount of the notification 7006 is visible, as shown by the notification 7006 being fully visible in FIG. 7M). Scrolling notifications in the plurality of notifications in the third region, to display at least a threshold amount of a respective notification, in accordance with a determination that less than the threshold amount of the respective notification is visible while the plurality of notifications is displayed in the second configuration, automatically scrolls a notification to a position for user interaction in response to a user input at a location corresponding to the notification, without requiring further user input (e.g., a user input to first scroll the notifications in the plurality of notifications, before the user can request that the computer system display the one or more affordances for interacting with the notification).

It should be understood that the particular order in which the operations in FIGS. 12A-12E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1000, 1100, 1300, 14000, 15000, 16000, and 17000) are also applicable in an analogous manner to method 12000 described above with respect to FIGS. 12A-12E. For example, the contacts, gestures, and user interface objects,—described above with reference to method 14000 optionally have one or more of the characteristics of the contacts, gestures, and user interface objects, described herein with reference to other methods described herein (e.g., 900, 1000, 1100, 1300, 14000, 15000, 16000, and 17000). For brevity, these details are not repeated here.

FIGS. 13A-13G are flow diagrams illustrating method 1100 of displaying status information in a session region based on subscriptions in accordance with some embodiments. Method 1300 is performed (1302) at a computer system (e.g., device 300, FIG. 3, or portable multifunction device 80, FIG. 1A) that is in communication with a display generation component (e.g., a hardware element, comprising one or more display devices, such as a display, a projector, a touch-screen display, a heads-up display, a head-mounted display, or the like) (and optionally, the computer system is further in communication with one or more input devices, one or more cameras, and/or one or more 3D sensing and/or determination devices, such as lidars, depth sensors, and/or distance sensors) Some operations in method 1300 are, optionally, combined and/or the order of some operations is, optionally, changed.

Displaying, at a consistent location on a particular user interface such as a wake screen user interface, updates for active application events enables the user to view different types of status information for the computer system quickly, thereby reducing an amount of time needed to perform a particular operation on the device.

The computer system detects (1304) one or more inputs (e.g., inputs directed to the first application and inputs directed to the second application; and/or inputs directed to a subscription interface that lists both events from the first application and events from the second application) to subscribe to updates from a first application for a first event, and to subscribe to updates from a second application for a second event (e.g., optionally, the first application is different from the second application, and/or the first event is different from the second event). For example, user input 808 (FIG. 8A) and user input 812 (FIG. 8C) correspond to requests to subscribe to a food delivery event, and user inputs 826 and 828 (FIG. 8L) correspond to requests to subscribe to two sports events. In some embodiments, the first event and the second event are not subscribed to at the same time. In some embodiments, the first event and the second event do not overlap in time. In some embodiments, the first event and the second event are both subscribed to during a first period of time, but the first event and the second event do not overlap in time. In some embodiments, the first event and the second event overlap in time for some portions of the two events, but they do not start and/or end at the same time. In some embodiments, the first and second applications are the same application and the first event is distinct from the second event. In some embodiments, the first application and second application are distinct applications. In some embodiments, the first event is a sporting event (e.g., with updates for starting time, score updates, interruptions, intermissions, and/or final score). In some embodiments, the first event is a delivery event (e.g., for food, for online purchases, and/or for express mail) (e.g., with updates for pickup, enroute, arrival, and/or expected delays). In some embodiments, the first event is a ride share event (e.g., with updates for estimated arrival time, arrival, pickup, intermediate stops, and/or drop off). In some embodiments, after a user subscribes to updates from the first application, additional events (e.g., that are related to the first event) are also automatically subscribed to. For example, when a user subscribed to an event corresponding to a first game for a first sport team, the computer system automatically subscribes another event corresponding to a second game for the first sport team.

The computer system displays (1306) a first user interface (e.g., a user interface that corresponds to a restricted state of the computer system, such as a wake screen user interface and/or a lock screen user interface). The first user interface includes a first region at a first location in the first user interface (e.g., a region directly below the time indication of the wake screen user interface, or a region in the bottom portion of the wake screen user interface). Displaying the first user interface includes: in accordance with a determination that the first event is active (e.g., ongoing and providing updates, and/or has not ended) and that the second event is not active (e.g., not providing updates, and/or has not started), displaying a first representation of the first event in the first region of the first user interface, and updating first information contained in the first representation of the first event in accordance with updates received from the first application for the first event (e.g., updating the information is made substantially in real-time of receipt of the updates for the first event). In some embodiments, while displaying the first user interface, in accordance with a determination that the first event is no longer active (e.g., the event has ended) or the user has unsubscribed the first event, the computer system ceases to display the first representation of the first event in the first user interface. For example, session 816-1 is displayed in a session region of wake screen user interface 800 (FIG. 8D) while the food delivery session is ongoing, and is no longer displayed (FIG. 8J) after the event has concluded (e.g., the food is delivered).

Displaying the first user interface includes: in accordance with a determination that the second event is active (e.g., ongoing and providing updates, and/or has not ended) and that the first event is not active (not providing updates, and/or has not started), displaying a second representation of the second event in the first region of the first user interface, and updating second information contained in the second representation of the second event in accordance with updates received from the second application for the second event (e.g., updating the information is made substantially in real-time of receipt of the updates for the second event). In some embodiments, a third subscribed event is active concurrently with the second event, and a third representation of the third event is displayed in a second region of the first user interface concurrently with display of the second representation displayed in the first region of the first user interface. In some embodiments, the first region of the first user interface does not include a user interface object when there is no subscribed events, or when no subscribed events are currently active. For example, in FIG. 8N, session 830-1 for a first sports game (e.g., Golden State vs Chicago) is active, and displayed in user interface 800, but the second sports game to which the user subscribed (e.g., via user input 828, FIG. 8L) is not currently active, and thus a session is not displayed for the second sports game in user interface 800. In FIG. 8Z a third event (e.g., session 864-1) is active concurrently with the first event (e.g., session 830-5). In some embodiments, session 864-1 is displayed in a second portion of the session region concurrently with session 830-5 that is displayed in a first portion of the session region.

In some embodiments, the first user interface is (1308) a wake screen user interface (e.g., the user interface that is initially displayed when the display generation component transitions from a power saving mode (e.g., a display off state, or a dimmed always on state) to a normal mode in response to an event (e.g., arrival of a notification, a press input on the power button or touch screen, and/or a change in an orientation of the display generation component)); the first representation of the first event is displayed in the first region while the first event is active; and the second representation of the second event is displayed in the first region of the wake screen user interface while the second event is active. For example, while the sports game Golden State vs Chicago is ongoing, session 830-1 for the game is displayed in the session region of wake screen user interface 800 (FIG. 8N). In some embodiments, while the first and second event are concurrently active, both the first and the second representations are displayed concurrently (e.g., with the representation of the event that started earlier displayed in the first region, and the representation of the event that started later displayed below the first region). In some embodiments, a representation of a respective event is only displayed while the respective event is active and automatically disappears in accordance with a determination that the respective event has ended (e.g., delivery arrived, game is over, or workout is over). In some embodiments, the representation of the event that started earlier and ended earlier is removed from the first region, and then the representation of the event that started later and ended later is moved to the first region once it has been vacated by the representation of the earlier event. Displaying updates for active application events in a wake screen user interface enables the user to view different types of status information for the computer system quickly, prior to navigation to another user interface such as a home user interface, and optionally without requiring user authentication, thereby reducing an amount of time needed to view the status information.

In some embodiments, while the first event is active (1310): at a first time, the computer system displays the wake user interface with the first representation of the first event in the first region of the wake user interface; at a second time after the first time, the computer system ceases display of the wake user interface (e.g., and optionally, ceases to display the first representation of the first event) in response to detecting that a first condition is met (e.g., in response to the display generation component transitioning into a power saving mode after prolonged inactivity and/or a press input on the power button, or in response to navigation to another user interface (e.g., home user interface and/or widget screen user interface)); and at a third time after the second time, in response to detecting that a second condition is met, the computer system redisplays the wake user interface with the first representation of the first event in the first region of the wake user interface. For example, in some embodiments, the respective representation of a respective subscribed event is persistently displayed on the wake user interface, as long as the respective event is still active and receiving updates, even if the wake user interface has been dismissed one or more times (e.g., display is turned off or dimmed, and/or other user interfaces has replaced display of the wake user interface) while the respective event is active. For example, in FIG. 8P, session 830-2 is displayed for the sports event, before detecting user input 856 (FIG. 8X) for putting device 100 into a low-power state. After the device has entered the low-power state, and comes out of the low-power state, session 830-4 (FIG. 8Y) for the sports event continues to be displayed in the session region of the wake screen user interface 800. Displaying, in a wake screen user interface, updates for active application events, including when the wake screen user interface is redisplayed after being dismissed or turned off, enables the user to view different types of status information for the computer system quickly, thereby reducing an amount of time needed to view the status information.

In some embodiments, while the first event is active (1312): at a fourth time, the computer system displays the first user interface with the first representation of the first event in the first region of the first user interface, wherein the first user interface does not include notifications; and at a fifth time later than the fourth time, the computer system redisplays one or more notifications (e.g., displays notification history including one or more previously saved notifications, and/or displaying newly received and/or unread notifications) in the first user interface (e.g., the wake screen user interface, the lock screen user interface, or a blurred and/or dimmed version of the wake user interface or lock user interface) in response to a third condition being met (e.g., arrival of new notifications, and/or a user input that corresponds to a request to display the notification history), and maintains display of the first representation of the first event in the first user interface (e.g., in the first region of the first user interface, or in a second region of the first user interface different from the first region of the first user interface (e.g., scrolled upward from the first region)). For example, in FIG. 8N, session 830-1 is displayed in the session region of the wake screen user interface without notifications, and in FIG. 8O, a plurality of notifications (e.g., notifications 806-7 and 806-8) are displayed concurrently with session 830-2. In some embodiments, notifications are displayed in a distinct region of the first user interface (e.g., below the first region). For example, the first region that displays the ongoing event is a dedicated region that is distinct from the region(s) that display notifications. In some embodiments, notifications are scrollable and may shift underneath the first region that displays the first representation of the first event. In some embodiments, the first representation of the first event scrolls with the notifications in a direction of a swipe input when the swipe input (e.g., an upward swipe) is detected on the notifications. In some embodiments, when notifications are dismissed, cleared, or saved, the notifications cease to be displayed in the first user interface, while the first representation of the first event is persistently displayed in the first user interface as long as the first event is still active, as described with reference to FIGS. 8P-8Q. In some embodiments, while the notifications are displayed in the first user interface, in accordance with a determination that the first event has ended, the computer system ceases to display the first representation of the first event and continues to display the notifications on the first user interface. Displaying updates for active application events in a user interface that is also occasionally updated to include one or more notifications enables the user to view different types of status information for the computer system together in the same user interface, thereby reducing an amount of time needed to view the status information while making more efficient use of the display area.

In some embodiments, while the first event is active (1314): at a sixth time, the computer system displays the first user interface with the first representation of the first event in the first region of the wake user interface; and at a seventh time after the sixth time: the computer system replaces display of the first user interface with display of a second user interface that includes a plurality of application icons that, when selected, cause display of corresponding applications (e.g., the second user interface is one of a home screen user interface, an application launch user interface, and/or a widget screen). In some embodiments, in response to detecting that a fourth condition is met (e.g., in response to detecting a upward swipe input from a bottom edge of the display region of the display generation component, a press on a home button, or a rightward swipe from the left edge of the display region), the computer system replaces display of the first representation of the first event in the first region of the first user interface with display of a third representation of the first event (e.g., a reduced representation as compared to the first representation) (e.g., a bubble, or pill shaped user interface object that includes less information than the first representation of the first event) in a second region of the second user interface (e.g., in one of the upper left corner, upper right corner, and/or a screen cutout region). For example, as described with reference to FIGS. 8Q-8R, session 830-3 displayed on the wake screen user interface 800 is shifted to a session region 838-1 in FIG. 8R while displaying the home screen user interface 805. For example, in some embodiments, the respective representation of a respective subscribed event is transformed into a reduced representation that is persistently displayed on the display, as long as the respective event is still active and receiving updates, even if the first user interface has been dismissed one or more times and replaced with display of another user interface, such as the home screen user interface, the widget screen user interface, and/or a notification center user interface. Displaying updates for active application events in a home user interface reduces the number of inputs and the amount of time needed to view current status information for aspects of the computer system even without otherwise displaying user interfaces of the active applications.

In some embodiments, detecting the one or more inputs to subscribe to updates from the first application for the first event includes (1316): while displaying a first notification corresponding to the first application (e.g., while the first notification is displayed on the first user interface) (e.g., optionally, the first notification is regarding a first update from the first event), detecting a first set of inputs directed to the first notification, wherein the first set of inputs meet respective criteria for subscribing to updates from the first application for the first event. In some embodiments, the first set of inputs include one or more inputs from: an input causing display of a selectable option for subscribing to the first event, an input selecting the selectable option for subscribing to the first event, and/or an input confirming subscription to the first event. For example, in FIGS. 8B-8C, user inputs 810 and 812 cause the device 100 to subscribe to the food delivery event from notification 804. Enabling a user to subscribe to updates from a respective active application by directing one or more inputs to a notification corresponding to the respective application reduces the number of inputs needed to pin and view status information for the computer system.

In some embodiments, detecting a first set of inputs directed to the first notification includes (1318) detecting selection of a first affordance displayed with the first notification. For example, in FIG. 8A, user input 808 selects the "Subscribe" option 802 from notification 804. In some embodiments, the first affordance is a button displayed on the first notification (e.g., automatically based on a determination that the notification is a type of notification associated with repeated future updates). In some embodiments, the first affordance is displayed next to the first notification (e.g., the first notification shifts in response to a user input (e.g., a touch-hold input on the first notification, or a sideways swipe on the first notification) and the first affordance is revealed where the first notification is shifted away from). In some embodiments, the first affordance is displayed in a menu of affordances (e.g., for dismissing the first notification, for opening an application associated with the first notification, and/or for storing the first notification in a notification history). Enabling a user to subscribe to updates from a respective active application by selecting an affordance for doing so that is displayed with a notification corresponding to the respective application reduces the number of inputs needed to pin and view status information for the computer system.

In some embodiments, detecting (1320) the one or more inputs to subscribe to updates from the second application for the second event includes: while displaying one or more search results (e.g., search results including content from the computer system, and/or content from outside of the computer system) corresponding to a search input (e.g., one or more search keywords), including a first search result that corresponds to the second application (e.g., the first search result includes at least one of an application icon for the second application, content from the second application (e.g., text message from a messaging application), and/or a widget corresponding to the second application), detecting a second set of inputs directed to the first search result, wherein the second set of inputs meet respective criteria for subscribing to updates from the second application for the second event. In some embodiments, the second set of inputs includes one or more inputs selected from: an input causing display of a selectable option for subscribing to the second event, an input selecting the selectable option for subscribing to the second event, and/or an input confirming subscription to the second event. In some embodiments, the first event of the first application can also be subscribed from a search result that corresponds to the first application in a manner analogous to those described above with respect to the second event of the second application. For example, as described with reference to FIG. 8V-8X, the user subscribes to a workout and/or health application from a search result. Enabling a user to subscribe to updates from a respective active application by directing one or more inputs to a search result that corresponds to the respective application reduces the number of inputs and amount of time needed to locate the respective application and pin and view corresponding status information using the computer system.

In some embodiments, while displaying a respective user interface of a third application (e.g., same as the first application, same as the second application, different from the first application, and/or different from the second application), the respective user interface including a respective affordance for subscribing to updates from the third application for a third event, the computer system detects (1322) selection of the respective affordance for subscribing to updates from the third application for the third event. In accordance with a determination that the third event is active, the computer system displays a third representation of the third event in the first region of the first user interface (e.g., when the first event and the second event are not active), and updates information contained in the third representation of the third event in accordance with updates received from the third application for the third event. In some embodiments, the first event of the first application and/or the second event of the second application can also be subscribed respectively from the first application and/or the second application in a manner analogous to those described above with respect to the third event of the third application. For example, the device subscribes to one or more sports events from user interface 803 (FIG. 8L) for the sports application in response to user inputs 826 and 828. Enabling a user to subscribe to updates from a respective active application by selecting an affordance for doing so that is displayed within a user interface of the respective application reduces the number of inputs and amount of time needed to pin and view status information for the computer system.

In some embodiments, in accordance with a determination that a user of the computer system has enabled an option for automatic subscription, the computer system automatically subscribes (1324) to updates from a fourth application for a fourth event in response to detecting that a fifth condition (e.g., a new event corresponding to the option for automatic subscription has been created) has been met. For example, the user selects, for a particular application, to subscribe to all events, or a subset of events, for the application; and after the selection, the computer system automatically subscribes to any new events that are created for the application without requiring further user inputs. For example, the user selects to subscribe to a subset of events from a sports application, the subset of events corresponding to a first team participating in the event, and/or the user selects to subscribe to a subset of a certain type of events (e.g., basketball games, but not football games, or sports games that occur at a selected location (or set of locations) or include a selected team (or set of teams) but not sports games that do not occur at a selected location and/or do not include a selected team), and when a new game event for the first team and/or when a new instance of the certain type of events becomes available (e.g., not yet active) in the particular application, the computer system automatically subscribes to the new game event and/or the new instance of the certain type of events without requiring further user inputs specifically directed to the new game event or the new instance. In some embodiments, the user selects to subscribe to all events for a particular application, for example, a plurality of (e.g., most or all) rideshare requests and/or a plurality of (e.g., most or all) food deliveries, are automatically subscribed to such that upon initiation of a new rideshare and/or food delivery event, the status of the new event is updated in the first region of the first user interface. For example, as described with reference to FIG. 8AE, the device enables and/or disables automatic subscription for an event in accordance with a state of the toggle option 880 and in response to a user input changing the toggle state of the toggle option 880 (e.g., for future rides in the rideshare application). Enabling a user to configure the computer system to automatically subscribe to updates from a respective active application reduces the number of inputs and amount of time needed to pin and view status information for the computer system.

In some embodiments, in accordance with a determination that past user behavior meets one or more subscription criteria, the computer system automatically subscribes (1326) to updates from a fifth application for a fifth event. In some embodiments, the user does not always need to actively select to subscribe to events from an application. For example, the computer system determines that the user has elected to subscribe to a threshold number of events (of a certain type, or from a certain application) and automatically subscribes the user, without additional user input, to future events that satisfy similarity criteria to the events that the user has previously subscribed. For example, the computer system determines that the user tends to follow sports events for a first sports team, and automatically subscribes the user to future events for the first sports team. In some embodiments, the computer system learns from user feedback for automatic subscribed events and determines whether to continue to automatically subscribe to similar events. For example, as described with reference to FIG. 8AE, in some embodiments, the computer system automatically subscribes the user to particular events based on the user's past behavior (e.g., past subscriptions). Automatically subscribing to updates from a respective active application based on past user behavior causes the device to automatically pin and view status information for the computer system that is likely to be of interest to the user without requiring additional user input.

In some embodiments, the first application is (1328) a rideshare application and the first event is an instance of a respective ride requested in the rideshare application. The first information contained in the first representation of the first event that is updated in accordance with updates received from the first application for the first event includes location information of the respective ride requested in the rideshare application. In some embodiments, the first information includes a distance and/or other indication of location of the hailed ride, optionally displayed in a map. In some embodiments, the first information includes an approximate time until the hailed ride arrives. In some embodiments, the first information includes information about a drop off location (e.g., a distance, time and/or route to a drop off location), that is displayed while the user is riding in the hailed ride. In some embodiments, the second application is a rideshare application and the second event is an instance of a respective ride requested in the rideshare application; and the second information contained in the second representation of the second event that is updated in accordance with updates received from the second application for the second event includes location information of the respective ride requested in the rideshare application. For example, FIGS. 8AC-8AF illustrate an example of initiating a session for a rideshare application, wherein session 884-1 for the rideshare application is displayed in the wake screen user interface 800. Enabling a user to subscribe to updates from an active rideshare application, which are displayed at a consistent location within another user interface such as a wake screen user interface, reduces the number of inputs and amount of time needed to view current, potentially time-sensitive status information for the computer system while making more efficient use of the display area.

In some embodiments, the first application is (1330) a delivery application (e.g., a food or package delivery application) and the first event is an instance of a respective delivery requested in the delivery application. The first information contained in the first representation of the first event that is updated in accordance with updates received from the first application for the first event includes delivery information of the respective delivery requested in the delivery application. In some embodiments, the first information includes a distance and/or other indication of time of arrival of the requested delivery, optionally displayed in a map. In some embodiments, the second application is a delivery (e.g., food or package delivery) application and the second event is an instance of a respective delivery requested in the food delivery application; and the second information contained in the second representation of the second event that is updated in accordance with updates received from the second application for the second event includes delivery information of the respective delivery requested in the delivery application. For example, as described with reference to FIGS. 8A-8I, in some embodiments, the user subscribes to a food delivery event. Enabling a user to subscribe to updates from an active delivery application, which are displayed at a consistent location within another user interface such as a wake screen user interface, reduces the number of inputs and amount of time needed to view current, potentially time-sensitive status information for the computer system while making more efficient use of the display area.

In some embodiments, the second application is (1332) a sports application (e.g., an application associated with a particular sport, a video application that includes sports game videos, and/or a news application that includes sports game news) and the second event is an instance of a game reported by the sports application. The second information contained in the second representation of the second event that is updated in accordance with updates received from the second application for the second event includes score information for the instance of the game. In some embodiments, the second information includes a time indicator (e.g., time remaining in a quarter or a half), in the game. In some embodiments, the score information includes updated scores for each team participating in the instance of the game. In some embodiments, the first application is a sports application and the first event is an instance of a game reported by the sports application; and the first information contained in the first representation of the first event that is updated in accordance with updates received from the first application for the first event includes score information for the instance of the game. For example, session 830-1 (FIG. 8N) is a session for a basketball game associated with a sports application. Enabling a user to subscribe to updates from a sports application that include score information for a game or other sporting event being reported by the sports application, and displaying the updates at a consistent location within another user interface such as a wake screen user interface, reduces the number of inputs and amount of time needed to view current status information for the computer system that is of interest to the user while making more efficient use of the display area.

In some embodiments, the second application is (1334) a workout application and the second event is an instance of a workout logged by the workout application. The second information contained in the second representation of the second event that is updated in accordance with updates received from the second application for the second event includes activity information for the instance of the workout. In some embodiments, the activity information includes a pace of an activity (e.g., a running and/or walking pace). In some embodiments, the activity information includes an indication of a length of time of the activity. In some embodiments, the activity information includes an indication of distance covered in the activity (e.g., mileage). In some embodiments, the activity information includes an indication of a location of the activity (e.g., a path taken during the activity). In some embodiments, the first application is a workout application and the first event is an instance of a workout logged by the workout application; and the first information contained in the first representation of the first event that is updated in accordance with updates received from the first application for the first event includes activity information for the instance of the workout. For example, session 864-1 (FIG. 8Z) is a session for a workout associated with a workout and/or health application. Enabling a user to subscribe to updates from a workout application that include activity information for a workout being logged by the workout application, and displaying the updates at a consistent location within another user interface such as a wake screen user interface, reduces the number of inputs and amount of time needed to view current, potentially time-sensitive status information for the computer system that is of interest to the user while making more efficient use of the display area.

In some embodiments, while displaying the first user interface (e.g., while displaying the first user interface after the initial display of the first/second representation of the first/second event): in accordance with a determination that the first representation of the first event is currently displayed in the first region of the first user interface (e.g., the first representation of the first event has been updated one or more times based on updates received from the first application for the first event): in accordance with a determination that the first event is still active, the computer system maintains (1336) display of the first representation of the first event in the first region of the first user interface (and optionally, continuing to update the first representation based on future updates received from the first application for the first event); and in accordance with a determination that the first event is no longer active (e.g., after the last update has been received and represented in the first representation of the first event), ceases display of the first representation of the first event in the first region of the first user interface. For example, in FIGS. 8Y-8Z, the basketball game associated with session 830 is still active, and the session remains displayed in the wake screen user interface 800, and in FIG. 8AK, the basketball game is over and the session 830 is no longer displayed. In some embodiments, while displaying the first user interface: in accordance with a determination that the second representation of the second event is currently displayed in the first region of the first user interface: the computer system, in accordance with a determination that the second event is still active, maintains display of the second representation of the second event in the first region of the first user interface; and the computer system, in accordance with a determination that the second event is no longer active, ceases display of the second representation of the second event in the first region of the first user interface. In some embodiments, the computer system automatically, without user input, ceases display of the representation of an event after the event ends. In some embodiments, a final status is provided before ceasing display of the representation of the event. For example, the computer system displays "delivered" for a delivery event and maintains display of the final status for a predetermined amount of time (e.g., 30 seconds, 1 minute, or 5 minutes) before automatically removing the status and the representation of the event, without requiring the user to request to clear the status and the representation of the event from the first user interface. When displaying a status region that is updated with status information for an active event, ceasing to display the status region when the event is no longer active causes the device to automatically reduce the number of displayed elements when no longer needed.

In some embodiments, while displaying the first user interface (e.g., displaying the first user interface after the initial display of the first/second representation of the first/second event, optionally after navigating to another user interface and/or turning the display off and on again): in accordance with a determination that the first event is inactive (e.g., has ended and/or no longer receiving updates) and a determination that the first representation of the first event was last displayed (e.g., the first event ended at a time after the first user interface was last displayed) or is currently displayed (e.g., the first event ended at a time while the first user interface is displayed) in the first region of the first user interface: in accordance with a determination that a sixth condition is not met (e.g., the sixth condition requires that the first representation of the first event is displayed at least once after the first user interface is dismissed and redisplayed after the first event ended), the computer system displays (1338) the first representation of the first event in the first region of the first user interface, the first representation of the first event including the first information that has been updated in accordance with a first final update received from the first application for the first event; and in accordance with a determination that the sixth condition is met, forgoing displaying the first representation of the first event in the first region of the first user interface. In some embodiments, while displaying the first user interface: in accordance with a determination that the second representation of the second event is currently displayed or was last displayed in the first region of the first user interface, and a determination that the second event is inactive: the computer system, in accordance with a determination that the sixth condition is not met, displays the second representation of the second event in the first region of the first user interface, the second representation of the second event including the second information that has been updated in accordance with a second final update received from the second application for the second event; and the computer system, in accordance with a determination that the sixth condition is met, forgoes displaying the second representation of the second event in the first region of the first user interface. In some embodiments, the sixth condition is satisfied in accordance with a determination that the first user interface (e.g., the wake screen user interface and/or the lock screen user interface) is displayed and dismissed at least once after the first/second event is no longer active (e.g., the user has displayed and then dismissed the wake screen after the first/second event ends such that the device makes the final update for the first/second event on the wake screen user interface (e.g., a location to which an item was delivered or a final score for a sports event) visible to the user for at least once. For example, in FIG. 8I, session 816-6 indicates "Your food has been delivered" and session 816-6 is optionally maintained until the device 100 has entered a low-power state, such that when the device 100 leaves the low-power state, the wake screen user interface 800 no longer displays the final status of session 816-6 (FIG. 8J). Where a status region was updated with status information for an active event, maintaining display of the status region after the event is no longer active until a particular condition (e.g., based on a user viewing the final status of the active event) is met causes the device to automatically ensure that the user is provided with an opportunity to view the final status information and reduce the number of displayed elements when no longer needed.

In some embodiments, while displaying the first user interface: in accordance with a determination that the first event and the second event are both active, the computer system concurrently displays (1340) the first representation of the first event (e.g., in the first region of the first user interface) and the second representation of the second event (e.g., in another region below the first region of the first user interface) in the first user interface. In some embodiments, two or more representations of two or more different events are concurrently displayed in the first user interface if they are active at the same time. In some embodiments, at least one of the concurrently displayed representations of events is an event that has ended, but has not been automatically removed because the condition (e.g., the sixth condition described above) has not been met. For example, FIG. 8AH illustrates a plurality of sessions, including session 830-6, session 888-1, and session 864-4 are concurrently displayed. Concurrently displaying updates for multiple active events causes the device to automatically enable the user to view different types of status information for the computer system at the same time, thereby reducing an amount of time needed to view the status information while making more efficient use of the display area.

In some embodiments, the first application and the second application are (1342) the same application. In some embodiments, the first event and the second event are distinct events for a same application. For example, two or more sports games (e.g., for different teams and/or for different types of sports) are concurrently active, wherein updates for the two or more sports games are optionally retrieved via a same sports application. In some embodiments, two or more deliveries (e.g., food and/or package deliveries) are concurrently active, wherein updates for the two or more deliveries are optionally retrieved via a same sports application. For example, in FIG. 8AH session 830-6 and session 888-1 are both associated with the sports application. Concurrently displaying updates for multiple active events from the same application causes the device to automatically enable the user to view different types of status information for the computer system at the same time, thereby reducing an amount of time needed to view the status information while making more efficient use of the display area.

In some embodiments, the first application is (1344) distinct from the second application. For example, two or more sports games (e.g., for different teams and/or for different types of sports) are concurrently active, wherein a first sports game (e.g., scores and/or timing information) is updated via a first application (e.g., a basketball application or other sports application) and a second sports game is updated via a second application, distinct from the first application (e.g., a baseball application or other sports application). In some embodiments, two or more deliveries (e.g., food and/or package deliveries) are concurrently active, wherein a first delivery (e.g., a food delivery) is updated via a third application, and a second delivery (e.g., a package delivery) is updated via a fourth application distinct from the third application. In some embodiments, the events are not related and/or are not a same type of event. For example, a sports game and a package delivery are concurrently active, and updates for each even are retrieved via distinct applications. For example, in FIG. 8AH session 830-6 is associated with the sports application and session 864-4 is associated with a workout and/or health application. Concurrently displaying updates for multiple active events associated with different applications causes the device to automatically enable the user to view status information for different applications on the computer system at the same time, thereby reducing the number of inputs and amount of time needed to view different types of status information while making more efficient use of the display area.

In some embodiments, while displaying the first user interface (1346): in accordance with a determination that a number of subscribed events that are currently active is fewer than a first threshold number of events (e.g., three, four, or another number), the computer system displays respective representations of the subscribed events in the first user interface in a first manner, wherein the respective representations of the subscribed events displayed in the first manner are concurrently displayed without obscuration (e.g., concurrently and separately without overlap); and in accordance with a determination that the number of subscribed events that are currently active is equal to or greater than the first threshold number of events, the computer system displays the respective representations of the subscribed events in a second manner, wherein one or more representations of the respective representations of the subscribed events displayed in the second manner are obscured (e.g., hidden, and/or stacked) in the first user interface. For example, in FIG. 8AG, the plurality of sessions are collapsed. In some embodiments, one or more of the respective representations of subscribed events are not displayed in the first user interface. In some embodiments, one or more representations of events are stacked and/or partially hidden and/or condensed while displaying the representations for the subscribed events. In some embodiments, the first threshold number of events is four event (e.g., if there are less than four events, all of the representations for all of the events are displayed; if there are four or more events, only three representations are displayed and the other representations are optionally partially displayed (e.g., condensed)). Concurrently displaying updates for a limited number of active events causes the device to automatically enable the user to view status information for different applications on the computer system at the same time without overly crowding the user interface, thereby reducing an amount of time needed to view different types of status information while making more efficient use of the display area.

In some embodiments, while displaying the respective representations of the subscribed events in the second manner, the computer system detects (1348) a respective user input directed to a region of the first user interface that corresponds to the respective representations of the subscribed events; and in response to detecting the respective user input and in accordance with a determination that the respective user input corresponds to a request to expand display of the respective representations of the subscribed events, the computer system displays an expanded view of the respective representations of the subscribed events in which content corresponding to the subscribed events that was previously not displayed is displayed. For example, user input 886 (FIG. 8AG) causes the device 100 to expand the collapsed sessions. While concurrently displaying updates for a limited number of active events in a particular region of the user interface, enabling the user to direct a user input to the particular region to expand display of the region to include more status information about active events and/or status information about more active events causes the device to automatically enable the user to view additional status information for the computer system on request without overly crowding the user interface when not requested, thereby reducing the number of inputs and amount of time needed to view different types of status information while making more efficient use of the display area.

In some embodiments, the computer system detects (1350) a first user input that is directed to the first representation of the first event in the first user interface. In response to detecting the first user input: in accordance with a determination that the first user input is directed to a first portion of the first representation of the first event, the computer system displays a respective user interface for the first application (e.g., navigates to the first application and ceasing display of the first user interface). For example, in response to user input 890 (FIG. 8AH), the device 100 displays user interface 813 (FIG. 8AI) for the workout and/or health application. In accordance with a determination that the first user input is directed to a second portion of the first representation of the first event, the second portion being different from the first portion of the first representation of the first event, the computer system displays an expanded representation of the first event that includes more frequent updates and/or information than the first representation of the first event. For example, user input 890*b* (FIG. 8AH) causes device 100 to display additional information about the workout session 864-4, for example displaying a map indicating a route of the workout (e.g., a running route). In some embodiments, the first portion of the first representation of the first event is the right side of the first representation. In some embodiments, the second portion of the first representation of the first event is the left side of the first representation. In some embodiments, the expanded representation of the first event is a user interface of the first application that is particular to the first event, while the respective user interface of the first application is a user interface that is not dedicated to present information of the first event only but may display information of multiple events and/or provide other functions of the first application. When displaying a status region that is updated with status information for an active event associated with a respective application, displaying a user interface of the respective application in response to a user input directed to a first portion of the status region, versus displaying an expanded view of the status information for the active event in response to a user input directed to a second portion of the status region, enables different operations associated with the status region to be performed without displaying additional controls.

In some embodiments, the computer system detects (1352) a sequence of one or more inputs directed to the first representation of the first event in the first user interface. In response to detecting the sequence of one or more inputs, the computer system ceases to display the first representation of the first event in the first region of the first user interface while maintaining display of the first user interface. In some embodiments, the sequence of one or more inputs is directed to the first representation of the first event and/or to a second representation of a second event displayed in the first region of the first user interface. In some embodiments, in accordance with a determination that the sequence of one or more inputs is directed to the first representation of the first event, ceasing to display the first representation of the first event in the first region of the first user interface while optionally maintaining display of the second representation of the second event. In some embodiments, in accordance with a determination that the sequence of one or more inputs is directed to the second representation of the second event, ceasing to display the second representation of the second event in the first region of the first user interface while optionally maintaining display of the first representation of the first event. For example, FIGS. 8AK-8AN illustrate an example of a user unsubscribing to a session 888. When displaying a status region that is updated with status information for an active event, enabling the user to provide one or more inputs directed to the status region to dismiss or hide the status region causes the device to automatically provide the user with a way to reduce the number of displayed elements when no longer needed.

In some embodiments, detecting the sequence of one or more inputs includes (1354) detecting a second user input that is directed to the first representation of the first event in the first user interface. In response to detecting the second user input: in accordance with a determination that the second user input corresponds to a request to hide the first representation of the first event (e.g., the second user input is a press input or a swipe input), the computer system displays an affordance for hiding the first representation of the first event. For example, in FIG. 8AM, the device 100 provides an option to Mute (e.g., hide) the session 888-3. The computer system detects a third user input selecting the affordance for hiding the first representation of the first event. In response to detecting the third user input selecting the affordance for hiding the first representation of the first event, the computer system ceases to display the first representation of the first event in the first region of the first user interface while maintaining display of the first user interface (e.g., the wake user interface). In some embodiments, the affordance for hiding the first representation of the first event is displayed in an options menu (e.g., as illustrated in FIG. 8AM) that is displayed in response to detecting a swipe input on the first representation and/or in response to detecting a user input corresponding to a request to view the options menu. In some embodiments, the first representation of the first event is removed from the first user interface (e.g., the wake screen) but is still displayed on another user interface (e.g., in a session region on the home screen) and/or in the first application that updates the first event. When displaying a status region that is updated with status information for an active event, enabling the user to request to hide the status region and then displaying an affordance that the user must activate in order for the status region to cease to be displayed causes the device to automatically provide the user with a way to reduce the number of displayed elements when no longer needed while further reducing user mistakes by requiring the user to confirm that the requested operation should be performed.

In some embodiments, while displaying the first representation of the first event or the second representation of the second event in the first user interface, the computer system concurrently displays (1356), in the first user interface, a media control object that includes an indication of a currently playing media item (e.g., name of artist, album, song, and/or album art) and one or more media playback controls (e.g., pause, fast forward, stop, and/or rewind), for example user interface object 862 (FIGS. 8Y-8Z). In some embodiments, the media control object includes one or more of a volume control, a playback progress control, and/or a routing destination indicator indicating the currently used output device. Displaying updates for active application events in a user interface that also includes a media control object that indicates a currently selected or currently playing media item and that provides one or more media playback controls enables the user to view different types of status information for the computer system together in the same user interface, thereby reducing an amount of time needed to view the status information while making more efficient use of the display area.

In some embodiments, while the media control object and one or more notifications are to be displayed concurrently with the first representation of the first event (and, optionally, the second representation of the second event), the first representation of the first event is displayed (1358) between the media control object and the one or more notifications in the first user interface (e.g., the first representation of the first event (and optionally, the second representation of the second event) is displayed below the media control object and above the one or more notifications). For example, in FIG. 8Y, the session 830-4 is displayed between user interface object 862 and the indication of notifications. In some embodiments, while displaying one or more notifications, the computer system detects a user input (e.g., a scroll input or a swipe input) in a first direction, and in response to the user input, a second set of notifications is displayed in the first user interface (e.g., as described with reference to FIGS. 8O-8P), and optionally removes at least one notification from the one or more notifications from display. For example, the device scrolls through the notifications to bring additional notifications onto the display and remove notifications from the display in response to user inputs directed to the currently displayed notifications that correspond to a request to scroll the notifications. In some embodiments, the first representation of the first event is optionally scrolled to a first position in the display (e.g., a top region of the display) and, after moving to the first position, does not continue to scroll in accordance with the user input (e.g., the session region is maintained in the first user interface, even as the user continues scrolling through additional notifications). In some embodiments, a direction of movement of the notifications is based on a direction of the user input (e.g., as the user swipes up, additional notifications are displayed as entering from a bottom of the display and the previously displayed notifications are displayed as sliding off the top of the display and/or as the user swipes down, the additional notifications are displayed as sliding off the bottom of the display and the previously displayed notifications are displayed as sliding back onto the display from the top of the display). In some embodiments, notifications that are moved in the first user interface in accordance with the user input are scrolled under the first representation of the first event, optionally without scrolling the first representation of the first event off of the display. Displaying updates for active application events in a user interface that also includes a media control object that indicates a currently selected or currently playing media item and that provides one or more media playback controls, as well as one or more notifications, enables the user to view different types of status information for the computer system together in the same user interface, thereby reducing an amount of time needed to view the status information while making more efficient use of the display area.

In some embodiments, the computer system detects (1360) a fourth user input directed to a predefined portion (optionally less than all) of the media control object (e.g., a tap input on the cover art included in the media control object). In response to detecting the fourth user input directed to the predefined portion of the media control object, the computer system changes a background of the first user interface from a first background to a second background, wherein the second background is selected based on content in the predefined portion of the media control object (e.g., the album art of the currently playing media item). In some embodiments, the background is selected as a color, or color gradient, that is associated with a visual representation of the currently playing media item (e.g., cover art or other image). For example, user input 866 (FIG. 8Z) is directed to the cover art of the currently playing media item, and in response to user input 866, the device 100 animates a transition to display user interface 800*b* (FIG. 8AB). Enabling a user to direct an input to a predefined portion of a media control object to change a background of the surrounding user interface to coordinate with content in the predefined portion of the media control object makes the content and/or information about the content easier to see, thereby reducing the number of inputs needed to view feedback about a state of the device.

In some embodiments, changing the background of the first user interface from the first background to the second background includes gradually ceasing to display (1362) the first background, as illustrated in FIG. 8AA. In some embodiments, gradually ceasing to display the first background comprises blurring, resizing, and/or fading the first background while expanding the second background. When changing a background of the surrounding user interface to coordinate with content in a media control object, gradually transitioning from the previous background of the surrounding user interface to the new background provides feedback about a state of the device.

In some embodiments, the second background is selected (1364) based on album art for the currently playing media item, as described with reference to FIG. 8AB. Changing a background of the surrounding user interface to coordinate with album art for a currently playing media item in a media control object makes it easier to see information about which media item is currently playing, thereby providing feedback about a state of the device.

In some embodiments, the second background is selected (1366) based on one or more colors (e.g., prominent colors and/or colors that account for more than a threshold percentage of all areas in the content) that are in the content in the predefined portion of the media control object (e.g., the album art of the currently playing media item), as described with reference to FIG. 8AB. In some embodiments, the second background is a visually deemphasized (e.g., blurred or otherwise obscured) version of content associated with the media item. For example, the second background comprises a blurred version of album art and/or a portion of album art. Changing a background of the surrounding user interface to coordinate with colors of content in a media control object makes the content and/or information about the content easier to see, thereby providing feedback about a state of the device.

In some embodiments, the media control object includes (1368) the one or more media playback controls for controlling playback of the currently played media item and content representing the currently played media item. For example, user interface object 862 includes a plurality of controls, including skip forward control selected by user input 868 (FIG. 8Z). In some embodiments, the media control object includes a platter user interface element that includes one or more playback controls. In some embodiments, the one or more playback controls include controls for skipping forward, skipping backward, pausing and/or playing the media item. In some embodiments, the media control object includes an indication of a playback device (e.g., headphones, and/or an external speaker). In some embodiments, while displaying the one or more playback controls in the media control object, the computer system detects a user input (e.g., a tap input or other selection input) selecting a first control of the one or more playback controls. In some embodiments, in response to detecting the user input selecting the first control, the computer system performs an operation corresponding to the first control. For example, the user input selects a pause affordance, and in response to the user input, the computer system pauses the currently played media item, and/or the user input selects a skip affordance, and in response to the user input, the computer system ceases playing the current media item and plays a next media item. Displaying, in the media control object, one or more controls for controlling playback of the currently selected or currently playing media item in addition to other content reduces the number of inputs needed to perform operations associated with media playback.

It should be understood that the particular order in which the operations in FIGS. 13A-13G have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1000, 1100, 12000, 14000, 15000, 16000, and 17000) are also applicable in an analogous manner to method 1300 described above with respect to FIGS. 13A-13G. For example, the contacts, gestures, user interface objects and animations described above with reference to method 1300 optionally have one or more of the characteristics of the contacts, gestures, user interface objects and animations described herein with reference to other methods described herein (e.g., methods 900, 1000, 1100, 12000, 14000, 15000, 16000, and 17000). For brevity, these details are not repeated here.

FIGS. 14A-14G are flow diagrams illustrating method 14000 for changing between different configurations in which a representation of a plurality of notifications can be displayed, in accordance with some embodiments. Method 14000 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 14000 are, optionally, combined and/or the order of some operations is, optionally, changed.

As described below, method 14000 is a method for changing between different configurations in which a representation of a plurality of notifications can be displayed, thereby providing the user with an intuitive way to adjust how notifications are displayed based on different circumstances (e.g., based on whether the user is currently at work or at home, based on how many notifications are available for display, and/or based on aesthetic preferences of the user), which provides additional control options without cluttering the user interface with additional displayed controls.

The method 14000 is performed at a computer system with a display component and one or more input devices. While displaying a wake user interface (e.g., a wake screen user interface) that includes a representation of a first plurality of notifications in a first configuration, wherein the wake user interface is a user interface that is displayed when the computer system wakes from a low power state (e.g., a reduced power state or an off state), the computer system detects (14002), via the one or more input devices, a first user input. In response to detecting (14004) the first user input, and in accordance with a determination that the first user input meets first criteria, the computer system displays (14006) the representation of the first plurality of notifications in a second configuration on the wake user interface, wherein the second configuration is different from the first configuration. In response to detecting the first user input, and in accordance with a determination that the first user input does not meet the first criteria, the computer system maintains (14008) display of the representation of the first plurality of notifications in the first configuration on the wake user interface. After detecting the first user input, the computer system detects (14010) an occurrence of a condition (e.g., a user input corresponding to a request to display the wake user interface such as the user pressing a button to put the device to sleep and then wake the computer system, the computer system authentication expiring, the computer system timing out due to a lack of detected user input for at least a threshold period of time, the user sliding down notification center over an application user interface or a home user interface) that causes the computer system to redisplay the wake user interface. In response to detecting (14012) the occurrence of the condition that causes the computer system to redisplay the wake user interface, in accordance with a determination that the first user input met the first criteria, the computer system displays (14014) a representation of a second plurality of notifications in the second configuration. In some embodiments, the second plurality of notifications includes at least one notification (e.g., a new notification) that is not in the first plurality of notifications. In some embodiments, the second plurality of notifications is the same as the first plurality of notifications. In response to detecting the occurrence of the condition that causes the computer system to redisplay the wake user interface, in accordance with a determination that the first user input did not meet the first criteria, the computer system displays (14016) the representation of the second plurality of notifications in the first configuration.

In some embodiments, after detecting the first user input, and before detecting the occurrence of the condition that causes the computer system to redisplay the wake user interface, the computer system detects (14018) occurrence of a first event. In response to detecting the occurrence of the condition that causes the computer system to redisplay the wake user interface, and in accordance with a determination that the first user input met the first criteria, the computer system displays the representation of the second plurality of notifications in the second configuration, wherein the second plurality of notifications includes a notification for the first event.

In some embodiments, the second plurality of notifications includes notifications that were received between when the first user input was detected and when the device is woken. For example, a user performs a first user input that meets the first criteria, and in response, the computer system displays the first plurality of notifications with the second configuration (e.g., the user configures the computer system to display notifications with the second configuration). The computer system then receives a new notification. When the wake screen user interface for the computer system is next displayed, the computer system displays the second plurality of notifications (which includes the first plurality of notifications along with the new notification) in the second configuration. Stated differently, configuring the computer system to display notifications with a particular configuration is persistent (e.g., the computer system displays notifications with the particular configuration until the user reconfigures the computer system to display notifications with a different configuration), and the selected configuration applies also applies to newly received notifications (e.g., notifications that are received after the user configures the computer system to display notifications with the particular configuration). For example, in FIG. 7P, the notification 7050 is displayed with (e.g., as a part of) the representation 7000 in the second configuration 7000-*b*, even though the notification 7050 was received after detecting the first user input (e.g., the pinch gesture 7034, or the downward swipe gesture 7036 in FIG. 7G).

In some embodiments, the notification for the first event is initially displayed separate from a third plurality of notifications (e.g., a plurality of notifications that includes the second plurality of notifications without the notification for the first event). After a threshold amount of time (e.g., and in response to detecting a subsequent occurrence of the condition that causes the computer system to redisplay the wake user interface), the computer system displays a representation of a second plurality of notifications in the second configuration, wherein the second plurality of notifications includes a notification for the first event (e.g., the notification for the first event "collapses" into the second configuration, and the computer system displays the representation of the second plurality of notifications (that includes the notification for the first event) with the second configuration in response to detecting subsequent occurrences of the condition that causes the computer system to redisplay the wake user interface). For example, in FIG. 7P, even though the notification 7050 was received at 11:45, and is received after detecting the first user input (e.g., the pinch gesture 7034, or the downward swipe gesture 7036, shown in FIG. 7G) at 9:41, the notification 7050 is displayed with (e.g., as a part of) the representation 7000 in the second configuration 7000-*b*. Displaying the representation of the second plurality of notifications in the second configuration, wherein the second plurality of notifications includes a notification for the first event, in response to detecting the occurrence of the condition that causes the computer system to redisplay the wake user interface, reduces the number of user inputs needed to display notifications in the desired configuration (e.g., the user does not need to perform additional user inputs each time a new notification is received or generated, after the user has already selected a desired configuration (e.g., in response to detecting the first user input)).

In some embodiments, the first user input is (14020) a pinch gesture (e.g., a gesture that includes movement of two or more contacts towards each other) (e.g., the first criteria are met when the first user input is a pinch gesture). In some embodiments, the pinch gesture is detected at a location that corresponds to the representation of the first plurality of notifications. For example, the representation of the first plurality of notifications is displayed in the first configuration in a first region, and the pinch gesture is detected in the first region. For example, in FIGS. 7G, the first user input is a pinch gesture (e.g., the pinch gesture 7034). Displaying the representation of the first plurality of notifications in the second configuration in accordance with a determination that the first user input that is a pinch gesture meets the first criteria, and maintaining display of the representation of the first plurality of notifications in the first configuration in accordance with a determination that the first user input that is a pinch gesture does not meet the first criteria, provides additional control options without cluttering the UI with additional displayed controls (e.g., additional displayed controls for changing to or switching to a different configuration for the representation of the first plurality of notifications).

In some embodiments, displaying the wake user interface that includes the representation of the first plurality of notifications in the first configuration includes (14022) displaying the representation of the first plurality of notifications in a first region of the wake user interface, and displaying the representation of the first plurality of notifications in the second configuration on the wake user interface includes displaying the representation of the first plurality of notifications in a second region of the wake user interface that is smaller than the first region of the wake user interface. In some embodiments, the number of notifications represented by the representation of the first plurality of notifications is the same regardless of which configuration (e.g., the first configuration or the second configuration) the representation of the first plurality of notifications is displayed in. In some embodiments, because the second region is smaller than the first region, while the representation of the first plurality of notifications is displayed in the second configuration, the representation of the first plurality of notifications includes an indication of the number of notifications represented by the representation of the first plurality of notifications (e.g., because some notifications of the first plurality of notifications are not visually represented due to the second region being smaller than the first region). For example, in FIGS. 7F and 7G-7H, in response to the pinch gesture 7034 (in FIG. 7G), the portable multifunction device 100 transitions to displaying the representation 7000 in the second configuration 7000-*b* (e.g., as shown in FIG. 7H), and the representation 7000 in the second configuration 7000-*b* occupies a smaller region than the representation 7000 in the first configuration 7000-*a* (e.g., as shown in FIG. 7F). Displaying the representation of the first plurality of notifications in a second region of the wake user interface that is smaller than the first region of the wake user interface, in response to detecting the first user input that is a pinch gesture, provides additional control options without cluttering the UI with additional displayed controls (e.g., additional displayed controls for changing the configuration of the representation of the first plurality of notifications and/or additional displayed controls for adjusting a size of the region in which the representation of the first plurality of notifications is displayed).

In some embodiments, the first criteria include (14024) a criterion that is met when the first user input is a pinch gesture that meets a first movement threshold (e.g., the pinch gesture includes at least a first threshold amount of movement of two or more contacts towards each other). In accordance with a determination that the first user input meets second criteria, wherein the second criteria include a criterion that is met when the first user input is a pinch gesture that meets a second movement threshold (e.g., the pinch gesture includes at least a second threshold amount of movement, greater than the first threshold amount of movement, of the two or more contacts towards each other) that is greater than the first movement threshold, the computer system displays a representation of the first plurality of notifications in the third configuration. For example, as described above with reference to FIGS. 7G-7Q, a small pinch gesture transitions to the second configuration 7000-*b* (e.g., as shown in FIG. 7H), while a large pinch gesture transitions to the third configuration 7000-*c* (e.g., as shown in FIG. 7Q).

In some embodiments, the first criteria include a criterion that is met when the first user input is a pinch gesture that meets the first movement threshold without meeting the second movement threshold (e.g., the pinch gesture includes an amount of movement of two or more contacts towards each other that is greater than the first threshold amount of movement, but less than the second threshold amount of movement). In some embodiments, in accordance with a determination that the first user input did not meet the first criteria or the second criteria, the computer system maintains display of the representation of the first plurality of notifications in the first configuration. For example, with reference to FIGS. 7G-7Q, a small pinch gesture (e.g., that includes a first amount of movement, but is less that a second amount of movement) transitions to the second configuration 7000-*b* (e.g., as shown in FIG. 7H).

In some embodiments, a characteristic magnitude of the user input determines which configuration the representation of the first plurality of notifications is displayed in. Stated differently, a user can use different sized pinches to select which configuration the representation of the first plurality of notifications will be displayed in. A smaller pinch gesture results in displaying the representation of the first plurality of notifications in the second configuration, while a larger pinch gesture (e.g., a pinch gesture that includes a greater amount of movement of two or more contacts towards each other, as compared to the smaller pinch gesture) results in displaying the representation of the first plurality of notifications in the third configuration. For example, as described above with reference to FIGS. 7G-7Q, a characteristic of the user input (e.g., a magnitude of the pinch gesture) determines which configuration is selected. A small pinch gesture transitions to the second configuration 7000-*b* (e.g., as shown in FIG. 7H), while a large pinch gesture transitions to the third configuration 7000-*c* (e.g., as shown in FIG. 7Q). Displaying the representation of the first plurality of notifications in the second configuration in accordance with a determination that the first user input meets the first criteria, and displaying the representation of the first plurality of notifications in the third configuration in accordance with a determination that the first user input meets the second criteria, provides additional control options (e.g., for switching between configurations for the representation of the first plurality of notifications) without cluttering the UI with additional displayed controls (e.g., additional displayed controls for transitioning to the second configuration, and for transitioning to the third configuration), and reduces the number of inputs needed to select a desired configuration (e.g., the user can select the third configuration without needing to perform an additional user input (e.g., to first select the second configuration)).

In some embodiments, after displaying the representation of the first plurality of notifications in the second configuration on the wake user interface in response to detecting the first user input, the computer system detects (14026) a second user input. In response to detecting the second user input, the computer system displays the representation of the first plurality of notifications in a third configuration and in a third region of the wake user interface that is smaller than the second region of the wake user interface, wherein the third configuration is different from the first configuration and different from the second configuration. In some embodiments, the first configuration is a normal configuration, the third configuration is a condensed or reduced prominence configuration, and the second configuration is an intermediate configuration (e.g., the second configuration is more condensed or has a reduced prominence relative to the first configuration, but is less condensed or has an increased prominence relative to the third configuration). For example, in FIGS. 7P and 7Q, where in response to detecting a second user input (e.g., the pinch gesture 7052 in FIG. 7P), the portable multifunction device displays the representation 7000 in the third configuration 7000-*c* (e.g., as shown in FIG. 7Q). Displaying the representation of the first plurality of notifications in a third configuration and in a third region of the wake user interface that is smaller than the second region of the wake user interface, wherein the third configuration is different from the first configuration and different from the second configuration, in response to detecting the second user input (e.g., that is also a pinch gesture), provides additional control options without cluttering the UI with additional displayed controls (e.g., additional displayed controls for transitioning to the third configuration of the representation of the first plurality of notifications).

In some embodiments, after displaying the representation of the first plurality of notifications in the third configuration and in the third region of the wake user interface, the computer system detects (14028) a third user input, wherein the third user input is a depinch gesture (e.g., a gesture that includes movement of two or more contacts away from each other). In response to detecting the third user input, the computer system displays the representation of the first plurality of notifications in the second configuration and in the second region of the wake user interface. In some embodiments, the depinch gesture is detected at a location that corresponds to the representation of the first plurality of notifications (e.g., in the third region of the wake user interface). For example, in FIGS. 7R and 7S, in response to detecting a third user input (e.g., the depinch gesture 7056 in FIG. 7R), the portable multifunction device 100 displays the representation 7000 in the second configuration 7000-*b* (e.g., as shown in FIG. 7S). Displaying the representation of the first plurality of notifications in the second configuration and in the second region of the wake user interface, in response to detecting the third user input that is a depinch gesture, provides additional control options without cluttering the UI with additional displayed controls (e.g., additional displayed controls for transitioning between multiple possible configurations for the representation of the first plurality of notifications).

In response to detecting (14030) the third user input: in accordance with a determination that the third user input meets third criteria, wherein the third criteria include a criterion that is met when the third user input is a depinch gesture that meets a third movement threshold (e.g., the depinch gesture includes at least a third threshold amount of movement of two or more contacts away from each other), the computer system displays the representation of the first plurality of notifications in the second configuration and in the second region of the wake user interface; and in accordance with a determination that the third user input meets fourth criteria, wherein the fourth criteria include a criterion that is met when the third user input is a depinch gesture that meets a fourth movement threshold (e.g., the depinch gesture includes at least a fourth threshold amount of movement, greater than the third threshold amount of movement, of two or more contacts away from each other) that is greater than the third movement threshold, the computer system displays the representation of the first plurality of notifications in the first configuration and in the first region of the wake user interface. For example, with reference to FIGS. 7R-7U, a small depinch gesture transitions to the second configuration 7000-*b* (e.g., as shown in FIG. 7S), while a large depinch gesture transitions to the first configuration 7000-*a* (e.g., as shown in FIG. 7U).

In some embodiments, the third criteria include a criterion that is met when the third user input is a depinch gesture that meets the third movement threshold without meeting the fourth movement threshold (e.g., the depinch gesture includes an amount of movement of two or more contacts away from each other that is greater than the third threshold amount of movement, but less than the fourth threshold amount of movement). In some embodiments, in accordance with a determination that the third user input did not meet the third criteria or the fourth criteria, the computer system maintains display of the representation of the first plurality of notifications in the third configuration. For example, with reference to FIGS. 7R-7U, a small depinch gesture (e.g., that includes an amount of movement greater than the third threshold amount, but less than the fourth threshold amount) transitions to the second configuration 7000-*b* (e.g., as shown in FIG. 7S), while a large depinch gesture transitions to the first configuration 7000-*a* (e.g., as shown in FIG. 7U).

In some embodiments, the third movement threshold is the same as the first movement threshold (described above with reference to the first user input/pinch gesture), and the fourth movement threshold is the same as the second movement threshold (described above with reference to the first user input/pinch gesture). For example, if a pinch gesture that includes a threshold amount of movement results in displaying the representation of the first plurality of notifications in the second configuration, a depinch gesture that includes the same threshold amount of movement (but of two or more contacts away from each other, rather than towards each other) results in displaying the representation of the first plurality of notifications in the first configuration (e.g., reverses the change in configuration resulting from the pinch gesture). If the pinch gesture that includes the threshold amount of movement results in displaying the representation of the first plurality of notifications in the third configuration, then a depinch gesture that includes the same threshold amount of movement results in displaying the representation of the first plurality of notifications in the first configuration. For example, in FIGS. 7R-7U, a characteristic of the user input (e.g., a magnitude of the depinch gesture) determines which configuration is selected. A small depinch gesture transitions to the second configuration 7000-*b* (e.g., as shown in FIG. 7S), while a large depinch gesture transitions to the first configuration 7000-*a* (e.g., as shown in FIG. 7U). Displaying the representation of the first plurality of notifications in the second configuration in accordance with a determination that the third user input meets the third criteria, and displaying the representation of the first plurality of notifications in the first configuration in accordance with a determination that the third user input meets the fourth criteria, provides additional control options (e.g., for switching between configurations for the representation of the first plurality of notifications) without cluttering the UI with additional displayed controls (e.g., additional displayed controls for transitioning to the second configuration, and for transitioning to the first configuration), and reduces the number of inputs needed to select a desired configuration (e.g., the user can select the first configuration without needing to perform an additional user input (e.g., to first select the second configuration)).

In some embodiments, after displaying the representation of the first plurality of notifications in the second configuration and in the second region of the wake user interface in response to the third user input, the computer system detects (14032) a fourth user input, wherein the fourth user input is a depinch gesture. In response to detecting the fourth user input, the computer system displays the representation of the first plurality of notifications in the first configuration and in the first region of the wake user interface. For example, in FIGS. 7S and 7U, in response to detecting a fourth user input (e.g., the depinch gesture 7060 in FIG. 7S), the portable multifunction device 100 displays the representation 7000 in the first configuration 7000-*a* (e.g., as shown in FIG. 7U). Displaying the representation of the first plurality of notifications in the first configuration and in the first region of the wake user interface, in response to detecting the fourth user input that is a depinch gesture, provides additional control options without cluttering the UI with additional displayed controls (e.g., additional displayed controls for transitioning between multiple possible configurations for the representation of the first plurality of notifications).

In some embodiments, the computer system detects (14034) a fifth user input. In response to detecting the fifth user input: in accordance with a determination that the fifth user input is a pinch gesture, the computer system displays the representation of the first plurality of notifications in the first configuration; and in accordance with a determination that the fifth user input is a depinch gesture, the computer system displays the representation of the first plurality of notifications in a fourth configuration different from the first configuration and the second configuration. In some embodiments, the fourth configuration is the same as the third configuration (e.g., the first configuration is a normal configuration, the fourth configuration is a condensed or reduced prominence configuration, and the second configuration is an intermediate configuration (e.g., the second configuration is more condensed or has a reduced prominence relative to the first configuration, but is less condensed or has an increased prominence relative to the fourth configuration)). For example, in FIGS. 7P-7U, the user can use a pinch or a depinch gesture to switch to different configurations. For example, in response to the pinch gesture 7052 in FIG. 7P, the portable multifunction device 100 transitions to displaying the representation 7000 in the third configuration 7000-*c* (e.g., as shown in FIG. 7Q), and in response to the depinch gesture 7062 in FIG. 7S, the portable multifunction device 100 transitions to displaying the representation 7000 in the first configuration 7000-*a* (e.g., as shown in FIG. 7U). Displaying the representation of the first plurality of notifications in the first configuration, in response to detecting the fifth user input and in accordance with a determination that the fifth user input is a pinch gesture, and displaying the representation of the first plurality of notifications in a fourth configuration different from the first configuration and the second configuration, in response to detecting the fifth user input and in accordance with a determination that the fifth user input is a depinch gesture, provides additional control options without cluttering the UI with additional displayed controls (e.g., additional displayed controls for transitioning between multiple possible configurations for the representation of the first plurality of notifications).

In some embodiments, the first user input is (14036) a swipe gesture. For example, if the representation of the first plurality of notifications is displayed with the first configuration, in response to detecting a downward swipe, the computer system displays the representation of the first plurality of notifications in the second configuration (e.g., condenses the representation of the first plurality of notifications from the first configuration to the second configuration). Alternately, if the representation of the first plurality of notifications is displayed with the second configuration, in response to detecting an upward swipe, the computer system displays the representation of the first plurality of notifications in the first configuration (e.g., expands the representation of the first plurality of notifications from the second configuration to the first configuration). For example, in FIGS. 7G, the first user input is a swipe gesture (e.g., the downward swipe gesture 7036). Displaying the representation of the first plurality of notifications in the second configuration in accordance with a determination that the first user input that is a swipe gesture meets the first criteria, and maintaining display of the representation of the first plurality of notifications in the first configuration in accordance with a determination that the first user input that is a swipe gesture does not meet the first criteria, provides additional control options without cluttering the UI with additional displayed controls (e.g., additional displayed controls for changing to or switching to a different configuration for the representation of the first plurality of notifications).

In some embodiments, the first user input is (14038) a swipe gesture that includes movement in a first direction (e.g., towards a bottom edge of the wake user interface), displaying the wake user interface that includes the representation of the first plurality of notifications in the first configuration includes displaying the representation of the first plurality of notifications in a first region of the wake user interface, and displaying the representation of the first plurality of notifications in the second configuration on the wake user interface includes displaying the representation of the first plurality of notifications in a second region of the wake user interface that is smaller than the first region of the wake user interface. For example, in FIGS. 7F and 7G-7H, in response to the downward swipe gesture 7036 (in FIG. 7G), the portable multifunction device 100 transitions to displaying the representation 7000 in the second configuration 7000-*b* (e.g., as shown in FIG. 7H), and the representation 7000 in the second configuration 7000-*b* occupies a smaller region than the representation 7000 in the first configuration 7000-*a* (e.g., as shown in FIG. 7F). Displaying the representation of the first plurality of notifications in a second region of the wake user interface that is smaller than the first region of the wake user interface, in response to detecting the first user input that is a swipe gesture including movement in a first direction, provides additional control options without cluttering the UI with additional displayed controls (e.g., additional displayed controls for changing the configuration of the representation of the first plurality of notifications and/or additional displayed controls for adjusting a size of the region in which the representation of the first plurality of notifications is displayed).

In some embodiments, the first criteria include (14040) a criterion that is met when the first user input is a swipe gesture in a first direction that meets a fifth movement threshold (e.g., the swipe gesture includes at least a fifth threshold amount of movement). In accordance with a determination that the first user input meets second criteria, wherein the second criteria include a criterion that is met when the first user input is a swipe gesture in the first direction that meets a sixth movement threshold (e.g., the swipe gesture includes at least a sixth threshold amount of movement) that is greater than the fifth movement threshold, the computer system displays a representation of the first plurality of notifications in the third configuration. For example, with reference to FIG. 7G-7Q, a small downward swipe gesture transitions to the second configuration 7000-*b* (e.g., as shown in FIG. 7H), while a large downward swipe gesture transitions to the third configuration 7000-*c* (e.g., as shown in FIG. 7Q).

In some embodiments, the first criteria include a criterion that is met when the first user input is a swipe gesture in a first direction that meets the first movement threshold without meeting the second movement threshold (e.g., the swipe gesture includes an amount of movement in the first direction that is greater than the fifth threshold amount of movement, but less than the sixth threshold amount of movement). In some embodiments, in accordance with a determination that the first user input did not meet the first criteria or the second criteria, the computer system maintains display of the representation of the first plurality of notifications in the first configuration. For example, with reference to FIGS. 7G-7Q, a small downward swipe gesture (e.g., that includes a first amount of movement, but does not include a second amount of movement) transitions to the second configuration 7000-*b* (e.g., as shown in FIG. 7H.

In some embodiments, a characteristic magnitude of the user input determines which configuration the representation of the first plurality of notifications is displayed in. Stated differently, a user can use different size or length swipes to select which configuration the representation of the first plurality of notifications will be displayed in. A smaller or shorter swipe gesture results in displaying the representation of the first plurality of notifications in the second configuration, while a larger or longer swipe gesture (e.g., a swipe gesture that includes a greater amount of movement as compared to the smaller swipe gesture) results in displaying the representation of the first plurality of notifications in the third configuration. For example, in FIGS. 7G-7Q, a characteristic of the user input (e.g., a magnitude of the swipe gesture in the first direction) determines which configuration is selected. A small downward swipe gesture transitions to the second configuration 7000-*b* (e.g., as shown in FIG. 7H), while a large downward swipe gesture transitions to the third configuration 7000-*c* (e.g., as shown in FIG. 7Q). Displaying the representation of the first plurality of notifications in the second configuration in accordance with a determination that the first user input meets the first criteria, and displaying the representation of the first plurality of notifications in the third configuration in accordance with a determination that the first user input meets the second criteria, provides additional control options (e.g., for switching between configurations for the representation of the first plurality of notifications) without cluttering the UI with additional displayed controls (e.g., additional displayed controls for transitioning to the second configuration, and for transitioning to the third configuration), and reduces the number of inputs needed to select a desired configuration (e.g., the user can select the third configuration without needing to perform an additional user input (e.g., to first select the second configuration)).

In some embodiments, after displaying the representation of the first plurality of notifications in the second configuration on the wake user interface in response to detecting the first user input, the computer system detects (14042) a sixth user input (e.g., a swipe gesture in the first direction). In response to detecting the sixth user input, the computer system displays the representation of the first plurality of notifications in a fifth configuration and in a fourth region of the wake user interface that is smaller than the second region of the wake user interface, wherein the fifth configuration is different from the first configuration and different from the second configuration. In some embodiments, the fifth configuration is the same as the third configuration (e.g., the first configuration is a normal configuration, the fifth configuration is a condensed or reduced prominence configuration, and the second configuration is an intermediate configuration (e.g., the second configuration is more condensed or has a reduced prominence relative to the first configuration, but is less condensed or has an increased prominence relative to the fifth configuration)). For example, in FIGS. 7P and 7Q, in response to detecting a second user input (e.g., the downward swipe gesture 7054 in FIG. 7P), the portable multifunction device displays the representation 7000 in the third configuration 7000-*c* (e.g., as shown in FIG. 7Q). Displaying the representation of the first plurality of notifications in the second configuration on the wake user interface in accordance with a determination that a last notification of the first plurality of notifications is visible, and scrolling display of representations of the notifications in the first plurality of notifications while maintaining display of the first plurality of notifications in the first configuration in accordance with a determination that a last notification of the first plurality of notifications is not visible, provides additional control options without cluttering the UI with additional displayed controls (e.g., a displayed control for transitioning to the second configuration, and an additional displayed control for scrolling display of the notifications in the first plurality of notifications).

In some embodiments, after displaying the representation of the first plurality of notifications in the fifth configuration and in the fourth region of the wake user interface, the computer system detects (14044) a seventh user input, wherein the seventh user input is a swipe gesture that includes movement in a second direction that is opposite the first direction. In response to detecting the seventh user input, the computer system displays the representation of the first plurality of notifications in the second configuration and in the second region of the wake user interface. For example, in FIGS. 7R and 7S, in response to detecting a third user input (e.g., the upward swipe gesture 7058 in FIG. 7R), the portable multifunction device 100 displays the representation 7000 in the second configuration 7000-*b* (e.g., as shown in FIG. 7S). Displaying the representation of the first plurality of notifications in the second configuration and in the second region of the wake user interface, in response to detecting the seventh user input that is a swipe gesture including movement is a second direction opposite the first direction, provides additional control options without cluttering the UI with additional displayed controls (e.g., additional displayed controls for transitioning between multiple possible configurations for the representation of the first plurality of notifications).

In some embodiments, in response to detecting (14046) the seventh user input: in accordance with a determination that the seventh user input meets third criteria without meeting fourth criteria, wherein the third criteria include a criterion that is met when the seventh user input is a swipe gesture in the second direction that meets a seventh movement threshold (e.g., the swipe gesture includes at least a seventh threshold amount of movement), the computer system displays the representation of the first plurality of notifications in the second configuration and in the second region of the wake user interface; and in accordance with a determination that the seventh user input meets fourth criteria, wherein the fourth criteria include a criterion that is met when the seventh user input is a swipe gesture in the second direction that meets an eighth movement threshold (e.g., the swipe gesture includes at least an eighth threshold amount of movement) that is greater than the seventh movement threshold, the computer system displays the representation of the first plurality of notifications in the first configuration and in the first region of the wake user interface. For example, with reference to FIGS. 7R-7U, a small upward swipe gesture (e.g., meeting seventh criteria) transitions to the second configuration 7000-*b* (e.g., as shown in FIG. 7S), while a large upward swipe gesture (e.g., meeting eight criteria) transitions to the first configuration 7000-*a* (e.g., as shown in FIG. 7U).

In some embodiments, the third criteria include a criterion that is met when the seventh user input is a swipe gesture in a second direction that meets the seventh movement threshold without meeting the eighth movement threshold (e.g., the swipe gesture includes an amount of movement in the second direction that is greater than the seventh threshold amount of movement, but less than the eighth threshold amount of movement). In some embodiments, in accordance with a determination that the seventh user input did not meet the third criteria or the fourth criteria, the computer system maintains display of the representation of the first plurality of notifications in the third configuration. For example, with reference to FIGS. 7R-7U, a small upward swipe gesture (e.g., that includes a first amount of movement, but does not include a second amount of movement) transitions to the second configuration 7000-*b* (e.g., as shown in FIG. 7S).

In some embodiments, the seventh movement threshold is the same as the first movement threshold (described above with reference to the first user input/pinch gesture), and the eighth movement threshold is the same as the second movement threshold (described above with reference to the first user input/pinch gesture). For example, if a swipe gesture that includes a threshold amount of movement in a first direction results in displaying the representation of the first plurality of notifications in the second configuration, a swipe gesture that includes the same threshold amount of movement in a direction opposite the first direction results in displaying the representation of the first plurality of notifications in the first configuration (e.g., reverses the change in configuration resulting from the swipe gesture). If the swipe gesture that includes the threshold amount of movement in a first direction results in displaying the representation of the first plurality of notifications in the third configuration, then a swipe gesture that includes the same threshold amount of movement in a direction opposite the first direction results in displaying the representation of the first plurality of notifications in the first configuration. For example, as described with reference to FIGS. 7R-7U, where a characteristic of the user input (e.g., a magnitude of the swipe gesture in the second direction) determines which configuration is selected. A small upward swipe gesture transitions to the second configuration 7000-*b* (e.g., as shown in FIG. 7S), while a large upward swipe gesture transitions to the first configuration 7000-*a* (e.g., as shown in FIG. 7U). Displaying the representation of the first plurality of notifications in the second configuration in accordance with a determination that the seventh user input meets the third criteria, and displaying the representation of the first plurality of notifications in the third configuration in accordance with a determination that the seventh user input meets the fourth criteria, provides additional control options (e.g., for switching between configurations for the representation of the first plurality of notifications) without cluttering the UI with additional displayed controls (e.g., additional displayed controls for transitioning to the second configuration, and for transitioning to the first configuration), and reduces the number of inputs needed to select a desired configuration (e.g., the user can select the third configuration without needing to perform an additional user input (e.g., to first select the second configuration)).

In some embodiments, after displaying the representation of the first plurality of notifications in the second configuration on the wake user interface and in the second region of the wake user interface in response to the seventh user input, the computer system detects (14048) an eighth user input, wherein the eighth user input is a swipe gesture that includes movement in the second direction that is opposite the first direction. In response to detecting the eighth user input, the computer system displays the representation of the first plurality of notifications in the first configuration and in the first region of the wake user interface. For example, in FIGS. 7S and 7U, in response to detecting a fourth user input (e.g., the upward swipe gesture 7062 in FIG. 7S), the portable multifunction device 100 displays the representation 7000 in the first configuration 7000-*a* (e.g., as shown in FIG. 7U). Displaying the representation of the first plurality of notifications in the first configuration and in the first region of the wake user interface, in response to detecting the eighth user input that is a swipe gesture in the second direction, provides additional control options without cluttering the UI with additional displayed controls (e.g., additional displayed controls for transitioning between multiple possible configurations for the representation of the first plurality of notifications).

In some embodiments, in response to detecting (14050) the first user input: in accordance with a determination that a last notification (e.g., an oldest notification, a notification that is displayed at the bottom of the first plurality of notifications in the first configuration) of the first plurality of notifications is visible (e.g., and in accordance with a determination that the first user input meets the first criteria) (e.g., the first criteria include a criterion that is met when the first user input is detected over the last notification of the first plurality of notifications), the computer system displays the representation of the first plurality of notifications in the second configuration on the wake user interface; and in accordance with a determination that a last notification of the first plurality of notifications is not visible (e.g., because a user must first scroll through more recent notifications before the last notification is displayed or becomes visible), the computer system scrolls display of representations of the notifications in the first plurality of notifications while maintaining display of the first plurality of notifications in the first configuration. For example, with reference to FIGS. 7F and 7G, the last notification 7032 is not visible in FIG. 7G, so the upward swipe gesture 7028 scrolls notifications (e.g., to the view shown in FIG. 7G). The last notification 7032 is visible in FIG. 7G, so in response to the first user input (e.g., the pinch gesture 7034 or the downward swipe 7036), the portable multifunction device displays the representation 7000 in the second configuration 7000-*b* (e.g., as shown in FIG. 7H).

In some embodiments, after displaying the representation of the first plurality of notifications in the second configuration on the wake user interface, the computer system enters (or re-enters) the low power state (e.g., the reduced power state or off state). In response to detecting an occurrence of a condition (e.g., a user input that wakes the computer system from the low power state, or receiving/generating a new notification) that causes the computer system to redisplay the wake user interface, the computer system redisplays the representation of the first plurality of notifications in the second configuration on the wake user interface. Stated differently, if the computer system changes the configuration in response to the first user input, the new configuration remains selected the next time the computer system displays the wake user interface (e.g., the computer system enters the low power state and is later re-woken). For example, with reference to FIGS. 7M and 7N, if the portable multifunction device 100 enters the low power state after 9:41, and is later re-woken at 11:31, the wake user interface includes the representation 7000 in the second configuration 7000-*b* (e.g., as shown in FIG. 7M).

In some embodiments, after scrolling display of representation of the first plurality of notifications in the first configuration, the computer system enters (or re-enters) the low power state. In response to detecting an occurrence of the condition that causes the computer system to redisplay the wake user interface, the computer system displays the representation of the first plurality of notifications in the first configuration on the wake user interface (e.g., displays the representation of the first plurality of notifications with the same appearance as before notifications were scrolled in response to detecting the first user input). Stated differently, if the computer system scrolls display of representation of the notifications without changing the configuration, the computer system displays the representation of notifications (e.g., with the appearance prior to the scrolling) the next time the computer system displays the wake user interface (e.g., if the computer system enters the low power state and is later transitioned to a wake state). For example, in FIG. 7T, if one or more older notifications are not displayed (e.g., because there are enough recent notifications that the one or more older notifications do not fit on the display), in response to detecting the upward swipe gesture 7063, the portable multifunction device 100 scrolls notifications (e.g., such that at least one of the one or more older notifications is now displayed, while maintaining display of the representation 7000 in the expanded configuration 7000-*d*). If the oldest notification is already displayed (e.g., notifications cannot be scrolled further), in response to detecting the upward swipe gesture 7063, the portable multifunction device instead transitions to displaying the representation 7000 in the first configuration 7000-*a* (e.g., as shown in FIG. 7U). Displaying the representation of the first plurality of notifications in the second configuration on the wake user interface in accordance with a determination that a last notification of the first plurality of notifications is visible, and scrolling display of representations of the notifications in the first plurality of notifications while maintaining display of the first plurality of notifications in the first configuration in accordance with a determination that a last notification of the first plurality of notifications is not visible, provides additional control options without cluttering the UI with additional displayed controls (e.g., a displayed control for transitioning to the second configuration, and an additional displayed control for scrolling display of representation of the notifications in the first plurality of notifications).

In some embodiments, the computer system detects (14052) a ninth user input at a location in a fifth region of the wake user interface. In response to detecting the ninth user input, the computer system displays a system user interface for accessing functions of the computer system. In some embodiments, the ninth user input is a swipe gesture. In some embodiments, the swipe gesture begins at an edge of the display. In some embodiments, the swipe gesture begins away from an edge of the display. For example, as described above with reference to FIGS. 7V-1 through 7V-3, in response to detecting a ninth user input (e.g., the first leftward swipe gesture 7064) in a fifth region of the wake user interface (e.g., the region 7076), the portable multifunction device 100 displays a system user interface for accessing functions of the computer system. Displaying a system user interface for accessing functions of the computer system in response to detecting the ninth user input at a location in a fifth region of the wake user interface, provides additional control options without cluttering the UI with additional displayed controls (e.g., additional displayed controls for displaying the system user interface for accessing functions of the computer system).

In some embodiments, while the first plurality of notifications is displayed in the first configuration, the fifth region has (14054) a first size, and while the first plurality of notifications is displayed in the second configuration, the fifth region has a second size different from the first size (e.g., larger than the first size). In some embodiments, the size of the fifth region (e.g., over which the user can swipe to invoke the system user interface) is proportional to a size of the first plurality of notifications in a respective configuration. In some embodiments, the size of the fifth region changes inversely with the size of the first plurality of notifications (e.g., if the first plurality of notifications has a smaller size when displayed in the second configuration, as compared to in the first configuration, the fifth region has a larger size when the first plurality of notifications is displayed in the second configuration, and the fifth region has a smaller size when the first plurality of notification is displayed in the first configuration). For example, in FIG. 7V-1 through 7V-3, the size of the region 7076 changes depending on the configuration in which the representation 7000 is displayed. Displaying a system user interface for accessing functions of the computer system in response to detecting the ninth user input at a location in a fifth region of the wake user interface, wherein a size of the fifth region is different depending on which configuration the representation of the first plurality of notifications is displayed with, automatically adjusts a size of the fifth region when a set of conditions has been met (e.g., the representation of the first plurality of notifications is displayed with a particular configuration) without the need for additional user inputs.

In some embodiments, after displaying the representation of the first plurality of notifications in the second configuration on the wake user interface in response to detecting the first user input, the computer system detects (14056) a tenth user input. In response to detecting the tenth user input, the computer system displays the representation of the first plurality of notifications in the first configuration. In some embodiments, the tenth user input and the first user input are inputs of the same type (e.g., both the first user input and the tenth user input are taps), and repeated user inputs of the same type will toggle or alternate between displaying the representation of the first plurality of notifications in the first configuration and displaying the representation of the first plurality of notifications in the second configuration. In some embodiments, a characteristic of the tenth user input is reversed, or the opposite of, a characteristic of the first user input (e.g., the second user input is an upward swipe, and the first user input is a downward swipe). In some embodiments, the tenth user input and the first user input do not have overlapping characteristics (e.g., the second user input is a swipe and the first user input is a tap). For example, in FIG. 7S, in response to detecting the depinch gesture 7060, or the upward swipe gesture 7062, (e.g., which are gestures that include a opposite type of movement compared to the first user input (e.g., the pinch gesture 7034, or the downward swipe gesture 7036, as shown in FIG. 7G)), the portable multifunction device 100 transitions to displaying the representation 7000 in the first configuration 7000-*a* (e.g., as shown in FIG. 7U). Displaying the representation of the first plurality of notifications in the first configuration in response to detecting the tenth user input (e.g., reversing the change in configuration resulting from the first user input), after displaying the representation of the first plurality of notifications in the second configuration in response to detecting the first user input, provides additional control options without cluttering the UI with additional displayed controls (e.g., additional displayed controls for selecting a particular configuration, or additional displayed controls for reversing a change in configuration).

In some embodiments, after displaying the representation of the first plurality of notifications in the second configuration on the wake user interface in response to detecting the first user input, the computer system detects (14058) an eleventh user input (e.g., a pinch gesture, a downward swipe gesture, or a swipe gesture in a first direction). In response to detecting the eleventh user input, the computer system displays the representation of the first plurality of notifications in a sixth configuration, wherein the sixth configuration is different from the first configuration and different from the second configuration. In some embodiments, the sixth configuration is the same as the third configuration (e.g., the first configuration is a normal configuration, the sixth configuration is a condensed or reduced prominence configuration, and the second configuration is an intermediate configuration (e.g., the second configuration is more condensed or has a reduced prominence relative to the first configuration, but is less condensed or has an increased prominence relative to the sixth configuration)). For example, in FIG. 7P, in response to detecting eleventh user input (e.g., the pinch gesture 7052, or the downward swipe gesture 7054 (e.g., which are gestures of the same type as the pinch gesture 7034, or the downward swipe gesture 7036, as shown in FIG. 7G)), the portable multifunction device 100 transitions to displaying the representation 7000 in the third configuration 7000-*c* (e.g., as shown in FIG. 7Q). Displaying the representation of the first plurality of notifications in a sixth configuration in response to detecting the eleventh user input, after displaying the representation of the first plurality of notifications in the second configuration in response to detecting the first user input, provides additional control options without cluttering the UI with additional displayed controls (e.g., additional displayed controls for further adjusting the configuration in which the representation of the first plurality of notifications is displayed in).

It should be understood that the particular order in which the operations in FIGS. 14A-14G have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1000, 1100, 12000, 1300, 15000, 16000, and 17000) are also applicable in an analogous manner to method 14000 described above with respect to FIGS. 14A-14G. For example, the contacts, gestures, and user interface objects,—described above with reference to method 14000 optionally have one or more of the characteristics of the contacts, gestures, and user interface objects, described herein with reference to other methods described herein (e.g., methods 900, 1000, 1100, 12000, 1300, 15000, 16000, and 17000). For brevity, these details are not repeated here.

FIGS. 15A-15I are flow diagrams illustrating method 15000 for automatically shuffling through media items as a background, in accordance with some embodiments. Method 15000 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 15000 are, optionally, combined and/or the order of some operations is, optionally, changed.

As described below, method 15000 is a method for automatically shuffling through media items to be displayed as a background based on user selection of particular categories, wherein the shuffled media items are selected in accordance with the media item being associated with one of the categories. Allowing a user to select categories of images that the device automatically identifies and displays as a background in a system user interface provides additional control options for the user and reduces the number of inputs required to select backgrounds, thereby reducing the amount of time required to select settings for the system user interface of the device.

The method 15000 is performed at a computer system with a display generation component (15002). The computer system displays (15004), via the display generation component, a first user interface for configuring a system user interface that has a first background and a first set of one or more system user interface objects (e.g., widgets, time, date, complications, and/or system status indicators) overlaying the first background (e.g., the first user interface is a user interface for configuring a photos face and/or configuring a wallpaper and/or other elements of the wake screen, the home screen, a desktop, and/or another system user interface). In some embodiments, the first user interface is displayed in response to detecting a user's request to create a new version of the system user interface, and the computer system replaces a currently displayed version of the system user interface with another version of the system user interface, and/or modifying one or more aspects of the currently displayed version of the system user interface.

While the system user interface is displayed (15006), the computer system automatically shuffles through two or more media items selected from a collection of media items (e.g., photos and/or videos) in the first background over time (e.g., upon waking the computer system, upon redisplay of the system user interface, upon detection of a preset user input that corresponds to a request to switch the currently displayed version of the system user interface, and/or based on preset shuffling schedule, without requiring additional user inputs at the time of a respective shuffle). For example, as described with reference to FIGS. 6S-6T, in some embodiments, a wake screen user interface 692 is automatically updated to wake screen user interface 694, without receiving user input. In some embodiments, wake screen user interface 692 and/or wake screen user interface 694 include an indication of a time, a date, and/or one or more complications.

The first user interface includes (15008) respective selectable representations of a plurality of categories for media items associated with the computer system (e.g., photos stored on the computer system, photos associated with a photos application installed on the computer system, and/or photos corresponding to a user account corresponding to the computer system), including at least a first selectable representation of a first category and a second selectable representation of a second category (e.g., the plurality of categories include system-generated categories based on computer-detected subject matter of photos and/or videos, such as people, pets, nature, urban, plants, and/or portraits).

A first plurality of media items associated with the computer system (e.g., stored on the computer system and/or included in a media library associated with the computer system) are automatically selected (15010) for inclusion in the first category based on the first plurality of media items containing automatically detected content of a first type (e.g., media items identified by the computer system as containing people, and/or other people-themed subject matter; media items identified by the computer system as containing nature, and/or other nature-themed subject matter) For example, as described with reference to FIGS. 6U-6W, one or more categories are selected by the user and media items (e.g., images or photos) associated with the selected categories are identified by device 100.

A second plurality of media items associated with the computer system (e.g., stored on the computer system and/or included in a media library associated with the computer system) are automatically selected (15012) for inclusion in the second category based on the second plurality of media items containing automatically detected content of a second type (e.g., media items identified by the computer system as containing pets, and/or other pet-themed subject matter; media items identified by the computer system as containing portraits; and/or media items identified by the computer system as containing urban themed subject matter). For example, a first image is associated with a first category (e.g., representation 6003-1 that includes a flower is associated with the nature category, as described with reference to FIG. 6U), and a second image is associated with a second category (e.g., representation 6003-2 that includes a house is associated with the urban category).

While displaying the first user interface for configuring the system user interface (e.g., including the respective selectable representations of the plurality of categories), the computer system detects (15014) a first input selecting a set of one or more of the plurality of categories (e.g., based on selection of one or more of the respective selectable representations corresponding to the one or more of the plurality of categories, which is different from manual selection of individual media items (even if selection is from a listing of media items corresponding to a respective manually or automatically created category), and different from selection of a folder that are automatically generated based on criteria other than computer-determined content type based on automatically detected content (e.g., folders that are automatically generated based on creation/modification date, creator, associated application, file type, and/or other metadata associated with the media items). For example, user input 6010 in FIG. 6V selects the urban category.

After the set of one or more of the plurality of categories were selected by the first input (e.g., after the user has dismissed the first user interface while the selection of the categories are maintained by the computer system), the computer system displays (15016) the system user interface, wherein displaying the system user interface includes, over time displaying the system user interface with a plurality of versions of the first background that respectively include media items selected (e.g., automatically selected randomly, pseudorandomly, or deterministically) from media items in respective categories in the set of one or more of the plurality of categories.

In accordance with a determination that the set of one or more of the plurality of categories includes the first category, without including the second category, the plurality of versions of the first background include (15018) media items from the first category without including media items from the second category. For example, as described with reference to FIG. 6U, while the categories of people, pets, and nature are selected, and urban is not selected, the backgrounds include media items that are identified as being associated with people, pets, and/or nature, but the backgrounds do not include media items that are identified as being associated with urban.

In accordance with a determination that the set of one or more of the plurality of categories includes the second category, without including the first category, the plurality of versions of the first background include (15020) media items from the second category without including media items from the first category; and For example, after user input 6006 (FIG. 6U) deselects nature as a category, images associated with the nature category are not displayed as a background in the Smart Album.

In accordance with a determination that the set of one or more of the plurality of categories includes the first category and the second category, the plurality of versions of the first background include (15022) one or more media items from the first category and one or more media items from the second category. For example, media items associated with any of the selected categories (e.g., people, pets, and urban in FIG. 6W), may be selected as a background in the Smart Album. For example, the computer system shuffles through a plurality of versions of the first background in the system user interface, where the different versions of the first background are generated based on the different media items that have been automatically selected from the media items included in the selected categories and rather than from the media items included in the non-selected categories. In some embodiments, after the set of one or more of the plurality of categories were selected by the first input, the computer system identifies one or more media items that are added to the media library (e.g., photos taken by the device, received by the device, or otherwise stored on the device in the media library), wherein in accordance with a determination that a first media item of the one or more media items is associated with the first category, the computer system includes the first media item in the plurality of versions of the first background. For example, the computer system automatically identifies that a new media item is included in one of the selected plurality of categories, and includes the new media item in the respective plurality of versions of the first background based on the identified category. In some embodiments, after the set of one or more of the plurality of categories were selected by the first input, the computer system detects one or more additional media items associated with the computer system (e.g., new media items that were captured and/or stored onto the computer system after detecting the first input selecting the set of one or more of the plurality of categories) that were not previously included in the plurality of categories, and the computer automatically includes the one or more additional media items in one or more respective categories of the plurality of categories based on the respective types of automatically detected content of the one or more additional media items. In some embodiments, at least one of the one or more additional media item is included in the first category for containing automatically detected content of the first type, and/or at least one of the one or more additional media item is included in the second category for containing automatically detected content of the second type. In some embodiments, when displaying the system user interface over time, in accordance with a determination that at least one of the additional media items was included in the first category and the first category was in the set of one or more of the plurality of categories, the computer system includes the at least one of the additional media item in at least one of the plurality of versions of the first background; and in accordance with a determination that at least one of the additional media items was included in the first category and the first category was not in the set of one or more of the plurality of categories, the computer system does not include the at least one of the additional media item in the plurality of versions of the first background. In some embodiments, when displaying the system user interface over time, in accordance with a determination that at least one of the additional media items was included in the second category and the second category was in the set of one or more of the plurality of categories, the computer system includes the at least one of the additional media item in at least one of the plurality of versions of the first background; and in accordance with a determination that at least one of the additional media items was included in the second category and the second category was not in the set of one or more of the plurality of categories, the computer system does not include the at least one of the additional media item in the plurality of versions of the first background. In some embodiments, when displaying the system user interface over time, in accordance with a determination that at least one of the additional media items was included in one of the categories in the set of one or more of the plurality of categories, the computer system includes the at least one of the additional media item in at least one of the plurality of versions of the first background;

and in accordance with a determination that at least one of the additional media items was not included in a category in the set of one or more of the plurality of categories, the computer system does not include the at least one of the additional media item in the plurality of versions of the first background.

In some embodiments, the respective selectable representations of the plurality of categories for media items associated with the computer system include (15024) a third selectable representation of a third category (e.g., the plurality of categories include system-generated categories based on computer-detected subject matter of photos and/or videos, such as people, pets, nature, urban, plants, and/or portraits), and a third plurality of media items associated with the computer system (e.g., stored on the computer system and/or included in a media library associated with the computer system) are automatically selected for inclusion in the third category based on the third plurality of media items containing automatically detected content of a third type (e.g., media items identified by the computer system as containing plants, and/or other plant-themed subject matter; media items identified by the computer system as containing art, and/or other art-themed subject matter). In some embodiments, in accordance with a determination that the set of one or more of the plurality of categories includes the first category, without including the third category, the plurality of versions of the first background include media items from the first category without including media items from the third category; in accordance with a determination that the set of one or more of the plurality of categories includes the third category, without including the first category, the plurality of versions of the first background include media items from the third category without including media items from the first category; and in accordance with a determination that the set of one or more of the plurality of categories includes the first category and the third category, the plurality of versions of the first background include one or more media items from the first category and one or more media items from the third category. In some embodiments, in accordance with a determination that the set of one or more of the plurality of categories includes the second category, without including the third category, the plurality of versions of the first background include media items from the second category without including media items from the third category; in accordance with a determination that the set of one or more of the plurality of categories includes the third category, without including the second category, the plurality of versions of the first background include media items from the third category without including media items from the second category; and in accordance with a determination that the set of one or more of the plurality of categories includes the second category and the third category, the plurality of versions of the first background include one or more media items from the second category and one or more media items from the third category. For example, the computer system shuffles through a plurality of versions of the first background in the system user interface, where the different versions of the first background are generated based on the different media items that have been automatically selected from the media items included in the selected categories (e.g., two or more different categories) and rather than from the media items included in the non-selected categories. For example, as described with reference to FIG. 6U, while the categories of people, pets, and nature are selected, and urban is not selected, the backgrounds include media items that are identified as being associated with people, pets, and/or nature, but the backgrounds do not include media items that are identified as being associated with urban. Automatically determining which media items belong to a respective category, and displaying or forgoing display of certain categories of media items based on a user selection of the categories, causes the device to automatically present media items that are likely to be of interest to the user without requiring manual user selection of individual media items, thereby reducing a number of inputs and an amount of time that is needed for the user to select settings for the system user interface of the device.

In some embodiments, the first category corresponds (15026) to a people category, and, the first plurality of media items associated with the computer system are automatically selected for inclusion in the first category based on the first plurality of media items containing automatically detected content corresponding to a person. In some embodiments, the first plurality of media items include photos and/or videos that are respectively focused on individual people as the main subject matter of the photos and/or videos (e.g., as opposed to photos and/or videos focused on nature, plants, and/or pets as the main subject matter). For example, as described with reference to FIGS. 6W-6X, the set of categories includes a people category, and the device displays respective selectable representations of individuals in response to a user's request to manually select and/or filter the media item automatically included in the people category. In response to user selection of one or more of the respective selectable representations of individuals, the device selects the individuals corresponding to the user-selected representations to include in the people category, without including other individuals that are or would be automatically included in the people category but that are not manually selected by the user. Automatically determining which media items include a particular individual that the user has identified to include in backgrounds for the system user interface, causes the device to automatically present media items that are likely to be of interest to the user in accordance with the user's selection of a category for certain people, without requiring manual user selection of individual media items, thereby reducing a number of inputs and an amount of time that is needed for the user to select settings for the system user interface of the device.

In some embodiments, the first plurality of media items is (15028) a subset of media items that are stored in a media library (e.g., a personal photo and or video library of photos and home videos) associated with the computer system and that are selected for inclusion in the first category based the subset of media items containing automatically detected human faces that correspond to faces identified in media items (e.g., in at least a threshold number or quantity of media items) in the media library. In some embodiments, the computer system automatically recognizes and categories media items from the media library or other media storage accounts and/or locations associated with the computer system based on automated facial recognition techniques. For example, the individuals illustrated in user interface 6018 (FIG. 6X) are recognized faces identified from a photo library stored at device 100. Automatically identifying media items that include an individual based on facial detection, enables the device to automatically select and present media items that are likely to be of interest to the user without requiring the user to manually identify media items that include the individual, thereby reducing a number of inputs and an amount of time that is needed for the user to select settings for the system user interface of the device.

In some embodiments, the computer system detects (15030) a second input that corresponds to a request to configure the first category (e.g., selecting a "browse" or "choose . . . " link displayed next to the first selectable representation of the first category, or selecting another user interface object for configuring the first category that is distinct from the selection affordance for selecting the first category) For example, user input 6016 selects "Choose . . . " in FIG. 6W. In some embodiments, in response to detecting the second input, the computer system displays a plurality of selectable representations of subjects (e.g., people and/or pets) identified in the first plurality of media items that have been automatically included in the first category based on the first plurality of media items containing automatically detected content of the first type (e.g., displays selectable thumbnails of the first plurality of media items, and/or displaying respective representative images for different groups of media items corresponding to different individuals that have been recognized from the first plurality of media items, for example the representations of individuals displayed in FIG. 6X). In some embodiments, the computer system detects a third input selecting and/or deselecting one or more representations of subjects (e.g., people and/or pets) who have been identified in the first plurality of media items (e.g., by selecting and/or deselecting the respective selectable representations of the one or more of the first plurality of media items). In some embodiments, the respective representations for the first plurality of media items are selected by default and can be individually deselected by the user. In some embodiments, the respective representations for the first plurality of media items are deselected by default and can be individually selected by the user. For example, user inputs 6020, 6022 and 6024 illustrated in FIG. 6X are user inputs selecting individuals to be included in the people category. In some embodiments, after the one or more of the first plurality of media items were selected and/or deselected by the third input (e.g., after the user has dismissed the first user interface while the selection of the categories and the selected/unselected states of the first plurality of media items are maintained by the computer system), the computer system displays the system user interface, wherein displaying the system user interface includes, over time displaying the system user interface with the plurality of versions of the first background that respectively include media items selected (e.g., automatically selected randomly, pseudorandomly, or deterministically) from media items in the respective categories in the set of one or more of the plurality of categories, wherein: in accordance with a determination that the set of one or more of the plurality of categories includes the first category, and that a first subset of the first plurality of media items that contain a first subject were selected and a second subset of the first plurality of media items that contain a second subject were not selected by the third input, the plurality of versions of the first background include media items from the first subset of the first plurality of media items in the first category without including the second subset of the first plurality of media items in the second category; and in accordance with a determination that the set of one or more of the plurality of categories includes the first category, and that the second subset of the first plurality of media items that contain the second subject were selected and the first subset of the first plurality of media items that contain the first subject were not selected by the third input, the plurality of versions of the first background include media items from the second subset of the first plurality of media items in the second category without including the first subset of the first plurality of media items in the first category. For example, in some embodiments, even though many of the media items are identified by the computer system as including people or people's faces, only some of these are suitable for use in the background of the system user interface; and the computer system allows the user to manually single out these suitable or unsuitable media items on the basis of the automatic categorization and/or inclusion. In some embodiments, even though the computer system may identify media items corresponding to many different people, only some of these may be appealing to the user for use in the background of the system user interface, and the computer system allows the user to manually single out these suitable and unsuitable media items on the basis of the automatic categorization and/or inclusion. For example, FIGS. 6AQ-6AR illustrate wake screen user interface 6080 that includes an individual that is included in the people category as the background image of the wake screen user interface 6080, and wake screen user interface 6084 that includes a second individual that is included in the people category as the background image of the wake screen user interface 6084. Allowing the user to specify which individuals to include and to exclude from being displayed on the system user interface provides additional control options for the user without requiring the user to manually select and deselect individual media items, thereby reducing a number of inputs required to select media items to be included in the system user interface of the device.

In some embodiments, the second category corresponds (15032) to a pets category, a nature category, or an urban category; and the second plurality of media items associated with the computer system are automatically selected for inclusion in the second category based on the second plurality of media items containing automatically detected content corresponding to pets, nature, or urban subject matter (e.g., buildings, streets, and/or cars or other vehicles). In some embodiments, the third category is different from the first category and the second category and corresponds to a respective category selected from the pets category, the nature category, and the urban category; and the third plurality of media items associated with the computer system are automatically selected for inclusion in the third category based on the third plurality of media items containing automatically detected content corresponding to subject matter corresponding to the respective category (e.g., pets, nature, or urban subject matter). For example, FIG. 6U illustrates respective selectable representations of a plurality of categories, including people, pets, nature, and urban, which have respective select and/or deselect states that is changeable by user inputs directed to the respective selectable representations. Allowing the user to select from a plurality of categories that correspond to different types of subject matter, enables the device to automatically select and display a variety of media items from any of the selected categories that are likely to be of interest to the user, without requiring the user to manually identify media items that include the different types of subject matter, thereby reducing a number of inputs and an amount of time that is needed for the user to select settings for the system user interface of the device.

In some embodiments, the set of one or more of the plurality of categories that are selected by the first input includes (15034) at least two of the plurality of categories (e.g., includes the first category and the second category, or includes any two or more of the plurality of categories). In some embodiments, the first user interface allows the user to select multiple categories of the plurality of categories and/or deselected multiple categories of the plurality of categories in a single session before dismissing the first user interface. In some embodiments, the first user interface retains respective previously selected/unselected states of the plurality of categories, and selection of multiple categories and/or deselection of multiple categories are the cumulative results of multiple inputs entered during multiple sessions in which the first user interface was displayed and dismissed. For example, as described with reference to FIG. 6V, the categories people and pets are already selected, and user input 6010 corresponds to an input selecting urban as a category. Allowing the user to concurrently select multiple categories that correspond to different types of subject matter enables the device to automatically select and display a range of media items that are likely to be of interest to the user without limiting the user to one type of subject matter, and without requiring the user to manually identify media items that include the different types of subject matter, thereby reducing a number of inputs and an amount of time that is needed for the user to select settings for the system user interface of the device.

In some embodiments, the first user interface includes (15036) a plurality of previews of the system user interface that are generated based on a set of currently selected categories from the plurality of categories. For example, in some embodiments, the plurality of previews include at least a first preview that shows a version of the system user interface that is generated using a media item from a first selected category in its background, a second preview that shows a version of the system user interface that is generated using a media item from a second selected category, and optionally, additional previews that show different versions of the system user interface that are generated using media items from different selected categories. In some embodiments, the plurality of previews are arranged in a overlapping fashion, with one or more previews fully visible and one or more previews only partially visible. In some embodiments, as the user selects and deselect different categories, some of the plurality of previews corresponding to the deselected categories will cease to be displayed, while new previews corresponding to newly selected categories will be displayed. In some embodiments, the order of the previews may be rearranged when the categories are selected and/or deselected (e.g., with previews corresponding to the newly selected categories shown in the more prominent positions, and previews corresponding to earlier selected categories in less prominent positions). In some embodiments, displaying the plurality of previews of the system user interface includes: in accordance with a determination that the set of currently selected categories includes the first category without including the second category, displaying a first set of previews generated based on media items selected from the first category without displaying a second set of previews generated based on media items selected from the second category; in accordance with a determination that the set of currently selected categories includes the second category without including the first category, displaying the second set of previews generated based on media items selected from the second category without displaying the first set of previews generated based on media items selected from the first category; and in accordance with a determination that the set of currently selected categories includes the first category and the second category, displaying at least one preview selected from the first set of previews and at least one preview selected from the second set of previews. In some embodiments, in accordance with a determination that the set of currently selected categories includes the first category without including a third category, the plurality of previews of the system user interface includes the first set of previews generated based on media items selected from the first category without including a third set of previews generated based on media items selected from the third category; in accordance with a determination that the set of currently selected categories includes the third category without including the first category, the plurality of previews of the system user interface includes the third set of previews generated based on media items selected from the third category without including the first set of previews generated based on media items selected from the first category; and in accordance with a determination that the set of currently selected categories includes the first category and the third category, the plurality of previews of the system user interface includes at least one preview selected from the first set of previews and at least one preview selected from the third set of previews. For example, in FIG. 6U, while nature is selected as a category, representation 6003-1 that includes a flower (e.g., and is included in the nature category) is displayed, and after the user input 6006 deselects nature as a category, representation 6003-1 is no longer displayed, as illustrated in FIG. 6V. In response to an input specifying categories of media items to include or exclude from being displayed in a system user interface, adding or removing previews of the system user interfaces having the respective media items as the backgrounds, causes the device to automatically present current information to the user that reflects the user's currently selected categories, thereby providing feedback about a state of the device.

In some embodiments, the first user interface includes (15039) one or more selectable user interface objects for adjusting a respective frequency at which the computer system automatically shuffles through the two or more media items selected from the collection of media items in the first background over time (e.g., a first set of selectable controls (e.g., a shuffle frequency picker, a slider, and/or other control that provides a value adjustment/selection function) that sets a respective frequency at which the computer system automatically shuffles through the two or more media items or a control that when selected initiates a process to display a first set of selectable controls (e.g., a shuffle frequency picker, a slider, and/or other control that provides a value adjustment/selection function) that sets a respective frequency at which the computer system automatically shuffles through the two or more media items). In some embodiments, the first set of selectable controls are represented in a dropdown menu, or next to a set of radio buttons or check boxes. In some embodiments, the frequencies include one or more frequencies based on occurrence of a condition or event, and/or one or more frequencies based on elapse of time. In some embodiments, the first set of selectable controls are displayed in response to a touch hold gesture on a background of the system user interface as the system user interface is displayed. In some embodiments, the first set of selectable controls are displayed in a configuration user interface for configuring the system user interface. For example, as described with reference to FIG. 6Y, in response to detecting a user's request selecting (e.g., via user input 6030 and one or more subsequent inputs) a frequency in which to change from one media item to another media item, the device sets the frequency and automatically shuffles through media items selected from the set of selected categories based on occurrences of the condition(s) associated with the selected frequency. Providing an option to the user to select a frequency at which a system user interface automatically updates from displaying a first media item to displaying a second media item, enables the device to automatically update the system user interface according to the selected frequency without requiring the user to navigate to system settings and manually update the system user interface, thereby reducing a number of inputs required to change the current display of a device.

In some embodiments, the computer system detects (15040) occurrence of a first condition that corresponds to a request to transition from a low power state (e.g., a display-off state or a dimmed always-on state) to a normal state of the display generation component (e.g., detecting occurrence of the condition to wake the display generation component and/or the computer system from the low power state (e.g., the first condition includes arrival of a notification or alert, movement of the display generation component to an upright orientation, tap on the display generation component, a voice activation command, and/or activation of a home button or power button of the computer system)). In response to detecting the occurrence of the first condition, the computer system transitions the display generation component from the low power state to the normal state; and in accordance with a determination that the respective frequency is a first frequency (e.g., shuffle on wake, shuffle on wake from display-off state, and/or shuffle on wake from power-off state), displays the system user interface with a respective media item in the first background, wherein the respective media item is automatically selected from the collection of media items and is different from a last-displayed media item that was included in the first background when the system user interface was last displayed before the display generation component entered into the low power state. In some embodiments, in accordance with a determination that the respective frequency set by the first set of selectable controls is another frequency different from the first frequency, displaying the system user interface with the last-displayed media item in the first background (e.g., when pulling down the system user interface as a coversheet to hide the home screen or an application user interface, the computer system displays the same media item in the first background of the system user interface as what was shown in the system user interface when the system user interface was last displayed). For example, as described with reference to FIG. 6Y, user input 6030 enables the user to select a frequency that is based on detection of an event of the device 100, such as upon a lock and/or unlock cycle. Automatically updating a system user interface from displaying a first media item to displaying a second media item based on detecting the occurrence of a predefined event, including upon waking the device from a low power state, enables the device to automatically update the system user interface upon detection of the occurrence of the predefined event, without requiring the user to navigate to system settings and manually update the system user interface, thereby reducing a number of inputs required to change the current display of a device.

In some embodiments, while displaying the system user interface with the first background including a first media item selected from the collection of media items, the computer system detects (15042) a second input directed to the system user interface that meets first criteria (e.g., the second input is a tap input directed to the system user interface, a double tap on the system user interface, or a touch input on the system user interface that does not meet the criteria for triggering an editing mode for the system user interface). In some embodiments, in response to detecting the second input directed to the system user interface that meets the first criteria, in accordance with a determination that the respective frequency is a second frequency (e.g., shuffle on a press of a hardware or solid state button, shuffle on tap, shuffle on swipe, or shuffle on double tap on the system user interface (e.g., on the background, on the bottom, and/or on the edge of the system user interface)), the computer system updates the system user interface, including replacing the first media item in the first background with a second media item that is automatically selected from the collection of media items (e.g., the second media item is not manually selected by the second input, but rather is automatically selected from the media items that were automatically included in one of the user-selected categories for containing computer-detected content corresponding to the selected category). In some embodiments, the first media item and the second media item may be from different categories of the user-selected categories. For example, as described with reference to FIG. 6Y, user input 6030 enables the user to select a frequency that is based on detection of an event of the device 100, such as detecting a user input at device 100. Automatically updating a system user interface from displaying a first media item to displaying a second media item based on detecting the occurrence of a predefined event, including upon detecting a user input on the device, enables the device to automatically update the system user interface upon detection of the occurrence of the predefined event, without requiring the user to navigate to system settings and manually update the system user interface, thereby reducing a number of inputs required to change the current display of a device.

In some embodiments, while displaying the system user interface with the first background including a third media item selected from the collection of media items, the computer system determines (15044) whether a time period that the third media item has been used in the first background of the system user interface (e.g., a cumulative amount of time that the third media item has been used (e.g., regardless of actual display time of the system user interface) in the first background after replacing a last-displayed media item in the first background, amount of time that the third media item was included in the first background during the current display of the system user interface, or a cumulative amount of time that the third media item has been displayed (e.g., only actual display time count) in the first background after replacing the last-displayed media item in the first background) meets time-based criteria for switching (e.g., an hour, a day, or a time threshold of another duration has elapsed since the background of the system user interface has changed). In some embodiments, in response to detecting that the time-based criteria for switching has been met, in accordance with a determination that the respective frequency is a third frequency (e.g., shuffle every hour, shuffle every day, shuffle every two days, or shuffle with another preselected periodicity), the computer system updates the system user interface, including replacing the third media item in the first background with a fourth media item selected from the collection of media items. For example, as described with reference to FIG. 6Y, user input 6030 enables the user to select a frequency that is based on an amount of time (e.g., every 1 hour, 5 hours, daily, or another time-based frequency). Automatically updating a system user interface from displaying a first media item to displaying a second media item based on a time-based frequency, such as every hour or every day, enables the device to automatically update the system user interface according to the selected frequency, without requiring the user to navigate to system settings and manually update the system user interface, thereby reducing a number of inputs required to change the current display of a device.

In some embodiments, after the set of one or more of the plurality of categories were selected by the first input (e.g., after the user has dismissed the first user interface and redisplayed the first user interface, or while the first user interface is still displayed), the computer system detects (15046) a third input selecting one or more media items (e.g., from a plurality of media items associated with the computer system (e.g., photos stored on the computer system, photos associated with a photos application installed on the computer system, and/or photos corresponding to a user account corresponding to the computer system)) to include in a first set of media items (e.g., a set of manually selected media items, optionally including media items that are not automatically included any of the plurality of categories, and/or optionally including media items that are already automatically included in one or more of the plurality of categories), wherein the third input selects the one or more media items for inclusion in the first set of media items independent of whether the one or more media items belong to the set of one or more of the plurality of categories (e.g., some or all of the one or more manually selected media item may in in one or more unselected categories). In some embodiments, after the first set of media items have been selected by the third input (e.g., after the user has dismissed the first user interface and while the selection of the first set of media item is maintained by the computer system), the computer system displays the system user interface, wherein displaying the system user interface includes, over time displaying the system user interface with different versions of the first background respectively including media items selected from the first set of media items (e.g., independent of whether the media items belong to the set of one or more of the plurality of categories, or in addition to the media items from the set of one or more of the plurality of categories). In some embodiments, the manual selection of media items from a media library overrides the user selection of categories; and after manual selection of media items is made, the computer system shuffles the manually selected media items in the first background when displaying the system user interface but does not shuffle media items in the selected categories in the first background. In some embodiments, the manual selection of media items from a media library does not override the selection of categories; and after manual selection of media items is made, the computer system shuffles through media items selected from a set of media items including both the manually selected media items and items from the selected set of categories, in the first background when displaying the system user interface. For example, as described with reference to FIG. 6Y, user input 6032 causes the device to automatically select media items to be used as the background of the wake screen, while selection of the manually select affordance enables the user to identify particular media items (e.g., images or other media items) to be used as the background of the wake screen. Providing the user with an option to individually select and/or deselect media items to be displayed in the system user interface, and automatically rotating display of the selected media items, enables the device to automatically present a plurality of content items that are relevant to the user without requiring the user manually update the system user interface, thereby reducing a number of inputs required to change the current display of a device.

In some embodiments, the computer system displays (15048) a second user interface (e.g., a settings user interface, or another configuration user interface that includes options for configuring the system user interface or a wallpaper used for the system user interface) (e.g., the second user interface is different from the first user interface, and/or different from the system user interface), including a first selectable option for choosing a new background for the system user interface. In some embodiments, in response to detecting selection of the first selectable option in the second user interface, the computer system displays a prompt requesting user confirmation about whether to replace a currently displayed version of the system user interface (e.g., choose another version of the system user interface from a plurality of preconfigured versions of the system user interface to display, without modifying the currently displayed version of the system user interface) or to create a new version of the system user interface (e.g., create a new version of the system user interface and store it among the plurality of preconfigured versions of the system user interface for later use, without modifying the currently displayed version of the system user interface). In some embodiments, the first user interface provides options for modifying the currently displayed version of the system user interface, without creating a new version of the system user interface or replacing the currently displayed version of the system user interface with another preconfigured version of the system user interface. For example, in some embodiments, the user accesses user interface 652 (FIG. 6K) from a settings user interface, and after the user has created and/or edited a face, in response to user input 662 (FIG. 6L), device 100 displays a prompt asking the user whether to replace a current wake screen user interface with the created and/or edited face, or to add the created and/or edited face as an additional face (e.g., to be stored for later access and/or to be included in the rotating set of wake screen user interfaces). Providing the user with an option, while the user is creating a new background for the wake screen user interface, to replace a currently selected background of wake screen user interface with the new background for wake screen user interface, or to add the new background as an additional background option for the wake screen user interface, provides the user with additional control options for saving the newly created background, thereby reducing a number of inputs required to save a new background.

In some embodiments, the second user interface concurrently includes (15050): a second selectable option that, when selected, causes display of a first set of selectable user interface objects that configures the currently displayed version of the system user interface; a third selectable option that, when selected, causes display of a second set of selectable user interface objects that configures another system user interface (e.g., a home screen user interface, a desktop, and/or another system user interface that is different from the system user interface recited above) that is different from the system user interface and a fourth selectable option, that, when selected, causes display of a third set of selectable user interface objects that creates and configures a new version of the system user interface without changing the currently displayed version of the system user interface. For example, in some embodiments, the user accesses user interface 606 (FIG. 6F) from a settings user interface, and user interface 606 includes an option to edit a current wake screen user interface (e.g., as illustrated in FIGS. 6G-6H), an option to edit a current home screen user interface (e.g., as illustrated in FIGS. 6I-6J), or create a new wake screen user interface (e.g., using the plus affordance illustrated in FIG. 6F). Concurrently displaying options for the user to edit an existing wake screen, edit an existing home screen, and create a new wake screen, provides the user with additional control options for modifying system user interfaces, without requiring the user to navigate through individual menus, thereby reducing a number of inputs required to modify or create system user interfaces.

In some embodiments, displaying the system user interface includes (15052): in accordance with a determination that a respective media item (e.g., a first media item, a second media item, or a third media item, selected from the same category, different categories, and/or the set of manually selected media items) from the collection of media items is to be included in the first background (e.g., in the currently displayed version of the first background) (e.g., in response to detecting an adjustment of a size and/or center of the respective media item in the first background): in accordance with a determination that a foreground portion of the respective media item (e.g., a person or pet represented in the media item, or a main subject matter represented in the media item) overlaps with the first set of one or more system user interface objects by less than a first threshold amount of overlap (e.g., 5% of the area occupied by the first set of one or more system user interface objects, or another amount of area occupied by the first set of one or more system user interface objects), displaying the foreground portion of the respective media item at a simulated depth that is in front of a simulated depth of the first set of one or more system user interface objects in the system user interface (the foreground portion of the respective media item would block some portions of the first set of one or more system user interface objects in the system user interface, while the background portions of the respective media item are displayed at a greater display depth than the first set of system user interface objects and behind the first set of system user interface objects); and in accordance with a determination that the foreground portion of the respective media item overlaps with the first set of one or more system user interface objects by more than the first threshold amount of overlap, displaying the foreground portion of the respective media item at a simulated depth that is behind the simulated depth of the first set of one or more system user interface objects in the system user interface (e.g., the foreground portion of the respective media item and the background portions of the respective media item are both displayed at simulated depths that is behind the simulated depth of the first set of one or more system user interface objects, and at least a portion of the foreground portion of the respective media item is blocked (e.g., displayed as being behind in its simulated depth) by the first set of one or more system user interface objects). For example, in FIG. 5AJ, user input 5004 causes the device to increase a size of the subject of the wake screen user interface, and in accordance with a determination that the subject increases by a threshold amount (e.g., overlaps with the complications and/or time indication by at least the threshold amount), the complications and/or time indication are displayed in front of the subject. Automatically changing display of a photo that has been expanded in size to overlap displayed user interface elements, such that the displayed photo appears to be behind the user interface elements, causes the device to automatically present information in the user interface elements that is likely to be of interest to the user, without obstruction of the enlarged photo, in an efficient way in the display area, thereby reducing an amount of time that is needed for the user to view the information.

In some embodiments, while displaying the system user interface with the first background including the respective media item, the computer system detects (15054) a fourth input that changes an amount of overlap between the foreground portion of the respective media item and the first set of system user interface objects (e.g., resizes and/or recenters the first media item). In some embodiments, in response to detecting the fourth input: in accordance with a determination that the fourth input changes the amount of overlap between the foreground portion of the respective media item and the first set of system user interface objects from less than the first threshold amount of overlap to more than the first threshold amount of overlap: the computer system displays the system user interface with the respective media item enlarged and/or recentered in the first background; and increases the simulated depth of the foreground portion of the respective media item such that the foreground portion of the respective media item is displayed with a simulated depth that is behind the simulated depth of the first set of one or more system user interface objects in the system user interface; and in accordance with a determination that the fourth input changes the amount of overlap between the foreground portion of the respective media item and the first set of system user interface objects from more than the first threshold amount of overlap to less than the first threshold amount of overlap: the computer system displays the system user interface with the respective media item shrunken and/or recentered in the first background; and decreases the simulated depth of the foreground portion of the respective media item such that the foreground portion of the respective media item is displayed with a simulated depth that is in front of the simulated depth of the first set of one or more system user interface objects in the system user interface. In some embodiments, as the user resizes and/or recenters a respective media item used in the first background of the system user interface, the foreground portion of the respective media item may pop in front of or be pushed behind the set of system user interface objects depending on the amount of overlap between the foreground portion of the respective media item and the set of system user interface objects (e.g., a small amount of overlap allows the foreground portion of the respective media item to remain in the foreground in front of the set of system user interface objects, but a large amount of overlap that obscured too much of the view of the set of system user interface objects is not permitted). For example, in FIG. 5AK, user input 5006 causes the device to decrease a size of the subject of the wake screen user interface, and in accordance with a determination that the subject decreases by a threshold amount (e.g., overlaps with the complications and/or time indication by less than a threshold amount), the complications and/or time indication are displayed behind the subject. Automatically changing a perceived depth of elements in a photo based on an amount of overlap of the elements in the photo with displayed user interface elements, such that only a small amount of overlap causes the photo to be displayed in front of the user interface elements, whereas a large amount of overlap causes the photo to be displayed behind the user interface elements, causes the device to automatically present content to the user in an efficient way in the display area, thereby reducing an amount of time that is needed for the user to view the information.

It should be understood that the particular order in which the operations in FIGS. 15A-15I have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1000, 1100, 12000, 1300, 14000, 16000, and 17000) are also applicable in an analogous manner to method 14000 described above with respect to FIGS. 15A-15I. For example, the contacts, gestures, and user interface objects,—described above with reference to method 15000 optionally have one or more of the characteristics of the contacts, gestures, and user interface objects, described herein with reference to other methods described herein (e.g., 900, 1000, 1100, 12000, 1300, 14000, 16000, and 17000). For brevity, these details are not repeated here.

FIGS. 16A-16J are flow diagrams illustrating method 16000 for applying different versions of a filter to a background media item, in accordance with some embodiments. Method 16000 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 16000 are, optionally, combined and/or the order of some operations is, optionally, changed.

As described below, method 16000 is a method for automatically detecting visual properties of an original background image, and providing a recommended set of backgrounds, each background having a version of a filter applied to the image that is selected based at least in part on the visual properties of the original background image, enables the device to provide backgrounds that are automatically selected to visually enhance a particular image in a manner that is likely to be visually pleasing to the user, without requiring the user to manually edit visual properties of the particular image, thereby reducing a number of inputs required to achieve a desired background image.

The method 16000 is performed at a computer system with a display component (16002). The computer system displays (16004), via the display generation component, a first representation of a system user interface (e.g., the wake screen user interface, home screen user interface, lock screen user interface or the desktop user interface as the currently displayed user interface of the computer system, and/or a representation of a wake screen user interface, a home screen user interface associated with a wake screen user interface, a lock screen user interface, or a desktop user interface that is displayed in an editing user interface for configuring the wake screen user interface, the home screen user interface, the lock screen user interface, or the desktop user interface), wherein a respective version of the system user interface includes a respective background and a respective set of one or more system user interface objects (e.g., a plurality of user selectable objects, such as complications, widgets, shortcuts and/or a plurality of user interface objects such as a time object, and/or a date object) overlaying the respective background, and wherein the first representation of the system user interface corresponds to a first version of the system user interface illustrating a first set of one or more system user interface objects (e.g., editable system user interface objects, and/or non-editable system user interface objects) overlaying a first background (e.g., the first background is an original photo without an applied filter, or the first background is a photo with a currently selected filter applied). For example, FIG. 6Z illustrates a first background (e.g., an original background labeled "Natural") for a wake screen user interface. In some embodiments, the wake screen user interface illustrated in FIG. 6Z optionally includes an indication of the date, an indication of the time, and/or one or more complications.

While displaying the first representation of the system user interface that corresponds to the first version of the system user interface, the computer system detects (16006) occurrence of a first condition that causes the computer system to change an appearance of the system user interface based on a first combination of a first background media item (e.g., a photo, graphics, or video selected from one or more selected categories, a set of manually selected media items, and/or a set of system-selected media items) and a first filter (e.g., a filter selected from filters of different photo effects (e.g., studio color, dual tone, black and white, color backdrop, color wash, and/or other photo filters), filters of different colors, and/or filters of other visual properties (e.g., luminance, tone, and/or tint) that is applied to the background and/or a foreground of the background media item) for the system user interface. In some embodiments, detecting the occurrence of the first condition includes detecting occurrence of a condition for automatically shuffling through two or more media items in the first background of the system user interface, where the first combination of the first background media item and the first filter includes a new background media item and a currently used filter. In some embodiments, detecting the occurrence of the first condition includes detecting occurrence of a condition for manually shuffling through two or more preconfigured versions of the system user interface, where the first combination of the first background media item and the first filter includes a new background media item and a new filter, a new background media item and a currently used filter, or a currently used background media item and a new filter. In some embodiments, detecting the occurrence of the first condition includes detecting a user input that causes the currently displayed version of the system user interface to be replaced by another version of the system user interface (e.g., a horizontal swipe on the system user interface to switch to another version of the system user interface without entering the editing mode of the system user interface), where the first combination of the first background media item and the first filter includes a new background media item and a new filter, a new background media item and a currently used filter, or a currently used background media item and a new filter (e.g., filters of different photo effects (e.g., studio color, dual tone, black and white, color backdrop, color wash, and/or other photo filters), filters of different colors, and/or filters of other visual properties (e.g., luminance, tone, and/or tint)). For example, as described with reference to FIG. 6Y, in some embodiments, the user selects a frequency for changing display of the wake screen user interface from having a first background to a second background. In some embodiments, detecting occurrence of the first condition comprises satisfying the selected frequency (e.g., event-based frequency or time-based frequency).

In response to detecting the occurrence of the first condition (16008) that causes the computer system to change the appearance of the system user interface based on the first combination of the first background media item and the first filter for the system user interface: in accordance with a determination that the first combination of the first background media item and the first filter meets first criteria, wherein the first criteria require that a first set of one or more visual properties of the first background media item meets a first requirement in order for the first combination of the first background media item and the first filter to meet the first criteria, the computer system applies (16010) a first version of the first filter to the first background media item to create a second version of the system user interface by modifying the first background media item in a first manner (e.g., the first version of the first filter is applied to the whole image including background portion and foreground portion of the first background media item, the first version of the first filter is applied to the background portion and not the foreground portion of the first background media item) (e.g., the background of the second version of the system user interface includes at least a portion of the first background media item) For example, as described with reference to FIGS. 6AA-6AB, the duotone background (e.g., a duotone filter), which is applied to the content of the original background image, is automatically selected to be a low-key version of the duotone background in accordance with a determination that the original background (e.g., a natural filter, or no filter) illustrated in FIG. 6AA has a calculated low-key tone.

In accordance with a determination that the first combination of the first background media item and the first filter meets second criteria, wherein the second criteria require that the first set of one or more visual properties of the first background media item meets a second requirement different from the first requirement in order for the first background media item to meet the second criteria, the computer system applies (16012) a second version of the first filter to the first background media item to create the second version of the system user interface by modifying the first background media item in a second manner that is different from the first manner (e.g., the second background for the second version of the system user interface includes at least a portion of the first background media item) (e.g., the second version of the first filter is applied to the whole image including background portion and foreground portion of the first background media item, or the second version of the first filter is applied to the background portion and not the foreground portion of the first background media item). In some embodiments, a background portion of the first background media item comprises one or more objects, colors, or other visual features that appear behind and/or around a foreground portion of the first background media item, wherein the foreground portion includes one or more subjects (e.g., individuals, pets, buildings, or other objects that are determined to be the subject of the media item). In some embodiments, the foreground portion is determined to be within a center region of the displayed media item, and the background portion is around the center region and includes the portions of the media item that are not identified as the subject. In some embodiments, the first set of one or more visual properties corresponds to visual properties that affect the overall brightness of the first background media item and/or the brightness of the background portion of the first background media item. In some embodiments, the background portion of the first background media item includes portions of the first background media item that is outside of the foreground portion of the first background media item representing the main subject matter of the first background media item (e.g., the person, pet, or other main subject matter of the photo, video, and/or graphics). In some embodiments, for a respective background media item that is overall very bright or has a bright background portion, a high-key version of the first filter is used to modify the respective background media item (e.g., changing its colors and/or tones); for a respective background media item that is overall very dark or has a dark background portion, a low-key version of the first filter is used to modify the respective background media item (e.g., changing its colors and/or tones). In some embodiments, for a respective background media item that is overall neutral or has a neutral background portion, a neutral version of the first filter is used to modify the respective background media item (e.g., changing its colors and/or tones). In some embodiments, different colors have different corresponding tones, and when applying a color filter, different versions of the color filter having the same tint but different tones may be chosen depending on the first set of visual properties of the respective background media item (e.g., based on whether the background portion of the media item or the overall quality of the media item is dark, light, or neutral). For example, as described with reference to FIGS. 6AE-6AF, the duotone background (e.g., duotone filter) in FIG. 6AF is automatically selected to be a high-key version of the duotone background in accordance with a determination that the original background image, illustrated in FIG. 6AE, has a high-key tone.

In some embodiments, detecting the occurrence of the first condition that causes the computer system to change the appearance of the system user interface based on the first combination of the first background media item and the first filter for the system user interface includes (16014): detecting (e.g., while displaying the first version of the system user interface, or upon transitioning from a low power state to a normal state) that preset criteria for switching from displaying the first version of the system user interface to displaying the second version of the system user interface are met (e.g., upon waking the display generation component, upon detecting a tap on the system user interface, upon determining that the first version of the system user interface has been displayed for more than a threshold amount of time, and/or another condition for automatic switching from the first version of the system user interface to the second version of the system user interface; upon manual switching from the first version of the system user interface to the second version of the system user interface (e.g., in response to a swipe input on the system user interface while the first version of the system user interface is displayed); and/or upon placement of an enclosure or other accessory on the display generation component and/or upon removal of the enclosure or accessory from the display generation component), wherein the first version of the system user interface is not based on the first combination of the first background media item and the first filter. In some embodiments, the first version of the system user interface optionally includes a background media item that is different from the first background media item and is generated using the first filter. In some embodiments, the first version of the system user interface optionally includes the first background media item and is generated using a filter that is different from the first filter. In some embodiments, the first version of the system user interface optionally includes a background media item that is different from the first background media item and is generated using a filter that is different from the first filter or does not use a filter. For example, as described with reference to method 15000, in some embodiments, the wake screen user interface automatically updates from a first wake screen user interface to a second wake screen user interface in accordance with a frequency selected by the user (e.g., as described with reference to FIG. 6Y). For example, FIGS. 6AQ-6AR illustrate filters (e.g., a duotone filter applied to a high-key background photo in wake screen user interface 6080, and a studio filter applied to a low-key background photo in wake screen user interface 6084). In some embodiments, in response to detecting one or more swipe inputs directed to the wake screen user interface (e.g., in FIG. 6AQ), the device selects different filters applied to a same background photo while displaying the wake screen user interface (e.g., not in editing mode). Automatically changing a system user interface according to a predefined frequency selected by the user without requiring the user to manually request changing the system user interface, enables the device to display different system user interfaces without requiring user input, thereby reducing a number of inputs and providing access to other system user interfaces without displaying additional controls.

In some embodiments, detecting the occurrence of the first condition that causes the computer system to change the appearance of the system user interface based on the first combination of the first background media item and the first filter for the system user interface includes (16016): while in a user interface for configuring the appearance of the system user interface, detecting a first input that changes one or more aspects of the first background of the first version of the system user interface (e.g., inputs changing a color of the first background, a font color of the system user interface objects, changing the background media item to be used in the background of the system user interface, and/or changing a filter or visual effect applied to the background of the system user interface, e.g., as detected in an editing user interface for the system user interface), including changing a respective background media item used in the first background of the first version of the system user interface to the first background media item, and/or changing a respective filter used in the first background of the first version of the system user interface to the first filter. In some embodiments, detecting the occurrence of the first condition that causes the computer system to change the appearance of the system user interface based on the first combination of the first background media item and the first filter for the system user interface includes: detecting a second user input that changes one or more aspects of the first set of one or more system user interface objects (e.g., changing the font colors, and/or the set of complications, widgets, and/or other system user interface objects included in the system user interface) in the first version of the system user interface. In some embodiments, the first user input includes a user input that causes the computer system to switch from displaying the first representation of the system user interface to displaying a second representation of the system user interface that corresponds to the second version of the system user interface having a different background media item and/or a different filter, and optionally, a different set of system user interface objects overlaying the second background of the second version of the system user interface. More details about changing one or more aspects of the first background of the first version of the system user interface can be found in the description of method 1100. For example, as described with reference to FIGS. 6Z-6AD, the device switches between different filters (e.g., natural, duotone, black and white, studio, and/or color) in response to one or more swipe inputs directed to the editing user interface 6034-2 and/or other inputs that manually change the applied filters, while displaying editing user interface 6034-2. Presenting a plurality of system user interface options while the user is in an editing mode for the system user interface, the plurality of system user interface options generated with visual properties based on an original system user interface, enables the device to automatically provide a plurality of different system user interfaces that are likely to be visually pleasing to the user, without requiring user input to manually create or edit the system user interfaces, thereby reducing a number of inputs needed to create and select a respective version of a system user interface.

In some embodiments, detecting the first input that changes one or more aspects of the first background of the first version of the system user interface includes (16018) detecting the first user input that changes the respective background media item used in the first background of the first version of the system user interface to the first background media item, without changing the respective filter used in the first background of the first version of the system user interface. In some embodiments, while in editing mode, such as in FIG. 6AA, the device changes one or more properties of the wake screen user interface in response to one or more user inputs without switching to a different filter. For example, the natural filter is maintained while the user modifies the textual indication of the date, textual indication of the time, and/or one or more complications in the wake screen user interface. In some embodiments, the device optionally performs any of the editing functions described with reference to FIGS. 5Y-5AF without changing the background filter. Providing the user with an option to edit one or more properties of the background of a system user interface without changing a filter appearance applied to the system user interface, enables a user to control what information is displayed and how the information is displayed in the system user interface without impacting a visual aesthetic of the background of the system user interface, thereby providing additional control options for the user to customize the system user interface.

In some embodiments, detecting the first user input that changes one or more aspects of the first background of the first version of the system user interface includes (16020) detecting the first user input that changes the respective filter used in the first background of the first version of the system user interface to the first filter, without changing the respective background media item used in the first background of the first version of the system user interface. For example, user input 6040 (FIG. 6AA) causes the device to change the filter from natural to duotone (e.g., as illustrated in FIG. 6AB) without changing the image (e.g., the content of the photo remains with a different filter and/or coloring applied). Providing the user with an option to edit a filter appearance applied to the system user interface, without changing the content in the background of the system user interface, enables a user to select different visual aesthetics to a same background of the system user interface, thereby providing additional control options for the user to customize which filter is applied to the background of the system user interface.

In some embodiments, while displaying the first representation of the system user interface that corresponds to the first version of the system user interface, the computer system detects (16022) a second user input that changes one or more aspects of the first set of one or more system user interface objects in the first version of the system user interface; and, in response to detecting the second user input, changing the one or more aspects of the first set of one or more system user interface in the first version of the system user interface without changing one or more aspects of the first background of the first version of the system user interface. In some embodiments, while in editing mode, such as in FIG. 6AA, the device changes one or more properties of the wake screen user interface in response to one or more user inputs without switching the background image. For example, the natural filter is maintained while the user modifies the textual indication of the date, textual indication of the time, and/or one or more complications in the wake screen user interface. In some embodiments, the device optionally performs any of the editing functions described with reference to FIGS. 5Y-5AF without changing the background image. Providing the user with an option to edit one or more user interface elements of a system user interface without changing the background of the system user interface, enables a user to control what information is displayed and how the information is displayed using the one or more user interface elements, such as by modifying display of the date, time, and/or complications, thereby providing additional control options for the user. For example, in some embodiments, the computer system allows the user to change one or more aspects of the system user interface (e.g., changing the font of the system generated text, changing the type and appearances of the complications, and/or changing the layout of the system user interface objects) without changing the background media item, the filter, and/or the appearance of the background of the system user interface.

In some embodiments, in response to detecting the occurrence of the first condition that causes the computer system to change the appearance of the system user interface based on the first combination of the first background media item and the first filter for the system user interface, the computer system (16024): replaces display of the first representation of the system user interface with display of a second representation of the system user interface (e.g., the wake screen user interface, home screen user interface, lock screen user interface or the desktop user interface as the currently displayed user interface of the computer system, and/or a representation of a wake screen user interface, a home screen user interface associated with a wake screen user interface, a lock screen user interface, or a desktop user interface that is displayed in an editing user interface for configuring the wake screen user interface, the home screen user interface, the lock screen user interface, or the desktop user interface), wherein the second representation of the system user interface corresponds to the second version of the system user interface, and the second version of the system user interface includes a second set of system user interface object (e.g., different from the first set of system user interface objects, or same as the first set of system user interface objects) overlaying a second background that has been generated based on the combination of the first background media item and the first filter. In some embodiments, the second set of system user interface objects are the same as the first set of system user interface object. In some embodiments, the second set of system user interface objects and the first set of system user interface objects are different in at least one aspect, such as the type(s) of system user interface objects that are included, the format(s) of the system user interface objects that are included, and/or the color, visual effect, and/or other visual properties of the system user interface objects that are included. For example, in response to user input 6062 (FIG. 6AI), the second version of the wake screen user interface is displayed with a different filter (e.g., a color filter) in FIG. 6AJ, and one or more of the indication of the date, time, and/or one or more complications are updated in response to user input 6062. For example, in FIG. 6AJ, a color of the text used to display the date and time indication is updated. In some embodiments, a different set of complications is provided concurrently while changing a filter applied to the background of the wake screen user interface. Providing a first set of user interface objects with a first background of a system user interface and a second set of user interface objects that are different from the first set of user interface objects, with a second background of the system user interface, causes the device to automatically change the information that is displayed in the system user, including updating a set of complications for applications that have their content displayed, thereby reducing the amount of time that is needed for the user to view current information about the device.

In some embodiments, the first plurality of system user interface objects include (16026) a first set of system generated text, and the second plurality of system user interface objects include a second set of system generated text (e.g., the system generated text includes text indicating the current date, current time, textual information presented in complications and widgets, text for notifications, live session, alerts, and/or system prompts). In some embodiments, in response to detecting the occurrence of the first condition that causes the computer system to change the appearance of the system user interface based on the first combination of the first background media item and the first filter for the system user interface, the computer system: in accordance with a determination that the first combination of the first background media item and the first filter meets the first criteria, replaces display of the first set of system generated text with display of the second set of system generated text, wherein a first set of font colors is selected for the second set of system generated text in accordance with the first version of the first filter. For example, in FIG. 6AB, the textual indications of the time and date are displayed with a first color (e.g., black) that is selected in accordance with a determination that the original background image is a low-key image. In some embodiments, in accordance with a determination that the first combination of the first background media item and the first filter meets the second criteria, the computer system replaces display of the first set of system generated text with display of the second set of system generated text, wherein a second set of font colors is selected for the second set of system generated text in accordance with the second version of the first filter, and wherein the second set of font colors is different from the first set of font colors. For example, in FIG. 6AF, the textual indications of the time and date are displayed with a second color (e.g., grey) that is selected in accordance with a determination that the original background image is a high-key image. In some embodiments, the set of font colors that is selected for the system generated text used with a respective background media item has visual properties that aid the visual clarity and saliency of the system generated text given the visual properties of the background media item in use and the filter that is applied to the background media item to generate the background of the system user interface. For example, if the first background media item has a dark background, a low-key version of the first filter is used to generate the background of the second version of the system user interface, and the font colors of the system text shown in the second version of the system user interface are light colors (e.g., colors with brighter tones) to contrast with the background modified by the low-key version of the first filter; if the first background media item has a light background, a high-key version of the first filter is used to generate the background of the second version of the system user interface, and the font colors of the system text shown in the second version of the system user interface are dark colors to contrast with the background modified by the high-key version of the first filter. In some embodiments, the condition for switching the font colors of the system text is different from (e.g., offset in threshold value(s) from) the condition for switching between the different versions of the first filter. Automatically changing a font of system generated text based on the visual properties of a current background of a system user interface, provides the user with fast and easy access to the information included in the system generated text, without requiring the user to adjust a color of the text in order to view the text over the background of the system user interface, even as the background of the system user interface changes, thereby reducing a number of inputs needed to view the information.

In some embodiments, while displaying a representation of the system user interface that corresponds to the second version of the system user interface (e.g., the wake screen user interface, home screen user interface, lock screen user interface or the desktop user interface as the currently displayed user interface of the computer system, and/or a representation of a wake screen user interface, a home screen user interface associated with a wake screen user interface, a lock screen user interface, or a desktop user interface that is displayed in an editing user interface for configuring the wake screen user interface, the home screen user interface, the lock screen user interface, or the desktop user interface), the computer system detects (16028) occurrence of a second condition (e.g., same as the first condition, or different from the first condition) that causes the computer system to change the appearance of the system user interface based on a second combination of a second background media item and a second filter for the system user interface, wherein the second combination of the second background media item and the second filter is different from the first combination of the first background media item and the first filter (e.g., the first background media item is different from the second background media item, and/or the first filter is different from the second filter). In some embodiments, detecting the occurrence of the second condition includes detecting occurrence of a condition for automatically shuffling through two or more media items in the first background of the system user interface, where the second combination of the second background media item and the second filter includes a new background media item and a currently used filter. In some embodiments, detecting the occurrence of the second condition includes detecting occurrence of a condition for manually shuffling through two or more preconfigured versions of the system user interface, where the second combination of the second background media item and the second filter includes a new background media item and a new filter, a new background media item and a currently used filter, or a currently used background media item and a new filter. In some embodiments, detecting the occurrence of the second condition includes detecting a user input that causes the currently displayed version of the system user interface to be replaced by another version of the system user interface (e.g., a horizontal swipe on the system user interface to switch to another version of the system user interface without entering the editing mode of the system user interface), where the second combination of the second background media item and the second filter includes a new background media item and a new filter, a new background media item and a currently used filter, or a currently used background media item and a new filter (e.g., filters of different photo effects (e.g., studio color, dual tone, black and white, color backdrop, color wash, and/or other photo filters), filters of different colors, and/or filters of other visual properties (e.g., luminance, tone, and/or tint)). In some embodiments, in response to detecting the occurrence of the second condition that causes the computer system to change the appearance of the system user interface based on the second combination of the second background media item and the second filter for the system user interface, the computer system: in accordance with a determination that the second combination of the second background media item and the second filter meets the first criteria, wherein the first criteria require that the first set of one or more visual properties of the second background media item meets the first requirement in order for the second combination of the second background media item and the second filter to meet the first criteria, applies a first version of the second filter to the second background media item to create a third version of the system user interface by modifying the second background media item in a third manner (e.g., the first version of the second filter is applied to the entirety of the second background media item including background portion and foreground portion of the second background media item, the first version of the second filter is applied to the background portion and not the foreground portion of the second background media item) (e.g., the background of the third version of the system user interface includes at least a portion of the second background media item); and in accordance with a determination that the second combination of the second background media item and the second filter meets the second criteria, wherein the second criteria require that the first set of one or more visual properties of the second background media item meets the second requirement in order for the second background media item to meet the second criteria, applies a second version of the second filter to the second background media item to create the third version of the system user interface by modifying the second background media item in a fourth manner that is different from the third manner (e.g., the second version of the second filter is applied to the entirety of the second background media item including background portion and foreground portion of the second background media item, or the second version of the second filter is applied to the background portion and not the foreground portion of the second background media item) (e.g., the third background for the third version of the system user interface includes at least a portion of the second background media item). In some embodiments, the first set of one or more visual properties corresponds to visual properties that affect the overall brightness of the second background media item and/or the brightness of the background portion of the second background media item. In some embodiments, the background portion of the second background media item includes portions of the second background media item that is outside of the foreground portion of the second background media item representing the main subject matter of the second background media item (e.g., the person, pet, or other main subject matter of the photo, video, and/or graphics). In some embodiments, for a respective background media item that is overall very bright or has a bright background portion, a high-key version of the second filter is used to modify the respective background media item (e.g., changing its colors and/or tones); for a respective background media item that is overall very dark or has a dark background portion, a low-key version of the second filter is used to modify the respective background media item (e.g., changing its colors and/or tones). In some embodiments, for a respective background media item that is overall neutral or has a neutral background portion, a neutral version of the second filter is used to modify the respective background media item (e.g., changing its colors and/or tones). In some embodiments, different colors have different corresponding tones, and when applying a color filter, different versions of the color filter having the same tint but different tones may be chosen depending on the first set of visual properties of the respective background media item (e.g., based on whether the background portion of the media item or the overall quality of the media item is dark, light, or neutral). For example, as described with reference to FIGS. 6AE-6AG, in accordance with the original background image in FIG. 6AE being a high-key background, the device displays additional filters that have high-key properties, including the duotone filter in FIG. 6AF and the studio filter in FIG. 6AG. Automatically detecting visual properties of a second original background image, and providing a recommended set of backgrounds, each background having a version of a filter applied to the image that is selected based at least in part on the visual properties of the second original background image, enables the device to provide backgrounds that are automatically selected to visually enhance a particular image in a manner that is likely to be visually pleasing to the user, without requiring the user to manually edit visual properties of the particular image, thereby reducing a number of inputs required to achieve a desired background image.

In some embodiments, while displaying the system user interface with the first combination of the first background media item and the first filter for the system user interface, the computer system detects (16030) a third user input corresponding to a request to display the system user interface with a second filter that is different from the first filter (e.g., a swipe gesture that causes the currently used photo filter to change from a first photo filter to a second photo filter, or from a first color filter to a second color filter, without changing the background media item used to generate the background). In some embodiments, in response to detecting the third user input corresponding to the request to display the system user interface with the second filter, the computer system: in accordance with a determination that a respective combination of the first background media item and the second filter meets the first criteria, wherein the first criteria require that the first set of one or more visual properties of the first background media item meets the first requirement in order for the respective combination of the first background media item and the second filter to meet the first criteria, applies a first version of the second filter to the first background media item to create a third version of the system user interface by modifying the first background media item in a third manner that is different from the first manner and the second manner (e.g., the first version of the second filter is applied to the whole image including background portion and foreground portion of the first background media item, or the first version of the second filter is applied to the background portion and not the foreground portion of the first background media item) (e.g., the background of the third version of the system user interface includes at least a portion of the first background media item); and in accordance with a determination that the respective combination of the first background media item and the second filter meets the second criteria, wherein the second criteria require that the first set of one or more visual properties of the first background media item meets the second requirement different from the first requirement in order for the first background media item to meet the second criteria, applies a second version of the second filter to the first background media item to create the third version of the system user interface by modifying the first background media item in a fourth manner that is different from the third manner, the second manner, and the first manner (e.g., the second version of the second filter is applied to the whole image including background portion and foreground portion of the first background media item, or the second version of the second filter is applied to the background portion and not the foreground portion of the first background media item) (e.g., the background of the third version of the system user interface includes at least a portion of the first background media item). For example, as described with reference to FIGS. 6AE-6AG, in accordance with the original background image in FIG. 6AE being a high-key background, the device automatically selects respective high-key versions of a plurality of filters for display to the user; and in FIGS. 6AA-6AB, in accordance with the original background image in FIG. 6AA being a low-key background, the device automatically selects respective low-key versions of the plurality of filters for display to the user. Providing a recommended set of backgrounds that share a visual aesthetic that is selected based on the original background image, without requiring the user to manually edit visual properties of the particular image while applying different filters to the image, causes the device to display multiple options for the background image that are likely to be visually pleasing to the user, thereby reducing a number of inputs required to achieve a desired background image).

In some embodiments, the first set of one or more visual properties of the first background media item includes (16032) a first measure of brightness (e.g., luminance, gray value, tone, or another analogous measure of brightness) of a respective background portion of the first background media item (e.g., portions outside of the main subject matter of the first background media item). In some embodiments, the brightness level of the foreground portion of the first background media item is also included in the first set of one or more visual properties but is given a reduced weight than the brightness level of the background portion of the first background media item, when choosing between the different versions of the first filter to use on the first background media item. For example, as described with reference to FIG. 6AA, a brightness, or luminance, of the original background image is determined, and used to select the version of the filter applied to the other views of the background image. Automatically detecting a brightness of an original background image, and providing a recommended set of backgrounds, each background having a version of a filter applied to the image that is selected based at least in part on the brightness of the original background image, enables the device to provide backgrounds that are automatically selected to visually enhance an image while maintaining an overall brightness of the background, in a manner that is likely to be visually pleasing to the user, without requiring the user to manually edit visual properties of the particular image, thereby reducing a number of inputs required to achieve a desired background image.

In some embodiments, in accordance with a determination that the second version of the system user interface was created by applying the first version of the first filter to the first background media item and modifying the first background media item in the first manner, displaying a selectable representation of the second version of the first filter that was not applied in creating the second version of the system user interface (e.g., displaying the selectable representation of the second version of the first filter with a second representation of the system user interface that corresponds to the second version of the system user interface) (e.g., displaying the selectable representation of the second version of the first filter in a drop down menu that is invoked by the user touching the first background in the system user interface), the computer system detects (16034) a third user input that selects the selectable representation of the second version of the first filter that was not applied in creating the second version of the system user interface. In some embodiments, in response to detecting the third user input selecting the selectable representation of the second version of the first filter that was not applied in creating the second version of the system user interface, the computer system applies the second version of the first filter to the first background media item to create a first revised second version of the system user interface by modifying the first background media item in the second manner (and, optionally, replacing display of the second representation of the system user interface that corresponds to the second version of the system user interface with display of a first revised second representation of the system user interface that corresponds to the first revised second version of the system user interface). For example, in FIG. 6AB, user input 6044 manually selects to switch to the high-key version of the background image with the duotone filter, after the low-key version of the background image with the duotone filter was automatically provided based on the visual properties of the original image in FIG. 6AA. Providing the user with an option to invert the version of a filtered background that was automatically selected based at least in part on visual properties of an original background image, enables the user to quickly and easily switch between the automatically selected version and the inverted version, thereby providing additional controls for the user.

In some embodiments, in accordance with a determination that the second version of the system user interface was created by applying the second version of the first filter to the first background media item and modifying the first background media item in the second manner, the computer system displays (16036) a selectable representation of the first version of the first filter that was not applied in creating the second version of the system user interface (e.g., displaying the selectable representation of the first version of the first filter with a second representation of the system user interface that corresponds to the second version of the system user interface) (e.g., displaying the selectable representation of the first version of the first filter in a drop down menu that is invoked by the user touching the first background in the system user interface), detects a fourth user input that selects the selectable representation of the first version of the first filter that was not applied in creating the second version of the system user interface; and in response to detecting the fourth user input selecting the selectable representation of the first version of the first filter that was not applied in creating the second version of the system user interface, applies the first version of the first filter to the first background media item to create a second revised second version of the system user interface by modifying the first background media item in the first manner (and, optionally, replacing display of the second representation of the system user interface that corresponds to the second version of the system user interface with display of a second revised second representation of the system user interface that corresponds to the second revised second version of the system user interface). For example, in FIG. 6AG, in response to user input 6058, the low-key version of the studio filter is applied to the background image after automatically providing the high-key version of the studio filter based on the visual properties of the original image illustrated in FIG. 6AE. Providing the user with an option to invert the version of a filtered background that was automatically selected based at least in part on visual properties of an original background image, enables the user to quickly and easily switch between the automatically selected version and the inverted version, thereby providing additional controls for the user.

In some embodiments, the first background media item includes (16038) one or more background portions and one or more foreground portions (e.g., foreground portions include portions representing one or more main subject matters of the first background media item that have been computationally identified by the computer system, the background portions include portions that have not been computationally identified as containing the main subject matters of the first background media item). In some embodiments, a photo includes one or more foreground portions that are identified as foreground portions for containing the main subject of the photo (e.g., an automatically identified face, person, pet, and/or other subject), and background portion(s) outside of the one or more foreground portions. In some embodiments, foreground portions are optionally identified based on characteristics such as lighting, focus, and/or location of the portions in the media item. In some embodiments, if the media item includes multiple frames in a video, the foreground portions are assessed based on the video as a whole, rather than based on a single frame of the video. In some embodiments, applying the first version of the first filter to the first background media item includes applying a first set of colors to the one or more background portions of the first background media item, and applying the second version of the first filter to the first background media item includes applying a second set of colors to the background portions of the first background media item. In some embodiments, the first set of colors and the second set of colors include the same basic color but different saturation levels, tones, tints, and/or hues of the same basic color. In some embodiments, the set of colors that are applied to the background of the first background media item is selected based on colors present in the first background media item (e.g., in the foreground of the first background media item and/or in the background of the first background media item). For example, as described with reference to FIG. 6AJ, a color filter is applied to at least a portion of the background of the wake screen user interface, including optionally applying the color filter to the background and/or foreground portions of the background image. Changing a system user interface by modifying a color of the background of the system user interface, wherein the color is automatically selected based on one or more visual properties of an original system user interface, without requiring the user to manually select or edit the color of the background, reduces a number of inputs required to achieve a desired background of the system user interface.

In some embodiments, the first background media item includes (16040) one or more background portions and one or more foreground portions (e.g., foreground portions include portions representing one or more main subject matters of the first background media item that have been computationally identified by the computer system, the background portions include portions that have not been computationally identified as containing the main subject matters of the first background media item), applying the first version of the first filter to the first background media item includes applying a third set of colors to the one or more foreground portions of the first background media item, and applying the second version of the first filter to the first background media item includes applying a fourth set of colors to the foreground portions of the first background media item. In some embodiments, the third set of colors and the fourth set of colors include the same basic color but different saturation levels, tones, tints, and/or hues of the same basic color. In some embodiments, the set of colors that are applied to the foreground of the first background media item is selected based on colors present in the foreground of the first background media item. In some embodiments, the first set of colors and the third set of colors include the same basic color but different saturation levels, tints, and/or hues of the same basic color. In some embodiments, the second set of colors and the fourth set of colors include the same basic color but different saturation levels, tints, and/or hues of the same basic color. In some embodiments, the sets of colors that are applied to the first background media item are selected based on colors present in the first background media. In some embodiments, the set of colors that is applied to the foreground portions of the first background media item is less prominent (e.g., lighter, less saturated, more faded out, and/or more translucent) than the set of colors that is applied to the background portions of the first background media item. For example, as described with reference to FIG. 6AJ, a color filter is applied to at least a portion of the background of the wake screen user interface, including optionally applying the color filter to the background and/or foreground portions of the background image. Changing a system user interface by modifying a color of the foreground of the system user interface, wherein the color is automatically selected based on one or more visual properties of an original system user interface, without requiring the user to manually select or edit the color of the foreground, reduces a number of inputs required to achieve a desired foreground of the system user interface.

In some embodiments, while displaying a second representation of the system user interface that corresponds to the second version of the system user interface (e.g., displaying the second version of the system user interface in an editing mode, displaying the second representation of the system user interface in an editing user interface), the computer system displays (16042) a color picker for modifying a respective background color of a second background of the second version of the system user interface (e.g., a currently selected color in the color picker is the color of the color filter currently used for the second version of the system user interface) and an adjustable control for modifying a respective tone of the respective background color of the second background of the second version of the system user interface (e.g., the displayed value for the adjustable control corresponds to the tone of the color filter currently used for the second version of the system user interface). In some embodiments, the computer system detects a fifth user input adjusting the adjustable control (e.g., changing the tone value along the slider for tone values, or manually entering a tone value for the currently selected color); and in response to detecting the fifth user input adjusting the adjustable control, modifies the respective tone of the respective background color of the second background of the second version of the system user interface in accordance with adjustment made using the adjustable control. In some embodiments, a default value of the tone of the respective background color filter used to modify the first background media item in the second background of the second version of the system user interface is selected based on the first set of visual properties (e.g., the brightness, luminance, tone, and/or saturation) of the first background media item that is used to generate the second background of the second version of the system user interface. For example, as described with reference to FIG. 6AK, in some embodiments, the tone of the color, as indicated by slider bar 6068, is selected to match a tone of the original image. Displaying a slider user interface object that indicates a tone of the color used as a filter applied to a system user interface, wherein the tone of the color is automatically selected based on one or more visual properties of an original system user interface, indicates to the user the automatically selected tone of the color while providing the user with an option to change the tone of the color using the slider user interface object, thereby providing improved feedback to the user and providing additional control options.

In some embodiments, displaying the color picker for modifying the respective background color of the second background of the second version of the system user interface includes (16044) displaying a plurality of representations of colors that are available to be selected as the respective background color of the second background of the second version of the system user interface, including a first representation of a first color with a default tone corresponding to (e.g., selected based on a tone of) the first background media item and a second representation of a second color with a default tone corresponding to the first background media item. In some embodiments, in response to selection of a respective representation of a color among the plurality of colors, the adjustable control is updated to show the adjustable range of the tone for the color and a current value of the adjustable control is a default tone selected for the color based on the first set of visual properties of the first background media item. For example, if the first background media item has a light background, the representations for different color filters have colors with a light tone; and if the first background media item has a dark background, the representations for the same set of different color filters have colors with a dark tone. In some embodiments, the sets of color filters presented for the first background media item depends on the colors present in the first background media item. For example, as described with reference to FIGS. 6AK-6AL, in some embodiments, the set of colors provided in user interface element 6066 include colors having a tone that matches a tone of the original image. Displaying a plurality of automatically selected color options, each color option matching a tone of a color based on an original system user interface, provides the user with selectable color options without requiring the user to manually modify colors to match a visual aesthetic of the original system user interface, thereby providing additional control options and reducing a number of inputs needed to select a color to apply to the system user interface.

In some embodiments, while displaying a second representation of the system user interface that corresponds to the second version of the system user interface (e.g., displaying the second version of the system user interface in an editing mode, displaying the second representation of the system user interface in an editing user interface), in accordance with a determination that the first background media item corresponds to a portrait or a black and white image, the computer system displays (16046) a selectable control corresponding to two or more discrete tone options for modifying the second version of the system user interface (e.g., changing between high-key and low-key versions, changing between black-on-white and white-on-black versions of a filter currently used for the second version of the system user interface). For example, the black and white filter illustrated in FIG. 6AD (e.g., the low-key version of the black and white filter) and FIG. 6AI (e.g., the high-key version of the black and white filter) have binary tone options, such that, in some embodiments, the user is not able to modify a tone of the colors in the black and white filter, but is only able to select between the high-key and low-key versions. Displaying an option to switch between two versions of a filter applied to an image, without enabling further adjustment of color tones within each version of the filter, provides the user with the ability to change a visual aesthetic of a background without display of additional control that clutter the user interface for further customizing the background color, thereby providing additional control options for the user with efficient use of the display area.

In some embodiments, detecting the occurrence of the first condition that causes the computer system to change the appearance of the system user interface based on the first combination of the first background media item and the first background for the system user interface includes (16048) detecting that a first accessory (e.g., a first enclosure, a first case, and/or a first attachment) is placed on or proximate to the display generation component of the computer system, and wherein the first filter is selected based on a second set of visual properties of the first accessory (e.g., color, style, and/or brightness of the first accessory) For example, as described with reference to FIGS. 6AM-6AO, a color of the background is updated in accordance with case 6073 being placed on device 100. Automatically detecting that a physical accessory, such as a case for the device, is placed on or near the device, and providing an option to update a system user interface to have a color that is selected based on the type of physical accessory, such as the color of the case, provides the user with an option to match a color of the system user interface with the accessory without requiring the user to manually select a matching color, thereby reducing a number of inputs needed to select a color and providing feedback that an accessory has been detected by the device.

In some embodiments, in response to detecting that the first accessory is placed on or proximate to the display generation component of the computer system, the computer system displays (16050) a prompt regarding replacing display of the first representation of the system user interface that corresponds to the first version of the system user interface with display of a second representation of the second version of the system user interface that corresponds to the first accessory (e.g., the first filter is selected based on the combination of the first accessory and the first background media item (e.g., the currently used background media item in the first background)). In some embodiments, the prompt includes a preview of the second version of the system user interface that corresponds to the first accessory. In some embodiments, the prompt is displayed for a preset period of time (e.g., dismissed by a user input or until a user confirmation is received). For example, FIG. 6AN illustrates a prompt for the user asking whether the user would like to update the background color to match the detected case color. In response to detecting that a physical accessory, such as a case for the device, is placed on or near the device, prompting the user with an option to update a system user interface to have a color that is selected based on the type of physical accessory, such as the color of the case, provides the user with an option to match a color of the system user interface with the accessory without requiring the user to manually select a matching color, thereby reducing a number of inputs needed to select a color and providing feedback that an accessory has been detected by the device.

In some embodiments, in response to receiving a request to create a new version of the system user interface (e.g., from a settings user interface, from a media library, and/or from a editing user interface for the system user interface), the computer system displays (16052) a set of recommended versions of the system user interface (e.g., suggestions of different looks and/or faces), including: in accordance with a determination that the first accessory has been placed on or proximate to the display generation component of the computer system (e.g., after the first accessory has been placed on or attached to the display generation component and in response to detecting a request to display a plurality of recommended looks for the system user interface), displaying respective representations for a first set of recommended versions of the system user interface, wherein the first set of recommended versions of the system user interface are generated based on a first set of filters selected in accordance with the second set of visual properties of the first accessory (e.g., optionally, the first set of recommended versions of the system user interface also includes system user interfaces with background media items that are selected in accordance with the second set of visual properties of the first accessory). In some embodiments, in accordance with a determination that the first accessory is no longer on or proximate to the display generation component of the computer system (e.g., after the first accessory has been removed from the display generation component and in response to detecting a request to display a plurality of recommended looks for the system user interface), the computer system displays respective representations for a second set of recommended versions of the system user interface, wherein the second set of recommended versions of the system user interface are different from the first set of preconfigured versions of the system user interface. For example, the set of recommended looks and faces or the ranking of the recommended looks and faces may change depending on the visual properties of the accessories that are attached to or placed next to the display generation component. For example, as illustrated in FIG. 6AP, the recommended set of featured faces includes representation 6078, which includes a background color that matches the detected case color. Displaying a set of recommendations of system user interfaces, including a recommendation for a system user interface that includes a color that is selected based on a type of physical accessory, such as a color of a case, in accordance with a determination that a physical accessory, such as a case for the device, is placed on or near the device, while the user has requested to create a new system user interface, enables the user to directly select from the set of recommendations to use as the system user interface without requiring the user to manually design a system user interface, thereby reducing a number of inputs needed to select a color and providing feedback that an accessory has been detected by the device.

In some embodiments, while displaying the first version of the system user interface (e.g., as the currently displayed system user interface), the computer system detects (16054) a user request to display a plurality of preconfigured versions of the system user interface (e.g., including displaying a selection user interface for the different preconfigured looks and/or faces for the system user interface) (e.g., detects an upward swipe gesture, an arc swipe gesture that starts from the bottom of the system user interface and that meets preset criteria for displaying a selection user interface for the different preconfigured versions of the system user interface), wherein the plurality of preconfigured versions of the system user interface are accessible without modification (e.g., displayed as the currently displayed system user interface as previously configured) from the currently displayed version of the system user interface using one or more user inputs that meets first criteria (e.g., using one or more horizontal swipe gestures across the bottom portion of the display region). In some embodiments, in response to detecting the user request to display the plurality of preconfigured versions of the system user interface: in accordance with a determination that the first accessory has been placed on or proximate to the display generation component of the computer system (e.g., after the first accessory has been placed on or attached to the display generation component and in response to detecting a request to display a selection user interface that includes the currently selected looks and/or faces for the system user interface), the computer system displays respective representations of the plurality of preconfigured versions of the system user interface with a respective representation of a first preconfigured version of the system user interface that is generated based on a first set of filters selected based on the second set of visual properties of the first accessory (e.g., by modifying the respective background media item in the currently displayed version of the system user interface in accordance with the first set of filters). In some embodiments, in accordance with a determination that the first accessory is no longer placed on or proximate to the display generation component of the computer system (e.g., after the first accessory has been removed from the display generation component and in response to detecting a request to display a selection user interface that includes the currently selected looks and/or faces for the system user interface)), the computer system displays the respective representations of the plurality of preconfigured versions of the system user interface without the respective representation of the first preconfigured version of the system user interface that is generated based on the first set of filters selected based on the second set of visual properties of the first accessory. In some embodiments, in accordance with a determination that a second accessory rather than the first accessory has been placed on or proximate to the display generation component of the computer system (e.g., after the first accessory has been placed on or attached to the display generation component and in response to detecting a request to display a selection user interface that includes the currently selected looks and/or faces for the system user interface), the computer system displays respective representations of the plurality of preconfigured versions of the system user interface with a respective representation of a second preconfigured version of the system user interface that is generated based on a second set of filters selected based on the second set of visual properties of the second accessory (e.g., by modifying the respective background media item in the currently displayed version of the system user interface in accordance with the second set of filters). For example, the color filter applied to the wake screen user interface background in FIG. 6AJ is optionally displayed with a color selected based on a case color of a case that is detected as being on or near the device 100. Changing a system user interface by modifying a color of the background of the system user interface, wherein the color is automatically selected based on one or more visual properties of an original system user interface, without requiring the user to manually select or edit the color of the background, reduces a number of inputs required to achieve a desired background of the system user interface.

In some embodiments, the second set of visual properties of the first accessory includes (16056) a respective color of the first accessory, and in accordance with a determination that the respective color of the first accessory is a first color, a first color filter is selected as the first filter; and in accordance with a determination that the respective color of the first accessory is a second color different from the first color, a second color filter different from the first color filter is selected as the first filter. For example, in FIG. 6AO, a color that is applied to the wake screen user interface 6072-3 is selected based on a color of the case 6073, such that a different color of the case 6073 causes the color of the wake screen user interface 6072-3 (e.g., the background and/or foreground of the background image, and optionally the textual indications and/or complications of the wake screen user interface) to be updated to a different color. Providing a first recommended system user interface having a first color that is selected based on a color of a first case that is detected on or near the device, and providing a second recommended system user interface having a second color that is selected based on a color of a second case that is detected on or near the device, causes the device to automatically display a different recommendation for a system user interface based on the case that is currently detected by the device, thereby providing improved feedback that indicates which case has been detected by the device.

In some embodiments, the first plurality of system user interface objects include (16058) a first set of system generated text (e.g., the system generated text includes text indicating the current date, current time, textual information presented in complications and widgets, text for notifications, live session, alerts, and/or system prompts). In some embodiments, the computer system, in response to detecting that the first accessory is placed on or proximate to the display generation component of the computer system, changes a first set of font colors used for the first set of system generated text in accordance with the second set of visual properties of the first accessory (e.g., the second version of the system user interface includes the system generated text after its font colors have been changed). For example, as illustrated in FIGS. 6AM-6AO, a color of the font of the textual indications of the time and date is updated concurrently with the change in the color of the background of the wake screen user interface. Automatically detecting a color of a case that is on or near the device to provide a recommended system user interface causes the device to change a color of a font of textual information displayed by the device based on the color of the detected case, thereby providing improved feedback that indicates which case has been detected by the device.

In some embodiments, the first filter changes (16060) a color tint of the first background media item in a second background of the second version of the system user interface (e.g., the tint of the second background matches the color of the first accessory or is in contrast with the color of the first accessory). For example, the wake screen user interface 6072-3 (FIG. 6AO) is displayed with a color tint having a color that matches or complements the color of case 6073. Automatically detecting a color of a case that is on or near the device to provide a recommended system user interface causes the device to change a color of a tint applied to a background image of the system user interface that is displayed by the device, based on the color of the detected case, thereby providing improved feedback that indicates which case has been detected by the device.

In some embodiments, the second version of the system user interface maintains (16062) one or more aspects of the first version of the system user interface (e.g., without changing those aspects relative to the first version of the system user interface). For example, in some embodiments, in FIG. 6AO, one or more visual properties of the wake screen user interface 6072-3 are not changed, such as a color of the textual indications are not updated. Automatically changing one or more visual features of a system user interface based on a color of a case that is detected as being on or near the device, without changing one or more other features of the system user interface enables the device to continue displaying information that is likely pertinent to the user, such as complications and/or a date or time indication, while providing a visual aesthetic that matches the case that is on or near the device, without requiring the user to manually edit the system user interface, thereby providing improved feedback that indicates which case has been detected by the device and reducing a number of inputs needed to design or edit the system user interface.

In some embodiments, the first background media item used in the second version of the system user interface is (16064) also used in the first version of the system user interface. For example, in some embodiments, in FIG. 6AO, the background image of the wake screen user interface 6072-3 is not changed while the color tint of the wake screen user interface 6072-3 is updated in accordance with the color of case 6073. Automatically changing one or more visual features of a system user interface based on a color of a case that is detected as being on or near the device, without changing the content of the image selected as the background of the system user interface enables the device to continue displaying information that is likely to be of interests the user, such as the image, while providing a visual aesthetic that matches the case that is on or near the device, without requiring the user to manually edit the system user interface, thereby providing improved feedback that indicates which case has been detected by the device and reducing a number of inputs needed to design or edit the system user interface.

In some embodiments, the first set of system user interface objects and the second set of system user interface objects include (16066) the same set of user interface objects that include application content that is automatically updated based on information from corresponding applications of the set of user interface objects. For example, in some embodiments, in FIG. 6AO, one or more complications are displayed in the wake screen user interface 6072-3, and the one or more complications are not changed while the color tint of the wake screen user interface 6072-3 is updated in accordance with the color of case 6073. Automatically changing one or more visual features of a system user interface based on a color of a case that is detected as being on or near the device, without changing the complications displayed in the system user interface enables the device to continue displaying information that is likely pertinent to the user in an efficient way in the display area, while providing a visual aesthetic that matches the case that is on or near the device, without requiring the user to manually edit the system user interface, thereby providing improved feedback that indicates which case has been detected by the device and reducing a number of inputs needed to design or edit the system user interface.

In some embodiments, the first version of the system user interface is (16068) displayed with a first set of notifications, and the first set of notifications remain displayed when display of the first representation of the system user interface that corresponds to the first version of the system user interface is replaced with display of a second representation of the second version of the system user interface. For example, in some embodiments, in FIG. 6AO, one or more notifications are displayed in the wake screen user interface 6072-3, and the one or more notifications are maintained while the color tint of the wake screen user interface 6072-3 is updated in accordance with the color of case 6073. Automatically changing one or more visual features of a system user interface based on a color of a case that is detected as being on or near the device, without changing the notifications displayed in the system user interface enables the device to continue displaying information that is likely pertinent to the user in an efficient way in the display area, while providing a visual aesthetic that matches the case that is on or near the device, without requiring the user to navigate away from the system user interface to view the notifications, thereby providing improved feedback that indicates which case has been detected by the device and reducing a number of inputs needed to access notifications.

In some embodiments, display of the first representation of the system user interface that corresponds to the first version of the system user interface is (16070) replaced with display of a second representation of the second version of the system user interface while the computer system is in a locked state. For example, in some embodiments, the update to the color of the wake screen user interface 6072-3 in FIG. 6AO, is performed while the device is in the locked state, without requiring authentication from the user. Automatically changing one or more visual features of a system user interface based on a color of a case that is detected as being on or near the device, even while the device is in a locked state, improves privacy and security by enabling the user to select a different style of the system user interface while the system user interface is displayed in the locked state, thereby reducing an amount of time needed to change the system user interface.

It should be understood that the particular order in which the operations in FIGS. 16A-16J have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1000, 1100, 12000, 1300, 14000, 15000, and 17000) are also applicable in an analogous manner to method 14000 described above with respect to FIGS. 16A-16J. For example, the contacts, gestures, and user interface objects,—described above with reference to method 16000 optionally have one or more of the characteristics of the contacts, gestures, and user interface objects, described herein with reference to other methods described herein (e.g., 900, 1000, 1100, 12000, 1300, 14000, 15000, and 17000). For brevity, these details are not repeated here.

FIGS. 17A-17D are flow diagrams illustrating method 17000 for providing feedback on a system user interface, in accordance with some embodiments. Method 17000 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 17000 are, optionally, combined and/or the order of some operations is, optionally, changed.

As described below, method 17000 is a method providing an animation that displays continuous movement and that is updated in accordance with a detected user input, such that the animation completes if the detected user input satisfies criteria for dismissing a wake screen, and the animation does not complete if the detected user input does not satisfy the criteria for dismissing the wake screen, enables the device to indicate to the user a current state of the device in response to the user input, thereby improving feedback for a progress of the input.

The method 17000 is performed at a computer system with a display component and one or more input devices (17002). The computer system displays (17004), via the display generation component, a wake screen user interface that corresponds to a restricted state of the computer system, including displaying a first background and a plurality of system user interface objects (e.g., a time element, a date element, one or more system status indicators (e.g., lock/unlock status indicators, login identity indicators, usage mode indicators, privacy level indicators, and/or indicators of other system status), widgets, complications, and/or prompts regarding how to dismiss the wake screen interface) overlaying at least a portion of the first background, wherein the first background includes a plurality of graphical elements arranged in accordance with a first spatial configuration (e.g., including a first graphical element and a second graphical element that are respectively displayed at a first position and a second position on a display area of the display generation component, where the first graphical element and the second graphical element form a first spatial relationship (e.g., a two-dimensional spatial relationship and/or a three-dimensional spatial relationship)) (e.g., the plurality of graphical elements arranged in the first spatial configuration includes a plurality of ribbons or string like elements that spiral in roughly the same directions and with roughly the same curvatures in three-dimensional or pseudo three-dimensional space). In some embodiments, the wake screen user interface is a system user interface that is displayed when the computer system transitions from a low power state (e.g., a display-off state, a power saving state, and/or a dimmed always-on state) to a normal state. In some embodiments, a wake screen user interface is sometimes displayed in a locked state and input of valid authentication information is required in order to dismiss the wake screen user interface that is in a locked state. In some embodiments, a wake screen user interface is sometimes displayed in an unlocked state and dismissal of the wake screen user interface does not require input of authentication information (and only require a gesture meeting preset movement criteria). In some embodiments, a wake screen user interface optionally has only a locked state (e.g., serving as a lock screen user interface) or only an unlocked state (e.g., serving as a coversheet user interface). In some embodiments, a wake screen user interface is used as a coversheet user interface that reveals a last displayed user interface when the coversheet user interface is dismissed. In some embodiments, a wake screen user interface is a system user interface that restricts access to a home user interface of the computer system until the wake screen user interface is dismissed (e.g., irrespective of the locked/unlocked state of the wake screen user interface). For example, FIG. 5BP illustrates a wake screen user interface that is displayed while the device is locked or is in a restricted state, wherein a user input to dismiss the wake screen user interface, and optionally successful authentication (e.g., biometric, fingerprint, and/or passcode), is required to exit the restricted state.

While displaying the wake screen user interface that corresponds to the restricted state of the computer system, the computer system detects (17006) a first user input, including a request to dismiss the wake screen user interface (e.g., an activation of a hardware input control such as a button or rotatable input element, a horizontal swipe gesture and/or a vertical swipe gesture on a touch-sensitive surface, an upward in-air swipe gesture, a downward in-air swipe gesture, a flick gesture, and/or an input of another type that includes movement in a first direction). In some embodiments, the first user input is recognized by the computer system as including a request to dismiss the wake screen user interface based on the first user input meeting at least a subset of first criteria (e.g., criteria based on the location, direction, magnitude, movement path, and/or speed of the first user input). In some embodiments, the first user input is recognized by the computer system as including a request to dismiss the wake screen user interface based on a location of the first user input on a preset software or hardware control or button, which may or may not be accompanied by valid authentication information. In some embodiments, the first user input is recognized by the computer system as including a request to dismiss the wake screen user interface based on an initial location of the first user input on a preset software or hardware control or button, which may or may not be followed by subsequent movement or gesture that meets first criteria. For example, user input 5072 (FIG. 5BQ) corresponds to a first user input that does not satisfy the first criteria, and user input 5080-1 (FIG. 5BU) corresponds to a first user input that does satisfy the first criteria.

In response to detecting the first user input (17008) that includes the request to dismiss the wake screen user interface, the computer system moves (17010) the plurality of graphical elements in a first direction in accordance with the first user input (e.g., moves the plurality of graphical elements in accordance with a first movement in a first direction in response to a swipe input in the first direction, moves the plurality of graphical elements with a direction, magnitude, movement path, and/or speed in accordance with a direction, magnitude, movement path, and/or speed of the first user input, or moves the plurality of graphical elements in a first direction based on a duration of the first user input on a hardware or software control), while increasing a spatial gap between the plurality of graphical elements. For example, in FIG. 5BR, the colored stripes (or colored threads) are displayed as moving upward in accordance with user input 5072 being in the upward direction.

In accordance with a determination that the request to dismiss the wake screen user interface included in the first user input meets first criteria (e.g., after moving the plurality of graphical elements in the first direction in accordance with the first user input and increasing the spatial gap between the plurality of graphical elements), the computer system replaces (17012) display of the wake screen user interface that corresponds to the restricted state of the computer system with display of a second user interface different from the wake screen user interface (e.g., displaying the home screen user interface, a widget user interface, another system user interface that is different from the home screen user interface and the wake screen user interface, or another system user interface that does not correspond to a restricted state of the computer system), including displaying the plurality of graphical elements in the second user interface while reducing the spatial gap between the plurality of graphical elements. In some embodiments, the plurality of graphical elements are continuously displayed throughout the visual feedback including the movement of the plurality of graphical elements in the first direction in accordance with the first user input and the replacement of the wake screen user interface by the second user interface. For example, FIG. 5BX illustrates a home screen user interface 5070-10 that is displayed in response to user input 5080-1 (FIG. 5BU) that satisfies the first criteria.

In some embodiments, in response to detecting the first user input (17014) that includes the request to dismiss the wake screen user interface: in accordance with a determination that the request to dismiss the wake screen user interface included in the first user input does not meet the first criteria (e.g., after moving the plurality of graphical elements in the first direction in accordance with the first user input and increasing the spatial gap between the plurality of graphical elements), the computer system reduces the spatial gap between the plurality of graphical elements and forgoing replacing display of the wake screen user interface that corresponds to the restricted state of the computer system with display of the second user interface (e.g., redisplays the wake screen user interface after displaying a partial replacement of the wake screen user interface by the second user interface, or maintaining display of the wake screen user interface). In some embodiments, the plurality of graphical elements are continuously displayed throughout the visual feedback including the movement of the plurality of graphical elements in the first direction in accordance with the first user input and reducing the spatial gap between the plurality of graphical elements in accordance with the determination that the request to dismiss the wake screen user interface does not meet the first criteria. For example, as illustrated in FIGS. 5BR-5BT, in accordance with user input 5072 not satisfying the first criteria, and in response to user input 5074 (or optionally in response to the user input 5072 being lifted off), the device 100 displays an animation of the colored stripes (or threads) getting closer together and/or shifting back down the display, in a direction opposite of user input 5072. Providing an animation that displays continuous movement and that is updated in accordance with a detected user input, such that the animation does not complete if the detected user input does not satisfy the criteria for dismissing the wake screen, enables the device to indicate to the user a current state of the device in response to the user input, thereby improving feedback for a progress of the input.

In some embodiments, detecting the first user input, including the request to dismiss the wake screen user interface, includes (17016) detecting a swipe gesture in a first direction, wherein the swipe gesture in the first direction meets at least a subset of the first criteria (e.g., the swipe gesture is a swipe gesture that has a movement direction, movement speed, movement distance, liftoff position, and/or liftoff speed meeting at least a subset of the pre-established conditions corresponding to the request to dismiss the wake screen user interface). In some embodiments, the determination that the request to dismiss the wake screen user interface meets the first criteria includes a determination that the swipe gesture in the first direction meets the first criteria, and a determination that the first user input does not meet the first criteria includes a determination that the swipe gesture in the first direction does not meet all of the first criteria after a first amount of time has elapsed since the start of the first user input and/or after the termination of the first user input has been detected. For example, user input 5080-1 (FIG. 5BU) is a swipe gesture to dismiss wake screen user interface 5070-7. Enabling the user to dismiss the wake screen user interface using a swipe gesture, without displaying an affordance, and initiating an animation that completes in response to the swipe gesture, allows the device to efficiently display the wake screen user interface without obstruction of control affordances, thereby providing additional control options for the user without cluttering the user interface and providing improved visual feedback in response to a user input.

In some embodiments, detecting the first user input, including the request to dismiss the wake screen user interface, includes (17018): detecting the first user input (e.g., a press input, a touch input, a tap input, an in-air flick, and/or an in-air tap) that is directed to a first location that corresponds to a first control (e.g., a hardware affordance, a solid state button, and/or a software affordance such as a software button, slider, toggle, and/or switch) and that meets activation criteria corresponding to the first control (e.g., criteria based on duration, intensity, movement direction, and/or movement pattern). In some embodiments, the determination that the request to dismiss the wake screen user interface meets the first criteria includes a determination that the first user input directed to the first location that corresponds to the first control is preceded, accompanied, and/or followed by valid authentication input (e.g., facial image, fingerprint, voiceprint, authentication gesture, and/or other authentication input or information). In some embodiments, a determination that the first user input does not meet the first criteria includes a determination that the first user input directed to the first location that corresponds to the first control is not preceded, accompanied, and/or followed by valid authentication input after a first amount of time has elapsed since the start of the first user input and/or after the termination of the first user input has been detected. For example, in FIG. 5BU, user input 5080-1 comprises a user input detected on a button (e.g., a virtual or physical button) that corresponds to a request to dismiss wake screen user interface 5070-9. Enabling the user to dismiss the wake screen user interface using a button press, causes the device to initiate display of an animation in response to a user input corresponding to a button press, thereby providing additional control options for the user and providing improved visual feedback in response to a user input.

In some embodiments, the wake screen user interface includes (17020) a first plurality of selectable objects that, when selected, respectively cause performance of a plurality of operations associated with the wake screen user interface (e.g., including at least a first selectable object and a second selectable object, wherein the first selectable object and the second selectable object, when activated, respectively cause performance of a first operation and a second operation associated with the wake screen user interface) (e.g., the wake screen user interface described with reference to FIG. 5A). In some embodiments, the first plurality of selectable objects, including the first selectable object and the second selectable object, are selected from a group including one or more application icons (e.g., icons for a flashlight application, a camera application, and/or other frequently used applications), one or more notifications (e.g., notifications for incoming communications (e.g., text messages, emails, and/or calls), one or more widgets or complications (e.g., widgets and/or complications that includes content from respective applications and that are automatically updated from time to time based on content from the respective applications), and/or other user interface objects that are associated with operations of the wake screen user interface). In some embodiments, the plurality of operations associated with the wake screen user interface (e.g., the first operation and the second operation) are selected from a group including: opening a corresponding application from a notification, a widget, and/or a camera/flashlight icon without going to the home screen or accessing the application icons on the home screen, clearing a notification, subscribing to an event, and/or other operations of the wake screen user interface. For example, wake screen user interface 5070-2 (FIG. 5BP) includes an icon for accessing a flashlight and an icon for accessing a camera. In some embodiments, wake screen user interface 5070-2 includes one or more complications. Displaying, in a wake screen user interface, a plurality of user interface objects that are periodically updated with content from active applications and/or notifications, and that can a user can customize (e.g., by adding, removing, rearranging, or other modification), improves privacy and security by enabling the user to select which applications will have their content displayed in the wake screen user interface and in what configuration or order, thereby reducing the amount of time that is needed for the user to view current information about the device.

In some embodiments, the second user interface includes (17022) a second plurality of selectable objects that, when selected, respectively cause performance of a plurality of operations associated with the second user interface (e.g., including at least a third selectable object and a fourth selectable object, wherein the third selectable object and the fourth selectable object, when activated, respectively cause performance of a third operation and a fourth operation associated with the second user interface (e.g., home screen user interface, a widget screen, or a notification history screen). In some embodiments, the second plurality of selectable objects, including the third selectable object and the fourth selectable object, are application icons of installed applications, rather than only frequently used applications, and/or one or more widgets or complications other than those included on the wake screen user interface. In some embodiments, the plurality of operations associated with the second user interface (e.g., the third operation and the fourth operation) are selected from a group including: opening a corresponding application from an application icon and/or a widget, performing an application function provided by an application user interface, or other operations provided by the second user interface). The wake screen user interface and the second user interface do not provide the same set of functions and do not include the same set of user interface objects. For example, the wake screen user interface is not a simplified or limited version of the second user interface, nor vice versa. For example, as illustrated in FIG. 5BX, after dismissing the wake screen user interface 5070-7 (FIG. 5BU), home screen user interface 5070-10 is displayed, which includes a plurality of application icons. Displaying, in a home screen user interface, a plurality of user interface objects that are used to open respective applications, enables the user to control an application and/or navigate between applications, thereby reducing the amount of time that is needed for the user to find and select applications using complex menu hierarchies.

In some embodiments, the first user input includes (17024) movement in a first input direction and the computer system: detects movement in a second input direction that is different from (e.g., opposite to or substantially opposite to) the first input direction before a termination of the first user input (and, optionally before the first criteria are met by the request to dismiss the wake screen user interface) (e.g., when the first user input includes a swipe gesture in a first direction, the movement in the second input direction is a continuation of the swipe gesture in a second direction that is different (e.g., at least partially opposite from) the first direction); and in response to detecting the movement in the second input direction before the termination of the first user input (and optionally, before the first criteria are met by the request to dismiss the wake screen user interface), moves the plurality of graphical elements in a second direction in accordance with the movement in the second input direction (e.g., moving the plurality of graphical elements in accordance with a second movement in a second direction in response to a reversal of the swipe input in the first direction, or moving the plurality of graphical elements with a direction, magnitude, movement path, and/or speed in accordance with a direction, magnitude, movement path, and/or speed of the reversal of the first user input), while decreasing the spatial gap between the plurality of graphical elements. For example, as illustrated in FIG. 5BR, user input 5074 is in an opposite direction as user input 5072, and the animation includes moving the colored stripes down, as illustrated in FIG. 5BS, in an opposite direction of the animation illustrated in FIGS. 5BQ-5BR. Providing an animation that displays continuous movement and that is updated in accordance with a detected user input, including displaying the animation in a direction that corresponds to a direction of the input, enables the device to indicate to the user a current state of the device in response to the user input, thereby improving feedback for a progress of the input.

In some embodiments, the computer system detects (17026) a termination of the first user input (e.g., liftoff of a contact from a touch-sensitive surface, cessation of movement of an in-air swipe or flick gesture, reduction of intensity of a press input below a preset threshold intensity, and/or other types of termination depending on the input type of the first user input) before the first criteria are met by the request to dismiss the wake screen user interface and in response to detecting the termination of the first user input before the first criteria are met by the request to dismiss the wake screen user interface, moves the plurality of graphical elements in a second direction different from the first direction, while decreasing the spatial gap between the plurality of graphical elements (e.g., restoring respective positions of the plurality of graphical elements and the spatial relationships between the plurality of graphical elements to a state before the start of the first user input). For example, as illustrated in FIG. 5BS, user input 5076 corresponding to liftoff of a user input causes the device 100 to continue the animation (e.g., in the downward direction) until redisplaying wake screen user interface 5078. Providing an animation that displays continuous movement and that is updated in accordance with a detected user input, such that the animation does not complete, and the user interface returns to its original state, if the detected user input does not satisfy the criteria for dismissing the wake screen, enables the device to indicate to the user a current state of the device in response to the user input, thereby improving feedback for a progress of the input.

In some embodiments, the plurality of graphical elements arranged in accordance with the first configuration includes (17028) a plurality of elongated shapes winding around each other (e.g., a plurality of threads, ribbons, ropes, and/or other simulated flexible materials that are wounded or twisted together). For example, as illustrated in FIG. 5BP, the plurality of stripes correspond to threads that wind around each other (or around an invisible shape, such as a cylinder). Displaying a user interface that includes a plurality of threads winding around each other, enables the device to provide an animation that displays the threads continuously shifting and moving relative to each other as the user interacts with the device, thereby improving feedback of the device.

In some embodiments, in response to detecting the first user input that includes the request to dismiss the wake screen user interface, the computer system: changes (17030) (e.g., increases, and/or decreases) thickness of at least some (e.g., less than all, or all) of the plurality of graphical elements and also (e.g., while) changing (e.g., increasing and/or decreasing) the spatial gap between the plurality of graphical elements. For example, in some embodiments, as the plurality of graphical elements are moving in the first direction in accordance with the first user input, the thickness of the plurality of graphical elements is reduced as the spatial gap between them is increased. In some embodiments, the change in the spatial gap between the graphical elements is partially attributed to the reduction in the thickness of the plurality of graphical elements and partially attributed to the difference in the movement speeds/accelerations of the plurality of graphical elements in the first direction. For example, as illustrated in FIGS. 5BQ-5BR, during the animation, and while detecting user input 5072 and/or user input 5074, a thickness of at least one colored stripe is updated as the top-most colored stripe moves to increase a distance from the other colored stripes. Providing an animation that displays user interface elements gradually increasing in thickness, in accordance with a detected user input, enables the device to indicate to the user a current state of the device in response to the user input, thereby improving feedback for a progress of the input.

In some embodiments, the computer system changes (17032) (e.g., increasing, and/or decreasing) thickness of at least some (e.g., less than all, or all) of the plurality of graphical elements after detecting a termination of the first user input. For example, in accordance with a determination that the termination of the first user input has been detected before the first criteria were met by the request to dismiss the wake screen user interface, the computer system increases the thickness of the plurality of graphical elements while decreasing the spatial gap between the plurality of graphical elements; and in accordance with a determination that the first criteria were not met before detecting the termination of the first user input, the computer system increases the thickness of the plurality of graphical elements while decreasing the spatial gap between the plurality of graphical elements. For example, in FIG. 5BV, during user input 5080-2, the thickness of the optional stripes optionally does not change, and the thickness of the stripes change (e.g., become thinner) after detecting the end of the user input, such as upon liftoff user input 5084 (FIG. 5BW). Providing an animation that displays user interface elements increasing in thickness, at the end of a detected user input, enables the device to indicate to the user a current state of the device in response to completion of the user input, thereby improving feedback for user input.

In some embodiments, moving the plurality of graphical elements in the first direction in accordance with the first user input includes (17034) shifting portions of at least some of the plurality of graphical elements out of a display area of the display generation component (e.g., out of the display, off the touch-screen, and/or out of a boundary of an active region of the display) as the first user input progresses. For example, as illustrated in FIGS. 5BU-5BW, as the colored stripes are animated to shift upwards, a top portion of the stripes appears to slide off the top of the display of device 100. Providing an animation that displays user interface elements gradually moving in a direction of a detected user input such that portions of the user interface elements appear to shift off the display, enables the device to indicate to the user a current state of the device in response to the user input, thereby improving feedback for a progress of the input.

In some embodiments, while the plurality of graphical elements move in the first direction in accordance with the first user input, at least some of the plurality of graphical elements overlap (17036) with (e.g., move over and visually obscure, or move underneath and are visually obscured by) at least some of the plurality of system user interface objects. For example, a first graphical element of the plurality of graphical element does not overlap with any of the system user interface objects in the wake screen user interface before the first user input is detected, and the first graphical element overlaps with (e.g., moves in front of and visually obscures, and/or moves underneath and is visually obscured by) one or more of the plurality of system user interface objects during its movement in the first direction in accordance with the first user input. For example, a second graphical element of the plurality of graphical element that overlaps with (e.g., is underneath and/or is in front of) one or more of the system user interface objects in the wake screen user interface before the first user input is detected, and the second graphical element may overlap with (e.g., moves in front of and visually obscures, and/or moves underneath and is visually obscured by) one or more other system user interface objects during its movement in the first direction in accordance with the first user input. In some embodiments, the displayed depth of a respective user interface object is changed during the movement of the respective user interface object in the first direction, which causes the respective user interface object to pass in front of or behind one or more system user interface objects in the wake screen user interface. In some embodiments, a respective graphical element of the plurality of graphical elements is a three-dimensional shape, where different portions of the respective graphical element are displayed at different depths at the start of the first user input, and the displayed depths of the different portions of the respective graphical element change during the movement of the respective user interface object in the first direction, which causes the different portions of the respective user interface object to pass in front of or behind one or more system user interface objects in the wake screen user interface during the movement of the respective user interface object in the first direction. For example, in FIG. 5BR, the animated background that includes the colored stripes is displayed as overlapping with the indication of the date, the indication of the time, and the icon for accessing a camera application. Providing an animation that displays user interface elements moving in accordance with a detected user input, while concurrently displaying system information that provides information such as a time, a date, and/or one or more complications that include status information for respective applications, enables the device to continue displaying information that is pertinent to the user while also providing feedback about the user, thereby improving visual feedback.

In some embodiments, while the plurality of graphical elements move in the first direction in accordance with the first user input, at least some of the plurality of graphical elements are (17038) moved to positions behind at least some of the plurality of system user interface objects and are visually obscured by said at least some of the plurality of system user interface objects. For example, during the movement of the plurality of elongated shapes in the upward direction, a portion of at least one of the plurality of elongated shapes that used to be displayed below the time and date elements at a first display depth is moved upwards and shifted to a second display depth that is larger than the display depth of the date and time elements, and as a result, the portion of said at least one of the plurality of elongated shapes is visually obscured by the date and time elements. For example, in FIG. 5BR, the animated background that includes the colored stripes is displayed as behind the indication of the date, the indication of the time, and the icon for accessing a camera application. Providing an animation that displays user interface elements moving in accordance with a detected user input, the user interface elements being displayed behind system information that provides information such as a time, a date, and/or one or more complications that include status information for respective applications, provides the user with continued access to pertinent information without obscuring the information with the animation, thereby improving feedback.

In some embodiments, during movement of the plurality of graphical elements in the first direction in accordance with the first user input, in accordance with a determination that a first graphical element of the plurality of graphical elements overlaps with (e.g., move over and visually obscure, or move underneath and are visually obscured by) a first system user interface object of the plurality of system user interface objects, the computer system changes (17040) one or more first visual properties (e.g., color, brightness, blur radius, luminance, sharpness, and/or tone) of the first system user interface object in accordance with one or more second visual properties (e.g., color, tone, transparency, brightness, and/or luminance) of the first graphical element. In some embodiments, the computer system changes the appearance of the system user interface objects in accordance with the visual characteristics of the graphical elements that are moved into their vicinities to simulate virtual light being cast by the graphical elements on the system user interface objects. For example, in FIG. 5BV, the animated background that includes the colored stripes is displayed as overlapping with at least a portion of the indication of the date, the indication of the time, and the icon for accessing a camera application. In some embodiments, at least one colored stripe appears to be in front of a portion of the indication of the date and/or time, and at least one colored stripe appears to be behind another portion of the indication of the date and/or time. In some embodiments, device 100 displays a visual effect to show light being cast from at least one colored stripe onto a portion of the indication of the date and/or time in FIG. 5BV. Providing an animation that displays simulated light from one or more user interface elements to displayed system information that provides information such as a time, a date, and/or one or more complications that include status information for respective applications, allows the user to easily view the system information even while the one or more user interface elements overlap with the information, thereby improving visual feedback to the user.

In some embodiments, while displaying the wake screen user interface, including the first background with the plurality of graphical elements arranged in accordance with the first spatial configuration, the computer system detects (17042) an event that triggers a transition from a normal state to a low power state of the display generation component; and in response to detecting the event that triggers the transition from the normal state to the low power state of the display generation component, the computer system reduces a level of luminance of the wake screen user interface (e.g., making the first background darker, and/or reducing the overall luminance for the background and the system user interface objects) and changes the spatial gap between the plurality of graphical elements (e.g., increasing or decreasing the gap between the plurality of graphical elements). In some embodiments, the computer system also changes the thicknesses of the plurality of graphical elements (e.g., increasing or decreasing the thicknesses). For example, in FIG. 5BO, device 100 is in a low power state and the colored stripes are displayed as dimmed and spread apart, with the black background showing between the stripes. Providing an animation that displays user interface elements moving apart while decreasing a luminance of the display, in accordance with a device switching into a low power mode, indicates to the user when the device is entering, or currently in, a low power mode, thereby providing improved feedback about a state of the device.

In some embodiments, the first spatial configuration is (17044) selected by a user from a plurality of available spatial configurations for the plurality of graphical elements. For example, the orientation of the plurality of graphical elements can be selected by the user. In some embodiments, the plurality of graphical elements spiral in a first direction or spiral in a second direction depending on user set preferences. For example, as illustrated in FIGS. 5BY-5BZ, the device displays selectable options corresponding to different orientations of the colored stripes and sets an orientation of the colored stripes in the wake screen user interface in accordance with a user input selecting one of the selectable options. Providing an option to display user interface elements on a wake screen user interface in different orientations, causes the device to display control options that enables the user to customize the wake screen user interface, thereby providing additional controls for the user.

In some embodiments, the first spatial configuration is (17046) automatically selected for a respective lock/unlock cycle by the computer system from a plurality of available spatial configurations for the plurality of graphical elements. For example, during a first lock/unlock cycle (e.g., a respective time that the wake screen is displayed and dismissed, or a respective time that the wake screen is dismissed and redisplayed), the computer system toggles between displaying the plurality of graphical elements arranged in a first twist direction and displaying the plurality of graphical elements arranged in a second twist direction. For example, as illustrated in FIGS. 5BY-5BZ, in some embodiments, the orientation of the colored stripes changes upon a lock and/or unlock cycle of device 100. Automatically changing an orientation of the arrangement of user interface elements, such as changing a direction of a twist formed by the user interface elements in accordance with detection of an event, causes the device to update the display in accordance with the device completing a lock and unlock cycle, thereby providing improved feedback about a state of the device.

In some embodiments, one or more visual properties of a portion of the first background that underlies the plurality of graphical elements are (17048) selected by a user. For example, the computer system provides one or more selectable options for a user to change the color, brightness, tone, and/or light/dark modes of the portion of the first background that underlies the plurality of graphical elements, such that the regions of the background that are not blocked by the plurality of graphical elements (e.g., the gaps between the plurality of graphical elements) may have different appearances depending on the user's selection. In some embodiments, in response to a user selecting a dark or light mode for the system user interface, the computer system changes the background portion of the system user interface that underlies the plurality of graphical elements (e.g., from a dark color to a light color, or vice versa). For example, as described with reference to FIGS. 5CA-5CB, the background color displayed behind the colored stripes is updated, optionally in accordance with user selection and/or in accordance with the device currently being in a light or dark mode of operation. Providing an option to display user interface elements on a different color background, such as black or white, optionally automatically in accordance with a currently selected dark and/or light mode of operation, causes the device to display selection controls for the user to select conditions for changing the color of the background, thereby providing additional controls for the user and improving feedback about a state of the device.

In some embodiments, while displaying the second user interface including displaying the plurality of graphical elements arranged in accordance with a second spatial configuration, the computer system detects (17050) a second user input, including a request to replace the second user interface with the wake screen user interface (e.g., an activation of a hardware input control such as a button or rotatable input element, a horizontal swipe gesture and/or a vertical swipe gesture on a touch-sensitive surface, an downward in-air swipe gesture, a downward in-air swipe gesture, a flick gesture, and/or an input of another type that includes movement in a second direction). In some embodiments, the second user input is recognized by the computer system as including a request to cover up the second user interface with the wake screen user interface based on the second user input meeting at least a subset of second criteria (e.g., criteria based on the location, direction, magnitude, movement path, and/or speed of the second user input). In some embodiments, the second user input is recognized by the computer system as including a request to cover up the second user interface with the wake screen user interface based on a location of the second user input on a preset software or hardware control or button. In some embodiments, the second user input is recognized by the computer system as including a request to cover up the second user interface with the wake screen user interface based on an initial location of the second user input on a preset software or hardware control or button, which may or may not be followed by subsequent movement or gesture that meets second criteria. In some embodiments, the second user input includes movement in a second direction different from the movement direction of the first user input. In some embodiments, the second user input starts from a different edge of the display generation component than the first user input. For example, the first user input is an upward swipe gesture that starts from the bottom edge of the display, while the second user input is a downward swipe gesture that starts from the top edge of the display. In some embodiments, in response to detecting the second user input that includes the request to cover up the second user interface with the wake screen user interface, the computer system moves the plurality of graphical elements in a second direction in accordance with the second user input (e.g., moves the plurality of graphical elements in accordance with a second movement in a second direction in response to a swipe input in the second direction, moves the plurality of graphical elements with a direction, magnitude, movement path, and/or speed in accordance with a direction, magnitude, movement path, and/or speed of the second user input, or moves the plurality of graphical elements in a second direction based on a duration of the second user input on a hardware or software control), while decreasing the spatial gap between the plurality of graphical elements. In some embodiments, in accordance with a determination that the request to replace the second user interface with the wake screen user interface included in the second user input meets second criteria (e.g., after moving the plurality of graphical elements in the second direction in accordance with the second user input and decreasing the spatial gap between the plurality of graphical elements), the computer system replaces display of the second user interface with display of the wake screen user interface, including displaying the plurality of graphical elements in the wake screen user interface while increasing the spatial gap between the plurality of graphical elements. In some embodiments, the plurality of graphical elements are continuously displayed throughout the visual feedback including the movement of the plurality of graphical elements in the second direction in accordance with the second user input and the replacement of the second user interface by the wake screen user interface. In some embodiments, in accordance with a determination that the request to replace the second user interface with the wake screen user interface included in the second user input does not meet the second criteria, the computer system forgoes replacing display of the second user interface with display of the wake screen user interface, and redisplays the plurality of graphical elements arranged in accordance with the second spatial configuration. For example, while displaying home screen user interface 5070-10 (FIG. 5BX), the device 100 detects a user input requesting to display the wake screen user interface, or a coversheet user interface, and in response to the user input, the device 100 displays the animation illustrated in FIGS. 5BU-5BX in an opposite direction, for example by shifting the colored stripes down and sliding off a bottom of the display of device 100, optionally while increasing a distance between the colored stripes, and then decreasing a distance between the colored stripes while increasing a thickness of the colored stripes to redisplay the wake screen user interface 5070-7 at the end of the animation. Providing an animation of the home screen user interface that displays continuous movement and that is updated in accordance with a detected user input, such that the animation does not complete, and the user interface returns to its original state of the home screen user interface, if the detected user input does not satisfy the criteria for displaying the wake screen, enables the device to indicate to the user a current state of the device in response to the user input, thereby improving feedback for a progress of the input.

It should be understood that the particular order in which the operations in FIGS. 17A-17D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1000, 1100, 12000, 1300, 14000, 15000, and 16000) are also applicable in an analogous manner to method 14000 described above with respect to FIGS. 17A-17D. For example, the contacts, gestures, and user interface objects,—described above with reference to method 17000 optionally have one or more of the characteristics of the contacts, gestures, and user interface objects, described herein with reference to other methods described herein (e.g., 900, 1000, 1100, 12000, 1300, 14000, 15000, and 16000). For brevity, these details are not repeated here.

The operations described above with reference to FIGS. 9A-9I, 10A-10I, 11A-11H, 12A-12E, 13A-13G, 14A-14G, 15A-15I, 16A-16J, and 17A-17D, are, optionally, implemented by components depicted in FIGS. 1A-1B. For example, detection operation 904 and display operation 908 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:

at a computer system that is in communication with a display generation component:

displaying, via the display generation component, a first version of a first user interface that corresponds to a restricted state of the computer system, wherein displaying the first version of the first user interface includes displaying a first plurality of user interface objects displayed concurrently with a first background in accordance with a first configuration, and wherein the first plurality of user interface objects correspond to a first plurality of applications and include respective content from the first plurality of applications and are updated periodically as information represented by the first plurality of user interface objects changes;

while displaying the first version of the first user interface, detecting a first input that is directed to the first version of the first user interface;

in response to detecting the first input that is directed to the first version of the first user interface:

in accordance with a determination that the first input, that is directed to the first version of the first user interface, meets first criteria, wherein the first criteria require that the first input includes first movement in a first direction in order for the first criteria to be met, replacing display of the first version of the first user interface with display of a second user interface that includes respective representations of a second plurality of applications, wherein the respective representations of the second plurality of applications, when activated, cause the computer system to launch corresponding applications of the respective representations; and in accordance with a determination that the first input, that is directed to the first version of the first user interface, meets second criteria, wherein the second criteria require that the first input is maintained for at least a threshold amount of time, displaying a representation of the first version of the first user interface concurrently with display of at least a portion of a representation of a second version of the first user interface, wherein the second version of the first user interface includes a second plurality of user interface objects displayed concurrently with a second background in accordance with a second configuration, wherein the second plurality of user interface objects correspond to a third plurality of applications and include respective content from the third plurality of applications and are updated periodically as information represented by the second plurality of user interface objects changes, and wherein the first background is different from the second background, the first plurality of user interface objects is different from the second plurality of user interface objects, and/or the first configuration is different from the second configuration;

while concurrently displaying the representation of the first version of the first user interface with at least the portion of the representation of the second version of the first user interface, detecting a respective input directed to a selectable object corresponding to the representation of the first version of the first user interface; and in response to detecting the respective input directed to the selectable object corresponding to the representation of the first version of the first user interface, concurrently displaying the representation of the first version of the first user interface with a representation of the second user interface.

2. The method of claim 1, including:

while the display generation component is in a power-saving state, detecting a second input that corresponds to a request to display the first user interface; and in response to detecting the second input that corresponds to the request to display the first user interface:

in accordance with a determination that the first version of the first user interface is a currently selected version for the first user interface, displaying a first animated transition that corresponds to the first version of the first user interface and displaying the first version of the first user interface upon completion of the first animated transition; and in accordance with a determination that the second version of the first user interface is the currently selected version of the first user interface, displaying a second animated transition that corresponds to the second version of the first user interface and displaying the second version of the first user interface upon completion of the second animated transition, wherein the first animated transition is different from the second animated transition.

3. The method of claim 2, including:

in response to detecting the second input that corresponds to the request to display the first user interface:

in accordance with a determination that the currently selected version of the first user interface is a respective version of the first user interface that includes a plurality of weather-based elements, displaying the currently selected version of the first user interface after displaying animated changes of one or more elements of the plurality of weather-based elements.

4. The method of claim 2, including:

in response to detecting the second input that corresponds to the request to display the first user interface:

in accordance with a determination that the currently selected version of the first user interface is a respective version of the first user interface that includes an image of at least a portion of a planetary or celestial body, displaying the currently selected version of the first user interface after displaying animated movement of the planetary or celestial body.

5. The method of claim 2, including:

in response to detecting the second input that corresponds to the request to display the first user interface:

in accordance with a determination that the currently selected version of the first user interface is a respective version of the first user interface that includes a photo, displaying the currently selected version of the first user interface after changing at least a first visual property of at least a portion of the photo through a plurality of values for the first visual property.

6. The method of claim 2, including:

in response to detecting the second input that corresponds to the request to display the first user interface:

in accordance with a determination that the currently selected version of the first user interface is a respective version of the first user interface that includes a first color gradient, displaying animated changes of the first color gradient before displaying the currently selected version of the first user interface.

7. The method of claim 2, including:

in response to detecting the second input that corresponds to the request to display the first user interface:

in accordance with a determination that the currently selected version of the first user interface is a respective version of the first user interface that includes one or more graphical objects, displaying animated movements of the one or more graphical objects before displaying the currently selected version of the first user interface.

8. The method of claim 1, including:

while displaying a currently selected version of the first user interface, detecting a third input that meets the first criteria; and in response to detecting the third input that meets the first criteria, replacing display of the currently selected version of the first user interface with a respective version of the second user interface that corresponds to the currently selected version of the first user interface, including:

in accordance with a determination that the currently selected version of the first user interface is the first version of the first user interface, displaying a third animated transition that corresponds to the first version of the first user interface and displaying a first version of the second user interface upon completion of the third animated transition; and in accordance with a determination that the currently selected version of the first user interface is the second version of the first user interface, displaying a fourth animated transition that corresponds to the second version of the first user interface and displaying a second version of the second user interface upon completion of the fourth animated transition, wherein the third animated transition is different from the fourth animated transition.

9. The method of claim 8, wherein replacing display of the currently selected version of the first user interface with the respective version of the second user interface that corresponds to the currently selected version of the first user interface includes:

in accordance with a determination that the currently selected version of the first user interface is a respective version of the first user interface that includes a respective color gradient, displaying animated changes of the respective color gradient before displaying the respective version of the second user interface that corresponds to the currently selected version of the first user interface.

10. The method of claim 8, wherein replacing display of the currently selected version of the first user interface with the respective version of the second user interface that corresponds to the currently selected version of the first user interface includes:

in accordance with a determination that the currently selected version of the first user interface is a respective version of the first user interface that includes a portrait, displaying animated increase of a scale of at least a portion of the portrait before displaying the respective version of the second user interface that corresponds to the currently selected version of the first user interface.

11. The method of claim 8, wherein replacing display of the currently selected version of the first user interface with the respective version of the second user interface that corresponds to the currently selected version of the first user interface includes:

in accordance with a determination that the currently selected version of the first user interface is a respective version of the first user interface that includes one or more objects in a foreground of the first user interface, displaying animated movements of the one or more objects in the foreground of the first user interface before displaying the respective version of the second user interface that corresponds to the currently selected version of the first user interface.

12. The method of claim 8, wherein replacing display of the currently selected version of the first user interface with the respective version of the second user interface that corresponds to the currently selected version of the first user interface includes:

in accordance with a determination that the currently selected version of the first user interface is a respective version of the first user interface that includes one or more preset objects, increasing respective visual depths of the one or more objects before displaying the respective version of the second user interface that corresponds to the currently selected version of the first user interface.

13. The method of claim 8, wherein replacing display of the currently selected version of the first user interface with the respective version of the second user interface that corresponds to the currently selected version of the first user interface includes:

in accordance with a determination that the currently selected version of the first user interface is a respective version of the first user interface that includes a pattern of objects, moving the pattern of objects in accordance with a preset movement pattern.

14. The method of claim 8, wherein replacing display of the currently selected version of the first user interface with the respective version of the second user interface that corresponds to the currently selected version of the first user interface includes:

in accordance with a determination that the currently selected version of the first user interface is a respective version of the first user interface that includes a first scene, displaying different views of the first scene that corresponds to movement of a virtual viewpoint within the first scene before displaying the respective version of the second user interface that corresponds to the currently displayed version of the first user interface.

15. The method of claim 1, including:

while displaying a currently selected version of the first user interface, detecting a fourth input that corresponds to a request to dismiss the first user interface; and in response to detecting the fourth input that corresponds to the request to dismiss the first user interface:

in accordance with a determination that a respective user interface that is to replace display of the first user interface in response to the fourth input includes the second user interface, displaying a first intermediate view of the first user interface that visually obscure at least a portion of the second user interface before displaying the second user interface; and in accordance with a determination that the respective user interface that is to replace display of the first user interface in response to the fourth input includes a respective user interface of a first application, displaying a second intermediate view of the first user interface that visually obscures at least a portion of the respective user interface of the first application, wherein the first intermediate view of the first user interface and the second intermediate view of the first user interface have different values for a first display property of the first user interface.

16. The method of claim 1, including:

while the display generation component is in a power-saving state, detecting a fifth input that corresponds to a request to display the first user interface; and in response to detecting the fifth input that corresponds to the request to display the first user interface:

displaying a respective animated transition and displaying a currently selected version of the first user interface upon completion of the respective animated transition, wherein displaying the respective animated transition includes changing an appearance of a textual element in the currently selected version of the first user interface.

17. The method of claim 1, wherein displaying the first version of the first user interface includes displaying an indication of a current time, and wherein the first plurality of user interface objects are displayed proximate to the indication of the current time.

18. The method of claim 1, including:

while displaying the first version of the first user interface, detecting a user input that corresponds to a request to update the first plurality of user interface objects that are displayed concurrently with the first background; and in response to detecting the user input that corresponds to the request to update the first plurality of user interface objects, displaying one or more selectable options that, when selected, modify at least one of the first plurality of user interface objects.

19. The method of claim 1, including:

while the first version of the first user interface is displayed, detecting a first condition that causes the display generation component to cease display of the first user interface;

in response to detecting the first condition that causes the display generation component to cease display of the first user interface, ceasing to display the first version of the first user interface;

while the first user interface is not displayed, detecting a second condition that causes the display generation component to redisplay the first user interface; and in response to detecting the second condition that causes the display generation component to redisplay the first user interface, redisplaying the first version of the first user interface, including:

redisplaying the first plurality of user interface objects with updated application content from the first plurality of applications, in the first version of the first user interface; and in accordance with a determination that one or more notifications have been received between occurrences of the first condition and the second condition, displaying the one or more notifications in the first version of the first user interface, along with the first plurality of user interface objects that include the updated application content.

20. The method of claim 1, wherein displaying the first version of the first user interface including the first plurality of user interface objects includes:

at a first time: displaying the first version of the first user interface with a first user interface object corresponding to a first application and a second user interface object corresponding to a second application, wherein the first user interface object includes first application information from the first application and the second user interface object includes second application information from the second application; and at a second time later than the first time: displaying the first version of the first user interface with the first user interface object corresponding to the first application and the second user interface object corresponding to the second application, wherein the first user interface object includes updated application information from the first application that is different from the first application information from the first application.

21. The method of claim 1 wherein the first plurality of user interface objects includes at least a first user interface object that is associated with a first application published by a first third-party provider and a second user interface object that is associated with a second application published by a second third-party provider different from the first third-party provider.

22. The method of claim 1, including, while displaying the representation of the first version of the first user interface concurrently with the display of the at least a portion of the representation of the second version of the first user interface:

detecting a sixth input that meets third criteria different from the first criteria and the second criteria; and in response to detecting the sixth input that meets the third criteria:

initiating a process to display an editing user interface, including displaying one or more selectable options for editing one or more aspects of the first user interface.

23. The method of claim 1, wherein the method further includes, before displaying the representation of the first version of the first user interface concurrently with the display of the at least a portion of the representation of the second version of the first user interface:

in accordance with a determination that the computer system is in an unauthenticated state, acquiring authentication information prior to displaying the representation of the first version of the first user interface concurrently with the display of the at least a portion of the representation of the second version of the first user interface; and in response to acquiring the authentication information, in accordance with a determination that the authentication information is consistent with authorized authentication information required to transition the computer system from the unauthenticated state to an authenticated state, dismissing an authentication user interface and displaying the representation of the first version of the first user interface concurrently with the display of the at least a portion of the representation of the second version of the first user interface.

24. The method of claim 1, wherein the second criteria require that the first input is detected at a location that corresponds to a predefined portion of the first user interface.

25. The method of claim 1, wherein:

replacing display of the first version of the first user interface with the second user interface in accordance with the determination that the first input meets the first criteria includes replacing display of the first version of the first user interface with a first version of the second user interface that corresponds to the first version of the first user interface, and the method further includes:

while displaying the second version of the first user interface, detecting a seventh input; and in response to detecting the seventh input:

in accordance with a determination that the seventh input meets the first criteria, replacing display of the second version of the first user interface with a second version of the second user interface that corresponds to the second version of the first user interface.

26. The method of claim 25, wherein the first version of the second user interface includes a third background and the second version of the second user interface includes fourth background that is different from the third background.

27. The method of claim 25, wherein the second version of the second user interface includes respective representations of a third plurality of applications that are distinct from the respective representations of the second plurality of applications that are included in the first version of the second user interface.

28. The method of claim 1, wherein the first version of the first user interface includes a first notification display region that is configured to display a plurality of notifications, and the second version of the first user interface includes a second notification display region that is configured to display the plurality of notifications.

29. The method of claim 28, wherein detecting the first input includes detecting the first input while one or more notifications are displayed in the first notification display region in the first version of the first user interface.

30. The method of claim 1, including:

in response to detecting the first input that is directed to the first version of the first user interface:

in accordance with a determination that the first input, that is directed to the first version of the first user interface, meets third criteria, wherein the third criteria require that the first input includes second movement in a second direction, different from the first direction, in order for the third criteria to be met, replacing display of the first version of the first user interface with display of a user interface of a camera application.

31. The method of claim 1, wherein the representation of the first version of the first user interface includes a selectable option that is configured to set, for the first version of the first user interface, a respective notification delivery mode of the computer system that is used when the first version of the first user interface is displayed.

32. The method of claim 1, including:

in response to detecting the first input that is directed to the first version of the first user interface:

in accordance with a determination that the first input that is directed to the first version of the first user interface meets fourth criteria, wherein the fourth criteria require that the first input includes third movement in a third direction, different from the first direction, for the fourth criteria to be met, displaying a third version of the first user interface, wherein displaying the third version of the first user interface includes displaying a third plurality of user interface objects in accordance with a third configuration, wherein the third plurality of user interface objects correspond to a fourth plurality of applications and include respective content from the fourth plurality of applications and are updated periodically as information represented by the third plurality of user interface objects changes, and wherein:

the first plurality of user interface objects is different from the third plurality of user interface objects, the first configuration is different from the third configuration, or the first plurality of user interface objects is different from the third plurality of user interface objects, and the first configuration is different from the third configuration.

33. A computer system in communication with a display generation component, comprising:

one or more processors; and memory storing one or more programs, wherein the one or more programs are configured to be executed by the one or more processors, the one or more programs including instructions for:

displaying, via the display generation component, a first version of a first user interface that corresponds to a restricted state of the computer system, wherein displaying the first version of the first user interface includes displaying a first plurality of user interface objects displayed concurrently with a first background in accordance with a first configuration, and wherein the first plurality of user interface objects correspond to a first plurality of applications and include respective content from the first plurality of applications and are updated periodically as information represented by the first plurality of user interface objects changes;

while displaying the first version of the first user interface, detecting a first input that is directed to the first version of the first user interface;

in response to detecting the first input that is directed to the first version of the first user interface:

in accordance with a determination that the first input, that is directed to the first version of the first user interface, meets first criteria, wherein the first criteria require that the first input includes first movement in a first direction in order for the first criteria to be met, replacing display of the first version of the first user interface with display of a second user interface that includes respective representations of a second plurality of applications, wherein the respective representations of the second plurality of applications, when activated, cause the computer system to launch corresponding applications of the respective representations; and in accordance with a determination that the first input, that is directed to the first version of the first user interface, meets second criteria, wherein the second criteria require that the first input is maintained for at least a threshold amount of time, displaying a representation of the first version of the first user interface concurrently with display of at least a portion of a representation of a second version of the first user interface, wherein the second version of the first user interface includes a second plurality of user interface objects displayed concurrently with a second background in accordance with a second configuration, wherein the second plurality of user interface objects correspond to a third plurality of applications and include respective content from the third plurality of applications and are updated periodically as information represented by the second plurality of user interface objects changes, and wherein the first background is different from the second background, the first plurality of user interface objects is different from the second plurality of user interface objects, and/or the first configuration is different from the second configuration;

while concurrently displaying the representation of the first version of the first user interface with at least the portion of the representation of the second version of the first user interface, detecting a respective input directed to a selectable object corresponding to the representation of the first version of the first user interface; and in response to detecting the respective input directed to the selectable object corresponding to the representation of the first version of the first user interface, concurrently displaying the representation of the first version of the first user interface with a representation of the second user interface.

34. The computer system of claim 33, the one or more programs further including instructions for:

while the display generation component is in a power-saving state, detecting a second input that corresponds to a request to display the first user interface; and in response to detecting the second input that corresponds to the request to display the first user interface:

in accordance with a determination that the first version of the first user interface is a currently selected version for the first user interface, displaying a first animated transition that corresponds to the first version of the first user interface and displaying the first version of the first user interface upon completion of the first animated transition; and in accordance with a determination that the second version of the first user interface is the currently selected version of the first user interface, displaying a second animated transition that corresponds to the second version of the first user interface and displaying the second version of the first user interface upon completion of the second animated transition, wherein the first animated transition is different from the second animated transition.

35. The computer system of claim 33, the one or more programs further including instructions for:

while displaying a currently selected version of the first user interface, detecting a third input that meets the first criteria; and in response to detecting the third input that meets the first criteria, replacing display of the currently selected version of the first user interface with a respective version of the second user interface that corresponds to the currently selected version of the first user interface, including:

in accordance with a determination that the currently selected version of the first user interface is the first version of the first user interface, displaying a third animated transition that corresponds to the first version of the first user interface and displaying a first version of the second user interface upon completion of the third animated transition; and in accordance with a determination that the currently selected version of the first user interface is the second version of the first user interface, displaying a fourth animated transition that corresponds to the second version of the first user interface and displaying a second version of the second user interface upon completion of the fourth animated transition, wherein the third animated transition is different from the fourth animated transition.

36. The computer system of claim 33, the one or more programs further including instructions for:

while displaying a currently selected version of the first user interface, detecting a fourth input that corresponds to a request to dismiss the first user interface; and in response to detecting the fourth input that corresponds to the request to dismiss the first user interface:

in accordance with a determination that a respective user interface that is to replace display of the first user interface in response to the fourth input includes the second user interface, displaying a first intermediate view of the first user interface that visually obscure at least a portion of the second user interface before displaying the second user interface; and in accordance with a determination that the respective user interface that is to replace display of the first user interface in response to the fourth input includes a respective user interface of a first application, displaying a second intermediate view of the first user interface that visually obscures at least a portion of the respective user interface of the first application, wherein the first intermediate view of the first user interface and the second intermediate view of the first user interface have different values for a first display property of the first user interface.

37. The computer system of claim 33, the one or more programs further including instructions for:

while the display generation component is in a power-saving state, detecting a fifth input that corresponds to a request to display the first user interface; and in response to detecting the fifth input that corresponds to the request to display the first user interface:

displaying a respective animated transition and displaying a currently selected version of the first user interface upon completion of the respective animated transition, wherein displaying the respective animated transition includes changing an appearance of a textual element in the currently selected version of the first user interface.

38. The computer system of claim 33, wherein displaying the first version of the first user interface includes displaying an indication of a current time, and wherein the first plurality of user interface objects are displayed proximate to the indication of the current time.

39. The computer system of claim 33, the one or more programs further including instructions for:

while displaying the first version of the first user interface, detecting a user input that corresponds to a request to update the first plurality of user interface objects that are displayed concurrently with the first background; and in response to detecting the user input that corresponds to the request to update the first plurality of user interface objects, displaying one or more selectable options that, when selected, modify at least one of the first plurality of user interface objects.

40. The computer system of claim 33, the one or more programs further including instructions for:

while the first version of the first user interface is displayed, detecting a first condition that causes the display generation component to cease display of the first user interface;

in response to detecting the first condition that causes the display generation component to cease display of the first user interface, ceasing to display the first version of the first user interface;

while the first user interface is not displayed, detecting a second condition that causes the display generation component to redisplay the first user interface; and in response to detecting the second condition that causes the display generation component to redisplay the first user interface, redisplaying the first version of the first user interface, including:

redisplaying the first plurality of user interface objects with updated application content from the first plurality of applications, in the first version of the first user interface; and in accordance with a determination that one or more notifications have been received between occurrences of the first condition and the second condition, displaying the one or more notifications in the first version of the first user interface, along with the first plurality of user interface objects that include the updated application content.

41. The computer system of claim 33, wherein displaying the first version of the first user interface including the first plurality of user interface objects includes:

at a first time: displaying the first version of the first user interface with a first user interface object corresponding to a first application and a second user interface object corresponding to a second application, wherein the first user interface object includes first application information from the first application and the second user interface object includes second application information from the second application; and at a second time later than the first time: displaying the first version of the first user interface with the first user interface object corresponding to the first application and the second user interface object corresponding to the second application, wherein the first user interface object includes updated application information from the first application that is different from the first application information from the first application.

42. The computer system of claim 33, wherein the first plurality of user interface objects includes at least a first user interface object that is associated with a first application published by a first third-party provider and a second user interface object that is associated with a second application published by a second third-party provider different from the first third-party provider.

43. The computer system of claim 33, the one or more programs further including instructions for, while displaying the representation of the first version of the first user interface concurrently with the display of the at least a portion of the representation of the second version of the first user interface:

detecting a sixth input that meets third criteria different from the first criteria and the second criteria; and in response to detecting the sixth input that meets the third criteria:

initiating a process to display an editing user interface, including displaying one or more selectable options for editing one or more aspects of the first user interface.

44. The computer system of claim 33, wherein the one or more programs further include instructions for, before displaying the representation of the first version of the first user interface concurrently with the display of the at least a portion of the representation of the second version of the first user interface:

in accordance with a determination that the computer system is in an unauthenticated state, acquiring authentication information prior to displaying the representation of the first version of the first user interface concurrently with the display of the at least a portion of the representation of the second version of the first user interface; and in response to acquiring the authentication information, in accordance with a determination that the authentication information is consistent with authorized authentication information required to transition the computer system from the unauthenticated state to an authenticated state, dismissing an authentication user interface and displaying the representation of the first version of the first user interface concurrently with the display of the at least a portion of the representation of the second version of the first user interface.

45. The computer system of claim 33, wherein the second criteria require that the first input is detected at a location that corresponds to a predefined portion of the first user interface.

46. The computer system of claim 33, wherein:
replacing display of the first version of the first user interface with the second user interface in accordance with the determination that the first input meets the first criteria includes replacing display of the first version of the first user interface with a first version of the second user interface that corresponds to the first version of the first user interface, and
the one or more programs further include instructions for:
while displaying the second version of the first user interface, detecting a seventh input; and
in response to detecting the seventh input:
in accordance with a determination that the seventh input meets the first criteria, replacing display of the second version of the first user interface with a second version of the second user interface that corresponds to the second version of the first user interface.

47. The computer system of claim 33, wherein the first version of the first user interface includes a first notification display region that is configured to display a plurality of notifications, and the second version of the first user interface includes a second notification display region that is configured to display the plurality of notifications.

48. The computer system of claim 33, the one or more programs further including instructions for:
in response to detecting the first input that is directed to the first version of the first user interface:
in accordance with a determination that the first input, that is directed to the first version of the first user interface, meets third criteria, wherein the third criteria require that the first input includes second movement in a second direction, different from the first direction, in order for the third criteria to be met, replacing display of the first version of the first user interface with display of a user interface of a camera application.

49. The computer system of claim 33, wherein the representation of the first version of the first user interface includes a selectable option that is configured to set, for the first version of the first user interface, a respective notification delivery mode of the computer system that is used when the first version of the first user interface is displayed.

50. The computer system of claim 33, the one or more programs further including instructions for:
in response to detecting the first input that is directed to the first version of the first user interface:
in accordance with a determination that the first input that is directed to the first version of the first user interface meets fourth criteria, wherein the fourth criteria require that the first input includes third movement in a third direction, different from the first direction, for the fourth criteria to be met, displaying a third version of the first user interface, wherein displaying the third version of the first user interface includes displaying a third plurality of user interface objects in accordance with a third configuration, wherein the third plurality of user interface objects correspond to a fourth plurality of applications and include respective content from the fourth plurality of applications and are updated periodically as information represented by the third plurality of user interface objects changes, and wherein:
the first plurality of user interface objects is different from the third plurality of user interface objects,
the first configuration is different from the third configuration, or
the first plurality of user interface objects is different from the third plurality of user interface objects, and the first configuration is different from the third configuration.

51. A non-transitory computer readable storage medium storing one or more programs, the one or more programs comprising instructions that, when executed by a computer system in communication with a display generation component cause the computer system to:
display, via the display generation component, a first version of a first user interface that corresponds to a restricted state of the computer system, wherein displaying the first version of the first user interface includes displaying a first plurality of user interface objects displayed concurrently with a first background in accordance with a first configuration, and wherein the first plurality of user interface objects correspond to a first plurality of applications and include respective content from the first plurality of applications and are updated periodically as information represented by the first plurality of user interface objects changes;
while displaying the first version of the first user interface, detect a first input that is directed to the first version of the first user interface;
in response to detecting the first input that is directed to the first version of the first user interface:
in accordance with a determination that the first input, that is directed to the first version of the first user interface, meets first criteria, wherein the first criteria require that the first input includes first movement in a first direction in order for the first criteria to be met, replace display of the first version of the first user interface with display of a second user interface that includes respective representations of a second plurality of applications, wherein the respective representations of the second plurality of applications, when activated, cause the computer system to launch corresponding applications of the respective representations; and
in accordance with a determination that the first input, that is directed to the first version of the first user interface, meets second criteria, wherein the second criteria require that the first input is maintained for at least a threshold amount of time, display a representation of the first version of the first user interface concurrently with display of at least a portion of a representation of a second version of the first user interface, wherein the second version of the first user interface includes a second plurality of user interface objects displayed concurrently with a second background in accordance with a second configuration, wherein the second plurality of user interface objects correspond to a third plurality of applications and include respective content from the third plurality of applications and are updated periodically as information represented by the second plurality of user interface objects changes, and wherein the first background is different from the second background, the first plurality of user interface objects is different from the second plurality of user interface objects, and/or the first configuration is different from the second configuration;
while concurrently displaying the representation of the first version of the first user interface with at least the portion of the representation of the second version of the first user interface, detect a respective input directed to a selectable object corresponding to the representation of the first version of the first user interface; and in response to detecting the respective input directed to the selectable object corresponding to the representation of the first version of the first user interface, concurrently display the representation of the first version of the first user interface with a representation of the second user interface.

52. The non-transitory computer readable storage medium of claim 51, the one or more programs further including instructions that cause the computer system to:

while the display generation component is in a power-saving state, detect a second input that corresponds to a request to display the first user interface; and in response to detecting the second input that corresponds to the request to display the first user interface:

in accordance with a determination that the first version of the first user interface is a currently selected version for the first user interface, display a first animated transition that corresponds to the first version of the first user interface and display the first version of the first user interface upon completion of the first animated transition; and in accordance with a determination that the second version of the first user interface is the currently selected version of the first user interface, display a second animated transition that corresponds to the second version of the first user interface and display the second version of the first user interface upon completion of the second animated transition, wherein the first animated transition is different from the second animated transition.

53. The non-transitory computer readable storage medium of claim 51, the one or more programs further including instructions that cause the computer system to:

while displaying a currently selected version of the first user interface, detect a third input that meets the first criteria; and in response to detecting the third input that meets the first criteria, replace display of the currently selected version of the first user interface with a respective version of the second user interface that corresponds to the currently selected version of the first user interface, including:

in accordance with a determination that the currently selected version of the first user interface is the first version of the first user interface, displaying a third animated transition that corresponds to the first version of the first user interface and displaying a first version of the second user interface upon completion of the third animated transition; and in accordance with a determination that the currently selected version of the first user interface is the second version of the first user interface, displaying a fourth animated transition that corresponds to the second version of the first user interface and displaying a second version of the second user interface upon completion of the fourth animated transition, wherein the third animated transition is different from the fourth animated transition.

54. The non-transitory computer readable storage medium of claim 51, the one or more programs further including instructions that cause the computer system to:

while displaying a currently selected version of the first user interface, detect a fourth input that corresponds to a request to dismiss the first user interface; and in response to detecting the fourth input that corresponds to the request to dismiss the first user interface:

in accordance with a determination that a respective user interface that is to replace display of the first user interface in response to the fourth input includes the second user interface, display a first intermediate view of the first user interface that visually obscure at least a portion of the second user interface before displaying the second user interface; and in accordance with a determination that the respective user interface that is to replace display of the first user interface in response to the fourth input includes a respective user interface of a first application, display a second intermediate view of the first user interface that visually obscures at least a portion of the respective user interface of the first application, wherein the first intermediate view of the first user interface and the second intermediate view of the first user interface have different values for a first display property of the first user interface.

55. The non-transitory computer readable storage medium of claim 51, the one or more programs further including instructions that cause the computer system to:

while the display generation component is in a power-saving state, detect a fifth input that corresponds to a request to display the first user interface; and in response to detecting the fifth input that corresponds to the request to display the first user interface:

display a respective animated transition and displaying a currently selected version of the first user interface upon completion of the respective animated transition, wherein displaying the respective animated transition includes changing an appearance of a textual element in the currently selected version of the first user interface.

56. The non-transitory computer readable storage medium of claim 51, wherein displaying the first version of the first user interface includes displaying an indication of a current time, and wherein the first plurality of user interface objects are displayed proximate to the indication of the current time.

57. The non-transitory computer readable storage medium of claim 51, the one or more programs further including instructions that cause the computer system to:

while displaying the first version of the first user interface, detect a user input that corresponds to a request to update the first plurality of user interface objects that are displayed concurrently with the first background; and in response to detecting the user input that corresponds to the request to update the first plurality of user interface objects, display one or more selectable options that, when selected, modify at least one of the first plurality of user interface objects.

58. The non-transitory computer readable storage medium of claim 51, the one or more programs further including instructions that cause the computer system to:

while the first version of the first user interface is displayed, detect a first condition that causes the display generation component to cease display of the first user interface;

in response to detecting the first condition that causes the display generation component to cease display of the first user interface, cease to display the first version of the first user interface;

while the first user interface is not displayed, detect a second condition that causes the display generation component to redisplay the first user interface; and in response to detecting the second condition that causes the display generation component to redisplay the first user interface, redisplay the first version of the first user interface, including:

redisplay the first plurality of user interface objects with updated application content from the first plurality of applications, in the first version of the first user interface; and in accordance with a determination that one or more notifications have been received between occurrences of the first condition and the second condition, display the one or more notifications in the first version of the first user interface, along with the first plurality of user interface objects that include the updated application content.

59. The non-transitory computer readable storage medium of claim 51, wherein displaying the first version of the first user interface including the first plurality of user interface objects includes:

at a first time: displaying the first version of the first user interface with a first user interface object corresponding to a first application and a second user interface object corresponding to a second application, wherein the first user interface object includes first application information from the first application and the second user interface object includes second application information from the second application; and at a second time later than the first time: displaying the first version of the first user interface with the first user interface object corresponding to the first application and the second user interface object corresponding to the second application, wherein the first user interface object includes updated application information from the first application that is different from the first application information from the first application.

60. The non-transitory computer readable storage medium of claim 51, wherein the first plurality of user interface objects includes at least a first user interface object that is associated with a first application published by a first third-party provider and a second user interface object that is associated with a second application published by a second third-party provider different from the first third-party provider.

61. The non-transitory computer readable storage medium of claim 51, the one or more programs further including instructions that cause the computer system to, while displaying the representation of the first version of the first user interface concurrently with the display of the at least a portion of the representation of the second version of the first user interface:

detect a sixth input that meets third criteria different from the first criteria and the second criteria; and in response to detecting the sixth input that meets the third criteria:

initiate a process to display an editing user interface, including displaying one or more selectable options for editing one or more aspects of the first user interface.

62. The non-transitory computer readable storage medium of claim 51, wherein the one or more programs further include instructions that cause the computer system to, before displaying the representation of the first version of the first user interface concurrently with the display of the at least a portion of the representation of the second version of the first user interface:

in accordance with a determination that the computer system is in an unauthenticated state, acquire authentication information prior to displaying the representation of the first version of the first user interface concurrently with the display of the at least a portion of the representation of the second version of the first user interface; and in response to acquiring the authentication information, in accordance with a determination that the authentication information is consistent with authorized authentication information required to transition the computer system from the unauthenticated state to an authenticated state, dismiss an authentication user interface and display the representation of the first version of the first user interface concurrently with the display of the at least a portion of the representation of the second version of the first user interface.

63. The non-transitory computer readable storage medium of claim 51, wherein the second criteria require that the first input is detected at a location that corresponds to a predefined portion of the first user interface.

64. The non-transitory computer readable storage medium of claim 51, wherein:

replacing display of the first version of the first user interface with the second user interface in accordance with the determination that the first input meets the first criteria includes replacing display of the first version of the first user interface with a first version of the second user interface that corresponds to the first version of the first user interface, and the one or more programs further include instructions that cause the computer system to:

while displaying the second version of the first user interface, detect a seventh input; and in response to detecting the seventh input:

in accordance with a determination that the seventh input meets the first criteria, replace display of the second version of the first user interface with a second version of the second user interface that corresponds to the second version of the first user interface.

65. The non-transitory computer readable storage medium of claim 51, wherein the first version of the first user interface includes a first notification display region that is configured to display a plurality of notifications, and the second version of the first user interface includes a second notification display region that is configured to display the plurality of notifications.

66. The non-transitory computer readable storage medium of claim 51, the one or more programs further including instructions that cause the computer system to:

in response to detecting the first input that is directed to the first version of the first user interface:

in accordance with a determination that the first input, that is directed to the first version of the first user interface, meets third criteria, wherein the third criteria require that the first input includes second movement in a second direction, different from the first direction, in order for the third criteria to be met, replace display of the first version of the first user interface with display of a user interface of a camera application.

67. The non-transitory computer readable storage medium of claim 51, wherein the representation of the first version of the first user interface includes a selectable option that is configured to set, for the first version of the first user interface, a respective notification delivery mode of the computer system that is used when the first version of the first user interface is displayed.

68. The non-transitory computer readable storage medium of claim 51, the one or more programs further including instructions that cause the computer system to:

in response to detecting the first input that is directed to the first version of the first user interface:

in accordance with a determination that the first input that is directed to the first version of the first user interface meets fourth criteria, wherein the fourth criteria require that the first input includes third movement in a third direction, different from the first direction, for the fourth criteria to be met, display a third version of the first user interface, wherein displaying the third version of the first user interface includes displaying a third plurality of user interface objects in accordance with a third configuration, wherein the third plurality of user interface objects correspond to a fourth plurality of applications and include respective content from the fourth plurality of applications and are updated periodically as information represented by the third plurality of user interface objects changes, and wherein:

the first plurality of user interface objects is different from the third plurality of user interface objects, the first configuration is different from the third configuration, or the first plurality of user interface objects is different from the third plurality of user interface objects, and the first configuration is different from the third configuration.

* * * * *